US009141823B2

(12) United States Patent
Dawson

(10) Patent No.: US 9,141,823 B2
(45) Date of Patent: Sep. 22, 2015

(54) ABSTRACTION LAYER FOR DEFAULT ENCRYPTION WITH ORTHOGONAL ENCRYPTION LOGIC SESSION OBJECT; AND AUTOMATED AUTHENTICATION, WITH A METHOD FOR ONLINE LITIGATION

(71) Applicant: William Johnson Dawson, Baja, CA (US)

(72) Inventor: William Johnson Dawson, Baja, CA (US)

(73) Assignee: Veridicom, SA de CV, Baja California (MX)

( * ) Notice: Subject to any disclaimer, the term of this patent is extended or adjusted under 35 U.S.C. 154(b) by 0 days.

(21) Appl. No.: 13/841,763

(22) Filed: Mar. 15, 2013

(65) Prior Publication Data

US 2014/0304505 A1    Oct. 9, 2014

(51) Int. Cl.
*H04L 9/00* (2006.01)
*H04L 9/32* (2006.01)
*G06F 21/62* (2013.01)
*G09C 5/00* (2006.01)

(52) U.S. Cl.
CPC .............. *G06F 21/6227* (2013.01); *G09C 5/00* (2013.01); *H04L 9/00* (2013.01); *H04L 9/32* (2013.01)

(58) Field of Classification Search
CPC ............................ H04L 9/00; H04L 32/3297
USPC .......... 713/165, 168–174, 182–186; 709/225, 709/229; 726/2–9; 380/255, 266, 270, 273
See application file for complete search history.

(56) References Cited

U.S. PATENT DOCUMENTS

| | | | | |
|---|---|---|---|---|
| 2006/0277054 | A1* | 12/2006 | Benzrihem et al. | 705/1 |
| 2007/0016802 | A1* | 1/2007 | Wingert et al. | 713/193 |
| 2008/0209231 | A1* | 8/2008 | Kim et al. | 713/189 |
| 2009/0208001 | A1* | 8/2009 | Kent et al. | 380/42 |
| 2010/0131753 | A1* | 5/2010 | Ha | 713/153 |
| 2012/0174200 | A1* | 7/2012 | Cross et al. | 726/6 |
| 2012/0246487 | A1* | 9/2012 | Gu et al. | 713/190 |
| 2013/0080573 | A1* | 3/2013 | Boliek et al. | 709/217 |

* cited by examiner

*Primary Examiner* — Evans Desrosiers
*Assistant Examiner* — Quazi Farooqui
(74) *Attorney, Agent, or Firm* — Blakely Sokoloff Taylor & Zafman LLP

(57) ABSTRACT

Embodiments herein provide methods, apparatus, computer program products, software and means for (1) an abstraction layer for default encryption, (2) with orthogonal encryption logic session object, and (3) automated authentication, (4) with a method for online litigation. In some cases subject matter disclosed herein relates to default data encryption; use a user's registration data to generate an encryption logic and related executable code, including servers and client applications; encryption as an automatic background task occurring through variable encryption logic, with authentication; embodiments are also described for conducting online litigation through pleadings formed as meta-files that trigger litigation related algorithms in order to automate and coordinate litigation.

17 Claims, 157 Drawing Sheets

| Workspace |
| --- |
| Area LeftArea;<br>Area RightArea;<br>String title; |
| getLeftArea(): Area<br>getRightArea(): Area<br>getTitle(): String<br>setLeftArea(Area)<br>setRightArea(Area)<br>setTitle(String) |

| Area |
| --- |
| String Name;<br>String class; |
| getName(): String<br>getClass(): String<br>setName(String)<br>setClass(String) |

| MenuBar |
| --- |
| Menu[] menu;<br>String title; |
| getMenuArray(): Menu[]<br>getTitle(): String<br>setMenuArray(Menu[])<br>setTitle(String) |

| Menu |
| --- |
| String Name;<br>String class; |
| getName(): String<br>getClass(): String<br>setName(String)<br>setClass(String) |

| Application |
| --- |
| Workspace workspace;<br>MenuBar menuBar; |
| getWorkspace():Workspace<br>getMenuBar(): MenuBar<br>setWorkspace(Workspace)<br>setMenuBar(MenuBar) |

FIG.14

From

Subject

Attachment
C:\docs\MyDoc.docx    Browse

Send

FIG. 36

| Select Source Drive | ▾ |
|---|---|
| A:\ | |
| C:\ | |

| Select Dest. Drive | ▾ |
|---|---|
| E:\ | |
| F:\ | |

Expiration Date: | DAY ▾ | MO ▾ | Yr ▾

Select File

| Name | Author | Path |
|---|---|---|
| MyMatter.xml | jramirez | F:\sharedFiles\ |
| Case1.xml | jdawson | C:\sharedFiles\ |
| Case2.xml | iiohnson | E:\sharedFiles\ |

Cancel | Ok

FIG. 71

| Select Client | ▼ |
|---|---|
| JM Ramirez | |
| John Dawson | |
| William Smith | |
| Ramon Martinez | |
| Caleb Robinson | |

Report

| Date | Id | Messages Sent |
|---|---|---|
| 03/02/2012 | jramirez | 2 |
| 04/03/2012 | jdawson | 5 |
| 04/03/2012 | wsmith | 3 |

[ Cancel ] [ Ok ]

FIG. 72

General Data

ELDs: 100
Test Mode ELDs: 10

Interval for Updating MetaLogic: 24
Units:
Months
Weeks
Days
Hours

Interval for Updating ELDs: 24
Units:
Months
Weeks
Days
Hours

Client Confidential

Login :

jlivingston@gmail.com

Password :

************************

[ Login ]

☐ Remember Data

```
 3  Court of State of California

4

5  Mario Logan,                    )  Case No.: 00001
                                    )
 6              Plaintiff,          )  Motion to Dismiss Deal
                                    )
 7       vs.                        )
                                    )
 8  Joseph Jones,                   )
                                    )
 9              Defendant           )
                                    )
10  _____

11

12                                     Dated this 20/11/2012
                                       _____
13                                         John Livingston
14                           Signature
15
16                           
17
```

[33] The packet receives other values to complete the matters DBMS of the second lawyer for the case. Such additional values include additional identity information concerning the first lawyer needed to render complete the matters DBMS of the second lawyer's Lit Linker for that case. The packet also includes any new data concerning other lawyers and parties who might have entered the case.

↓

[34] Because this is the second lawyer's first appearance, the packet will include all of the pleadings that have been generated in the case. (Note the fact that the second lawyer does not have them yet.) Everytime one lawyer contacts another, both Lit Linkers' *global pleadings indexes* are compared and updated as a background task, so that all the lawyers always enjoy access to the complete set of pleadings in the case. The lists are compared, and the more complete Lit Linker updates the less complete Lit Linker by supplying the missing pleadings. Watermarking assures accuracy.

↓

[35] Lit Linker transmits the service response packet to the second lawyer.

[36] The second lawyer's Lit Linker receives and processes the service response packet. The balance of the first lawyer's ID data is inserted into the second lawyer's matters DBMS. If any other lawyers have joined the case, their data is also added to the DBMS, along with their client information. The second laywer's Lit Linker compares its pleading set to the pleadings in the packet and saves any not yet received.

[37] The second lawyer's Lit Linker is now complete and he can engage in online litigation henceforth in the case that the first lawyer has begun. He has the latest data pertaining to the case.

[38] The second lawyer, through his Lit Linker, wants to propound interrogatories to the first lawyer, and now he can do so electronically. He has completed his first electronic pleading and as a result is no longer burdened with the manual steps in Box 16 because his Lit Linker has recorded the fact that he already has appeared electronically in the case. The automatic functionality of the litigation process algorithms is given effect through the values in each pleading meta-file. The values in the meta-file and in the DBMS actuate the algorithms, rendering automatic the steps of litigation.

[39] End

FIG. 123G

[46] The Lit Linker auto-completes the pleading meta-file for the complaint in intervention by means of the data harvested from the reply to the request for case data which the first lawyer sent out. With this step has entered the case electronically, so he can serve pleadings online.

[47] End

Create Pleading

Pleading Data

ID

3F&8^KT7!+Y40Y)P$-&86)%$*5)9+351+E-$~&O5#X~0V~11-L

Superior Court of California

Name
Logan vs Jones

Author
John Livingston

Plaintiff
Mario Logan

Defendant
Joseph Jones

Intellectual Content
Comes now the plaintiff, Mario Logan, and complains as against the defendants and each of them as follows....

Ok    Cancel

FIG. 127

```
 1  Gregory Macarthur

2  Beyer Street, 5646, San Diego, California

3

4  California Supreme Court

5

6  Mario Logan,                      ) Case No.: 012349897865461
                                      )
 7              Plaintiff,            ) Motion To Dismiss Appeal
                                      )
 8       vs.                          )
                                      )
 9  Joseph Jones,                     )
                                      )
10              Defendant             )
                                      )
11

12

13

14

15                                Dated this November, 5, 2012
                                  _____
16                                Park Ave. Road, 2343, San Diego, California
                                            John Livingston
17
```

FIG. 129

Create Pleading

Pleading Data

ID
3F&8^KT7I+Y4

Superior Court of California

Name
Logan vs Jones

Author
Gregory Mcarthur

Plaintiff
Mario Logan

Defendant
Joseph Jones

Intellectual Content
My client, Joseph Jones....

Ok    Cancel

FIG. 131

```
<MetaFile>
    <Header>
        <Pair Name="TYPE" Value="SERVICE_RESPONSE_PACKET"/>
        <Pair Name="MATTER_ID_CHARS" Value="0Y)P$-&86)%$*5)9+351+E-
                $~&O5#X~0V~11-L3)*%H40+058L366%Y(-#7+HU65~2~4"/>
        <Pair Name="MATTER_XML"
            VALUE = "
            <Pairs>
                <Pair Name="MATTER_NAME" Value="Logan vs Jones">
                <Pair Name="PLAINTIFF" Value="Mario Logan">
                <Pair Name="DEFENDANT" Value="Joseph Jones">
                <Pair Name="PLAINTIFF_ATTORNEY" Value=" John
                                                            Livingston">
                <Pair Name=" ATTORNEY_EMAIL" Value="
                                                            jlivingstone@gmail.com">
                <Pair Name="Jurisdiction" Value=" State Court of California">
            </Pairs> "
        />
        <Pair Name="ATTORNEYS"
            VALUE = "
            <Pairs>
                <Pair Name="Solomon Peterson" Value="spet@gmail.com">
                <Pair Name="David Levy" Value="dlevy@hotmail.com">
            </Pairs> "
        />
        <Pair Name="PLEADINGS"
            VALUE = "
            <Pairs>
                <Pair Name="Complaint" Value="... ">
                <Pair Name="Response to complaint" Value="... ">
                <Pair Name="Cross complaint" Value="... ">
            </Pairs> "
        />
```

FIG. 140

ABSTRACTION LAYER FOR DEFAULT ENCRYPTION WITH ORTHOGONAL ENCRYPTION LOGIC SESSION OBJECT; AND AUTOMATED AUTHENTICATION, WITH A METHOD FOR ONLINE LITIGATION

BACKGROUND FIELD

The subject matter disclosed herein (1) relate to default data encryption; (2) use a user's registration data to generate an encryption logic and related executable code, including servers and client applications; (3) perform encryption as an automatic background task occurring through variable encryption logic, with authentication; (4) and optionally conduct online litigation through pleadings formed as meta-files that trigger litigation related algorithms in order to automate and coordinate litigation.

BACKGROUND

Relevant Background

The encryption of digital data sent between points is the subject of abundant prior art. The purpose of encrypting a data stream or file is to obstruct access by a person not entitled to receive it. Denial of access is brought about by an executable program that, on the sender's end of the data stream, scrambles the digital bits of the data flow. At the other end the person who receives the data unscrambles it and is able to read it.

In other processes encryption is put into effect by an executable program that requires that a person entitled to receive the information posses a password, a key (a number expressed in binary logic) that enables the program to descramble the information. The effectiveness of the key depends on its length, and on the complexity of the executable code with which it interacts. The password is received by an algorithm that performs the scrambling/descrambling.

Symmetric key encryption is a scheme in which each computer knows the secret key that, when entered into the scrambling or descrambling algorithm, allows the process to occur. Symmetric key encryption is limited in that the data stream itself can be received by someone other than the intended recipient.

One solution to this problem is public-key encryption. Also known as asymmetric-key encryption, public-key encryption uses two different keys at once: a private key and a public key. The private key is known only to your own computer while the public key is given by your computer to any computer that wants to communicate securely with it. To decode an encrypted message, a computer must use the public key, provided by the originating computer, and its own private key. One very popular public-key encryption program is Pretty Good Privacy (PGP).

Another approach to encryption is with SSL, which may use certificates. Certificates are used in connection with Public Key cryptography in order to authenticate the parties who send each other encrypted messages. But the use of certificates or Public Key cryptography has not been completely successful.

As Wikipedia explains, July 2012:
A central problem with the use of public-key cryptography is confidence (ideally, proof) that a particular public key is correct, and belongs to the person or entity claimed (i.e. is "authentic"), and has not been tampered with, or replaced by, a malicious third party (a "man-in-the-middle"). The usual approach to this problem is to use a public-key infrastructure (PKI), in which one or more third parties—known as certificate authorities—certify ownership of key pairs. PGP, in addition to being a certificate authority structure, has used a scheme generally called the "web of trust", which decentralizes such authentication of public keys by a central mechanism, and substitutes individual endorsements of the link between user and public key. To date, no fully satisfactory solution to this "public key authentication problem" has been found.

The embodiments are the solution to this problem.

The Encryption Logic Switch may be used to create ELD's and distribute them across the network. One embodiment is a hub-and-spoke configuration reaching the client applications to supply them with the ELD's. For example, a chat server may provide chat sessions as well as disposable encryption logic, flushed and replaced for each new session through the dynamic class loading, to encrypt the chat transmissions occurring in a session. The encryption occurs automatically, which is to say by default and with no user input. At the start of the session each computer in the chat session receives the common ELD. A Secondary ELD also may be used in this approach, encrypting the ELD used on the plain-text. This allows the ELD used on the plain-text safely to be included in the encryption meta-file, which allows the entire meta-file to execute automatically as a background task, auto encrypting it upon transmission and auto decrypting it upon receipt. Trust is granted in the embodiments by the encrypted transmission of the ELD's that are used to carry out encryption on the plain-text, through a private, Secondary ELD that encrypts the first ELD used in the plain-text encryption. This is to say, the first encryption logic instruction is used to scramble the payload of the message, and the second encryption logic instruction is used to scramble the first instruction, and as so encrypted the first logic instruction, which is a text file, and the encrypted plain-text are transmitted together to the recipient of the message. This is a central concept in the embodiments. The primary encryption and secondary encryption may use a common method of execution, and this is possible because like the plain-text of the message, the encryption instruction also is expressed as a text file. An Encryptor encrypts the text file in each case.

Other methods, such as those using public-key encryption, take a lot of computing resources, so most systems use a combination of public-key and symmetric key encryption. When two computers initiate a secure session, one computer creates a symmetric key and sends it to the other computer using public-key encryption. The two computers can then communicate using symmetric-key encryption. Once the session is finished, each computer discards the symmetric key used for that session. Any additional sessions require that a new symmetric key be created, and the process is repeated. The embodiments of the invention differ from this. The embodiments use an encryption logic descriptor that is executed locally on the devices that generate the output files, encrypting the output files by means of the Encryptor, which is a dynamic class loader under Java.

Another approach to encryption in other processes is with SSL, which uses certificates. The burden of compute cycles on the microprocessor is a heavy one when a certificate based secure session is used. In the case of a major electronic commerce site, such as PayPal, the compute burden can be severe, increasing the consumption of electricity. The expense of electricity consumption is borne by the commerce site, not the end user. The embodiments shift the expense and electricity consumption from the middle to the edge of the network because the encryption executes at the edge.

SUMMARY

Embodiments of the invention are related to default data encryption; use a user's registration data to generate an encryption logic and related executable code, including servers and client applications; encryption as an automatic background task occurring through variable encryption logic, with authentication; embodiments are also described for conducting online litigation through pleadings formed as meta-files that trigger litigation related algorithms in order to automate and coordinate litigation.

Some cases include two-computer encryption using a common algorithm based on Encryption Logic Descriptor [ELD], which is a text file used in a Java dynamic class loading process to encrypt the bytes of the plain-text on each computer and also to decrypt them.

Some cases include sending messages and attachments using meta-files containing the plain-text encrypted by the ELD and also containing the ELD used in that encryption, so that the two computers will parse that ELD and auto encrypt the plain-text upon transmission, and auto decrypt it upon receipt; and that ELD before it is included in the meta-file is encrypted by a second and different ELD that is uniquely shared by the two computers but unlike the first ELD is not included in the meta-file, the second ELD having previously been furnished to the two computers to function as a dedicated, unique logic tunnel between them that authenticates them and establishes trust, the second ELD using the same dynamic class loading process to decrypt the first ELD that is parsed from the meta-file, and the first ELD in its decrypted state then being used to auto encrypt and auto decrypt the bytes of the plain-text.

Some cases include encryption using new logic for each communication session, the logic being generated on a commonly connected "Switch" between two computers.

Some cases include an auto-scheduled mass chat session, consisting of a series of individual sessions between a master chat application and a set of slave applications.

Some cases include an automated, secure online method for litigation using applications with a computer-to-computer communications capability on a network, the applications processing meta-files that employ dynamic class loading or name-value pairs to execute litigation-related procedures.

Some cases include a travel drive that uses automatically implemented encryption to scramble sensitive data on a portable computer and automatically remove the data after the trip, but during the trip provides secure access to the user when he authenticates himself during a session.

Some cases include an extension to the Java dynamic class loader that uses an XML text file, instantiated as an Xml-Beans Object, as a configuration file parsed to load a Java class.

Some cases include a satellite data transmission used to send a common data stream to multiple computers, the data stream operating as a shared randomness input into a dynamic process of encryption logic generation on the computers, resulting in mirrored executable encryption logic so that they automatically authenticate one another and auto encrypt the messages upon transmission and auto decrypt them upon receipt.

In some cases, the enrollment of the user on a secure network that provides the auto-generation of the executable code of the encryption application installed by each user, so that each application is individuated from those of the other users, thereby providing orthogonality and mitigating the monoculture problem.

In some cases, the mutual reception by two or more communicating computers (or smart phones) of one more satellite datacasts, and the processing of the same on the computers or on a switch connected to a LAN, to create a shared randomness input into an encryption process on the computers that allows them to auto encrypt and auto decrypt the messages they send back and forth.

In some cases, the applications of the local computers using the ELD in Dynamic class loading, with that logic descriptor loading the class and executing the encryption, the local applications including a JAR file under Java containing the constituent algorithms specified in the descriptor, which are ordered in a sequence to form a composition. The JAR file may be present on the Switch and on the local applications that execute the encryption. The descriptor specifies the generation of the composite algorithm and the class is loaded, executing the encryption by means of the constituent algorithms in the JAR file, the output of one encryption algorithm becoming the input to the next per the specified sequence. Using the same descriptor on each computer results in each computer executing the same encryption logic, creating a logic mirror each time a descriptor is used in the session and discarded.

BRIEF DESCRIPTION OF THE DRAWINGS

The embodiments of the invention are illustrated by way of example and not by way of limitation in the figures. It should be noted that references to "an" or "one" embodiment of the invention in this disclosure are not necessarily to the same embodiment, and they mean at least one. The drawings provide examples of some embodiments of the inventions, but embodiments herein are not restricted to what is shown in these figures. In the drawing, like reference characters identify correspondingly throughout and wherein:

FIG. 14 Diagrams of Classes Obtained after Compiling a Schema . . .

FIG. 36 Display of file path when Protect option is clicked . . .
FIG. 71 The Travel Drive GUI . . .
FIG. 72 The Report Card . . .
FIG. 79 The Console: General Data Panel . . .
FIG. 89 Client Confidential Professional Enrollment . . .
FIG. 90 Client Confidential Login . . .
FIG. 93 Lawyer Profile Search . . .

FIG. 123F Auto Decryption and Reply Process Flow . . .
FIG. 123G Auto Decryption and Reply Process Flow . . .
FIG. 127 Creation of a Pledging . . .
FIG. 129 The Pleading . . .
FIG. 131 Creation of the Pleading Response . . .
FIG. 140 Xml of a Matter . . .

DETAILED DESCRIPTION

Figure 1:
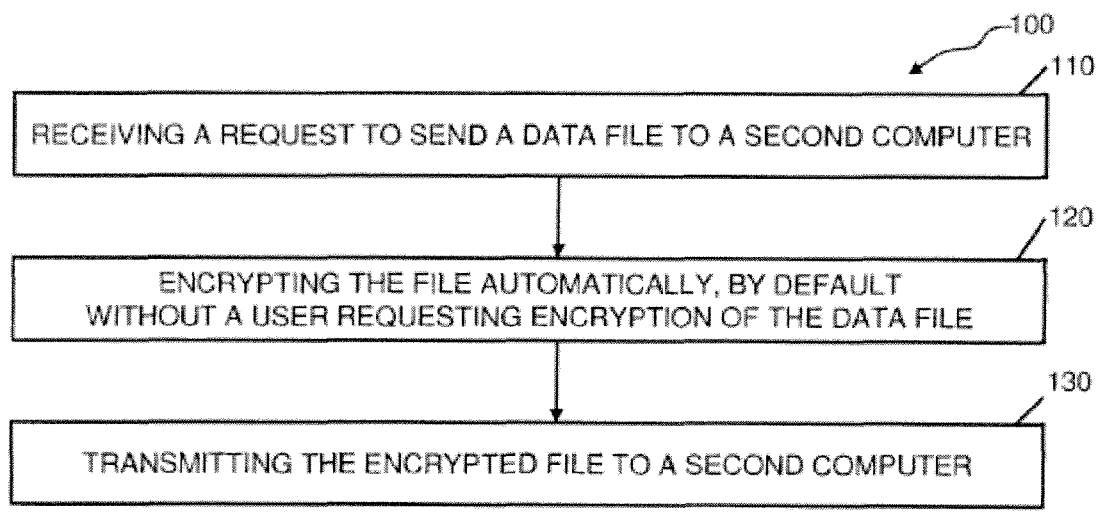
FIG. 1 Auto Encryption Process Flow . . .

Several embodiments of the invention are now explained, with reference to the appended drawings. Whenever the blocks, processes, devices, shapes, relative positions and other aspects of the parts described in the embodiments are clearly defined, the scope of the invention is not limited only to the features or parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of the description provided.

In accordance with embodiments of the invention, the shortcomings of other processes noted above may be remediated by using default or automatic data encryption; and encryption algorithms may be implemented by advanced software techniques not possible in other processes, such as object oriented programming (OOP) or computing, the dynamic loading of classes, and the transmission of encryption related data by satellite or other non-terrestrial means in order to make the data harder to steal. Dynamic class loading makes use of ELD's. The ELD is a text file that, along with the plain-text, supplies the parameters for the dynamic class loading, thereby providing automatic encryption and decryption functionality. The ELD specifies a selection of one or more encryption algorithms, such as a gang of several, as well as the arguments used in the class loading process. The ELD is a logic composition. The gang approach makes the encryption more random than is possible in other methods, and thus, harder to crack.

Encryption by Default

Encryption is the process through which data is modified so that no one can read it except the person that has the decryption process in order to return the data to its original form. Encryption has been used for a long time, even before the invention of computers. But now a-days, it is used mostly on the transference of data from one computer to another using the Internet, in order to keep the data secure.

A background task may be described as a process that runs on an operating system in such a way that the user is not aware of it, or at least, not required to perform any manual steps for the process to occur. An example of a background task is antivirus software that is always listening to incoming or outgoing files to and from a computer. The antivirus is always running, when it detects an incoming file, it scans it, in order to find out if it contains harmful information, such as viruses or spyware. Encryption as a background task may be given effect through the file system of an application. The output files of the applications assume the form of meta-files that contain the plain-text and the ELD's so that the associated application on each of the communicating computers will auto encrypt the payload upon transmission, and auto encrypt it upon receipt.

In some cases, the default encryption process may described a process that happens "automatically," such as, as a result of another selection, detection, or receipt, but without a user explicit input to cause that specific process to occur. For instance, a user may not know or be aware that a computer is scanning incoming messages for viruses. On the other hand, a user may be aware that a computer is scanning incoming messages for viruses, but may simply be opening the messages, so that they can be read, without making a separate selection (e.g., without activating or clicking on a menu button with keyboard or mouse) to have each message scanned. The embodiments use this approach to achieve auto encryption and auto decryption.

One concept of encryption as a background task combines these two techniques, automation and the notion of no user input required, in order to encrypt and decrypt outgoing and incoming files to and from a computer, so that the user is not forced to remember or do anything to cause the encryption to happen. In the present work, this process may be called Encryption by Default.

The following is an example process to be executed in the encryption by default, such as using an Encryptor:

The user would send the file using a given application (an email or chat application, MS Office™).

The Encryptor detects a file is going to be sent.

The Encryptor determines whether, based on the file type of the file going to be sent, the file is one as to which automatic detection is desired (e.g. Microsoft Office™), or of a type as to which encryption is not desired.

The Encryptor takes the file and automatically encrypts it.

The Encryptor sends the file.

Therefore, generally embodiments of encryption by default may be where encryption is automatically (e.g., by default) performed by one or more computers communicating with each other, without a user's knowledge or manual input to cause encryption. An Encryption Abstraction Layer may be provided so that the encryption logic is implemented as the instance of a class. The class is loaded separately for each instance of encryption, so that the encryption logic varies from one communication to the next. At a first computer, encryption by default is triggered by the user selecting to send a file or communication through a network, such as a LAN, WAN, or the Internet. Upon receiving this selection, the first computer encrypts the file by default, without the user necessarily knowing of the encryption or selecting for the encryption to occur. This approach is in contrast to the situation, for example, where persons may communicate on a chat network that uses client applications and a central server, but for each encrypted communication the recipient computer must agree to the transmission of the encrypted file, or agree to accept it. The latter approach cannot be described as encryption by default.

Upon receipt of the encrypted file by a second computer, the second computer automatically (e.g., by default) decrypts the encrypted filed, without a user's manual input to cause decryption. Optionally, the second computer may respond with a second file, also encrypted by default. For example, the second computer may monitor (e.g., using a port monitor) incoming files to determine whether they are encrypted. If a file is detected that is encrypted, that detection triggers the second computer to decrypt the file by default, and optionally to send a second encrypted file to the first computer, encrypted by default (e.g., without a user's manual input to cause the second encryption). The encryption is completely automatic as there is no requirement that the sender receive a reply from the recipient indicating whether the encrypted transmission will be accepted. Acceptance in one case may be presumed by the recipient computer by virtue of the fact that the recipient computer has enrolled on a virtual private network (VPN) using default encryption and has received and installed the client application that executes the encryption.

Monitoring, detection, and triggering may be performed by a "port monitor." Monitoring, detection, and triggering also may be performed at the file level, when the plain-text to be encrypted is wrapped in a meta-file, by parsing the file and executing the encryption logic described within it by means of a JAR file on each computer containing common encryption executables (or the equivalent of a JAR file in other computing languages). From these a gang of algorithms may be assembled and executed as a logic composition.

Encryption by default may include using a common encryption algorithm at the first and second computer, or a common composite algorithm that is a set of sub-algorithms assembled with input output links. When a composite algorithm is used, some of the algorithms may use keys and other may not. The composite encryption logic creation process incorporates the keys, when they are used, into the logic descriptor that actuates the dynamic class loading that auto encrypts and auto decrypts the plain-text.

It may be assumed that the first and second computer have the same algorithm during their communication, although per embodiments different algorithms may be used in each instance of communication, as in the switched embodiment explained below. In addition, the algorithm at the first and second computer may be updated, such as using a network tool that allows information, computer configuration, computer software, middleware, etc. to be updated using a network, such as the Internet. Alternatively, it's possible that the first and second computer may communicate to send, receive, or otherwise identify a common algorithm, or to build one. The common algorithm may originate on an Encryption Logic Switch, and the common algorithm may be expressed as an ELD. A dedicated application may process the meta-files that actuate encryption through the ELD, which describes the encryption logic that is used to automatically encrypt and decrypt the file by the dynamic class loading process. The class loader may be a module of functionality on the local dedicated local encryption application, or a plugin or a module appurtenant to an operating system.

Embodiments of the port monitor may or may not read from or invoke the computer's registry (e.g., using the operating system). For instance, in some embodiments, the port monitor will detect or identify browser a type of network connection software (e.g., a type of Internet browser currently executing). This may be described, in some cases as having the port monitor use logic to detect a browser type. In these cases, if the browser is "Fire Fox"™ the registry is not needed, so the port monitor will proceed without reading from or invoking the computer's registry. In these cases, if the browser is "Internet Explorer"™ the registry is needed, so the port monitor will proceed to read from or invoke the computer's registry to obtain information to allow the monitor to detect outgoing and/or incoming network communications. So, here, there is a logic process in which the port monitor determines what kind of browser the PC is using, and based on that, how the logic for encryption by default branches from there.

FIG. 1 is an example of a flow diagram of a process to perform encryption by default. FIG. 1 shows process 100 to perform encryption by default, including block 110 for receiving a request from a user at a first computer to send a data file to a second computer. Then, block 120 includes encrypting the file automatically (e.g., by default) without a user requesting encryption of the data file. Next, block 130 is for transmitting the encrypted file over a network to a second computer.

FIG. 1 is a flow diagram of a process to perform decryption by default. FIG. 1 shows process 102 to perform decryption by default, including block 140 for receiving the encrypted file from a network at the second computer. Then, block 150 includes decrypting the file automatically, by default, without a user requesting decryption of the data file. Block 160 is encrypting a second data file, responsive the first file, automatically, by default, without a user requesting encryption of the second data file. Next, block 170 is for transmitting the encrypted second data file over a network to the first computer. Block 170 is optional.

According to embodiments, the encryption algorithm is the same as the Decryption algorithm, and if the particular algorithm selected uses keys, the encryption key is the same key as the Decryption key. Moreover, encryption and/or decryption by default may include one or more encryption algorithms that operate at the byte level on the digital information.

Examples of encryption algorithms that may be used herein, (e.g., included in the JAR file and made available for selection) include the following:

Offset Encryption—A string of text is encrypted by applying an offset to the ASCII values of each character in the string.

Bit shift encryption—This type of algorithm performs a bitwise XOR operation on the text's character's ASCII values and a given byte value, shifting the character's bits Key encryption—This algorithm uses a key code in order to encrypt a given string of text. The ASCII code of the characters in the text are obtained, as well as those of the key code. Once obtained, the ASCII codes of the corresponding characters are added.

Date Key encryption—A special case of the key encryption. In this case, they key used in the encryption is not selected by the user, but it is generated based on the date of the computer.

For the session of communication between the computers (web browsing session, instant messenger session, VOIP session, email transmission session), at least one specific encryption algorithm is used, and the algorithm is selected by random means. The selection may occur solely via software, or via hardware, such as by means of the computer's clock or by an RNG, or using a GPU for parallel processing. The next time the computers connect, the process is repeated. However, the repetition of the process may generate or select a different algorithm.

In cases using a server, which may operate as an Encryption Logic Switch, the server keeps the current list of Encryption Algorithms that are made available to the selection process, so every time the computers start a session, an updated common set of candidate algorithms is available. Algorithms on a cloud also may be used for the updating, by downloading them. The algorithms on the cloud may be implemented by descriptors, and the descriptors may be encrypted when uploaded to the cloud and decrypted when downloaded.

This updating feature can be implemented in the same fashion as, or even along with, the updating of antivirus algorithms in an antivirus program. Varying the algorithm can take place by a process of selecting one algorithm from a set of algorithms using or based on the numerical value of a random pointer. Randomizing the algorithms that are selected for an encrypted session may come about in various ways. According to embodiments, there could be but a single encryption/decryption algorithm at each computer, which is swapped out daily on each computer in a virtual private network (VPN). The arguments used in the algorithms also may be swapped out and replaced with new ones.

According to embodiments, encryption and/or decryption by default can be described as filtering the communication data. For example, the Encryptor can be seen as a filter through which data passes. That is, it intercepts the file off the output stream, filters (encrypts) it and returns it back to the output stream. The filter may change insofar as the encryption logic is concerned, and therefore the method may be described as an Encryption Abstraction Layer.

According to embodiments, encryption and/or decryption by default can be implemented using one or more of the following: a) the Java programming language; b) sockets and threads; c) an Encryption Switch, and/or (d) the client/server model. There may be a slight modification to the client/server model in the sense that there is not going to be a single centralized server, but each computer involved in the communication process will include server functionality, and at the same time, each computer will act as a client, and a peer-to-peer network may incorporate encryption in this manner. Configuration (d) allows the computers to be peers on a peer-to-peer network. The first computer acts as server when it is designated to define the values that determine the encryption logic and then install them on the second computer, and in this embodiment the first computer may be thought of as a slave because it supplies the second computer with its encryption logic, which the second computer uses to execute the encryption. It is a slave because the computing it performs is not for its own benefit, but for the benefit of another computer.

According to embodiments, encryption and/or decryption by default can include a logical port monitor in order to listen to all the ports or a computer that are used in sending and receiving data (for example, port 8080 is used for HTTP, port 21 is used for FTP, etc.). This port monitor may be similar to a firewall, because it will always be detecting incoming or outgoing data. When the port monitor detects activity in one of the ports, it communicates with a Server Socket. The Server Socket creates a thread that instantiates the "Encryptor", which is a Java class, in order to encrypt the file and execute the whole process.

Figure 2:
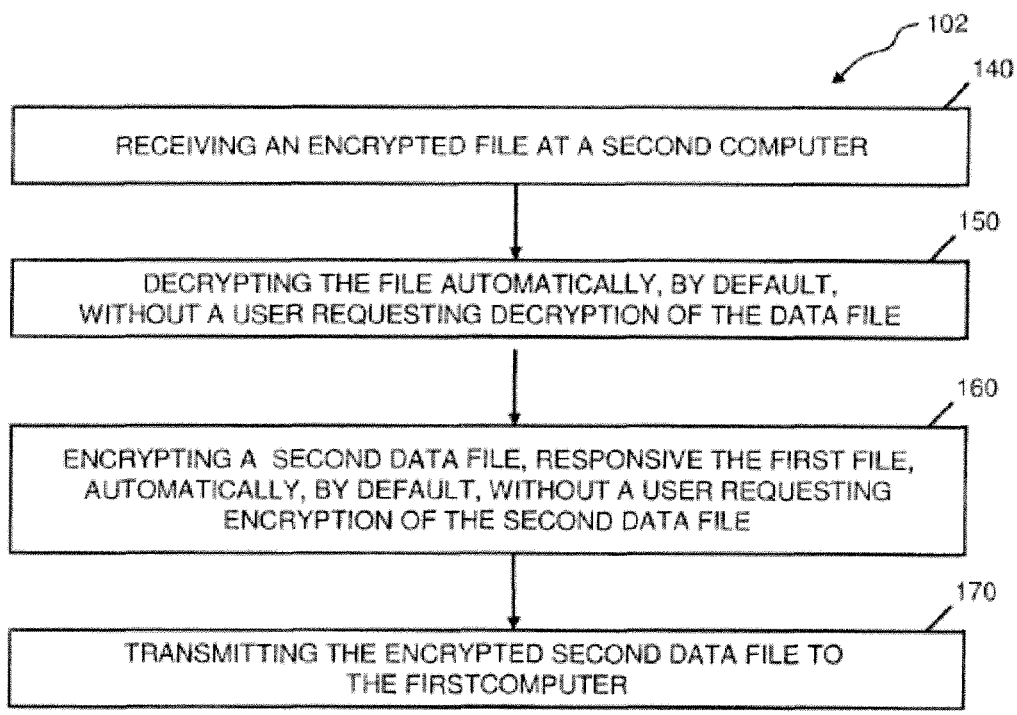
FIG. 2 Auto Decryption and Reply Process Flow . . .
Figure 3:
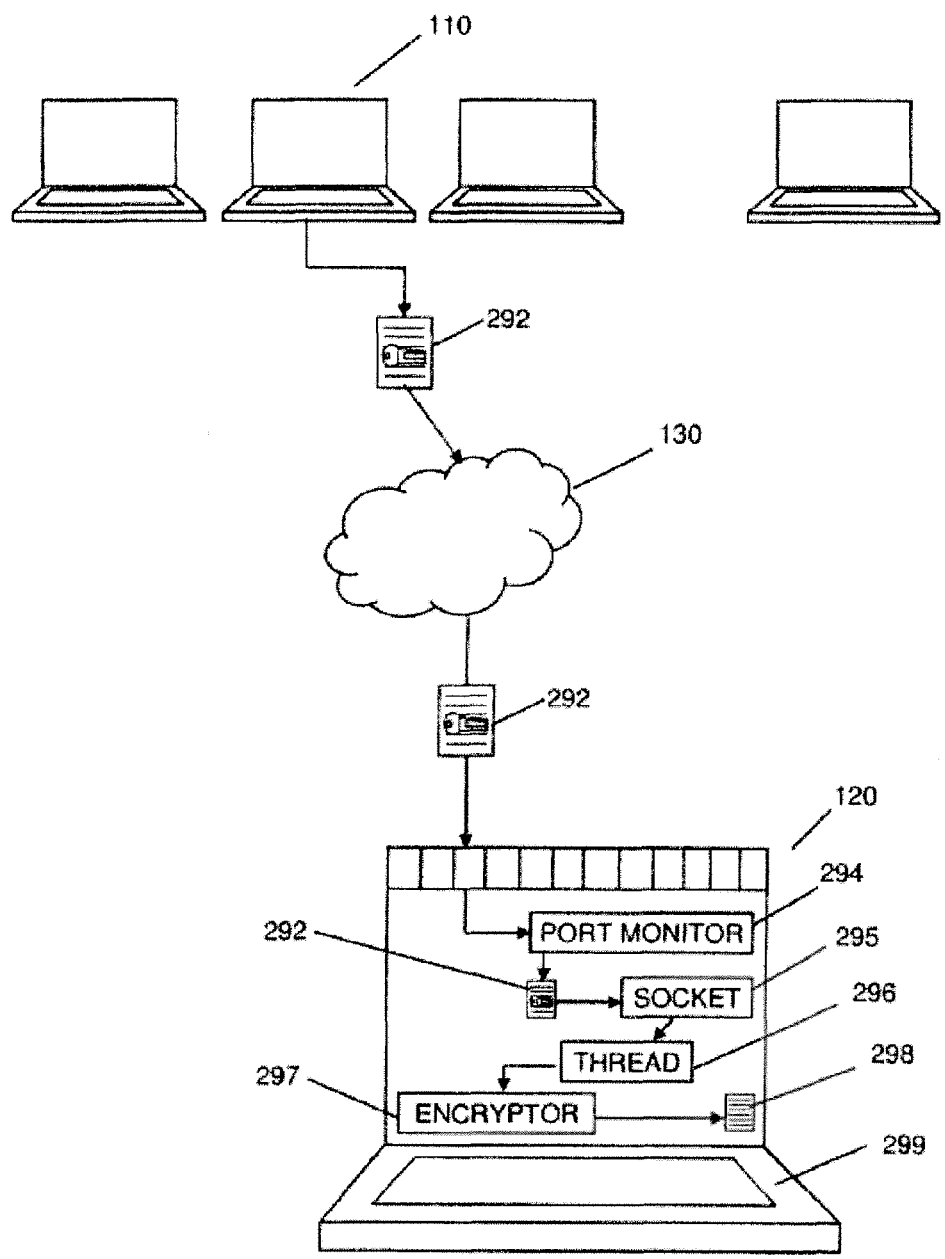
FIG. 3 Port Monitor and Encryptor with Encryption Output . . .

FIG. 2 is an example of a block diagram to encrypt or decrypt a file by default. FIG. 3 shows that computer 110 sends or transmits encrypted file 292 to computer 120 through network 130. Port monitor 294 or computer 120 listens to all the ports that are used in sending and receiving data at computer 120. When encrypted file 292 is received and activity in one of the ports is detected by port monitor 294, port monitor 294 sends notification to a Server Socket 295. Upon receipt of the notice, the Server Socket automatically creates thread 296 that automatically instantiates "Encryptor" 297, which may be a Java class. Encryptor 297 is executed (possibly using GPU decryption) to automatically, by default, decrypt the file. Encryptor 297 may also be executed (possibly using a GPU to execute the decryption through parallel processing) to encrypt a file to be sent to computer 110.

In the figure, the computer that receives the document has a Socket Server running, which is called by the ports monitor when an incoming file is detected, and the computer that sends the file is acting as a client, but at the same time this computer may act as a server when the computer that received the file sends a file back. Thus, the port monitor may act as a middleware (e.g., program) between the Encryption application (which includes the sockets and Encryptor) and the logical ports.

In some cases, the port monitor may exclude the Server Socket. In this case, the port monitor would create the thread that instantiates the Encryptor. The advantage of this architecture would be that a Java object is eliminated, the Server Socket, meaning that it would take less memory to run the application. However, it would be less modular, in that is, there would be no middleware, due to the fact that the monitoring of ports is being merged with the encryption task. This version might be more appropriate in an embedded application, such as on an Iphone.

FIG. 2 may also show that computer 120 detects user selection to sends or transmit a data file to a computer 110 through a network 130. Port monitor 294 or computer 120 listens to all the ports that are used in sending and receiving data at computer 120. When a file is received for sending, and activity in one of the ports is detected by port monitor 294, port monitor 294 sends notification to a Server Socket 295. Upon receipt of the notice, the Server Socket automatically creates thread 296 that automatically instantiates "Encryptor" 297, which may be a Java class. Encryptor 297 is executed (possibly using GPU-based decryption for parallel processing) to automatically, by default, encrypt the file the user selects to send to the second computer. Encryptor 297 may also be executed (again, possibly using GPU decryption) to decrypt file received from computer 110, in response to the file the user selects to send to the computer 110.

Automatically encrypting or decrypting may include encrypting or decrypting without a user's explicit selection for encrypting or decrypting, such as by being triggered only by the computer using hardware or middleware sensing when an incoming file or an outgoing file is at a network communication port (e.g., network adapters 260). In some cases, a computer automatically performs encrypting only in response to the detection at a port of an outgoing email (or attachment), such as caused by a user input of selecting to send an email (or attach a file with an email). In some cases, a computer automatically performs decrypting only in response to the detection at a port of a received email (or attachment). The email and attachment may also be encrypted and decrypted as noted above. But in another embodiment it is not the port, but the file structure of the file being transmitted that triggers encryption, such as a file bearing a certain defined suffix, such as .pdf. FIG. 3 shows the use of a port monitor and middleware, with the port monitor at 294, the intervening steps, and the encrypted document at 298.

The capability to do encryption by default (e.g., as a background task) can be part of the Windows© Operating System, though in theory it can work on any other Operating System. In this case, an additional filter or driver can be added to the encryption process in order to detect files developed with MS Office©: PowerPoint Presentations, Word Documents, Excel sheets, etc., or in fact with any computer application running under Windows whatsoever, from any licensor. In this embodiment, any two computers enjoying a common operating system could encrypt automatically, and invisibly to the user, all binary files sent across a network from one computer to the other, and likewise, decrypt the same. The file type is used as a selector, to determine which files are to be auto encrypted and auto decrypted, and which ones are not.

In the case of Encryption by Default under Windows™, the port monitor may be implemented using the Windows© Driver Kit (WDK), which is a Development Kit offered by Windows™. The WDK may be used in conjunction with C++. This programming language offers the advantage of low level programming to manipulate hardware. Java Native Interface (JNI) may be used in order to develop Dynamic Link Libraries (DLL's) that allow C++ programs to be linked with Java applications.

Figure 4:
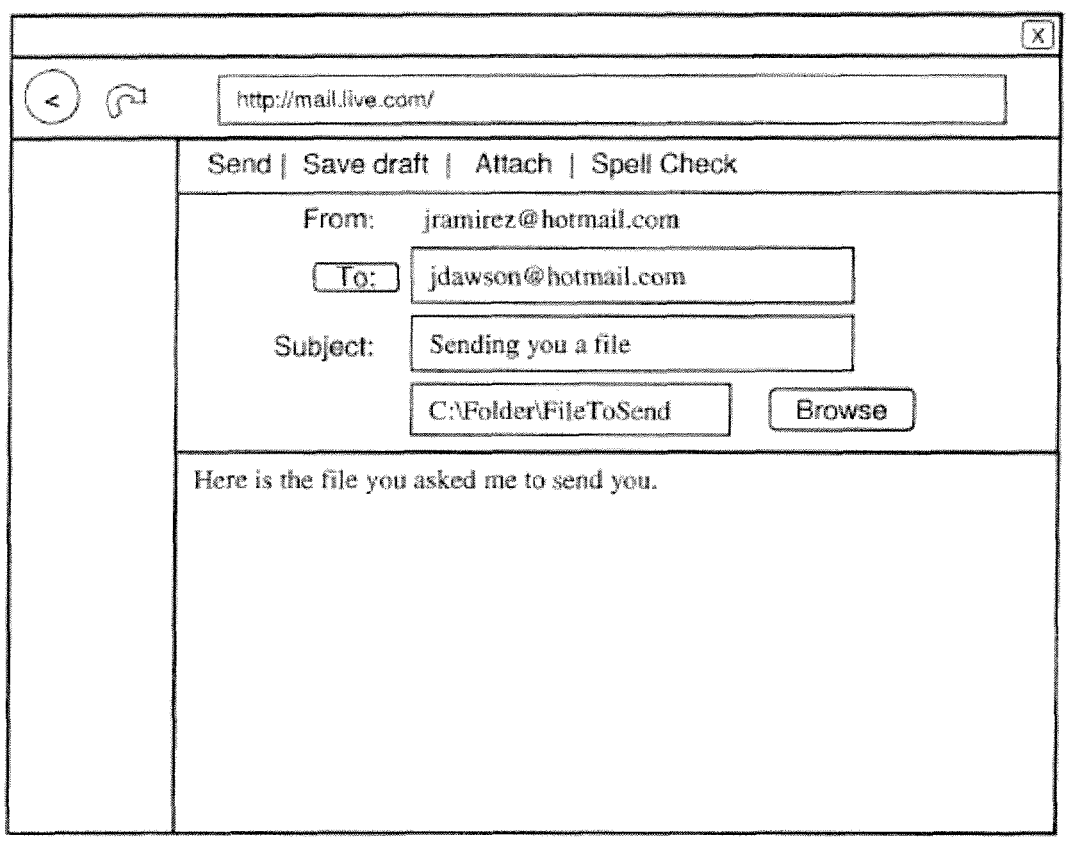
FIG. 4 User Interface using Port Monitor and Automatic Encryption . . .

According to embodiments, FIG. 4 is an example of a process when a document is going to be sent as an attachment on an email, and the user interface is shown. In the case when MS office documents are detected, the code to filter those documents may be the following:

```
1. JFileChooser fc = new JFileChooser( );
2. FileFilter ft = new FileFilter("MS Documents");
3. ft.addExtension("ppt");
4. ft.addExtension("doc");
5. ft.addExtension("xls");
6. fc.setFileFilter(ft);
```

The File Chooser instance is created in the first line of code. The object that determines which type of files are chosen is defined in lines 2 through 5. The file filter is created in line 2, and the extensions of files that are accepted (shown when the file chooser is displayed) are added in lines 3-6. The last step consists of setting the File Chooser's file filter.

Figure 5:
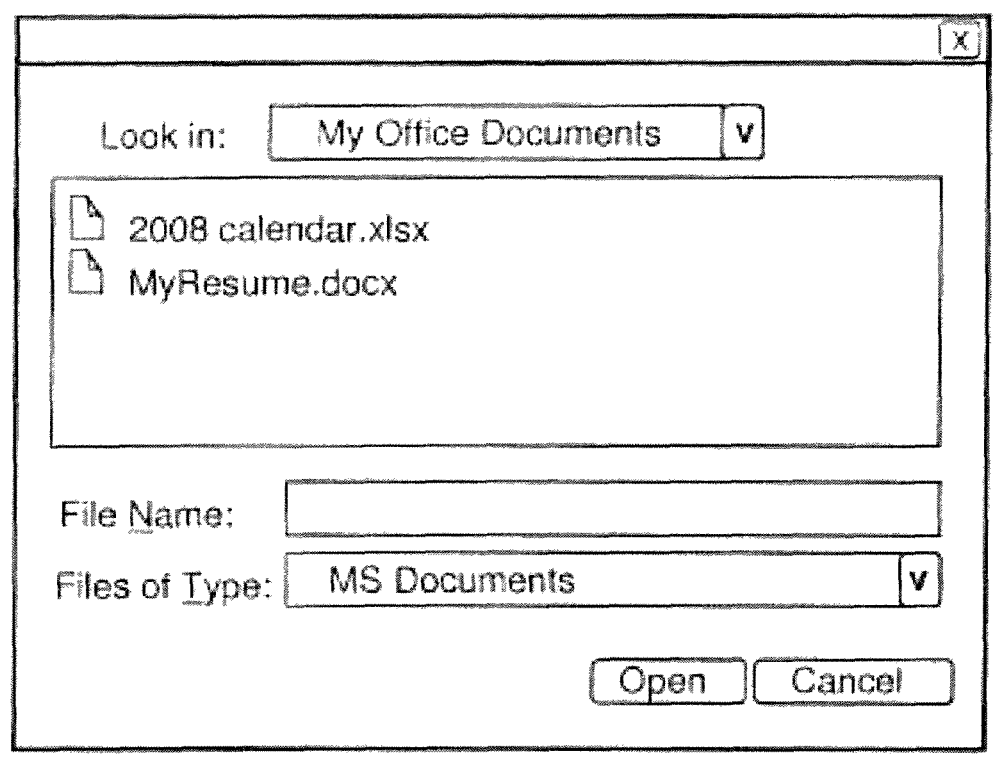
FIG. 5 File Selector with no User Input Requirement for Encryption . . .

According to embodiments, FIG. 4 shows that from the perspective of the user, when default encryption is employed a standard email user interface may be used to transmit and receive messages, and they are encrypted and decrypted as a background task, automatically. Note that there is no input requirement at all from the user in the interface shown, other than what the user would be required to do in any event with a normal email application. The port monitor will detect a file is going to be send, and the whole encryption process is executed by default, as a background task. Once the document has been encrypted, a message may be displayed, in order to tell the user the document was successfully encrypted. FIG. 5 is an example of a file chooser for selecting a document to be sent as an attachment to an email message. Here too there is no requirement in the user interface for the user to do anything to achieve encryption, it is all automatic.

Encryption by default (e.g., as a background task) also has the benefit that the encryption algorithms can be stored in a server where they can be refreshed or updated; or more are can be added every certain given amount of time (a day, a week, a month), and a JAR file under JAVA may be used to carry this out. This can occur as an enhancement to procedures already existing, causing minimal additional overhead if any, such the process by which the licensor of an antivirus program provides daily updates to the algorithms used to combat the newest viruses. Another application that is widely implemented that can carry out this updating process would be Microsoft Active Desktop, or successor version of this component of the Windows™ operating system.

Some embodiments of encryption and/or decryption by default may include a middleware program, or API. In some cases, the middleware, or API, allows the abstraction of hardware whereby higher layer processes may be defined in executable code that is liberated from the burden of interacting with the hardware directly, and may be thought of as an Encryption Abstraction Layer. An Encryption Abstraction Layer separates the encryption logic functions from the details of execution on the hardware, rendering the encryption logic more universal among different machines, easier to maintain, and easier to install. For example, a computer or smart phone (e.g. a sending computer encrypting data or files; and/or a receiving computer decrypting data or files) may use a middleware program, or API, and may invoke dynamic class loading under JAVA, or a similar technique under other programming languages, to carry out the automatic encryption. The encryption algorithm used in a particular session of communication may be the instance of a Class under Java, so that the logic is changed from one session to the next, making the system harder to hack. The algorithms may be contained on each computer in a JAR file, and subject to selection.

Figure 6:
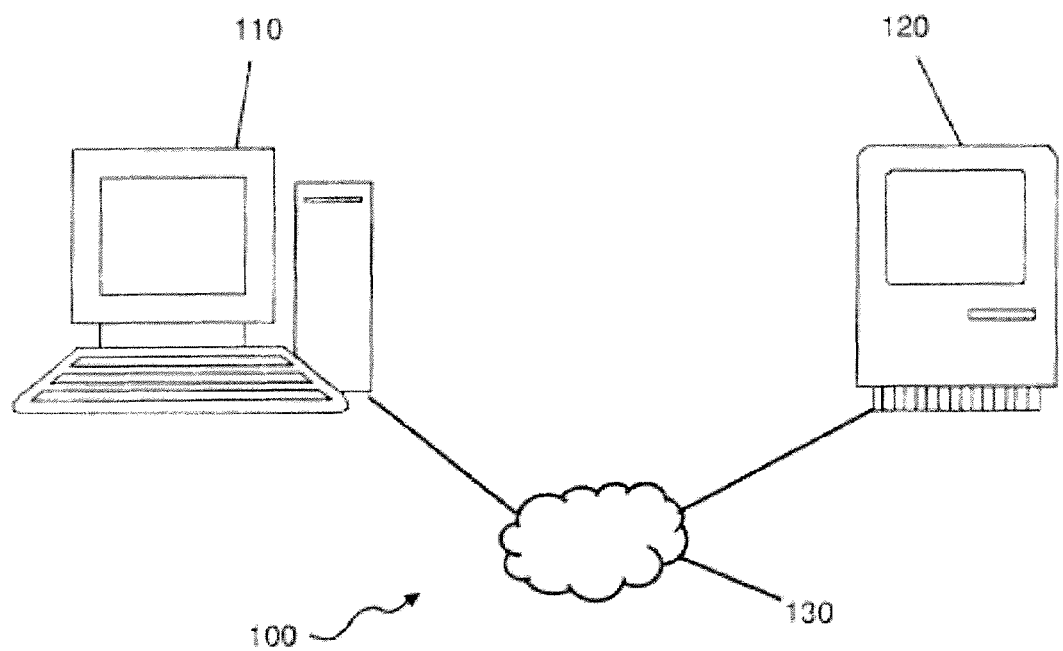
FIG. 6 OS Independent Security Layer that Updates Encryption Logic and Antivirus . . .

Existing antivirus programs communicate with a server at a pre-designated interval, such as daily, in order to load onto the desktop antivirus application the newest algorithms. This is essential because the universe of viruses is constantly evolving, and in order to stay ahead of it the personal computer needs the latest antivirus ammunition. A practical advantage of this approach is the fact that antivirus companies are well positioned to offer encryption by default to the customer as an additional tool in a set of security services, so that the encryption logic used on a network of computers may be updated in a universal way. For such companies to offer encryption embodiments described herein, to the public, would amount to merely putting additional value into the same channel. FIG. 6 shows a PC on the left and a Mac on the right, and through the encryption abstraction layer in the middle, everything going back and forth between the computers is encrypted even though they do not share the same OS. Item 100 shows the input of updated security information into the abstraction layer, including new antivirus information and updated encryption logic. Swapping out the old encryption logic and inserting the new frustrates hacking, and this step too is automated as a background task, requiring no input from the user.

The need to update the antivirus toolset on a daily basis means that the typical licensed antivirus desktop application already is communicating with a server provided by the antivirus licensor. If encryption per the embodiments of the invention is brought into the antivirus computer application as an added function, or as a parallel function in a companion stand-alone application, the daily updating broadcast from the server to the subscribing licensees can include a daily update consisting of any new algorithm used to encrypt the data, or to be selected or combined into a composition of multiple algorithms and arguments. Another embodiment is a simple value broadcast to the universe of computers to shill a clock that selects one or more algorithms from the clock positions, thereby changing the encryption logic.

The update function for the enhancement of the randomness of the encryption algorithms may be done by means of broadcasting new encryption algorithm information to a universe of subscribed users. This may be done where the broadcasting process already is happening anyway by means of an antivirus application or other application that puts into effect updating by means of a server triggered at intervals, presenting little additional compute burden. Satellites or HD radio also may carry out the broadcasting.

The Embodiments Versus Other Encryption Methods

The embodiments represent a way of encrypting plain-text using a constantly changing set of algorithms, and this is different from the other, static methods of encryption, such as SSL. In contrast to SSL, the embodiments may bring about encryption dynamically, through an encryption algorithm that varies from instance to instance. Not only the input into the particular encryption algorithm, but the actual algorithm itself varies from communication to communication. The embodiments may invoke a single use encryption logic that is used only once and discarded. A new logic, generated on the Encryption Logic Switch ("Switch" for brevity) may be used for each individual instance of communication, and this is one means of updating the encryption logic.

In contrast to the embodiments, another approach to encryption may use certificates, and SSL may be used. In order to speed up certificate based secure sessions, hardware accelerators (digital devices dedicated to the sole process of speeding up SSL encryption) have been employed. For example, single-box devices such as those manufactured by Sonic Wall and Cisco meet the purpose. One disadvantage of such devices is that they are not themselves re-programmable, at least not insofar as the algorithms that they deploy are concerned, as these are hard-wired into the box. Therefore, the box may be considered a static device: the executable code typically is burned into read-only memory. In this type of solution the executable code conforms to a single, universal, encryption scheme such as SSL or AES. The encryption executable itself does not alternate: the only thing that changes is the certificate or key. This variation is the sole dimension of randomness which these static solutions afford. This is different than using a new set of encryption logic algorithms, such as a novel composition resulting from the combination of several constituent algorithms into a whole, for every communications session. The embodiments, in contrast to the other methods, may combine sub-algorithms into a single-use composite algorithm that is used once and discarded.

The static boxes offered by companies such as Cisco or Sonic Wall do not invoke any abstraction of the process of encryption in order to treat encryption as something independent from the specific architecture of the box. Under this approach encryption improvement comes about by means of a better algorithm or perhaps greater processing power to execute a larger key, but not as a result of any global re-examination of the process of randomness per se, or by instantiating an abstraction layer for encryption, such as the implementation of multiple encryption algorithms as a novel encryption logic composition by dynamic class loading during each encrypted session.

The requirement of the static-box encryption schemes and of SSL for keys creates an expense to the user. The market for the sale of SSL certificates represents a substantial source of revenue. Eliminating the cost of certificates is an object of the invention, as a way to lessen the end user's cost. Eliminating this cost could add value to a software ecosystem (e.g. Microsoft Windows®) by liberating the user from the expense, bother, and security risk posed by SSL certificates, while at the same time affording a encryption method that is more powerful, more secure, and because it is automatic, easier to use.

The fact that in the other methods only the keys vary, but not the encryption algorithm itself, is known to hackers. This shortcoming may be remedied by embodiments of the invention. Encryption schemes such as SSL typically rely on a single algorithm that is repeated identically over and over, through which randomness in the scrambling of a binary file is provided by means of an input string (a key) that varies. Embodiments of the invention may allow randomness in the same dimension, such as varying the input string, by varying the parameters of the encryption algorithm.

Keys are one example of how a parameter may vary the values that operate with the algorithm, but embodiments are not limited to keys, as other parameters also may supply randomness. Toward that end, as a totally separate dimension of randomness and independent of the setting of parameters, the embodiments of the invention may also vary the encryption algorithm itself. This will now be explained.

Each time there is a session of communication the encryption logic, the algorithm that encrypts the bytes, is generated from scratch by a descriptor that is the output of a logic descriptor engine. The algorithm that is generated per the descriptor may be a gang of sub-algorithms. This may take the form of a composite encryption algorithm in which the output of one algorithm becomes the input to the next, and this is described below in greater detail. The gang or composite algorithm is expressed in an ELD, a text file. This is a descriptor that specifies the encryption logic for a given instance of secure communication. A Switch generates the ELD's and transmits them to the local computers. The actual encryption and decryption of the plain-text happens on the local computer, but in this embodiment the encryption logic is supplied from the external source that generates the ELD.

The applications of the local computers use the ELD's in Dynamic class loading, using the logic descriptor to load the class to execute the encryption. The local applications contain a JAR file under Java, and the JAR file contains the constituent algorithms used in the gang or the composite. The JAR file may be present on the Switch and on the local applications that execute the encryption. The descriptor specifies the generation of the composite algorithm and the class is loaded, executing the encryption by means of a subset of the executables in the JAR file. Using the same descriptor on each computer results in each computer executing the same encryption logic. Each time a descriptor is used a logic mirror is created. The mirror allows mutual intelligibility between the computers by means of an encryption logic that is auto generated for that session.

Default Encryption Through Parsable Meta-Files

Default encryption may use an encryption meta-file that is parsed on the local application, so that the encryption values contained in it are executed. The meta-file, which has a formal structure that may invoke SML, standardizes the use of the algorithms in the default encryption. Encryption by default may include using a common encryption algorithm, or a set of them, at the first and second computer. The method provides that the first and second computer have a mirrored pair of identical encryption algorithms for the session. The mirrored pair of executable encryption logic is made possible by the two computers implementing the same ELD. The mirrored algorithm pair allows the encrypted files to be passed back and forth in a way that permits them to be auto decrypted upon transmission and auto decrypted upon receipt as a background task, because the two computers use the same logic. The two computers may use copies of the same application, such as an email client application adapted to this method of default encryption. The two computers share, in addition to the ELD used in each instance, a common means of executing that ELD. The common applications enjoy an Encryptor, which is the executor that carries out the dynamic class loading process to encrypt and decrypt the bytes, per the shared logic that the common descriptor supplies to the computers. The ELD, which may be received along with the plain-text in a meta-file and contained within it, specifies the class loading process on each computer in the pair. In one embodiment two computers enslave a third computer to participate in the encryption logic process, and the third computer provides or generates the ELD, or several operating at different abstraction levels.

Figure 7:
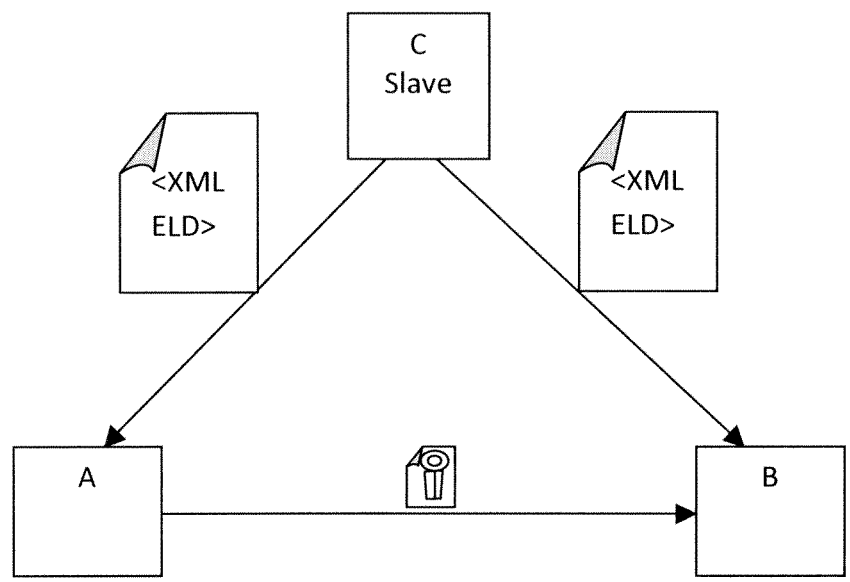
FIG. 7 Architecture using Enslavement and State Control . . .

FIG. 7 is a block diagram showing architecture using enslavement, depicting computers A, B and C. Logic for A and B may be prepared on a Switch, or on a third computer, C. This embodiment allows C to act as an enslaved Virtual Encryption Logic Switch to A and B, and the logic so generated enables A & B to encrypt their messages, and a peer-to-peer architecture may implement this encryption method. State Control may transmute each computer from a consumer of encryption logic into a generator of logic that the other computers use. The initial logic descriptor may be used to encrypt the plain-text, or it may trigger a process to commence a new logic generation routine in which A and B contact C, whereupon C generates a third encryption logic that it supplies for execution to a the Encryptors on A and B, in a process of chained encryption. C in this example, through enslavement, works as the Engine (as shown in FIG. 7). C also can be an encrypted messenger, passing the descriptor down to A and B by using a different ELD for each leg to encrypt the ELD during its passage, in which case C is a relay. The algorithms the first and second computer use may be updated, such as using a network tool that allows information, computer configuration, computer software, etc. to be updated using a network, such as the Internet. To bring about this functionality computers A, B and C may take the form of a peer-to-peer network, in which each computer is capable of enslaving any other, as described above.

In another embodiment, the first and second computer may identify a common Switch to provide the ELD to be used in the session, or a network of Switches (and these may configured as super-nodes) to accomplish the same. The URL or address of the Switch or Switch network is presented to each computer as a resource, and the resource may supply the ELD's through a port on the encryption application or plug in installed on each computer. In this embodiment an operating system may be used to make the process more systematic, although one is not required. An SDK ("software development kit,") that is compatible with a particular OS may enable the creation of applications in which the file system allows files to contain tags that specify a URL containing a Switch to supply the requisite ELD for the output files. In this way, the application that generates the plain-text files that constitute its output, in order to encrypt those files, has a compatible source of encryption logic, allowing that application to exchange files with the other applications for the purpose of automatic encryption and decryption. All of the copies of the application encrypt the output files in the same way, using ELD's and the common Encryptor on each application. This allows the ELD's to inter-operate across the common applications, or a suite of them, such as MS Office™. The Switch on the URL either contains the ELD's to be used to create an encrypted session for each of the communicating computers and downloads them to the computers in a batch, or it generates one each time the local application needs one. The Switch may generate the ELD's in a batch, and download the batch to each local computer whenever the computer needs more. The local applications can contain an integral Switch to generate their own ELD's, in another embodiment. The SDK may provide a common integral Switch so that each application that the developer creates is endowed with the encryption logic generation capability. In lieu of operating system implementation, this functionality may be supplied by Java.

The Encryption Abstraction Layer

Separating the Encryption Logic Engine from the Encryptor

Under the embodiments, encryption and decryption may take place by means of an ELD describing the encryption process for the bytes of plain-text to be auto encrypted upon transmission of the message and auto decrypted upon receipt, and the process is executed on the Encryptor of each application. This the essence of an Encryption Abstraction Layer, per the embodiments. The Encryptor is the execution unit that parses a text file describing the encryption, and that text file is the ELD. The values in the ELD are used in the Encryptor to dynamically load one or more classes in order to auto encrypt and auto decrypt the bytes. A significant advantage of the embodiments over the other methods is the fact that there may be a second encryption step, whereby the first ELD is encrypted by a second ELD, and then the encrypted first ELD is included in an encryption meta-file along with the encrypted plain-text, so that the meta-file operates as a self executing logic packet for auto encryption and auto decryption. Because the Plain-Text ELD is encrypted by the second ELD, and because the second ELD is only known to the sending computer and the receiving computer, it is safe to include the Plain-Text ELD in the self executing packet, as the Plain-Text ELD has been encrypted.

In contrast to the monolithic encryption programming methods, the Encryption Abstraction Layer approach allows a division of function whereby the generation of the encryption logic is independent of its execution. This division of function is an advantage. The separation of encryption logic creation and encryption logic execution allows the author of an encryption system to devise distributed, orthogonal encryption schemes that are harder to crack than encryption given effect through monolithic programming. Among other advantages, the automated orthogonal encryption schemes that the Encryption Abstraction Layer approach allows may present multiple physical points of attack to the would-be hacker.

In the embodiments the procedural separation of logic generation and logic execution is inherent in the architecture. The logic is generated on the Switch. The logic is executed on the local client applications, by the Encryptor of each. Encapsulating the process of encryption into these separate processes allows encryption by default to occur by means of staged routines, which may include distributed execution, conditions, and reticulation. For example, the abstraction layer may allow the expression of a particular encryption logic via a composition, which may consist of randomly selecting one algorithm from a set as one element of the composition, and then, randomly selecting an argument from a set of arguments which pertain to the particular algorithm that randomly was selected, as the second process in the composition. After this selection process for the encryption logic, a descriptor encapsulates this instance of the encryption logic generation process, and the descriptor is sent to the local computers to execute the described encryption. The output of the encapsulation process is the ELD.

In a similar approach, there may be a gang or composite of algorithms used in a given instance, causing the output of the first algorithm in the gang to be the input into the next algorithm. The arguments used in each algorithm in the composition are randomly selected. In the nomenclature of the invention this is called a Composite ELD.

The abstraction layer approach also makes meta-encryption possible, because the first ELD used to encrypt the plain-text may be encrypted by the Secondary ELD. Under the terminology of the embodiments, when one descriptor is used to encrypt another descriptor, as opposed to being used to encrypt the plain-text, the technique is called encryption meta-logic. The Secondary ELD is the ELD that encrypts the first ELD, and the first ELD is the one that encrypts the plain-text, when encryption meta-logic is used. Yet another ELD maybe used, so that the meta-logic ELD's may be encrypted by another meta-logic layer. (This approach is used in the Trust Initiator application described below, as well as in matters control). This architecture is capable of providing n levels of re-encryption of the descriptors.

Figure 8:
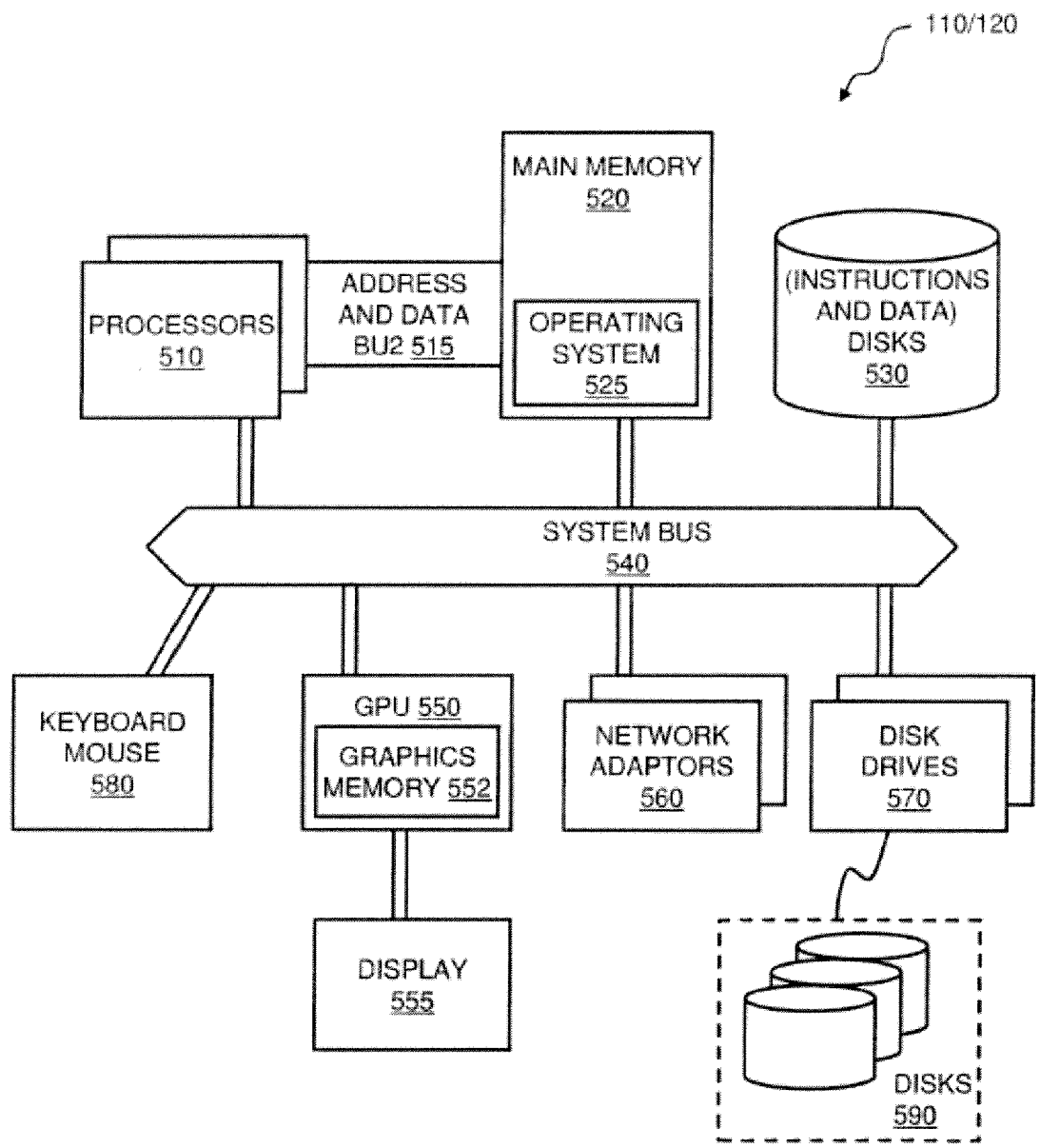
FIG. 8 Hardware Configuration for Computer using Encryption by Default . . .

Such embodiments include encryption by default performed or caused by software executing on a CPU and/or GPU. For example, a computer (e.g. a sending computer encrypting data or files; and/or a receiving computer decrypting data or files) may use a middleware program, and the program may be authored using a universal SDK that allows the creation of an ecosystem of applications implementing this method of encryption. The middleware may include encryption pseudo drivers that generalize the presentation of the plaintext to be encrypted to a set of common execution resources, per the Abstraction Layer. The hardware for Encryption by Default may be as shown in FIG. 8. Moreover, encryption and/or decryption by default may be performed completely by software, logic, etc. as described herein, without the need for any specialized hardware used in the other methods, such as the accelerator box mentioned above. However, specialized hardware may be helpful, such as a plug in board with satellite data reception capability deployed on two computers in an embodiment that allows them to receive the same satellite datacast and make use of it as a mirrored randomness input into the reciprocal encryption logic generation process through which the computers auto encrypt and auto decrypt the messages they exchange.

In one embodiment the Encryption Switch auto generates, in addition to the ELD's, the local encryption applications that the communicating client computers use. The application may include features that allow the Switch, when auto generating the application, to individuate the application so that no two users share an identical one. The end users download and install the applications, which may be chat or email clients, or a plug in used with a suite of applications such as MS Office™. The client applications execute the encryption logic generated on the Switch in on the edge of the network, automatically encrypting and decrypting everything that they send back and forth, using the ELD as the encryption logic specification for each session. The logic is described in the ELD but executed by the local application. When the local applications are email clients, the email messages and the attachments are auto encrypted upon transmission and auto decrypted upon receipt, by default. A meta-logic layer may be added, so that the ELD's used to encrypt the plain-text also are encrypted. The meta-logic steps allows the ELD used on the plain-text to be disguised. Disguising the Plain-Text ELD allows it safely to be included in the encryption meta-file along with the encrypted plain-text, in a manner not presenting an undue hacking risk. A Secondary ELD can operate as the meta-logic to allow this, so that the recipient computer obtains both the encrypted plain-text and the logic descriptor required to decrypt it.

The Switch that prepares the encryption logic may be described as an input-output instrument that controls the differential encryption logic state between two communicating digital devices, and using that differential logic state, executes the encryption on the devices in an automatic, mirrored process. To effectuate auto encryption, intelligible bytes are transmuted into unintelligible bytes, and vice versa for auto decryption. This means that under the embodiments the Switch, operating by remote control, specifies the encryption and decryption process on the communicating computers, and the encryption occurs invisibly to the end user, by default. The user may be aware that the auto encryption is happening, but the user is not required to remember to do anything, and this is what is meant by describing the encryption process as a background task.

The Switch can be thought of as a device to generate logic descriptors that build a provisional logic gate on the communicating computers. The descriptors build an encryption logic session object by loading Java classes to encrypt and decrypt the bytes. The output of the Switch, the ELD, is a text file. The plain-text and the ELD may both be input to the "Executor" on the local application, so that the input to the dynamic class loader is the data of the class to be encrypted, and the methods to be executed, which the ELD describes.

Therefore, an Encryption Switch may be seen as an instrument to cause a shift in the logic state of the data flowing between the computers during their communication, and the shift causes the data to be unreadable during transmission for privacy. The Switch is a filter. In one embodiment the encryption happens each time a session of data transmission takes place, automatically and by default, so the bytes are auto encrypted upon transmission and auto decrypted upon receipt, and then then that ELD is discarded. This is in contrast to other methods, such as SSL, which do not automatically generate, load, and discard new encryption logic for each communication session. The Switch may be virtual, physical, or even a distributed network of virtual and physical devices. The sole requirement for an Encryption Switch is that it operate between or among the digital devices in order to provide ELD's to specify the encryption of the plain-text in the files that the devices execute. The Switch implements encryption through an abstraction layer, which operates as a filter, and in each communication the filter is instantiated.

In one embodiment, the Switch is a stand-alone device that operates as a relay between the two computers, automatically encrypting the message payload by executing one or more ELD's with the first computer communicates with the second computer. In one example of this approach the Switch uses ELD A to encrypt the bytes of the sending computer, and ELD B to re-encrypt the bytes for transmission to a second computer, giving each leg of the relay independent encryption logic. As will be explained below, this is the technique used in the Protector-Receiver Network when a tertiary logic descriptor is transmitted indirectly from one computer to another, using the Switch as the buffer in the middle to scramble the bytes of the Secondary ELD during the transmission of it. Using multiple encryption logic filters in the transmission makes the system harder to crack.

The purpose of transmitting the Secondary ELD is to initiate trust between the computers, giving them what amounts to a private encryption logic tunnel for sending to each other the single use plain-text encryption logic that is executed and discarded each time the body of the message is encrypted. In each communication the Plain-Text ELD is included in the encryption meta-file, and the Secondary ELD encrypts it. This is unlike tunnels using SSL, wherein public keys or private keys are transmitted, because a different encryption algorithm is used for each encrypted session under the embodiments.

The Switch may be equipped with a parser that parses tags embedded in the documents that are encrypted. However, the parser in other embodiments may repose on a different device, such as a client application that receives descriptors from the Switch through a port. In the latter embodiment the Switch merely supplies the ELD's, which are parsed from the meta-files on the local computers and executed on the computers.

In some embodiments this encryption method may invoke a spectrum of encryption logic layers in which randomness for the encryption logic is given effect in an independent way in each layer. Each layer may implement an ELD in a unique way, or use a technique that is not ELD based. The use of a spectrum of logic layers for encryption may allow a single digital file to express digital rights that differ as among a group of users. For example, a contract may be encrypted with different encryption logic layers, so that only the parties to the contract may decrypt it. One layer may encrypt the plain-text, the second layer encrypts first ELD, and a third layer corresponding to the parties with contractual rights encrypts the second ELD that encrypted the first ELD, etc. This differs from the non-orthogonal approach of SSL and the other methods.

Figure 9:
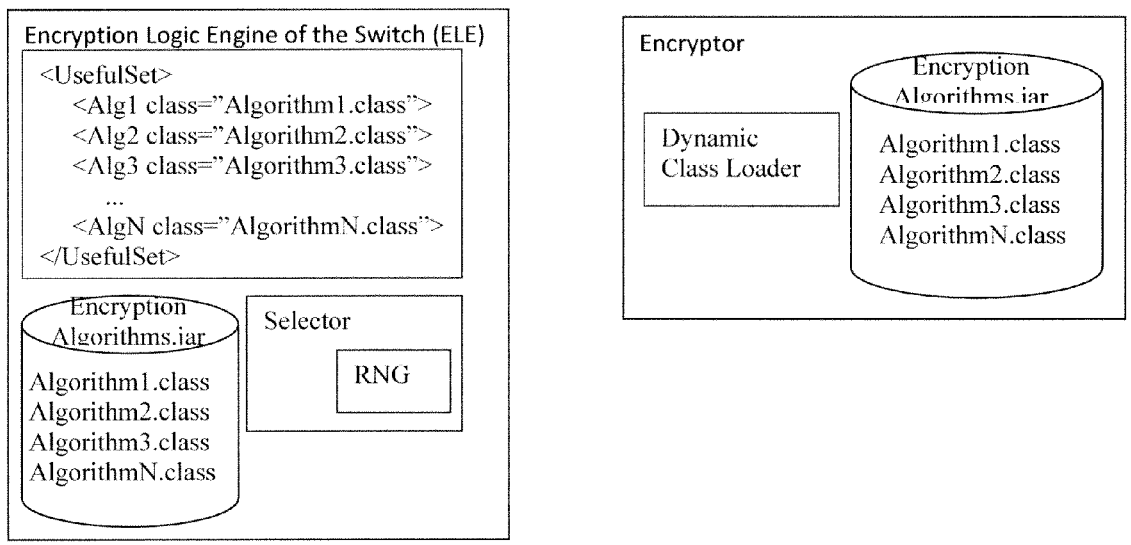
FIG. 9 Randomness Selection Functionality for Varying Encryption Logic . . .

The Switch may generate an ELD through software, such as a pointer, or an RNG, or through hardware. Although the use of a pointer is not required for the Encryption Logic Switch, a pointer is a good way to effectuate randomness. Using random clock values to select an encryption algorithm from a set of algorithms occupying various positions on the clock is one embodiment of the Switch. The clock on the Switch may generate a common time-based object to generate an ELD, and the clocks on the local computers may use their clocks to execute that object. Time based objects also may be used to process a datacast from space so that the local computers may use the data in a reciprocal fashion, by specifying part of the random data when it reaches the computers on Earth. FIG. 9 diagrams the Randomness functionality in the generation of the Composite ELD on the Switch, and the feature set of the Encryptor that allows it to process that logic. It can be seen that both the Switch and the Encryptor on the encryption application access the same JAR file, which contains the constituent algorithms used to generate the encryption logic composition.

In some cases, the middleware is written with the support of an SDK, and this allows the abstraction of the hardware, whereby higher layer processes may be defined in executable code that is liberated from the burden of interacting with the hardware directly. This is a characteristic of the Encryption Abstraction Layer. An Encryption Abstraction Layer separates the encryption logic functions from the details of execution on the particular hardware, rendering the encryption logic more universal among different machines, easier to maintain, and easier to install.

The abstraction layer approach may mimic the functionality of "drivers" under Windows®. One embodiment for an encryption "pseudo driver" is a common meta-file format for the encryption meta-file, to express values that load a class to carry out the encryption in a way that is compatible with a standard version of the Encryptor and a common parser. Both the meta-file format used in the client applications and the Encryptor may be universalized across the operating system, or using Java virtual machines. When an OS is used, a development environment may streamline the task of creating output files for the application, so that the output files are compatible with the automatic encryption and decryption, and the common Encryptor and parser, thanks to the "encryption pseudo drivers." The pseudo driver is a common file structure for the encryption meta-file, and the structure activates the class loading in a universal manner across the operating system.

The difference between actual drivers under Windows™ and the encryption "pseudo drivers" is that the pseudo drivers do not necessarily interface the hardware. Under one concept of what a driver is, it is an item of middleware interfacing hardware in a universal way, but this is not so under the embodiments. The "pseudo driver" for encryption merely standardizes the meta-file format that wraps the bytes to be encrypted, so that the meta-file can interface with the common Encryptor on all of the applications using the OS. The meta-file structure may be standardized in the application via the output files, with the support of an SDK in writing the application. So the "pseudo driver" is not a driver in the ordinary sense because it does not interface any peripheral hardware that receives an input, such as a monitor (although the encryption "pseudo driver" may in one embodiment interface the GPU when execution of the encryption occurs on that device. The output of the GPU in this case, however, does not involve any signal into the monitor but instead uses its computing power solely for encryption.) One embodiment of the pseudo driver is an XML file structure using a DTD, and this will be explained below.

Composite ELD's

In accordance with embodiments, one method of encryption is specifying an encryption routine using multiple Encryption algorithms, and the algorithms act in concert to affect the bytes. This multiple-algorithm approach may occur per a master combinatorial algorithm. In this manner an ELD may be formed by the aggregation of sub-algorithms into a composition, a packet. The Switch may cause the dynamic generation of an encryption logic resulting from the inter-operation of such a set of algorithms, by providing an output called the Composite ELD. Like the single-algorithm ELD, the Composite ELD executes by dynamically loading a class on the communicating devices to perform the encryption. It enhances randomness to use a Composite ELD, as it contains multiple algorithms for encryption and decryption by default, and the algorithms are randomly combined.

In one embodiment, the Switch may output a Composite ELD by means of a selector or a sequencer that operates on a master set of algorithms to create an ordered sub-set, and this subset comprises the composite. A JAR file may contain the master set of algorithms subject to the selection process. The JAR file may be present on the Switch and available to the Encryptors of the applications, as well, for execution. See FIG. 9. The selector randomly chooses some of the algorithms to be included in a set while excluding the others, and determines the sequence for their execution.

The output of one algorithm becomes the input to the next, in one version of the Composite ELD. (However, a simpler version of an encryption logic composition may consist of the random selection of only one algorithm, and the random selection of a one of the arguments pertaining to it. See pending patent). The subset of algorithms is selected and sequenced before the parameters are supplied. As the final step, the Switch sets the parameters of each algorithm of the resulting composite, rendering the completed Composite ELD.

Figure 10:
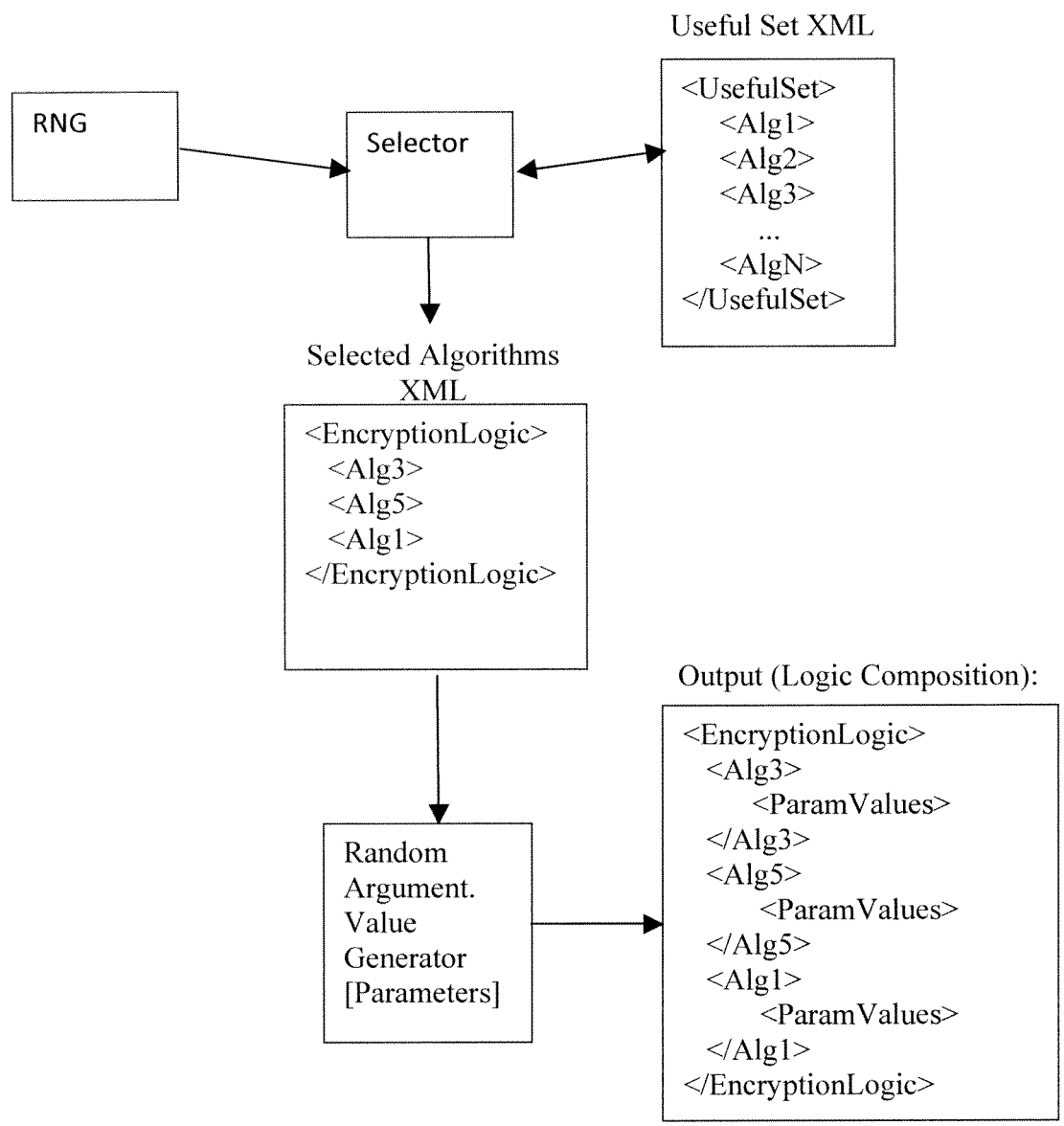
FIG. 10 Process of Composite ELD Generation . . .

The Switch may use a global set of algorithms, which may be updated. From this master set the Switch selects the subsidiary algorithms, when the Composite ELD approach is used, which will form the particular instance of the Composite. The JAR files containing the algorithms, which are present on the local applications and on the Switch, may be include a first JAR file which, across the network, is substituted by a Second JAR file. The Second JAR file may be given effect, as a substitute for the first one, at a pre-defined moment across the entire network. This updates the system. These details of the random logic generation process are illustrated in FIG. 9. The Composite ELD logic generation on the Encryption Switch process is seen in FIG. 10.

In one embodiment the ELD in a particular instance is parsed and an XmlBeans Object is created. The object is used in dynamic class loading. The selected subsidiary algorithms may be sequenced randomly each time the Switch generates the ELD. The subsidiary group is called the Useful Set. Randomness may be assured by the operation of the clock or an RNG in hardware, such as the Intel Bull Mountain device. Hardware, software, or both may be used in the random selection process.

The global set of algorithms from which the Useful Set is derived may be replenished at intervals, so that the Switch is constantly supplied with fresh algorithmic raw material to generate the changing, novel encryption logic. A class "Updater" may be used for this purpose. The Updater class also updates the algorithm set on the individual computers who use their Encryptors to execute the specified algorithms, so that as among all of the computers the candidate algorithms are synchronized. The JAR files may be the vessel containing the algorithms and keeping things current. When the clocks on the Switch and the computers are used in the randomization, clock synchronization may occur through Updater as well so that the clocks on the computers generate the same values across the network in the random selection process. When the Switch is capable of receiving satellite data, the Switches may be synchronized by atomic clocks. The updater functionality on the Switches and on the encryption applications on the computers may reach a URL.

Once the Useful Set has been determined and the parameters have been set, the resulting logic in one embodiment may be captured as an XML file. XML is a tool well suited for the parsing and class loading steps because of its structured nature. This is in contrast to SSL, AES, or other encryption methods which do not employ an encryption algorithm logic descriptor expressed in XML and do not carry out encryption by dynamic class loading. Other encryption methods, such as those of Adobe™ or silent Circle™ differ from the embodiments in these respects.

With the creation of the XML-based ELD text file, the Switch has completed its task. A unique, disposable ELD comes into operation, being applied during a defined period of use in the communication between the computers, working as the encryption-decryption filter. The ELD can encrypt the plain-text in a file for message, or for a session, such as a chat session or a session of videoconferencing. A new ELD may be used for each new plain-text file, as in the case of the Protector-Receiver Network described below, or for each new session. For example, there may be an encrypted chat session with encrypted attachments sent back and forth. The ELD causes execution by loading (e.g., via the dynamic class loader) the classes available in the JAR vile to the Encryptor of the client application, which parses the ELD and executes the encryption procedure that the ELD has specified.

Figure 16:
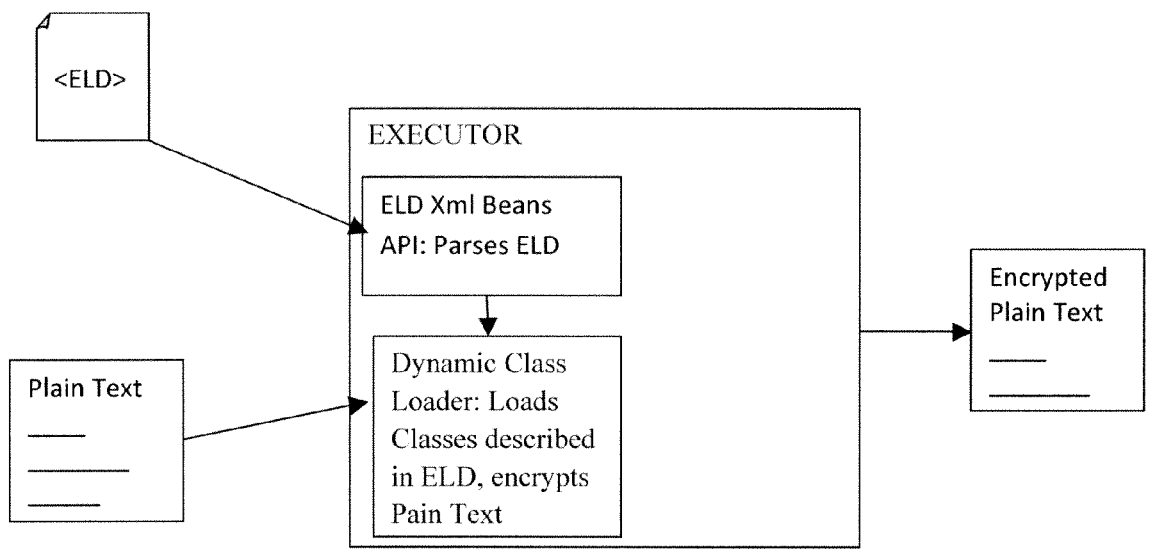
FIG. 16 The Executor . . .
Figure 17:
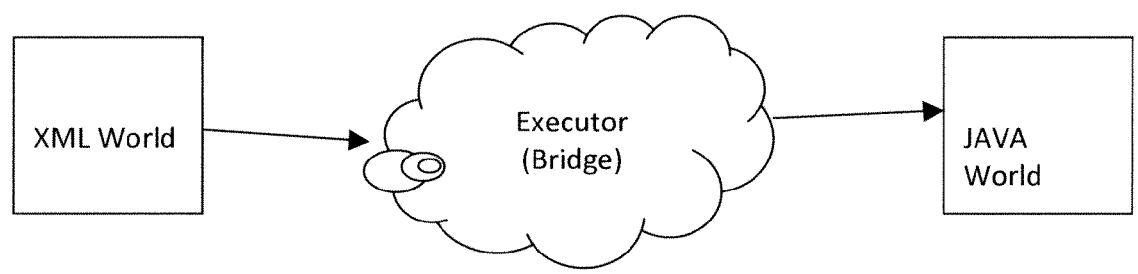
FIG. 17 The Executor is the Bridge between XML and Java . . .

The Executor, explained in greater detail below, is the bridge between XmlBeans and the Dynamic Class Loader of Java. (See FIG. 17). The Executor is the heart of the Encryptor. The Executor is the application that reads and parses the XML document, the ELD, and XmlBeans object is obtained from this process. After the XML Beans Object has been instantiated, it is used programmatically to obtain the values that are supplied to the proprietary Dynamic Class Loader of the embodiments, via Java, in order to load the classes and execute the methods per the specified encryption algorithms. This is illustrated in FIG. 14 and FIG. 16, and explained at a greater detail below in the section "The Encryptor and the XML Meta-files."

The ELD in one embodiment is an XML document. It is fed into the Encryptor. After the XML has been parsed, the parameters used to load the class or classes and execute the methods reach the Dynamic Class Loader in the Encryptor, and encryption is achieved. The Encryptor receives the XmlBeans object and executes the encryption. In this manner encryption and decryption occur automatically, as a background task. This procedure happens in an identical fashion on a mirrored pair of digital devices equipped for the session, with the same ELD and the same JAR file, and with an identically operating Encryptor on each device to invoke these resources to encrypt and decrypt the messages. The computers execute the common encryption recipe that the mirrored ELD's furnish. The use of the same ELD on each computer allows them to build the common logic by selecting from the common JAR files the constituent algorithms forming the composite, using them in the dynamic class loading.

Given that the logic is dynamically generated on the Switch, it need not persist beyond the session because a new logic easily may be generated for the next one. The advantage of disposable encryption logic is that it takes away the incentive for a brute force attack. Cracking the old logic to intercept the next communication session is useless, because next time a new logic is used.

The Encryptor of the client application of each computer may contain in memory the same gross set of algorithms contained on the Switch, and the set may be replenished at intervals. The algorithms are contained in a JAR file in the client encryption application so that the Encryptor, executing the ELD, can string the algorithms and the arguments together into the Composite ELD to encrypt the bytes. The Updater class may be used when the Switch providing the ELD to the client applications is implemented on a network. The new algorithms used to form the Composite ELD on the local computers are broadcast to them for use. This "freshening" of the algorithm set is a defense against hacking. A brute force attack may be frustrated by, among other things, the constant swapping-out of the candidate algorithms from which the Composite ELD's are formed.

FIG. 9 illustrates the components of the method using the Switch and the Encryptor. One can see that the algorithms on the Encryption Logic Engine of the Switch are the same as the algorithms on the Encryptor.

The parsing and dynamic loading of classes that occurs in the Encryptor is a process that happens in tandem, on both computers engaging in the encrypted session, such as during chat or when encrypted text or image files are exchanged. The technique, in contrast to SSL and the other methods, automatically implements a unique, disposable session logic that is mirrored on each device. In one embodiment that logic executes multiple times during the communication session, such as with each chat message. On each occasion when a message is transmitted from one computer to the other it automatically is encrypted and rendered unreadable during transmission and decrypted and rendered readable upon receipt, by a new ELD. When the session is over the logic is flushed.

Whether a GPU is used or not, and whether or not the computer's clock is used or a hardware based RNG generator such as the Intel Bull Mountain device, it is advantageous in any such system of networked devices to generate the encryption logic from scratch by means of an Encryption Logic Switch. Advantages from the execution of such end-point encryption logic through ELD's, rather than by the passing of keys or certificates such as with SSL or with the exchange of public keys, extend beyond avoiding the burden and risk of handling keys. The following table shows the advantages of the embodiments described herein over SSL:

|  | SSL and Other Methods | Encryption Based on ELD's |
| --- | --- | --- |
| Multiple Algorithms | NO | YES |
| Needs Keys | YES | NO |
| Use of Certificates | YES | NO |
| Possible use of GPU | NO | YES |
| Disposable Encryption Logic | NO | YES |

(As will be explained below, the embodiments may use keys, but in manner that differs from the other methods. In an ELD, when keys are used, e.g. appearing in one of several algorithms that are assembled as a composite, and there is no need for the user to remember them because they are deployed automatically as an argument in the algorithm. The utility of this approach surpasses the manual method in which the other methods use keys.)

At the programmatic level, the generation of a Composite ELD works as follows. The Encryption Logic Engine on the Switch may use a selector relying on an RNG or the computer's clock, or other means using purely software, to generate a number between 1 and the maximum number of available algorithms in the Useful Set. The generated number is used as an index value and the algorithm in the position given by that value is selected. The process may be repeated according to the maximum number of algorithms that are going to be contained in the Composite ELD. In the case of an ELD that is not a composite, the selector chooses a single algorithm from the group to provide the encryption recipe for the session, and the clock, the RNG, or software may be used to make the selection. The same approach is used to select one of the many arguments which the various algorithms employ, and a set of arguments corresponds to each algorithm. See FIG. 10.

Figure 11:
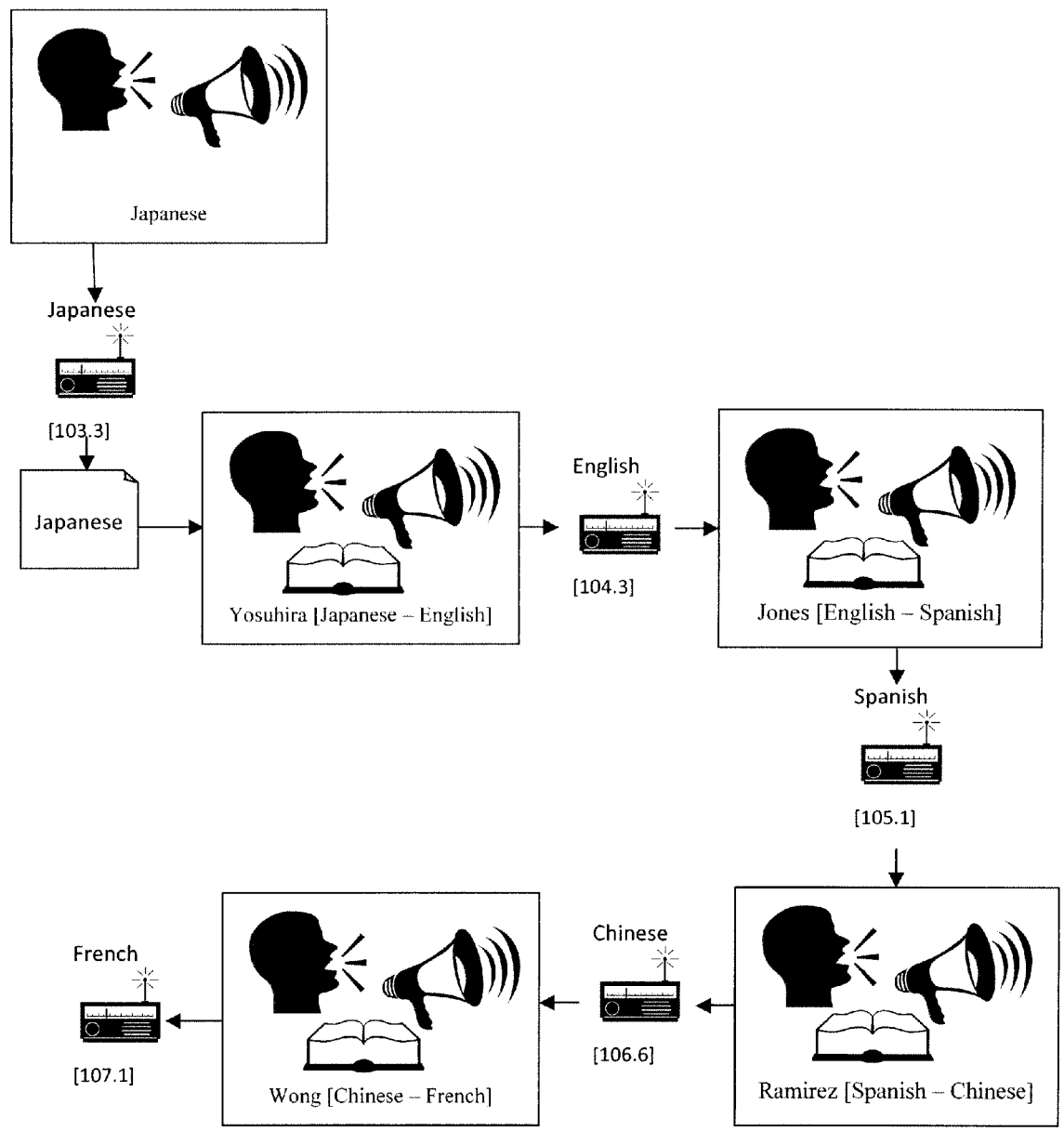
FIG. 11 Metaphorical illustration of the Composite ELD . . .

The law allows an inventor to describe his invention metaphorically. The Composite ELD technique may be likened to a set of bi-lingual radio announcers on the FM spectrum, who transmit a message from one to another in different languages, in series. FIG. 11 illustrates the metaphor. Announcer Yasuhira is bilingual in Japanese and English. Announcer Jones is bilingual in English and Spanish. Announcer Ramirez is bilingual in Spanish and Chinese. Announcer Wong is bilingual in Chinese and French. Each broadcaster represents one the of the constituent algorithms in the Composite ELD. Each announcer receives an input, a message in one language, and causes an output, a message in another language. Each announcer uses a dictionary to perform the translation. Jones listens in English and transmits in Spanish. Ramirez listens in Spanish and transmits in Chinese. Wong listens in Chinese and transmits in French.

Each announcer listens in the input language and translates the message into his other language, the output language. Moreover, each announcer broadcasts on his own FM frequency: Yasuhira on 104.3, Jones on 105.1, Ramirez on 106.6, and Wong on 107.1. The frequencies represent the values of the arguments of the encryption algorithms of the Composite ELD. The next announcer cannot simply listen to any of the others, but only to one as top whom he can provide an intelligible input. The transmission of one announcer must be heard by another announcer who can understand that language. The dictionary represents the translation logic that, for each announcer, allows the language input, the first language, to be translated into the language output, the second language.

This process illustrates the execution of the Composite ELD. The ELD itself is the instruction set that tells all the announcers the message that they are to translate, and to whom and in what language, and further, identifies the frequencies for the process. So first the process is described in the instruction set, and then it is executed. Furthermore, although this is not shown in the illustration, the instruction set itself may be scrambled, by the same technique, so that it is sent securely to each of the announcers. This would be using encryption meta-logic.

The elements of the Composite ELD are generated by a process of random selection. In one embodiment, the Protector-Receiver Network, there is an RNG in software which is programmable. The computer's clock may be used as an additional tool for the random selection. The clock may be virtually "set" by a routine to further randomize the process.

The operation of the RNG also may be defined by programmable settings, or alternate through a filter; and each group of settings may be unique and may be swapped out at an interval across the network on all of the computers simultaneously.

One option is to enable a network administrator to make available to the applications more than one Switch, as a fail safe strategy. Also, each system integrator making an encrypted network can endow his network with a Switch that differs from the Switches used on other networks. For example, a law firm wishing to communicate in confidence with its clients can operate its own private Switch, one that is non-identical to all others, to provide the highest assurance of privacy in the encryption logic to shield the confidential client communications. Such a proprietary Switch is more secure because the specifics of how it endows the network with its ELD's remain confidential. With the proprietary Switch some of the features are individuated. In this respect the embodiments differ from a certificate server or the methods of SSL in which public keys and private keys are transmitted via an approach that is not completely proprietary.

Once all of the algorithms have been selected, the values of the parameters in them may be generated using the Parameter Value Generator, which also may use an RNG or the computer's clock. The arguments used in the algorithms are randomized in this way. After all the parameters of all the algorithms have been inserted, the ELD, which may be an XML text file, is generated. The ELD, because it is parsed from the meta-file in a way that allows the values contained in it to be used as parameters in dynamic class loading, is executable on the Encryptor of each device participating in the mirrored encrypted session.

Not only the plain-text—but also the ELD itself—can be encrypted. (Recall that, like the message payload, the ELD also is a text file). In the terminology of the invention, this is called the meta-logic. The ELD used for this purpose, as meta-logic, is called the Secondary ELD. This is an extremely important point in the embodiments. Because one ELD can encrypt another ELD, it is possible to safely encryption send logic compositions that self execute across the Internet. The recipient computer already is in possession of the Secondary ELD, so this means that the actual ELD used to scramble the bytes may be encrypted by the Secondary, and safely transmitted from the sender to the recipient. An additional layer of meta-logic may encrypt the Secondary ELD, and the additional ELD is shared by users who work on a confidential matter. This allows the fine grained control of digital rights. Please see FIG. 12.

The fact that in the embodiments the encryption executable logic is constantly in a state of flux reduces the incentive for a brute force attack. In such an attack the hacker attempts to derive the logic deductively from n attacks on the system. If the hacker succeeded in reverse engineering one of the ELD's, it would be a Pyrrhic victory because by that time the ELD would no longer be in use. This "swapping-out" of the encryption logic can take place at multiple levels and points on a distributed network, and the multiple points may represent different physical points of presence. The orthogonal approach in the embodiments makes hacking very hard.

The encryption code on the computers may comprise two functional modules, one of which creates the ELD's, and the other of which executes them. This functional separation is the essence of the abstraction layer approach of the embodiments. The Switch may be the ELD creating computer, and the local computers may be the ones with the Encryptor, part of the identical client applications where the ELD is executed to encrypt the plain-text upon transmission and decrypt it upon receipt.

When the client application receives the ELD's from the Switch, it may do so through a port. Alternatively, if the client application is an email client, it may receive the ELD's in a packet sent out or disguised as an email message. The client encryption application may be auto generated on a server. Through its settings, it may conform to the needs of the individual user, as in the example of the Protector-Receiver architecture, explained below. In this embodiment the server that auto generates the client application may do double duty as the Switch generating the ELD's.

Per embodiments, Encryption Logic Engines can repose on each networked client application, or on a Switch, or on both. There are many ways in which the ELD's may emanate from their source and reach the client applications that execute them. For example, Twitter™ or Facebook™ may transmit ELD's via a broadcast occurring during a social networking session, and this approach may take advantage of Secondary ELD's to provide an authentication tunnel. The ELD's may reach the Twitter™ or Facebook™ user from satellites. The "tweet" is encrypted by an ELD, and that ELD is encrypted by a Secondary ELD corresponding to each person to whom the tweet is transmitted. The transmitting computer contains an applet with a DMBS to order the Secondary ELD's for the persons receiving the broadcast. Distributing ELD's in this manner, via social Networking, overcomes the "man in the middle" hack because the encryption logic executes on the edge, via the ELD's. The amount of functionality that is shifted from the central server to the user application on the edge, in the social networking context, may vary with embodiments.

The server network containing the Twitter servers may contain a Trust DBMS corresponding to each user who broadcasts tweets. There may be a browser based plug-in provided by the broadcasters to encrypt the tweets and each plugin may implement the Trust DBMS containing the Secondary ELD's in order to associate the users entering into trust, with each pair of users executing the dedicated Secondary ELD, thereby providing both encryption and authentication in social networking communication. The plug-in may be a third party application provided independently of the operators of the social media network, and a Registry, such as under Windows, or Java, may be used to associate the plug-in with the web service providing the social media functionality. Also, the functionality of the browser may be extended toward this end. The Tweets™ may consist of meta-files containing a message encrypted by a Plain-Text ELD, which in turn is encrypted by a Secondary ELD, and the encrypted Plain-Text ELD is embedded in the tweet meta-file. The Twitter™ server network may contain encryption logic engines to create the ELD's and supply them to the edge, per this architecture, but an independent network or a network of satellites also may accomplish this. The same approach applies to Facebook™ and the other social media providers. Although a central chat server may operate as a relay for chat messages encrypted using ELD's, the use of ELD's is not limited to chat, nor to Twitter or Facebook. ELD's work with email. ELD's may be used generally in communication from one computer to the other, with no central server active in the message transmission process at all, so that the man-in-the-middle attack is prevented.

The ELD's may be provided to the local applications in advance of their use. The ELD's execute on the local applications, auto encrypting and auto decrypting the files or messages through dynamic class loading, without any involvement of a central encryption server in the actual transmission of the encrypted the message, unlike other methods using certificates, AES, or SSL. Other methods, such as the email encryption services offered by Adobe or Silent Circle, pass the confidential plain-text across a server in the middle, one intervening between the communicating parties.

The ELD's may be broadcast to users in a way that controls their digital rights, creating a web of trust. For example a professional's encrypted communication application may receive ELD's in a common format, but re-encrypts them with a sub-logic that is only available to the professional and that particular client, using a second ELD layer, thereby creating a private encryption logic tunnel between the two of them. Another sub-layer of logic may be unique for each matter that the professional handles in order to provide security and organize the workflow for the documents, associating like with like. This approach, for example, may be used to encrypt and decrypt contracts hosted on a cloud, with the parties to the contract using the common sub-logic both to authenticate one another and to encrypt the contract. As will be explained below, ELD's may be used in this manner to implement secure matters control. There may be an orthogonal spectrum of encryption logic layers with each layer using an independent ELD and each layer employing encryption for a different purpose.

Generally, in the embodiments offering maximum privacy the first ELD, the one used to encrypt the plain-text, is encrypted with a Secondary ELD, the meta-logic. This technique is used in the Protector-Receiver architecture, so that only the persons in the group of trust of a given Protector are allowed to decrypt the ELD's that are used to encrypt the plain-text in the messages they send back and forth. Each member of the group of trust of a given Protector application enjoys a dedicated, unique Secondary ELD that is used to encrypt the primary ELD which randomly is selected to scramble the plain-text in each instance of communication. The encrypted plain-text ELD is placed in the encryption meta-file along with the encrypted payload. This approach also works when a case or matter common to multiple users employs the same ELD as a Secondary to encrypt the Plain-Text ELD randomly selected to encrypt the payload of the meta-files.

This filtration-by-re-encryption technique can occur multiple times and at multiple levels, and invoke various physical points of execution. A matrix of trust may implemented so that a Secondary ELD associates one user with another for the purpose of trusted communication between them, and the matrix specifies trust by providing a value, the Secondary ELD at the point of intersection that corresponds to the two users. Then, an additional ELD may encrypt that Secondary ELD for a given matter by invoking another data table expressing that additional ELD, and the matter is looked up on the second table. For a user to decrypt the document possessing both the Secondary ELD for privacy and the additional ELD corresponding to the matter are required. The additional ELD corresponds to the matter or case on which the trusted users are communicating, so that only if the users are authorized to participate in that matter do they have that additional ELD required to unlock the documents pertaining to it. So in this embodiment three ELD's are used in the security scheme: one for encrypting the plain-text, one re-encrypting that ELD based on the identity of the two parties in trust, and one pertaining to the case or matter. The richness of the interaction of the ELD's in designing layers of encryption that form a spectrum of encryption logic layers is limited only by the imagination of the system architect.

Figure 12:
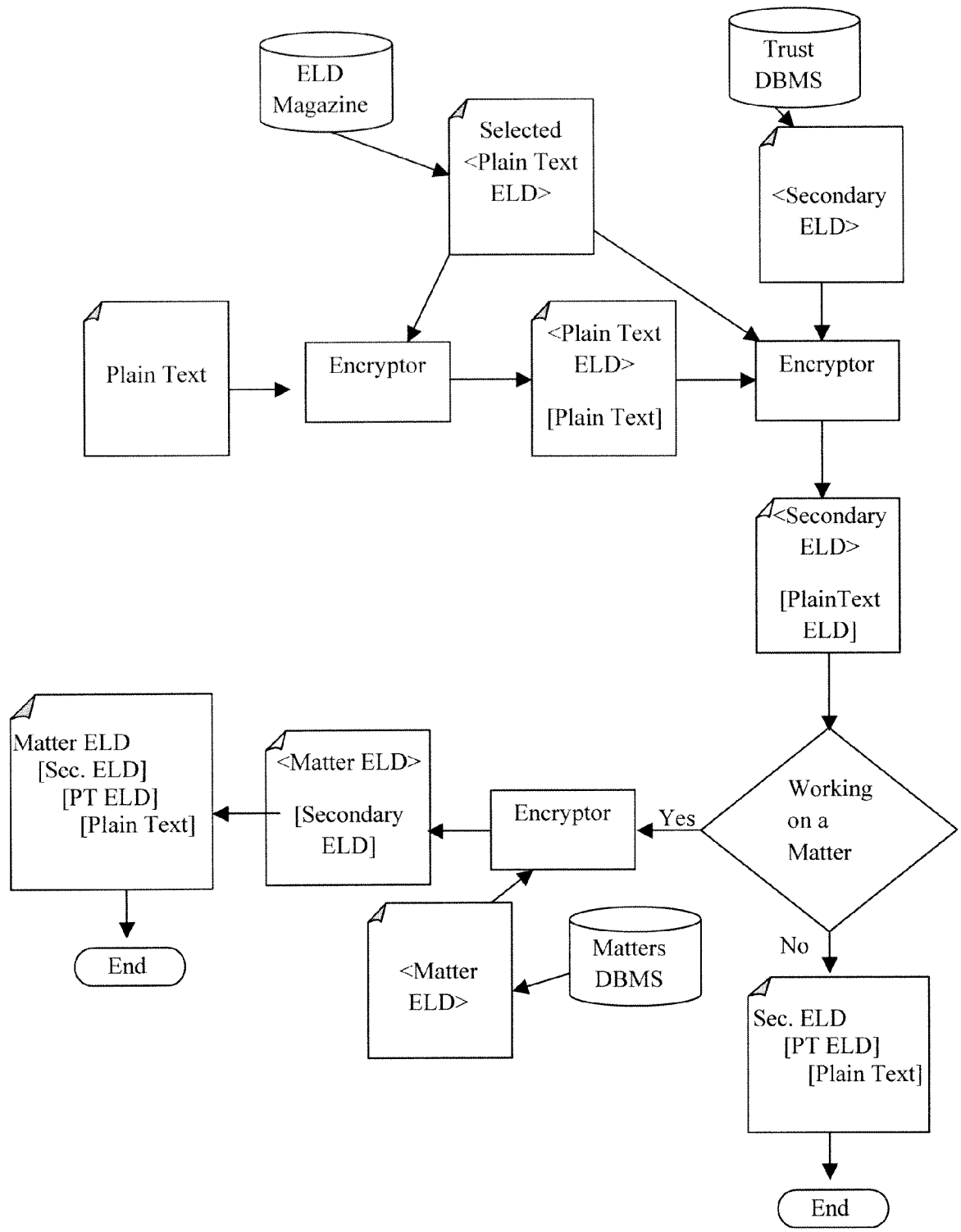
FIG. 12 Multi-Level Encryption Meta-Logic . . .

This process is illustrated in FIG. 12. (In this and the following illustrations the data to be encrypted is enclosed in square brackets). In this figure, the Plain Text ELD is taken from the magazine of ELDs on the local application. The plain-text and Plain-Text ELD are fed into the Encryptor, and it encrypts the Plain Text. (In each block what is encrypted is contained within the square brackets.) Next, the Secondary ELD is taken from the DBMS. The Plain-Text ELD and the Secondary ELD are fed into the Encryptor, and the Secondary ELD is used to encrypt the Plain Text ELD (the Plain-Text ELD is enclosed in the square brackets). The next step is determining if the Plain Text is part of a Matter. If no matter is involved, the layered re-encryption process ends. But when the plain text is part of a matter, the Matter ELD corresponding to the matter is taken from the Matters DBMS, and the Secondary ELD and the Matter ELD are fed into the Encryptor. The Encryptor encrypts the Secondary ELD using the Matter ELD.

Figure 13:
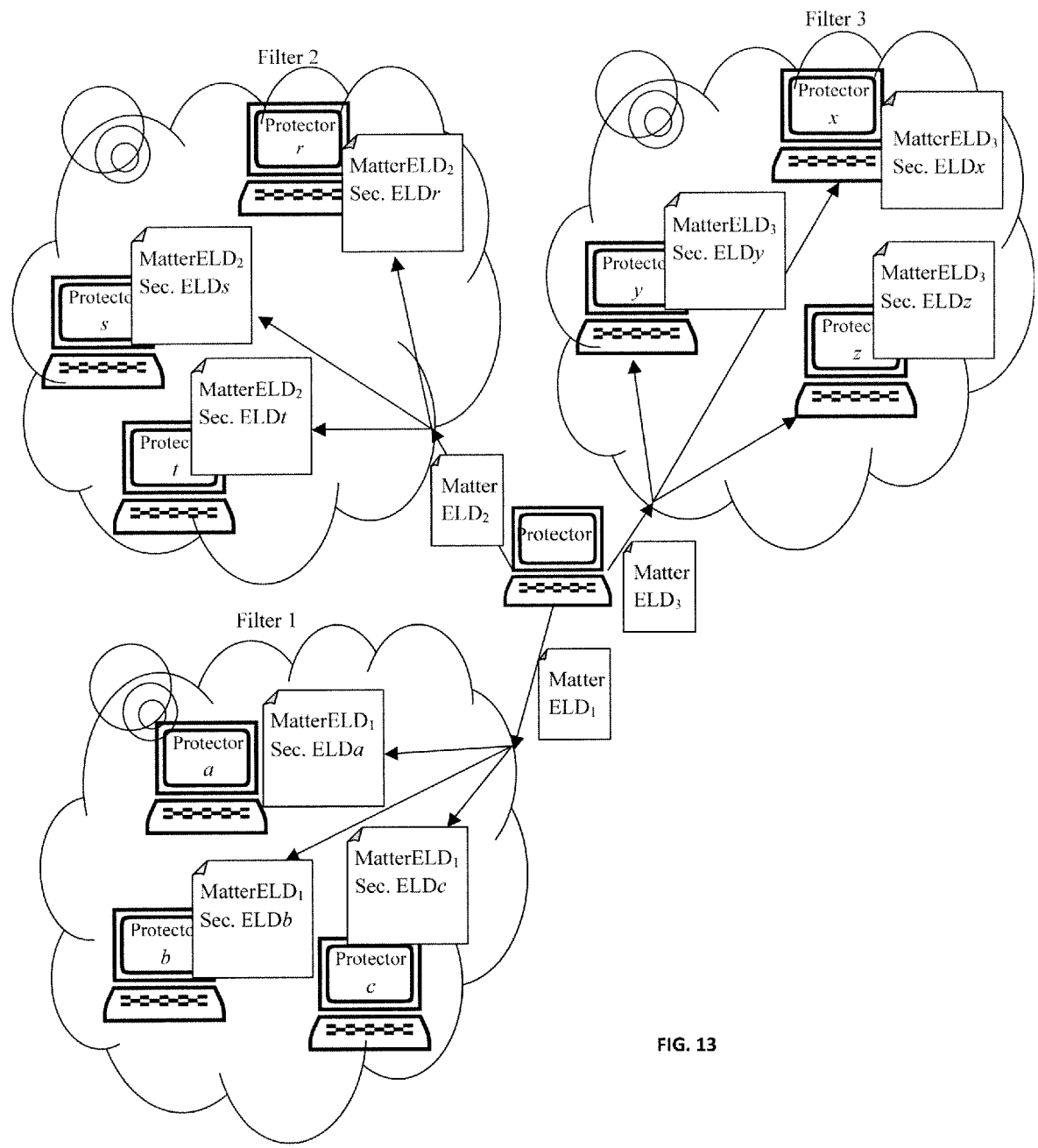
FIG. 13 Multiple Meta-Logic Layers . . .

FIG. 13 illustrates the steps. One filter, Secondary ELDn, is applied to the trust group of the Protector, his colleagues who have Protectors; and a sub filter, Matter ELD A2, is applied to the sub-group of those Protectors who are authorized to participate in Matter A. For example, in FIG. 13, Protectors r, s and t are involved in Matter 2. Therefore, they receive documents encrypted with Matter $ELD_2$, and in the same process, individually, the plain text ELD of the documents each of them receive is encrypted through their respective private logic tunnels (Secondary ELDr, Secondary ELDs and Secondary ELDt), those Receivers being Receivers r, s, and t.

Encryption by default may be given effect by broadcasting the ELD's out to the local applications, and sub-groups of trust can be created by this means as well. This may occur for any sub-group of trust in communication with a higher group, and n levels of meta-logic may be created, using this filtration-based approach. This may happen in advance of communication, as a background task, using threads so that when the moment for communication arrives the required ELD's are present on each computer.

Programmatic View of the Switch, the ELD, and the Encryptor

In accordance with, embodiments, data may be encrypted by an Encryptor using an ELD generated by the Switch. The encryption logic may result from a series of selections from a set of elements: in other words, a composition. The composition in its simplest form is a random selection process that involves choosing an algorithm from a set, and then, choosing the arguments operating within it. In another embodiment, the ELD may be a composite logic descriptor that is created by combining constituent algorithms and arguments into a whole, such as a packet of algorithms with each executed in series on the plain-text so that the output of one algorithm is the input to the next. The generation of an ELD in the latter embodiments now explained in greater detail.

The Switch may have available a universe of encryption algorithms, the Global Set, from which the Encryption Logic Engine randomly selects a quantity of N of algorithms, a subset to be combined in the encryption logic packet, the ELD for an encrypted session. After determining the quantity of algorithms to be N, the particular ones to be supplied in Quantity N are selected, and this creates the Useful Set. Please see FIG. 10.

For the generation of a given ELD, the Useful Set is referenced as an indexed list taken from the available algorithms in the Global Set. The list is saved on the Switch in memory. When an ELD is to be created a random number is generated. When the random number is obtained, the algorithm indexed by that number is selected to be included in the composite. The selection process repeats, until each algorithm needed for the composite is obtained from the Useful Set. The random selection process is not complete until each of full complement of algorithms is reached, matching the Quantity N. When this subset is complete, another random number generated on the hardware RNG or the clock, or by software, and that number establishes the sequence according to which the chosen algorithms will appear, so that the bytes output of one becomes the bytes input to the next.

Figure 15:
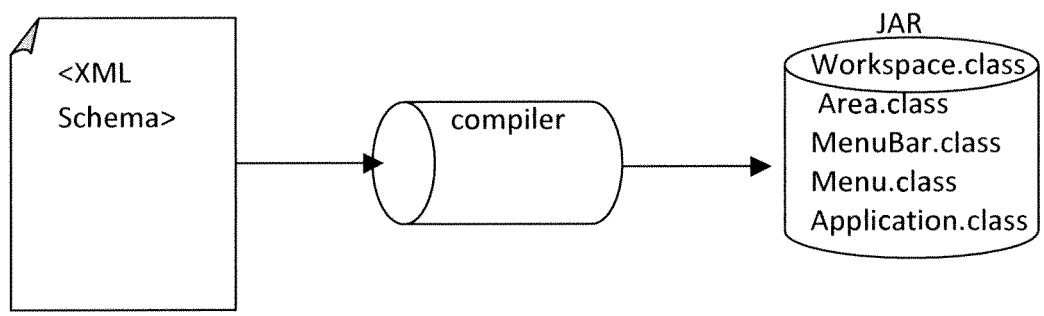
FIG. 15 Schema Compilation Process . . .

Once all the algorithms that will comprise the composite ELD have been selected and their sequence has been set, the values of the parameters used in those algorithms (the arguments) are generated, also randomly. The number and the types of the parameters are expressed in the XML document that will become the final Composite ELD. That ELD may be parsed into an XmlBeans Object. The XmlBeans Object provides the bridge to Java, and thus to execution on the Encryptor. Please see FIGS. 15, 16, and 17.

For example, if an encryption algorithm requires 2 parameters, and those parameters are of the type integer and string, both values are randomly generated and expressed in the XML text file, the ELD. A DMBS or index may be used to order the relationship of algorithms and the number and type of parameters corresponding to each. All of the encryption algorithms require at least one parameter: the data that is going to be encrypted, the plain-text. The value of this parameter will be given at run time, so it is not randomly generated.

Several data types can be used as a parameter in the encryption algorithms. Some of them are string, integer, Boolean, and float. When a String is going to be randomly generated two arrays may be used, one with letters and one with numbers. Both arrays may be added to a vector. A number may be randomly generated (with only two values, 1 and 2) in order to select the array the current character will be taken from. Once the array that the current character will be taken from has been selected, another number may be generated in order to randomly select the character of the corresponding array. That is, that number will be used as an index so that the character of the selected array in the obtained index is taken as the current character. This process continues on to completion, according to the length of the String.

The values may be numerical or Boolean. According to embodiments, when a numerical value must be obtained a random number is generated, limited by the maximum number allowed. When a Boolean (a "true" or "false") value is generated, a random number is generated, and if the selected value is less than a given threshold, "false" is assigned to the Boolean parameter, the "true" value is selected when the random number is greater than or equal to the given threshold.

When a value in an ELD specifying a parameter is taken from the XML, the XML specifies whether the same value is going to be used in the both the encryption and decryption process. In some cases, when a different value must be used a new random value must be generated for the decryption process. For example, if during the encryption process a Boolean value is required to have the "true" value, but it is indicated that a different value is required during the decryption, the opposite value ("false") must be assigned to that same parameter when decrypting the data.

Which of the parameters of the algorithm is the one corresponding to the data that is going to be encrypted also is something that must be indicated in the XML, in order to assign that value at run time. Once all of the algorithms have been selected, and the values of the parameters have been generated, all this information is stored in the XML text file. FIG. 10 shows the details. This file is the ELD, the recipe that describes the series of steps that must be performed on the Encryptor to encrypt the plain-text in the meta-file when the encryption is executed, which is to say, when the class is loaded. Below is a flow diagram showing how the ELD is created:

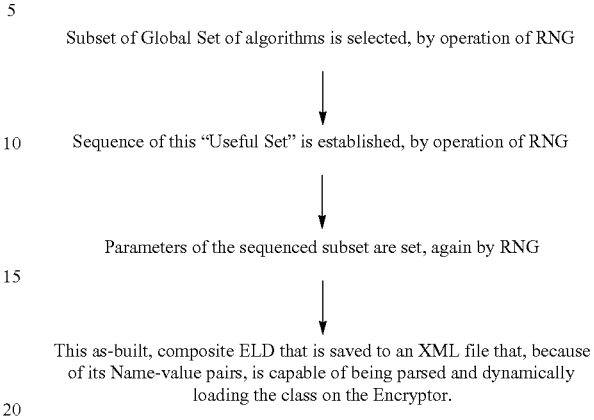

A Virtual Membrane for the Dynamic Loading of Classes

The process of encryption via the ELD has been described. According to embodiments, the ELD's used to encrypt and decrypt the plain-text may operate, in effect and metaphorically speaking, as a virtual permeable membrane, a filter for encryption. Because the membrane functionality is a background task, the user does not need to know how it works, or even that it is working. That is the point. The major problem with encryption is that it is too hard to use, but the embodiments cure this shortcoming dramatically: the user doesn't have to do anything at all. The virtual membrane upon the transmission of the data encrypts everything the needs to be encrypted, and decrypts everything upon receipt. The user may not have an inkling that this is happening, other than the fact that the confidentiality of his messages never fails.

The membrane executes the ELD so that the plain-text on the output side of the membrane is more useful, per the needs of encryption, than the data on the input side. Each client application contains the virtual membrane functionality. When the data is to be encrypted during transmission, the unencrypted bytes pass the membrane and emerge as encrypted for transmission. Then, upon receipt of that meta-file by the other application, the virtual membrane reverses. The membrane auto decrypts it so the message can be read, again by utilizing the ELD to load the class to transform the bytes but in this case from the illegible form to the legible form. The virtual membrane approach automates the security process, and the essence of it is as follows:

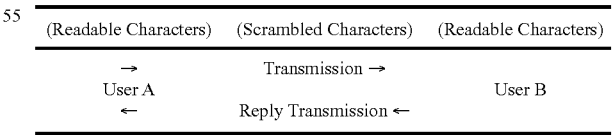

When the Java programming language is used, the Encryptor may invoke Dynamic class loading in order to execute the algorithms specified in the ELD. It is generally to be understood in the embodiments herein described that Java is not limitative, in that similar languages such as C# may provide the same functionality. Unlike other processes, under the embodiments encryption is actuated by a descriptor, and the descriptor may be an XML document to inform the dynamic class loading process. By using an XmlBeans object, the ELD operates as a software bridge to allow the XML to operate under Java. This will now be explained in greater detail.

Extensible Mark-Up Language

The Extensible Mark-up Language (XML) is a language that has been used in a variety of applications in the recent history of programming. XML is defined as a markup language that defines a set of rules for encoding documents in a format that is both human-readable and machine-readable. It is defined in the XML 1.0 specification[4] produced by the W3C, and several other related specifications,[5] all gratis open standards.[6] [http://en.wikipedia.org/wiki/XML]

XML uses Document Type Definition (DTD) files. A DTD specifies the structure of a document, the Elements and attributes of the Elements. The elements used in a logic composition for encryption may be expressed in XML, and the ELD meets this end.

Another type of file that also defines the structure of XML documents is called a Schema, or Xml Schema Definition (XSD). XSDs are more powerful than DTDs. They use a rich data-typing system and allow for more detailed constraints on the logical structure of an XML document. XSDs also use an XML-based format, which makes it possible to use ordinary XML tools to process them. In the embodiments XML Schemas are used to express the ELD. Throughout the Figures, an XML document is represented by the name of the document enclosed by the "<" and ">" symbols. For example, an ELD XML document would have the name "<ELD>".

The Schema is defined through a set of complex types that correspond to the tags in the XML document that is structured per the Schema. A complex type is composed as a name that describes the function of the complex type, and the attributes and elements. An attribute is the most basic piece of data a complex type can have, and it must have a name and a data type. The name describes the attribute, and the data type defines the type of data that can be assigned to it. Some basic data types are xs:string, xs:int, xs:float, xs:double.

Elements, as in the case of attributes, have a name and a data type. The main difference is that in this case the data type of the element can be other complex types defined within the Schema.

An Example of a Schema is the following:

```
<!--xs:schema targetNamespace='http://www.veridico.com/metaIDE'
xmlns:xs="http://www.w3.org/2001/XMLSchema"
elementFormDefault="qualified"-->
    <xs:complexType name="Workspace">
        <xs:sequence>
            <xs:element name="LeftArea" type="Area"/>
            <xs:element name="RightAread" type="Area"/>
        <xs:sequence>
        <xs:attribute name="Title" type="xs:string"/>
    </xs:complexType>
    <xs:complexType name="Area">
        <xs:attribute name="Name" type="xs:string"/>
        <xs:attribute name="class" type="xs:string"/>
    </xs:complexType>
    <xs:complexType name="MenuBar">
        <xs:sequence>
            <xs:element name="Menu" type="Menu"/>
        <xs:sequence>
        <xs:attribute name="Title" type="xs:string"/>
    </xs:complexType>
    <xs:complexType name="Menu">
        <xs:attribute name="Name" type="xs:string"/>
```

-continued

```
        <xs:attribute name="class" type="xs:string"/>
    </xs:complexType>
    <xs:element name="Application">
        <xs:complexType>
            <xs:sequence>
                <xs:element name="Workspace" type="Workspace"/>
                <xs:element name="MenuBar" type="MenuBar"/>
            </xs:sequence>
        </xs:complexType>
    </xs:element>
</xs:schema>
```

Parsing

Parsing consists in the evaluation of an XML document as against the Schema from which it was structured, which is to say, determining whether the XML is well formed. An XML document created based on the structured defined on the Schema can be considered an instance of that Schema. The following XML document is an example of this:

```
<Application>
    <MenuBar>
        <Menu name="File" class="file.menu.File"/>
        <Menu name="Properties"
 class="props.Menu.Properties">
            <Menu name="Help" class="help.menu.Help">
    </MenuBar>
    <Workspace>
        <LeftArea name="Tree" class="com.tree.Tree"/>
        <RightArea name="Wizard" class="com.wizard.Wizard"/>
    </Workspace>
</Application>
```

This XML was created based on the Schema of the previous section. Parsing is the validation of an XML document against the Schema from which it was structured, through a process of comparison. The validation, by allowing one to know if the XML document is well formed, informs whether the data can be used in the process for which it was created.

XML can be used in conjunction with computer programs in various tasks. In the case of Web applications such as Web Servlets XML is used for storing the properties of the Servlet, such as the base class of the Servlet, the parameters used to execute the Servlet, etc. In order to use the XML within a program, API's or Libraries for manipulation of the XML documents are necessary. For example, the Java programming language contains certain libraries for this purpose, such as the Java.xml library. Libraries provided by companies other than Oracle's Java are JDOM and Apache Software Foundation's XmlBeans.

XmlBeans in the Embodiments

XmlBeans is an open source tool provided by Apache Software Foundation that allows one to compile an XML Schema into a set of Java Classes in order to manipulate XML files that are structured according to the Schema. When one examines the complex types of XML Schemas, it is evident that they closely resemble Object Oriented Programming (OOP) classes. OOP Classes have a structure that includes a name, attributes (or fields), and methods (also called functions). These concepts will be explained in greater detail in connection with the embodiments. Classes for manipulating the XML Schema complex types can be created and compiled, in order to use them in object oriented computer programs, such as under Java. This technique is used to implement automatic encryption as a background task, per the embodiments, through dynamic class loading. An example of an XML schema for generating classes is FIG. 14.

This is one of the main objectives of XmlBeans. XmlBeans provides a "Schema compiler," that compiles a Schema, generates a set of classes, and stores them into a Java Archive (JAR) file. This JAR file can be further used in Java classes for the manipulation of XML Documents. A given JAR file for ELD's may repose on the Switch, and also, identically on the Local Applications.

In the Schema given in the previous example, five classes would be generated by the compiler: Workspace, Area, Menu Bar and Application. The form of these classes would be as in the ones shown in FIG. 14. These classes are used for the manipulation of the XML document in a Java program. Schematically, the compiling of a XML Schema is illustrated in the FIG. 15. Once the schema has been compiled, the use of the classes for parsing and manipulating the XML document from a Java class is as follows. First the XML file is parsed, and the Document's class is created. This is done through the main class' parse() method. Suppose we have an XML document called app.xml. The code for parsing it would be:

```
Application appXml =
   Application.Factory.parse("C:\\app.xml");
```

Now the XML can be manipulated programmatically. The next code shows manipulation of the XML using XmlBeans objects:

```
Application appXml =
   Application.Factory.parse("C:\\app.xml");
MenuBar menuBar = appXml.getMenuBar( );
Menu[ ] menus = menuBar.getMenuArray( );
for(int i=0; i<menus.length; i++)
{
    String name = menus[i].getName( );
    String class = menus[i].getClass( );
}
Workspace workspace = appXml.getWorkspace( );
Area rightArea = workspace.getRightArea( );
Area leftArea = workspace.getLeftArea( );
String rightAreaName = rightArea.getName( );
String rightAreaClass = rightArea.getClass( );
String leftAreaName = leftArea.getName( );
String leftAreaClass = leftArea.getClass( );
```

An XML document can be created programmatically, as shown in the following code:

```
Application appXml = Application.Factory.newInstance( );
MenuBar menuBar = MenuBar.Factory.newInstance( );
Menu[ ] menus = new Menu[3];
String fileMenuName = "File";
String fileMenuClass = "file.menu.File"
Menu fileMenu = Menu.Factory.newInstance( );
fileMenu.setName(fileMenuName);
fileMenu.setClass(fileMenuClass);
menus[0] = fileMenu;
String propsMenuName = "Properties";
String propsMenuClass = "props.menu.Properties"
Menu propsMenu = Menu.Factory.newInstance( );
propsMenu.setName(propsMenuName);
propsMenu.setClass(propsMenuClass);
menus[1] = propsMenu;
String helpMenuName = "Help";
String helpMenuClass = "help.menu.Help"
Menu helpMenu = Menu.Factory.newInstance( );
```

-continued

```
helpMenu.setName(helpMenuName);
helpMenu.setClass(helpMenuClass);
menus[2] = helpMenu;
appXml.setMenuArray(menus);
String leftAreaName = "Tree";
String leftAreaClass = "com.tree.Tree";
Area leftArea = Area.Factory.newInstance( );
leftArea.setName(leftAreaName);
leftArea.setClass(leftAreaClass);
String rightAreaName = "Wizard";
String rightAreaClass = "com.wizard.Wizard";
Area rightArea = Area.Factory.newInstance( );
rightArea.setName(rightAreaName);
rightArea.setClass(rightAreaClass);
Workspace workspace = appXml.getWorkspace( );
workspace.setLeftArea(leftArea);
workspace.setRightArea(rightArea);
appXml.setWorkspace(workspace);
app.save("C:\\app.xml");
```

Classes, Instances, Packages, and Dynamic Class Loading

The purpose of the Encryptor is executing the encryption logic to encrypt or decrypt the data. The Encryptor uses Dynamic class loading under Java to execute the algorithms specified in the ELD. Unlike SSL, or encryption using certificates, the embodiments may use an XML document to inform the dynamic class loading process for encryption during a secure session. The other methods do not use dynamic logic generated in this fashion, but use a static algorithm to encrypt the bytes.

In object oriented programming there are the concepts of classes, and instances of classes. A program, such as a program for encryption, may be expressed as a class. A class encapsulates a set of fields (or attributes) and the functions that are used to manipulate those fields. An instance of the class is a "copy" of the class where specific values are given to the fields of that class. For example, if we have the class "human", then some fields (attributes) can be "name," "age," "date of birth." So, an instance of "human" can be someone named "John Doe", "35" years old, "Feb. 29, 1977."

Classes must contain a special method called the "constructor." The constructor creates an instance of the class. In order to use a class in a program, an instance of that class must be created, and the usual way to do this is using the constructor. The syntax used in Java to instantiate a class is the following:

```
Class1 instance1 = new Class1( );
```

However, the Java programming language offers an alternative: the Dynamic Class Loader, and this is invoked in the embodiments. Some concepts need to be explained to understand Dynamic class loading: libraries, packages, classes and functions. Dynamic class loading, however, is not required to render the encryption functionality described herein. Conventional class loading also may be employed in encryption, but dynamic class loading presents certain advantages.

Functions

Functions are a set of instructions to modify the fields of the class, or to supply parameters given to the function. In Java this occurs in the same way that a mathematical function modifies its parameter and a result is obtained, for example, f(x)=x+2. This function modified the value of x by adding 2 to it, so if x=5, the result would be 7. A class contains a set functions used for the manipulation of the attributes of the class.

Class

A class is a construct that is used as a template to create objects of that class. It contains a set of attributes that defines the class, and also the functions used to modify the attributes. An object of a given class is called an instance of the class.

Package

A package is used to organize classes belonging to the same category or providing similar functionality. For example, if in a computer system we have classes for the graphical user interface, and for performing a special task, like reading hardware features, there would be two different packages:

```
com.system.gui
com.hardware.features
```

Library

A library is a collection of classes used to develop software (at design-time) and to execute the developed software (at run-time). A library is also called an Application Programmers Interface (API). In Java a library is stored in a Java Archive (JAR) file.

Java supports class instantiation using class loading. Where Class1 is class that is going to be instantiated, instance1 is the instance and new is the key word that indicates the program a new instance is going to be created.

Java offers a class named ClassLoader through which Java itself loads the classes:

```
Object instance = classLoader.loadClass("Class1");
``` where Object is a general Java class (all classes in Java extend this super class).

All classes can be loaded in this way. All the ClassLoader needs to know is the binary name of the class (the package of the class and the class' name). For example, if there is a class name MyClass, that's contained in the package com.myclasses.classes, the binary name would be
com.myclasses.classes.MyClass Also, the class must be included in the Java run-time Environment (JRE) class path, in order for the class to be found.

Another requirement is the parameters of the constructor, in the event they are needed. This kind of class loading is one of Java's greatest attributes because, thanks to the constructor, programs are very flexible and scalable, meeting these important goals in Object Oriented programming. Java's class loader provides the method that is used for the loading of classes, and this method is
ClassLoader.loadClass(String binaryName)

The method receives one parameter, binaryName, which corresponds to the binary name of the class, that is, the name of the class including the package it belongs to. Before the class can be loaded, the ClassLoader must know where it can find the class. Through the method
ClassLoader.addURL(String url)
the URL of the JAR file that contains the class is provided. This URL can correspond to the path of the Jar File, with the "jar:file:/" prefix. An example of a Jar File URL can be
"jar:file:/c:/Protector/resources/lib/EncryptionAlgorithms.jar"

After the class has been loaded an instance of that class can be created. This is done using another class Java provides, Constructor. By obtaining the Constructor of the loaded class, and the execution the method createInstance( ), of the Constructor class, the class is dynamically instantiated. So, the dynamic instantiation process consists of 3 steps, described in the following code:

```
Class classToLoad = ClassLoader.loadClass(className);
Constructor c = classToLoad.getConstructor(types);
Object classInstance = c.newInstance(args);
```

First, the class is loaded. Second, the Constructor is obtained from the loaded class. The Parameter types consists of an array of Class elements that define the data type of the constructor's parameters. The third step is the instantiation of the class. The args parameter corresponds to the actual values of the constructor's parameter.

Execution of Methods

The execution of a method in "normal" (that is, static) class instantiation, is the usual structured programming approach to function calling, and this is class.methodName(params. However, in the case of a dynamically loaded class, the Java's Class provides the method Class.getMethod(methodName, paramTypes. Through this method a Method object is obtained. (The Method class is a Java class in charge of manipulating the methods of a dynamically loaded class). The parameter methodName corresponds to the name of the method to be obtained, and the paramTypes is an array of Class instances. This class has the method Method.invokeMethod (instance, paramValues), where the parameter instance corresponds to the instance of the loaded class, and paramValues is an array of Objects that contain the actual values of the method's parameters. So the execution of a method consists of two stages:

```
Method method = classInstance.getClass( ).getMethod(name, paramTypes);
Object result = method.invoke(classInstance, params);
```

XML Based Dynamic Class Loader

The proprietary dynamic class loader class of the embodiments results in the encapsulation of these different steps, through an integrated mechanism that facilitates the class loading and the execution of the methods. This is how encryption is automated as a background task. Under the embodiments the proprietary Dynamic Class Loader is built upon Java's ClassLoader class and, to put it in the vernacular of OOP, that Dynamic Class Loader is extended from Java's Class Loader. The method of the proprietary Dynamic Class Loader of the embodiments in charge of instantiating a class is the following:

```
public Object createInstance(Class[ ] types, Object
args[ ])
{
    Class classToLoad = ClassLoader.loadClass(className);
    Constructor c = classToLoad.getConstructor(types);
    Object classInstance = c.newInstance(args);
    return classInstance;
}
```

The next block shows the code that executes a method:

```
public Object invokeMethod(String name, Class[ ] paramTypes,
Object[ ]                                             params)
{
    Method method = classInstance.getClass( ).getMethod(name,
paramTypes);
    Object result = method.invoke(classInstance, params);
    return resut;
}
```

Dynamic class loading combined with XML, per the embodiments, is very powerful. XML is used as a configuration file from which a Java program reads the information about the classes that are going to be loaded (the parameters of the constructors, names of methods to be executed, parameters of those methods, etc.)

For example, suppose we want to execute a program that consists of a main window that contains a menu bar, and has a "working space" where a tree and a wizard are displayed. These three different components must be dynamically loaded, and this may occur through the proprietary class loader of the embodiments.

The XML corresponds to the one previously shown. The Java code would look like this:

```
1.  xmlDoc = Application.parse("C:\\app.xml");
2.  JMenuBar menuBar = new JMenuBar( );
3.  Menu[ ]menuArray=xmlDoc.getMenuBar( ).getMenuArray( );
4.
5.  for(int i=0; i<menuArray.length; i++)
6.  {
7.      Menu menu = menuArray[i];
8.  DynamicClassLoader cl = new DynamicClassLoader
9.    Object objMenu = cl.createInstance( );
10.
11.     for(int j=0; j<menu.getItemArray( ).length; j++)
12.     {
13.       Item item = menu.getItemArray( )[j];
14.       Object objItem = cl.loadClass(item.getClass( ));
15.       cl.invokeMethod("add",objItem)
16.     }
17.      menuBar.add((JMenu)menu);
18. }
```

With this approach, if in a future version of the system when a new menu or module is to be added, that module is programmed separately from the main program. Only the XML that contains the information needs to be modified. If a whole new system must be built, the main class can be used, and the information about the modules changed is in the XML. This allows great scalability compared to the other approaches to encryption that rely on monolithic programming.

The Encryptor and the XML Meta-Files

A bridge between the XML configuration document and the Dynamic Class Loader links these processes. The Encryptor contains the Executor, and the Executor is the bridge. The purpose of the Executor is to use the XmlBeans object JAR file that was generated from the Schema to parse and manipulate the XML document, extracting the properties needed for the loading of classes and execution of methods, per FIG. 16.

Meta-files are known in other processes. In any given operating system, for example, meta-files are used for various purposes. The meta-files have a given a format, and the extension of the file in the file name corresponds to it. Some examples of file formats are .JPG, which is an image file format that corresponds to a format proposed by the Joint Photographic Experts Group, and the .PDF (that stands for Portable Document Format) developed by Adobe. File formats define a way to array the bytes the data the files store, and the formats provide a description that is used by programs to process the bytes. Normally, the format is divided into two parts: the header and the body. The header defines the way that the data in the body must be processed, and the body includes the actual contents of the file. In the embodiments this structured meta-file approach is used to effectuate automatic encryption as a background task.

XML offers a way to define file formats easily. A file format designed to store encrypted bytes is called an encryption meta-file. It wraps the bytes to be encrypted. The encryption meta-file is formed by two basic parts, as in any other such file, the header and the body.

The header of an encryption meta-file contains the information that is used to process the contents of the Body. This information is stored in "name-value" pairs, because each pair has a name used to identify it and a value, the actual value that is used in processing the meta-file. The name-value pairs may contain information concerning the algorithm used for encrypting the contents of the body (the actual file, the plaintext). For example, the name-value pairs of the encryption meta-file may contain an ELD. For security purposes that ELD may be encrypted, and this is accomplished through the Secondary ELD. The encryption meta-file may contain, among other things, the name of the Sender, in the case where the meta-file is sent by means of a chat or email client application. The meta-file format is flexible enough to use any type of name-value pairs. An IDE may be provided to allow the author of an application to use the embodiments to auto encrypt the output meta-files of the application that the author creates, and add such other name-value pairs as fit the particular purpose of the application, such as the automated processing of text files used in legal pleadings, for the purpose of online litigation.

The body is the part of the encryption meta-file that stores the "payload," that is, the actual file or message or email attachment to be encrypted or decrypted. It also contains the name of the original file and its extension. The payload is "wrapped."

In the embodiments an encryption meta-file has the capability of wrapping any type of file, such as those with the extensions previously mentioned, due to the fact that the bytes of the file (including its extension) are stored in the body. XML may be used to designate where these bytes are contained. An XML document must conform to a structure previously defined in an XML Schema, and an encryption meta-file is no exception. In one embodiment, the XML Schema of the encryption meta-file is as follows:

```
<?xml version="1.0" encoding="UTF-8"?>
<xs:schema xmlns:xs="http://www.w3.org/2001/XMLSchema"
elementFormDefault="qualified">
<xs:complexType name="File">
  <xs:sequence>
```

```
        <xs:element name="Header" type="Header"/>
        <xs:element name="Body" type="Body"/>
    </xs:sequence>
</xs:complexType>
<xs:complexType name="Header">
    <xs:sequence>
        <xs:element name="Pair" type="Pair" minOccurs="0"
                                        maxOccurs="unbounded"/>
    </xs:sequence>
</xs:complexType>
<xs:complexType name="Pair">
    <xs:attribute name="Name" type="xs:string"/>
    <xs:attribute name="Value" type="xs:base64Binary"/>
</xs:complexType>
<xs:complexType name="Body">
    <xs:sequence>
        <xs:element name="bytes" type="xs:base64Binary"/>
    </xs:sequence>
    <xs:attribute name="Name" type="xs:string"/>
    <xs:attribute name="Ext" type="xs:string"/>
</xs:complexType>
``` schema corresponds to the Header of the meta-file. It is formed by an array of Pairs (the name-value pairs).

The next complex type shown above corresponds to the Pair (name-value pair). It is formed by two attributes, the name, which, in a document based on this schema, i.e. a meta-file, corresponds to a descriptive name; and the value, which is going to store the bytes of the actual value. Bytes are used for the values, not characters. The value can be a string, an integer, etc. By using bytes instead of characters the data type of the value does not matter, so this gives the approach flexibility and scalability.

The next complex type is used to store the payload, the plain-text. It is formed by an array of bytes, which stores the bytes of the payload and two attributes, corresponding to the name and the extension of the file that is wrapped.

The last complex type corresponds to the main tag of the document, the one that encloses all of the previous tags. An example of an encryption meta-file is as follows.

```
<?xml version="1.0" encoding="UTF-8"?>
<xFile>
    <File>
        <Header>
            <Pair Name="SENDER_EMAIL"
Value="bGNjX2NoZWlhQGhvdGlhaWwuY29t"/>
            <Pair Name="ELD"
                Value="/03vyP9N70HvQ+9HkMf/zu9G/0j/T+9A70eQxu/A70vvwu/D"/>
        </Header>
        <Body Name="MyDocument" Ext="docx">
<bytes>/8zvRZDJgMWAxO9IsEeAS4DIkE2Ax4BEgEuQwu/L70rvxO9D78vvSLDOgM
WwQ4BHgEmAQYBLsM//T5DAkEKQQZDJ78rvTO/L70X/zP/F/8fvQoBMkMmAToDHgMn
/zf/K70X/Qe/FkMiAx4DEgM6QQ/9H/8z/QP/H/8yQRLDOgEWwwYBKgED/zf/K70X/
Qf9O/0D/TZDCgMiwxIDDXMOQxIDLgEeAzpDC78uQS5BKkEqQyJDOgEHvTIBAkEaQy
5BBkEqQSe/KkM6ARIBFgEOAzpDC78uQRu/CgEeAxIBJgMeQS4BIgEWAxZDJgEawyO
JkECQRpBDkE//Te9NgEbvwoBOkEKQQZDLgMuAQYDEkMiQwJBAkECAToBHgEXvy+/O
kMqQQ+/AkE2QRpDIgMeASYDFkECARu/CgE6Qx5BM78CQS4DJgEGAQoBLkMeQSpDIs
M+QQYDBkMmQw+9JkMewSpBJkE6QSu/BgMaASYDHkEPvRpBAgEWQx5BPgMDvwoDN70
yQwJBDkEeAy5DBgEOQQIDOkMGAyoBPgEKwwZBDkMH/SZDEsErvSYBJgMqQyf9NkMa
AQZBAgMeQRZBGkMmQS4DJkMOQzpDIkMbvz5BPgEGQQ5BMkMuQw/9JkMSwxP/O70+Q
y5DDgESAz4DEkEqAQoBLkMeQSpDI70yQQ4BBXMiAQ4BKgMSASZBEkEaQQ+/DgMSQQ
IDBkMeQS5DCkMCQQYDPgEeAR4DGkE2ASZBAkMbvzJBBgM2QwpDGgEXvQbBOkMGwQv
9MkEaAxZBHgM6QwYBLkMPvw5DHkEGAQJDA78uAQJBFkM/vRoBLkEqATpBEgM6QQZD
JgMiASJBOkMuQT+9N78yAx4DEgEaQQJDJ70OARLBJkECQSP9IkMeARu/GgECQwYBA
kMCQQZBBgMSASZBAkEaQQ5BP/03vTYBG78KATpDAkE7vz4BBkE3/TZDIgMKQypDBk
EeAwZDBgE//zf/PkEGAxO9M70aAwe9MgMqASJDEgMmQRbBBkECQyJBF/0yAxpBIgM
aQzYDIgEGQSYDL70mQSf9MgEWQwpDBgEXvz5DJ/0yQRpBC70yQwJDHgMaQwoDEkMG
QwYBBkEPvSJDLkECQQpDEsM+QwYBMkMiAwIDIkMeAxv9JkE6Ax5BAkECAyJBBgMiQ
zoBE78Pvz5BEgMaAxJDEkEGOQIDEkEGwQZDAgE/vSIDHkMSQTZBGkMWAQ4BAkMuAS
JDEgMmQRe/HkMfvQ4DGgEqQzJBAkMiAx4DIgMfvRoBLkEqATpBEgM6QwpDJ78yQSL
BCkEOQT4DEkECwz+/CkE/vzZDI/0nvRoBBgEeAzZBN70yQwO9GkMLvy+9N/8z/xf/
H/8TvxP/M702QwYDJgEWATrDOgMPvyv9G/0T/Qe9CkMuQyYBOgMeAyf/N/8rvRf/M
702QyZBOgEGASrDO/80=</bytes>
        </Body>
    </File>
</xFile>
```

```
<xs:element name="xFile">
    <xs:complexType>
        <xs:sequence>
            <xs:element name="File" type="File"/>
        </xs:sequence>
    </xs:complexType>
</xs:element>
</xs:schema>
```

The first complex type, File, is the tag that represents the meta-file in the document. As can be seen, it is formed by two elements, Header and Body. The second complex type in the This is a meta-file sent as an encrypted attachment to an email, using the embodiments. The header contains the email address of the sender and the ELD that was used for encrypting the body. The body stores the encrypted bytes of a MS Word document file, named MyDocument.docx, which was encrypted using that ELD.

Database Management System

The Switch and the client applications containing the Encryptor may use database management systems. A database is an integrated collection of data records, files, and other objects. A database management system (DBMS) is a software package that allows the creation, maintenance, and use of a database. A DBMS allows different user application programs to concurrently access the same data. Most DBMS's design databases by means of tables. A table can be seen as a matrix where the columns correspond to the fields of the database, and the rows correspond to the records stored within the database. An example of a table is the following:

| Data Table | | | |
|---|---|---|---|
| ID | Name | Address | Phone |
| 001 | John Doe | 13$^{th}$ Street | 111222333 |

As in the above example, a table can be considered a Matrix. DBMS's may use a variety of database models, such as the relational model or object model, to describe and support applications.

A database can be seen as a collection of tables. In the relational model all of the tables are related (hence the name) by a key field. Such a database typically supports query languages, such as Structured Query Language. These are high-level programming languages that considerably simplify writing database application programs. Database languages simplify the database organization, as well as retrieving and presenting information from it. The embodiments use multiple DBMS's and SQL, and may use SQL Lite™.

A Programming System for Default Encryption

Examples of this technique are the encryption applications of the embodiments, which are dynamically created by an XML schema containing the description of the classes that contain the encryption functionality. For example, the Switch can use this XML-based technique to auto generate the client Encryptor application, individuating the features of the application for each user. The XML technique can be used for other purposes, and one of them is the execution of the Encryption Logic. In this case the specification of the algorithms in the dynamic class loading is contained within the ELD. When Composite ELD's are used they are generated by a Switch that randomly selects algorithms from a set expressed in an XML document called the Global Set. The XML of the Global Set may resemble this:

```
<Encryption>
    <Algorithms>
        <Algorithm
   class="veridicom.EncryptionAlgorithms"
            EncryptionMethod="OffsetEncryption"
            DecryptionMethod="OffsetDecryption">
            <param type="String" textToEncrypt="true"
                random="false"
                useSameValueToDecrypt="false"/>
            <param type="int" textToEncrypt="false"
                random="true"
                useSameValueToDecrypt="true"/>
        </Algorithm>
        <Algorithm
   class="veridicom.EncryptionAlgorithms"
            EncryptionMethod="BitshiftEncryption"
            DecryptionMethod="BitshiftEncryption">
            <param type="String" textToEncrypt="true"
                random="false"
                useSameValueToDecrypt="false"/>
        </Algorithm>
        <Algorithm
   class="veridicom.EncryptionAlgorithms"
            EncryptionMethod="KeyEncryption"
            DecryptionMethod="KeyEncryption">
            <param type="String" textToEncrypt="false"
                random="false"
                useSameValueToDecrypt="true"/>
            <param type="String" textToEncrypt="true"
                random="false"
                useSameValueToDecrypt="true"/>
            <param type="boolean" textToEncrypt="false"
                random="false"
                useSameValueToDecrypt="false"/>
        </Algorithm>
    </Algorithms>
</Encryption>
```

In some embodiments, the XML of the Global Set must store the following information for each algorithm within it:

a. The class that contains the function that implements the algorithm;

b. The name of the function that implements the algorithm;

c. Information about the parameters of the function,

The XML Schema of the Global Set may resemble this:

```
<xs:complexType name="Algorithm">
    <xs:sequence>
        <xs:element name="param" type="Param" minOccurs="0"
        maxOccurs="unbounded"/>
    </xs:sequence>
    <xs:attribute name="class" type="xs:string"/>
    <xs:attribute name="EncryptionMethod"
                                        type="xs:string"/>
    <xs:attribute name="DecryptionMethod"
                                        type="xs:string"/>
    <xs:attribute name="Name" type="xs:string"/>
    <xs:attribute name="Description" type="xs:string"/>
</xs:complexType>
<xs:complexType name="Param">
    <xs:sequence>
        <xs:element name="stringParamValue"
type="xs:string"/>
        <xs:element name="intParamValue"
type="xs:integer"/>
        <xs:element name="byteParamValue" type="xs:byte"/>
        <xs:element name="boolParamValue"
                                        type="xs:boolean"/>
        <xs:element name="floatParamValue"
type="xs:float"/>
        <xs:element name="doubleParamValue"
                                        type="xs:double"/>
```

```
        <xs:element name="decryptStringParamValue"
                                        type="xs:string"/>
        <xs:element name="decryptIntParamValue"
                                        type="xs:integer"/>
        <xs:element name="decryptByteParamValue"
type="xs:byte"/>
        <xs:element name="decryptBoolParamValue"
                                        type="xs:boolean"/>
        <xs:element name="decryptFloatParamValue"
type="xs:float"/>
        <xs:element name="decryptDoubleParamValue"
type="xs:double"/>
      </xs:sequence>
    <xs:attribute name="type" type="xs:string"/>
    <xs:attribute name="textToEncrypt"
type="xs:boolean"/>
```

An example of the XML of an ELD that was generated from the Global Set is the following:

```
<Encryption>
  <Algorithms>
    <Algorithm class="veridicom.EncryptionAlgorithms"
               EncryptionMethod="OffsetEncryption"
               DecryptionMethod="OffsetDecryption">
      <param type="String" textToEncrypt="true"
             random="false"
useSameValueToDecrypt="false"/>
      <param type="int" textToEncrypt="false"
random="true"
useSameValueToDecrypt="true"/>
    </Algorithm>
    <Algorithm class="veridicom.EncryptionAlgorithms"
               EncryptionMethod="BitshiftEncryption"
               DecryptionMethod="BitshiftEncryption">
      <param type="String" textToEncrypt="true"
             random="false"
useSameValueToDecrypt="false"/>
    </Algorithm>
    <Algorithm class="veridicom.EncryptionAlgorithms"
               EncryptionMethod="KeyEncryption"
               DecryptionMethod="KeyEncryption">
      <param type="String" textToEncrypt="false"
             random="false"
useSameValueToDecrypt="true"/>
      <param type="String" textToEncrypt="true"
             random="false"
useSameValueToDecrypt="true"/>
      <param type="boolean" textToEncrypt="false"
             random="false"
useSameValueToDecrypt="false"/>
    </Algorithm>
```

This XML was generated by the Encryption Switch, so the parameters also have randomly generated values.

According to embodiments, some of the Encryption Algorithms that may be implemented are the following:

Offset Encryption

In accordance with embodiments, this is the simplest encryption algorithm. It applies a variation of the "Julius Caesar Cipher."

A string of text is encrypted by applying an offset he bytes of the data.

The Java code of this algorithm is as follows:

```
public byte[ ] OffsetEncryption(byte[ ] bytes, int offset)
{
  for(int i=0; i<bytes.length; i++)
```

```
    encryptedBytes[i] = bytes[i]+offset;
    return encryptedBytes;
}
```

The decryption is similar (instead of addition is the subtraction of the offset):

```
public byte[ ] OffsetDecryption(byte[ ] bytes, int offset)
{
  for(int i=0; i<bytes.length; i++)
    decryptedBytes[i] = bytes[i]-offset;
    return decryptedBytes;
}
```

Bit Shift Encryption

This type of algorithm performs a bitwise XOR operation on the bytes of the data and a given byte value, shifting the character's bits, and the code for encryption and decryption is:

```
public byte[ ] BitshiftEncryption(byte[ ] bytes, byte shift)
{
  for(int i=0;i<bytes.length;i++)
    encrypted_bytes[i] = bytes[i]^shift;
    return encrypted_bytes;
}
```

Key Encryption

This algorithm uses a key code in order to encrypt the bytes of the given data. The bytes of the key are added to the corresponding bytes of the data, that is, the byte in the $n^{th}$ position in the key is added to the byte of the data in the $n^{th}$ position. If the key is shorter than the data to be encrypted, when the byte in the last position of the key has been used, in order to encrypt the byte in the next position the first byte of the key is used.

```
public byte[ ] KeyEncryption(byte[ ] bytes, byte[ ] key)
{
  for(int i=0; i<bytes.length; i++, j++)
  {
    if (j>=bytes.length)
```

```
        j=0;
    encrypted_byte = bytes[i] + key[j];
    if (encrypted_byte > 255)
        encrypted_byte = encrypted_byte – 255;
    encrypted_bytes[i] = encrypted_byte;
    }
}
```

The decryption method is similar:

```
public byte[ ] KeyEncryption(byte[ ] bytes, byte[ ] key)
{
    for(int i=0; i<bytes.length; i++, j++)
    {
        if(j>=bytes.length)
            j=0;
        decrypted_byte = bytes[i] – key[j];
        if(decrypted_byte < 0)
            decrypted_byte += 256;
        decrypted_bytes[i] = decrypted_byte;
    }
}
```

According to embodiments, the Encryptor uses the encryption logic to encrypt a given body of plain-text, and the logic may contain a list of the algorithms that must be executed. The way the algorithms are executed is the following. The encryption algorithms selected from the Library are applied to the data consecutively, that is, the first algorithm ($EA_1$) that is going to encrypt the original data, called Plain Text (PT) and an encrypted data is going to be obtained ($E_1$). Then, the Second algorithm is applied on $E_1$, and another encrypted data set is obtained, $E_2$, etc. until $E_n$ (where n is the number of algorithms used) is obtained.

According to embodiments, in the case of the decryption of the data, the reverse procedure is performed, that is, the first algorithm to be executed on the encrypted data $E_n$ must be $EA_n$, in order to obtain $E_{n-1}$, and so forth, until $EA_1$ is executed, and PT is obtained.

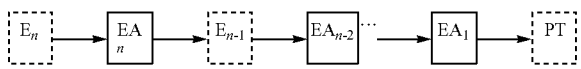

According to embodiments, in the case of the decryption of the data the reverse procedure may be performed, that is, the first algorithm to be executed on the encrypted data $E_n$ must be $Ea_m$, in order to obtain $E_{n-1}$, and so forth, until $EA_1$ is executed, and PT is obtained.

Here an example of the encryption of a string using the encryption logic presented in the previous section. Suppose the string to be encrypted is: Hello World! The Encryption algorithms work directly with the bytes of the data, so the array of bytes of the given string is:

72 101 108 108 111 32 87 111 114 108 100 33
H E L L O _ W O R L D!

The first encryption algorithm to be executed is OffsetEncryption, with the value of 10.

The resulting bytes after encryption are: 82 111 118 118 121 42 97 121 124 118 110 43 Observe that the offset value was added to the byte, for example, the first byte (72) was encrypted to 82. The resulting string is: Rove*aylvn+

The second encryption algorithm, BitshiftEncryption with a shift value of 25, is applied on the bytes obtained in the previous step (from the first algorithm). The obtained bytes are:

75 118 111 111 96 51 120 96 101 111 119 50

The String corresponding to these bytes is: Kvoo'3x'eow2.

The last algorithm, KeyEncryption, with the key "publickey" is used, and the bytes obtained are:

-64 -40 -37 -40 -61 -98 -35 -39 -43 -28 -39 -98

The String corresponding to these bytes cannot be displayed, since the bytes of "visible" characters do not have negative values.

The Encryption Abstraction Layer and the Protector-Receiver Architecture

Protector-Receiver, one of the embodiments for default encryption as a background task given effect through dynamic class loading, is an architecture that illustrates the scalability that the abstraction layer approach to encryption affords. It allows the encryption logic-build process to proceed as a series of steps that occur in a programmable sequence across a network of trusted users. The build process is a cascade, like a row of falling dominoes. In the Protector-Receiver architecture a professional is able to communicate with his clients through a virtual private logic tunnel provided to each of them. The tunnel is generated automatically, as a background task, by this cascade-like process. The ELD's used in the logic-build process are cascaded from the Switch to the Protector, and then from each Protector to its Receivers.

A different method from the embodiments is to securely connect computers by causing a central server to transmit private keys or public keys to a pair of computers to engage in encrypted communication. In the embodiments, in contrast, the central server that transmits public or private keys is eliminated. The applications at the edge contain everything needed to execute the encryption tunnel, with no involvement by the central server in encryption execution. Moreover, unlike the other methods using public keys, private keys, or certificates, when ELD's are employed the ELD used to execute the encryption of the plaintext may be encrypted by a Secondary ELD. The Protector-Receiver architecture uses this approach.

This secondary encryption technique is not used in the other, monolithic methods, such as with SSL, certificates, private keys, or public keys. Furthermore, with the embodiments as opposed to the other methods, there is no need to transmit a public key or certificate from one user to another. The reason for this is the fact that the authenticating, secondary logic in this architecture is already in the possession of the communicating parties at the time of the data transmission. The Secondary ELD may be provisioned on the local computer in advance of its use and by an orthogonal process. Provisioning the Secondary ELD may involve the creation of the private logic tunnel when contact between two computers is initiated for the first time, and this occurs as a background task. This is a prior procedure, so that at the moment of transmission the computers already have the data they need to execute the encryption, without any keys or certificates transmitted from any device in the middle. This feature cuts the central server out of the process at runtime: the computers at the edge are logically self-sufficient.

With Protector-Receiver it is possible to break the process down into steps, because the generation of the encryption logic is a process distinct from the execution of the logic.

Therefore, the overall procedure can be described as "define and execute." The entire process is dynamic. The Protector-Receiver architecture exemplifies the Encryption Abstraction Layer approach as a process invoking the two independent sub-processes insofar as the encryption logic is concerned: the logic prep step and the logic execution step. This, too, is different from encryption brought about by SSL, certificates, public keys and private keys, as these techniques do not divide encryption into these independent processes for each instance of encryption. The process of the embodiments may be seen as the following:

Generate Logic→Execute Logic→Output: Auto encrypted or Auto decrypted Bytes

The Encryption Abstraction Layer Process

Figure 18:
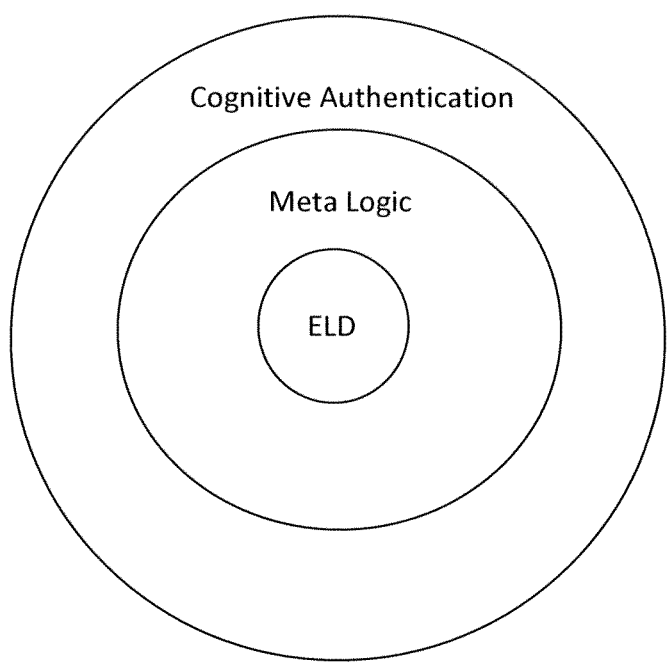
FIG. 18 Orthogonality through Three Independent Encryption Logic Layers . . .

According to this dual-layer approach, each step is a necessary one for encryption or decryption to occur, but neither step by itself is sufficient. This fact enhances security. Protector-Receiver evinces maximum orthogonality. There is a spectrum of at least three individuated encryption logic layers in the Protector-Receiver architecture (even four layers, in one advanced version explained below). Each layer is generated separately, and each is executed separately as well. This means that hacking the system would require a simultaneous attack at multiple points, at each logic layer in the spectrum. A hacker would confront the challenging of compromising each logic layer individually in order to breach the system. And hacking becomes even more daunting when one considers that the encryption logic used at two of the three layers is auto generated by an encryption logic engine (ELF), which allows the logic to be used only once and discarded. FIG. 18 is a diagram showing the three layers—Cognitive Signature authentication, meta-logic, and the ELD.

Encryption by OOP makes possible encryption via the inter-operation of the Switch and the Encryptors in a process that can be described as "Dynamic Encryption." Instead of using static algorithms as in other processes employing monolithic programming, the technique of Dynamic Encryption uses OOP to dynamically create, install, and the session is over dispose of randomly created executable encryption logic that is generated on the Switch. The encryption logic is an object. By this means a unique encryption logic created ad hoc, a composition, is shared as a mirrored pair of executables on the Encryptors whenever the two devices communicate. With Protector-Receiver this happens as a background task, in an automated process, so that the logic is replaced the next time encryption takes place. Each instance of the logic is an encryption logic session object.

The Different Embodiments of Encryption by Default

The embodiments may include virtual private networks (VPN's), with user authentication and encryption taking place via the orthogonal processes described, and the messages and files going back and forth on the network are protected by encryption that happens by default. The Protector-Receiver Network is one such embodiment, and it is designed to work with minimal online connectivity required in the client applications. The task of sending the ELD's out from the Protector application to the Receiver application is handled by data in the encrypted files themselves, instead of in a separate process occurring through a port.

The Protector-Receiver Network is an example of an Encryption Abstraction Layer. The two process approach is used, and encryption logic generation happens independently from encryption logic execution. Because the creation of the encryption logic is separated from the execution, the desktop applications execute encryption by consuming the encryption logic, but they do not produce that logic. This means that there is nothing on the desktop application to reverse engineer to allow a hacker to divine the secret about how ELD's are created. To succeed the hacker would have to breach the application and the remotely located Switch as well.

The meta-file that constitutes the encrypted output of the application is commandeered as a "values bucket" to transport the descriptors, the ELD's, from one computer to the next. This occurs as a background task, so the user is not aware of it. The email approach of Protector-Receiver is one way of bringing about Encryption by Default through an abstraction layer, but this is not limitative. Chat, for example, may also be used.

When the port approach it used to trigger automatic encryption as a background task it may be seen that the process of detecting that a file is to be sent can take place at the commencement of message transmission by a browser, such as through a port monitor. An alternative form of detecting that a file is to be sent can take place at the file system, and this is the technique in Protector-Receiver.

When an application takes control of a file in order to transmit it across a network, implications concerning the file that are relevant to whether encryption by default is to occur, may be inferred by examining the nature of the file itself. This may take the form in some embodiments of taking advantage of the fact that that an operating system such as Windows™, for instance, contains a registry. This is an index that automates the process of associating a file with its application. For example, the MS Word™ software application utilizes files designated with the .doc extension, the Adobe Acrobat™ application uses files that express the portable document format, .pdf., and the Registry records these associations.

When the MS Word application seizes a .doc file different user objectives are implied in contrast to when a browser seizes a .doc file. When the browser seizes such a file it reasonably may be inferred that the purpose is to transmit it across a network. This circumstance implies that encryption should occur in order to enhance security, so the file is encrypted as a background task. But when a word processor takes control of a file, it may be assumed that the purpose is to write to the file or read it rather than to transmit it, so the file in this case is not auto encrypted. This may vary per user settings, and per embodiments. The use of file extensions and the Windows™ Registry is one example of how an OS can regulate the process of encryption by default.

When the Registry identifies the file as .pdf, for instance, and the browser takes the file and the process of encryption by default is triggered according to the settings on the encryption application. For the purpose of detection, a default Encryptor may make use of a middleware application that invokes the Windows™ Registry (or a similar file association index under other operating systems) in order to assume the circumstances of use, and on that basis imply when a file should be encrypted by default. The middleware operates as a trigger so that with the right kind of file the automatic steps occur. The middleware will find, seize, and reroute the files that fit the targeted profile to the Encryptor, making use of Switch reachable on the network to furnish an ELD, so that when the meta-file reaches the Encryptor the bytes are encrypted per the logic that each ELD provides. The encrypted meta-file reaches the recipient, running the same application, and it is auto decrypted using the same approach.

The Switch in an alternative embodiment is locally available as part of the client application installed on the personal computer. Peer-to-Peer default encryption applications may each contain a Switch, and a state controller on the peer allows the application to execute the Switch function when it is supposed to do that, with threads for prioritization. In any of these embodiments receipt of the ELD and its insertion into the meta-file is incorporated into the automatic process, as well as its later execution by default, and the file association function of the Registry may trigger these events.

The process is not limited to ELD's that are used on text. Encryption for digital images may be triggered by invoking the Registry. For example, if a document has been created by a word processing program, the middleware can add a digital image of the person's signature at the end of the plain-text, through functionality added to a conventional word processor. If the file is associated with MS Word™ a template may provide the insertion point for the digital image of the handwriting signature, and the bytes of the image file are decrypted to render the signature image visible, using class loading.

In one embodiment the ELD operates so that only after authentication by a Secondary ELD does the digital signature image become visible at the pre-defined point of insertion. The authentication process may consist of one trusted computer looking up the Secondary ELD that corresponds to the other trusted computer, and then, using that Secondary ELD to decrypt the digital image file expressing the handwritten signature of the other trusted user. In this way the digital image signature file may be decrypted upon authentication, so that when the document is decrypted the signature image file appears visibly on the signature line as a palpable assurance of the authenticity of the document, the true mark of the author. (The signature is authenticated because only that recipient possesses and uses the particular Secondary ELD that the communicating computers have installed in the Trust DBMS of each).

In a similar embodiment, one ELD is used to encrypt the text of the document and another to encrypt the digital image of the signature. A meta-file containing both encrypted files is transmitted from User A to User B, and a Secondary ELD unique unto them is used to encrypt both the Plain-Text ELD that encrypted the payload and the digital signature image ELD.

According to embodiments, the middleware may contain an index to order the encryption process, allowing selective encryption by default. For example, if a word processor retrieves a .doc file, in light of settings in a middleware program that are in its index, default encryption is not invoked because the architect has decided that the .doc extension should not operate as a trigger to encryption by default. When a browser encounters the file, on the other hand, encryption is triggered. In this way, files may be encrypted automatically before the browser transmits them, and likewise, encrypted files when received may be rerouted to automatic decryption according to the assumed use of the file.

For the purposes of the embodiments it is to be understood that the term "Encryptor" encompasses both encryption and decryption. The encryption executable is the same, but the difference is that in encryption it runs in forward and in decryption in reverse, as explained above. When the Encryptor is thought of as a membrane, as a filter, when the function changes from encryption to decryption the sides swap so that input side becomes the output side, and vice versa.

The following code executes the encryption. Note how the output of one algorithm is the input of the next algorithm:

```
1. public byte[ ] encrypt(byte[ ] bytes)
2. {
3.   Object encryptedText = null;
4.   boolean plainTextEncrypted = false;
5.   String jarPath = xmlDoc.getEncryption( ).getJarPath( );
6.   Algorithm[ ] algorithms =
xmlDoc.getEncryption( ).getAlgorithmArray( );
7.   for(int i=0; i<algorithms.length; i++)
8.   {
9.     String binaryName = algorithms[i].getClassName( );
10.    String method = algorithms[i].getEncryptionMethod( );
11.    Param [ ] params = algorithms[i].getParamArray( );
12.    Class[ ] types = new Class[params.length];
13.    Object[ ] values = new Object[params.length];
14.    for(int j = 0; j<params.length; j++)
15.    {
16.      String type = params[j].getType( );
17.      types[j] = getParamClass(type);
18.      Object paramValue = null;
19.      if(type.equals("bytearray"))
20.      {
21.        if(params[j].isPlainText( ))
22.        {
23.          if(!plainTextEncrypted)
24.          {
25.            paramValue = bytes;
26.            plainTextEncrypted = true;
27.          }
28.          else      paramValue = encryptedText;
29.        }
30.        else paramValue = params[j].getByteArrayParamValue( );
31.      }
32.      else if(type.equals("String"))
33.        paramValue = params[j].getStringParamValue( );
34.      else if(type.equals("boolean"))
35.        paramValue = params[j].getBoolParamValue( )
36.      else if(type.equals("int"))
37.        paramValue = new params[j].getIntParamValue( );
38.      else if(type.equals("float"))
39.        paramValue = params[j].getFloatParamValue( );
40.    }
41.    values[j] = paramValue;
42.  }
43.  URL[ ] urls = {jarPath};
44.  DynamicClassLoader dcl = new DynamicClassLoader(urls);
45.  dcl.setClassName(binaryName);
46.  dcl.createInstance( );
47.  encryptedText = dcl.invokeMethod(method, types, values);
48. }
49. }
50. return (byte[ ])encryptedText;
51. }
```

This code presupposes that the parsing of the ELD and the processing of the XmlBean object, xmlDoc in the code, has been successful. The path of the JAR file that contains the algorithms is obtained in line 5. The description of the algorithms is obtained on line 6. Lines 7-42 processes the data of the algorithms.

The name of the class to be loaded is obtained in line 9, the name of the method to be executed is obtained in line 10, and the array that contains the algorithm descriptions and values of the parameters of the method to be executed is obtained in line 11. Lines 14-40 obtain the data type of the parameters, and also the value according to the data type. The plain text to be encrypted is always a byte array, so when the type of the parameter is bytearray it must be checked if the PlainText flag is turned on (see line 21). If the current parameter is a byte array, it is determined whether the plain text has already been encrypted, meaning a previous algorithm has been executed. In this case the value of the current parameter is the encrypted plain-text, as can be seen in lines 23-27.

The encryption algorithm is executed in lines 43-47. The Dynamic Class Loader is instantiated in line 44. The name of the class to be loaded is set on line 45, and the class is loaded and an instance is created in line 46. The method is executed in line 47, and the encrypted bytes are obtained. This process is repeated with the rest of the algorithms in the series. The result corresponds to the output bytes of the last algorithm executed.

The decryption process is similar, with the exception that the first algorithm that is executed corresponds to the last one that was executed in the encryption process. The decryption code may be as follows:

```
 1.  public byte[ ] decrypt(byte[ ] bytesToDecrypt)
 2.  {
 3.    Object decryptedText = null;
 4.    boolean plainTextDecrypted = false;
 5.    String jarPath = xmlDoc.getEncryption( ).getJarPath( );
 6.    Algorithm[ ] algorithms =
        xmlDoc.getEncryption( ).getAlgorithmArray( );
 7.    for(int i=0; i<algorithms.length-1; i++)
 8.    {
 9.      String binaryName = algorithms[i].getClassName( );
10.      String method = algorithms[i].getEncryptionMethod( );
11.      Param [ ] params = algorithms[i].getParamArray( );
12.      Class[ ] types = new Class[params.length];
13.      Object[ ] values = new Object[params.length];
14.      for(int j=0; j<params.length; j++)
15.      {
16.        String type = params[j].getType( );
17.        types[j] = getParamClass(type);
18.        Object paramValue = null;
19.        if(type.equals("bytearray"))
20.        {
21.          if(params[j].isPlainText( ))
22.          {
23.            if(!plainTextDecrypted)
24.            {
25.              paramValue = bytes;
26.              plainTextDecrypted = true;
27.            }
28.            else    paramValue = bytesToDecrypt;
29.          }
30.          else paramValue = params[j].getByteArrayParamValue( );
31.        }
32.        else if(type.equals("String"))
33.          paramValue = params[j].getStringParamValue( );
34.        else if(type.equals("boolean"))
35.          paramValue = params[j].getBoolParamValue( );
36.        else if(type.equals("int"))
37.          paramValue = new params[j].getIntParamValue( );
38.        else if(type.equals("float"))
39.          paramValue = params[j].getFloatParamValue( );
40.      }
41.      values[j] = paramValue;
42.  }
```

The decryption code is basically the same as the encryption code: it only changes in line 7, where the first algorithm to be executed is the last one in the array of algorithms. Also, the encrypted bytes array is assigned to paramValue object immediately when the first decryption algorithm is executed.

In some cases, identifying the files while they remain in the file system and seizing the proper one for default encryption as the first procedure that the files encounter when they leave permanent memory, is a good strategy. The files are at that point virgin material, as they have not yet been altered during the transmission process. This file-oriented approach stands in contrast to using a port monitor to identify, seize, and auto encrypt or auto decrypt the files.

The "virgin material" philosophy is a good one. A web service application such as Gmail can insert characters into a file to be transmitted, and this may interfere with auto encryption when the program relies on a port monitor. Therefore, using the file system in lieu of a port monitor to identify the files to be subjected to encryption by default, and re-routing the file to encryption at this early point, is a strategy that works under varying circumstances, and this is an unexpected result. This file-based approach is the technique used in the Protector-Receiver Network.

According to embodiments, the ELD expresses one encryption algorithm—or when a Composite ELD is used a combination of several—that is made available to the Encryptor. When several encryption algorithms are made available for the purpose of allowing one to be selected to use in a particular instance of encryption by default, the Switch can process the available set by creating combinations, permutations, and sequences, and then providing the variables or "parameters" that are inserted into each algorithm. Switching the logic around like this creates randomness in the encryption logic process, so the encryption is harder to hack. By deriving combinations, permutations, and sequences of constituent encryption algorithms into a composite, nearly infinite variation is possible in the encryption logic that is installed on the mirrored pair of Encryptors that encrypt the bytes during a communication session. The Switch creates this variation, and the Switch output in each instance is a unique ELD executed identically on the mirrored pair of Encryptors.

The parameters to be introduced into the Composite ELD are yet another nearly infinite dimension of randomness. The binary file to be encrypted, the plain-text, is simply another one of the parameters in the meta-file used in the dynamic class loading. The meta-file is the work unit of the process, a self-contained packet including everything required for automatic decryption upon receipt.

The random variation of the algorithms accomplished through the engine is analogous to changing the lock, and changing the parameters is changing the key. Because the embodiments described invoke two independent nearly infinite dimensions of randomness—variation in the keys and in the lock as well—cracking the encryption represents an extremely difficult challenge. The creation of a composite encryption executable—the selection of the elemental encryption algorithms as a set—may be governed by a master, combinatorial algorithm. This is contrast to SSL, public keys, and private keys: techniques in which the key changes but the algorithm remains constant. In the embodiments the master combinatorial algorithm may be expressed in a Java class.

Figure 19:
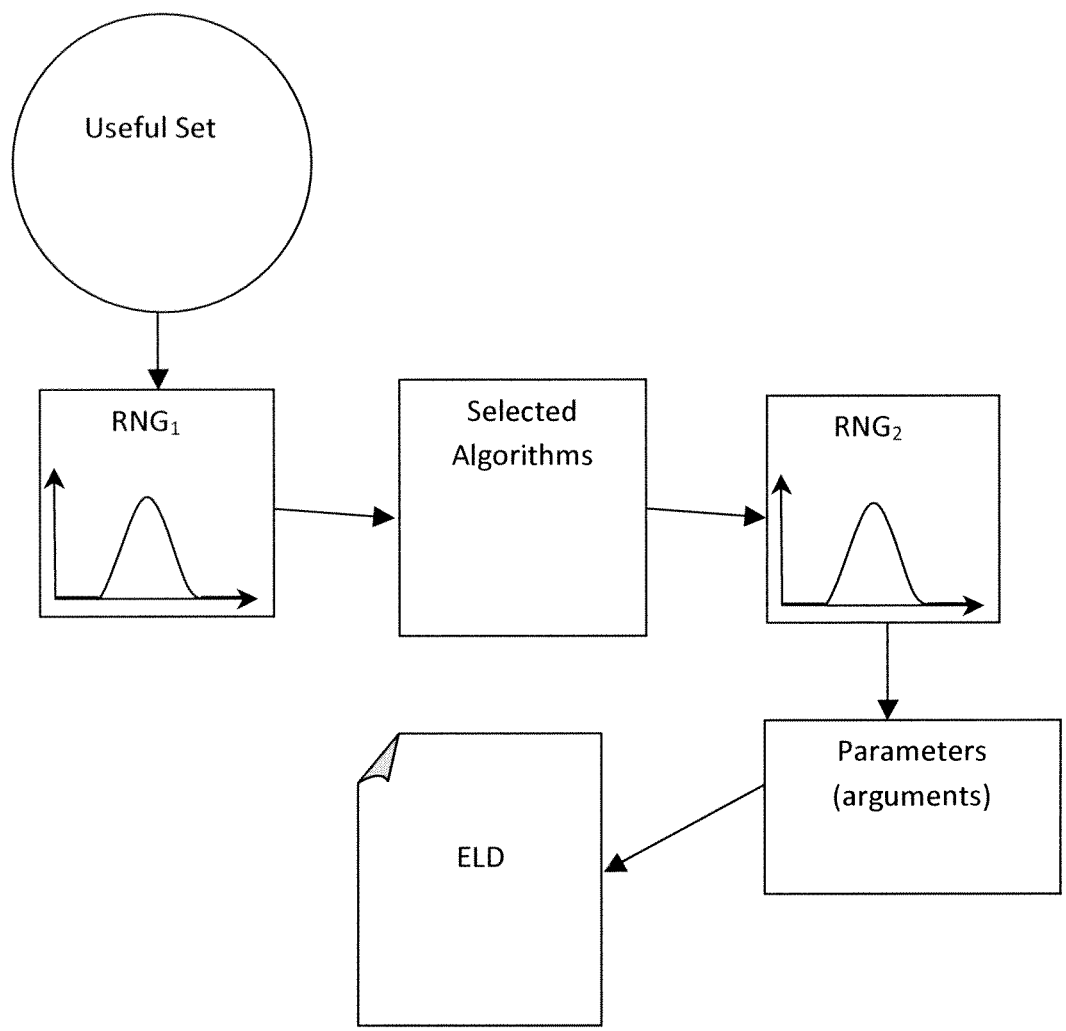
FIG. 19 Orthogonality through Two Independent Dimensions of Randomness . . .

FIG. 19 illustrates the two nearly infinite dimensions of randomness, and the embodiments use both dimensions. The diagram shows how RNG1 (depicted as a Gaussian curve) selects the algorithms from the Useful Set, and once the algorithms have been selected, a different RNG, named RNG2 performs the generation of the parameters of each one of the selected algorithms. The end of the process is the generation of the Composite ELD, invoking both randomness dimensions.

The process of creating the Composite ELD may occur on the Switch when the Switch contains an Encryption Logic Engine (ELE). An Encryption Switch is a logical processor that may in its fullest embodiment combine two functions, as it may both generate the ELD and execute it as well. In this full embodiment the Switch takes a file as an input and creates as an output the same file with the bytes encrypted, per the process that the descriptor generated on the Switch has specified. In the full embodiment an Encryption Switch may operate as a relay encrypting data between a sender and a recipient in a way that does not depend on a single encryption logic scheme. Each leg of the relay data transmission from the Switch may invoke a separate, single-use ELD. (This is the approach in the transmission of the Tertiary ELD, the technique described below when one Protector wishes to initiate trust with another. The Initiator module endows the Protector-Receiver Network with this capability, and Initiator uses the Switch in the full embodiment for this purpose). A Switch in the full embodiment, in a simpler version, may use two logic schemes that do not vary, one as the input and one as the output, but this provides less randomness. Instead of an ELD that is generated as a composite, randomness is supplied by a simple process of association. There may be a matrix that associates each pair of communicating computers with a pair of algorithms, one from the first computer to the Switch, and a second from the Switch to the other computer. The Switch orders the computer logic pairs in a DBMS so that the logic corresponding to each pair of computers is returned when those computers are looked up.

In contrast to the full embodiment for the Switch, in the reduced embodiment the Switch merely generates the ELD's but they are executed off the Switch, at other points of the network, such as a firewall, or on the client applications. The reduced embodiment of the Switch is more flexible from the standpoint of network design. It is merely generates the ELD, which in a later step is executed on another computer or device. This approach is more orthogonal.

The reduced embodiment architecture is a good anti-hacking strategy because only the Encryptor on the local application is exposed to the hacker, not the engine that generates the encryption logic. Hacking the Encryptor on one computer would not reveal how the ELD's are made. The reduced embodiment is more in keeping with the abstraction layer approach to encryption, because severing logic prep from logic execution affords maximum flexibility. In an Encryption Abstraction Layer the creation of the ELD's and the execution of them may occur at different points in a distributed network. Using a spectrum of several layers of encryption logic gives the system designer further richness to work with.

This multi-layer approach is used in Protector-Receiver. In this reduced embodiment implementation, the Switch dispatches ELD's to one or more points of execution off the Switch. But in one Protector-Receiver logic layer, the Initiator module, the full embodiment of the Switch is used in order to supplement the overall randomness of the network. When the Switch operates in the Initiator mode it both selects the ELD and executes it, in order to transmit the Tertiary ELD to the client applications in an encrypted relay process. In this case, what is being encrypted is another ELD instead of the plain-text, and that ELD is installed on the local applications there after to function as the dedicated Secondary ELD, providing authentication and encrypting the Plain-Text ELD. Thus, the Switch can be either in the reduced embodiment or in the full one, depending on which encryption logic layer in the spectrum of layers it controls, and both Switch embodiments may be combined in a single encryption network such as Protector Receiver.

In Protector-Receiver the ELD's are cascaded down from the Switch to the Protector in the first stage, and in the second stage cascaded down once again, from the Protector to the Receiver. Thanks to this cascade technique the Protector and the Receiver both receive and maintain a full supply of ELD's, the supply being stored on each application, and yet neither application contains the ELD logic engine which could educate a hacker about how to reverse engineer the ELD creation process.

Figure 20:
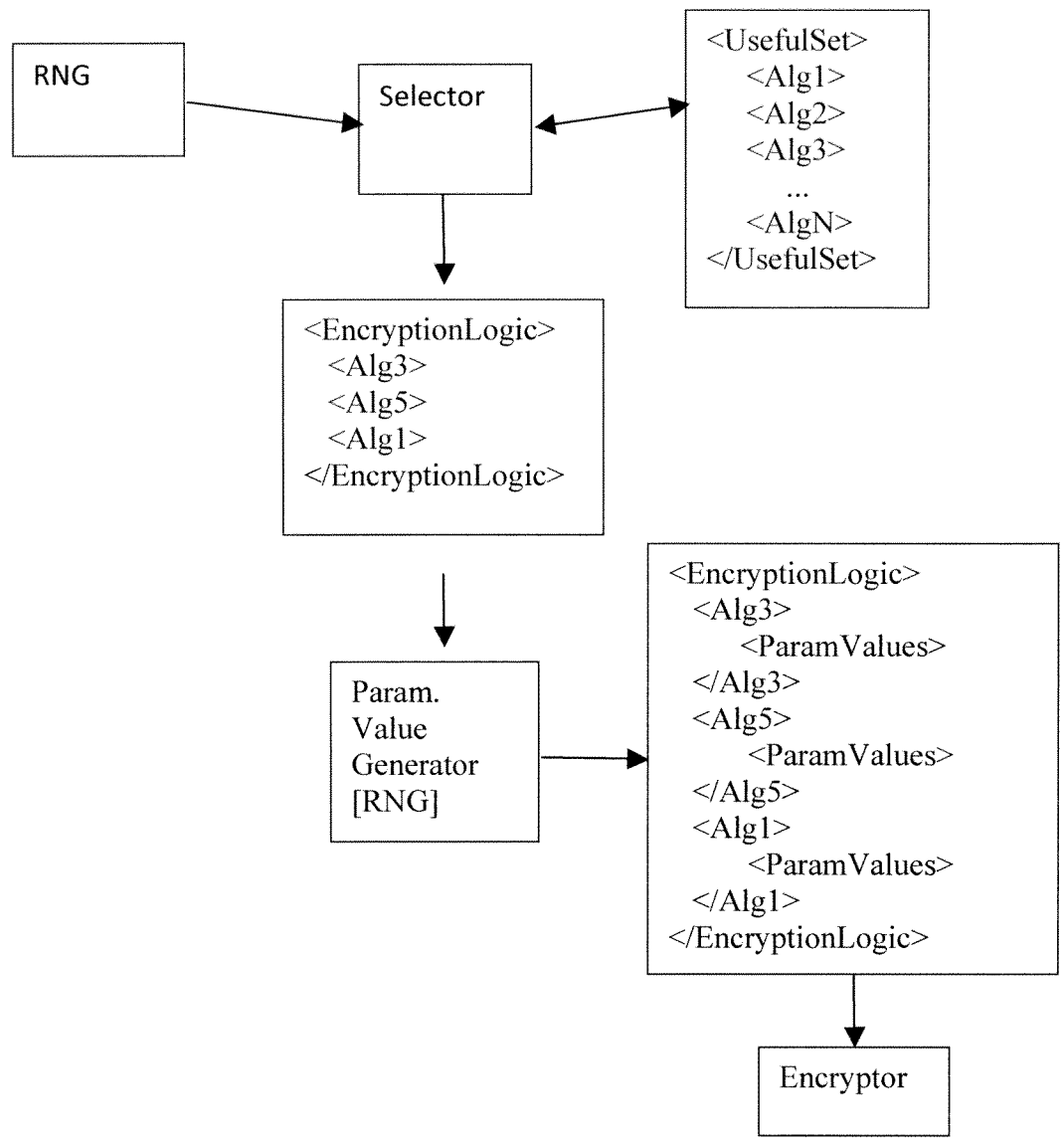
FIG. 20 Block Diagram: Encryption Logic Switch . . .

The first embodiment of the Switch is shown in FIG. 10, the reduced embodiment, as one can see that in the reduced embodiment there is no Encryptor. The second embodiment can be seen in FIG. 20, a block diagram. FIG. 20 depicts the full embodiment. Both the full embodiment of the Encryption Switch and the reduced embodiment implement the Encryption Abstraction Layer paradigm of encryption logic generation followed by logic execution. The difference is that in the full embodiment the logic generation and the execution happen on a single device; but in the reduced embodiment at least two devices are needed as the Switch only creates the logic and then dispatches it for execution to the second or third device. In chained encryption, execution involves multiple steps of re-encryption on a series of discrete devices.

The abstraction layer approach means, among other things, that the designer is free to implement a complex logic build process that only executes at run-time, using the techniques of OOP. This is in contrast to SSL and the other encryption methods, in which providing the static encryption logic and executing it occur in a monolithic process. But with the embodiments the ELD may be transported to its eventual place of execution in one step, only to be executed much later, in another step completely.

Figure 21:
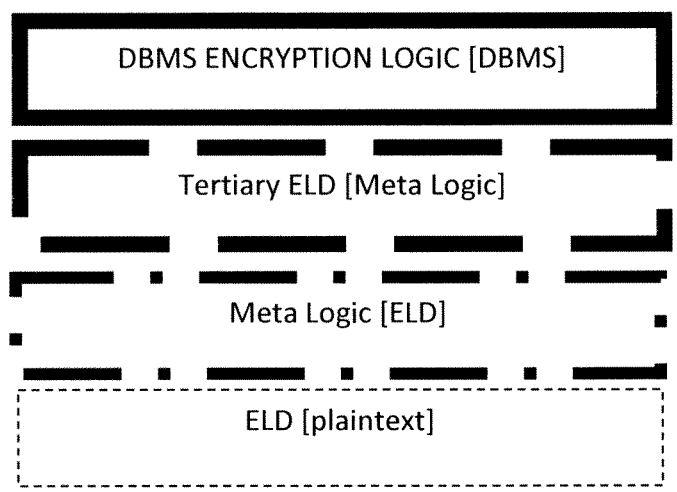
FIG. 21 System Using Four Encryption Logic Layers . . .
Figure 22:
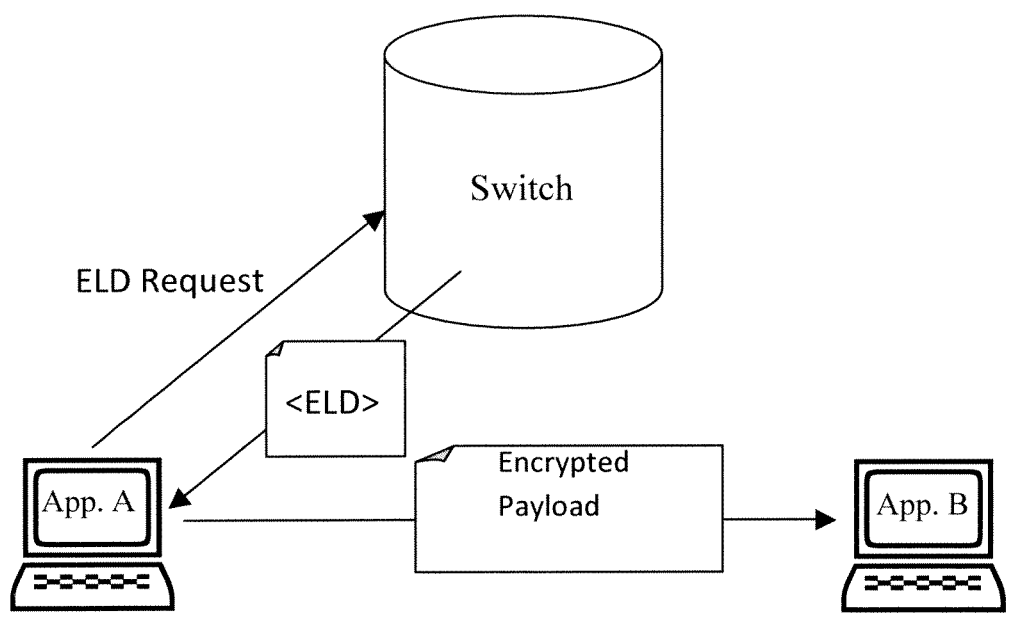
FIG. 22 How App. A requests ELD's and uses them to Communicate with B . . .

As one can see, the Encryption Abstraction Layer approach is not limited to the creation of a one-layer implementation of encryption abstraction. Multiple layers may be invoked, so that an encryption scheme may comprise a spectrum of individuated logic layers, with the logic used in each layer generated distally. For example, Protector-Receiver in one version involves four individuated layers of encryption logic: one to scramble the plain-text, one constituting meta-logic to encrypt the ELD's that are used to do that scrambling, the Initiator module that scrambles the latter ELD (the Secondary) in the process of provisioning it on the client computers, and a fourth layer for encrypting the trust DBMS that associates each Secondary ELD with the pair of users possessing the right to use it when they communicate. FIG. 21 illustrates the use of multiple layers of encryption logic, and in this case there are four logic layers.

To sum up, encryption construed as an abstraction layer is a differentiated process in which the preparation of the logic to be executed occurs first in a step that, because it is independent, can pass the logic downstream to trigger the execution of processes subject to algorithmic control that do not happen simultaneously. The implementation of encryption as an abstraction layer, susceptible to programmable and distributed routines, multiplies its power. It allows encryption to occur in layers, branches, and loops, and in a spectrum of orthogonal logic layers.

Exoneration Encryption

Dividing the processes of encryption logic creation and encryption logic execution per the abstraction layer concept presents another advantage over other encryption processes. According to embodiments, in the reduced Switch configuration there may be no need for a centralized server that ever touches the plain-text. This is in contrast to encryption techniques using a central server, such as a chat server, that receives the plain-text sent from one communicating computer to the other, and becomes involved in the encryption process. This is a significant advance for user privacy because it allows encryption to be supplied to the user as a service, and the provider of the service never possesses the confidential data, and therefore cannot steal it.

In contrast to other processes, with the reduced Switch embodiment the server only provides the encryption logic, because it is only an encryption logic engine that churns out the ELD's, but it cannot execute them. The Switch in some embodiments may never perform any actual encryption, because that is a step that occurs on the edge if the network, on the Encryptors of the local encryption applications or by the operating system or through Java. Therefore the confidential information can never be spanned, diverted, corrupted, or stolen by any intermediate server that stands between the communicating parties. Please see the table below contrasting the embodiments to the other methods.

Thanks to the inherent architecture of the embodiments, they completely eliminate the security risk of diversion through an intervening resource, e.g. the "man-in-the-middle" problem. An encryption service as contemplated by the embodiments merely supplies the ELD's, but the actual encryption occurs on a computing application on the local computers, which the encryption service provider does not execute or control. The Encryptor that performs the encryption is completely under the control of the parties who send or receive the encrypted plain-text. For example, an email server may be used to transmit the email from one person to the other, but it plays no role in encryption. The emails are encrypted on the edge, where the local applications execute the ELD's. The ELD's may arrive at the local computers by a completely independent means of data transmission, such as satellite or HD radio. The same principle applies to chat servers. There is no need for the provider of the email or chat or social networking service to take any role whatsoever in the encryption of the plain-text sent from one computer to the other.

For the purposes of the embodiments I therefore call this encryption method Exoneration Encryption, because the encryption service provider is exonerated from any potential liability arising from mishandling the plain-text. This architecture also may be called Edge Encryption because while the Switch may repose at the center, the Encryptors operate only at the edge of the network.

This stands in contrast to other encryption services, and a hypothetical example is in order. For example, during the year 2012, Adobe© Software Company (or any other similar software company offering encryption as a web service) offered a cloud based encryption service in which the plain-text is sent up to an Adobe© server, encrypted with SSL, and sent to the recipient in encrypted form. The Silent Circle email encryption offering of 2013 is similar. The recipient by one means or another is informed of the password or is provided with a private key or a certificate, and the recipient decrypts the plain-text. This architecture requires the encryption server under Adobe's control actually to receive the client's private data.

This means that the provider of this encryption service is saddled with a fiduciary responsibility because it is, at least momentarily, the custodian of the confidential information and at the same time is the provider of the encryption logic that scrambles the data. The central-server encryption paradigm cannot overcome this inherent disadvantage, so it creates an unavoidable potential liability against any company standing in these shoes. Receipt of the confidential information—whether encrypted or not—makes it possible for that information to be compromised. If malfeasance occurs (for example, an unauthorized viewing by an Adobe employee) this would defeat the very purpose for which the client enrolls on the service: to protect confidentiality.

With Exoneration Encryption this kind of liability cannot exist. An encryption service provider enjoying the architecture of the embodiments does not encrypt anything, but merely supplies the disposable ELD's that others use to encrypt the confidential material. When the encryption service provider is merely the supplier of the ELD's rather than the actual Encryptor of the file, the provider is exonerated: immune from legal liability.

Furthermore, the need to transmit a password or key by any human action is another potential point of failure that is inherent in other processes, such as the Silent Circle email encryption service, or the Adobe product. Both of these risks are eliminated by the embodiments. Encryption occurs automatically, as a background task, so there is no key for the user to provide or password to remember.

The next table shows some of the advantages of some embodiments described herein over other encryption processes:

| |
| --- |
| Plain text never arrives at any central computer. |
| No Password is used; therefore there is no risk of forgetting it and being unable to decrypt the document. |
| No certificates are used, and therefore none can be lost or stolen. |
| No unencrypted information needs to be transmitted. |

With the embodiments, a Switch and Secondary ELD's may be employed in lieu of certificates in order to provide authentication. The Engine does not encrypt the plain-text: it only prepares the ELD's. Then, then, in a two step process, the plain-text ELD's are used to encrypt the plain-text, and those ELD's are encrypted by the Secondary ELD's that operate as an authenticator, confirming the identities of the parties. (If the meta-file is received by someone other than the intended, authentic recipient, the file will not auto decrypt because the unintended recipient will not possess the Secondary ELD and therefore cannot decrypt the plain-text ELD, which remains unusable). Unique, session based logic is generated by default and is installed for use during the encrypted session, with the logic executing a mirrored pair of Encryptors on the communicating computers. The mirrored pair of Encryptors performs in situ encryption using the encryption and decryption logic that is shared for the session, and the ELD's used in that process are encrypted in transit by Secondary ELD, which establishes trust between the sender and the receiver by locking out other parties.

The confidential bytes are constantly under the dominion of the communicating parties, and nobody else. This confers encryption logic independence on the parties who have the right to mutual confidentiality, so that no outside computer ever stands between them to garner their proprietary information. The man in the middle attack is eliminated, and the users are authenticated by the same process.

Because the Switch prepares the ELD's but does not necessarily execute them on the plain-text, its work is a necessary component to complete the encryption process, yet not a sufficient one because it may have no Encryptor. For these reasons, the severance of logic creation and logic execution—the essence of the Encryption Abstraction Layer—may be thought of as a defalcation fuse. The defalcation fuse is the functional objective, and the use of ELD's and Encryptors operating independently are the means. There simply is no single point in the network at which a defalcation easily can occur, because the encryption logic creation and the execution of the logic do not happen in the same place; and moreover, the process takes place in multiple layers. The Encryption Abstraction Layer is an orthogonal, distributed logic circuit that eliminates the single-point-of-failure problem that is inherent in the central server approach. Hacking the encryption logic engine alone would not defeat privacy, nor would hacking the Encryptor alone.

How the Embodiments Eliminate the Need for Certificates

Unlike other processes, keys or certificates need not be sent out across the network. Rather, instead of keys or passwords pertaining to a static algorithm, an encrypted ELD encoded in the meta-file is sent. The meta-file is an integrated, self-contained packet containing everything needed for auto decryption, thanks to the Encryptor on the recipient computer. That is to say, everything except the Secondary ELD, which is not included in the packet.

Each pair of communicating computers use the common Secondary ELD to encrypt the ELD used to scramble the plaintext of each message they send back and forth, and by one means or another they obtain the Secondary other than through the transmission of the packet. (Initiator is the module of executable code that accomplishes the receipt by the computers of the Secondary ELD, and four Initiator embodiments are described below). Because the meta-file is sent to the computers anyway, the encrypted Plain-Text ELD included within it, encrypted by the Secondary ELD, also is sent out. It gets a free ride, via the "bucket" approach, because the encryption meta-file is the bucket that contains everything needed. There is no distinct route for the ELD, unlike when central encryption servers are used that send the file and the password separately for safety.

It must be observed that as a general rule sending the decryption means with the packet to be decrypted is a bad idea. If a party also possessing the encryption application intercepts the packet, it is a simple matter to extract the decryption means and decrypt the packet, unless additional precautions are taken. This risk is obviated by the embodiments because the decryption code (the Plain-Text ELD) is decrypted by the Secondary ELD, which already is in the possession of the party when that person receives the encrypted meta-file.

In one embodiment each encryption client application has a Trust DBMS that receives the Secondary ELD corresponding to every other trusted counterpart in communication on the network or a sub-group, so that the transmitting counterpart can be looked up as soon as that computer is identified. A value in the meta-file identifies that counterpart. Through the lookup the counterpart is associated with the Secondary ELD that the communicating counterparts in trust use as their private logic tunnel. By this means each user enjoys a personal web of trust, which is expressed as the matrix of Secondary ELD's connecting him to his trusted counterparts.

Each communication session may execute a single-use encryption logic specified by a new ELD to encrypt the plaintext of that communication. Instead of varying a password to an existing algorithm, as in other processes, the embodiments swap out the old composite algorithm for a new one that is auto generated by the Switch during the ELD generation step, and auto-executed through the second step, the dynamic class loading of the encryption algorithm subset that the ELD has specified, which subset is taken from the JAR file on each application at encryption runtime. So a significant difference between the embodiments and the other encryption processes may be observed. In other processes the key changes. In the embodiments the key changes and the entire lock as well.

Generating the composite ELD on the Switch may be triggered by the onset of a session. The Switch receives a signal that an ELD is needed, so it generates the ELD and transmits it to the applications to be in communication. In this embodiment, one computer signals another that communication is desired and the preparation of the ELD takes place automatically on the Switch for the proposed communication. The Switch then transmits that ELD to the computers.

In another embodiment, Protector-Receiver, the ELD's are prepared in a small batch and stored in a magazine on the Protector applications for future use, like bullets in a gun. When the supply gets low it is refilled automatically from the Switch. And then, from the Protector, the ELD's are cascaded down to the various Receiver applications with whom the Protector enjoys trust. This squirrel-storing-nuts approach eliminates the need to initiate a handshake with the Switch each time a session is to take place, so that the relation of handshakes to ELD's is one to many instead of one to one. The requirement of a handshake with the Switch for each encrypted communication is burdensome. But with the magazine embodiment, if the handshake with the Switch fails for some reason it is of no consequence to the ability of the Encryptor to continue functioning so long as a few ELD's remain in the magazine.

In yet another embodiment, a peer-to-peer architecture is used, and the peers are state-based. There is a network of peers and each peer may change its state from ELD consumer to ELD producer, so that in its second state it can become an Encryption Logic Engine (ELE) and produce ELD's when the other applications call upon it to do so, but in its first state operate as an Encryptor, a consumer of ELD's generated by the other peers whenever it encrypts its own files. In yet another embodiment the Peer creates its own ELD's on a local logic engine incorporated into the peer, and the peers circulate encrypted files on the cloud but do not circulate ELD's, given the absolute encryption logic self sufficiency that each peer enjoys in this embodiment.

Single Use Encryption Logic

Discardable encryption logic in one important respect is an advance over other encryption processes. A single use, session-based encryption logic frustrates the hacker because it removes the incentive to try it. In traditional encryption schemes such as SSL, with a successful hack the logic of the encryption algorithm may be derived by deduction, such as in a brute force attack. If the interloper succeeds in cracking the logic he can defeat subsequent attempts at encryption when the logic is reused. (This is what the military intelligence of the United States achieved in World War Two when they reverse engineered the encryption logic used by the Japanese Navy).

But with the embodiments the encryption logic algorithm—not just the parameters entered into it—changes every time encrypted communication takes place. Therefore, the criminal advantage gained by cracking the logic would be short-lived, to say the least. The logic might be cracked, but the victim could say to the hacker "So what!" because the logic would never again see the light of day.

Another advantage flows from the "single use" limitation to the encryption logic. Because each encryption executable is created dynamically and not reused, under some embodiments there may be no need to store it in permanent memory. In this case there is no encryption logic that persists on the system in memory to be stolen, such as in an embodiment not using the magazine to store ELD's. What an interloper would have attempted to reverse engineer, the encryption logic, is gone as soon as the class is loaded. Absent a ram dump it is invisible on the system.

Encryption as Facilitated by the Meta-Files

The encapsulation of files to be encrypted and decrypted involves a header appended to the body of plain-text, or a similar labeling method. The header contains tags that express values, or correspond to functions, including URL's containing Switches, and to hardware profiles; and the functions are triggered when the file is parsed on the port monitor or at the file registry. The process is as follows:

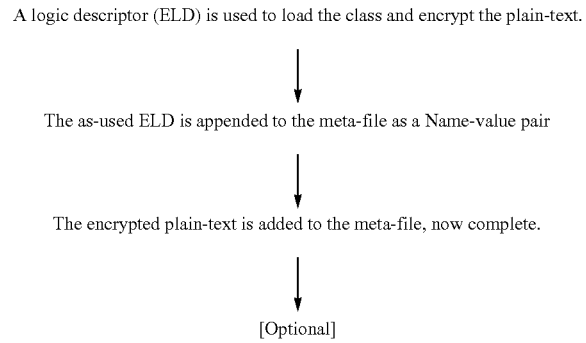

A logic descriptor (ELD) is used to load the class and encrypt the plain-text.

↓

The as-used ELD is appended to the meta-file as a Name-value pair

↓

The encrypted plain-text is added to the meta-file, now complete.

↓

[Optional]

By adding name-value pairs to the meta-file, its functionality may be expanded in ways that go beyond encryption. For example, in an application for writing legal pleadings, values for automatic proof of service maybe included in the meta-file, and the proof executes automatically as a background task on the local applications. The documents constituting the output of the legal application are meta-files that add automatic proof of service via a post-processing routine triggered by descriptors in the meta-file that load a class. As before, XML may be used. The values extracted from the XML meta-file are used by the class loader to send the legal document to the addressee, and then to load the class that adds the proof of service. Adding proof of service as a background task may occur universally among a community of users, such as the Bar of State X, when each enjoys a copy of the application, because the applications are compatible and use the same meta-file format and class loader to execute the proof of service functionality.

Other embodiments of meta-files adapted to the special needs of litigation also may be used in the process of suing and defending the parties to a lawsuit. Litigation may be automated by conceiving of it as an online process executed through dedicated applications using meta-files employing name-value pairs containing values that trigger much of the litigation functionality. The values may trigger algorithms, so that the litigation process is conceived as a series of steps subject to programmed automation. For example, each pleading in the litigation may be expressed as a meta-file that contains a name-value pair indicating whether the pleading so created is a response to another pleading, or on which requires a response. The name-value pair triggers a mapping function to display the entire action as a tree, with each pleading either creating a new branch or filling out an existing one. The value generates a visual aid allowing the entire case to be seen in its totality, as a tree.

The values required for the automatic proof of service fulfill one of the name-value pairs of the output meta-files of the litigation application, and this may include addressing information. A DBMS may order this information on each copy of the litigation application. The name-value pairs may include the email addresses of the party serving the document, or an alias or an index value to that address, and that of the recipient as well; and the values are looked up in the DMBS. Online service of process may take the form of an automated document transmission routine in an application, or in a web service. The routine is triggered by a descriptor in the meta-file so that the proof of service class loads, sending the document out to an Internet address and recording that fact as proof.

The class may generate a printable document when a written certification of the service is requested, and a reply packet sent as a background task may trigger this process. The reply packet also may be used in dynamic class loading. The automatic proof of service for legal documents occurs by default and as a background task each time the online litigation application prepares and transmits the pleading. The pleadings are its output meta-files. A graphical interface may allow the user to select, whenever a legal document is to be transmitted, whether the automatic proof of service functionality should be executed or not.

Using the File System as the Trigger for Default Encryption

Encryption made possible by a Switch and ELD's may be achieved in a closed computer architecture that does not require a port monitor that listens to the open Internet, such as a VPN. This may be a VPN dedicated to encrypted email, using specialized email client applications that encrypt the message content via the embodiments. In such an implementation the file system of the email application is capable of discerning the file attributes of the meta-file to distinguish the files to be subject to auto encryption from the files that are not, and to carry out the class loading.

In some networks that implement encryption as a background task—and this is generally true for virtual private networks—the network itself assigns fixed ports to the client software. So in this situation there is no need globally to monitor all of the traffic by means of a port monitor. The port assignment, in one embodiment, is a step that a server takes when auto-generating the local client software application for automatic encryption by default, such as an email client with the automatic encryption functionality. In this embodiment the application possibly may use a pre-assigned port, but the communication through it may be intermittent and for a limited purpose, such as downloading ELD's from the Switch, instead of for the general purpose of transmitting the messages. When the ports through which the ELD's are to be provided are known, the sniffing action of the port monitor is not needed for encryption to occur.

So ports are not the only way to do it: the file system may provide an alternative point of control in distinguishing the files to be encrypted from those not to be, and if auto encryption is to occur, how. For example, the Windows® Registry can be modified toward this end, and the approach is not limited to Windows. Other operating systems offer comparable functionality.

This file-centric approach is the technique used in one example of default encryption shown below, Protector-Receiver. This is an architecture using a Switch and two categories of local applications: the Protector, used by the professional, and the Receiver, used by the professional's clients. Protector-Receiver runs equally well under three operating systems: Microsoft Windows, Android, and Apple OS X. The Switch produces ELD's through a Java program, and the ELD's work with both the Windows version and with the Apple version. The local client applications of Protector-Receiver employ an OS detector, so that when the local application is installed it is configured to allow the file system to perform the auto-selection function irrespective of the OS. This allows, for example, that all MS Word™ files may be routed to auto encryption no matter what operating system is used to run Word™. This OS-independent encryption functionality may be thought of as file system middleware, intervening between the encryption logic system and the file system of the OS.

Figure 23:
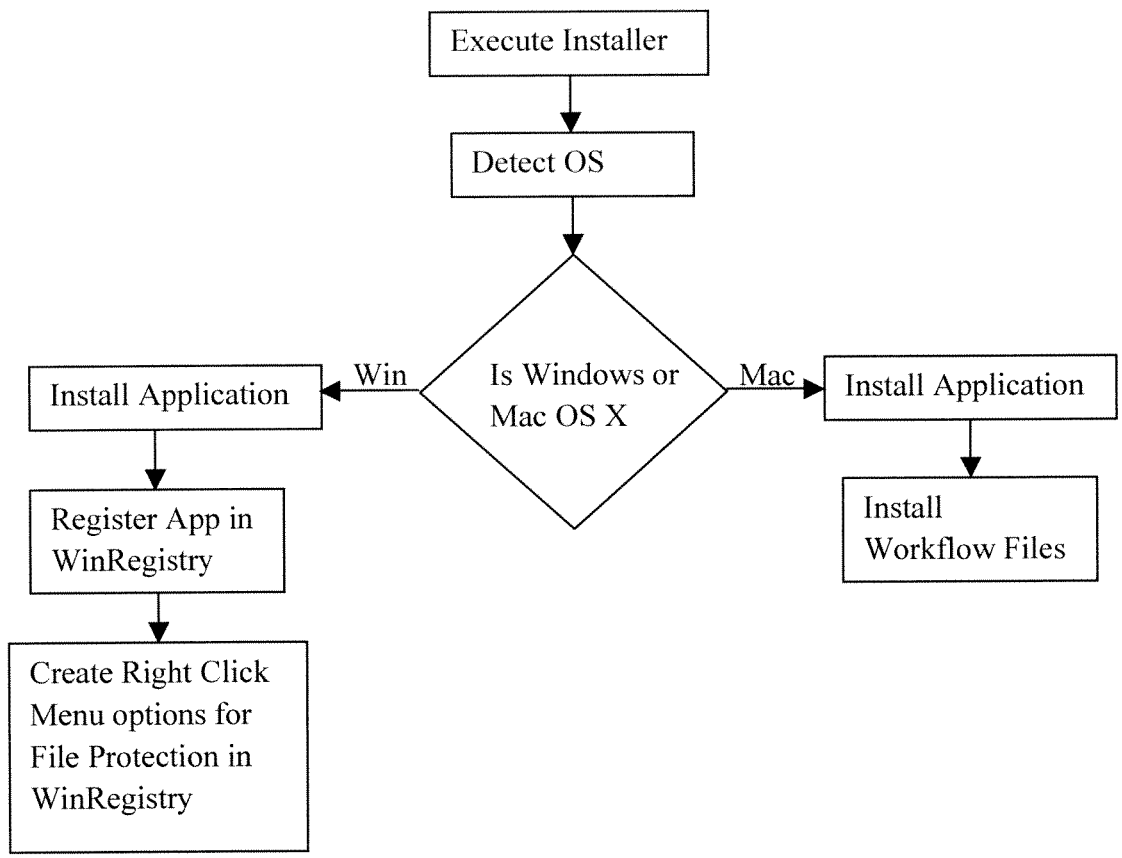
FIG. 23 Multi OS Functionality through the OS Detector . . .

FIG. 23 is a flow chart illustrating the installation of the application in a manner allowing Windows and the Apple OS to interoperate. It shows the detection of the OS and based on this the registering of the application, in this case the Windows™ OS, and the copying of a "Workflow" (a sub-application of Mac OS X application that allows the manipulation of the Right click menu of the file system). In the case of the Windows™ OS, manipulation of the right click menu of the file system is done through the WinRegistry™. Please see FIG. 24, a flow chart showing the how auto encryption occurs in MS Windows™ OS, based on the WinRegistry.

Cognitive Signature Authentication Via the Trust DBMS in Protector-Receiver

In one embodiment of Protector-Receiver the answer to a personal identification question, or to several, is harvested as a string used as an encryption key to lock and unlock the user's contacts list. The contacts list is a DBMS that associates each person with a dedicated Secondary ELD, and this operates as an authentication control. The Protector can only communicate with the Receiver if both applications have the Secondary ELD available. Unless the question is answered correctly the Trust DBMS on the Protector remains locked and the Secondary ELD's are unusable.

The personal identification answers, when keyed in, generate the string. Then, the string is expanded into a bigger one, because a bigger string is harder to crack than a smaller one by a brute force attack. The expansion process may occur by means of a hash table corresponding to a universe of available characters that the string is capable of expressing when it is expanded. Then, the expanded string is fed into an encryption algorithm that encrypts the bytes of the user's file of personal contacts, the Trust DBMS.

The expanded string when the answers are correct opens the Trust DBMS. In one embodiment SQL Lite is used as the DBMS to order the contacts for that user. The database orders the meta-logic values, the Secondary ELD's that correspond to the trusted counterparts with whom the authenticator is to be in communication, his personal web of trust. This SQL Lite file contains a unique Secondary ELD for each trusted contact. Unless a correct login authentication response is provided, the correct Mnemonic Input (the term used in the embodiments for the answers the user enters into the system from his personal memory) to match the stored Cognitive Signature, the Trust DBMS remain locked. Using SQL Lite, however, is not limitative. An array or hash table may be used instead to express the web of trust.

Each Secondary ELD in practical effect functions as a private logic tunnel: it is the shared logic descriptor that allows the Plain-Text ELD used to scramble the text of the message itself to be encrypted or decrypted, as the case may be, when the meta-files pass back and forth between the trusted counterparts. Using the Secondary ELD is the safety mechanism that makes it viable to include the as-encrypted Plain-Text ELD along with the encrypted plain-text in the same transmitted packet. So the DMBS that opens upon authentication is both a secure container for private data and a filter that selects the Secondary ELD corresponding to each pair of trusted counterparts. The Protector's correct Mnemonic Input opens the container as the first step, so that in the second step the Secondary ELD is obtained and executed.

With the latter step all of the logic layers in the spectrum of layers are unlocked to work in concert in the integrated encryption security scheme.

With the Cognitive Signature authentication step, assuming that the person undergoing the authentication answers correctly, the DBMS opens. This not only allows existing Secondary ELD's to be used in a given case of communication, but also allows new ones to be inserted when the meta-logic needs to be updated, such as when a new trusted counterpart is added to the user's web of trust. This may occur pursuant to the Java class Initiator, explained below and illustrated in four embodiments. The DBMS randomly inserts a Secondary ELD into the field corresponding to the identity of the new trusted counterpart the first time the Protector and that counterpart communicate, and from that point forward that ELD operates by default as their dedicated Secondary ELD.

When a meta-file is sent by the first Protector to the Protector there is a series of steps. First, the sending Protector encrypts the body of the message with a random ELD that is removed from the magazine of that application. Then, that ELD is encrypted. The DBMS of the first Protector application looks up who the recipient Protector is. The DBMS uses the mutual Secondary ELD associated with that recipient Protector, their dedicated private meta-logic, to encrypt the Plain-Text ELD.

With that step the encryption meta-file is complete, as it contains both the encrypted plain-text and the encrypted Plain-Text ELD. The Protector transmits the encryption meta-file, and the recipient other Protector receives it. Upon receipt the receiving computer looks up the Secondary ELD corresponding to the sender and uses it to decrypt the Plain-Text ELD. The Plain-Text ELD decrypts the plain-text, and the message is readable on the recipient Protector Application, in the message window. The recipient sees the message in the window, but has no involvement in the steps that encrypted it and decrypted it on its way there.

When the Protector sends a file to the Receiver there is the same series of steps. The plain-text is encrypted by the Plain-Text ELD. The encrypted plain-text is added to the meta-file. The Secondary ELD associated with the Receiver who is to receive the file is looked up on the sender's Trust DBMS. That Secondary ELD encrypts the Plain-Text ELD. Then, the as-encrypted Plain-Text ELD is added to the meta-file, in a name-value pair reserved for that purpose, along with the other name-value pairs such as the plain-text that has been encrypted. This completes the meta-file for the purposes of its encrypted transmission. It is transmitted to the trusted counterpart, the Receiver, as a complete packet containing everything needed to auto decrypt. That is to say, everything is there in the meta-file to allow decryption except the Secondary ELD; but the Receiver already has this "missing link" in its Trust DBMS. He has obtained the Secondary ELD by a prior, independent process.

Whenever the DBMS is opened upon successful authentication by the Protector at log-in, the set of Secondary ELD's is decrypted and available for use. When SQL Lite is used as the Trust DBMS, the entire DBMS including the executable is decrypted as a file, through an expanded key. (The expansion step for that string is detailed below). With that step Secondary ELD's are able to operate automatically on the Plain-Text ELDs, encrypting the Plain-Text ELD's as a background task. Depending on whether the need at the moment is to encrypt the plain-text and send it out or to receive and decrypt it, the Secondary ELD either encrypts the Plain-Text ELD, or the Secondary ELD decrypts it.

Provisioning the meta-logic in the trust DBMS of the application to make it available in this manner allows a personal web of trust that auto generates the private meta-logic virtual tunnel for each communication session, as a background task. This allows any two communicants who enjoy trust, without any manual input from either of them, to communicate using a meta-logic shared by nobody else. Therefore, one can see that the technique establishes trust by default, and then, encryption by default as well.

Plainly, this automated meta-logic approach using a primary ELD and then a Secondary is different than creating a tunnel by means of SSL, or public keys or private keys. There is no user action required, such as keying in a public or private key, because the values used to authenticate the user are already contained in that person's encryption application as the meta-logic, given that they were installed in advance of the session in the Trust DBMS. The application looks up the Secondary ELD's as a background task and by default, and with that authentication occurs automatically.

Therefore, the embodiments are a way of granting trust that solves the public key authentication problem. Furthermore, it is a solution to this challenge that is completely automatic.

The Cognitive Signature Authentication Routine employed in the Protector to open the SQL Lite file may contain the personal knowledge questions expressed verbatim, in one embodiment. In another embodiment it merely contains a set of index values, so that the questions are selected from an indexed list, and the verbatim questions are found by search. The indexed questions may be downloaded from a URL, the index value looks up the selected questions through a local procedure on the Protector application, so that the Protector receives its the candidate questions to selected by the user. In yet another embodiment the personal knowledge questions are prepared by the user in a completely subjective procedure. He is asked, "Think about the things you remember the best, and frame some questions based on those things." The subjective method may be combined with the objective recitation of possible questions, to stimulate the user's imagination. The questions and answers are saved as the Cognitive Signature.

The questions listed on the URL may be updated from time to time, with new questions provided to be answered per an ongoing "winnowing" process in which good questions are winnowed out from the total question set. The good questions are the ones as to which the person undergoing authentication, the user of the Protector, has certain knowledge. New questions may constantly be filtered into the system each time the user logs on. It frustrates hacking when the question-answer pairs used in the Cognitive Signature are fresh. The Protector application may update the Cognitive Signature questions by communicating with the URL through a port, inserting the new questions and purging the old ones. Alternatively, the files containing the updated questions also may be transmitted to the applications as an email attachment. A wiki process that a URL hosts may test the potential questions, and users of the system may suggest new test questions using the wiki. An algorithm may test the effectiveness of the questions in actual use, sort them, and include only the best in the updates.

One way of harnessing the Mnemonic Input (the response to the Cognitive Signature questions) is to generate an encryption key, and then, to expand the key. For example, there may be a bytes expansion algorithm that translates the ASCII bytes corresponding to the characters of the authenticator's Mnemonic Input (an answer, for example, in English) into a much larger byte set that corresponds to Unicode characters, using an arbitrary translation table. The as-installed table in the Protector application may vary from user to user, as the Switch may auto generate a randomized hash table for each user when it creates his Protector Application. As the final step, the Unicode characters are then translated into Unicode bytes. The process is as follows:

Mnemonic Input→ASCII characters→Unicode characters→Unicode byte set

The larger byte set frustrates hacking because the Mnemonic Input is transformed into a bigger key used to decode the Protector's Trust DBMS, and the enlarged key is used during the log-in process as the user's authentication test. In this encryption logic layer the technique of the other encryption methods is used to the extent that only the key changes, not the lock. But the embodiments expand the key into something vastly bigger, making the logic layer harder to crack.

More complexity is possible when the system designer desires more randomness. In a richer embodiment, each random value in the ASCII string is expressed as three random Unicode characters, a three character value so that upon translation, with five hundred Unicode characters available, the resulting character set equals five hundred cubed. In one embodiment for character expansion appropriate for the Protector application, the key is expanded into a Unicode derived key file that is two percent of the size of the bytes of the Bible. Because the Cognitive Signature input step occurs locally, without any communication with another device, the slow-down of the login process when a huge key is used may be a fair price to pay for security, and this process may execute in the background while the user does the other activities surrounding the starting of his session, such as reviewing his Facebook™ or looking at advertising.

The use of a hash table to expand the character set of the key via translation into Unicode makes the system more secure, because it generally is recognized that a larger key makes the system harder to crack. For example, in the True Crypt© encryption application, circa 2012, the user moves his mouse randomly for a sustained period, using this digital-optical process to generate random pixel values that create a larger key. The more the hand moves the mouse back and forth, the bigger the key. Expanding the character set in the embodiments, using a randomly generated translation table operating the character set expander, accomplishes this goal without out the tiresome manual step of randomly moving the mouse.

Another strategy to strengthen the security of the Cognitive Signature login step is to ensure that the user is forced to use numbers and letters, as well as shift-number keys (such as !@#$%^&*). If letters are keyed in as the first step in providing the Mnemonic Input, they may feed an algorithm that compels the user to enter not only the actual keys comprising his subsequent answers, but in addition to those keys, random keys that the user is told to enter via a CAPTCHA like function that the algorithm generates. For example, if his answers are numerical, the algorithm may command the user to submit additional shift number keys that the algorithm randomly describes or displays on the screen. The additional shift number keys are specified in terms of their relation to the keys comprising the actual answer, with "2L" meaning "two to the left of the number key." In other words, the key "7" appearing next to '2L" would refer to the key %. This strategy of enriching the Mnemonic Input process is further described below. There is a tradeoff between key size and difficulty for the user, so the details of the Mnemonic Input process may vary with embodiments.

Other Encryption Systems Contrasted to the Encryption Abstraction Layer

With this overview of the embodiments in mind, one can perceive advantages of the embodiments over other methods of scrambling the bytes or characters of a file or message. All encryption programs implement randomness in one form or another. Under some approaches encryption is given effect in monolithic programs that invoke a static encryption scheme, such as SSL or AES. Another example would be PGP (Pretty Good Privacy), which is used in the Silent Circle email encryption method, an offering also using keys.

With that approach, in contrast to the embodiments, the process of ensuring randomness is not conceived as an abstraction that can be implemented as one or another instance a class. With the approach of the other methods randomness itself is not considered in the abstract, or as a library permitting encryption as instances via object oriented programming (OOP). The static implementation of encryption per the other methods stands in sharp contrast to the abstraction layer approach of the embodiments, which construe encryption as occurring by means of a set of resources subject to dynamic configuration. Instead of abstracting the creation of the logic from the inception as a configurable process that can be the instance of a class, the programmers of the static approach have created, pell mell, applications that implement one encryption algorithm or another which, in light of their inherent lack of dynamism, is easier to defeat, and for the same reason harder to adapt to specific needs.

Because the static, monolithic approach to encryption of the other methods does not conceive of the randomness in encryption as an abstraction, it has not conceived of encryption executables that are dynamically built for a session by the loading of classes; or created pursuant to an operating system that allows each programmer to individuate the auto encryption logic for his particular application, while at the same time offering shared functionality across a universe of compatible programs; or capable of implementation by means of an encryption logic that is used once and flushed in order to deprive the hacker of the raw material he would need in a brute force attack. Encryption per the embodiments achieves all of this.

The Encryption Abstraction Layer technique replaces the static encryption algorithm with an algorithm that alternates. This dynamism makes possible, one could say, a more random randomness. This feature sets the embodiments apart from the programs which invoke a single encryption procedure that remains constant, and for that reason, predictable—such as SSL, PGP, or AES. The other encryption approaches using public keys, private keys, or certificates in a monolithic architecture do not allow the encryption designer to imagine applications that incorporate autonomous, individuated, auto generated encryption algorithms that are randomly composed from a set and discarded, such as the Composite ELD; or applications that eliminate the risky requirement to transfer keys from one user to the other. Moreover the embodiments, in contrast to the other approaches, do not require the person sending or receiving the file to consent to its being received, and if received, encrypted. Instead, the plain-text always is encrypted as a background task, by default. The other methods require the passing of public keys or other manifestations of assent whenever something is to be encrypted, providing an awkward means of authentication. In the embodiments this manual step is obviated by the use of Secondary ELD's. Trust is granted automatically, and authentication is established as a background task. In the embodiments, encryption occurs by default and the Secondary ELD handles the authentication.

In the embodiments the Switch replaces the fixed or static algorithm of the monolithic architectures with OOP. The encryption logic used to execute the encryption of the binary file may be generated on the fly by the Switch, and later executed off the Switch on an Encryptor that invokes the dynamic loading of classes. This orthogonal division of function enhances the system integrator's architectural discretion. Without this individuation of function it would not be possible to build a VPN with spectrum of separate encryption logic layers, or meta-logic as a means of authentication, or a distributed encrypted network presenting the hacker with multiple physical points of attack, as in the embodiments.

Edge Encryption

Avoiding "the Murdoch Hack"

Hacking is a crime when a private party does it. Hacking also may take the form of law enforcement crime. Both can result in severe economic loss.

One example of law enforcement computer crime is the hacking, reported in the British press in 2011 through 2013, of the voice mail accounts of important figures such as Gordon Brown, the former prime minister of the United Kingdom, and of lawyers representing their clients in court. According to the confessions by people implicated in the scandal who have resigned, a Rupert Murdoch controlled newspaper bribed Scotland Yard to allow its reporters to hack certain voice mail accounts of interest. This is a classic example of the man-in-the-middle attack. This kind of attack is possible in encryption systems relying on a central server, such as a chat network that passes confidential data across the middle, or centralized voice mail.

The British scandal involving Murdoch illustrates the advantage of a non-centralized network in which the computers on the edge are given the autonomy that the abstraction layer approach of the embodiments affords. The edge computing paradigm minimizes the danger of improper influence. This is a threat present in all of the encryption methods employing centralized control, because the centralized control can be abused to steal private information. The existence of decentralized encryption logic layers arrayed in a spectrum and executed at the edge, in contrast, endows functional independence from any outside encryption logic source that might be subject to bribery or blackmail. In the Murdoch hacks, had the users of the voice mail system used audio or text messages encrypted locally on the transmitting cell phone by an ELD, and decrypted on the other phone, the Murdoch newspapers would not have been able to carry out a hack—even by bribing Scotland Yard. With the embodiments the message would have been encrypted before it ever left the first phone, by an encryption logic independent of the cell phone service provider standing in the middle.

When cell phones or PAD's are used to transmit the messages (either voice or text) the Mnemonic Input may be spoken instead of typed. The same questions may be presented as in the earlier example, and the user through a selection or through his settings may choose whether the Mnemonic Input is oral or written. The spoken Mnemonic Input allows the user to open his Trust DBMS while driving. As an additional layer of security, voice printing may be used, so that not only does the Mnemonic Input require the correct spoken answers, but additionally, requires the spoken words to match the true voice of the person being authenticated. The voice printing functionality may actuate another encryption logic layer in the spectrum, and another layer of meta-logic may be invoked using the voice print as a logic input.

In the voice printing embodiment when the Cognitive Signature is generated upon the user's enrollment on the network, it consists of spoken answers in that person's true voice. The Mnemonic Input voice file is compared to the Cognitive Signature voice file, requiring not only the correct words, but voice similarity at the level of n for the Trust DBMS to unlock. Once unlocked, the cell phone can achieve encryption and authentication via Plain-Text and Secondary ELD's whenever the caller communicates with the other trusted parties, with no threat of a Murdoch Hack. Other smart phone encryption systems that encrypt the data on the edge, such as the Silent Circle service of 2013, do not use a trust DMBS or any mnemonic input, or any automatic authentication such as that afforded by the Secondary ELD.

The Updater Class in Protector-Receiver

Figure 25:
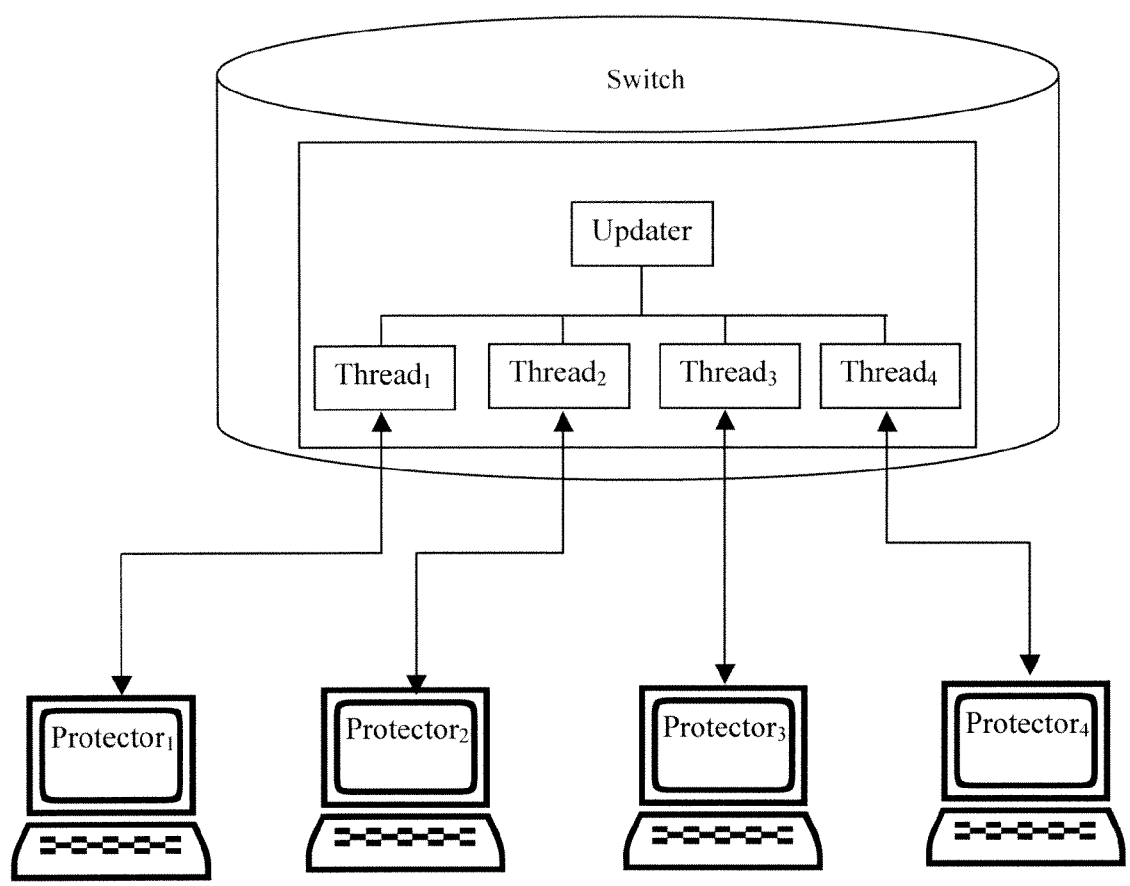
FIG. 25 Operation of the Updater Class on the Switch . . .

Updater is a library that keeps the client software current in Protector-Receiver. FIG. 25 illustrates an embodiment of the Updater. The Updater may not be a stand-alone application, but may be instead a Library or class that is used as an integral part of the other applications. The purpose is to send updates to the modules of executable code of the end user applications. When the Updater Library executes on the Switch it may identify when, how, and as to whom the updates are to occur. A DBMS on the Switch may be of assistance in associating the users and the modules to be updated. The Updater class may be a subpart of a Library called ServerCommunicator, and this library is explained below.

The Switch instantiates the Updater class and executes the appropriate method, in one embodiment, providing data so it can establish a connection with the Protector applications pertaining to that Switch that are going to be updated. This may occur as shown in the following code:

```
1. public static void connectAndUpdate(Vector data, String
   except)
2. {
3.        Vector v = getIpsAndPorts(except);
4.        Vector ips = (Vector)v.get(0);
5.        Vector ports = (Vector)v.get(1);
6.        com.updater.Updater updater = new
   com.updater.Updater( );
7.        updater.connectAndUpdate(ips, ports, data);
8. }
```

In this code, the connection information is obtained on line 3. The method getIpsAndPorts( ) obtains the IPs and the Ports of the applications that are going to be updated. In line 6, the Updater is instantiated, and in the next line, the method that connects to the peers is executed, performing the updating process, which consists in sending the fresh data to the clients.

The code of the connectAndUpdate( ) method may be as follows:

```
1. public void connectAndUpdate(String ip, int port,
                                                Vector
   data)
2. {
3.        Client client = new Client(ip, port);
5.        client.setConnectData(data);
6.        client.start( );
7.        try{
8.             Thread.sleep(5000);
9.             client.close( );
10.       }catch(Exception e)
11.       {
12.       }
13. }
```

This code shows the usage of the Client class (see line 3). The Connect Data that is set in the Client contains the data to be updated. The sleep( ) method of the Thread class is invoked in order to delay the execution of the following line, which closes the communication, in order to avoid closing the stream prematurely (while the data is still being sent).

The previous code is used when only one application is going to be updated. In the case where more than one application is going to be updated the following code is appropriate:

```
1. public void connectAndUpdate(Vector ips, Vector ports,
                                                Vector
   data)
2. {
3.   for(int i=0; i<ips.size( ); i++)
4.   {
5.     String ip = (String)ips.get(i);
6.     String sPort = (String)ports.get(i);
7.     int port = Integer.parseInt(sPort);
8.     ConnectThread thread = new ConnectThread(ip, port,
   data);
9.     thread.start( );
10. }
11. }
```

The ConnectThread class is used. This class executes the given code in a different thread. In this way, the data is sent almost concurrently. The main method of the class only executes the connectAndUpdate( ) method.

Thanks to dynamic class loading, the updater can execute the update method of any given class. This may be done using the following code:

```
1. public static void executeUpdateMethod(Object instance,
2.         String method, Class[ ] paramTypes, Object[ ]
   paramValues)
3. {
4.   try{
5.            instance.getClass( ).getMethod(method,
6.                    paramTypes).invoke(instance,
   paramValues);
7.    }catch(Exception e)
8.    {
9.    }
10. }
```

An instance of the class, stating the name of the method that sends the updates and the types of the parameters and their values, provides the update.

The Server Communicator Library

The ServerCommunicator is a library that contains classes for Protector-to-Switch communication. It is the building block for this communication, implementing encryption as a background task, and the Switch is the "server" in this library. The classes are: Server, ServerThread and Client.

Server, as its name implies, is the class that implements the server functionality—the operation of the Switch. ServerThread is the thread created by the Server in order to dispatch requests coming from clients, and Client contains the functionality used to establish a connection with the Server.

In one embodiment the Server is a utility class used to execute a SocketServer and process the communication between a ServerThread and the Client. The Server and ServerThread classes are building blocks in client/server communications, and the classes that actually process the received data can be programmed separately and used with these base classes. Embodiments of the ServerThread take advantage of dynamic class loading and access of methods, unlike server based encryption using SSL, AES, etc. An instance of the class that is going to process the communication is used. The class is given a set of commands, and the methods that must be executed according to those commands must be given to complete the client/server interaction.

The last class, Client, is the class used by the clients that want to connect to Server. As with the case of ServerThread, the Client uses dynamic class loading in order to execute the methods of a class that will process communication data. For example, a network using ELD's can provide encrypted chat sessions. If a chat client and Server are going to be utilized, Server along with ServerThread can be used for the transmission of encrypted data. But the use of a central chat server is not required in order to employ ELD's, as they also may be used to encrypt files such as email messages.

Figure 26:
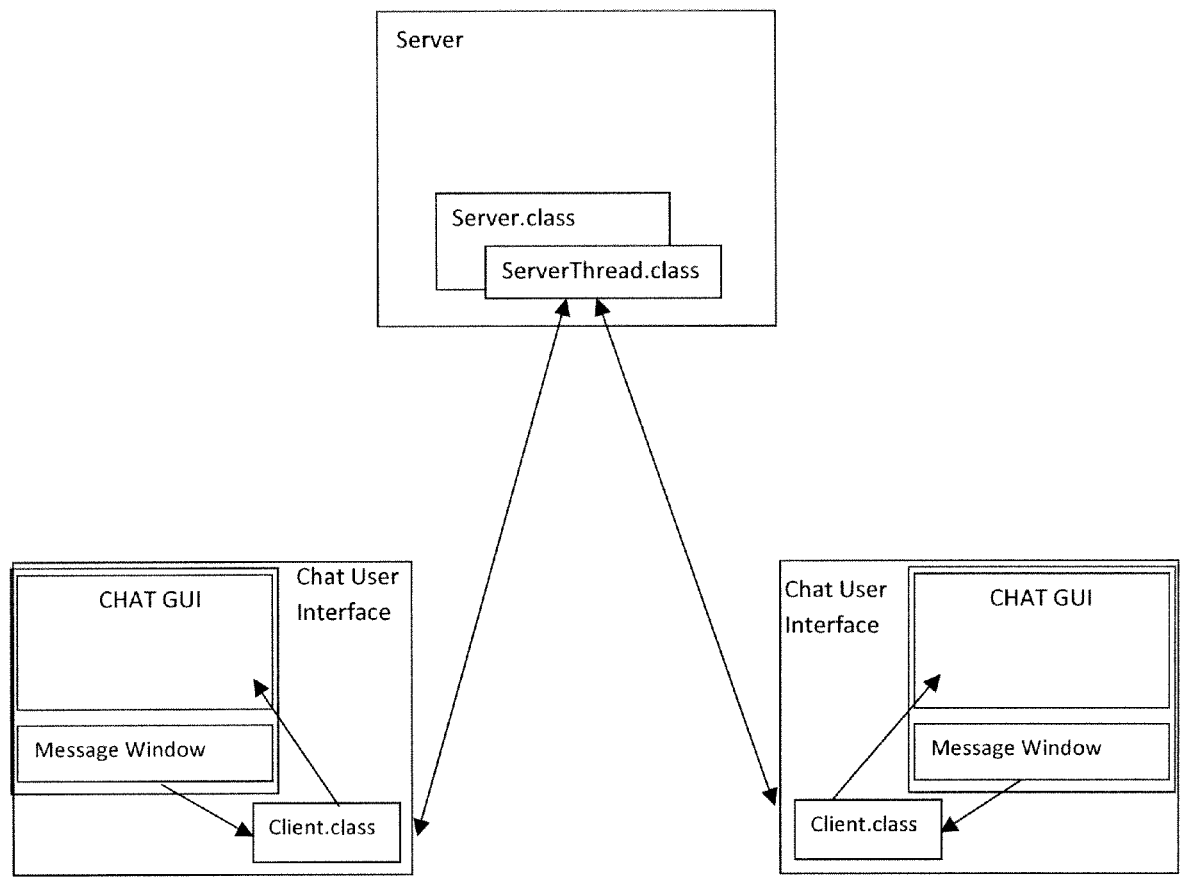
FIG. 26 Low Level Communication through Server Communicator Library . . .

A new class, one that is not part of the ServerCommunicator library, is programmed in order to display a chat user interface, so the functionality of the client application includes chat. The way the chat user interface carries out this process (typing of the message from one end of the communication, sending the data, receiving the data, and display of message on the other end of the communication) is as follows. The chat user interface invokes an instance of the class, theClient, to send data to theServer, and to receive data from it. At the same time, the Client executes methods of the class that instantiated it, in this case the Chat User Interface, in order to process the received data. An example of the processing of data is displaying the message in a text area of the chat user interface. FIG. 26 illustrates ServerCommunicator.

Figure 27:
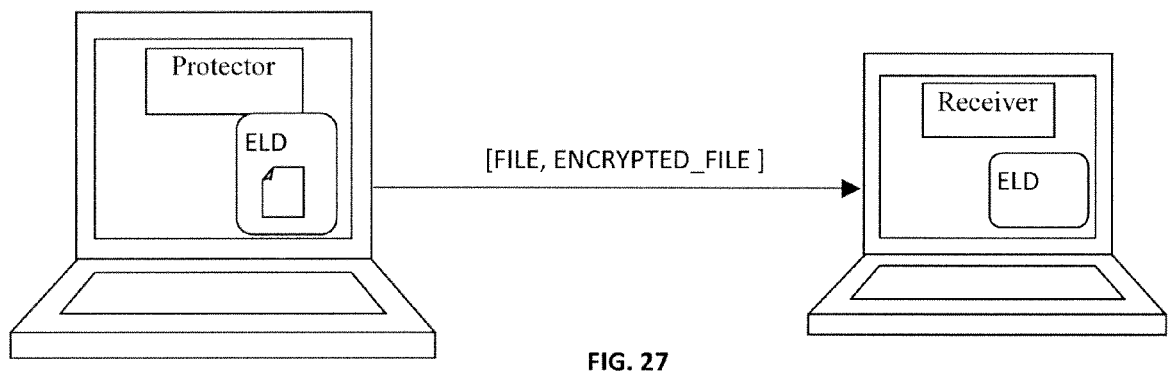
FIG. 27 Protector Encrypts File with ELD and sends it to Receiver . . .
Figure 28:
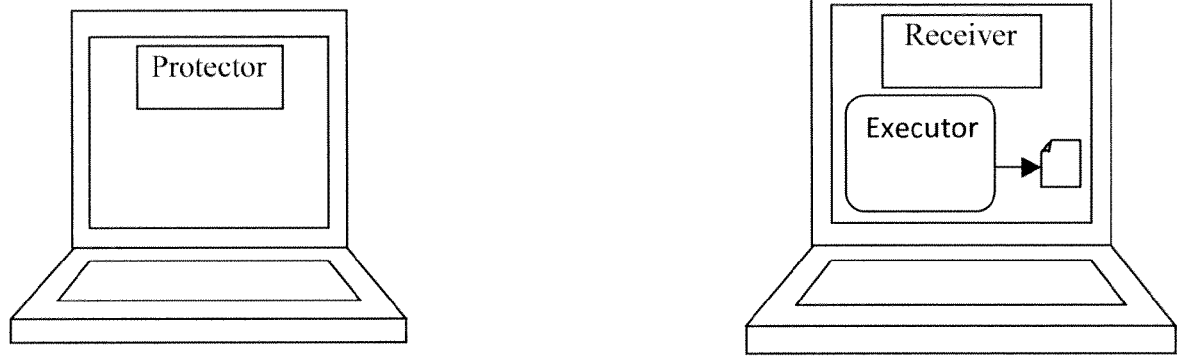
FIG. 28 Receiver in receipt of File and using ELD and Executor, auto decrypts it . . .

There is a protocol of communication for Server and Client. This protocol is formed by a command invoking the ID of the sender and the ID of the recipient, and the data that is sent. For instance, following the previous example of Chat Server and Client, an item of communication data can be of the form [COMMAND, SENDER_ID, RECIPIENT_IP, DATA], where COMMAND is the communication command (the request). SENDER_ID is the id of the sender of the data, RECIPIENT_ID is the recipient of the data and DATA is the data that is being sent. An example of communication protocol can be ["MSG", "john@hotmail.com," "joe@hotmail.com", "hello, how are you doing?"]. Here, the communication data indicates that the user with the id "john@hotmail.com" sent the message "hello, how are you doing?" to the user "joe@hotmail.com." FIGS. 27 and 28 illustrate the communication between the Protector and Receiver, which may include chat, using the protocol. FIG. 27 illustrates the Protector sending the encrypted file to the Receiver. And in FIG. 28, the Receiver decrypts the received file.

The Power Session

One of the objectives of the Protector-Receiver architecture as a tool for professional-to-client communication is to improve the regularity of contact. In the embodiments the strategy is to automate the act of communication by increasing the scope of the things that take place routinely. In that spirit, Protector-Receiver in one embodiment offers a communication method using chat called the Power Session.

A Power Session is a mass, concatenated session of chat conferences, with the individual chat sessions occurring in a rapid series. It provides a virtual conference that the professional has with each one of his clients, and these occur as a sequence of meetings. Each client is assigned an interval (a time slot) for the communication. The Professional can include or exclude any client he wishes, and the option is available to charge a fee for the client to participate in the Power Session.

The chat architecture used in Protector-Receiver is not based on a central server. In the chat architecture for Protector-Receiver the Protector itself governs the chat sessions with its multiple Receivers. The master application, the Protector, contains a pseudo-server functionality to control the scheduling of the chat sessions and to execute them with the slave application, the Receiver. There may be a peer-to-peer architecture for the Power Session as well, and in that case the Power Session is one of the state-based functions that the peer may carry out, so that the peer may act either as the chat server or as the chat client.

In Protector-Receiver the communication objective is to maximize the yield of the professional's time by concentrating many client communications into a single, batched chat session, minimizing wasted time. The business theory is that the professional's time is more valuable than the client's. Therefore the Protector and Receiver are in a master-slave relationship, the Protector dominant and the Receiver subservient. This means the Power Session is scheduled to the convenience of the professional, rather than to the client's convenience, so when the client is waiting for his individual session to start he in effect remains on standby in a virtual waiting room.

There may be a calendar in the form of a pull-down menu on the Protector application, and there may be a wizard. Using these tools, the month, day of the month, year, hour and minute are selected to schedule the Power Session. The interval in between the individual chat sessions in the Power Session also is selected, as is the amount of time that the professional devotes to each client in the session. A different interval of time for each client's session can be selected, or the same interval can be used for all. The wizard may be used to set the times, and the output may be stored in an XML document, a packet given effect through dynamic class loading.

Once the professional selects the time for the Power Session, an invitation that is generated in the form of an XML scheduling document is sent to each of the clients, to their Receiver, in one embodiment. The invitation states the time for the individual chat session. This may be a packet using Dynamic class loading, in order to generate the invitation appearing at the presentation layer of each Receiver, stating the time of his session. The invitation appears in the Power Session window of the Receiver application.

The clients of the professional, using their Receivers, each return the invitation reply packet to the Protector and the Protector processes the replies. The Receiver's invitation reply packet generates the automated scheduling for the Power Session, per a process executing on the Protector. The Protector may batch the replies for processing, and provide a cutoff date so that late replies are excluded form the scheduling. The schedule provides the time slot for each Receiver's participation in the Power Session. Each reply packet is parsed, and the processed result is fed into the scheduling executable that sets up the Power Session at run-time.

Dynamic class loading may be the programming technique that builds and executes the serial mass chat session. The invitation to each Receiver contains the time for each session, and the Protector application sets up the chat series to include the Receivers who have replied affirmatively to the invitation. The invitations are sent to the Receivers in a batch of transmissions, using the email address of each.

In case the professional decides to charge the client a fee, it must be paid before the Power Session is executed, in one embodiment. Otherwise the client will not be included in the session. There may be a Power Session DBMS on the Protector's containing the information required to process each client. It is updated to reflect that client's status regarding the power sessions, e.g. whether the power session charge is paid. This information and other session related data is extracted from the Protector's Power Session DBMS when the power session is executed. This DBMS may be a file in SQL Lite.

After the Power Session has been scheduled, the Protector's timer checks the date and time and starts the session. When it detects the time to begin it automatically displays the Chat Frame for each client included in the session, one by one and in the proper sequence. The frames may appear as a series of thumbnail icons, each of which references a client, and when the next session arises the chat window opens for that client. The individual sessions may be prioritized in the scheduling by the calculated number of days that have passed without any communication with that client, favoring the clients who have gone the longest. Payment may be an alternative means of prioritization, with the clients having the poorest payment record getting the lowest priority.

The Chat Frame will display the amount of time that is selected for each client's session. Chat begins. "Chat" is used in a broad sense, because instead of interaction by typed text, live video interaction in the style of Skype may be the medium of professional-client interaction. Thirty seconds before each chat session is over a warning message is displayed in the Linker and the Responder. The purpose is so they can get to the point and mention anything of importance that has not yet been said. When the time is over, the Chat Frame of the next client on the list is displayed, and so on. When matters control is provided the frame includes a link to any of the documents involved in the matter, so that the professional can discuss the documents during the session.

When Receiver One has finished his Power Session there is a break for a brief interval, the length of which the Protector has determined using the wizard that has provided the settings for the session, and after the break the session with Receiver Two begins. Receiver Two has been waiting for his turn to chat with the lawyer, in the virtual waiting room.

During the break, the lawyer can gather his thoughts, and if matters control is implemented in the application he can search to find and review the documents that will be involved in Receiver Two's matter, during the next session. To help the lawyer prepare, a note space is provided in each chat frame, so the lawyer in advance of the Power Session may organize his presentation to each client and focus on the main points. The notes may be generated in advance of the Power Session to familiarize the lawyer with each client's case and outline the discussion points in an overview, and a template may be used. This rehearsal step helps the lawyer sound like he is familiar with the case, as if he knew what he was talking about. The Encryptor loads the class and the notes or summary appears at in that client's window.

The business purpose of the Power Session is to ensure that the professional communicates with each client on a regular basis. The communication may be perfunctory, but that is better than no communication at all. The brevity that the process forces on the communication is good because it compels the client to eliminate the small talk and get to the point. The advantage for the lawyer is that the Power Session allows him or her (henceforth the use of the male pronoun is meant as conjunctive to include both sexes) to maintain a minimal amount of communication with all his clients, with the smallest total amount of time expended and through a procedure that schedules everything at the lawyer's convenience. The lawyer's malpractice insurer views the procedure favorably as a prophylaxis against the malpractice claims that result from a mere lapse in communication rather than actual professional negligence.

The Power Session is not limited to the attorney-client relationship. The technique works in many relationships: psychologist-patient, doctor-patient, teacher-student, manager-factory worker, priest-penitent, etc. to most relationships between a professional and the person seeking the professional's service there is a difference in the value of their time. The client of the professional pays for the professional's time, and impliedly the client's time is worth less than the professional's, so it makes economic sense that the burden of being on standby is foisted onto the client.

Figure 29:
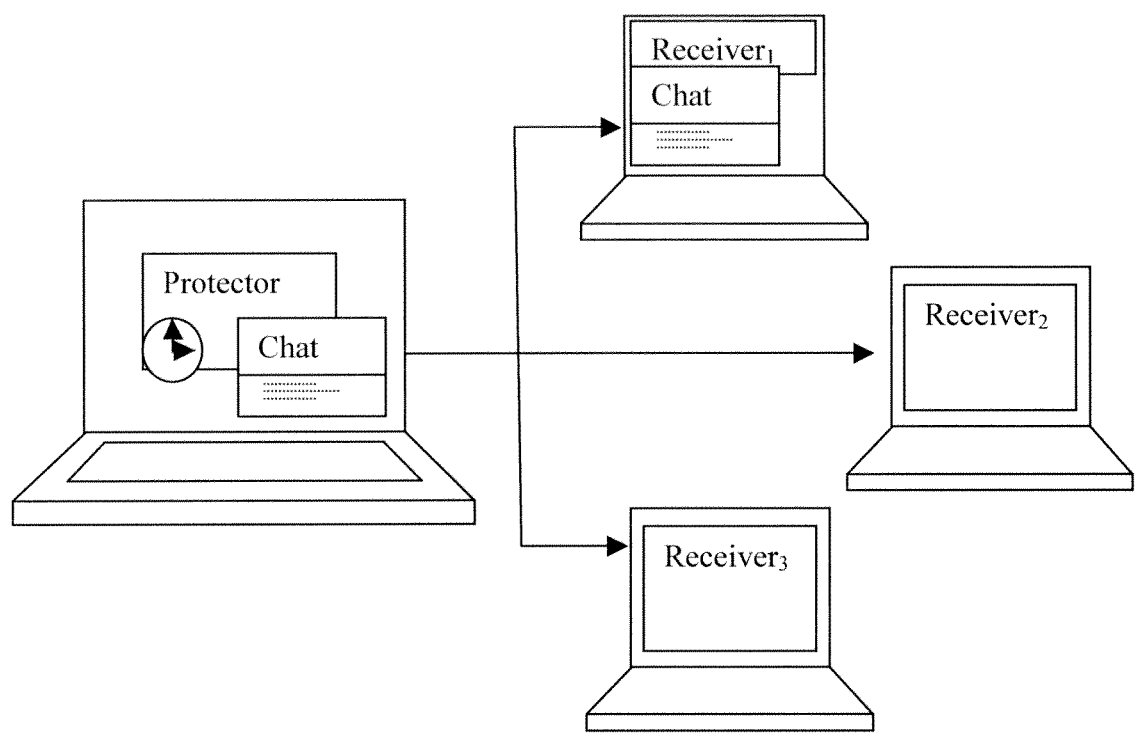
FIG. 29 Power Session has Started, connecting Receiver One . . .
Figure 30:
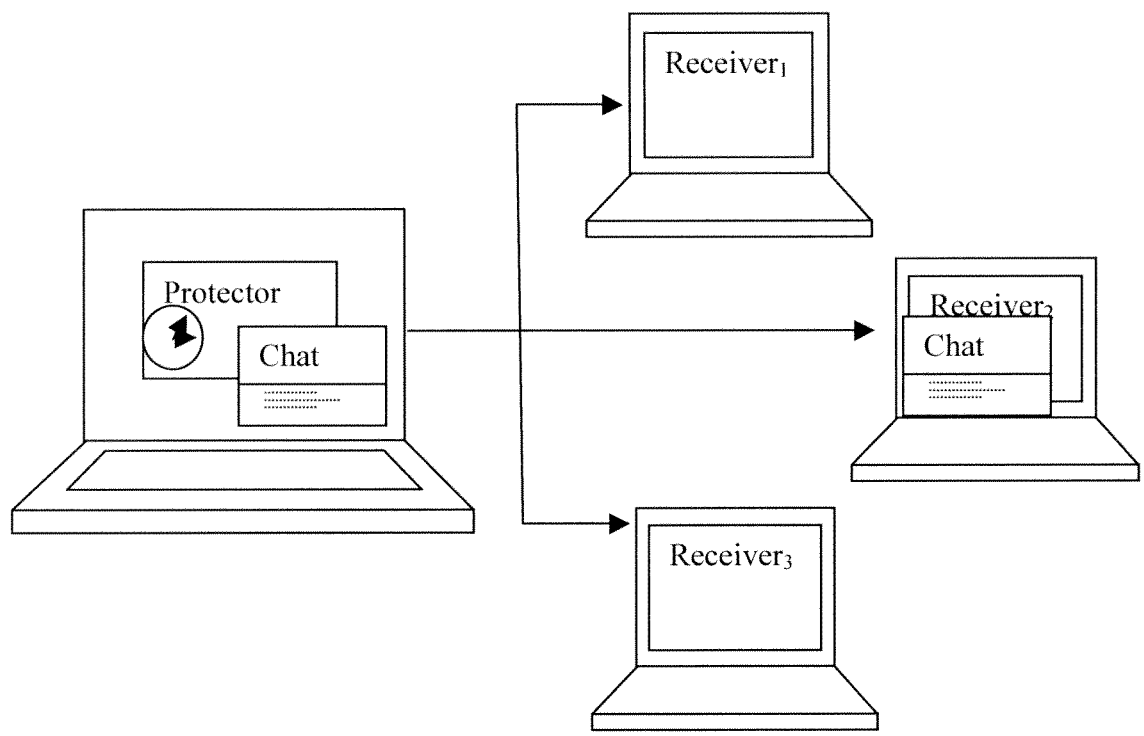
FIG. 30 Power Session with One ends, and session begins with Two . . .
Figure 31:
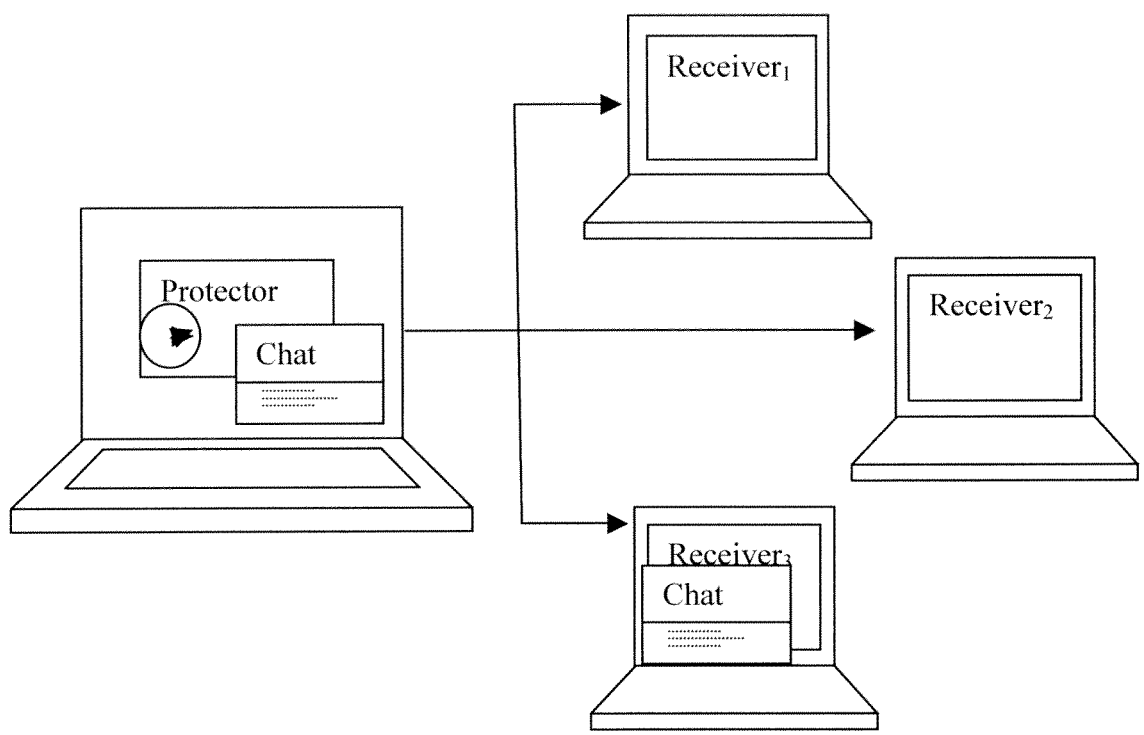
FIG. 31 Power Session with Two ends, and session with Three begins . . .

FIGS. 29-31 illustrate the Power Session. In FIG. 29 the Power Session has already started, and the current client is $Receiver_1$, the timer (represented as a clock shown to the left) is checking the time and when time's up communication starts with the next Receiver ($Receiver_3$, as can be seen in FIG. 30). FIG. 31 shows the chat session with the last Receiver.

The professional's application operates as a chat server that only connects to that particular professional to his clients, and not to anyone else. Because the only purpose is to connect the professional to his clients at a pre-defined time there is no need for a central server to inform the Protector of who may be online. The Power Session is a software function only subject to episodic use. Either the individual client meets his scheduled virtual appointment, or he doesn't. If the clients are online, they can communicate with the professional through his application, and if they are offline nothing happens.

Programmatic Detail

Server Communicator

Server Communicator is a Java library used whenever two applications communicate using the client server model and a packet of data is sent, such as in Power Session, or in the Switch to Protector communication. It differs from the communication through email, where an email server acts as a proxy between clients, because with Server Communicator packets are sent and received in real time. The packet contains data to be processed, for example a chat message, and a command that indicates to the recipient application how to process what is sent. The Server Communicator library is able to encrypt all of this communication, and encryption happens as a background task.

As another security measure, Server Communicator can restrict communication to a set of approved IP's. The IP's are stored in an SQLite database on the server. Whenever a client wants to establish communication, the Server checks the database, and if the IP of the client is contained in the set of acceptable IPs communication is established; otherwise, the client is rejected. GPS may be used as an additional filter, so that only when the correct IP is located at the normal latitude longitude coordinate is the data processed. This is discussed in greater detail in the satellite embodiments of Initiator, below.

The Code of the server that executes communication may be as follows:

```
1. public void executeServer( )
2. {
3.     try{
4.         server = new ServerSocket(serverPort);
5.         while ( true )
6.         {
7.             Socket s = acceptConnection( );
8.             if(s!=null)
```

```
9.      {
10.         ServerThread st = new ServerThread(s,
hClassProps,
11.                             commandsData);
12.         if(ELDXml!=null)
13.             st.setELD(ELDXml);
14.         st.start( );
15.      }
16.   }
17. }
18. catch ( Exception e )
19. {
21. }
```

The ServerSocket is created in line 4, using a port that was previously read from a configuration XML file. An endless loop is executed, so the server is always listening in the assigned port. All processing is paused while the server waits for a client to request connection. When a client tries to establish connection this happens through the acceptConnection( ) method. After a connection has been established, the thread that is going to process the communication is created, and if an ELD is available, it is sent on that thread so communication can be encrypted.

The next code segment corresponds to the acceptConnection( ) method:

```
1. public Socket acceptConnection( ) throws IOException
2. {
3.    Socket connection = server.accept( );
4.    String conIp =
conexion.getInetAddress( ).getHostAddress( );
5.    if(!restrictConnection) return connection;
6.    boolean flag = restrictConnection &&
isIPAccepted(conIp);
7.    if(flag)
8.        return connection;
9.    return null;
10. }
```

Line 3 is where the Server is listening to incoming requests. When a client has sent a request, the connection is accepted, and the LP of the client is taken. Line 5 illustrates when no restrictions are applied to connections. Any requester can establish a connection with the server. On the other hand if the connections are restricted, the IP of the requester is compared to a set of acceptable IP's, and if the requester IP is contained in that set the connection is established. Otherwise it is rejected. The method of the ServerThread that process the communication may be as follows:

```
1. private void processCommunication( ) throws IOException
2. {
3.    while ( true )
4.    {
5.        try {
6.            byte[ ] bytes =
7.
(byte[ ])clientInput.readObject( );
8.            byte useMeta-logic = bytes[0];
9.            byte[ ] dataBytes = removeExtraByte(bytes);
10.           dataBytes = decrypt(dataBytes, useMeta-logic);
11.           Vector data = (Vector) getObject(dataBytes);
12.           Object result =
stateController.executeState(data);
13.           if(result!=null)
14.               sendData(result);
15.       }catch ( Exception e )
16.       {
17.       }
18. }
19. }
```

The object sent by the client, an array of bytes, is read. The first byte of the array indicates if the data is encrypted with meta-logic, or with a "Housekeeping" encryption algorithm. "Housekeeping" encryption, a term used in the embodiments, is static encryption, which is to say an encryption algorithm that does not use any ELD or otherwise transmute from instance to instance, but instead is always the same. It is used if the value of the first byte is 0 it indicates it is encrypted with Housekeeping Encryption Logic. If the value is 1, then meta-logic (the corresponding Secondary ELD) is retrieved and used. The bytes resulting from the decryption correspond to a vector that contains the data, and is obtained in line 11 through the getObject( ) method. After obtaining the array of bytes, it is decrypted and then the Vector is obtained. The next step is executing the received command, that is, to execute the state according to that command. This step is performed by the State Controller. (Multiple states may execute simultaneously by using different threads.)

If a result is obtained from the processing it is sent back to the client. The sendData( ) method is in charge of sending the data back and is also in charge of performing the encryption of the data. The recipient of this data is informed whether the data is encrypted or not, by turning on or off the first byte of the array of bytes that contains the data to be sent.

The code of the sendData( ) method may be as follows:

```
1.  public void sendData(Object data)
2.  {
3.    try{
4.      byte[ ] bytes = getBytes(data);
5.      byte[ ] formattedBytes = null;
6.      byte useMeta-logic = 0;
7.      if(meta-logicXml!=null)
8.          useMeta-logic = 1;
9.      bytes = encrypt(bytes, useMeta-logic);
10.     formattedBytes = addExtraByte(bytes, useMeta-
logic);
11.     clientOutput.writeObject( formattedBytes );
12.     clientOutput.flush( );
13.   }catch(Exception e)
14.   {
15.   }
16. }
```

In line 4 the bytes of the data to be sent are obtained, so only bytes are sent and received. The next line checks if the meta-logic is available, and in line 9 the method that encrypts the bytes is executed. If no meta-logic is available, the encrypt( ) method uses the Housekeeping Encryption Logic algorithm to encrypt the bytes. In line 10, the addExtraBytes( ) method adds the byte that indicates if the data is encrypted with meta logic or Housekeeping Encryption, so the Client that processes the response is able to know what kind of decryption should take place. The last step is the sending of the bytes. This method is the counterpart of the processCommunication( ) method.

The functionality of the Client class is very similar to that of Server and ServerThread. The code for connecting to a Server may be as follows:

```
1. private boolean connectServer(ServerData serverData)
throws
2.
Exception
3. {
4.     for(int i=0; i<serverData.sizeOfServerArray( ); i++)
5.     {
6.         String serverIp =
serverData.getServerArray(i).getIP( );
7.         int port = serverData.getServerArray(i).getPort( );
8.         try{
9.             socketClient = new Socket(serverIp, consolePort
);
10.             connected = true;
11.             return connected;
12.         }catch(Exception e)
13.             { continue }
14.     }
15.     if(!connected)
16.         throw new Exception("Could not connect to
server");
17.     return connected;
18. }
```

The client reads the information of the Server from an XML text file, which may contain information showing not only one Server, but a list of them. The connectServer( ) method searches for the IP to which a connection can be established, testing them sequentially. If no connection can be established an exception is thrown.

The Security Strategy of Offline Encryption

In some of the other systems of encryption the scrambling of the bytes takes place on a central server, and contact with the server must be achieved for each act of communication. For example, chat may be effectuated through a central server and the server may transmit public keys reciprocally from one communicating party to another for encryption. SSL may be used in this approach, and AES as well. The exchange of keys may be triggered by a manual input by one or more users, indicating their assent to the encrypted transmission.

This differs from the embodiments. With the embodiments the dominion of the central server over the encryption execution process is eliminated, as the central server is only a logic switch. Encryption in one embodiment of the inventions occurs with none of the execution of the encryption occurring on the central server at all, as the encryption occurs completely on the Executors of the local applications. In another, highly orthogonal embodiment, this approach is taken to the extreme. Not only does all of the encryption execution take place on the local computers, but the ELD's also are generated completely without any terrestrial or Internet based communication at all: all of the ELD related data arrives at the computers via satellite.

This differs from other methods, which either encrypt the data on a central server, or exchange keys. For example, the Silent Circle approach to encryption on cell phones executes the encryption logic on the edge instead of on a central server, but does not generate new logic on an Encryption Switch. The Silent Circle email encryption product, circa 2013, uses keys and a central server.

The offline encryption approach is used in the Protector-Receiver architecture. Both the Protector and the Receiver client applications use ELD's to encrypt the data as they send the messages back and forth. The professional is the user of the Protector application and he uses that application to communicate with his clients, who use the Receiver application on the other end of the communication.

In places where Internet connections are not too reliable or bandwidth is low it is advantageous to use a system of ELD-based encryption in which the ELD's are executed off-line, instead of being received one at a time via a "nailed up" connection, as in the other methods of encryption. ELD's are used to encrypt files, so the files themselves are capable of carrying any of the values needed for a private encryption logic network to function.

A persistent online connection to a Switch through a port, in one embodiment, is one way to regulate such a network and supply it with ELD's. However this is not the only way because the encrypted file itself, operating as a bucket, can be the transport for the values to actuate encryption and execute the encryption on the local applications of the network. So an alternative method of providing ELD's to the network is to use the encrypted meta-files parasitically, for an incidental purpose: to carry down from the Switch the ELD's and any other values needed in the functioning of the client encryption applications. To keep the network supplied with ELD's, the encryption applications use the meta-file as container, with the ELD's traveling through the network by that means instead of through a port on the applications. So with this approach the transport mechanism for the ELD's is a bucket instead of a wire. In a hybrid embodiment the "bucket approach" is used so that the Protector supplies its Receivers with ELD's, but as between the Switch and the Protector a port is used instead of the bucket. The system is more secure and reliable if the Receivers have no open port to the Internet.

So instead of a permanent connection, with this offline architecture the ELD's may be downloaded and stored in advance of their use in a magazine that is part of the Protector application. Then the ELD's are withdrawn from the magazine, and may be provisioned into one or more databases to order them and look them up as the application needs them. This way of handling ELD's is more reliable than using a port, because the adequacy of the online connection to the source of the ELD's is not a precondition to success at the very moment the ELD is needed. The encryption application output files are traveling back and forth between the applications in any event, so using them as a transport mechanism in this parasitic fashion is an opportunistic substitute for "nailed up" Internet connectivity to the Switch. Information from the Switch is not available instantly nor all the time with this approach, but this is no impediment to communication because with proper design of the network all of the information can be supplied before it is needed. All that is required is for the magazine on the Protector to have an adequate ELD supply.

In Protector-Receiver the user logs onto the Switch each time he opens the application, and the handshake occurs as a background task. Because the Protector has stored some ELD's in its magazine, it can continue to function even if its contact with the Switch at the beginning of the session for some reason fails. Once the Switch and the Protector finish the handshake there is no need for further contact for the Protector to operate with its Receivers. There may be a failsafe feature, according to which the Protector and Receivers still communicate, but with reduced encryption richness in the event the Protector is not able to log onto the Switch. If the Switch cannot be reached Protector A and Protector B, though not yet enjoying a Secondary ELD, may still pass encrypted messages using only the Plain-Text ELD. (In this fall back method the Plain-Text ELD is not encrypted by the Secondary).

The Protector-Receiver Network keeps the Receiver applications supplied with ELD's and other updated information by using the files in a forward-and-store process. The technique treats the meta-files sent to the Receiver applications not as only a body of plain-text to present the message to the reader, but also as pawns to supply the virgin ELD's.

Thanks to this "parasitic" encryption logic provisioning technique, using the encryption meta-file as a bucket, the Protector-Receiver Network enjoys much of the same functionality as an application with an open port to the Switch, but without the concomitant hacking risk that exists when there is an open port. Reducing the online connectivity requirement by this strategy makes the Protector-Receiver Network less susceptible to network failures. Only one application, the Protector, has to link to the Switch, and it does so but intermittently. If it fails once it can try again, and the Protector can continue to function so long as it has some ELD's remaining in its magazine. This approach provides a margin of error. If there is no open Internet connection to the Switch there can be no hacking through that opening, so by operating in off-line mode the application is in effect sealed.

The off-line encryption approach lends itself to email applications because the opening of email messages is a process that in some embodiments happens on the local computer and not on the server, and the offline encryption strategy of the embodiments uses the same local approach to execution. Existing email accounts may be used with encryption functionality added to the mail messages using the embodiments.

The way the Receiver obtains its ELD's is as follows. The Protector holds the ELD's that it receives from the Switch in the magazine, and then takes batches of them out of the magazine, sending a batch to each of its Receivers. Through this staged process of cascading the ELD's downward through the virtual private network (UN), both the Protector and the Receiver remain supplied with ELD's to encrypt the plain-text that they send during routine communication. The ELD's auto encrypt each message when it is sent, and the ELD used in each act of encryption is parsed and used to auto decrypt the message upon receipt. This works for email and for chat.

This happens as a background task and by default, so the Protector and the Receiver enjoy secure communication with no user effort. This approach is easier than requiring the communicating parties to agree to accept encrypted messages or attachments from one another before encrypted communication happens. The "mother-may-I" approach to encryption of the other methods, using SSL, AES, etc., rather than using ELD's for the encryption logic in an automated process, is tedious. The method of the embodiments is easier than requiring the communicating persons, first, to agree to send each other certificates or keys, and then, manually to send them. With the embodiments in contrast to the other methods, each communication uses a pristine encryption logic recipe, a virgin ELD, and the encryption and trust granting process is a background task that requires the user to do nothing at all once the application has been installed.

When private logic tunnels are provided using the embodiments, authentication is provided for each Receiver through the Secondary ELD's. A unique Secondary ELD operates between the Protector and each of its Receivers, provisioned as their dedicated meta-logic when their trust relationship begins, operating as a permanent authentication tunnel. Unless the executors of both computers load the same Secondary ELD the decryption does not execute, so security is ensured.

The Protector has a Receiver Trust DBMS ordering the Secondary ELD's used with its Receivers, so that the Secondary ELD of each Receiver may be looked up and deployed when the communication session with the trusted counterpart computer is to commence. The Receiver application may have the Secondary ELD hard-wired into it, or in the multi-Protector version use a Secondary ELD looked up in a DBMS used to index the various Secondary ELD's that correspond to its several Protectors. The DBMS approach of the multi-Protector version allows a single Receiver to operate with a trust group of more than one professional, such as when a corporate vice president for legal affairs communicates with several law firms. This approach encourages compatibility in encryption logic across the entire VPN, creating a universal encryption ecosystem.

The magazine on the Protector may store the ELD's in a directory, the destination specified by a path for the download from the Switch. From the magazine of ELD's an individual ELD is extracted for each use to encrypt the plain-text. Furthermore, an individual ELD may be installed into the Protector's Trust DBMS to function as a Secondary whenever a new trust relationship is launched. The DBMS can sort the ELD's and any other values used in the network in an orderly fashion and enable look-up, so that the correct Secondary ELD may be invoked during the routine operation of the VPN, connecting the trusted counterparts through their private logic tunnel. The process may include invoking a Secondary or Tertiary ELD, and ultimately, yet another ELD to decrypt the plain-text. (As explained below, Tertiary ELD's are used in the initial grant of trust process per Initiator, so that from that point on the Secondary ELD is ready for use.)

In one approach to supplying the magazine with ELD's, there is a port on the Protector, limited to this sole purpose when it opens to the Internet. The port is open but briefly. The Protector goes online to reach the Switch to obtain ELD's, and that batch of ELD's pass through the private logic tunnel (the hard-wired Secondary ELD connecting the Protector and the Switch) that opens for the duration of the ELD transmission and closes after the ELD's download. The Switch DBMS contains the hard-wired Secondary ELD corresponding to each Protector, and the Switch looks it up each time there is contact with that Protector. Unless the Protector receiving the ELD download possesses the hard-wired Secondary ELD that truly corresponds to that Protector, the download remains encrypted and the ELD's are unusable.

In one of its embodiments the Protector goes online at an interval as infrequent as once per month in order to download ELD's from the Switch. Contact with the Switch can be made more frequent, though, and a good approach is for the Protector client application to log onto the Switch every time it is opened on the computer. The Switch handshake may occur with the Protector and the receipt of the ELD batch executes in the background, simultaneously as the Protector uses another thread to process the user's Cognitive Signature to decrypt the Trust DBMS.

The upshot is that Protector-Receiver may take the form of an architecture for communication between an attorney or other professional and his client, in which the encryption that is given effect by the dynamic class loading process and operates completely offline at run-time. The descriptor is what allows the encryption to execute: not any run-time server connection. The bytes of the messages are encrypted and decrypted, and this occurs before the messages are sent and after they are received, locally and automatically. Significantly, and in contradistinction to other methods of encryption, the scrambling of the bytes occurs completely on the local application and not on any central server. This is what is meant by calling the process off-line encryption.

Therefore it may be observed that the Protector-Receiver architecture, to the extent possible, forsakes online connectivity in favor of the security advantage of staying offline. This is an object of the invention. In the Protector-Receiver architecture the Protector's port to the Switch is almost always closed because real time full duplex communication is not one of its capabilities (except during the Power Session). And during this limited exception to the rule, the Power Session opens the Protector only to its own Receivers, and then only briefly, during the scheduled time of the session. The rest of the time the Protector and Receiver applications operate as nothing more than email clients transmitting meta-files with encryption effectuated through ELD's and Dynamic class loading, with authentication provided by the Secondary ELD's.

Protector-Receiver networks allow professionals and their clients to communicate by means of an encryption logic that is unique unto them, in a modality that can be characterized as encryption self-sufficiency. It is an example of the edge encryption strategy that the embodiments invoke to overcome the danger of "the Murdoch Hack." When the professional uses his Protector as his email application to contact his fellow professionals or his clients there is no need for any unencrypted plain-text ever to come into the possession of another party. The encryption of the emails occurs automatically, as a background task. The execution of the encryption logic happens only at the edge, on the Protector and the Receiver email applications. This is in contrast to other methods for the encryption of email, in which a central server is involved in each act of communication, such as the Silent Circle application of 2013. The local dynamic class loading process is what makes it possible to avoid the infirmities of the other methods.

Manual Grants of Trust Versus Automatic Trust Grants in the Embodiments

The Matrix of Secondary ELD's

Protector-Receiver overcomes the shortcomings in the other processes in initiating trust because the architecture does not require the handling or exchange of keys or certificates. No manual steps are required to establish trust. Because they are not exchanged, they cannot be intercepted and stolen. This is a significant advantage. Trust is granted when the private logic tunnels between the Protectors are constructed automatically, at the inception of the trust relationship, instead of manually by the user during each act of communication as in the other methods. Thus, the embodiments are not only more secure but also are easier to use.

The embodiments, therefore, meet a fundamental challenge in computer science. The embodiments overcome an inherent limitation in public-key cryptography, the "public key authentication problem," the conundrum identified earlier in the Wikipedia passage. It is respectfully submitted that the embodiments, by invoking the Secondary ELD technique, are the solution to this challenge. Dynamically implemented virtual private logic tunnels as the mechanism for granting trust are the answer. The auto generated, dedicated private logic tunnels in Protector-Receiver, a capability created at the inception when each individual application is generated, connect the enrolled users on a trusted network so that during each act of communication trust is granted as a background task.

With the embodiments enrollment is the touchstone of trust. The communicating persons enroll on a virtual private network. The context that the process of enrollment provides identifies the enrollee as trusted.

This contextual authentication methodology may be multifactorial. For example in Protector-Receiver, in one implementation called ClientConfdidential.net, a person must be a lawyer to enroll and receive his Protector application. His credit card, bar number, and other personal data is subject to verification before permission to download the Protector application is granted. The Protector application the lawyer will use is auto generated on the Switch, so that the personal information is integrated into the executable code, and as a result the application is usable only by that enrolled and authenticated person, who receives the customized application in a download. This orthogonal approach allows his personal data to generate customized code in the application, posing an obstacle to any impostor. For example, the Switch auto generates a serial id number for each Protector application. It associates this serial id number with the enrollment data of the professional to whom that Protector is assigned.

In one embodiment a live telephone operator verifies the identity of the enrollee, using a call back procedure to corroborate the physical location of the person calling in. The upshot of this contextual approach, using enrollment as a mechanism of authentication, is that the initial authentication of the person to be enrolled does not occur through solely electronic means, but at least to some extent through actual human interaction. The live operator may supply an activation code in the event that after the enrollee passes a checklist of authentication steps and if, in the operator's best judgment, the enrollee's bona fides are corroborated.

The existence of a personal relationship—or at least a human one—has long been used as a precursor to allowing an individual to use a network that poses a risk of fraud. For example, one very safe way to send an encrypted document over the Internet is to encrypt it and transmit using conventional password-based encryption, but without including the password in the transmission. After transmitting the encrypted document the sender calls the recipient on the phone and leaves a voice mail message, informing the recipient that the encrypted transmission is on its way, and stating the password. This is an example of contextual authentication. The recipient recognizes the voice of the transmitting party, or at least understands who that person is. This puts the communication in a human context, making the most of the mutual personal knowledge of the parties to establish genuine trust.

This is very secure but not at all automated, and in fact is quite time consuming. It is a burden to take the manual step of calling every time a document is sent, or the manual step of accepting the transmission of a document from the transmitting party by clicking on a button in a chat application. This illustrates why encryption under other processes, as a practical matter, has proven to be so burdensome that usually people don't bother with it.

Encryption done manually, therefore, poses a high transaction cost. Subjectively at least, the cost is difficult to justify because it is not measured against something that happens, but against a hypothetical harm that usually and hopefully never happens: the theft of data. Selling encryption software is like selling fire insurance, in the sense that it is hard for people to imagine the product actually ever being needed. Many people would never buy fire insurance if their mortgage lender did not require it. The same principle applies to encryption software.

In light of this, the economic justification for a new method of encryption is the ability to minimize the steps imposing the costly requirement of non-automatic, human action. This is an object of the invention. The embodiments, by providing default encryption as a background task, meet the goal. The labor-intensive user steps only occur at the inception, during enrollment. The user must enroll, and this may even require talking to a live operator. Several pieces of user identity may be captured in connection with the enrollment, providing a multi-factorial contextual milieu that authenticates the user. But in the total scheme of things this is not burdensome because it only occurs once, unlike phoning the password in to voice mail for every encrypted message, or agreeing to receive every encrypted transmission over a chat network by clicking on a button every time.

The labor expenditure imposed by enrollment is justified because the benefit is worth the cost. The fastidious enrollment process described allows the enrollee, after passing this identification step, to download his orthogonal, auto generated encryption application. From that point on the private logic tunnels implemented through the Secondary ELD's are the mechanism for authentication. The process once initialized is completely automated and occurs as a background task. There is zero effort required to conduct encrypted communication that not only scrambles the bytes of the messages, but also authenticates the communicating parties.

One could say that by using the embodiments the user does not authenticate the transmissions or encrypt them. The user authenticates the as-installed application, and the application authenticates the users and does the encryption. The application operates as the user's personal security avatar. Three intrinsic features of the architecture of the embodiments make this possible. The features combine catalytically to allow automatic encryption and authentication in a way not available in the other methods of data security.

First is the fact that each client encryption application, whether a Protector or a Receiver, is auto generated by an algorithm in a way that causes each application to differ from all others, guaranteeing orthogonality in each application. Each copy is a slave application with an individuated feature set. Each time the Switch generates a Protector, the subservient application, the master application specifies a unique private encryption logic tunnel for each slave. Each individual slave application generated is a unique instance of the Encryption Abstraction Layer of the embodiments, a unique recipe to use ELD's to create carry out encryption and authentication for the sessions. Additionally, each Protector has its own instance of the hash table for decrypting the Trust DBMS and its own hard-wired ELD, or its own instance of Housekeeping Encryption Logic, connecting it to the Switch.

This process of application individuation means that any knowledge gained in hacking one slave application is of no help in hacking the others. This eliminates "the monoculture problem." The extensive individuation of the encryption applications—including the customization of each application and utilizing the individual's unique knowledge and profile—differs from the other encryption methods.

Second, in the embodiments the application allows in each act of communication the creation of an encryption logic session object. The session object may be extremely complex, involving multiple ELD's that may interoperate programmatically using logical dependencies, and the object may be executed at various physical points of the network. The other methods do not use an encryption logic session object. In light of the foregoing, where R equals the resistance of the encryption system to hacking, where E equals the number of ELD's used each time the object is generated, and where P equals the number of physical points where a hacker would have to attack the system, it may be observed that $R=(PE)^2$.

Third, because the encryption logic uniqueness of the application is either hard wired into it or the result of an automated look-up, this fact obviates the user's need to remember anything for authentication to occur. The system, not the user, does the remembering. To the extent that the individual is required to remember something, that requirement is limited to his ability to log into his application using his Cognitive Signature. This consists of questions he personally has selected according to his best memory: in other words, a technique that minimizes forgetting. Voice printing may provide an additional barrier to hacking when the questions are answered verbally, and values received from the digital voice printing process may be an input into a supplemental encryption logic layer forming a sense-reference circuit. The need to remember passwords for the actual encryption is either delegated to the system or vastly reduced, because the Secondary ELD's are a substitute for passwords.

And in the one security layer where a password is used—the Cognitive Signature that unlocks the Trust DBMS—the password thanks to the expansion steps described above may be complex and huge, e.g. a set of Unicode bytes a fiftieth the size of the Bible. This is something far beyond the capacity of human memory. Because digital memory is substituted for human memory, the frailty of the human mind is does not limit the degree of randomness in the values used in encryption and authentication. From the point of login forward the requirement to remember anything is delegated to the digital system. Human memory is limited to the single requirement of remembering the Cognitive Signature, and this step is the catalyst for a cascade of programmatic steps instantiating the encryption session object, so that the act of remembering from that point forward is entrusted to digital means.

Therefore, the system does the remembering when it generates the encryption logic session object. The system leverages the user's personal memory. The digital means of the embodiments pose requirements far beyond the capacity of the unassisted human mind. It is not possible for a human to string together multiple algorithms and create a composite ELD, and then, look-up the Secondary ELD's at multiple points across the network. This means that it would be impossible for a digitally unaided human to instantiate the abstraction layer for the session. Under the principles of cognitive science, where the human memory capacity is indicated by H, and the memory capacity of the computer used is C, and R represents encryption robustness, it may be observed that $R=(C-H)^2$. Please see FIG. 32, explained below.

The system authenticates the user and provides the hundreds or thousands of private logic tunnels that the user needs by invoking the meta-logic, the Secondary ELD's, and this too is far beyond the power of simple human memory. The fact that the meta-logic is either hard-wired into the system at multiple points or is subject to automatic look-up by the system, allows a richer, more complex, and more random multi-point encryption logic scheme for a VPN than what is possible under the other methods. The system instantiating the Encryption Abstraction Layer in each case allows the auto-generation of an encryption logic session object, via complex encryption values and processes vastly exceeding a human's digitally unaided intellectual capacity. When the encryption logic is a session object, an instance of a class expressing an Encryption Abstraction Layer, far greater security is possible then the limited systems in which a human merely remembers a password. In the embodiments the human memory, effectuated through the Cognitive Signature, operates merely as a catalyst to the instantiation of the Encryption Abstraction Layer, rather than as something yielding a literal password that operates directly on the plain-text to be encrypted, through a single algorithm, as in the other methods. Greater encryption richness is possible when the auto generated, session-based Encryption Abstraction Layer of the embodiments is instantiated through an algorithmically generated encryption logic session object.

The fact that the abstraction layer in each session includes inputs from the edge precludes the operator of the central server or Switch from ever being able to crack the entire system, even if it is hacked. At the edge, the Secondary ELD decrypts the Plain-Text ELD and without this step the messages cannot be decrypted. The Switch has no control over the Secondary at all during the session, given the fact that the Secondary, which is an element that is pre-existing as to the session, is a necessary but not a sufficient logical input into the encryption session object for encryption or decryption to occur. The Protector randomly selects form its magazine the Secondary ELD for each receiver, which means that the selection step is a process completely independent of the Switch. The existence of the meta-logic at the edge is an overwhelming obstacle to anyone trying to hack the system from the center.

Figure 32:
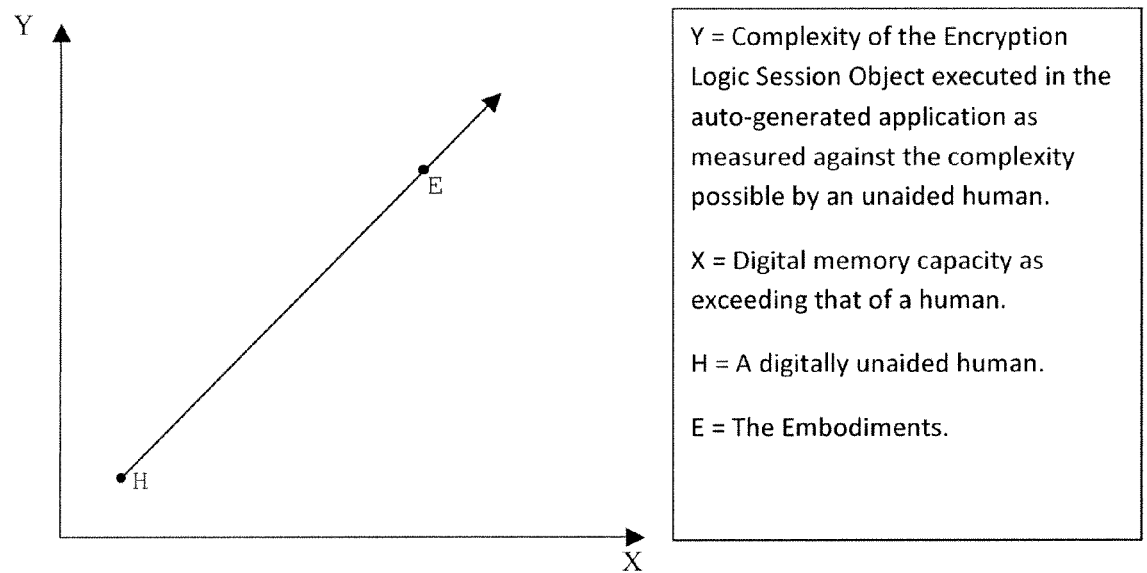
FIG. 32 Relationship between Human and Computer Memory . . .

FIG. 32 has two axes: the y axis showing the logical complexity of the encryption logic session object generated by the auto generated application. The x axis shows the degree to which the capacity of the system to remember a large encryption key and the other values used in the security process exceeds the recall capability a digitally unaided human mind. The diagram illustrates, for instance, the following fact. Under the embodiments a key may consist of a byte set corresponding to five hundred Unicode characters, thanks to the bytes expansion process described, so that the byte set may be (for instance) a fiftieth the size of the Bible. A digitally unaided human mind simply could not remember a key of that size. But the Cognitive Signature embodiments allow such a key to be auto generated, triggering the system to create an instance of the user's personal security avatar for the session.

The arrow in FIG. 32 represents the difficulty of hacking a system, identified by the values of x and y. The arrow begins at point H representing the capacity of a digitally unaided human. This point represents the logical complexity of a single algorithm, which is something that a human can deal with, and the maximum size of a password which a human can remember. Point E represents a point on the continuum of encryption richness made possible by the embodiments. At Point E, representing a key a fiftieth the size of the Bible, there is far greater complexity in the encryption logic session object as compared to H. This complexity is made possible by the algorithmic auto-generation of the encryption logic feature set provided in the application, which instantiates the encryption logic session object by using ELD's and encryption meta-logic. The greater complexity at point E is also made possible by the far greater memory capacity of the devices in the embodiments, e.g. the use of digital means to generate such a huge key, as compared to unleveraged human memory.

The capability represented by point E, representing the embodiments, may be thought of as a personal security avatar in the service of the human, at point H. The avatar extends the capability of the digitally unaided H as a participant in the processes of authentication and encryption. This avatar-like functionality is possible because of the architectural innovations of the embodiments just described.

Under the embodiments, after the enrollment process has provided a multi-factorial contextual verification of the enrollee's identity, each enrollee then may download his tailored, algorithmically auto generated client application and install it. From that point forward the system functions as the encryption and authentication avatar of the human user, the system generating a unique encryption session object for that human during each act of communication with the other enrolled persons. The Primary and Secondary ELD's perform encryption and authentication automatically, as a background task. The client applications not only execute ELD's during encryption to scramble the plain-text, but also deploy the ELD's as meta-logic in order to form the private logic tunnels at the edge of the network, by means of the Secondary ELD's, and these provide the authentication.

Thus, the overall process of granting trust may be seen as a personal authentication at the inception that takes place contextually, and then with that step complete, default authentication as a background task effectuated through the auto generated application and the dedicated Secondary ELD's. The human user delegates the power to manage authentication and encryption to an abstraction layer that operates at a complexity level beyond human capability. From that point forward the application does the "remembering" and handles authentication automatically through the Secondary ELD's and the auto encryption of the plain-text during the session.

Each application uses ELD's and Dynamic class loading to communicate with the other applications in a way that builds the encryption logic session object through programmed steps, and this happens automatically as a background task. This is more complex than the granting of certificates or public or private keys, such as under the other methods, for example the Silent Circle email encryption method circa 2013, or Adobe. Because the embodiments do not provide a single, central point of attack, the man-in-the-middle vulnerability is eliminated.

The result of using the embodiments is an auto generated, unique security scheme instantiated anew for each session. The method provides a matrix of meta-logic between the communicating computers performing a first encryption, the message being encrypted by a first descriptor, and then the second encryption, the first descriptor being decrypted by the second descriptor. The encryption logic is executed at distributed points on the network, so the system provides checks and balances that would require a successful hacker to be omnipresent to succeed. A critical distinction between the embodiments and the other methods is this: because an ELD is not only capable of encrypting the plain-text, but also can encrypt another ELD, a unique complex encryption scheme that includes recursion and logical dependencies may be generated for each session, as an object.

Detailed Illustration the Protector-Receiver Architecture

The Protector-Receiver architecture is highly orthogonal, as it uses a spectrum of encryption logic layers. The layers are as follows. First, in order to login the user needs to pass a Cognitive Signature authentication test, and this occurs on his Protector. The user needs to provide a true Mnemonic Input in order to login. Through a process the complexity of which may vary with embodiments, the input operates as a key, a decryption byte set. The key opens the Trust DBMS, the contacts list for the Protector application. The key is never transmitted across the VPN from one computer to another, because it only is used locally to encrypt and decrypt the Trust DBMS. The DBMS expresses all of the Secondary ELD's that operate as the private logic tunnels, so that each Protector is connected to each of its trusted counterparts through their private authentication logic "recipe." The Protector's contacts list is that user's personal web of trust, the Trust DBMS. With the DBMS decrypted, the Secondary ELD's can encrypt the Plain-Text ELD's that encrypt the meta-file body upon transmission and decrypt it upon receipt.

A Secondary ELD in the Trust DBMS also may be used to encrypt the Plain-Text ELD's that have encrypted the documents in the hard drive, giving the document storage system a lockdown capability. When messages are sent the Secondary ELD's are used to decrypt each random, Plain-Text ELD that encrypts the message plain-text during each act of communication, and the same Secondary ELD may be used to encrypt the as-stored document. A refinement of this functionality, the Travel Drive, is explained below. It keeps a laptop secure during business travel.

The Cognitive Signature is the alphanumeric string resulting from a user's answer to personal knowledge questions. The string may contain "shift number" characters such as !@#$%^&*, through an expansion step. The as-entered string is a comparator, and it must be repeatable by that answering person above a threshold level of N. This is a sense-reference circuit. The questions are ones which, to that user, are known with certainty.

The questions are selected toward the goal of a high likelihood that only that individual would know the answer, so they are questions such as "State the name of your grandfather's favorite dog." With each additional question posed the odds of a random hack grow exponentially more difficult. As the key is generated, a CAPTCHA like step, controlled by an instance of a hash table individuated in each application when it is auto generated, may specify shift number keys for the user to enter as part of the Mnemonic Input data entry.

The professional chooses his questions, which he will answer each time he logs in, first answers them through the initiation procedure that creates his Cognitive Signature. The initiation his first step after he downloads and installs his Protector application. The ostensibly matching Mnemonic Input must be entered the same way each time the professional logs in to his Protector, in order to generate a true key to decrypt the Trust DBMS. Without access to his decrypted contacts list the user of the Protector application is locked out because he has no access to the Secondary ELD's. Without a Secondary ELD the tunnel remains shut because the encrypted Plain-Text ELD in each message cannot be decrypted.

The Protector application may receive the ELD's from the Switch and store them in a magazine, like cartridges in a gun. When a Protector application is executed, it may establish a connection to the Switch at logon, or at every fourth logon, or once every twenty days, etc. It can connect whenever a limit detector signals that more ELD's are needed to top off the supply. The Switch uses its Encryption Logic Engine to generate the bundle of ELDs, eight hundred of them at a time in one embodiment of Protector-Receiver, so that the Protector may receive them as a batch and load its magazine up.

Before the batch of ELDs is sent to the Protector, the Switch encrypts the batch using the meta-logic that corresponds to that particular Protector. Recall that the Switch has its own Trust DBMS, so that for each download to the Protector the entire ELD batch is encrypted using the hard-wired ELD that corresponds to that Protector. When the Switch auto generates that particular Protector application, a randomly chosen ELD is hard wired into it to provide this private logical tunnel. As a result the batch of ELD's sent down from the Switch to that Protector's magazine is encrypted prior to transmission, and auto decrypted upon receipt. In fact, this hard-wired ELD encrypts all communication between the Switch and the Protector.

Figure 33:
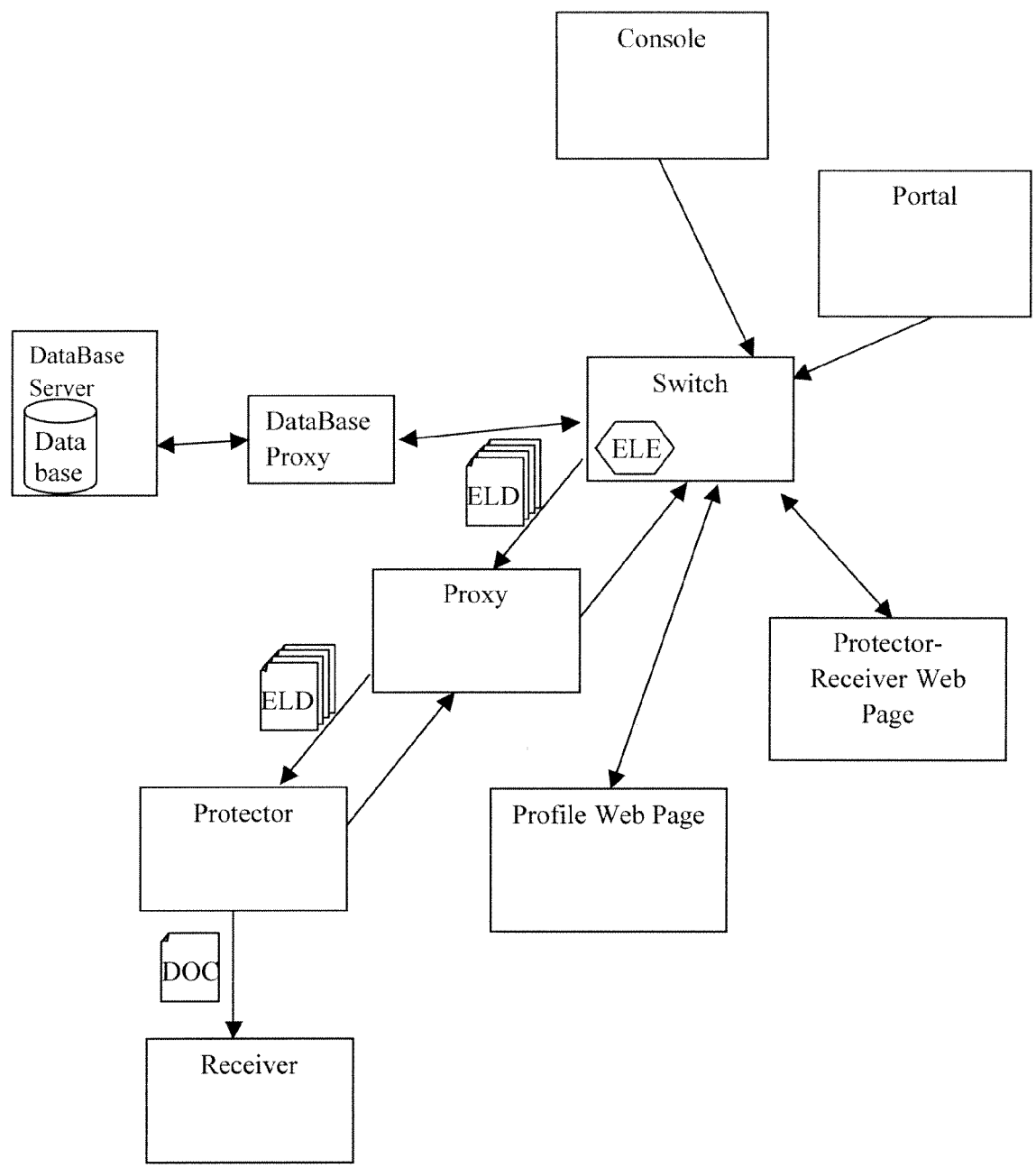
FIG. 33 Components of a Protector Receiver Network . . .

FIG. 33 shows the components involved in a Protector-Receiver Network. The components will now be summarized.

The Switch generates the ELD's using the "encryption logic engine" or "ELE." The end-user components of the Protector-Receiver network are the Protector and Receiver applications. The Receiver functions only as a dedicated message conduit, for the limited purpose of allowing the particular client who installs it to communicate with the Protector who generated it, and nobody else. In order for the Receiver applications to work properly, each one of them must receive an ELD supply. The Receiver is enslaved to the Protector who generated it, and the Protector provisions that Receiver with the ELD's from the Protector's own magazine. The process of supplying ELD's to the Receiver, therefore, amounts to scavenging. The Protector must receive those ELD's before it can supply them to its Receivers, and each Receiver scavenges some from its Protector. A name value pair in the meta-files that are transmitted form the Protector to the Receiver is included to supply these ELD's whenever more are needed.

Additional components of a Protector-Receiver Network may include a URL in the form of a web site where professionals register and download their Protector application. This may provide a servlet based profile page for each professional. The URL is used to enroll the professionals who will use their Protector applications. The right to receive them may be an incident to membership in a professional organization or guild, such as lawyers in the State Bar of a given state that offers the Protector to its members. The enrollment URL sends the data identifying the professionals who enroll to the Switch, which stores the information to a DBMS. See FIG. 33. The enrollment URL gathers the information useful in the multi-factorial, contextual authentication process, which may involve a live operator during enrollment.

The membership URL may contain an advertising function to benefit the professionals. The professional's profile page displays his professional data. If a person searches for a professional using a search engine such as Google the page provides the hit for the search. The profile page identifies the professional as one who cares about client data security enough to use automatic encryption in his client communication, so this speaks to his professionalism. The page not only plugs the professional, but plugs the encryption service too. An optional function of the profile page is to provide the presentation layer that allows the professional to download his customized Protector application, which is auto generated on the Switch and transmitted to the URL.

In Protector-Receiver the Console is the highest point of control over the network. The Console governs the network resources that allow the end user applications to work, such as the IP of the Switch, the Proxy, etc. The master administrator (analogous to the Super-user under UNIX) using the Console has access to the deepest level of network functionality. The Console has complete dominion over the Switch, which is a physical server operating multiple logical networks.

At a lower level in the architecture, the system integrators can build and operate the individual networks that invoke the common Switch. Each individual network is called a CryptoNet. The application that the system integrator uses to accomplish this is called the Portal. To ease the process of creating Protector-Receiver Networks an integrated development environment may be provided to each system integrator, and it may be part of the Portal or connected to it. The IDE simplifies the task of supplying to the network the ELD's that it will need. The task of the system integrator in supplying the ELD's to his network may be as simple as using the IDE to click on one of several pre-identified Switches, or a network of them.

A single Switch may supply ELD's to multiple networks. A network of Switches operating as super-nodes, with each Switch on a separate physical computer, can provide the ELD's too. Having more than one Switch available provides a fail-over capability. A proxy protecting each Switch may include the capability of re-directing the Protector's request to another Switch.

The Console is the highest level of control. The Console may utilize a "Console DBMS." The Console communicates with the Switch, and may use a proxy dedicated to this operation. The Console may be configured as a virtual server or as a physical, stand-alone server. The console DBMS contains information concerning each of the Protector-Receiver Networks as to which the Switch supplies ELD's, and the identities of the administrators of those networks and their passwords.

It is at the intermediate level, the network level, that each network administrator is provided with the Portal application for activating and deactivating the Protectors, the enrolled members who belong to a given network. The Portal is the administrator's dedicated network control application. Each CryptoNet receives its ELD's from the Switch. The Switch is controlled by the Console, under the dominion of the super-user who presides over all the networks. The Portal is at the middle level. At the bottom level of the CryptoNet network are the Protector and the Receiver, the end user applications. The hierarchy of control is as follows:

Console
↓
Portal
↓
Protector
↓
Receiver

A CryptoNet network may be very basic. The only communication between the Protector and the Receiver, in its simplest embodiment, is one way. This embodiment is a stripped-down version of Protector-Receiver in which the confidential documents sent from the professional to the client are encrypted, but there is no way for the client to make any encrypted reply. The professional prepares the binary file, it is encrypted as a background task, auto decrypted when received, and no further functionality is provided.

This minimal functionality works in some circumstances. The limited embodiment offering only one-way communication allows the client to receive confidential advice from a professional, and the messages are secure. The client receives the professional's advice and follows it, and in some cases this may amount to adequate communication. The ELD's that encrypt the plain-text of the messages flowing down to the Receiver are encrypted by means of a meta-logic that is "hardwired" into the Receiver, in one embodiment of this one-way architecture. When the Protector sends down a message, a look-up associates the particular Receiver with the encryption logic that was installed. This allows a unique logic scheme to exist as between each Receiver and its Protector. The "hardwired" ELD may be a Secondary ELD, but in the simplest version of all it is merely a Plain-Text ELD. The authentication provided in this manner, through a private logic tunnel differs from the other methods of encrypting cell phone messages, such as that of Silent Circle, which provides encryption but no authentication step.

This "light" architecture is suitable for cell phones. The user of a cell phone or Iphone has no easy way to prepare messages, such as a keyboard, so replying to the Protector with encryption is less facile than when a personal computer is used. Therefore this embodiment might make sense for a cell phone user, who can get by receiving encrypted messages and not replying, for example, while driving.

In a more advanced embodiment of Protector-Receiver communication is full duplex. The Receiver enjoys encryption functionality matching that of the Protector, as it automatically can encrypt and send a file, and receive and decrypt one as well. The initial meta-file passing from the Protector to the Receiver, taking advantage of the design philosophy of "the bucket approach," contains extra ELD's, so that the Receiver is given a supply of them to use to encrypt the data to be sent in reply. Like the Protector, the Receiver may have a magazine to store the ELD's. This is a suitable architecture for email and for chat.

In this embodiment, offering full duplex communication, the existence of a private logic tunnel between the professional and the client may be provided in order to establish authentication through Secondary ELD's. Per the contextual authentication approach described above, the fact that the Professional and the Client know each other means that real-world trust already exists, so using Secondary ELD's to generate the logic tunnel provides strong authentication. The professional supplies the Receiver application, which contains the tunnel, to the client. The professional knows his client, enrolls him on his group of trusted Receivers, and personally provides him with his Receiver application, and may give him an activation code so he can download his Receiver and install it. From that point forward the applications provides encryption as a background task and authentication as well through the private logic tunnels each time the Protector and Receiver communicate.

The Protector

Programmatic Details

The Protector may use chat. The Protector also may be an email client. In the case of email it may be a client application that uses an independent web-mail server such as Gmail©, or a pop or imap server. The Protector may use the user's existing email account to send the documents that the Protector auto encrypts to an addressee, or the professional may set up a new email account to be used exclusively for Protector-Receiver communication.

Because the Protector is only an email client application, the professional who uses it is spared expense and computing overhead by not having to host the user's email account. The Protector-Receiver architecture rides "piggyback" on other email servers or web mail severs that perform the server side tasks of email, so by taking advantage of this free resource, Protector-Receiver operates as a parasitic middleware layer. There is a server that is used in the architecture, the Switch, but this server does not host the email account Consistent with the abstraction layer design philosophy, that server is only the logic engine that supplies the ELD's. It may, however, handle ancillary tasks, such as the enrollment of the new users.

The Protector and the Receiver applications are in one embodiment highly modified email clients that can use web mail services such as Gmail™ or Hotmail™, as well as pop MAIL accounts. The Protector-Receiver architecture has been tested with Gmail circa 2013, and takes full advantage of the free functionality that Gmail offers to the user. The Protector lets the user enjoy automatic encryption via personal encryption logic by operating as a layer over existing email networks.

The Protector client application is similar to other email clients such as Microsoft's Outlook™, or Mozilla's Thunderbird™, in that it provides advanced email functionality including a contacts list, the adding an attachment, forwarding, etc. The difference is that the Protector receives ELD's from a network resource and stores them in its magazine in order to provide the automatic encryption and decryption of the messages as a background task. So one may see the Protector as Thunderbird™ plus ELD's and an Encryptor for dynamic class loading added to the basic email functionality, to auto encrypt and auto decrypt the messages, including a link to a Switch containing an logic engine where the ELD's are generated.

However, the logic engine that provides the ELD's need not be a URL or a web service. It is possible to incorporate the logic engine into the Protector natively, as a local resource. But putting the engine on the Protector presents the disadvantage of exposing it to reverse engineering. It is more secure if the mail application uses dynamic class loading to consume ELD's, but does not produce them, so that the mystery of their production cannot be divined by a hacker. Requiring that a URL supply the ELD's also presents the advantage that if the Protector user is in violation of the EULA his Protector is cut off and receives no ELD's.

Importing Information into a Cryptonet from the Internet

In one embodiment the Protector-Receiver Network email clients work in a closed system. To prevent the entry of any viruses, the encrypted message created by one Protector application only is usable by another Protector application. The network is not open the unrestricted Internet. The Protector is not a browser, nor can a browser read the encryption meta-files.

For general email purposes, the kind of email that on a daily basis subjects the user to spam, another account is used, not the account using the Protector. That other, ordinary account is a buffer that insulates the protected account. The ordinary account is like a sacrificial anode on a yacht that attracts the corrosion.

In one embodiment when the person who has a protected account reads his email in his ordinary account, not using his Protector to read the messages, he may forward that message to his protected account. He uses the standard forwarding function of his unprotected account to forward the message. Before the message is forwarded to the protected account, the anti-virus application already in use on the user's computer comes into play. The anti-virus application the user employs in the usual course operating through his normal email account examines the message and any attachment for viruses. When the user forwards the unprotected message to the email account that his Protector uses, he may save the Protector's protected email account address to streamline the forwarding process.

The Protector opens the forwarded message. The user may open it simply by right clicking on it, and with this step it is protected. So when he saves it is encrypted, automatically as a background task, by a Plain-Text ELD.

It may then be forwarded to other Protectors, using the Secondary ELD of each. By this technique, when the user of a Protector application wants to bring a document into his CryptoNet from an outside source, he may do so and the imported message gains encryption and authentication, per the embodiments. Once the message or attachment is forwarded to the protected account the Protector can open that non-protected document, and then using the right click menu, protect it. With that step the document is protected and may be sent to other Protectors and to Receivers with automatic encryption as a background task, and with the authentication that the Secondary ELD's provide. Another way to do this is to save the attachment from the unprotected account in the normal fashion, using the email application used on the user's conventional, unprotected account, and then use the Protector to open that saved attachment and encrypt it. Right clicking on the saved attachment accomplishes this.

The CryptoNet is only used for professional communication, and therefore needs to be free of spam. If the user of a Protector wishes to transmit a protected document to someone who is on the outside of the CryptoNet that may be done, but it is accomplished in a way that preserves security. The only way to transmit a message or document to someone on the outside of the Crypt® Net is to use the user's other, non-protected account, in the inverse of the process just described. The user may identify his protected account in his Settings menu on his conventional email client application, and this step automates the importation of the unprotected document into the Protector through forwarding. Likewise, the Protector allows the professional to streamline the forwarding process through settings or macros. (However, ease of use may trump security in one embodiment, if the wants to take that risk, and the outside document may be imported directly into the CryptoNet without these precautions.)

If the person attempts to use his Protector to send an email message to an unprotected account, which is to say that the address where the Protector is about to transmit the meta-file is on the outside of the CryptoNet, the Protector application discovers that such is the case when it performs the lookup for the Secondary ELD of that addressee. Any addressees who are not in the CryptoNet will have no Secondary ELD. Therefore, if no recipient Protector data is in the Trust DBMS, that logically implies the person is an outsider. Unless an exception is invoked, this situation would cause the Protector to decrypt the document and forward it to the user's designated non-protected account. The Protector notes the absence of the applicable Secondary ELD and uses this fact to trigger an exception to the attempted transmission. One solution is having a warning message appear, "User is not part of the CryptoNet. Send it anyway?" If the user wishes to send it anyway he must use his unprotected account, and the forwarding is automatic. If the user were to send it with his Protector the file would arrive in an encrypted state, as nonsense to the recipient.

In another solution, when the user of the Protector uses his non-protected account to come to the rescue. The non-protected account then acts as the firewall or proxy of the protected account. The user of that Protector must then open that conventional account and open the message forwarded from his Protector, and forward it again to the outside recipient via that non-protected account. Some email applications allow automatic forwarding, so the process need not be too cumbersome.

To trigger this functionality, when the Protector look-ups have been executed and it is clear that one or more of the proposed recipients of the message are not members of the network, two buttons appears, Outsource, and Cancel. If the Protector wants the message or attachment to reach the outsider, he clicks on Outsource. A dialog box appears reminding the user of the Protector application that he will have to open his unprotected account and use it to transmit the message to the outsider. A filter or a macro may automate this step, and this may be accomplished through the Settings menu on the Protector. Some email applications or browsers allow the user to administer security policies, and the policies may be broad enough to provide a high degree of automation in the outsourcing process. This approach is in keeping with the strategy that the CryptoNet should never be directly exposed to an unencrypted email account, so that spam and viruses are kept off the CryptoNet VPN.

Apart from the auto encryption functionality and the Report Card and the Power Session functions, the Protector application resembles a conventional email application. With the Protector or Receiver applications the email connection may be established using Java's Mail API and Activation Framework.

In another embodiment the auto encryption and auto-authentication functionality is not provided by an email application. It is incorporated into a plug-in used with a conventional email application such as Outlook™, or with a browser such as Fire Fox™. In yet another embodiment, the operating system allows the transmission of the output files of the various applications using the embodiments to auto encrypt and auto decrypt those files. The OS handles everything, so there is no need for a separate encryption application or plug-in. In still another embodiment, the encryption functionality is part of a Java applet that is auto-executed to encrypt the output files of each application as a background task. As in the email embodiment, the users may enroll through a URL in the alternative embodiments.

Whenever a file is going to be sent using the Protector, before transmission it is encrypted—which is to say wrapped—within a meta-file. (See the section explaining XML Meta-files above, concerning wrapping.) The interaction of the Protector and its Receivers involves the processing of the meta-files across a VPN. The VPN is closed to any intruder, because no data ever passes from the Protector to the Receiver or back unless it is encrypted, and no data is ever transmitted unless the client applications are used in the communication. The user must be enrolled and paid up. Not only is access from the open Internet limited by the tunneling function of the VPN, but moreover, everything is encrypted in layers at the end point. The layers effectuate encrypted transmission of the data through the liberal use of Secondary ELD's throughout the network during the logic-build process that results in the encryption logic session object. The Initiator module, explained below, is an example of the liberal use of meta-logic.

Figure 34:
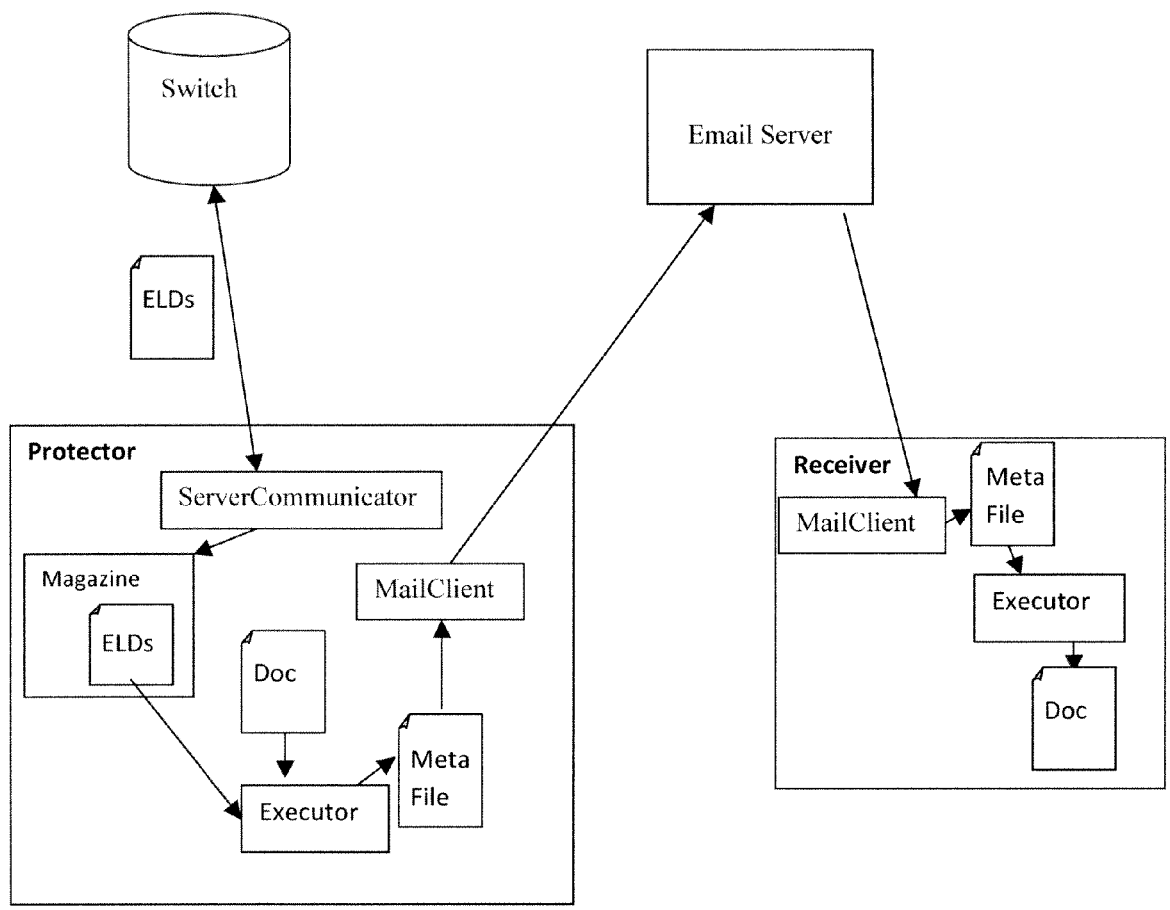
FIG. 34 Communication between the Protector and Receiver . . .

FIG. 34 illustrates how the Protector and the Receiver communicate. Other than contact with the Switch during the brief intervals when the ELD's are downloaded through the hard-wired meta-logic tunnel that connects the Switch to each Protector, the Protector email application is closed to the Internet (unless, of course, it is actually transmitting an email at that moment). The Receiver has no port to the open Internet whatsoever. The Protector-Receiver architecture takes advantage of its closed nature in an additional respect: each functional module of the network actuates the next module needed to complete the run-time functionality, in a cascade-like logic-build process. The formation of each module at runtime requires an input from a prior module, but not from an open port to the Internet, and never requiring any input supplied by a browser. The file system, using the bucket approach, is the mechanism to provide the descriptors in the logic-build process and the other values needed for the network to function.

The process resembles a row of falling dominoes. The three falling dominoes are the data outputs from Switch, the Protector, and the Receiver. The Protector is created on the Switch. The Receiver application is wholly the creation of the Protector. The Protector auto generates each Receiver application with whom the Protector wishes to communicate. The Receiver application is transmitted to the client as an attachment, and the client clicks on it, opens it, and installs it. Each Receiver is the slave of the Protector that created it, and each Protector is the slave or its Switch.

After the Protector has been constructed, its only subsequent contact with the Switch is when the ELD's are supplied to it, at logon. During this limited exposure to the Internet the Protector reaches the Switch through its private logic tunnel, thanks to the hard-wired Secondary ELD that encrypts the batch of ELD's installed to the magazine of the Protector.

The Protector Configurator

According to embodiments, after the Protector is downloaded it may be configured for use. This is done through the Protector Configurator, a small application that works as an installer. When the professional receives his Protector application from the Switch, after it has been auto generated, he receives the Protector Configurator along with it.

The Protector Configurator in one embodiment works in conjunction with the Windows® Registry. The Protector Configurator may be a Java class that modifies the Windows® Registry in order to configure the application and modify the right click menus that Windows uses for the files that the Protector will wrap and auto encrypt. This auto encryption functionality may be accessed through the Windows® Explorer. Access to the Windows™ Registry is via the WinRegistry™ library.

Figure 24:
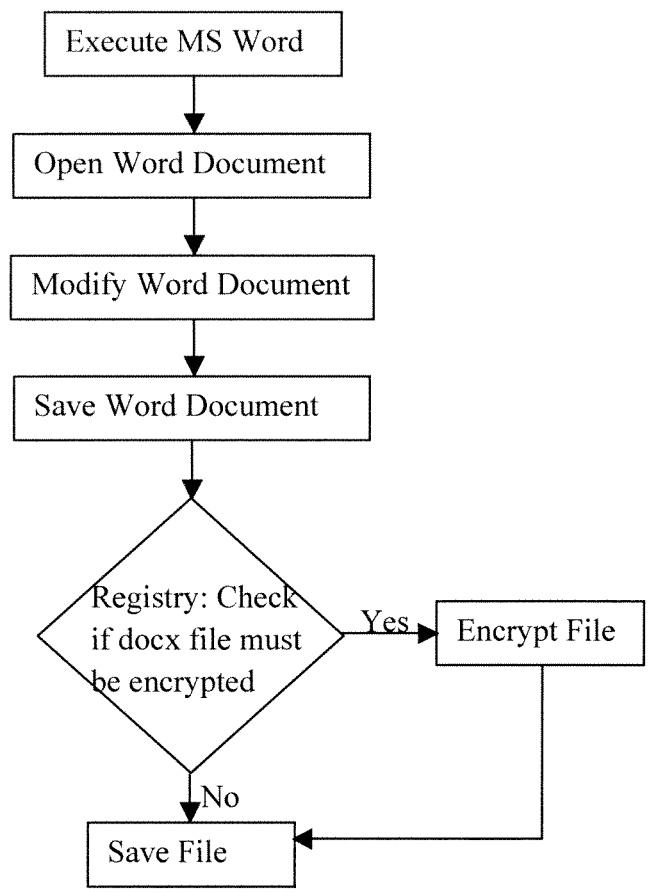
FIG. 24 Auto Encryption using Windows™ Registry and MS Word™ . . .

FIG. 23 illustrates the installation of the Protector, with OS detection. FIG. 24 shows the auto encryption of a file, triggered by reading the Registry.

In Windows®, and in general in any operating system, there are different types of files and they are identified by their extension, the letters after the dot in the string of characters forming the filename. The extension of a file is a brief description of the type of file, and it is given by the application that creates the file as its output. For example, in the case of Word, the extension of the documents created with this application is ".doc", or ".docx." In the case of image files, the extension corresponds to the format of the file, such as that of the Joint Photographic Experts Group (JPEG), which is ".jpg" or "jpeg."

The Windows Registry™ is a hierarchical database that stores configuration settings. It provides settings and options on MS Windows™ operating systems. It contains settings for low-level operating system components as well as the applications running on the platform: the kernel, device drivers, services, SAM, user interface and third party applications all make use of the Registry™. The Registry™ also provides a means to access counters for profiling system performance.

The Windows™ file system displays a menu whenever the right click button of the mouse is pressed while the cursor is on a file. The menu displays a set of options to process the file. For example, in the case of the Word™ document, the right click menu contains the options "Edit", "New", "Print", as shown in the FIG. 35.

The Registry™ records each file extension for all the different file types handled in Windows™. Several values related to the file type are stored, among them the identity of the application that opens files with the given extension. Also, in Windows™ there is a log for each application installed. The Registry™ may be thought of as a matrix associating file types and applications, in order to associate a set of file functionality with the application. In the Registry™ for an application there is a key that stores the data of the right click menu that corresponds to the files the application opens.

The key is the place where the right click menu is configured. The Protector Configurator checks the registry of the extensions of the files that are going to be protected (auto encrypted) and then obtains the list of all of the applications related to that extension. This limits the scope of the Protector's operation, so that only those applications whose output files are tested and certified to work with the "Protect" command are made available to that process. The Protector Configurator associates their extensions with the Protector. After the association, all of the applications chosen to be subject to the encryption by the Protector are modified so their right click menus can display the option "Protect." In the Windows™ version of Protector-Receiver the protected files have the ".prox" suffix.

The path in the Registry™ of an extension is as follows:

HKEY_CURRENT_USER\Software\Microsoft\Windows®\CurrentVersion\Explorer\FileExts\_file_ext\OpenWithProgids _file_ext Corresponds to the file extension that is going to be modified, for example ".docx"

In this code the list of Applications that open files with _file_ext is found. In the case where the file extension is ".docs", the list of applications is Word.Document.12, which is the ID for MS Word™. The Registry™ of an application that is modified in order to add new options to the right click menu is:

HKEY_CLASSES_ROOT\_APP\shell\_NEW_OPTION where _APP is the ID of the Application, such as Word.Document and _NEW_OPTION is the new option to be added. The Code that modifies the registry may be the following:

```
1. public void createRightClickMenuOptionsForApps(String fileExt,
2.           String newOption, String command) throws Exception
3. {
4.   List appsList = getApplicationIDs(fileExt);
5.   if(appsList!=null)
6.   {
7.     for(int i=0; i<appsList.size( ); i++)
8.     {
9.       Object appId = appsList.get(i);
10.      if(appId!=null)
11.        createRightClickMenuOption(appId, newOption, command);
12.    }
13.  }
14. }
```

The code first gets the list of applications related to the given file Extension, and after that the right click menu of each application is modified. The code that obtains the IDs of the applications may be this:

```
public static List getApplicationIDs(String fileExt)
{
  int root = RegistryReader.hkey_current_user;
```

```
  String path =
  "Software\\Microsoft\\Windows\\CurrentVersion\\Explorer\\FileExts"
;
  String key = "OpenWithProgids";
  String wholePath = path + "\\" + fileExt + "\\" + key;
  try{
      List list = RegistryReader.listValueNames(root, wholePath);
      return list;
  }catch(Exception e)
  {
  }
  return null;
```

The code for creating the right click menu Option may be this:

```
1. public static void createRightClickMenuOption(String app,
   String
2.          newOption, String command) throws Exception
3. {
4.   String path = app+"\\shell";
5.   int root = RegistryReader.hkey_classes_root;
6.   RegistryReader.createKey(root, path, newOption);
7.   path += "\\"+newOption;
8.   String key = "command";
9.   RegistryReader.createKey(root, path, key);
10.  path+="\\"+key;
11.  key = "";
12.  RegistryReader.setValue(root, path, key, command);
13. }
```

This code creates the new key that corresponds to the newOption in the right click menu of the files associated to that application.

The code of lines 6 and 9 is a function that uses the Win-Registry™ API that creates the new key. First, it creates the key of the new Option, for example, in the case of the Protector, that new option is "Protect", so the key that is created may be this:

HKEY_CLASSES_ROOT\Word.Document.12\shell\protect

According to embodiments, all the keys within the Registry contain a default value. In the case of the option of a right click Menu the value of the default value is the command line of the application that the option executes. For example, in the case of the Protect option, the value of the default value must be [PROTECTOR_PATH]\Exe\Protector.exe reduced %1 where [PROTECTOR_PATH] is the installation path of the Protector. The code that sets this value is line 12 of the previous code.

This configuration code is executed for each one of the applications corresponding to the file extension that is going to be protected. A Configuration XML is used to store all of the file extensions that the Protector will handle, per the results of the compatibility testing. The file extensions are defined by the system integrator of the Protector-Receiver Network when he designs the network, using the Protector-Receiver IDE. The system integrator does the compatibility testing, and a URL may provide assistance in that regard so that they may share knowledge. The Configurator is also responsible for registering the Protector under Windows™. It modifies the Registry™, allowing Windows™ to recognize the Protector as an installed application, and it also sets the Protector's working path. The working path is read by the Protector when it is executed, in order to access configuration files and other subdirectories the working path contains.

The code that registers the application may be the following:

```
1. public static void
2.                                       workingDir) throws
Exception
3. {
4.     String path = "Applications";
5.     int root = RegistryReader.hkey
registerAppAndWorkingDir(String app, String _classes_root;
6.     RegistryReader.createKey(root, path, app);
7.     path += "\\" + app;
8.     RegistryReader.setValue(root, path, "WorkingDir",
workingDir);
9. }
```

What this code does is to create the Registry path:
HKEY_CLASSES_ROOT\Applications\Protector.exe
This is done in line 6. Line 8 creates the value WorkingDir and assigns the working directory to it.

Programmatic Detail

The Receiver

The first user-level component of a Protector-Receiver Network is the Protector, and the second is the Receiver. The Receiver is the application that the client of the professional uses in order to auto decrypt the messages and attachments the professional sends and to auto encrypt the ones sent back to the professional in reply. The Professional uses his Protector to communicate with the Receiver of each client, and this is intended to be their only computer based communication link, in order to main professional confidentiality.

The Receiver, in contrast to the Protector, is in its most basic embodiment merely is a one way decryptor, a filter and not an email application. In this rudimentary embodiment it merely receives encrypted documents from the Protector and decrypts them by executing the ELD. In this simplest embodiment the Receiver may not handle email accounts, or access any such accounts to retrieve any email attachments, as it essentially is a file utility application, a bare filter and nothing more. This embodiment may work as an add-on used with email applications such as MS Outlook™, and it works by encrypting and decrypting an attachment to an email. Smart phones can benefit from this basic Receiver embodiment.

Once an email application has been used to read an email, and the attached document has been downloaded, this simplified Receiver detects attachments having the .prox extension and decrypts them automatically as a background task, using its Encryptor. In this embodiment a separate email application must be used in conjunction with the Receiver, such as MS Outlook™, Thunderbird™, or a browser to access web based email, like Hotmail™, or Gmail™, in order to operate. The Receiver does not handle the mail messages, but merely operates on the attachment, opening it and decrypting it and not modifying in any way the remaining functionality of the email application. Limiting the functionality to attachments simplifies installation, testing, and training because the email functionality used in the email or webmail message, and its transmission, is unaffected. This version may be practically invisible to the user, operating completely as a background task. Secondary ELD's may be used with this simple version of the Receiver, because full duplex communication is not a prerequisite to using private logic tunnels. When Secondary ELD's are used the messages are encrypted and the users are authenticated as well.

One advantage of this simple embodiment is that there is very little learning curve for the user, who continues to use his email application as before. His firewall is not an issue either, nor is his anti-virus application, because the emails and attachments pass through the network as before. If the user needs to he can create a rule under his anti-virus application so that all .prox files pass the firewall. This limited embodiment of the Receiver is merely, from the user's perspective, an invisible encryptor that decrypts things in the background using the advantages of automatic encryption as a background task. After the user installs this filter, he does nothing further to enjoy the benefits of automatic encryption and authentication. The user may enjoy communication security by the simple step of sending a cover email with the canned re-line, "Confidential Attached Document," such as via Gmail, and the attachment is protected.

In a slightly more complex version of the Receiver the background encryption auxiliary application not only receives and decrypts messages also replies with encryption. There is two way encrypted communication, but the user continues to operate his existing email application as before, without having to learn a new application. Both the attachments sent and the attachments received are auto encrypted upon transmission and auto decrypted upon receipt, and Secondary ELD's may be used as well. In this version the application is a plug-in that does not alter the look and feel of the existing email application, just as in the simplest version.

The Receiver in the most feature-rich embodiment is the full duplex version that operates as a complete email client, instead of merely alongside one. It may contain supplemental functionality such as the Power Session. It has a fully responsive communication capability, just as the Protector does. In this embodiment the Receiver application enables two-way messaging with fully automatic encryption/decryption, and mutual authentication as well. When the Receiver and the Protector in this version send files to and from one another all of the files go back and forth in encrypted form, and the Protector and the Receiver are both mail clients.

The Receiver may be auto generated so that it uses a dedicated ELD that automatically is associated with the Protector who created that Receiver application. Providing such a dedicated ELD establishes authentication by virtue of the fact that only with the common ELD is there mutual intelligibility between the applications. This mutual intelligibility only exists where the counterparts already have agreed to enter into trust by sharing that ELD, which may either encrypt the plain-text directly, or operate as a Secondary ELD.

A Receiver in one embodiment may communicate with multiple Protectors, as noted above. This version is appropriate if a particular person who has installed a Receiver wishes to communicate with more than one professional who happens to use a Protector. In this case there is a DMBS on the Receiver to associate each Protector with that Receiver. The identity of the particular Protector is expressed in the meta-file message, and the as-identified Protector is used to perform the association of that Protector with the corresponding Secondary ELD in the Receiver's Trust DBMS, connecting the Receiver to that Protector. So in this case the Secondary ELD is not "hard-wired" into the Receiver application, but looked up from the DBMS on the Receiver application in each instance of use.

This multiple-Protector capability is useful because it provides encryption compatibility to a high degree, and among the largest possible universe of users. For example, a corporation might have hundreds of legal matters, and communicate with dozens of lawyers about them. When the corporation uses the multiple-Protector version of the Receiver application there is no problem achieving encryption compatibility. The corporate officers who direct the litigation can have automatic encryption with all of the lawyers, regardless of which firm they belong to, enjoying a private logic tunnel to each of them, with everything for security occurring automatically as a background task. The Receiver the corporate legal officer uses looks up the Secondary ELD corresponding to each lawyer automatically and executes it by default. The corporate officers do not need to remember a different password for each lawyer, or learn a different encryption application depending on which law firm they are dealing with on any given case. The encryption compatibility advantage of the embodiments over the other methods, as well as the ease of use afforded by its automatic nature, are a striking difference.

Programmatic Detail

The Receiver Configurator

Whether the Receiver is of the simplest embodiment, the plugin filter version for one-way decryption, or is in the more advanced email client embodiment, in either case it is configured and registered during the installation process, just like the Protector is. It is not necessary to use Windows™ in order to do the configuration, but Windows™ is a good way to do it. When Windows™ is used the Registry is modified in order to register the Receiver and to detect .prox files and process them.

The Receiver Configurator may register the Receiver and the .prox files using the following code:

```
1.  private void registerFileAndApplication( ) throws Exception
2.  {
3.      Hash table h = createHashtableSettings( );
4.      byte[ ] bytes = (byte[ ])h.get("EXT");
5.      String fileExt =
6.              (String)object.util.ObjectToByteUtil.getObject(bytes);
7.      bytes = (byte[ ])h.get("APP");
8.      String app =
9.      (String)object.util.ObjectToByteUtil.getObject(bytes);
10.     bytes = (byte[ ])h.get("COMMAND");
11.     String command =
12.     (String)object.util.ObjectToByteUtil.getObject(bytes);
13.     command = appPath + command;
14.         Util.registerFileExtAndApplication(fileExt, app,
command);
15. }
```

This code reads an XML configuration file that stores the extensions of the files that, per the compatibility testing, are going to be processed, and the name and the Command line that executes the application. This command line is added to the Registry™ and related to the Receiver Application so that when a .prox file is double clicked, Windows® is able to know what application to open the .prox file with. When the application runs under Windows™ an autoexec.bat file can be used to simplify this step. The auto-exec.bat file may be supplied to the new user along with the Configurator. This XML configuration file is read, and the contents are stored in a Hash table from which the Name-value pairs are read. Each of the Name-value pairs is used in the registration process. The Registry™ that is modified adding the Key "Receiver.exe":
  HKEY_CLASSES_ROOT\Applications\Receiver.exe
After the Receiver application has been registered under Windows™, the value that stores the Receiver's installation path is entered. Once the Receiver has been registered the ".prox" files can be processed by double-clicking them.

Programmatic Detail

The Decryption Process

Figure 77:
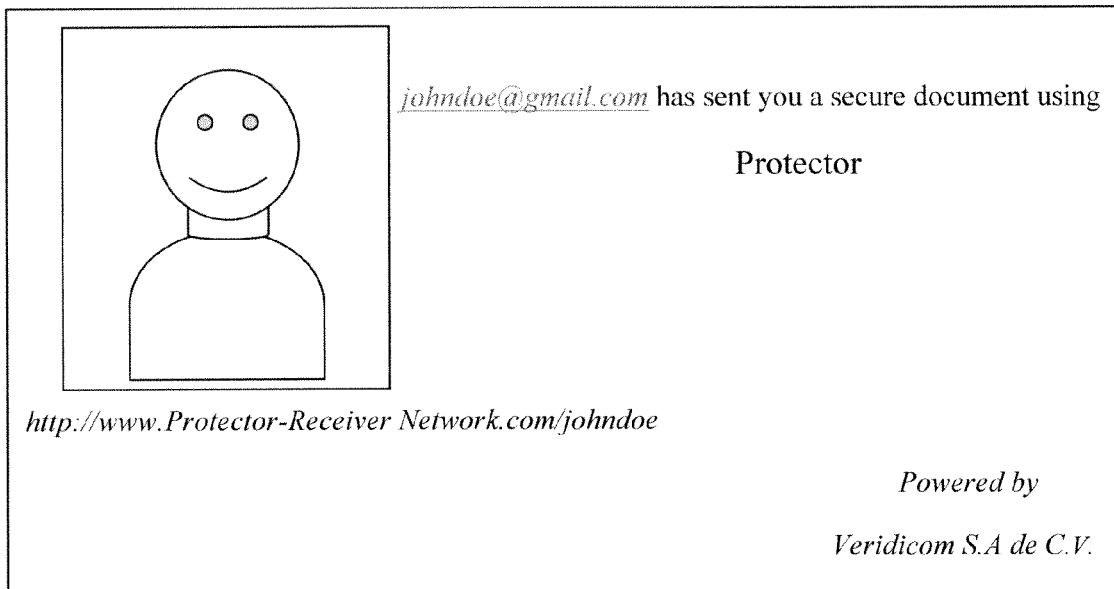
FIG. 77 Receiver Splash Screen with Photo of the Professional . . .

Once the .prox file sent by the Protector to the Receiver has been transmitted and the user of the Receiver double clicks it, the Receiver parses that meta-file. After the contents of the header are extracted they may be stored in a hash table, which is used to create a splash screen. The splash screen is a process that, for the convenience of each user, executes in the foreground while in the background the body of the file is processed. (The splash screen may execute immediately so that the wait that the user experiences while the file decrypts is attenuated, it least subjectively.) The splash screen displays the profile picture of the professional, his email address, and the servlet-based profile page or a link to it, as shown in FIG. 77. The interval used to process the plain-text may vary according to the complexity of the encryption logic and the computing resources brought to bear. For example, if a GPU and parallel processing are used to execute the encryption, the many cores of the GPU may multiply the compute power, making the process very rapid. The ELD, contained in the Header of the meta-file, is decrypted (using the Secondary ELD) and then it is used to decrypt the plain-text of the file. Once the file has been decrypted it is stored with the name and extension contained in the body of the meta-file.

The code that processes the meta-file may be the following:

```
1.      public String processMeta-file(File meta-file, String filePath)
2.      {
3.          try{
4.              meta-file.xml.XFileDocument xmlDoc =
5.                  XFileDocument.Factory.parse(meta-file);
6.              meta-file.xml.Body body =
xmlDoc.getXFile( ).getFile( ).getBody( );
7.              String fileName = body.getName( );
8.              String ext = body.getExt( );
9.              fileName = fileName + ext;
10.             byte[ ] bytes = body.getBytes( );
11.             file.io.FileIO.writeFile(filePath+fileName, bytes);
12.                 return filePath+fileName;
13.         }catch(Exception e)
14.         {
15.         }
16.         return null;
17.     }
```

The file is parsed in lines 4 and 5, and in line 6 the Body of the file is obtained. In lines 7 and 8, the name and extension of the file are taken from the body of the meta-file, and in line 10 the encrypted bytes are taken. These bytes are stored in a file with the given file name and extension in line 11. After this code has been executed, the file that was stored may be decrypted using the following code:

```
1. public static String decrypt(File f)
2. {
3.   String fileToDecrypt = f.getAbsolutePath( );
4.   String decryptedFilePath = processmeta-file(f,
fileToDecrypt);
5.   byte[ ] bytes = file.io.FileIO.readFile(decryptedFilePath);
6.   byte[ ] decryptedBytes = decryptFile(bytes);
7.   file.io.FileIO.writeFile(decryptedFilePath, decryptedBytes);
8.
9.   return decryptedFilePath;
10. }
```

This is done through a class provided by Java called Desktop. When the file has been decrypted and saved, the Receiver opens it and displays it. The Desktop class uses Windows™ low level programming in order to detect, by reading the Registry™, the application that must be used to open the file, per its given extension.

In order to increase security and to allow Receivers to decrypt the .prox files that are sent exclusively from the associated professional, the ID of the professional may be stored in a local database on each Receiver. The Trust DBMS may be used for this purpose. Thanks to this database a single Receiver, as noted above, may operate with more than one Protector. When Secondary ELD's are used in the Protector-Receiver communication, the Secondary ELD in this version must be looked up, as it is not "hard-wired" into the application. Every time a meta-file is to be processed it is associated with the ID of the professional that is in the corresponding name-value pair of the meta-file, and as a result the Secondary ELD corresponding to that professional is looked up. This may be performed per the following code:

```
1.  public static boolean readProfessionalId(String receivedId)
2.  {
3.      File dbFile = new File(dbDir+dbName);
4.
5.      Vector fields = new Vector( );
6.      fields.add("name");
7.      fields.add("id");
8.      com.database.DBMS DBMS = new com.database.DBMS(dbDir,
            dbName);
9.      String table = "professional"
10.     Hash table results = DBMS.selectData(table, fields, null);
11.     Vector ids = new Vector( );
12.     ids = (Vector)results.get("id");
13.         return ids.contains(receivedId);
14. }
```

An SQL-Lite database is used in this embodiment, and the class DBMS is in charge of manipulating the data. The class performs the transactions on the database (reading, writing, modifying, etc.) Basically, this code retrieves the stored ID from the table "professional," and compares the result with the received ID, the one that was taken from the header of the meta-file. For greater security, the ID may be encrypted when it is stored and decrypted when it is retrieved, by Housekeeping Encryption Logic.

Programmatic Detail

Modularization and the Module Loader

Object Oriented Programming allows software applications to be implemented through the totally flexible approach of Modules. Modules are the building the blocks containing the functionality of the program. For example, consider a hypothetical application using a menu frame. In non-modular applications the code of the main frame of the application and the code of the menu bar of the application can be contained within a single class. The problem is the class is very lengthy. Also, if the functionality of any of the components of the application (the main frame and menu bar, in this case) needs to be modified or updated, the whole class must be modified, recompiled and re-packed.

On the other hand, if each of these components is programmed as a module, then the application would consist of two of them: a Main Frame module and a Menu Bar module. In the case where only the Menu Bar needs to be modified, only that module would undergo modification. Using modules also makes it easier to update the application, as this approach takes full advantage of OOP. Furthermore, through Dynamic class loading and by using XML as the "recipe" describing the modules to be loaded, the modular approach is even more flexible. This is the technique is used in Protector-Receiver.

A special super-module performs the loading of the other modules. The Protector and the Receiver both are formed by this technique. This super module is called Module Loader. It reads the XML that describes the modules, the JAR file of the modules, the path of the Jar File, the name of the main class of the module, and the methods to be executed when the application is booted and when the application is terminated.

The Switch prepares the Protector application for each professional, who downloads it and installs it. It should be kept in mind that while all modules are JAR files, not all JAR files are modules. This is to say, part of the Protector application is generated by the loading of modules but part of it is not. The Encryptor (the dynamic class loading element) is not loaded from a module, in one embodiment. It is already present in the basic Protector application the Switch prepares for each professional and downloads to him.

The generation of the Protector application, insofar as the modules go, is explained below. The Schema that defines the structure of the modules XML may be as follows:

```
<?xml version="1.0" encoding="UTF-8"?>
<xs:schema xmlns:xs="http://www.w3.org/2001/XMLSchema"
elementFormDefault="qualified">
<xs:complexType name="Modules">
    <xs:sequence>
        <xs:element name="Module" type="Module" minOccurs="0"
                                               maxOccurs="unbounded"/>
    </xs:sequence>
    <xs:attribute name="jarPath" type="xs:string"/>
</xs:complexType>
<xs:complexType name="Module">
    <xs:sequence>
        <xs:element name="constParam" type="Param" minOccurs="0"
                                                  maxOccurs="unbounded"/>
        <xs:element name="InitData" type="InitData" minOccurs="0"
                                                    maxOccurs="unbounded"/>
        <xs:element name="FinData" type="InitData" minOccurs="0"
                                                   maxOccurs="unbounded"/>
    </xs:sequence>
    <xs:attribute name="Klass" type="xs:string"/>
    <xs:attribute name="JarPath" type="xs:string"/>
</xs:complexType>
<xs:complexType name="InitData">
    <xs:sequence>
        <xs:element name="Methods" type="Method" minOccurs="0"
```

```
            maxOccurs="unbounded"/>
    </xs:sequence>
</xs:complexType>
<xs:complexType name="Method">
    <xs:sequence>
        <xs:element name="Params" type="Param" minOccurs="0"
                                                maxOccurs="unbounded"/>
    </xs:sequence>
    <xs:attribute name="Name" type="xs:string"/>
</xs:complexType>
<xs:complexType name="Param">
    <xs:sequence>
        <xs:element name="stringParamValue" type="xs:string"/>
        <xs:element name="intParamValue" type="xs:int"/>
        <xs:element name="integerParamValue" type="xs:integer"/>
        <xs:element name="byteParamValue" type="xs:byte"/>
        <xs:element name="boolParamValue" type="xs:boolean"/>
        <xs:element name="floatParamValue" type="xs:float"/>
        <xs:element name="doubleParamValue" type="xs:double"/>
        <xs:element name="longParamValue" type="xs:long"/>
        <xs:element name="byteArrayParamValue" type="xs:base64Binary"/>
    </xs:sequence>
    <xs:attribute name="type" type="xs:string"/>
</xs:complexType>
    <xs:element name="Modules">
        <xs:complexType>
            <xs:sequence>
                <xs:element name="Modules" type="Modules"/>
            </xs:sequence>
        </xs:complexType>
    </xs:element>
</xs:schema>
```

The two main complex types in this schema are Modules and Module, and the rest of the complex types (InitData, FinData, Method and Param) are secondary types used by the primary complex types. The Modules Tag is used to describe the list of all of the modules to be loaded. The Module Tag defines all of the attributes needed in order to load a module, and its parameters are:

constParam.—The List of parameters for the constructor of the module;

InitData.—Contains the List of methods that must be executed when the main application is executed;

FinData.—Contains the list of methods that must be executed when the application is terminated;

Klass.—Defines the binary name of the main class of the module;

JarPath.—Defines the path of the jar file of the module;

An example of an XML based on the previous Schema is the following:

```
<Modules>
    <Modules>
        <Module Klass="contacts.manager.ContactsManager"
                                JarPath="ContactsManager.jar">
            <InitData>
                <Methods Name="initContactsFrame"/>
            </InitData>
        </Module>
        <Module Klass="protector.database.manager.DatabaseManager"
                                JarPath="ProtectorDatabaseManager.jar">
            <InitData>
                <Methods Name="createCommunicationDatabase"/>
                <Methods Name="updateStatus">
                    <Params type="boolean">
                        <boolParamValue>true</boolParamValue>
                    </Params>
                </Methods>
            </InitData>
            <FinData>
                <Methods Name="updateStatus">
```

-continued

```
                    <Params type="boolean">
                        <boolParamValue>false</boolParamValue>
                    </Params>
                </Methods>
            </FinData>
        </Module>
</Modules>
```

The above XML describes two of the modules (ContactsManager and DatabaseManager). The first module contains only Initialization Methods' data (InitData), and it corresponds to only one method (initContactsFrame), which is executed without parameters. The second module (DatabaseManager) contains initialization data, and also finalization data. In this case, InitData contains two methods, createCommunicationDatabase and updateStatus. The latter method uses a Boolean parameter with the "true" value. Only one method is called when the application is terminated, updateStatus, now with the "false" parameter.

The code of the ModuleLoader, where the modules are loaded, may be the following:

```
1.  public static void loadModules( )
2.  {
3.      Java.io.File xmlFile = new Java.io.File(modulesXmlPath);
4.      try{
5.      app.command.processor.ModulesDocument xmlDoc =
6.  app.command.processor.ModulesDocument.Factory.parse(xmlFile);
7.      app.command.processor.Modules modules =
8.  xmlDoc.getModules( ).getModules( );
9.      app.command.processor.Module[ ] moduleArray =
10. classes.getModuleArray( );
11.     for(int i=0; i<moduleArray.length; i++)
```

```
12.    {
13.        app.command.processor.Module module = moduleArray
[i];
14.        String jarName= module.getJarPath( );
15.        String binaryName = module.getKlass( );
16.        DynamiClassLoader classLoader = new
17.
DynamicClassLoader(urls);
18.        classLoader.addFile(jarPath+jarName);
19.        classLoader.setClassName(binaryName);
20.        Object instance = classLoader.createInstance(null,
null);
21.        GeneralObject go = new GeneralObject(instance);
22.        hModules.put(binaryName, go);
23.   }
24.   }catch(Exception e) { }
25. }
```

In the previous code example in lines 5-6 the XML is parsed and the list of modules is obtained. An array with the modules is created, in order to obtain each array in the loop that follows (lines 11-23). In lines 13-15 the attributes of the module are obtain in order to load the module, by means of the DynamicClassLoader (lines 16-22), an instance of the proprietary GeneralObject class is created, and the instance is stored in the hash table of modules. The GeneralObject class is a class that allows the dynamic execution of methods of the loaded classes.

The Module Loader is used to generate both the Protector application and the Receiver application. The modules of the Protector in one embodiment are:

Receiver Generator
Email Processor
Initiator
Protector Database Management System
Contacts Manager
Template Manager
Protector-Switch Connectivity
Travel Drive
Report Card Each module will be described below, but first the manner in which the users register on the network will be examined.

Client Registration

In order for a professional to securely communicate with his clients through the Protector-Receiver architecture, the client must register on the Protector's private trust network. The enrollment of a client involves the step of sending of an email with a special form attached to it, the invitation packet mentioned above. The client must provide the data requested in the form and send it back to the Professional, and he uses his Receiver to do this.

The packet that is sent to the client may use the following code:

```
<ClientData>
    Name=[_____]
    Address=[_____]
    Phone Number=[_____]
    Mobile Phone=[_____]
    email=[_____]
    Employer's Tax Payer ID=[_____]
    Do you have Open cases with this firm?=[_____]
    Are you taking Legal Action against Person or Entity=[_____]
    Name of the Person or Entity=[_____]
    Tax Payer ID of Person or Entity (in case you know
it)=[_____]
</ClientData>
```

An example of a filled in form is shown below:

```
<ClientData>
    Name=[John Smith]
    Address=[H Street, 234, Chula Vista, California]
    Phone Number=[619 124687989]
    Mobile Phone=[619 164597896]
    email=[jsmith@gmail.com]
    Employer's Tax Payer ID=[123456789]
    Do you have Open cases with this firm?=[No]
    Are you taking Legal Action against Person or
Entity=[Person]
    Name of the Person or Entity=[William Johnson Dawson]
    Tax Payer ID of Person or Entity (in case you know
it)=[123456789]
</ClientData>
```

After the client has provided the data in the form, he sends the filled-out form back to the professional. When the professional's Protector retrieves the form the Protector parses it, retrieves the data, and stores it in the Trust DBMS.

The code that parses the form and obtains the data may be the following:

```
1. public Hashtable parseDataFile(byte[ ] bytes)
2. {
3.    String content = new String(bytes);
4.    StringTokenizer st = new StringTokenizer(content, "\n");
5.    while(st.hasMoreTokens( ))
6.    {
7.      String token = st.nextToken( );//Get the current token
8.      if(token.isEmpty( ) || !token.contains("=")) continue;
9.      String fieldName = token.substring(0,token.indexOf("="));
10.     String value = token.substring(token.indexOf("[")+1,
token.indexOf("]"));
11.        hData.put(fieldName, value);
12.   }
13.    return hData;
14. }
```

First, the bytes of the form are received as a parameter of the method that parses it. The actual contents of the form are obtained from the bytes on line 3. The next step is tokenizing the String to obtain each row of data. After tokenization the tokens (a token corresponds to a row of data) are obtained in order to extract the name of the field and its value. (In the previous example of the filled form a name of a value would be "Name" and its value would be "John Smith"). The name and value are stored in a hash table. After the hash table has been obtained, the next step is storing the values in the Protector's client DBMS.

```
1. public void insertData(Hashtable hData)
2. {
3. String id = hData.get("email");
4. Vector v = new Vector( );
5. String cell = hData.get("Mobile Phone").toString( );
6. String phone = hData.get("Phone Number").toString( );
7. String address = hData.get("Address").toString( );
8. String name = hData.get("Name").toString( );
```

-continued

```
9. String employersTaxPayerID = hData.get("Employer's Tax Payer
ID")      10. String openCases = hData.get("Do you have Open
cases with this
                                                           firm?")
11. String personOrEntity = hData.get("Are you taking Legal
Action
                                               against Person or
Entity");
12. String nameOfPersonOrEntity = hData.get("Name of the Person
or
                                                         Entity");
13. String TaxIDOfPersonOrEntity = hData.get("Tax Payer ID of
Person or
                                  Entity (in case you know it)");
14. v.add(employersTaxPayerID);
15. v.add(TaxIDOfPersonOrEntity);
16. v.add(nameOfPersonOrEntity);
17. v.add(personOrEntity);
18. v.add(openCases);
19. v.add(cell);
20. v.add(phone);
21. v.add(address);
22. v.add(name);
23. v.add(id);
24. com.database.LDBMS ldbms = new LDBMS(databaseDir, dbName);
25. ldbms.insertData("contacts", v);
26. }
```

The values obtained with the data parser of the Client application are taken from the hash table on lines 3-13. Next, those value are added to a vector (see lines 14-23). The last step consists in using the LDBMS (SQL Lite) class in order to insert the data into the client DBMS.

Programmatic Detail

The Generation of a Receiver

The professional downloads and installs his Protector Application and uses it to communicate with his clients, who use their Receivers, in a way that provides a unique, private encryption logic recipe for each. To achieve this the Protector auto generates each of the Receiver applications that the clients will use. (This mimics the process occurring earlier, in which the Protector application is auto generated on the Switch. The architectural feature of auto generating a dedicated private logic application that communicates with a higher layer may be repeated n times.) The Receiver application is tailored to each individual client. The Protector Application auto-installs into each individual Receiver application a dedicated Secondary ELD, or alternatively in the Multi-Protector version, installs the Secondary ELD in the Trust DBMS that the as-generated Receiver includes, entering it as the one that corresponds to that Protector.

If the client does not have his Receiver application, it is impossible for him to decrypt the messages that his professional sends using the Protector application because it has no way to decrypt its Secondary ELD—or for the matter the Plain-Text ELD either. He cannot use his browser or conventional email client application to read the message. Therefore, the client's status as having installed a Receiver or not is a threshold condition for communication.

If the Protector already has generated a Receiver for a client and that client already has been provided with it, the professional's Protector application presumes that the client has installed it and is using it. (Erroneously or not, this is taken as a given). In light of this assumption, the Protector application treats the file accordingly by auto encrypting it, using the Secondary ELD installed in the Receiver application when it was generated to encrypt the Plain-Text ELD, and send the resulting encryption meta-file to the email address of that Receiver.

After the client has been registered on the professional's Protector application the professional can exchange secure emails with him, and authentication and encryption occur automatically as a background task. But before this can happen the client's Receiver application must be generated, transmitted to him, and installed. The generation of a Receiver involves the customization of the application for the particular client to whom it is sent. An ELD is permanently designated for that Receiver-Protector communication link, and that ELD is stored in the Protector's client DBMS so that it may be looked up and executed as the Secondary during each communication. That ELD in its functional effect amounts to a private encryption logic tunnel between the Protector and that Receiver.

When a secure email is going to be sent to a client, the Protector checks in the Trust DBMS if his Receiver has been issued. If the answer is no, then a Receiver is generated, per the following steps. First, the professional emails an invitation packet to the client. The Protector also may generate and send the email that is the cover letter to the packet. Because the Protector has noted that the client being contacted has no Protector, it suspends encryption for this initial letter and sends it out unencrypted. A flag in this meta-file may correspond to this state, so that the packet may be a .prox file, but one that does not cause default encryption or decryption. Because of the flag the packet when it is returned is not auto decrypted by the Protector. Because what is being sent is only an empty invitation and not a confidential communication, there is little risk to data privacy in sending it without encryption. Alternatively, the professional may use his ordinary account to send the invitation packet to the client. Another, more secure approach is to send out the packet as an MS Word™ file, using the native encryption capability of that application, and the professional leaves the password on the client's voice mail account, instructing the client to open it with Word™ and stating the password. The latter approach is another example of taking advantage of the context of the relationship to provide security, as the client will recognize the lawyer's voice and gain assurance, this personal contact serving as a catalyst for the automated procedures that follow as a result.

By one means or another the client returns the data packet, filled out. After the packet is filled out it is auto encrypted via Housekeeping Encryption Logic. The Protector receives the packet and uses the data it contains to generate the Receiver application for that new user. Because the filled-out packet is a special .prox file, and because the Protector recognizes the receipt of the packet as the first instance of communication with that client, this process is completely automated on the Protector.

Then, the Protector prompts the professional send the newly generated Receiver application to the client. The client's pre-existing email address, just used to send him the invitation packet, now is used to send the Receiver application that was generated in reply to the invitation response packet just received and processed on the Protector. As before, a the professional or his assistant may leave a password on the client's voice mail to unlock the Receiver application so it can be installed. The client will use his ordinary email application to open the Receiver attachments, just as in a conventional email. Included in the attachments are the Receiver Configurator and the Receiver application that the Protector has just auto generated, and finally, a "readme" file instructing the client on what to do to install his Receiver. In the Windows version an autoexec.bat file also may be included.

After receiving his Receiver the client opens it and installs it. With that step his Receiver is ready and the client can communicate with his Professional via Protector-Receiver auto-encrypted and auto-authenticated communication.

The code that detects if the recipient already has a Receiver may be the following:

```
1.  if(contactsManager.isClient(recips[0]))
2.  {
3.    String status = contactsManager.getContactStatus(recips[0]);
4.    if(status.equals("false"))
5.    {
6.      receiver.packer.ReceiverPacker rp = new ReceiverPacker( );
7.      rp.sendReceivers(recip[0]);
8.    }
9.  }
```

Line 1 checks if the recipient is a client, if so, checks his status. This status check indicates whether the recipient already has a Receiver (if so the status would equal "true"), and if the status is false, it means no Receiver has been sent. In the latter case, the Receiver is sent by the ReceiverPacker instance (see lines 6 and 7).

The code of the send Receivers( ) method of line 7 in the previous code maybe as follows:

```
1.  public void sendReceivers(String[ ] recips)
2.  {
3.    mailSender = preparemailSender( );
4.    packReceiver(ELD);
5.    String attachment = appPath + "data\\receiver\\Receiver.exe";
6.    String subject = Bundle.getString("SendReceiverSubject");
8.    String message = SENDER_EMAIL + Bundle.getString("SendReceiverMsg");
9.    mailSender.postMail(recips, subject, message, attachment);
10. }
```

The mail sender is prepared in line 3. The receiver is generated in line 4. The email is prepared in the next 3 lines, and finally the receiver is sent in line 9. Then the professional's Protector application, by installing a randomly chosen ELD from the batch of ELDs in the Protector's magazine, installs the dedicated Secondary ELD into the incipient Receiver application, and records that step in the Protector's Trust DBMS. (The code sample above is for the single Protector version of the Receiver).

The code of the packReceiver( ) method in line 4 of the previous code may be as follows:

```
1.  public void packReceiver(String ELD)
2.  {
3.    String receiverInstPath = appPath + "data\\receiver\\Receiver.exe";
4.    String dbPath = appPath + "sqlite\\";
5.    pDBMS.insertProfessionalData(SENDER_SITE, SENDER_EMAIL, ELD );
6.    String command = "jar -uf Receiver.app.jar " appPath + "sqlite\\contacts.sqlite";
7.    CommandLineExecutor.executeCommand(receiverInstPath, command);
8.    insertELDintoReceiver(ELD);
9. }
```

The command line executor of line 7 is in charge of executing the command. The command consists of the JAR instructions for modifying a .jar file (see line 6). The command is executed in line 7 and the ELD is added to the receiver in line 8. The code of the insertELDintoReceiver( ) method, in one embodiment, is shown below:

```
1.  public void insertELDintoReceiver(String ELD)
2.  {
3.    String installerPath = appPath + "data\\receiver\\";
4.    String protectorJarPath = "Contents/Resources/Java/";
5.    command = "jar -uf Receiver.jar serial.id";
6.    CommandLineExecutor.executeCommand(installerPath + protectorJarPath, command);
7.    String xmlPath = installerPath + protectorJarPath + "ELD.xml";
8.    ELDXml = EncryptionDocument.Factory.parse(ELD);
9.    Java.io.File xmlFile = new Java.io.File(xmlPath);
10.   ELDXml.save(xmlFile);
11.   command = "jar -uf Receiver.jar ELD.xml";
12.   CommandLineExecutor.executeCommand(installerPath + protectorJarPath, command);
13.   command = "jar -uf " + appName + " " +protectorJarPath+"Receiver.jar";
14.   CommandLineExecutor.executeCommand(installerPath, command);
15.   file.io.FileIO.rmDir(toRemove);
16. }
```

The serial id and the reserved Secondary ELD are inserted into the Receiver via this code. The command for inserting the serial.id file is created in line 5 and executed in the next line. The ELD is parsed and stored in permanent memory in lines 8-10, and inserted into the application (by means of the command line) in lines 11 and 12. The customized Receiver application is inserted into the installer in lines 13 and 14. Once the Receiver installer has been generated, it is sent in the sendReceivers( ) method.

With that step the client has received the complete package of everything needed for encrypted communication using his designated Receiver. Once the Receiver has been sent, received, installed, and configured, from that point forward the professional and the client communicate with encryption and authentication occurring automatically, as a background task. Both the professional and the client may achieve this by using their existing mail account, or if they wish, by opening a new one. All of their messages and attachments go back and forth through the Protector and the Receiver in a secure way, and they use of the Secondary ELD that has been installed into the Receiver to identify one another as trusted, all of which makes their communication very difficult to hack.

Programmatic Detail

The Email Processor Module, and Encryption by the Protector

The Email Processor Module processes all of the email related activity on a Protector-Receiver network, from the creation of the meta-files that are sent, the encryption of body of the message and the attachments, and the actual sending and receiving of the emails. The module also retrieves the emails, filtering them according to the email address of the senders, and processing the retrieved emails. The Email processor executes the Secondary ELD's, but the Secondary ELD's are installed by another module, the Initiator which is presented below in four embodiments.

Whenever a file is going to be transmitted by the Protector to the Receiver, it is auto encrypted and then it is sent. The file is "protected," per the nomenclature of the invention.

Figure 35:
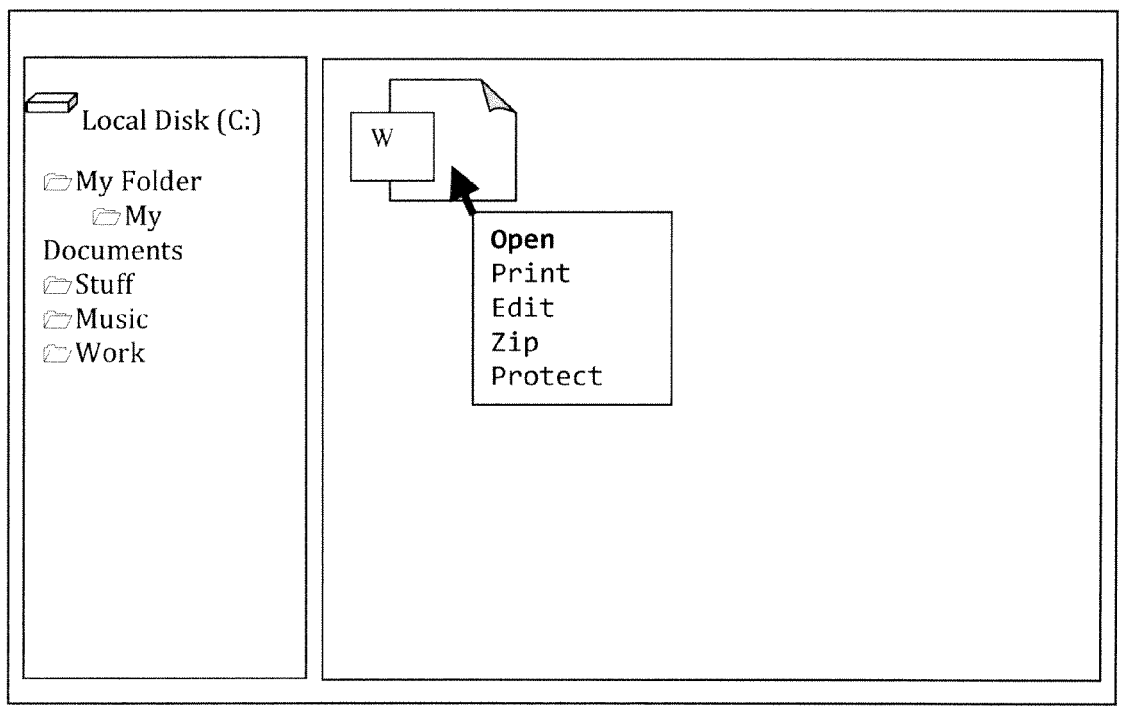
FIG. 35 Windows™ Explorer Adapted for use with Dynamic Encryption . . .

There are two ways a file can be protected. In the first case, an output file that is previously known to be of an extension that can be protected, per the compatibility testing of the application that produced that file, is right-clicked under the Windows Explorer™. Then the right click menu is displayed, showing the Protect option (as can be seen in FIG. 35), and the user clicks it. With this click the Protector is executed, with the selected file path displayed on the "Attachment" field, as seen in FIG. 36.

Figure 37:
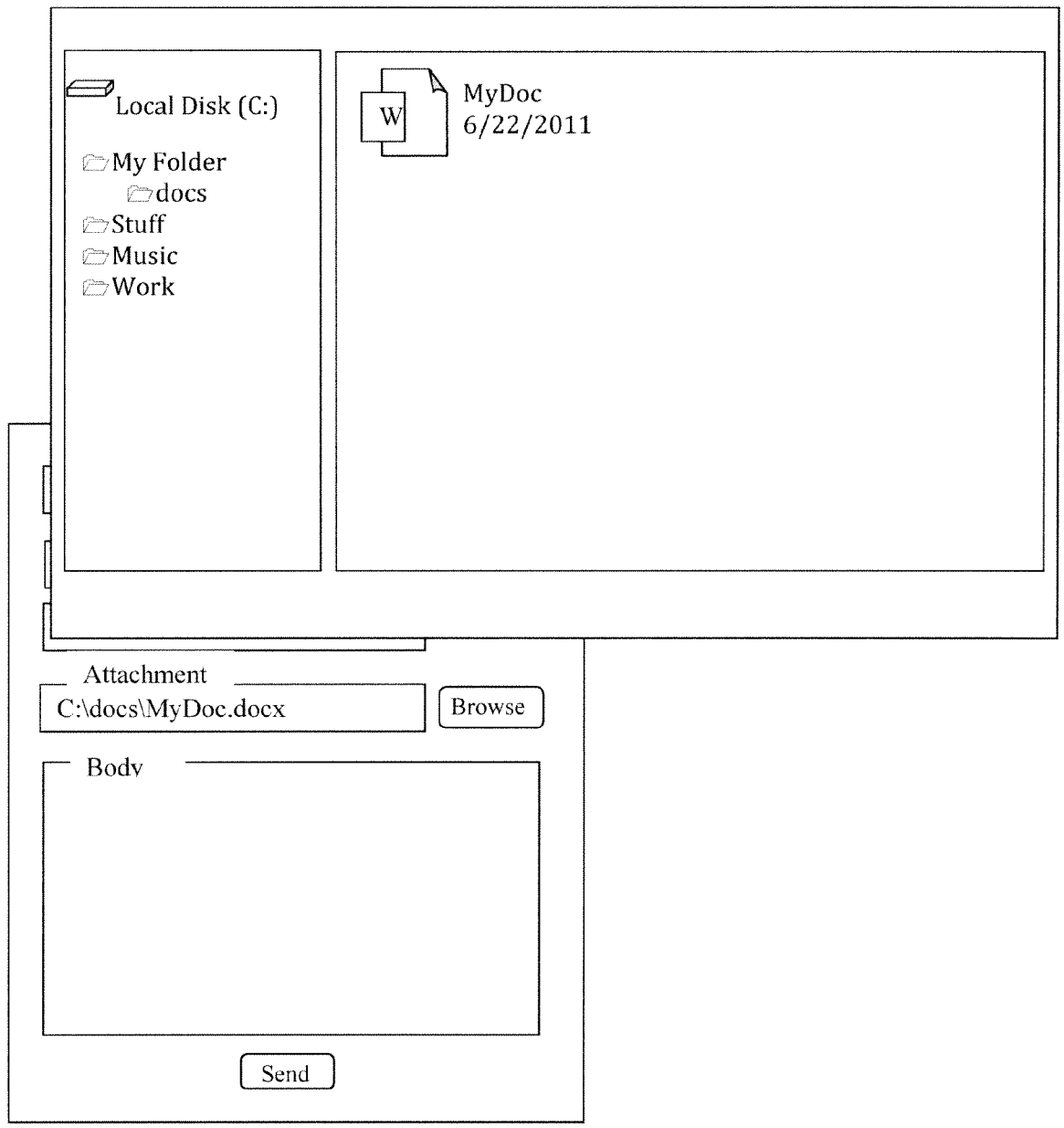
FIG. 37 Second GUI option, Using Browsing and Click to Protect the File . . .

The other way is to execute the Protector and then, using the Browse button by the Attachment field, search for it and select it (as shown in FIG. 37). The process, not requiring the independent step of clicking on Protect, is just like attaching a file in a Web Mail application such as Hotmail™. The file is encrypted and attached to an email message, which the author may compose either before or after clicking on the attachment, and the entire package is transmitted with automatic background encryption provided, with authentication through the Secondary ELD. Whether the encryption meta-file is sent either to one of the Protector's Receivers or to another Protector the encryption process is the same. (Before the file is encrypted and sent to a Receiver, the Protector checks its Client DBMS, which contains a record of that professional's clients, showing which of them already have installed a Receiver. For the purposes of explaining the Email Processor Module it is assumed that the client has obtained and installed his Receiver application.)

In the case of Protector to Receiver communication the Email Processor Module operates in the following manner. The Protector, using the Email Processor Module, performs encrypted messaging, in the case of sending a message, as follows. The professional uses his Protector to type, dictate, select, copy, input via voice, or otherwise compose the recipient's email message. For example, he types the message in the editing window of his Protector, and that text is saved to a temp file as in the .rtf format, or a similar format. The Email Processor Module reads the bytes of the .rtf file. The bytes are then saved to a temp file, so that the bytes can be encrypted and emailed.

Then, the Email Processor Module encrypts the bytes of the message, using one of the ELD's in the magazine, previously received from the Switch. The dynamic class loading encryption process occurs, operating on the unencrypted bytes of the message that the user of the Protector has just entered through the editing window, and using that randomly selected ELD to encrypt the bytes. The resulting encrypted bytes will form part of the Protector's output file, the encryption meta-file, and the encrypted bytes are one of its Name-value pairs.

Next, the meta-logic step takes place. The ELD just used to do the encryption, stored in a temp file, is also encrypted—via the Secondary ELD. (The Initiator Module, explained below, supplies the Secondary at the inception of trust between the communicating computers, so it can be used it in the routine course of communication between them henceforth to encrypt the Plain-Text ELD that will encrypt each message payload). The Protector uses that Secondary ELD to encrypt the Plain-Text ELD, and the resulting encrypted ELD also is inserted into the meta-file. In other words, the plain-text file is encrypted, or "wrapped" within the meta-file, and then the wrapping happens again: the ELD just used also is wrapped by the meta-logic.

It is important to note that the Secondary ELD is not included in the meta-file, neither in the case of communication between one Protector and another or in the case of Protector-Receiver communication. It is already in the possession of the receiving party. If the Secondary ELD were included in the meta-file it could be hacked and used to decrypt the Plain-Text ELD. That would defeat the whole purpose. But this risk is avoided because the Secondary ELD is pre-positioned in the Receiver by the auto-generation procedure that created that application, as explained above.

The Email Processor Module comes into play when the professional, using his Protector, writes the text of the message. It also comes into play to include an attachment to the email message. The right click by the Protector may trigger a menu offering the option of the transmission of an attachment. The Email Processor Module "protects" files. When a file is "protected" it is saved as a meta-file that the Protector or the Receiver can encrypt, auto encrypting it for transmission and auto decrypting it upon receipt. It is saved as a .prox file. In the full duplex architecture the Protector contains the Email Processor Module, and the Receiver contains it as well.

Per the right click technique, the Email Processor Module operates as follows when an encrypted message is received. First, the ID of the sender is parsed from the meta-file and the Secondary ELD is looked up. Then the ELD used on the plain-text is decrypted by loading that Secondary ELD into the Encryptor, along with the text of the first ELD. This step decrypts the Plain-Text ELD. Then, the decrypted Plain-Text ELD loads the class that decrypts the message payload. With this the message is decrypted. The decrypted message appears in the message window. Of course the user is unaware of these steps, as he merely sees the message appearing in the window and reads it, and his communication is secure.

When the process is used for encryption, the resulting meta-file is saved with the .prox extension (an acronym that connotes, at the same time, Professional, and Protected). An example of a meta-file resulting after the processing of the selected file to be sent, using the Protector, is the following:

```
<Meta-file>
  <File>
    <Header>
      <Pair Name="SENDER_EMAIL"
         Value="Y2hlbWEucmFtaXJlejFAZ21haWwuY29t"/>
      <Pair Name="PROFILE PIC"
         Value="xfgt4ikyhfgvbvhb54SDFGERTg534352FSDT"/>
      <Pair Name="SENDER_SITE"
Value="aHR0cDovL3d3dy5teXNwYWNlLmNvbS9taW5pc3Rlcm9mY2hyaXN0MQ==
"/>
      <Pair Name="ADD"
Value="rO0ABXNyAEJvcmcuYXBhY2hlLnhtbGJlYW5zLmltcGwudmFsdWVzLlht
bE9iamVjdEJ
c2UkU2VyaWFsaXplZFJvb3RPYmplY3QAAAAAAAAAQMAAHhwdnlAJ2NvbS51bmN
yeXB0aM9uLmxvZ21jLkVuY3J5cHRpb25Eb2N1bWVudAAAAAAAAAAAAeHB3Bg
AAAAEAAXQOEDxFbmNyeXB0aW9uPgogIDxBbGdvcml0aG1zIGphclBhdGg9IkM6X
```

-continued

```
FByb3RlY3RvclxFeGVcbGliXEVuY3J5cHRpb25BbGdvcml0aGlxLmphciI+CiAg
ICA8QWxnb3JpdGhtIGNsYXNzPSJ2ZXJpZpZGljb20uRW5jcnlwdGlvbkFsZ29yaXR
obXMiIEVuY3J5cHRpb25NZXRob2Q9ImVuY3JpcFhvckJpdENvcnIiIERIY3J5cH
Rpb25NZXRob2Q9ImVuY3JpcFhvckJpdENvcnIiPgogICAgICA8cGFyYW0gdHlwZ
T0iYnl0ZWFycmF5IiB0ZXh0VG9FbmNyeXB0PSJmYWxzZSIgcmFuZG9tPSJ0cnVl
IiB1c2VTYW1lVmFsdWVUb0R1Y3J5cHQ9InRydWUiPgogICAgICAgIDxieXRlQXJ
yYXlQYXJhbVZhbHVlPk5WZzNNakpTT1E9PTwvYnl0ZUFycmF5UGFyYW1WYWx1ZT
4KICAgICAgICA8ZGVjnlwdEJ5dGVBcnJheVBhcmFtVmFsdWU+TlZnM01qSlNPU
T09PC9kZWNyeXB0Qnl0ZUFycmF5UGFyYW1WYWx1ZT4KICAgICAgPC9wYXJhbT4K
ICAgICAgPHBhcmFtIHR5cGU9ImJ5dGVhcnJheSIgdGV4dFRvRW5jcnlwdD0idHJ
1ZSIgcmFuZG9tPSJmYWxzZSIgdXNlU2FtZVZhbHVlVG9EZWNyeXB0PSJ0cnVlIi
8+CiAgICAgIDxwYXJhbSB0eXB1PSJib29sZWFuIiB0ZXh0VG9FbmNyeXB0PSJmY
WxzZSIgcmFuZG9tPSJmYWxzZSIgdXNlU2FtZVZhbHVlVG9EZWNyeXB0PSJmYWxz
ZS/>
</Header>
<Body Name="TELS" Ext="docx">
        <bytes>e1WwvbAdsHWyJbd9sB2wxbCVsF2w1bLVsiW3DbA9sAWydbIlsp2
ynbLdskWy
nbLlsrWxfbFVtwWwHbC9sJWwHbIltx2wlbAdsHWwHbLVsiWynbKtsq2yfbKtsp2
yfbKdsp2xfbFVsX2xVbBlsEWwRbC1stWybbJtsK2wrbCtsnWwFbAdsHWwDbBtsB
2w1bBFsD2wDbAdsnWwDbBtsH2ydbB9sOWybbelsG2wlbBFsB2wBbcVsB2wdbANs
G23HbDVsEWwPbANsB2ybbClsL2wFbAFsF2wDbAdsm2wfbBdsI2wvbANsL2wlbCN
sB2wBbJtsA2wbbB1tz2w5bClsJWwPbCNsI2ybbANsG2wdbCNsL2wBbBFsB23jbA
dsAWwxbBtsI2ynbJ1sFWwjbClsX2xVbJFspWynbKNsrWyRbKdsqWypbKVspWypb
K9sp2ypbLl</bytes>
    </Body>
</File>
</Meta-file>
```

As one can see, the meta-file conforms to the XML Schema previously shown. In the Header we can see 4 different Pairs: SENDER_MAIL, PROFILE_PIC, SENDER_SITE and ADD. SENDER_MAIL contains the email address of the professional.

The Email Processor Module processes the encryption meta-file, using the functionality specified in the name value pairs, which execute on the Receiver in order to decrypt the message. In one embodiment the value of the pair with the name PROFILE_PIC contains a profile picture of the sender, which is displayed in a splash screen on the Receiver when the file is decrypted. In another embodiment the Profile picture corresponding to the Protector is inserted into the Trust DBMS of the Receiver, so that it is associated with the professional who sends each message, and the picture pops up on the screen, when the message arrives, via a lookup executing on the DBMS. In the multi-Protector version of the Receiver the Trust DBMS associates the message with the Protector who sent it, and this triggers the pop-up of that Protector's picture after it is retrieved from the DBMS. SENDER_SITE contains the address of the profile page of the Professional. ADD refers to ADDitional information, which in this case corresponds to the encrypted ELD that was used to encrypt the file.

The Body of the file contains the attributes of the file and the plain-text. The original name and extension are used by the application corresponding to the file extension (e.g. ".docx") after the decrypting process, so the name of the original (wrapped) file can be obtained per the name+text format. For example, if the Name has the value "MyDocument," and the extension is the value ".docx," the obtained name would be "MyDocument.docx"). The decrypted file can be saved by that name in the file system, per its native capabilities, in order for the document to be displayed.

In the case of an attachment, the bytes that are stored in the body of the meta-file correspond to the encrypted bytes of the file that was selected to be attached. This is to say, whenever a file is selected to be attached to the email the bytes of that file also are read and encrypted. After the bytes have been encrypted they are added to the Body of the meta-file, along with the name and extension of the original file. This all occurs as a background task. This means that the packet at that juncture includes everything required to actuate auto decryption, provided that the Receiver has access to the Secondary ELD that was used by the sending Protector.

The following code, one embodiment, encrypts the selected file and creates the meta-file.

```
1. public String processFile(String filePath)
2. {
3.     String fileName =
4. filePath.substring(filePath.lastIndexOf("\\")+1,
5.            filePath.length( ));
6.     String meta-fileName = fileName.substring(0,
7.            fileName.indexOf("."));
8.     meta-fileName += ".prox";
9.     String meta-filePath = meta-filesPath + meta-fileName;
10.    byte[ ] bytes = file.io.FileIO.readFile(filePath);
11.    byte[ ] bLogic = getELD( );
12.    com.encryption.logic.EncryptionDocument ELD =
13. parseLogic(bLogic);
14.    byte[ ] encryptedBytes = encrypt(bytes, true, ELD);
15.    createMeta-file(meta-filePath, fileName, encryptedBytes,
16.                                          createMeta-fileHeader(ELD));
17.    return meta-filePath;
18. }
```

In lines 3-5, the name of the file is obtained from the whole path of the file. For example, if filePath='C:\My Documents\TELS.docx', this code takes the substring "TELS.docx", Line 10 reads the bytes of the file that is going to be sent, and line 11 gets from the bundle of ELD's the one to be used. The bytes of the file are encrypted on line 14. The Header of the meta-file is created on line 16, and the meta-file is created on the previous line. The code for encrypting the bytes may be as follows:

```
1.  public static byte[ ] encrypt<byte[ ] bytes,
2.              com.encryption.logic.EncryptionDocument
    ELD)
3.  {
4.      com.Encryptor.Encryptor Encryptor = new
    com.Encryptor.Encryptor( );
5.      Encryptor.setEncryptionLogic(ELD);
6.      byte[ ] tmp = Encryptor.encrypt(bytes);
7.      return tmp;
8.  }
```

The Encryptor, the execution module containing the dynamic class loader that is used whenever a class is to be loaded for auto encryption, is used to encrypt the bytes. The code for the creation of the Header of the meta-file may be the following:

```
1.  public Header createHeader(EncryptionDocument ELD)
2.  {
3.      Header header = Header.Factory.newInstance ( );
4.      String names[ ] = {"SENDER_EMAIL", "PROFILE_PIC",
5.  "SENDER_SITE", "ADD"};
6.
7.      Pair[ ] metaPairs = new metaFile.xml.Pair[names.length];
8.      for(int i=0; i<names.length-1; i++)
9.      {
10.         meta-file.xml.Pair metaPair = Pair.Factory.newInstance( );
11.         metaPair.setName(names[i]);
12.         metaPair.setValue((byte[ ])hSettings.get(names[i]));
13.         metaPairs[i] = metaPair;
14.     }
15.     try{
16.         Pair metaPair = metaFile.xml.Pair.Factory.newInstance( );
17.         metaPair.setName(names[names.length - 1]);
18.     byte[ ] ml = object.util.ObjectToByteUtil.getBytes(ELD);
19.     metaPair.setValue(ml);
20.     metaPairs[names.length - 1] = metaPair;
21.     }catch(Exception e){ }
22.     header.setPairArray(metaPairs);
23.     return header;
24. }
```

The contents of the Settings file have been previously parsed and stored in the hash table object named hSettings. From there, the code takes the pairs and stores them in the Header, the exception being the ELD. The loop in lines 8-14 takes the pairs from the Settings and the lines 16-20, the ELD is stored in the Header. This code may create the meta-file:

```
1.  public static void createMeta-file(String meta-filePath, String
2.  fileName, byte[ ] bytes, meta-file.xml.Header header)
3.  {
4.      meta-file.xml.XFileDocument xmlDoc =
5.      meta-file.xml.XFileDocument.Factory.newInstance( );
6.      xmlDoc.addNewXFile( ).addNewFile( );
7.      meta-file.xml.Body xmlBody = Body.Factory.newInstance( );
8.      xmlBody.setBytes(bytes);
9.      String ext = fileName.substring(fileName.lastIndexOf (".")+1);
10.     fileName = fileName.substring(0, fileName. lastIndexOf (ext) -1);
11.     xmlBody.setName(fileName);
12.     xmlBody.setExt(ext);
13.     xmlDoc.getXFile( ).getFile( ).setHeader(header);
14.     xmlDoc.getXFile( ).getFile( ).setBody(xmlBody);
15.     try{
16.         xmlDoc.save(new Java.io.File(meta-filePath));
17.     }catch(Exception e) { }
18. }
```

The plain-text stored in the Body of the meta-file is received as a set of parameters of the method, as well as the previously generated Header. So what this code does is (1) create the XmlBeans object for storing the meta-file, and then (2) add the received information to the meta-file, saving it.

The parsing and processing of the meta-file when it is received will be explained below.

Whenever email is going to be read, as with any other mail client it must be retrieved from the mail server. The Email Processor module executes this task through the Java Mail Sender class, which uses the Java Mail API. The following code may carry out the email retrieval:

```
1.  public Vector<protector.util.mail.Email> retrieveEmail( )
2.  {
3.      mail.client.MailSender mailSender = prepareEmailSender(false);
4.      Vector vAcceptedMails = new Vector( );
5.      contactsManager = new contacts.manager.ContactsManager( );
6.      Vector<String> vAcceptedMails = contactsManager.getContacts( )
    ;
7.      mailSender.setAcceptedEmails(vAcceptedMails);
8.      try{
9.          Vector vReceivedMails = mailSender.readMail( );
10.         Vector vProcessedMails =
    processReceivedMail(vReceivedMails);
11.         return vProcessedMails;
12.     }catch(Exception e) {    }
13.     return null;
14. }
```

The MailSender is created and configured with the preparemailSender( ) method (see line 3). The Protector only retrieves mail that concerns the professional's professional communication, which is to say, the emails which the professional has composes using his Protector. Therefore, the Email Processor Module of the Protector must filter out those emails that do not correspond to the Protector's list of clients, per the Protector's Trust DBMS. Line 6 obtains the contacts (the clients) of the professional using the Contacts Manager Module. Line 7 sets the accepted email addresses in the mailSender. The mail is retrieved in line 9 and processed in the next line. The processing of the received mail consists parsing the meta-files, extracting all of the name-value pairs, processing them, decrypting attachments if any were received, etc. In one embodiment of the Email Processor Module there is an exception to the above mentioned filtering process, in order to accommodate the Outsourcing function already explained. There is another exception when the flags informs this class that the meta-file is an invitation packet so that the Receiver can be enrolled.

The following illustrates method that processes the emails:

```
1.  public Vector< protector.mail.Email>
        processReceivedMail(Vector <mail.client.Email> v)
2.  {
3.      Vector<protector.mail.Email> vEmails = new Vector( );
4.      pDBMS = new protector.database.manager.DatabaseManager( );
5.      for(int i=0; i<v.size( ); i++)
6.      {
7.        mail.client.Email recEmail = v.get(i);
8.        protector.mail.Email proEmail = new
                protector.mail.Email( );
9.        byte[ ] metaFileBytes =
                recEmail.getAttachment(0).getBytes( );
10.       proEmail.setMetaFileBytes(metaFileBytes);
11.       long sentDate = recEmail. getSentDateLong( );
12.       boolean isNew = recEmail.isNew( );
13.       boolean isClientData = recEmail.isClientDataMail( );
14.       proEmail.setSentDate(sentDate);
15.       proEmail.setIsNew(isNew);
16.       String sender = recEmail.getFrom( );
17.       pDBMS.updateLastMailDate(sender, sentDate);
18.       String recipient = recEmail.getRecipient(0);
19.       String subject = recEmail.getSubject( );
20.       byte[ ] contentBytes=null;
21.       if(!recEmail.getAttachments( ).isEmpty( ))
```

```
22.     {   Vector vMailAttachment =
                recEmail.getAttachments( );
23.         for(int j=0; j<vMailAttachment.size( ); j++)
24.         {
25.             Hashtable h = processAttachment(sender,
                    vMailAttachment.get(j));
26.             protector.util.mail.Attachment protAtt = null;
27.             contentBytes = (byte[ ])h.get("contentBytes");
28.             protAtt = h.get("attachment");
29.             subject = b.get("subject").toString( );
30.             proEmail.addAttachment(protAtt);
31.         }
32.     }
33.     proEmail.setBodyBytes(contentBytes);
34.     proEmail.setFrom(sender);
35.     proEmail.addRecipient(recipient);
36.     subject = "No Subject";
37.     proEmail.setSubject(subject);
38.     }
39. return vEmails;
40. }
```

The received emails are preprocessed by the MailSender class and are stored. The email's data is stored in an instance of the class mail.client.Email. The emails in this format must be "translated" into the protector.mail.Email format, and that is the objective of this method. All of the emails are processed in the method's main loop (lines 5-52).

The encrypted email along with its attachments is stored within the encryption meta-file, and the meta-file is attached to the conventional email that is sent through the web-mail server. This to say, the subject and body of the email message that the web server sends are not the real subject and body typed by the professional, but instead a mere place holder, consisting of dummy data. The real data is contained in a Name-value pairs of the encryption meta-file corresponding to the message, and the real message is encrypted. The real message is an attachment. In line 9 the bytes of the meta-file are obtained. The attributes of the original email (date it was sent, the flag that indicates if it is a new email, etc.) are obtained in lines 11-13.

The loop in lines 23-44 processes the attachment of the original email, the meta-file. The method processAttachment( ) in line 25 parses the meta-file, extracts the Name-value pairs, processes them (such as the extraction of the real subject and body of the email), and decrypts any documents that were attached by the professional. The method processAttachment( ) is explained in greater detail below. In line 30 the real attachment of the email, the file attachment containing the meaning and sent by the author, is added to the protector.util.mail.Email object. The last step sets attributes of the email, see lines 33-37.

The following code corresponds to the processAttachment( ) method:

```
1.  public Hashtable processMeta-file(EncryptionDocument
    metaLogic,
                meta-
    file.xml.XFileDocument xmlDoc)
2. {
3.    meta-file.xml.Body body =
    xmlDoc.getXFile( ).getFile( ).getBody( );
4.    meta-file.xml.Header header =
    xmlDoc.getXFile( ).getFile( ).getHeader( );
5.    meta-file.xml.Pair[ ] pairs = header.gotPairArray( );
6.    byte[ ] contentBytes=null;
7.    protector.util.mail.Attachment proAtt=null;
8.    com.encryption.logic.EncryptionDocument metaLogicXml =
    metaLogic;
9.    String subject="No Subject";
10.   String sender=null;
11.   boolean downloadRequestedFile = false;
12.   boolean downloadTrustBuddyArchive = false;
13.   boolean unencrypted = false;
14.   for(int i=0; i<pairs.length; i++)
15.   (     String name = pairs[i].getName( );
16.         byte[ ] value = pairs[i].getValue( )
17.     if(name.equals("SENDER_EMAIL"))
18.     {
19.         sender = new String(value);
20.         metaLogicXml = pDBMS.getMetaLogicFromDB(sender);
21.     }
22.     else if(name.equals("CONTENT"))
23.             contentBytes = decryptWithELD(value,
    metaLogicXml);
24.     else if(name.equals("MATTER"))
25.     {
26.         try{
27.             meta-file.xml.Header matterHeader =
    getMatterHeader(value);
28.             meta-file.xml.Pair[ ] headerPairs =
    matterHeader.getPairArray( );
29.             for(int x=0; x<headerPairs.length; x++)
30.             {
31.                 String name = headerPairs[x].getName( );
32.                 if(name.equals("RE"))
33.                 {
34.                     byte[ ] bs = headerPairs[x].getValue( );
35.                     byte[ ] decBytes = decryptWithELD(bs,
    metaLogicXml);
36.                     bs = decBytes;
37.                 }
38.                 subject = new String(bs);
39.             }
40.         }
41.     }catch(Exception e){ }
42.     }
43.     else if(name.equals("ADD"))
44.     { ELDBytes = decryptWithELD(value, metaLogicXml);
45.         try{ELDXml = parseLogic(ELDBytes);}catch(Exception e){ }
46.         String bodyName = body.getName( );
47.         String ext = body.getExt( );
48.         byte[ ] bodyBytes = decryptWithELD(body.getBytes( ),
    ELDXml);
49.         if(downloadRequestedFile)
50.             file.io.FileIO.writeFile(filePath, bodyBytes);
51.         if(downloadTrustBuddyArchive)
52.             file.io.FileIO.writeFile(filePath, bodyBytes);
53.         proAtt = new protector.util.mail.Attachment(bodyName +
    "." +
                                                          ext,
    bodyBytes);
54.     }
55.     }
56. }
57.   hResult.put("contentBytes", contentBytes);
58.   proAtt.setMeta-fileHeader(header);
59.   hResult.put("attachment", proAtt);
60.   hResult.put("sender", sender);
61.   hResult.put("subject", subject);
62.   return hResult;
63. }
```

The Body of the meta-file and the array of the name-values pair are obtained on lines 3-5. The name-value pairs are processed on the main loop of the method (lines 14-84). Each name of a pair is analyzed to see what processing should be done to the value. The ID of the sender (i.e., the email address) is obtained and processed in lines 17-21. Once the Id has been obtained, the Secondary ELD is obtained from the Trust DBMS (as can be seen in Line 20).

The content (i.e., the body) of the email is obtained in lines 23, must be decrypted so it can be displayed on the Protector. The flexibility of the approach of the embodiments, by using name-value pairs, arises in part from the fact that it is possible to nest one XML expression within another. This approach is used in the "re line." In lines 24-42 the XML of the matter is obtained, decrypted and parsed. The matter XML contains the re line, which is the value of the subject of the email.

The ELD is obtained and decrypted (using the private logic tunnel, the Secondary ELD). After the decrypted ELD has been obtained, the bytes of the body of the encryption meta-file (the encrypted bytes of the real message, the attachment) are decrypted. That result is saved in a temp file, with the name obtained from the name and extension attributes of the meta-file's payload. The last step of the process consists in storing the processed data (the body of the email, attachment, sender's email address and real subject of the email) in a hash table. Once the email has been processed, it is displayed in readable form in the Protector's GUI, in the message window.

Programmatic Detail

The Trust Initiator Module

Trust Initiator is the module that initiates trust between two Protectors on a Protector-Receiver Network. The Protector to Receiver communication dimension is not involved. Four embodiments are described. One uses a terrestrial VPN exclusively as the data transmission means to establish trust. A second uses a terrestrial VPN plus a satellite datacast to provide the data that establishes trust. A third and fourth embodiment use the satellite datacast as the sole data source for initiating trust. Using more than one data transmission means in the process of initiating trust makes the procedure harder to hack. First explained will be the VPN embodiment.

All of the embodiments of Initiator use the meta-logic approach: employing a second encryption logic descriptor to encrypt a first descriptor, with the first descriptor encrypting the plain-text. Therefore, Initiator is a specialized module used only to grant trust, and not to encrypt messages: Initiator only is used to encrypt ELD's. The Trust Initiator module encrypts and securely transmits the ELD that will be used as the Secondary between two parties who wish to perfect their trust, or alternatively, allows the satellite datacast to transmit or generate the Secondary ELD. However, it must be kept in mind that the non-terrestrial data transmission means described herein may be used to furnish the communicating with not merely Secondary ELD's, but in some embodiments the Plain-Text ELD's too; and for the matter random data inputs of any sort used in the privacy related routines processes executing on the local computers.

When the Secondary ELD, per the first Initiator embodiment, is transmitted to the trusted computers via terrestrial means, to make things highly secure Initiator uses a distributed approach, invoking encryption logic at four independent points and employing a separate ELD at each. In addition to the two hard wired ELD's that connect each Protector to the Switch, the method uses a third ELD, the Tertiary, to encrypt the Secondary ELD's that are in transit, to arrive at the computers and be permanently provisioned as the private logic tunnel that connects them. The fourth ELD in the method is the Plain-Text ELD for the session, used after trust is granted and which varies with each communication. It is used to encrypt the message payload after Initiator has installed the Secondary ELD on the computers. Initiator is an exuberant example of using ELD's as meta-logic in a layered system, and is testament to the orthogonality of the Encryption Abstraction Layer and the richness of the encryption logic session-object method for encryption.

The approach of the embodiments differs from how trust is granted in other secure systems, such as via certificates or public keys. Those methods typically require a manual step sending authorization from one user to another in order to grant trust. In contrast, the approach using Secondary ELD's and Initiator to install them, auto-executes the trust grant as a background task, providing authentication and encryption in a way that requires no user input other than composing the body of the first message sent. Initiator, the installer of the meta-logic functionality that is the essence of the trust grant, is fully automatic and it executes completely as a background task. This means that with the embodiments trust is granted by default, so that not only are the manual workload of the other methods is eliminated, but also the security problems and risk of error inherent in the manual approach.

The following embodiment of Initiator illustrates using Tertiary and Secondary ELD's for the trust grant. Recall that Initiator is in its essence a build process for the private logic tunnel that connects two Protectors and mutually authenticates them each time they communicate. The end result is that a dedicated, unique Secondary ELD is installed that will scramble the Plain-Text ELD used to encrypt each message payload. But to get to that point there is a series of steps.

The purpose of the Tertiary ELD is providing a secure transmission means for the Secondary ELD in the process of implementing it as the private logic tunnel connecting the Protectors. More specifically, the purpose of the Tertiary ELD is to encrypt the Secondary ELD, making the latter invulnerable to attack as it is transmitted across the network, because the transmission of the Secondary ELD is something that has to happen before the Secondary is installed in the Trust DBMS of each Protector. Because the Secondary ELD is encrypted by the Tertiary ELD, the Tertiary is a "throw-away" ELD that is used for this limited purpose and discarded after the Secondary safely arrives at its destination.

Initiator performs the task of deploying the various ELD's involved in this process in stages. Initiator is another example of the cascade approach to building the encryption logic in a VPN using the Encryption Abstraction Layer. Initiator creates a session object for granting trust, rather than a session object for encrypting a message. Initiator programs the receipt of the Secondary ELD and its installation on the trust recipient's side. The Switch is used as a relay to mediate the trust grant procedure, scrambling the bytes of the Tertiary ELD, making the process secure, by invoking the hard-wired ELD corresponding to each Protector.

There is an alternative approach. When the Protector applications have peer-to-peer functionality, the two applications to be put into trust may enslave a third application, so that the third application operates as the relay for the trust grant. The enslavement of a third application into the grant of trust process can make use of a port on the applications, or can occur by means of packets send via email if the process does not need to occur immediately, in real time. In one version of this approach each peer has its own encryption logic engine, and the peer generates the Tertiary ELD and transmits it to the two parties. The peers may on the other hand rely on the Switch for their ELD's, and extract them from the magazine.

In this peer to peer approach the third application that is enslaved, in one embodiment, is one with a pre-existing trust relationship with both of the parties who wish to establish trust for the first time. With this approach each Protector performs a lookup in its trust DBMS to find any third Protectors in common trust, which is to say in which trust already happens to exist as to both of the Protectors involved in the trust grant, both the sender and the recipient. Two computers who wish to establish Trust, A and B, may find the third computer to be enslaved through search. Each computer may provide, to a cloud, a trust profile which identifies its trusted computers, and when the two computers wishing to establish trust need to find such a common computer, they search the cloud. The existence of a common trust relationship between the two computers in the trust grant and a third computer allows the third computer to operate as a bridge. One or more of the common third Protectors is then selected to perform the relay of the Tertiary ELD from the Protector granting trust to the Protector receiving trust.

That common trusted computer can use its two pre-existing Secondary ELD's, the ones connecting it to each of the two other computers used in the trust grant in order, to encrypt the Secondary ELD to be installed to create the new trust relationship between those two computers, using the relay technique. As to the available third applications to be enslaved, the applications may select one that happens to be online, and a server or URL or listener may assist in this process. This is especially apropos when chat is the medium of communication.

Figure 38:
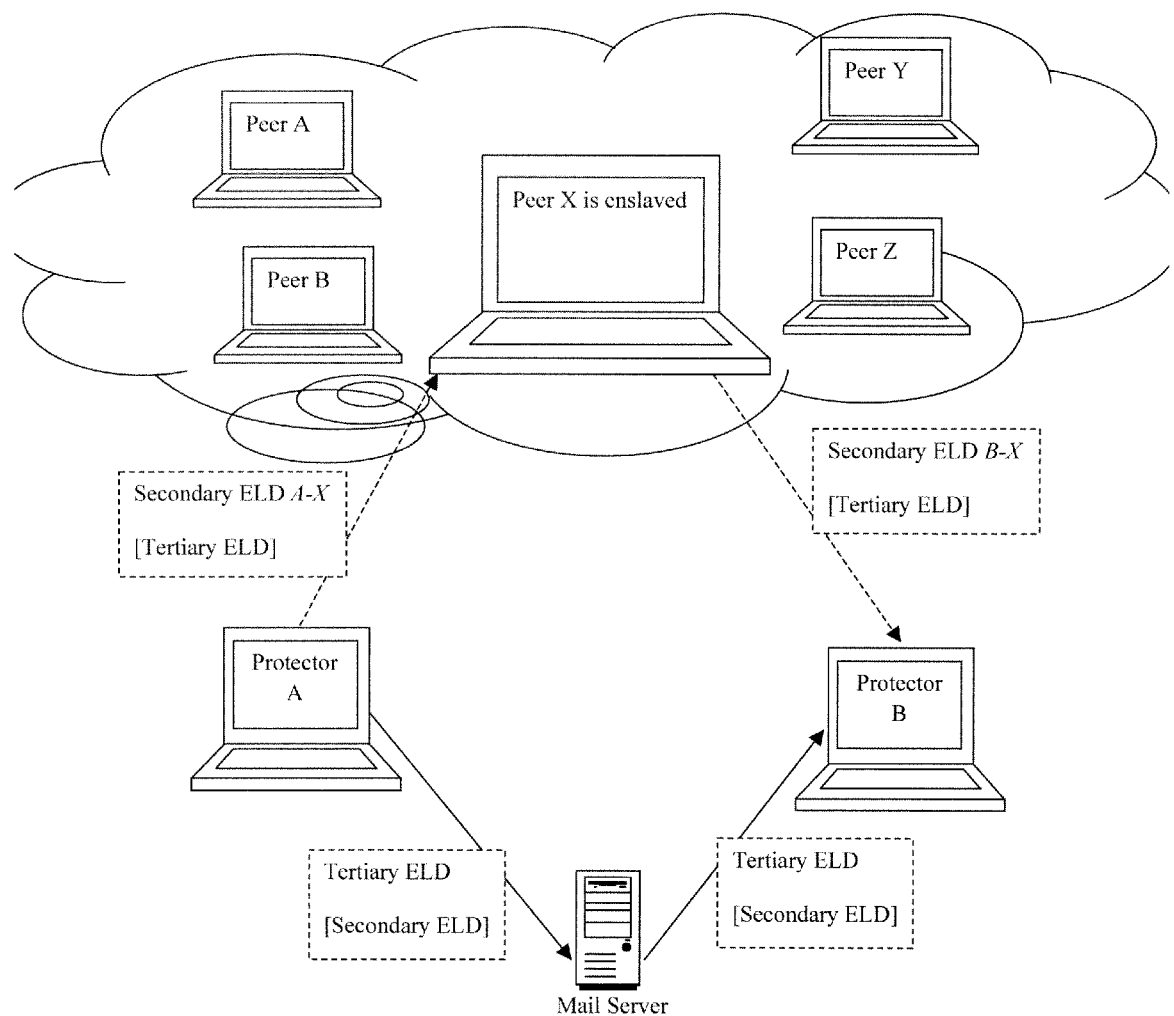
FIG. 38 Protectors and Switch in Grant of Trust using a Tertiary ELD . . .

The enslaved application, the third Protector, in addition to performing the relay, also can supply the ELD that operates as the Tertiary, instead of having the Protector who grants trust supply it. This embodiment is an additional safeguard against the man-in-the-middle attack, because the Switch plays no role whatsoever in provisioning the Tertiary ELD on the two computers establishing trust. Instead, a peer does this. There is no single Switch that can be identified in the relay process, and the relay process is carried out by an enslaved peer that is randomly selected. The slave may generate the Tertiary ELD, or use an ELD that it already has in its magazine. FIG. 38 illustrates this process. In this version the Peer supplies the Tertiary ELD, using the pre-existing Secondary ELD's to each computer to encrypt the Tertiary. The computers then use that Secondary to Transmit a new secondary ELD corresponding to the new trust relationship to be established. The computer initiating the trust grant takes an ELD from its magazine and uses the Tertiary ELD to encrypt it, sending it to the recipient computer. In this version the enslaved third computer never possesses the Secondary ELD, but merely supplies the Tertiary ELD, and this is more secure than when the enslaved computer supplies the Secondary.

State control may be implemented on the peer application so that the Initiator functionality is one of its states. This approach can be combined with the Switch approach to the trust grant, in that the Switch may operate as the fallback Initiator in the event that the two applications establishing trust have no common trusted third party applications to act as the peer that provides the relay. Also, the computer initiating trust may randomly select a third computer to enslave, in order to supply the relay function, even if neither of the two computers are in trust with that third computer. In this case the third computer builds a logic session to execute the relay by using the ELD's in its magazine, and it may do this even though there is no pre-existing trust relationship between the trust grantor and the trust grantee computers.

In FIG. 38 a peer to peer architecture is illustrated, and it carries out the Tertiary ELD process. Along these lines, each Protector using the peer-to-peer architecture has a port, and the step of enslaving a third computer occurs randomly when the Protector granting trust contacts such a random peer Protector through the port. The randomly enslaved peer supplies the Tertiary ELD and transmits it to the Protector who is the first computer's recipient of trust, and to the sending computer as well. Then the process proceeds as in the First example. In this approach there is no need for pre-existing trust to exist between the enslaved peer and both of the computers in the grant of trust. Instead, an ELD is randomly chosen by the enslaved peer to be transmitted to the two computers as the Tertiary. This approach does not rely on the pre-existence of connecting Secondary ELD's between the third computer and the two in the trust grant. In yet another variation, the enslaved peer eliminates the Tertiary, and sends out an ELD that is used directly as the Secondary. As one can see, the nature of the logic layers that may be applied to the grant of trust process when a Tertiary ELD is used may vary.

In all of the Initiator embodiments if a Protector wishes to communicate with someone not yet in trust that fact triggers the operation of the Initiator module. Initiator operates automatically, as a background task.

If the proposed recipient of the communication is not listed in the Trust DBMS of the Protector of the party initiating communication, the attempted lookup of the proposed recipient of the message results in a null value. The null value triggers Initiator, and in the embodiment employing the Switch as a relay the resulting process is as follows. First, the Protector who will be the sender of the first message, which triggers the trust request, identifies the recipient in the "send to" line of the new email message. After the lookup results in the null value (trust does not yet exist so there is no dedicated Secondary ELD) the steps begin for creating the new private logic tunnel which from that point forward will connect the sender and the recipient whenever they communicate, using their mutual Secondary ELD that is about to be provided. That shared ELD will be installed in the Trust DBMS of each. The grant of trust by default consists of executing the steps to establish this unique private logic channel, connecting the trusted computers by mutually provisioning the dedicated Secondary ELD.

The act of identifying the new recipient of trust, from the perspective of the user, consists of nothing more than selecting him as the recipient of an email, just as in the case where trust already exists. This characteristic of Initiator is what is meant when the trust grant process is described as a background task.

The Recipient of the trust grant always is another Protector. Initiator does not involve the trust architecture that orders the relationship between the Protector and the Receiver, but only the linking of one Protector to another Protector. Initiator only involves the horizontal dimension of communication. This is because by definition trust exists from the inception as between the Protector and the Receiver. Consider how communication occurs in the vertical dimension of Protector-Receiver. The Protector auto generates the Receiver application and provisions an ELD for that application when the Receiver application is auto generated, whether by hard-wiring it, or in the multi-Protector version of the Receiver by introducing that ELD in that Receiver's Trust DBMS. In either case the Secondary ELD dedicated to each Receiver reposes in the Trust DBMS of the Protector application. Because that ELD is a Secondary, which is to say it always encrypts another ELD instead of the body of a message, one may observe that Initiator is not needed as between the Protector and the Receiver, because trust already has been granted.

Figure 39:
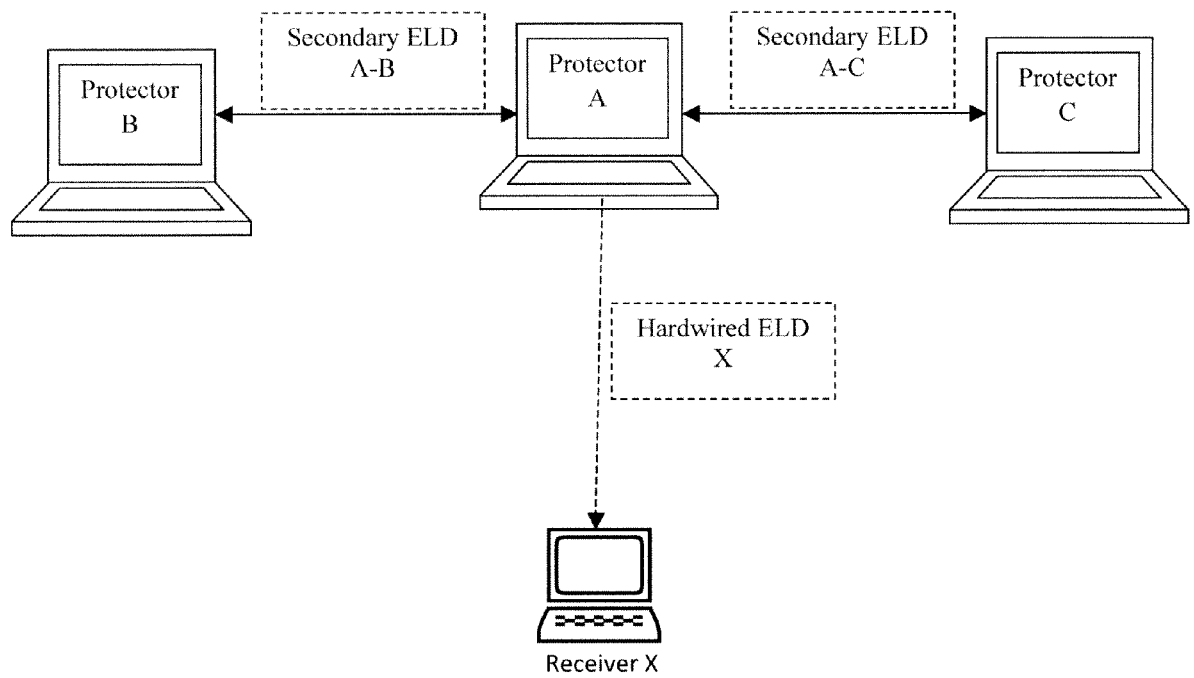
FIG. 39 Horizontal and Vertical Dimensions of Communication for Protector A . . .

For this reason, one can see that Initiator is only used to grant initial trust between Protectors. FIG. 39 illustrates the horizontal dimension (communication from Protector A to Protector B using the Secondary ELD A-B, and communication from A to C using Secondary ELD A-C), and the vertical dimension (communication from Protector A to Receiver X, encrypting emails with hard-wired ELD X).

When the Switch is used as a relay to grant trust between the Protectors, instead of a peer-to-peer network, the procedure is as follows. Once the target Protector is identified as the recipient of the email and there is confirmation from the lookup in the first Protector's Trust DBMS that trust does not yet exist, the next step occurs: establishing the Protector's connection to the Switch in order to transmit the Tertiary ELD to the recipient Protector.

The Switch will be involved in this transmission as a relay, preventing direct contact between computer A and computer B. The Protector initiating trust uses the Switch to send the Tertiary ELD, instead of transmitting it directly to the other computer, because using an indirect path to the other Protector provides yet another security layer. Recall that each Protector enjoys a hard-wired encryption logic tunnel to reach the Switch. (When the Switch auto generates each Protector, it installs this hard-wired ELD, which encrypts everything that goes back and forth between the Switch and that Protector by default). This means that the first Protector by using the hard-wired ELD can send the Tertiary ELD up to the Switch securely, scrambling it automatically for that leg of the journey. Then, after sending the Tertiary ELD up to the Switch, the first Protector stores the Tertiary ELD locally in its Trust DBMS, in the record corresponding to the Protector as to whom trust is being granted.

The other leg of the relay is the transmission of the Tertiary ELD from the Switch down to the second Protector, the recipient, whom the first Protector wishes to bring into trust. The recipient Protector's hard wired ELD, expressed in the Trust DMBS of the Switch, scrambles the Tertiary ELD on this second leg of the relay, just as it was scrambled in the first leg. The recipient Protector application receives the Tertiary ELD from the Switch and stores it in its Trust DBMS. The entire process of selecting an ELD to be the Tertiary and using the Switch to relay it to the recipient Protector is shown in FIG. 38. In this figure the ELD being encrypted is in brackets, and the ELD not in brackets is the one that performs that encryption.

The vessel for sending the Secondary ELD from the first Protector the second Protector may be a special meta-file transmitted via email or chat, or via Skype™, or through a social networking web service such as FaceBook™ or Twitter™. It will be encrypted by the Tertiary ELD. The meta-file, a starter packet, is the framework that wraps the encrypted Secondary ELD so that the Tertiary can decrypt it upon receipt. The Secondary ELD is encrypted by the Tertiary ELD and put into this special meta-file, the starter packet generated by the first Protector. The Email Processor Module processes the starter packet, treating it as an email.

Recall that the first Protector, the one initiating trust, has saved the Tertiary ELD to its Trust DBMS in the record corresponding to the Protector as to whom trust has been extended. Because the first Protector has saved it, both can use it to encrypt the Secondary ELD transmitted to the other Protector when the time to do that comes. It is saved in a temp file for the other purpose, too: sending it up to the Switch so that it can reach the trust invitee via the relay process. The recipient Protector will receive the Tertiary ELD from the Switch, via the second leg of the relay process protecting the Tertiary ELD by the hard-wired ELD that connects the second computer to the Switch. The Second Computer receives the Tertiary ELD and decrypts it, and saves it to its trust DBMS in the record corresponding to the first Protector. With that step complete both the sending Protector and the recipient Protector possess the Tertiary ELD. The will use it as follows.

The first Protector, the one to transmit a message for the first time, uses the Tertiary ELD to encrypt the Secondary ELD, and the Secondary ELD is placed in the starter packet. The starter packet is transmitted to the recipient Protector. The recipient Protector, now in possession of the encrypted Secondary ELD, will be able to decrypt the Secondary ELD and use it once the recipient Protector has obtained the Tertiary ELD from the relay transmission of the Switch. The meta-file containing the Secondary ELD encrypted by the Tertiary may be sent from the first Protector to the second Protector disguised as an email, without any message included, and this is one approach to using a starter packet. The special email meta-file exists solely for the purposes of the Initiator process. This starter packet also may be sent as an attachment to an ordinary email, and the Email Processor module operates on the attachment.

In another embodiment there is an embedded starter packet that is merely a name-value pair in an ordinary encryption meta-file that is transmitted from the first computer to the second computer via email. The encryption meta-file contains a normal message payload. In this case there may be a flag in the meta-file indicating the fact that, because it is the first transmission as between those Protectors, the meta-file contains the Secondary ELD, as encrypted by the Tertiary.

Because of the flag in the email meta-file, the recipient Protector is signaled to contact the Switch to cause it to download the Tertiary ELD. The recipient Protector also may become apprised of the non-existence of trust by finding a null value in the Trust DMBS for the sender, and this is an alternative to the flag approach. After the second Protector has obtained the Tertiary ELD the payload of the message is eventually decrypted by using, first, the Tertiary ELD to decrypt the Secondary ELD, and then, using the decrypted Secondary to decrypt the Plain-Text ELD, and finally, the Plain-Text ELD to decrypt the payload. Then the Secondary ELD, just used, is saved in the Trust DBMS of each computer. So as shown in this embodiment, all of the Initiator functionality may be embodied in the email meta-file without resort to a separate starter packet, if the system architect elects this approach.

The retrieval of the email and processing of it by the Initiator Class on the recipient computer is as follows. This step involves the decryption and temporary storage of the Tertiary ELD in the recipient Protector's Trust DBMS. The recipient Protector obtains the Tertiary ELD from the Switch, the Switch using the hard-wired ELD to encrypt it in transit. The Tertiary ELD is stored on the recipient Protector in memory, and one way to do this is to put it in the Trust DBMS, as a place holder for the Secondary ELD that will be installed. The Tertiary is retrieved from memory, and the recipient Protector uses the Tertiary to decrypt the Secondary that is parsed from the starter packet. Then, the decrypted Secondary is permanently installed in the computer's Trust DBMS so that it can operate as the dedicated private logic tunnel that encrypts the Plain-Text ELD of each message that the two Protectors send back and forth.

The next-to-the-last step consists in sending an acknowledgement message by the recipient Protector to the sender Protector confirming the successful execution of the Initiator function, which is to say, that trust has been established. And the final step is a matter of follow through, the discarding of the Tertiary ELD that was used to install the Secondary on the second Protector, as it has fulfilled its purpose. The Tertiary is erased on both computers.

These steps are now explained in greater programmatic detail. The first step is identifying the recipient Protector for the grant of trust, the person on the other end of the new protector-to-protector private logic tunnel to be formed. When the sender begins to write the email, the recipient may be selected from a list of colleagues by clicking on the name, or the email of the recipient might be typed directly in the "to"

(the recipient) field. Search also may be used to identify the recipient. The automatic Initiator functionality allows a professional to create a new trusted communication channel to any other professional who also has a Protector with the trust relationship generated completely as a background task. Trust automatically will be established, as they will enjoy a dedicated private encryption logic tunnel from that point forward in their communication, thanks to the Secondary ELD that by default will encrypt the Plain-Text ELD that scrambles the body of their messages.

The list of the first Protector's potential trusted colleagues—the universe of Protectors on the VPN as to whom potentially trust potentially may be initiated—is provided by the Switch to all the Protectors and updated, whenever they log on. Using the list, the first Protector identifies any enrolled professionals with whom a trust grant needs to occur.

To reduce the compute burden of updating a Protector's trusted contacts list, Initiator may update only a sub-group of this larger group. For example, when the professionals are lawyers who communicate primarily with other lawyers practicing law in the same jurisdiction, the Switch may filter the global Protectors list by jurisdiction. Each of the lawyers admitted to practice in the same jurisdiction as a given lawyer, when they all use Protectors, may be included in a jurisdictional subset of the global group of enrolled attorneys. As to that given lawyer, only the sub-list is updated, not the global list, so that any new lawyers enrolled in that jurisdiction are identified and their ID data is included in the given Protector's Trust DBMS update. If the global enrolled group of professionals enrolled in the Protector contacts list are the lawyers of the United States, but Lawyer X practices only in California, the contacts sub-set that is replenished on the Protector of Lawyer X would be the members of the State Bar of California.

The Switch may contain a global DBMS identifying all enrolled lawyers. As to each individual lawyer, the DBMS references his jurisdiction and this allows the Switch to update the jurisdictional DBMS in each Protector application in a way that includes only the lawyers licensed in that professional's jurisdiction so that all of the contact data for that jurisdiction is provided. From these lawyers the Protector, upon contact with a colleague in the same jurisdiction with whom he needs to establish trust, furnishes the required Secondary ELD by loading the Initiator Class.

Another way to mitigate the compute burden is to use threads, so that at a defined interval the Protector contacts the Switch to update its Trust DBMS as a background task, with this occurring on a thread of lower priority than the threads used in ongoing communication. In this embodiment the Protector may reach the global DBMS on the Switch through a port, and the hard-wired ELD is be used to encrypt the data transmission. With this approach the jurisdictional step may be eliminated, and all of the existing Protectors on the network are constantly put in trust with all of the new Protectors, with Initiator running in the background as an endless loop to execute the relay function supplying the Tertiary ELD's corresponding to all the new enrollees on the CryptoNet. As to each new enrollee the thread creates a new record in the Trust DBMS and stores in it the Tertiary ELD corresponding to that person, so that upon first communication the Tertiary can be used to encrypt the Secondary that the sending computer automatically supplies to the recipient computer.

This approach may be used with a web mail service to make it secure, such as Gmail™, so that all of the contacts in a user-defined group are supplied with Secondary ELD's. With the meta-logic in effect, they encrypt everything they send back and forth using encrypted Plain-Text ELD's. As of 2013, Gmail™ allows messages to tagged by user defined "system labels," and one such label can be "secure," to operate as a trigger to the auto encryption and authentication functionality, such as by means of a filter or plug-in containing an Encryptor, together with a source of ELD's, such as a Switch on a URL. A port listens for the tagged messages and routes them to auto encryption, and the messages may "wrapped" as described above. The encryption-and-authentication service may be subscription based, available for a fee, auto encrypting all the messages back and forth between the members of a secure group.

The following code presents the configuration of the Java Mail Properties for ending an email through Gmail:

```
1. public Properties createSmtpProperties( )
2. {
3.    Properties props = new Properties( );
4.    props.setProperty("mail.smtp.host",
                "smtp.gmail.com");
5.    props.setProperty("mail.smtp.starttls.enable",
                "true");
6.    props.setProperty("mail.smtp.port","587");
7.    props.setProperty("mail.smtp.user",
                "jlivingstone@gmail.com");
8.    props.setProperty("mail.smtp.auth", "true");
9.    return props;
10. }
```

Line 4 sets the Simple Mail Transfer Protocol (step) server used by Gmail. Line 6 sets the port of the SMTP server, and the next line sets the user (jlivingstone@gmail.com, in this case).

The following code illustrates when an email is going to be sent, and how the properties created in the previous code are used by Java Mail.

```
1. public void postMail( String rec[ ], String sbj,
                String mes , String att)
2. {
3.    Properties props = createSmtpProperties( );
4.    Session session =
                Session.getDefaultInstance(props);
5.    Message msg = new MimeMessage(session);
6.    InternetAddress addressFrom = new
                InternetAddress(sender);
7.    msg.setFrom(addressFrom);
8.    InternetAddress[ ] addressTo = new
                InternetAddress[rec.length];
9.    for (int i = 0; i < rec.length; i++)
10.   addressTo[i] = new InternetAddress (rec [i]);
11.   msg.setRecipients(Message.RecipientType.TO,
                addressTo);
12.   BodyPart messageBodyPart = new MimeBodyPart( );
13.   messageBodyPart.setText(mes);
14.   Multipart multipart = new MimeMultipart( );
15.   multipart.addBodyPart(messageBodyPart);
16.   messageBodyPart = new MimeBodyPart( );
17.   DataSource source = new
                FileDataSource(attachment);
18.   messageBodyPart.setDataHandler(new
                DataHandler;source));
19.   messageBodyPart.setFileName(att);
20.   multipart.addBodyPart(messageBodyPart);
21.   msg.setContent(multipart);
22.   msg.setSubject(sbj);
23.   Transport t = session.getTransport("smtp");
24.   t.connect(sender,password);
25.   t.sendMessage (msg,msg.getAllRecipients ( ) );
26.   t.close ( ) ;
27. }
```

The previous code is the lowest level programming of the email manipulation functionality, and it directly uses the Java Mail API. Encryption does not occur at this level, but at a higher level module, the Email Processor module, which is explained below. The createSmtpProperties( ) method is called in Line 3. The rest of the code is in charge of preparing the email to be sent (setting the email's subject, recipient, message and attachment, see lines 4-22), and sending the email, lines 23 through 26.

As an aside, it should be observed that this technique for updating contacts on a network, using Initiator to operate on meta-files that specify a Protectors's jurisdiction or another kind of grouping, is broadly useful in horizontal communication. It makes possible not only encrypted lawyer-to-lawyer messaging, but also online litigation among the various lawyers appearing on any given matter or case. When the embodiments are used as a methodology for online litigation, such as through an additional module of meta-file functionality added to the Protector-Receiver architecture, each pleading in the litigation may be expressed as a meta-file containing among its other name-value pairs a value corresponding to a jurisdiction. Initiator may be used to bring those lawyers together by supplying that value via the same technique described above. Another value in the meta-file, a "matter" value, may group all of the lawyers who work on a given case. The meta-files may be on a cloud and subject to search. The values that Initiator invokes in establishing trust sub-groups may do double duty as search values when they are indexed to labels that a person on the network can understand and enter as a search term.

This extra functionality may be achieved by extending the meta-file and "bucket" paradigm, so that additional name value pairs are used to actuate algorithms that capture the litigation process and automate it. For example, such a name-value pair may operate in an algorithm that controls processes in litigation that are jurisdictionally dependent, such as a particular manner of perfecting service of process in the given case, or a manner of filing a pleading electronically in court. One jurisdiction may not allow the electronic filing of pleadings at all, while another might allow the pleading to be expressed as a .PDF file that is filed on a central server under the court's control. Another jurisdiction may allow the lawyers to litigate online and "virtually file" their pleadings by uploading them to a private cloud reached by their local online litigation applications, storing redundant copies of the virtually "filed" pleadings to guard against accidental loss or malicious alteration. The jurisdiction value in the meta-file is used to select the correct routine.

The methodology for filing a pleading in the particular manner that a given jurisdiction might authorize is a matter of happenstance, so using a jurisdictional value in the pleadings meta-file that associates the pleading with the correct procedure is useful. A name-value pair that specifies the jurisdiction in which the litigation is conducted may be expressed in the meta-file that wraps the body of the pleading. That value operates as a selector in designating the court filing procedure, such as a digital routine or the conventional filing of a paper document, whichever corresponds to the jurisdiction. The value may select the appropriate procedure via dynamic class loading, and this is generally true of all the litigation related informational processes that may be automated by the embodiments.

Initiator in one embodiment may be utilized to create group logic tunnel used in litigation to prosecute a new case, by connecting through one or more ELD's the lawyers who will litigate it. This may be a process of successive filtration steps. One embodiment of Initiator launches, instead of a logic tunnel that corresponds to the communicating Protectors through Secondary ELD's that operate on the Plain-Text ELD for authentication purposes based on the user's identity, or in addition to that, a private logic tunnel that corresponds to the case or matter.

The grant of trust under Initiator may employ a DBMS in all of the Initiator embodiments. When the recipient of a message that the first Protector will transmit is selected, Initiator checks the database of contacts, the Trust DBMS of the first Protector, to see if the Recipient is in it yet. If the contact is not in the Trust DBMS, then the Protector takes a fresh ELD and contacts the Switch in order to send it to that new contact, using it as the Tertiary ELD and employing the Switch as the relay in the transmission. This begins the above-described process of provisioning, for use immediately and in future contacts too, the dedicated Secondary ELD that will authenticate the two Protectors in all their communication. This process may be used to establish trust for encryption, but also to ensure that the professionals working on a defined matter are authorized to download meta-files pertaining to that matter, such as two lawyers litigating a particular case in which they lawfully have appeared for the client.

In form and function all of the ELD's are alike, irrespective of how they are applied in a networked scheme of encryption or online litigation, or a combined system with both purposes, and all of them are subject to execution by the Encryptor. In online litigation too, the Tertiary ELD approach may be used to grant trust, for example by limiting a lawyer's access to a case to ones in which he has the right to appear. When all of the lawyers have, by virtue of their law license, the legal power to represent a client in a case, the lawyer simply enters the case using his online litigation application, and two Trust DBMS's are utilized, one for the Secondary ELD's used in encryption, and another layer over that the first layer that encrypts the Secondary ELD based on the matter based ELD dedicated to that case. The Initiator process supplies all the missing ELD's, both such Secondary ELD's as for encryption and the matter ELD pertaining to the case to the lawyer newly appearing in the case.

The Tertiary ELD is randomly selected from the magazine of ELDs of the Protector who wishes to initiate the new trust relationship, and it is temporarily saved. It is saved in a temp file because it will be used to encrypt the Secondary ELD to be provisioned as the private logic tunnel installed for the newly trusted Protector, and used in the recurring secure communication back and forth between the two of them. After that limited use, the Tertiary is discarded.

In the case where the contact is already in the Trust DBMS of the sending Protector, this means that there already is a Secondary ELD that is available, so that existing Secondary ELD is used for encrypting the plain-text ELD. There is no need to use a Tertiary because the private logic channel is already in place, so there is nothing for Initiator to do and the Protector does not trigger initiator.

The code for the look up of the recipient on the trust DBMS may be as follows:

```
1.  if(contactsManager. isTrustContact (recipient) )
2.      secondaryELD = pDBMS.getTrustELDs(recipient,
    isRecipient);
3.  else{
4.      ELDSender as = new ELDSender( );
5.      secondaryELD = es.sendStarterPacket(recipient);
6.  }
```

The first line checks if the recipient is already a trusted contact, and if so his existing Secondary ELD is obtained from the Trust DBMS. Otherwise, the starter packet containing the Tertiary ELD is generated and sent to the Switch (by the ELDSender instance in lines 4 and 5). In the version for lawyers this process may implement a comparison to the jurisdictionally available list of available contacts. If jurisdictionally included contacts are available but trust is not yet established, as to each of them Initiator automatically may be executed. In the port-and-endless-loop embodiment, the trust initiating is an ongoing task in the background. Each time a new user enrolls on the network the endless loop approach causes him to be updated with all of the Protectors on the network with whom the new user is expected to enjoy trust, whether this the whole group or only a subgroup. (The system architect decides this). When the lawyer enters a case for the first time Initiator establishes the ELD that corresponds to that matter, so that the new lawyer has both the encryption ELD's and the matter ELD, and with that information can handles the pleadings meta-files.

The data file used in the Initiator process is called the Starter Packet. The code of the sendStarterPacket( ) method may be the following:

```
1. public EncryptionDocument sendStarterPacket (String recipientId)
2. {
3.   SwitchConnectivity conn = new SwitchConnectivity( );
4.   Vector v = new Vector( );
5.   v.add("CONNECT_STARTER_PACKET");
6.   v.add(SENDER_EMAIL);
7.   v.add(recipientId);
8.   com.encryption.logic.EncryptionDocument ELD = null;
9.   byte[ ] bLogic = ELDFulfillment.getELD( );
10. try{
11.   ELD = parseLogic(bLogic);
12.   DatabaseManager dbms = new DatabaseManager( );
13.   dbms.insertTrustData(false, recipientId, "", ELD.toString( ));
14.   byte[ ] encBytes = encryptWithELD(ELD, hardWiredELD);
15.   v.add(encBytes);
16.   conn.initSwitchCommunicator(v);
17. }catch(Excepcion e){ }
18.   return ELD;
19.}
```

Once the Switch has received the Tertiary ELD, it is decrypted and re-encrypted using the recipient Protector's hard-wired ELD. After this, the Switch checks if the recipient is online, and if so the Tertiary ELD is automatically sent to the recipient via the process just described.

If the recipient is offline, then the ELD is temporarily stored on the Switch and sent the next time the recipient establishes a connection. As always, the connection between the recipient and the Switch uses the recipient's hard wired ELD to encrypt the data transmission, in this case the Tertiary ELD, on the second leg of the relay. If the second Protector is not online the Switch acts as an escrow holder, keeping the Tertiary ELD in trust for the second Protector to receive during his next login. A field in the Trust DBMS on the Switch may be dedicated to this end. So the Switch either immediately relays the Tertiary ELD down to the second Protector, or holds it until the second Protector is online, and relays it at that time. The code that preforms this on the Switch may be the following:

```
1.   public void processStarterPacket(Vector v)
2.   {
3.     String senderId = v.get (1) .toString( );
4.     String recipientId = v.get(2) .toString( );
5.     byte[ ] encTerELD = (byte[ ])v.get(3);
6.     hardWiredELD = retrieveHardWiredELD(senderId);
7.     recipHardWiredELD = retrieveHardWiredELD(recipientId);
8.     byte[ ] decBytes = decrypt(hardWiredELD, encTerELD);
9.     byte[ ] encBytesForB = encrypt(recipHardWiredELD, decBytes);
10.    if(Connections.containsKey(recipientId))
11.    {
12.      Vector data = new Vector( );
13.      data.add("TRUST_ELD");
14.      hELDs = retrieveTertiaryELDs(recipientId);
15.      if (hELDs==null) hELDs = new Hashtable( );
16.      hELDs.put(senderId, encBytesForB);
17.      data.add(hELDs);
18.      Connections.get(recipientId).sendData(data);
19.    }
20.    else insertTrustELD(senderId, recipientId, encTerELD);
21. }
```

Lines 3-5 obtain the data sent by the Protector. Lines 6 and 7 retrieve the hardwired ELD's of the sender and the recipient, respectively. Line 8 decrypts the Tertiary ELD, and line 9 re-encrypts it using the recipient Protector's hardwired ELD. Line 10 checks if the recipient is online. When the recipient is online all of the Tertiary ELD's sent to the recipient (by all the Protectors who are inviting the recipient into trust, in case there happens to be more than one Tertiary ELD pending) are retrieved in line 14. Each new Tertiary ELD is added to the hash table of ELDs. The ELDs are downloaded to the recipient Protector.

In the case where the recipient is offline, the Tertiary ELD may be stored in the Switch DBMS so it can be sent when the recipient comes online again. When the recipient Protector is not online and the sender has sent the Tertiary ELD, the next time the recipient establishes a connection to the Switch the recipient obtains it, and this is a background task occurring during the recipient's login. This may happen with multiple Tertiary ELD's in a batch, and they correspond to multiple new trust initiations so that all of the initiations execute at the beginning of the recipient's session.

After the relay process has provisioned the Tertiary ELD on the computers, the next step is sending the first email, which may include an actual message, from the trust-initiating Protector to the soon-to-be-in-trust recipient Protector. The meta-file that contains the email also contains the Secondary ELD—and that Secondary is encrypted by the Tertiary. When the recipient receives this email and the meta-file packet is processed, the application notices the flag that marks the communication as the initial one, and thereby giving notice that the Initiator process has been executed. The recipient Protector parses the encrypted Secondary ELD in one of the packet's name-value pairs.

The recipient of course will require the Tertiary ELD to decrypt that Secondary. If the Tertiary ELD has not yet been sent from the Switch to the recipient Protector during the recipient Protector's last session, the recipient Protector must log on anew, and this action sends a request to the Switch to obtain it as a background task. In this instance the recipient Protector did not happen to be logged in when the sending Protector transmitted the Starter Packet to the Switch, so the Switch saves the Tertiary so the recipient Protector can receive it later.

Unless the Tertiary ELD is executed to decrypt the Secondary ELD, the Secondary remains unusable, as it cannot load the class to successfully decrypt the Plain-Text ELD. It is essential that the Secondary ELD be decrypted before it is installed in the Trust DBMS, looked up, and executed to decrypt the plaintext ELD. For this reason, it is an efficient practice to download to the recipient Protector any new, pending (which is to say newly provided) Tertiary ELD's every time that Protector logs in.

The code for the look up of the sender in the Trust DBMS may be as follows:

```
1.  boolean isRegistered = pDBMS.isTrusted(sender);
2.  boolean hasSecondary =
    pDBMS.recipientHasSecondaryELD(sender);
3.  boolean isClient = contactsManager.isClient(sender);
4.  boolean isColleague = contactsManager.isColleague(sender);
5.  if(!isClient && !isColleague)
6.  {
7.      if(isRegistered && hasSecondary)
8.          secondaryELD = pDBMS.getTrustELDs(sender, isRecipient);
9.      else if(!isRegistered)
10.     {
11.         ELDRetriever er = new ELDRetriever( );
12.             er.sendTrustELDRequest( );
13.     }
14.  }
```

In the first 4 lines the code checks if the sender is already registered in the recipient Protector's Trust DBMS, to see if it already has the Secondary ELD for that sender, because if the sender is a colleague already in trust there will be a Secondary ELD available. Based on the value of the flag, one of two branches occurs. Either the Secondary ELD is obtained from the local DBMS, or a the recipient Protector must obtain the Tertiary ELD from the Switch. So the procedure may be seen as a branch in every act of communication that completes the Protector's trust matrix: either that value already is present, or the value is to be established by running an instance of Initiator.

The code used by the Switch to process the trust request may be as follows:

```
1.  public Vector processTertiaryELDRequest(Vector v)
2.  {
3.      String protectorId = v.get(1).toString( );
4.      Hashtable hELDs = retrieveTrustELD(protectorId);
5.      Vector data = new Vector( );
6.      data.add("TERTIARY_ELD");
7.      data.add(hELDs);
8.      return data;
9.  }
```

The Switch uses this code to process the recipient Protector's request for any pending downloads of Tertiary ELD's, so that the recipient can obtain the Tertiaries and update its Trust DBMS when the Protector application is first executed. Once the request is triggered by the login procedure on the recipient Protector, it signals the Switch to send any pending Tertiary ELD's needed to perfect any trust grants from the Protectors. The Switch looks up the Tertiary ELDs pertaining to that recipient Protector and downloads them, in a batch. With this step, the recipient's request at login to update the operative set of Secondary ELD's after obtaining Tertiary ELD's, is executed as a background task. The Id of the recipient Protector is taken from the data vector (line 3) in order to be used in the retrieval of the Tertiary ELD (see line 4). Because the recipient Protector has the Id of the initiating Protector the recipient can associate that Id with the correct Tertiary ELD and decrypt the corresponding Secondary ELD when that Secondary is received from that transmitting Protector in the email meta-file.

The result of the retrieveTERTIARYELD( ) method is a hash table that contains name value pairs of the form (senderId, TertiaryELD). This hash table is sent to the recipient Protector. When the Secondary ELD has been received, it is decrypted using the Tertiary ELD the recipient has received (after the Tertiary has been decrypted per the hardwired ELD that connects the recipient Protector to the Switch). The code for performing this may be as follows:

```
1.  if(pair.getName( ).equals("SEC_ELD")
2.  {
3.      byte[ ] bytes = pairs[i].getValue( );
4.      EncryptionDocument tertiaryXml =
    pDBMS.getTertiaryELD(sender);
5.      byte[ ] decBytes = decryptWithELD(bytes, tertiaryXml);
6.      secondaryELD = parseLogic(decBytes);
7.      String enc = HousekeepingEncryption.encrypt(secondaryELD);
8.      pDBMS.setSecondaryELD(enc, sender);
9.      pDBMS.setRecipientHasSecondary("true", sender);
10.     pDBMS.removeTertiaryELD(sender);
12.     sendELDHasBeenRecievedMessage(sender);
11. }
```

The encrypted bytes of the Secondary ELD are obtained in line 3. The Tertiary ELD is read from the DBMS in line 4, after this, the bytes are decrypted (see line 5) and the Secondary ELD is parsed and re-encrypted using Housekeeping Encryption Logic and saved as a read-only file stored in the Trust DBMS. The last step consists in discarding the Tertiary ELD and sending the message to the sender indicating that the Secondary ELD has been received (line 12).

Initiator having been executed, when the recipient Protector receives the encrypted message from the first Protector the Tertiary ELD is extracted from the recipient's DBMS, so that it can decrypt the Secondary. (Either the Tertiary was received at login, or alternatively, the recipient Protector has contacted the Switch to download it when the recipient became aware that it would be needed.) The recipient Protector uses the Tertiary to decrypt the Secondary. Then the recipient installs the decrypted Secondary ELD in its Trust DBMS, in the record corresponding to the first Protector. With the process now complete the Protectors on the VPN have gained the capability of authenticated and encrypted communication in each instance by routinely executing their mutual Secondary ELD, the private logic tunnel that has been installed by these steps, to auto encrypt and auto decrypt the plaintext ELD that scrambles the payload of each encryption meta-file. Everything occurs as a background task.

Figure 40:
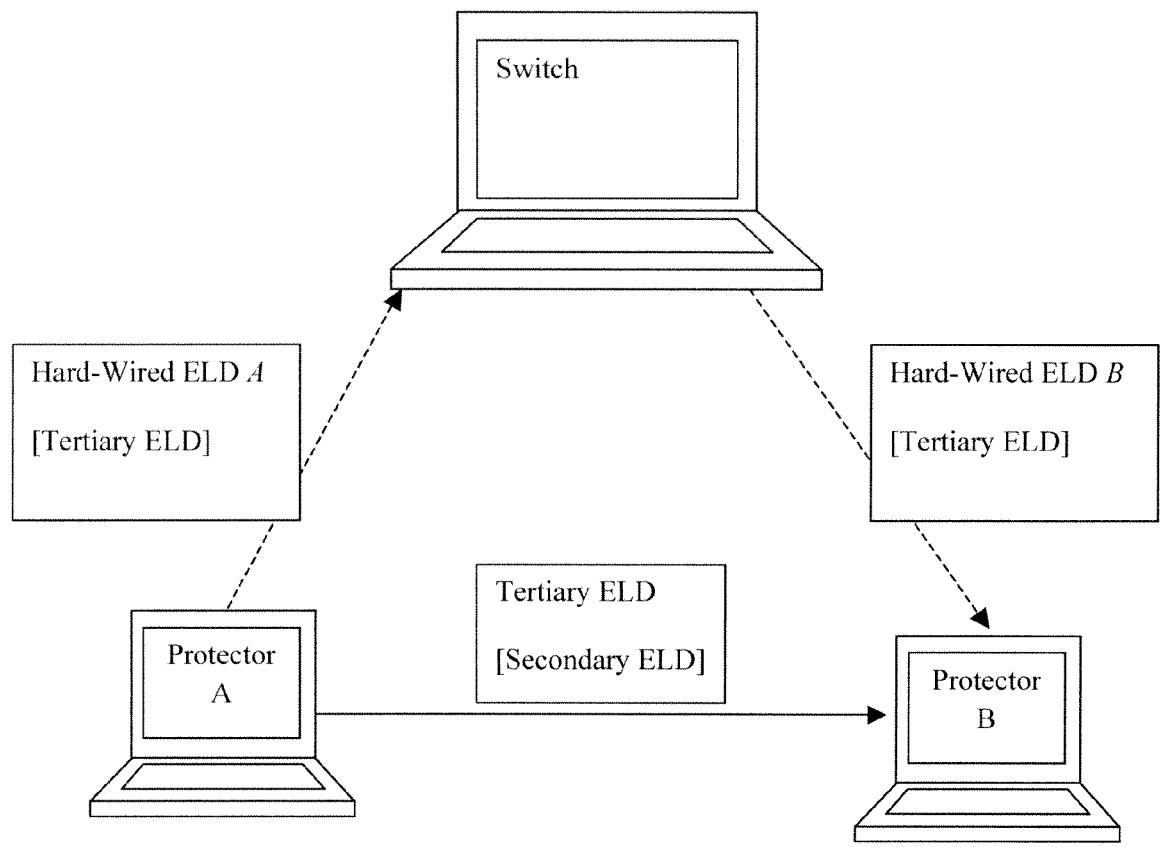
FIG. 40 Establishing Trust Through the Switch . . .

FIG. 40 illustrates the process of granting trust between two Protectors, Protector A and Protector B. In this Figure, the dashed arrow that goes from Protector A to the Switch refers to hard-wired ELD A, which encrypts the Tertiary ELD (illustrated with a block). The dashed arrow that goes from the Switch to Protector B means that hard-wired ELD B encrypts the Tertiary ELD on the other leg of its journey. In the case when the recipient of the Tertiary ELD is not online, requiring that the Switch temporarily store it, and the first Protector has already sent the email that contains a Secondary ELD, the re-line is used as the flag that indicates in the email that the meta-file that contains a Secondary ELD that, since it is to be used for the first time, is encrypted by the Tertiary.

Due to the fact that the Protector-Receiver network is a closed system (only emails coming from trusted clients or professionals are processed, only from Receivers or Protectors) the mail is filtered. Because in this particular case the sender is still not registered as trusted, the re-line is used as the flag to convey the fact of first use to the recipient Protector. The fact of first use means Initiator will have to be executed.

When the Email Processor of a recipient Protector detects the request for trust in the email (by checking the re-line) it parses the encryption meta-file, but still cannot read it because the recipient Protector still does not have the Tertiary ELD. The meta-file contains the Secondary ELD, but it is encrypted by the Tertiary. Since the recipient Protector has not yet received the Tertiary ELD with which the sender has encrypted the Secondary ELD, the recipient Protector must contact the Switch in order to download it and use it to decrypt the Secondary. Flagging by using the re-line of the email message may be the trigger allowing the logic tunnel to be installed, connecting the recipient Protector to the first Protector who launched the trust grant process. The recipient Protector may receive the Tertiary ELD's on a case-by-case basis, but downloading all of the Tertiary ELD's from the Switch at logon, all at once, accomplishes this at the inception of the recipient Protector's secure session and eliminates any bottleneck.

The code for filtering the email may be the following:

```
1.  public Vector filterMail(Folder inbox)
2.  {
3.    Vector filteredMails = new Vector( );
4.    String trustReLine = "GRANTING OF TRUST";
5.    Message[ ] clientDataMessages = inbox.getMessages( );
6.      for(int j=0; j<clientDataMessages.length; j++)
7.      {
8.        String subject = clientDataMessages[j].getSubject( );
9.        boolean isTrustMessage =
subject.equals(trustReLine);
10.       if(isTrustMessage)
11.           filteredMails.add(clientDataMessages[j]);
12.     }
13.   return filteredMails;
14. }
```

The messages are filtered according the re-line in the loop in lines 6-12. Line 9 checks if the subject (the Re-Line) of the email corresponds to the trust re-line, and if so it adds the email to the vector of filtered entails. An Alternative Initiator Embodiment: Encryption Data Transmission Via Satellite One security challenge in creating encryption applications is the monoculture problem, i.e. the obstacle that where commonality exists in the features of the applications, cracking one application allows the others to be cracked too in direct proportion to that commonality. The embodiments of the invention reduce that commonality. For example, the individual Protector applications are auto generated on the Switch, and each uses a unique translation table in the Cognitive Signature decryption function, differentiating one computer from the next in the bytes expansion translation table that expands the byte set from one corresponding to ASCII to one corresponding to Unicode, and in the parameters of encryption and decryption.

Another individuation feature is the hard-wired ELD, unique to each Protector, which encrypts by default all communication between the Protector and the Switch. In the embodiments the individuation of features in the application to mitigate the monoculture problem is provided at multiple points. Such individuation features may include, in addition to the hard-wired ELD, Cognitive Signature, and the serial id, other features that involve the receipt of encryption related values via satellite data casting. Satellites can supply random values to the dynamic encryption process, as will now be explained, in a manner that eliminates the commonality in the system caused when all of the encryption related data is sent to the computers solely via terrestrial means.

The individuation features are a defense against hacking. When an encryption network using the embodiments contains applications with logic features that are individuated at multiple points, this makes it very difficult for the Plain-Text ELD that is included in the encryption meta-file to be compromised. Unless strong precautions are taken, it is dangerous "to send the key and the lock in the same box." For this reason security is enhanced by strengthening the protection of the Secondary ELD, to better insulate the embedded Plain-Text ELD from hacking. Individuation features are a strategy for this.

The Tertiary ELD approach to Initiator, using the Switch as a relay, is the first embodiment. What follows are satellite based, highly secure embodiments of initiator. In these other Initiator embodiments, as a separate individuation feature in the layers of encryption logic, an alternative data transmission means is provided for the Secondary ELD's and related data. In Protector-Receiver, in the first embodiment of Initiator using the Tertiary ELD's, a terrestrial network such as the Internet is the only data transmission means. This means that all of the data that a hacker would need to crack the system is traveling by a single transmission means. Theoretically at least, this is a weakness. Assuming that the hacker could crack all of the ELD's at the various points of the network, and crack the Cognitive Signature as well, the system could be compromised. This is highly unlikely, but possible nonetheless.

So in the second, third, and fourth Initiator embodiments, this "single transmission means" risk is mitigated by another orthogonal feature: requiring that each application receive the encryption related data by more than one data transmission means. The meta-logic is received by a separate data transmission means, such as HD radio or satellite.

For example, data casting may be used as an alternative data transmission means, such in Microsoft Direct Band™, a data casting information service using radio. FM radio, AM radio, VLF Omega, or other analog bands on the electromagnetic spectrum can provide an alternative or supplemental means for to supply encryption related data to the dynamic encryption process. For example, one or more layers of meta-logic using the analog spectrum as an alternative data transmission means may be provided, in addition to or instead of the meta-logic architecture described above in the first Initiator embodiment through which the encryption related data arrives to the user applications exclusively through a terrestrial VPN. When the signal in the alternative data transmission means is analog, and analog to digital conversion is used at each end of the transmission, the signal cannot be compromised unless the hacker has analog means available.

Analog transceivers with a modem capability may operate in a peer-to-peer topology, so that when an analog radio Transceiver A, in Tonopah Nev., wishes to transmit to Transceiver X, in Kennebunkport Me., the transceivers in between are searched, found, and selected to relay the transmission. Transceiver selection may be governed by a value in a DMBS that specifies whether each of the other peers to be used in the relay, in respect of the transmitting peer, is in transmission range or not; and this value may be "tuned" per a feedback loop that grades the success of transmission from each peer to all of the others within its range during each transmission.

Yet another way to do it is via Satellite based data casting, such as via Sirius™ or XM™ Radio. The satellite based means of data transmission as a second transmission means for the encryption data will now be described.

In one embodiment using the satellite approach, the ELD's used for encrypted communication are transmitted on a terrestrial system such as the Internet in the manner previously described, but some of the ELD's do not use terrestrial means. The terrestrial means of data transmission is supplemented by a satellite based data casting system, in a way that makes the satellite data a necessary—but not a sufficient—input to the system to allow automatic auto encryption and auto decryption as a background task. The satellite-based datacast operates as a completely independent transmission means, providing a separate data stream and a separate logic layer. For this reason the system cannot be cracked by hacking the terrestrial VPN alone. This means that in the worst case scenario, such as one in which all of the ELD's are compromised on the terrestrial VPN, nonetheless the system remains uncracked because of the second, independent means of data-transmission, the satellite datacast.

Another individuation feature may further minimize the risk of the monoculture problem. A Switch that differs logically in its particulars from the Terrestrial Switch may be employed in processing the satellite datacast, and the Encryptor used for this separate data stream also may differ. This means that the logic used on the second Switch cannot be compromised merely by hacking the logic on the terrestrial Switch.

One strategy is to use terrestrial data transmission means for the Plain-Text ELD's, but satellite based data transmission for the Secondary ELD's. The encryption logic layers may be configured in such a way that the Secondary ELD's never traverse the VPN, as they do in the first embodiment of Initiator relying on Tertiary ELD's. They arrive at the Encryptors of the Protector application via the Satellite Switch only, never touching the VPN at all. In this second embodiment for Initiator the Secondary ELD's arrive at the trust DBMS of each Protector application (or any other point in the system invoking Secondary ELD's, such as a sub-switch or router for a LAN) purely via the satellite datacast.

One advantage of satellite datacast is the simultaneity that it affords in reaching the computers. When a satellite radio system such as Sirius™ is used as the means of transmission for the Secondary ELD's, a universe of millions of enrolled users may be served with data in the same instant, across a huge geographic area. The entire universe of users may be linked through a matrix of Secondary ELD's by employing a Trust DBMS for each user, and the satellite datacast provides that logic, supplying the Secondary ELD's and keeping each Trust DBMS current.

The additional overhead posed by the satellite transmission of ELD's to a subscriber base, such as businesses that receive and amplify digital music for their customers or employees, is not significant. For example as of the year 2013, the SIRIUS™ satellite music system (also known as XM™ Radio) offers approximately 200 channels of CD quality music, and a dozen datacast channels. If a single music channel were converted to a transmission means for ELD's, millions of ELD's could be sent as a continuous stream, containing time markers as a means to identify each ELD positioned in the stream. The time markers are processed on the local computers in order to overcomes any latency in receipt of the signal. This is to say, the satellite datacasts are buffered and processed as files, using the time markers to provide data coherency between the communicating computers. To render the ELD's usable by the Protectors, the streamed ELD's may be identified by a descriptor that specifies where each ELD is positioned in relation to one or more time markers in the datacast, or in relation to the other ELD's. The ELD's in one stream, furthermore, may be described in terms of their relative position to the ELD's in a second or third stream. In this case there is no need to insert time markers, because the relative position of the bytes in the first stream when compared to the bytes of the second stream allows the computers to calculate a starting point in either stream. In this latter case, using the common starting point so derived, there may be a matching process to generate a common input of bytes to all of the computers that receive the channels. The point is that no exact moment in real time is required to process the datacasts on the computers, because each computer can identify a mutual starting point by observing the pattern of bytes matching that results when one stream is compared to the other. With the common starting point, both computers may process the streams in a mirrored fashion to generate the Secondary ELD on each computer, so that they can establish trust.

When the system architect does not rely on bytes matching to achieve coherency by identifying a mutual starting point for the mirrored processing of the datacast, markers may be used instead. Markers are inserted into the datacasts, and various approaches may be used. The markers may express a moment in time that bifurcates the datacast into past and future, or segments them as a sequence; or the markers may be a label in the form of bytes that inserted into the data stream at the satellite.

By either means one or several ELD's may be identified and picked from the stream as it is simultaneously datacast to all the enrolled users on the encryption network. Because the ELD's may be harvested by two computers at the same time, they can be used as a mirrored logic input for encryption, per the embodiments. Or the two approaches may be combined. The mutual starting point in the datacast that is identified on both computers may be identified by bytes matching, and the markers are inserted in situ, on the local computers instead of in space, on the satellite.

This processing of the stream may take place, instead of on the individual computer, on a Satellite Reception Switch that generates the encryption logic analogously to the Switch previously described that operates using terrestrial data transmission means. Each Satellite Reception Switch (for brevity, Satellite Switch) may function as a router for a LAN, and each Protector is on one of the LAN's. The Satellite Switches receive the satellite datacast as a constant feed, and all of them receive it from the same satellite, or from a common sub-set of them, and simultaneously.

One or more ELD's in the datacast that the Satellite Switches receive, per a mirrored, descriptor based selection process executing on the computers or on the Satellite Switch, may be plucked from the stream and executed to auto encrypt or auto decrypt a digital file such as a body of text, for instance a message to a person, or to auto encrypt or auto decrypt another ELD. In the example given below, the ELD's generated by using the satellite datacast are used only as Secondaries. This is in keeping with the strategy of separating the meta-logic from the terrestrial part of the system by using the satellite datacast as an independent encryption data transmission means for the Secondary ELD's, while providing the Plain-Text ELD's by terrestrial means using a VPN, as described previously. This functional separation boosts orthogonality.

Figure 43:
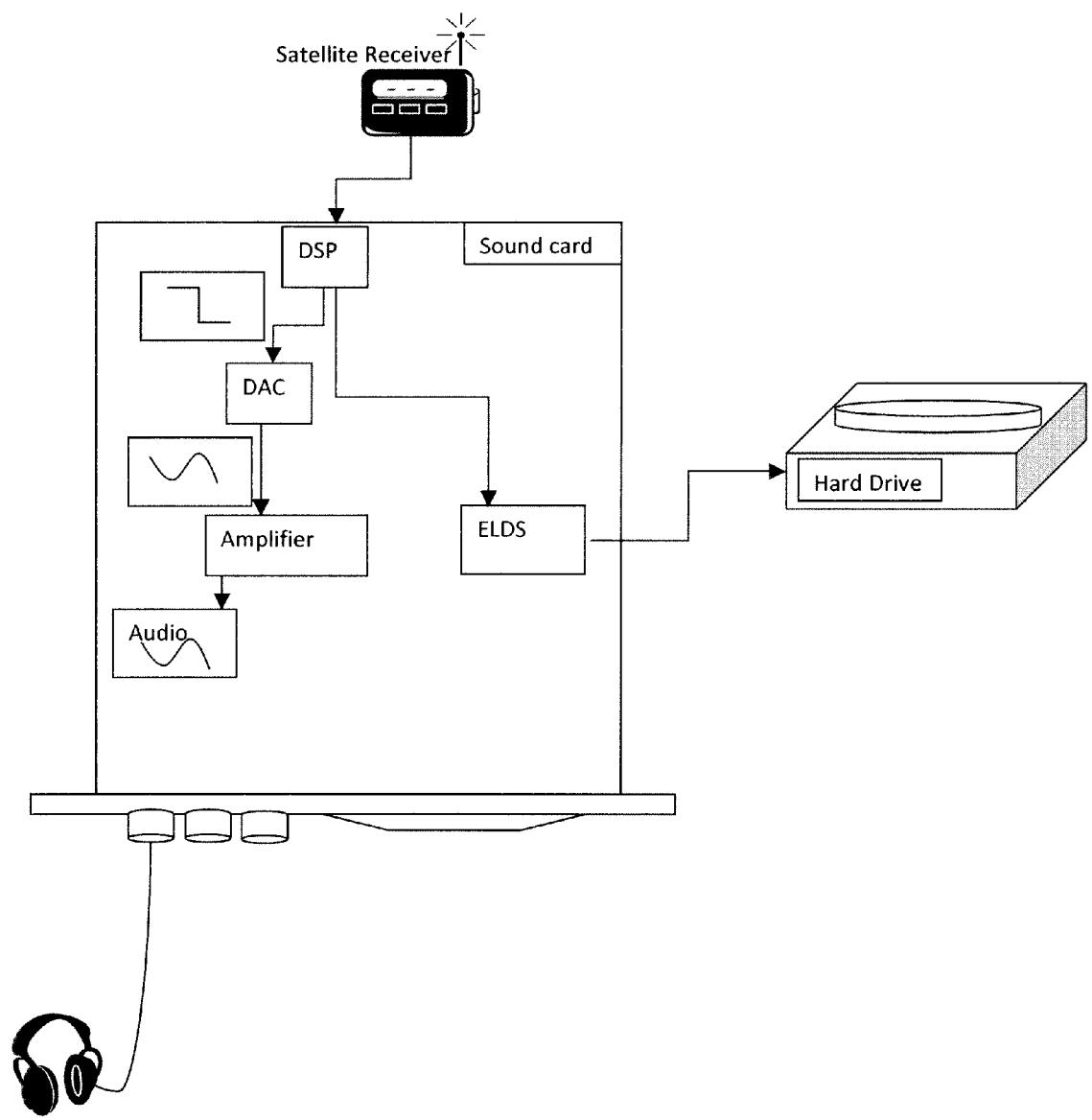
FIG. 43 Satellite Switch for LAN, with Hard Wired ELD's and Trust DBMS . . .

With or without the intervention of a Satellite Switch, the computers may use the datacast for encryption logic purposes. When the computers are not connected to a LAN with a Satellite Switch, they receive the datacast directly from space. The computers may use a plug-in card with satellite reception capability, such as one on the PCI bus, or through a satellite radio receiver with a digital output connected to the computer or to a network. This is shown in FIG. 43. By such means the computers may identify a common ELD in the stream.

As in the previous embodiment of Initiator, the encryption logic satellite reception process may happen as a background task that is triggered by the lookup on the Trust DBMS of each Protector, so that the Secondary ELD associated with the pair of Protectors is obtained and trust is established. If there is no Secondary ELD in the Trust DBMS corresponding to the recipient of the message that the first Protector composes and transmits, one needs to be provided so they can enjoy a private logic tunnel for all their communication from that point forward. This is the task of Initiator, in all of its embodiments. As explained previously, the first Protector as a background task looks up the recipient Protector in the Trust DBMS, and if there is no Secondary ELD in the corresponding record, one is implemented through an instance of Initiator, in this case using satellite datacast reception.

In the satellite embodiment when trust does not exist a Time Object Descriptor may be added to the encryption metafile. This is a pointer that, when executed, identifies an individual ELD in the datacast stream based on the relationship of that ELD to time tags marking the stream that are repeated at an interval of time. The pointer functionality is executed on each side of the encryption logic circuit, so that computer A and computer B identify the same ELD in the datacast, and that ELD becomes their Secondary ELD. The clock on each computer, or on each Satellite Switch, is synchronized with the clock on the satellite, and with synchronization a "virtual time," the systems are coherent, which allows the time object to work in an accurate manner. Perfect timing is not needed, as shown below, when a test file is used on the recipient computer, one of many ELD's in the datacast as the actual one that the sending selected and used as the Secondary. Sophisticated timing synchronization may be provided, however, in some embodiments. For example, Satellite Switches may use atomic clocks or masers for synchronization, and the Switches communicate with one another, or with the satellite, to carry the synchronization out. Less expensive radio clocks may provide synchronization for the Satellite Switches and this may prove adequate in some embodiments. Loran C is another signal that has timing accuracy and is inexpensive to process. Timing sensitive networks frequently use the Network Time Protocol, and this is another choice. Inexpensive radio clocks synchronized by atomic clocks are another inexpensive technique to provide timing accuracy. Dedicated Radio Time Signal Stations, many in the 45 kHz to 75 kHz band, provide a timing signal for free, and the circuitry for radio reception is very inexpensive. When the system integrator decides that accurate timing is important for a particular implementation, GPS disciplined oscillators, which are accurate to nanoseconds, may be installed on the Satellite Switches for superb timing accuracy in the datacast transmitted from each.

On each computer the time object is executed to select, in mirrored fashion, the same ELD from the datacast emanating from the satellite. The strategy is to capitalize on the fact that all of the computers receive the same data stream, by making use of the common random satellite data as the means of generating the private logic tunnels that link one computer to another. Because the data streams from space are captured, saved, and marked, the time object on the computers identifies an ELD with a specified a segment of them to be used as the Secondary. In another embodiment discussed below, standard entertainment based datacasts from space are used in a bytes comparison process to provide coherency between the two computers.

The ELD's may flow as pulses in the satellite datacast stream, such as 500 in each time interval segment, with each segment separated by an elapsed time measurement given effect as an inserted marker in the form of bytes. In embodiments processing the stream in real time, a DSP processes the signal as it is received, on both computers or on both Satellite Switches, using time alone, without resort to any markers in the form of inserted bytes. On the other hand, using both time measurement and physical tags to identify the individual ELD's in the datacast to be utilized as Secondary ELD's is a good approach. For instance, after Time Tag T the $37^{th}$ ELD, identified by counting markers separating the individual ELD's in the stream following that tag, may be the ELD selection on the computers that provides the mirrored logic.

Embodiments may use time tags, real time measurement, and time derived descriptors in various functional combinations. One embodiment uses GPS as the satellite random data input into the encryption logic, and this signal has inherently good timing. Timing accuracy may be provided in the satellite signal itself, and the computers may be synchronized to the embedded timing in the signal, and to thus each other, by the many means described above. Among the other background tasks that happen when a Protector logs on, it may contact and receive a timing signal from a radio clock, a dedicated radio Time Signal Station, or a GPS disciplined oscillator, any of which may be reached through a network. By this means the Protectors synchronize the clocks on their computers with one another, and with the timing signals received in the datacast from space as well. Many means of synchronization between earth receivers and satellites, and between one earth receiver and another, are known to a person skillful in the art.

Figure 70:
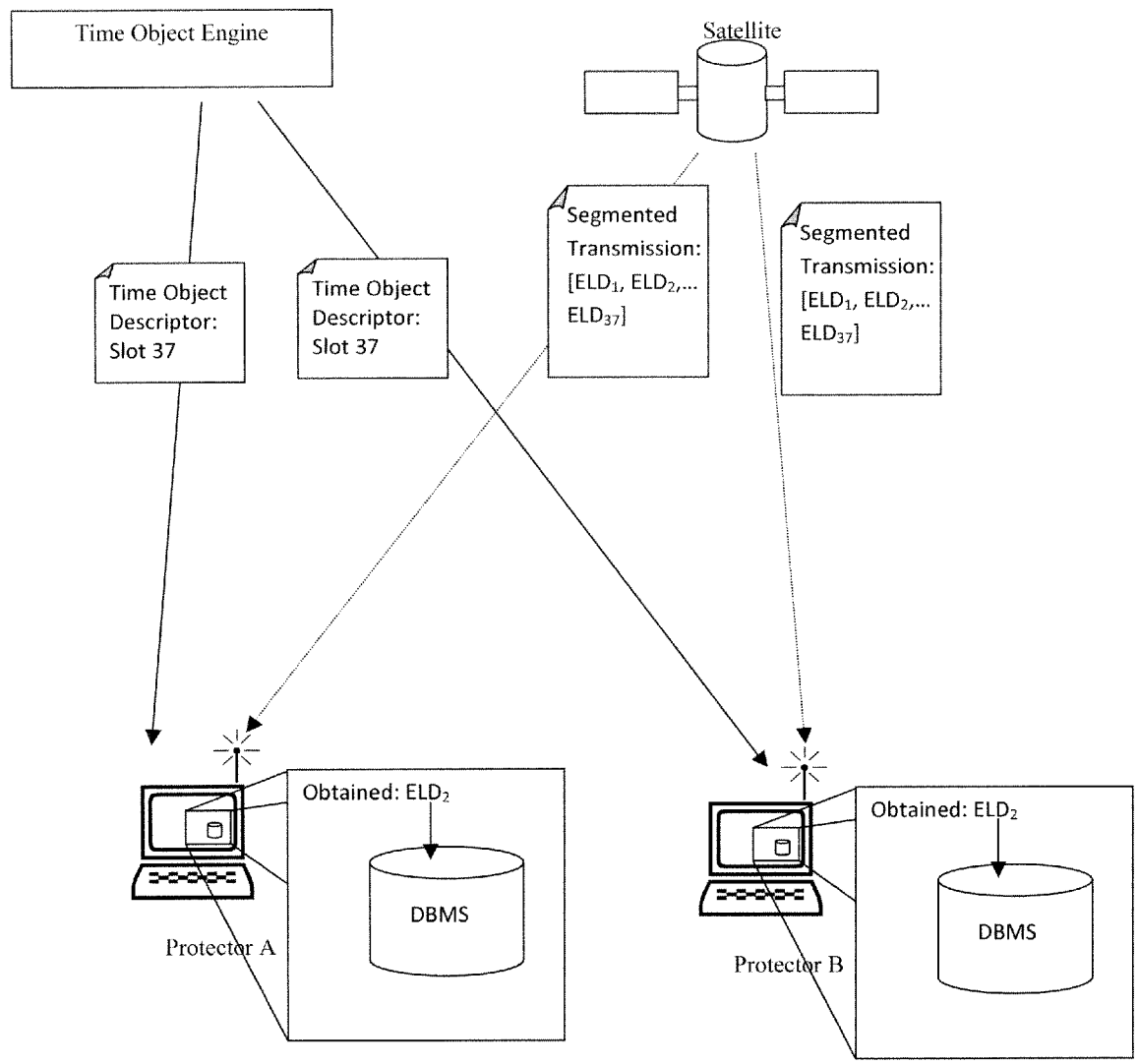
FIG. 70 Descriptors from Switch and ELD's from Space . . .

The selection process may be expressed by a descriptor instantiating algorithmic steps, and this is the essence of the Time Object Descriptor. Dynamic class loading per the embodiments may be used. The datacast may be processed into bytes instead of bits, by the analog to digital conversion process. The process of extracting individual ELD's from the stream may involve actions by both the Satellite Switch and the individual Protectors on the LAN which the Satellite Switch controls. The computer on the LAN may generate the Time Object Descriptor and the Satellite Switch may execute it. Alternatively, when encryption logic is needed the computer contacts the Time Object Engine, which prepares the Time Object Descriptor and returns it to the computers for execution, as in FIG. 70. The computers contact the Satellites and use the Time Object so provided to Identify an ELD in the satellite datacast stream. With the either ELD or the segment of the stream containing it received by the computers, that encryption logic data is processed to allow the ELD to be installed in the Trust DBMS, and from that point forward used by each computer to encrypt the Plain-Text ELD's.

The Time Object Descriptor class may be the following:

```
public class TimeObjectDescriptor
{
    long timeInMillis;
    Java.util.GregorianCalendar cal;
    public TimeObjectDescriptor(long t)
    {
        timeInMillis = t;
        cal = new Java.util.GregorianCalendar( );
        cal.setTimeInMillis(t);
    }
    public void setTimeInMillis(long t)
    {
        timeInMillis = t;
        cal.setTimeInMillis(t);
    }
    public void setDate(int dd, int mm, int yy)
    {
        cal.set(yy, mm, dd);
    }
    public void setTime(int h, int m, int s)
    {
        cal.set(h, m, s);
    }
    public int getDay( )
    {
        return cal.get(Calendar.DAY_OF_MONTH);
    }
    public String getDate( )
```

```
{   String dd = getDay( );
    String mm = getMonth( );
    String yy = getYear( );
    return dd+"/"+mm+"/"+yy;
    }
}
```

The computer initiating trust may generate the Time Object Descriptor randomly, per the randomization techniques described previously. Please see the following code:

```
public TimeObjectDescriptor createTimeObject( )
{
    TimeObjectDescriptor tod = new
                TimeObjectDescriptor( );
    int h = RNG.getRandomInt( );
    int m = RNG.getRandomInt( );
    int s = RNG.getRandomInt( );
    tod.setTime(h, m, s);
    return tod;
}
```

To obtain the mirrored Secondary ELD the computers both execute the Time Object Descriptor. The first computer sends it to the second computer and it may be encrypted via Housekeeping Encryption Logic before it is inserted into one of the name value pairs of the meta-file and sent to the other computer. The code in the next listing shows the encryption of the Time Object Descriptor:

```
public byte[ ] encrypt(TimeObjectDescriptor tod)
{
  byte[ ] bytes = ObjectToByte(tod);
  byte[ ] encrypted = HousekeepingEncryption(bytes);
  return encrypted;
}
```

The encryption meta-file is sent using the terrestrial transmission means, as previously described, such as via email or chat. A conventional webmail service may be used to transport the encryption-metafile containing the Time Object Descriptor, just as in the Tertiary ELD embodiment of Initiator. At design time the code for creating the name value pair that contains the Time Object Descriptor may be as follows:

```
public Pair createPair( )
{
  TimeObjectDescriptor tod = createTimeObject( );
  byte[ ] encrypted = encrypt(tod);
  metafile.xml.Pair p = Pair.Factory.newInstance( );
  p.setName("TIME_OBJECT");
  p.setValue(encrypted);
  return p;
```

The code for extracting the Time Object Descriptor from the encryption meta-file on the recipient's side of the logic circuit may resemble the following:

```
public void processTimeObject(Vector data)
{
  metafile.xml.Pair pair = data.get(2);
  byte[ ] encrypted = pair.getValue( );
  byte[ ] bytes = HousekeepingDecryption(encrypted);
  TimeObjectDescriptor tod = BytesToObject(bytes);
  registerTime(tod);
}
```

At runtime, the Secondary ELD's arrive at the point of execution exclusively via satellite, and the load the class on each Protector to encrypt and decrypt the Plain-Text ELD. One possible example of code to accomplish this is the following:

```
public void processSatelliteSignal( )
{
   while(true)
   {
     InputStream is = satRadio.getInputStream( );
     byte[ ] encrypted = is.read( );
     byte[ ] signal = decrypt(bytes);
     extractELDsFromSignal(signal);
   }
}
```

The recipient computer receives the encryption meta-file and parses the Time Object Descriptor from its name value pair. As with the ELD, XML may be used to express the descriptor. If the sending Protector used an ELD to encrypt the Time Object Descriptor, the Receiving Protector must decrypt it so that it can use it in native form to select the Secondary ELD from the satellite datacast. The object, once decrypted, is used in the dynamic class loading process. On both sides of the mirrored circuit the class loads to select a particular ELD from the stream in the satellite datacast, each side saving that ELD in the Trust DBMS as their mutual Secondary ELD and thereby endowing each computer with the ability to auto encrypt and auto decrypt the Plain-Text ELD used to scramble each message. Each time a message passes back and forth, the Secondary ELD that the satellite datacast has provided will operate as the private logic tunnel between the two Protectors. Thanks to the fact that the datacast is available simultaneously to both computers, they may in one embodiment execute the same Time Object Descriptor in their first communication session, gaining their Secondary ELD immediately. The Protector initiating the trust grant generates the Time Object Descriptor, includes it in the meta-file, and transmits it to the Second Protector, who parses the descriptor and at the time indicated will use it to load the Time Object class. At the time indicated in the Time Object Descriptor, both computers in mirrored fashion will seize the described ELD from the simultaneous datacast. See FIG. 41.

Figure 41:
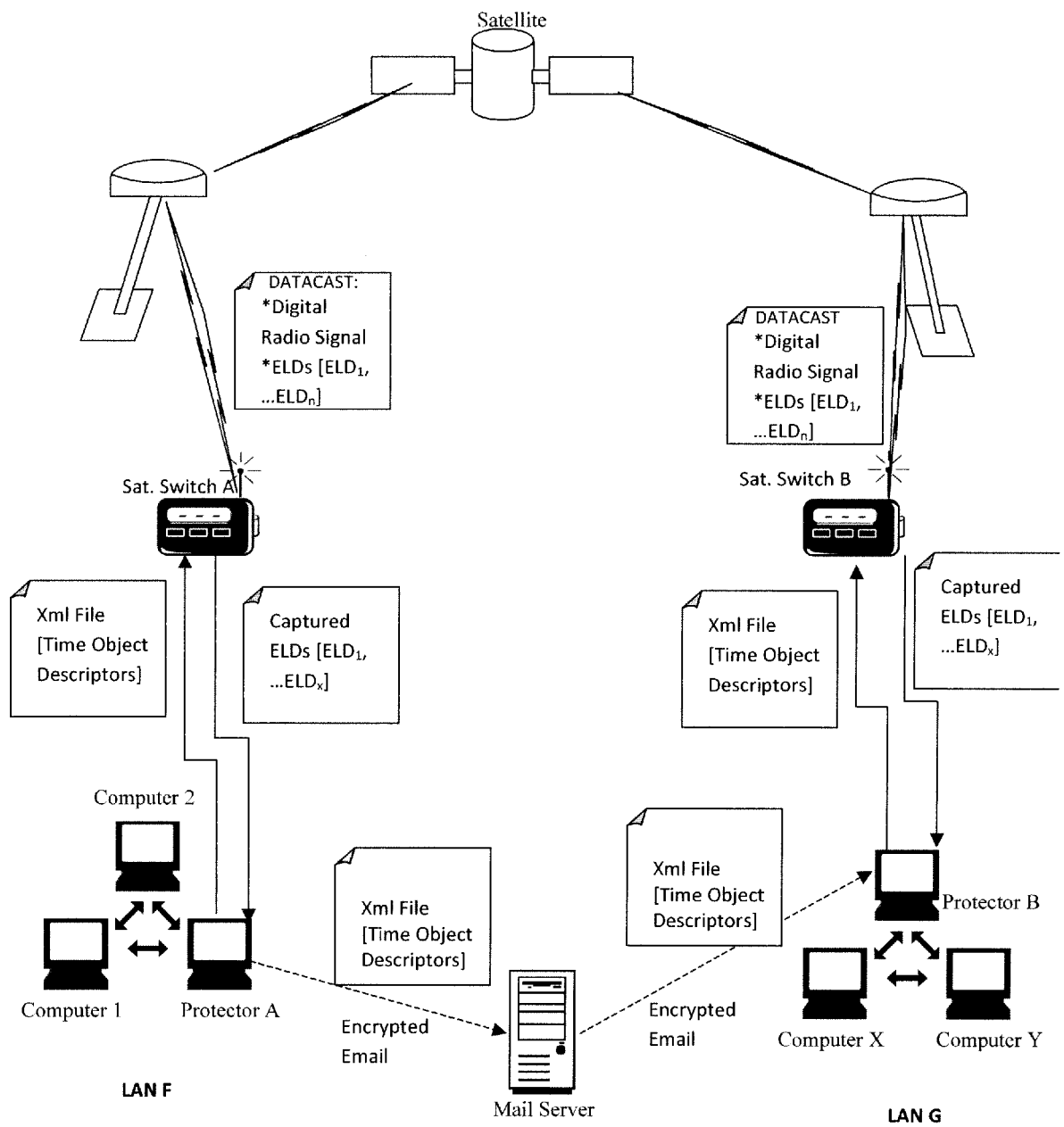
FIG. 41 Time Object Descriptor Input to Switch and return of ELD to Computers . . .

FIG. 41 depicts the Time Object Descriptor process when Satellite Switches and buffering are used. The first computer, A, has generated the Time Object Descriptor and saved it. The second computer, B, parsed it from the encryption meta-file it received from A, and saved it as well. Invoking that descriptor, the computers load the Time Object Class, using the shared instance of the class to obtain the same Secondary ELD by plucking it from the datacast at the same moment. Because buffering is used instead of a real time extraction of the ELD from the datacast stream, "at the same moment" is a figure of speech, because what really happens is that the same ELD is selected not in real time, but from the matching file on each computers created out of the buffered stream from the datacast.

On each side of the logic circuit, both on LAN F and LAN G, the arrow to the left shows the Time Object Descriptor uploaded to the Satellite Switch, where it is executed. The arrow on the right, on each side, shows the download of the ELD, identified by the descriptor, from the Satellite Switch to each computer. The class generating the descriptor is loaded on each computer in mirrored fashion, so that at the future time indicated in the descriptor the ELD corresponding to that moment is seized from the satellite datacast stream and saved. In this embodiment the ELD selection determined by the Time Object Descriptor occurs in a simultaneous, mutual process, with each computer selecting the same ELD from the datacast, thereby harvesting it as the private logic tunnel providing trust between the computers in future communication after it is installed in the Trust DBMS on each computer. (Because the reception of the Time Object Descriptor may be subsequent to the transmission of the encryption meta-file, that first transmission uses only the Plain-Text ELD per this embodiment, but from that point forward the Secondary ELD is used in each communication).

If there is a timing discrepancy between the sending computer and the receiving computer in the downloading and execution of the described ELD, the problem may be mitigated by using a test file and testing a zone of ELD's. This is explained below. Individual computers, and Switches as well, may use the test file approach as a fail safe mechanism to guard against timing errors. But in some embodiments the timing is good enough to not require such a "fudge factor." The satellite stream containing the ELD's may use timing tags, and the computers or Switches may set their clocks so that the tags are processed with synchronization. Some varieties of satellite datacasts already include timing tags, such as GPS, and an Initiator embodiment using GPS is described below. A combination of techniques may be employed to satisfy the timing techniques of the system. It is important to keep in mind that when buffering is used the data streams are not processed in real time, and this fact makes the buffered embodiments very forgiving as to the timing requirements.

Each point in time of the datacast is an evanescent moment. This fact means that even if the Time Object Descriptor is stolen by an interloper, it remains forever useless for hacking purposes so long as point in time described in the Time Object Descriptor has passed. The evanescence of the ELD's in the datacast stream is an obstacle that is logically impossible to overcome unless the moment specified in the object is still in the future, in respect of the time reference of the hacker. The time window that a hacker would have to use to crack the Secondary ELD may be made very narrow, such as a minute or less. An algorithm may provide feedback to the system, so that the time window, as adjusted per the feedback, is as small as practical. The limit on the feedback process may consist of a failure rate of x caused by the window being too small and the Secondary ELD match on the computers not executing.

The satellite datacast may be received by each individual computer in real time through a personal computer expansion card such as one using PCIe, but alternatively, received not in real time through network connection to a common Satellite Switch using buffering, allowing the signal to be saved as a file and processed as illustrated in FIG. 41. The antenna and receiver may be part of the Satellite Switch instead of on the computer. In the latter case the Switch receives the Time Object Descriptors from one of the computers on its LAN, and the Switch instead of the computer executes the time object, seizing the ELD from the datacast and saving it for the computer's use and transmitting it to the computer via the LAN.

When the satellite signal is received directly on the computers through a satellite reception expansion card and antenna, they must execute the Time Object Descriptor when the specified time arrives. The Time Object Descriptor, which expresses the future moment for executing the seizure of an ELD from the datacast stream, is saved in memory on both computers, both the one that randomly generated the object, Computer A, and the other one that received the meta-file containing it, or containing data that allowed it to be created on B locally. Both execute the object, seizing the ELD which corresponds to the specified moment in the datacast stream when that moment arrives.

For the two reasons stated below, a discrepancy in timing between the Computer A and Computer B, the recipient computer, is unimportant when buffering is used and an entire string of ELD's is processed off line. Consider the following. First, the satellite data does not encrypt anything in real time. The data is merely an input into the offline encryption logic generation process that encrypts files, not streams, on the local computers. The satellite datacasts are saved on the computers as snapshot files. Then, the snapshot files are processed offline. The actual ELD that Computer A needs to obtain in order to communicate with B is identified through this offline processing, and after being identified, executed. There may be a test file identification step so that B can zero in on the actual ELD that A used.

Second, when the test file routine described in greater detail below is used, timing is no longer critical, and the clocks on the local computers easily may be synchronized, using inexpensive circuitry such as the clock on each computer, to provide sufficient timing accuracy. The test file technique to overcome any timing discrepancy between A and B allows a zone of ELD's to be tested so that the actual one used on the sending computer properly is identified after the entire zone is tested. The test file processing involves saving "snapshot files" after buffering the satellite datacast, and then comparing on Computer A and Computer B the string of ELD's in the snapshot through a concatenated testing process that tests each ELD. The comparison process, executing on B, will allow B to identify the actual ELD that A used as the Secondary ELD. When the snapshot files are processed on A and B, the processing involves the selection of a Secondary ELD from the stream by A; and on B the processing involves not the identification and testing of a single ELD, but instead, the testing of a series of them. Testing ELD's on each side of the actual one in the stream allows B to be, within limits, either "late" or "early." This zone approach allows timing tolerance in the execution of the Time Object Descriptors on the computers.

In this embodiment the ELD's are transmitted from space to receivers on Earth. Let's say that from the time 13:01 GMT to 13:03 GMT, a stream of ELD's available to all of the computers is broadcast and, using buffering, saved by two computers wishing to establish trust. Protector A (or the Satellite Switch that hosts A on the LAN) generates a Time Object Descriptor. That descriptor will select one of the ELD's from the stream segment between 13:01 GMT and 13:03 GMT to operate as the Secondary ELD connecting A and B. The Time Object Descriptor specifies that time segment. Computer A, instantiating the Time Object Descriptor Class using the Time Object Descriptor it has generated, randomly plucks one from the stream at 13:02 and six seconds, GMT.

Adding the test file routine to the Protector functionality circumvents the problem of synchronizing the clocks, by using the "zone" approach. This relies on the snapshot files that capture a segment of the buffered ELD datacast. B, like A, possesses the Time Object Descriptor, but upon receiving it does not know without processing it which ELD in the stream was the actual one that A plucked out and used as the Secondary. The very purpose of B processing the Time Object Descriptor is to identify that Secondary ELD in the 13.01 GMT to 13.03 GMT ELD stream segment, so that it can be saved to B's Trust DBMS. A, before transmitting the encryption meta-file to B, has performed a related task: encrypting a test file that is inserted into the encryption meta-file.

A has used that plucked ELD resulting from executing the Time Object Descriptor to encrypt the test file (the test file can be a canned message present on all the Protectors). In the time segment specified in the Time Object Descriptor that A has inserted into the encryption meta-file specifies, in stead of a precise time target, the time segment of 13:01 GMT through 13:03 GMT.

The encryption meta-file that A has prepared includes in one of its name-value pairs the encrypted test file. Let it be assumed that there are 37,000 ELD's in the time segment of 13:01 GMT through 13:03 GMT, the segment specified in the Time Object Descriptor that A has generated, and by including it in the encryption meta-file, provided to B. At the approximate mark of 13:02 and six seconds, A plucks out an ELD, one that happens to be number 17,632 in the segment. A uses ELD number 17,632 to perform encryption twice. First, it encrypts the test file, the canned message which is included in the Protector of A and that of B. Then, A uses ELD number 17,632 to encrypt the Plain-Text ELD that is used to scramble the plain-text in the Encryption meta-file that A prepares and transmits to B. The Plain-Text ELD as encrypted by the Secondary ELD, in this case ELD number 17,632, also is included in the meta-file. Additionally, the Time Object Descriptor is included in the Encryption meta-file.

B receives that Encryption meta-file and parses the encrypted ELD, the encrypted test message, and the Time Object Descriptor. B then identifies the snapshot file from which A extracted ELD number 17,632, and this snapshot file is the string of ELD's that the satellite transmitted to earth between 13:01 and 13:03 GMT. Either B or the Switch associated with it has buffered the stream and saved that snapshot so that it can be processed as a file, which is to say, offline.

The Encryptor on B then uses each of the 37,000 ELD's in that time segment to decrypt the test file. This is the sense part of a sense-reference circuit. The reference is the standard unencrypted canned message on each Protector, which is what A encrypted using ELD number 17,632 and added to the encryption meta-file. When B uses that ELD to decrypt the canned message, a checksum that operates after each instance of decryption (each of the 37,000 ELD's is tested in this way) shows a match between the as-decrypted test file that B parsed from the Encryption meta-file and the unencrypted canned message. Each ELD is executed on the test file, and each encrypted test file is checked against the unencrypted canned message by the checksum. The fact that there is a match proves by inference that ELD number 17,632 is the ELD that A used as the Secondary ELD. B, having ascertained this crucial information, saves ELD number 17,632 to the Trust DBMS on B in the record corresponding to A. A already has done this, saving ELD number 17,632 to the Trust DBMS on A in the record corresponding to B.

With the Secondary ELD present on both computers, A and B now have their unique private logic tunnel. From that point forward each time they communicate ELD 17,632 will be looked up on the Trust DBMS of both computers and used to auto encrypt and auto decrypt the particular Plain-Text ELD which, in each session, is randomly selected to scramble the plain-text.

The digital sound card connected to the satellite antenna and receiver, or connected Satellite Switch, may process and amplify the music channels contained in the satellite datacast, convert the signal to analog and amplify it, and using a different thread offload the ELD selected by the Time Object Descriptor to the CPU, where it is processed as the Secondary ELD, per Initiator. FIG. 43 illustrates this.

The interval between the receipt of the ELD selected by the Time Object Descriptor and its execution may vary with embodiments. There must be a brief waiting period for this, because it takes an amount of time to transmit the descriptor from the computer generating it to the other computer. So there must be a pause for the encryption mega-file to be sent and received in order to position both Time Object Descriptors for execution on the mirrored computers (or the connected Satellite receiver associated with each). The delay allows the recipient computer's side of the logic circuit to receive the object in time, so that both computers simultaneously pluck from the data cast the ELD corresponding to the indicated future moment.

To make sure that the Protector does not time out before the Time Object Descriptor is received, there may be a "mail listener" that is run at a given interval. The listener is in charge of retrieving mail upon an interval, say, every 200 seconds. The retrieval is done as a background task, that is, the user of the Protector is never aware of it. The Listener listens to the mail to detect whether the name-value pair containing the Time Object Descriptor has a descriptor in it or is null. Whenever an email that contains a meta-file containing a Time Descriptor Object (because it is a first communication so there is still no Secondary ELD between the communicating computers) the listener parses the Time Object Descriptor so it may be executed. A Satellite Switch may constantly listen to incoming emails, functioning as a router to the Protectors on that LAN, and constantly listen to the satellite data cast transmission as well. When the Satellite Switch is equipped with the listener it parses the Time Object Descriptor from the encryption meta-file before passing across the LAN to the computer. The Satellite Switch executes it without any input from the recipient computer. After the Satellite Switch has captured the Secondary ELD from the satellite datacast, it transmits that ELD to the Protector that is the intended recipient of the email message. The Satellite Switch may send the Secondary ELD across the LAN to that Protector, after encrypting it by the corresponding hard-wired ELD. The Protector decrypts the Secondary ELD as a background task and loads it to its Trust DMBS. This may all happen before the Protector actually opens the message. There may be a "mail stripper" function to extract the Time Object Descriptor from the encryption meta-file and process it.

But when the mail stripper is deployed on each computer instead of using the LAN and the Satellite Switch, each computer can receive the satellite signal directly, and without ever timing out, by streaming the ELD's into a buffer and loading the Time Object Descriptor that the mail stripper extracts. The buffering technique also may be deployed on a Satellite Switch, in conjunction with the mail stripper. The advantage of using the mail stripper is that, by parsing the Time Object Descriptor, the ELD's can be obtained from the datacast before the email is ever opened.

When a Switch is used it may rely on a "mail stripper class" that strips out of the email encryption meta-files. There is a in the encryption meta-file that is parsed, and the flag indicates whether there is a requirement to execute Initiator. When there is the Switch executes Initiator and saves the downloaded ELD for the computer receiving the email, and sends the ELD so harvested across the LAN to that computer. This is described in greater detail below.

If either the Protectors or the Switch execute the Time Object Descriptor before its expiration, the ELD specified in the object is identified in the datacast stream by parsing the time value and loading the Time Object Descriptor Class, identifying the tags in the stream, and seizing the ELD the descriptor specifies. It is saved in the Trust DBMS and with that the automatic authentication process, using the ELD selected to be the Secondary, is given effect in the satellite transmission embodiment of Initiator just as in the terrestrial data transmission embodiment. It is stored to the Trust DBMS in the same way, and executes in the same way at runtime. The only difference is that the source of that Secondary ELD is the satellite, instead of another computer providing it by terrestrial data transmission means.

Because in this Initiator embodiment the Plain-Text ELD's are used by the Protectors as previously described, provided to them by the Switch operating on the terrestrial VPN, and because the Secondary ELD's are provided via a completely independent means of data transmission, hacking is difficult. To crack the system when two data transmission means are used, the VPN plus the Satellite datacast, a hacker would have to compromise both of them—a daunting task. Using two data transmission means instead of ones makes the system more orthogonal.

As noted, the latency challenges concerning the precise timing of plucking the ELD's from the datacast may be overcome by employing a Satellite Switch and buffering. There is an additional advantage to using a Satellite Switch in addition to the terrestrial Switch that provides the Plain-Text ELD's. The Satellite Switch eliminates the requirement that each individual computer have satellite data reception hardware, so this approach is less costly. The difference in this embodiment is that whereas the Terrestrial Switch previously described operates on a VPN using the Internet, the Satellite Switch, receiving and processing the satellite datacast, only operates on a LAN. The only purpose of the Satellite Switch is to convey the Secondary ELD's in the datacast to the local computers, so that each keeps its Trust DBMS operative to allow the Secondary ELD's to auto encrypt the Plain-Text ELD's upon transmission and auto decrypt them upon receipt in every instance of communication between one Protector and another. For the transmission of the encrypted messages the satellite is not used at all. For the messages the VPN is used just as in the other Initiator embodiment using Tertiary ELD's and the email encryption meta-files reach their destination in the same way. The Plain-Text ELD's execute in the same way, encrypting the payload of the encryption meta-file through dynamic class loading. The Terrestrial Switch still supplies the Plain-Text ELD's in the Satellite Initiator embodiment, and only the Secondary ELD's are supplied from space.

Figure 42:
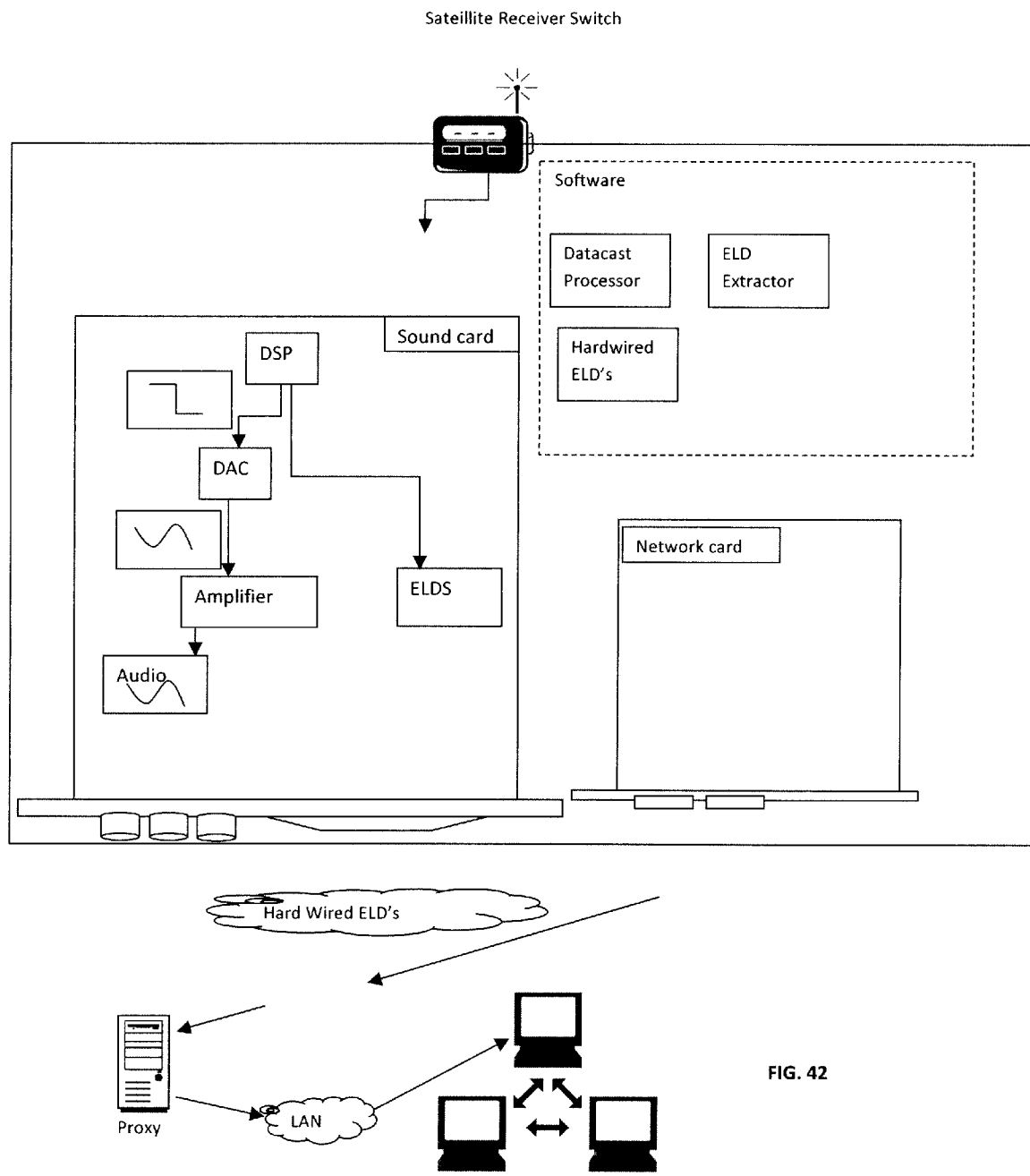
FIG. 42 Satellite Circuit for Encryption and Sound, on a PCIe Board . . .

The Satellite Switch may include hardware comprising a router, a CPU, an antenna receiving input from the satellite (and this may use a standard satellite data reception chip set), a proxy server (though this may be virtual), and a network card connecting to the LAN, with software to locate the ELD's in the datacast, such as Time Object Descriptors and a test file routine, and to retrieve and process them and transmit them to the computers on the LAN. Please see FIG. 42. The Satellite Switch may include satellite radio functionality as well, providing sound amplification and digital volume control, etc., supplying both encryption logic and music to the workgroup that the LAN supports. The Satellite Switch receives the entire datacast and listens to it in order to locate and retrieve all of the ELD's selected by the Time Object Descriptors that it processes, and to play the music that the listeners select. A GUI for music selection lets each computer on the LAN select different music. In the simpler version shown in FIG. 43 the Satellite signal reception board simply amplifies the analog music signal locally, eliminating the LAN. This board may be in the PCIe form factor and may be used with an individual computer or with a router.

The Satellite Switch may contain the code required to implement hard-wired ELD's securely connecting it to all of the Protectors on the LAN. As in the previously described terrestrial embodiment of the Switch, hard-wired ELD's may be used to individuate the encryption logic for each Protector connected to it. See FIG. 42. The "ELD Extractor" may consist of the Time Object Descriptor Class, which is loaded by the Time Object Descriptor. That descriptor may be generated on the Satellite Switch, but also on each computer on the LAN using the Protector software.

As in the case of the terrestrial Encryption Switch, the individual network software application for each computer on the LAN may be auto generated on the Satellite Switch. The auto generation of the application allows each one to differ from the others through customization. This is another example of using features individuation to minimize the monoculture problem. (All of the individuation features previously described may be used on the satellite data transmission subsystem of a Protector Receiver network). This end user application that the Satellite Switch auto generates may be the same as the auto generated Protector previously described, with only change being satellite means of data transmission to obtain the Secondary ELD's to be provisioned in the Trust DBMS to encrypt the Plain-Text ELD's.

As shown in FIG. 43, the Satellite Switch may auto-install a hard-wired ELD into each Protector when it auto generates that application, and this is another individuation feature. The Protector may utilize, as well, the other previously mentioned hard-wired ELD for the terrestrial Switch that supplies the Plain-Text ELD's. The second hard-wired ELD is one that operates only to encrypt the bytes flowing back and forth across the LAN between that Protector and its particular Satellite Switch. Individuating the logic for each application in this way makes it harder for a hacker to crack the system merely stealing a single computer from the LAN and reverse engineering it. The interloper would need to posses both a Protector and a Satellite Switch to reverse engineer that Protector's connection, thanks to the hard-wired ELD, and even having that information still would not be enough to hack the terrestrial switch supplying the Plain-Text ELD's. The software on each Satellite Switch, taking advantage of the capability of auto generating the applications to differentiate them, may be individuated from one application to the next in other respects as well.

The Satellite Switch instantiates the individual modules of the Protector application which it generates by means of a process occurring exclusively on the Switch and on the LAN, when the Protector is installed on the personal computer. The customization process of the Protector when it is auto generated on the Satellite Switch may receive no data input via terrestrial means. The Satellite Switch may use a firewall so that it is completely shielded form the Internet, its ports only open to the Protectors on the LAN. All of these steps advance the goal of insulating the processes related to the satellite datacast from the Internet to enhance security. For example, when a hard-wired ELD is used to protect the data that flows between the Satellite Switch and each individual Protector on the LAN, the Satellite Switch should create that logic via a local procedure rather than import it from a URL.

The connection between the Protector to the Satellite Switch, instead of being created by instantiating a module on a Protector which is auto generated on the Terrestrial Switch, may consist of a separate application completely auto generated on the Satellite Switch. This approach is more secure than merely providing a supplemental module of the Protector that the Satellite Switch instantiates but does not generate. Auto generating the complete application on the Satellite Switch is another approach. The latter approach further insulates the datacast from the other processes that occur only on the VPN. The auto-generation code running on the Satellite Switch may be supplied on a medium, such as a DVD, that accompanies the physical delivery of the Satellite Switch. The general strategy is that in as many respects as possible the part of the system using the satellite as the means of data transmission should be insulated from the terrestrial part of the system, to avoid "cross-contamination." The approach is like Kosher dishes.

In the case where trust does not exist, this second version of Initiator based on the reception of the Secondary ELD's from a satellite, like the first, works in a series of steps. These may be as follows. Using an algorithm, the Protector randomly generates the Time Object Descriptor that will be used on each side of the mirrored encryption logic build process to identify the ELD in the datacast selected as the Secondary ELD for the two computers, and installed in the Trust DBMS of each. Class loading under Java may be invoked to perform the random selection of the ELD which the Time Object Descriptor specifies, and XML may be used to express the descriptor that loads the Time Object Descriptor Class. Before the encryption meta-file is encrypted and transmitted from one Protector to the other via email or chat, the Time Object Descriptor is inserted by the first Protector into the name-value pair existing for this purpose. The Second Protector will harvest it and use it. This is illustrated in the code previously shown.

Note that the Time Object Descriptor is auto generated, and the object is what traverses the VPN as part of the encryption meta-file, not the actual Secondary ELD. Including the Secondary ELD in the meta-file would ruin the very strategy. Instead, only the Time Object Descriptor is included in the encryption meta-file, and it triggers the completely local satellite data transmission extraction process in order to harvest the Secondary ELD. The upshot is that the Secondary ELD is generated on each side, not transmitted to each side.

The conveyance of the Time Object Descriptor invokes "the bucket approach" to supplying the values used by the mirrored pair of computers in the encryption logic session object. The descriptor is included in the encryption meta-file. The recipient Protector receives the Time Object Descriptor from the transmitting Protector, saves it, and in mirrored fashion the other computer saves it too, so both may execute it simultaneously when the moment arrives. The end result will be that after a series of processing steps the common Secondary ELD will be saved mutually in the Trust DBMS of both computers.

The computers have now received the common Time Object Descriptor, so common logic exists whereby their mutual Secondary ELD, when the object class is loaded, will be extracted from the stream. As the next step, the both of the computers send the descriptor across the respective LAN to its Satellite Switch, protecting it along the way by the hardwired ELD. This step positions the Time Object Descriptor for execution when the moment the object specifies arrives, and each respective Satellite Switch will load the class and extract the Secondary ELD.

The Satellite Switch executes Time Object Descriptor, selecting the ELD at the moment specified. The Satellite Switch, using a listener in software that processes the buffered ELD stream, identifies the ELD specified by the Time Object Descriptor and extracts if from stream received from the satellite datacast.

The code of the listener that is constantly executing is shown in the code of block that contains the processSatelliteSignal( ) function, and in this embodiment the Satellite Switch instead of the individual computer does the listening to the datacast. By executing the Time Object Descriptor the Satellite Switch plucks that ELD from the datacast and transmits it across the LAN to the Protector, who will use it to prepare each encryption meta-file to be sent to the other Protector with the protection of meta-logic. The meta-logic will take effect only after both have installed the Secondary ELD that will be downloaded. After the Satellite Switch has extracted the Secondary ELD from the datacast, it is encrypted by the hard-wired ELD so that it is sent across the LAN securely, on each side of the logic circuit. Then the Protector Application, in receipt of the ELD the Satellite Switch has supplied, hand having decrypted it per the hardwired ELD, provisions it in its Trust DBMS, in the record corresponding to the recipient Protector. From the point of the second communication on the trusted pair will enjoy a unique private logic tunnel. Each side may supply an encrypted test file to the other to aid in the identification of the particular ELD from the stream that each computer has selected. In case the ELD's selected from the stream do not match, the system architect may specify either that the one confirmed by A per the test file routine as the one matching the ELD on Computer B becomes the ELD stored to the Trust DBMS of each computer, or vice versa.

The Satellite transmits the ELD's through the datacast, but how do the ELD's get to the satellite? Where do the satellite's ELD's come from? They can originate in several ways. A terrestrial encryption logic engine may upload them to the satellite, and a hard-wired ELD may be used to scramble the signal. Another approach is to put them on the satellite before it is launched, running a group of perhaps a million ELD's as an endless loop. Yet another way to do it is to put the encryption logic engine on the satellite. This approach makes it very difficult to hack unless the hacker happens to own a spacecraft! Another approach, explained in the third and fourth Initiator embodiments, is to generate them in situ on each computer from preexisting satellite datacasts that are employed for other purposes.

Toward the end of greater orthogonality in the system, the encryption logic engine used to generate the Satellite ELD's may differ from the one used in the Terrestrial Switch for the generation of the Plain-Text ELD's, and the Encryptor also may vary. If the logic in the terrestrial part of the system were hacked, the individuation of the logic on the terrestrial portion of the system and the satellite portion would make the hacked logic less useful in cracking the network than in the absence of the individuation.

The ELD stream from the Satellite Switch is segmented by the elapsed time values, or by the insertion of bytes that operate as markers independently of the timing. For each Protector to be able to execute the ELD selected from the datacast, to use it as the one mutually invoked as the Secondary ELD, both of the Satellite Switches (or the computers if they have satellite reception capability) use their clocks to measure the elapsed time with an accuracy above the level x.

If the computers cannot achieve accuracy at level x, accuracy at less than x need not impede the goal of installing in the Trust DBMS of each Protector a common Secondary ELD, because the Secondary may be selected on each from a snapshot file generated in the same way by each computer. The snapshot file approach is an alternative to precisely plucking an individual Secondary ELD from the datacast stream in real time. The snapshot file technique uses buffering to capture the flowing ELD stream. The snapshot is a file representing a captured segment of the stream that is taken from the buffer. Capturing it as a file allows it to be analyzed not in real time, but instead, processed as any other file is processed.

One way to do this is for the snapshot file to be a segment of the data cast containing multiple ELD's. The encryption meta-file default may include in one of its name value pairs a test message used by the Encryptor every time, such as the bytes corresponding to the character string "Encryption is Achieved." For example, this technique has been described above in connection with hypothetical ELD number 17.632 mentioned above. In each individual Protector application the bytes of the test message may be encrypted by the Cognitive Signature, saved to permanent memory, and unlocked when the user of the Protector logs in, for greater security.

The purpose of saving the bytes of test message to memory is to use it in a checksum that is part of the trust grant process, and the message is used to process a segment of ELD's received in the satellite datacast. The checksum is used to identify which of the multiple ELD's in the saved segment of the datacast, the snapshot file, was the one actually used as the Secondary to encrypt the Plain-Text ELD. With respect to that Secondary ELD, the decrypted test message contained by default in the encryption meta-file will match the reference test message provided in each Protector application. The test file also may be auto generated on each computer for each session, varying from one session to the next.

Each Protector uses the same Secondary ELD used on the test file to decrypt the Plain-Text ELD that encrypted message payload. Decrypting the test file by logical inference shows that ELD to be the one that also encrypted the plain-text. The fact that the test message was decrypted successfully means, by deduction, the same ELD that did that decryption also will decrypt the Plain-Text ELD that encrypted the message payload. The ELD so identified is stored in the Trust DBMS of each Protector, as the Secondary ELD.

In greater detail, the pseudo-logic is as follows. If ELDs was used on Computer A to encrypt the test message, and $ELD_S$ is found to decrypt the same test message on Computer B, and if A also used $ELD_S$ to encrypt the Plain-Text ELD that encrypted the payload of the encryption meta-file, then by power of deduction it is apparent that $ELD_S$ will decrypt the Plain-Text ELD with which A encrypted the message payload. This proves $ELD_S$ to be the Secondary ELD, and with that established $ELD_S$ is installed in each Trust DBMS, that of A and that of B.

The checksum on Computer B determines whether the unencrypted test file included in the application matches the particular instance of decryption corresponding to each ELD in the buffered segment. If the two test messages match, then that ELD was the one that Computer A used as the Secondary ELD.

The checksum may be executed either on the computer, or on the Satellite Switch on that computer's LAN. Computer A may encrypt the Plain-Text ELD encrypting message payload multiple times, by a subgroup of the ELD's in the segment. Using multiple encryption provides redundancy. The serial checksum tests identify which of the ELD's were used and which were not. The encrypted Plain-Text ELD that A inserts into the encryption meta-file may be encrypted multiple times by multiple Secondary ELD's. The encryption meta-file that A prepares and transmits to B, instead of containing a single instance of the Plain-Text ELD as encrypted by the Secondary ELD, can transmit a composition of several encrypted plain-text ELD's. This redundancy strategy works because Computer B only needs to decrypt one instance of the encrypted Plain-Text ELD in order to load the class that encrypts the plain-text. When redundancy is employed in this fashion B uses the test file checksum routine to test not just one of the encrypted Plain-Text ELD's parsed from the encryption meta-file that A has prepared and transmitted, but all of them.

One advantage of testing an entire segment of ELD's is that this simplifies the timing in finding the actual ELD that the first computer used as the Secondary. The harsh demands of precise timing inherent in seizing in real time the particular ELD used are eliminated by this technique. If the Time Object Descriptors on each computer for some reason do not provide the exact moment on each computer identically to resolve the same individual ELD, the method still works so long as the descriptors at least specify segments of ELD's that overlap enough to allow the Secondary ELD actually used to be identified by the checksum tests. With the test file approach individual ELD's are not used in the identification process, but instead, zones of them. The test file procedure invoking serial checksums is a substitute for the perfect timing accuracy required in the real time processing, described above, in which the actual individual ELD is "plucked" from the stream. The accuracy requirement in using segments and this "multi-test" process brings to mind horseshoes and hand grenades: close is good enough.

The steps in this multi-test approach to identifying the true Secondary ELD in the segment that the descriptor specifies may be as follows. Protector A, who initiates the grant of trust, generates a Time Object Descriptor, encrypts it using the hard-wired ELD that links that Protector to Satellite Switch A, and sends the object across the LAN to A. The Satellite Switch then executes the Time Object Descriptor as before, but in this embodiment instead of seizing in real time the actual Secondary ELD to be used, the entire segment of ELD's between time mark x and time mark y, and the randomly generated object has selected these marks, thereby delimiting the segment. The segment is retrieved from the stream, encrypted by the hard-wired ELD, and returned to Protector A.

Then Protector A, using an RNG based selection, chooses three of the ELD's in the segment that the Satellite Switch has provided, one from the first third, one from the second third, and one from the last third. Using the entire segment increases the odds that the other side of the logic circuit, Protector B, will find the Secondary ELD without any timing error. So long as part of the time segments from Satellite Switch A and Satellite Switch B overlap, at least one Secondary ELD taken from the stream can be matched on the other side of the circuit.

Protector A inserts the triple value Time Object Descriptor into the meta-file, the first message transmitted from Protector A to Protector B. The encryption meta-file that A sends includes three encrypted versions of the Plain-Text ELD, one for each of the three selected Secondary ELD's.

With the same object on each side mirrored logic is generated, a Secondary ELD is supplied to B so long as B finds at least one of the three ELD's that A used. Protector B, repeating the process of A, sends the descriptor across the LAN to Satellite Switch B. Satellite Switch B loads the Time Object Descriptor class. Both Satellite Switches may use buffering, so that when the first one executes the Time Object, the second one also can execute even if the moment described in the object already is in the past. The buffer uses the RAM of Satellite Switches A and B.

Both Satellite Switches constantly listen to the stream of ELD's coming from space. The buffer contains snapshot files, and they comprise a moving map of the ELD stream that all of the computers receive from the satellite. Each Satellite Switch contains this functionality.

Satellite Switch B uses the Time Object Descriptor to find the same portion of the ELD stream that Switch A retrieved to select the three ELD's that A's side of the logic channel derived from the stream. Computer B uses checksum to test each ELD in the segment against the test file, to the sequence of the three actual Secondary ELD's. Any one of them works to decrypt the triple-encrypted Plain-Text ELD, so that Computer B can read the message sent by A.

The timing coordination between A and B may occur in two ways. If each Satellite Switch uses a buffer, as described above, the stream of ELD's received on each Switch in real time may be saved and processed not in real time, but as a file. This means that as of the moment A sends the encryption meta-file to B, the Secondary ELD used will already be present on Satellite Switch B. Therefore A and B will enjoy a Secondary ELD from the inception, even in the first communication.

But if the time segment described in the Time Object Descriptor is a future time as to both A and B, that means that as of the moment when A sends the encryption meta-file to B, there still is no Secondary ELD in existence. Obviously if the time for A to harvest the Secondary ELD has not arrived as of the moment when A sends out the meta-file containing the Time Object Descriptor to B, A cannot as of that moment yet possess the Secondary ELD which that object specifies. The advantage of using this approach is that the data stream from space is never stored on any computer. A DSP may be used in this version of the Time Object Descriptor, to process the data in real time.

Using the other approach, buffering, creates the risk that the buffer can be hacked. But there is a penalty to the non buffered, real time approach. The penalty is that the first message from A to B will be sent without encrypting the Plain-Text ELD. This penalty makes this embodiment less secure, because the Plain-Text ELD is not encrypted before it is inserted into the encryption meta-file and sent across the terrestrial network. So not using a buffer imposes a cost.

A work around for this shortcoming can be eliminating the message payload in the first message. Instead of including the message payload, A saves it and substitutes in the place of the payload, a dummy file and with this modification the encryption meta-file is sent to B. The meta-file also includes the Time Object Descriptor that A has generated and executed. After the moment specified in the Time Object Descriptor has passed, A assumes that by that time Satellite Switch B has downloaded the ELD segment from the satellite datacast, transmitted it to Computer B, and Computer B has retrieved the Secondary ELD. Given this assumption, Computer A retrieves the message payload from the temp file and transmits the entire encryption meta-file (including the actual payload instead of the dummy file) to B, with a second transmission. This time A will encrypt the meta-file in the complete form, including the encrypted plain-text as well the Encrypted Plain-Text ELD, which will be encrypted by the Secondary ELD as soon as it becomes available to the computers. B receives the second meta-file containing the real data, the second transmission, and B loads both the Secondary ELD to decrypt the Plain-Text ELD. With the decryption of the Plain-Text ELD accomplished, B having before the second transmission already having downloaded the Secondary ELD, B decrypts the message payload from A's second transmission. B then stores the Secondary ELD in the record in the Trust DBMS corresponding to A, and discards A's prior message, the dummy file. B in one embodiment replies to A with an encrypted test file, so that A prior to sending the second transmission verifies the identify of the Secondary ELD that B has selected.

The workaround just described executes as a background task. The user of Protector A need not be aware that the transmission of the message was bifurcated into two transmissions, so that the Secondary ELD could be installed before the confidential message was actually included in the second transmission. The only difference between this initial transmission and the ones that follow, in the eyes of the user, is that it takes longer to execute.

In both of the timing embodiments described above, the Time Object Descriptor on each side of the mirrored logic circuit will execute the object, obtain that segment of ELD's from the datacast, obtain the Secondary ELD, and provision it in the Trust DBMS of each Protector. When the real time is used instead of the buffered snapshot method, both computers seizes the Satellite data stream at a future moment (the time described in the Time Object Descriptor is in the future). When the buffered approach is used, the Time Object Descriptor operates on the snapshot, processing it as a file.

The three ELD approach described provides a margin of error. If the Satellite Switch on the LAN of the recipient Protector is early in capturing the datacast, the selected ELD in the first third of the stream may still be captured. However, the ELD in the last third of the ELD is not captured because it arrives too late, the first Protector having been triggered too soon. The timing may be perfectly synchronized, in which case an ELD in the middle third is used as the Secondary. Or the timing may be early or late in which case the back up ELD, either the early one or the late one, comes to the rescue.

The encryption of the Plain-Text ELD by the Secondary also may occur n times in order to provide redundancy, and to make sure that as to the two segments there is at least a partial overlap in the stream so that the common overlapping portion is available to both computers. If there is no overlap, an exception is thrown and the process repeats until an overlap yielding a mutual Secondary ELD occurs. However, in the embodiment where the satellite Switch instead of the computer extracts the segment of ELD's from the datacast stream, compensating for inaccurate synchronization may not be required. The satellite receiver circuitry may provide accurate means of synchronization, such as atomic clocks, so that the overlapping segment technique is not needed. Atomic clocks are expensive, but less so when the computers share one on a Switch.

One "timing margin of error" solution using the Satellite Switch to obtain the ELD's from the datacast may be as follows. The Protector initiating the trust grant, Protector A, randomly generates a Time Object Descriptor, encrypts it using its hard-wired ELD, and passes the object across the LAN to the Satellite Switch, Switch A. Switch A executes the object by loading the Time Object Descriptor Class. It saves from the datacast stream the entire segment of ELD's that are bracketed by the time tags that the object has specified. Satellite Switch A then uses its hard-wired ELD to encrypt the segment and transmit it across the LAN to Protector A. Protector A uses its hard-wired ELD to decrypt the segment it has just received. The Time Object Descriptor contains the ELD's used to bracket the segment at the beginning and the end of it, but it does not choose the particular ELD. A does the actual selection of the particular ELD by this using its RNG.

Protector A then saves a copy of the Time Object Descriptor in the encryption meta-file and sends it to Protector B, encrypting it first through Housekeeping Encryption Logic. The Time Object Descriptor already has been used by Switch A, and A has selected a Secondary ELD and has used it to encrypt the Plain-Text ELD. As before, the Time Object Descriptor only specifies the segment of ELD's to be retrieved from the datacast, not the individual ELD actually used as the Secondary. Protector B sends the descriptor across the LAN to Switch B, and Switch B loads the Time Object Descriptor Class, extracting the described segment of ELD's from the datacast. The particular ELD that computer A used as the Secondary is identified on computer B not by the Time Object Descriptor, as the descriptor identifies not individual ELD's but an entire segment of them. By testing all of the ELD's in the segment against a test message, using serial checksums, Satellite Switch B identifies the actual Secondary ELD that A used to encrypt the Plain-Text ELD. Soon after this happens on both computers the stream passes, vanishing insofar as any hacker is concerned.

How the entire segment of ELD's is executed and how the checksum identification of the true Secondary ELD is carried out may vary with embodiments. One approach is the following. Several test messages are used instead of just one, and each message is associated with the actual ELD that has encrypted it. An endless loop of test messages is used to perform the association of each message with the next ELD in the stream. The Time Object Descriptor contains an index value that associates a particular ELD in the stream with a particular test message in the endless loop. Each ELD in the datacast segment is placed in an array and executed, and with each execution the as-decrypted test message is saved in a DBMS that associates each instance of the decrypted file with the particular ELD in the stream that was tested. By this means in each instance of decryption the decrypted test message is associated with its particular ELD. Then, the as-decrypted test messages, serially, are run through a checksum, to compare each decrypted message to the as-encrypted test message which A included in the encryption meta-file that B received. Only the actual ELD selected from the datacast by the trust grantor, Protector A, and used to encrypt its associated test message selected from the endless loop (and also, of course, the Plain-Text ELD) will cause a checksum match to the saved test message, because only that encrypted test message was included in the encryption meta-file that A has sent to B. The checksum match identifies that ELD as the Secondary, and the match triggers the class loading whereby it decrypts the Plain-Text ELD. That decrypted Plain-Text ELD, in turn, decrypts the payload in the encryption meta-file.

In light of the foregoing, one can see that orthogonality in the logic feature set of the encryption systems of the embodiments may be achieved not only but the exuberant use of distributed logic engines and Encryptors, but also by differentiating the means of transmission for the logic that is executed in the system. The second example of Initiator illustrates how an Encryption Abstraction Layer may be fortified when the Plain-Text ELD's are furnished by one means of data transmission, the Secondary ELD's by another, and cross-contamination between the two transmission means is prevented. When the transmission means is bifurcated, breaching the system even by corruption is very difficult, because the transmission means may be operated by different entities, and both would have to be bribed.

Described above are two Initiator embodiments. The first Initiator embodiment uses exclusively terrestrial data transmission means to supply the Protectors with Secondary ELD's. That embodiment uses Tertiary ELD's to encrypt the Secondary ELD's as the strategy for protecting the Secondary ELD's as they are transmitted across the VPN and to be installed into the Trust DBMS of the recipient computer.

The Second Initiator Embodiment, just explained, uses Satellite Data Transmission Means to supply the Secondary ELD's to the computers, but as in the previous embodiments the Plain-Text ELD's are the domain of the terrestrial system.

Using a different data transmission means makes Tertiary ELD's unnecessary in this embodiment. Two more embodiments now will described, both of which go even further to minimize the role of terrestrial data transmission for the encryption logic values. To the extent that the values are received directly from space, instead of via terrestrial means, the systems gain security.

One challenge in using satellite data transmission means is finding a touchstone for common the processes on each computer that generate the mirrored encryption logic, keeping in mind the goal that the Satellite embodiments is to minimize the transmission of encryption related data by terrestrial means. To meet this challenge a Seeding Object Class is given effect on each side of the mirrored encryption logic circuit. The purpose of the Seeding Object Class is to take advantage of common data on each side of the circuit by using that data in a seeding process, so that the common data generates a logic mirror to trigger the building process for the Secondary ELD that will repose on both Protectors and function as their private logic tunnel. The common data is invoked in a way that does not educate a hacker about subsequent steps, according to which the two computers generate the same encryption logic session object by integrating the Seeding Object and the data received from space.

The use of a Seeding Object eliminates the requirement of sending any descriptor of common processes from A to B. The output of the Seeding Object Class is not a descriptor, but a coalescence into an object of common values that, by happenstance, exist on each computer. The coalescence occurs identically on each side of the circuit to operate as a matched input into the mirrored logic build process that creates the Secondary ELD.

The Seeding Object Class is instantiated by supplying values that each computer necessarily would be expected to possess in any event, given the nature of email and the fact the computers are known to be communicating back and forth. For example, any email application would have the names of the sender and recipient in the address line, a time of transmission, and a time of receipt. The same principle applies to chat. In the various instances of the Seeding Object Class, this type of data is harvested from the routine course of communication and used as an input, in mirrored fashion on both sides of the logic circuit, to trigger the logic build process resulting in the Secondary ELD. The approach also may be used to create the Plain-Text ELD. The output of the Seeding Object Class is the input into the mirrored logic generation process whereby the encryption logic session object is created, and this process works for any kind of object. The randomness of the session object is supplied by the satellite datacast that the two sides of the encryption logic circuit simultaneously receive, and the session object that results encrypts the communication.

The Seeding Object Class may be used to generate input data into any class loading process on the two computers that might occur, including the Time Object Descriptor Class. The Seeding Object Class is instantiated on both computers, A and B, and the purpose is to provide a mirrored seeding object for each instance. Any class on both of the sides of the logic circuit that needs to be loaded may rely on an instance of the Seeding Object Class. For instance, A may generate a Time Object Descriptor by loading the Time Object Class with the output of the Seeding Object Class. The Time Object Descriptor instantiates the Time Object Descriptor Class by using the same class loading approach as when the ELD instantiates the Encryptor.

The Seeding Object Class may be invoked in a satellite based system in which the datacast consists of ELD's, or alternatively, in an embodiment in which the ELD's are generated in situ on each side of the logic circuit by processing out of one or more entertainment data channels such as XM Radio™. With either approach the datacast moves through the two halves of the mirrored encryption logic system as a moving map, and it may be captured as a snapshot file. As in the previous satellite based embodiment, the Time Object Descriptor may be generated on the computer, but executed on the Switch.

The Time Object Descriptor is encrypted on computer, and A, using a hard-wired ELD, transmits it across the LAN to the Satellite Switch. In this switched embodiment the Satellite Switch, and not A, loads the Time Object Descriptor Class. Dynamic class loading may be used and the descriptor loads the Time Object Descriptor Class, thereby randomly selecting one of the ELD's in the series of them contained in the ELD snapshot file. The time of transmission of the encryption meta-file from A to B, as recorded in the timestamp for that transmission, may serve as the random input into the class loading on the Time Object Descriptor Class. Because both A and B have this information, both can generate the same Seeding Object by using this data to load the Seeding Object Class. The output of that class, the seeding object, is used to generate the Time Object to select the ELD from the datacast. This means that B can load the Time Object Descriptor Class and receive as the output of that class the same Secondary ELD that A used to encrypt the Plain-Text ELD inserted into the encryption meta-file. The Seeding Object Class may use the timestamp as an input to generate seeding objects to be used in the various mirrored processes whereby the plaint-text is auto encrypted and auto decrypted on each side of the logic circuit. The timestamp may include the transmission time of the first message, from A to B, or B's reply, or both, to be the input that instantiates the Seeding Object Class. See FIG. 41, showing how the as-generated Time Object Descriptors function.

Buffering is helpful in processing the snapshot file, so that the datacast stream of ELD's is saved on the Satellite Switch as a file that is processed by dynamic class loading, in a manner not occurring in real time. (Alternatively, a digital signal processor may process one or more streams of the datacast in real time, but this imposes a hardware requirement above and beyond the CPU of personal computers A and B, or the CPU on the Satellite Switch. When a DSP is used, a Harvard architecture may employed so that the plain-text to be processed enters from one source, and the instruction, the ELD, enters from a separate source). The Satellite Switch may be provided with a solid state drive. Each ELD in the datacast is captured in the buffer and saved to the drive, stored in a file that is a snapshot of the datacast stream, which is a moving map of the datacast (See FIG. 47).

The code of the class that is in charge of saving the snapshots of the signals may be as follows:

```
1.  public class SnapshotSaver {
2.    byte[ ] bytes;
3.    String filePath;
4.    int index=0;
5.    public SnapshotSaver(int size)
6.    {
7.         bytes = new byte[(int)size];
8.    }
9.    public void append(byte[ ] b)
10.   {
11.     for(int i=0; i<b.length; i++)
12.     {
13.       bytes[index++] = b[i];
14.       if(index==size-1) break;
15.     }
16.   }
17.   public void save( )
18.   {
19.     File.io.FileIO.writeBytes(filePath, bytes);
20.   }
21. }
```

The class has three fields: bytes, filePath and index. The data field is the array that contains of the snapshot, filePath is the path where the snapshot file will be saved and the index indicates the position where the bytes are going to be appended. The constructor of the class is defined in lines 5 through 8, here is where the size of the snapshot file is given and where the bytes array is initialized. The append( ) function (lines 9-16) is in charge of appending the given array of bytes into the bytes of the snapshot file, based on the position of the index.

The last function, save( ), consists of the code that is used for saving the bytes of the snapshot file in permanent memory. The code that is constantly obtaining the datacast signal may resemble the following:

```
1.  public void listenToSignal(int[ ] channels)
2.  {
3.      signalGrabber = new SignalGrabber(channels);
4.      while ( true )
5.      {
6.        Signal s = signalGrabber.getSignal( );
7.        if(s!=null)
8.        {
9.          Thread at = new Thread(s);
10.         st.start( );
11.       }
12.     }
13. }
```

The previous code consists of an endless loop where the signals are being grabbed by the signalGrabber object. When a signal is obtained, the processing of that signal is performed in a different thread (see lines 9 and 10). The processing consists of storing the snapshots. The code for saving the snapshot in a buffer may resemble the following:

```
1. private void processSignal( )
2. {
3.    while ( true )
4.    {
5.      byte[ ] bytes = (byte[ ])signal.getBytes( );
6.      if(bytes!=null)
7.           snapshotSaver.append(bytes);
8.    }
9. }
```

The processSignal( ) function also consists of an endless loop in which the bytes of the signal that is being processed are obtained (see line 5). In the given case where the bytes are not null, they are appended to the bytes contained in the snapshotSaver (line 7.)

Figure 47:
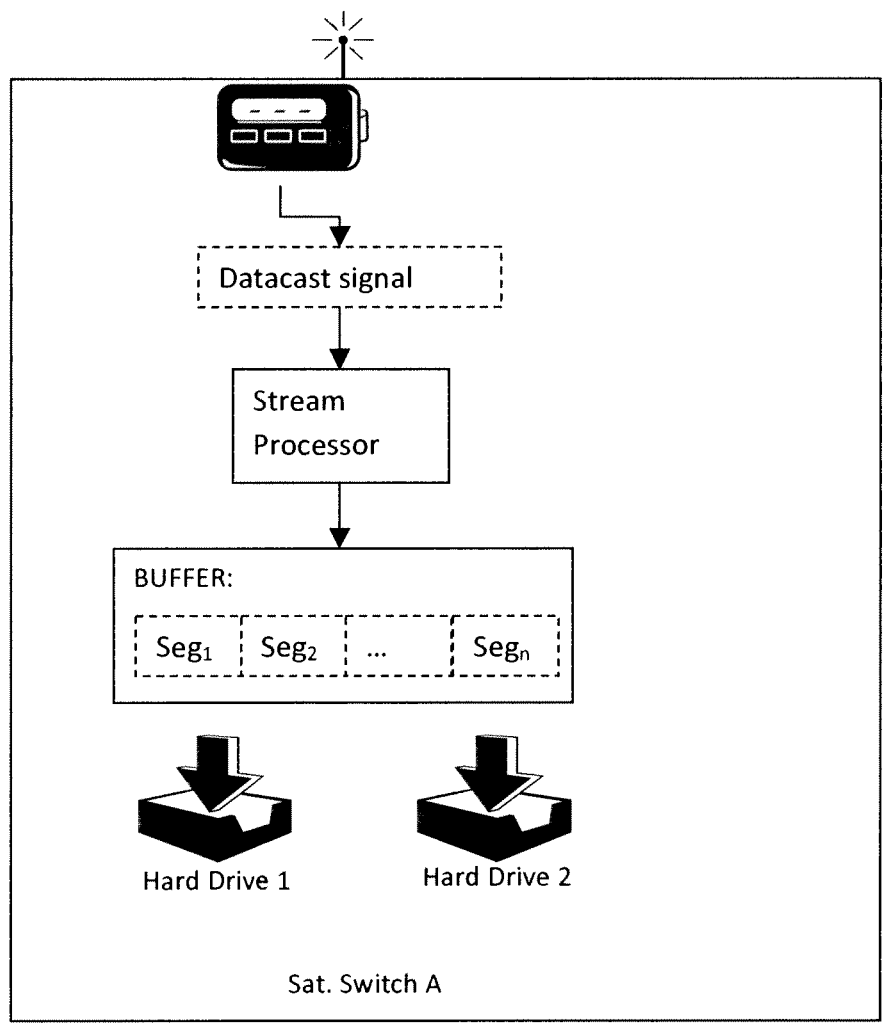
FIG. 47 Stream Processor Creating Datacast Segments to be Saved and Processed . . .

To make sure that no data is lost, there may two snapshot files, using alternating feeds from the datacast, and FIG. 47 illustrates this, as two hard drives are used. The time footprint of the alternative files may overlap, so that if one file is lost the other still may be used to supply the data needed for encryption. When the more recent snapshot file is full, the old file is purged, but the old file remains on the second drive as a fallback. A new snapshot file is begun, and what used to be the new snapshot file becomes the old snapshot file, in a process resembling runners in a relay handing a baton back and forth. Mirrored drives also may be used, capturing two identical copies of the same snapshot file. Snapshot files containing ELD's may be handled in this way, but also snapshot files taken from entertainment oriented data such as XM radio. The positioning function shown above in the code allows the precise positioning of a first stream in relation to a second stream, on each side of the logic circuit. Because of the matching positioning both computers may execute a bytes matching algorithm, processing the two pre-positioned streams, in a mirrored fashion. The output of the bytes matching process then becomes a mirrored input into a process generating the Secondary ELD in situ on each computer.

Another approach to recording the moving map, the flowing snapshot files, is the "toothpaste-in-the-tube" embodiment. There is a series of single snapshot files, constantly moving through the tube, like segments of toothpaste. The oldest segment of the file may be purged, the tail end of the file, and the newest segment (the one representing the most recent datacast) is added at the head of the file, the input to the snapshot. The toothpaste, like the data feed, is a continuous stream that is chopped off at the end as when toothpaste is placed on the brush, an action rendering that segment of the toothpaste no longer available for future use.

The code for the method that performs the moving map, the "tooth paste" embodiment, may resemble the following:

```
1. private void executeToothPaste(byte[ ] newBytes)
2. {
3.     byte[ ] end = new bytes[pasteLength];
4.     for(int i=pasteLength, int j=0; i<bytes.length; i++)
5.         end[j] = bytes[i];
6.     for(int i=0; i<pasteLength; i++)
7.         bytes[i] = end[i];
8.     for(int i=pasteLength, int j=0; i<bytes.length; i++)
9.         bytes[i] = newBytes[j];
10. }
```

The first loop (lines 4 and 5) are in charge of obtaining the bytes of the "tube" (the array of bytes) that are going to placed at the beginning of the array. The loop in lines 6 and 7 places is the bytes obtained in the previous loop in the beginning of the "tube." And the last loop appends the new bytes at the end. The point of appendage may serve as a mark for positioning one stream in relation to another.

Computer A upon searching for a Secondary ELD in the Trust DBMS corresponding to B, but finding none, generates a Time Object Descriptor in order to trigger the Secondary ELD creation process. The Time Object Descriptor may be an XML file used in dynamic class loading, per the embodiments.

In this embodiment the Time Object Descriptor is not included in the meta-file and transmitted via terrestrial means. Instead, the Time Object Descriptor is generated on each side of the circuit by loading the Time Object Descriptor Class through values that are the output of the Seeding Object Class. Note that after Computer A generates the descriptor and it is transmitted by terrestrial means, but it is only transmitted locally, across the LAN to A's Satellite Switch (See FIG. 41). The Time Object Descriptor is not sent via terrestrial means to Computer B, because B will generate its own descriptor, which will be identical to that of A, by generating its own Seeding Object. The Satellite Switches on A and B constantly receive the stream of data from the Satellite, so there is an endless supply of the raw material needed to generate the encryption logic that the Switch will return to the computers on its LAN on each side of the encryption logic circuit.

The Seeding Object Class generates the input into the Time Object Class on each side of the circuit. The Seeding Object Class uses stipulated data items in common on both A and B as the input used (sender, recipient, time of transmission, etc.) The output of the class, in a mirrored fashion on each computer, causes the Secondary ELD to be selected from the satellite datacast and installed in the Trust DBMS. It should be observed that using the Seeding Object Class obviates the need to transmit the descriptor because the encryption logic is generated in situ on each computer.

The computer sends the descriptor across the LAN to the Satellite Switch. It is encrypted via the hard-wired ELD that is used in all the communication between a Protector and its Satellite Switch. The Switch loads the Time Object Descriptor Class and selects one of the ELD's in the snapshot file and will transmit it to A, again using A's hard wired ELD to encrypt it enroute. The Switch transmits to A the ELD so selected. More than one ELD may be selected in this manner, to create a Composite ELD, or for redundancy. Alternatively the Switch sends the entire segment and the computer selects the particular ELD used as the Secondary. Using firewalls and proxies, the LAN is insulated from the Internet, for security. Computer A decrypts the received ELD and installs it in its Trust DBMS, in the record corresponding to B.

Although a Time Object Descriptor in order to generate the Secondary ELD can be sent from A to B as part of the meta-file, one can see that the safer embodiment is to use the Seeding Object Class, to generate the time object locally on both computers. On each computer, the output of the Seeding Object Class is the input into the Time Object Descriptor Class, and this generates the Time Object. A generates the Time Object and selects an ELD from the datacast, and B generates the same Time Object and selects the same ELD. This approach may subject the satellite data transmission for the Secondary ELD's on B to a trial and error process by using the test file to select the common Secondary ELD from the ELD datacast. This is safer than sending a descriptor across the VPN from A to B.

Figure 51:
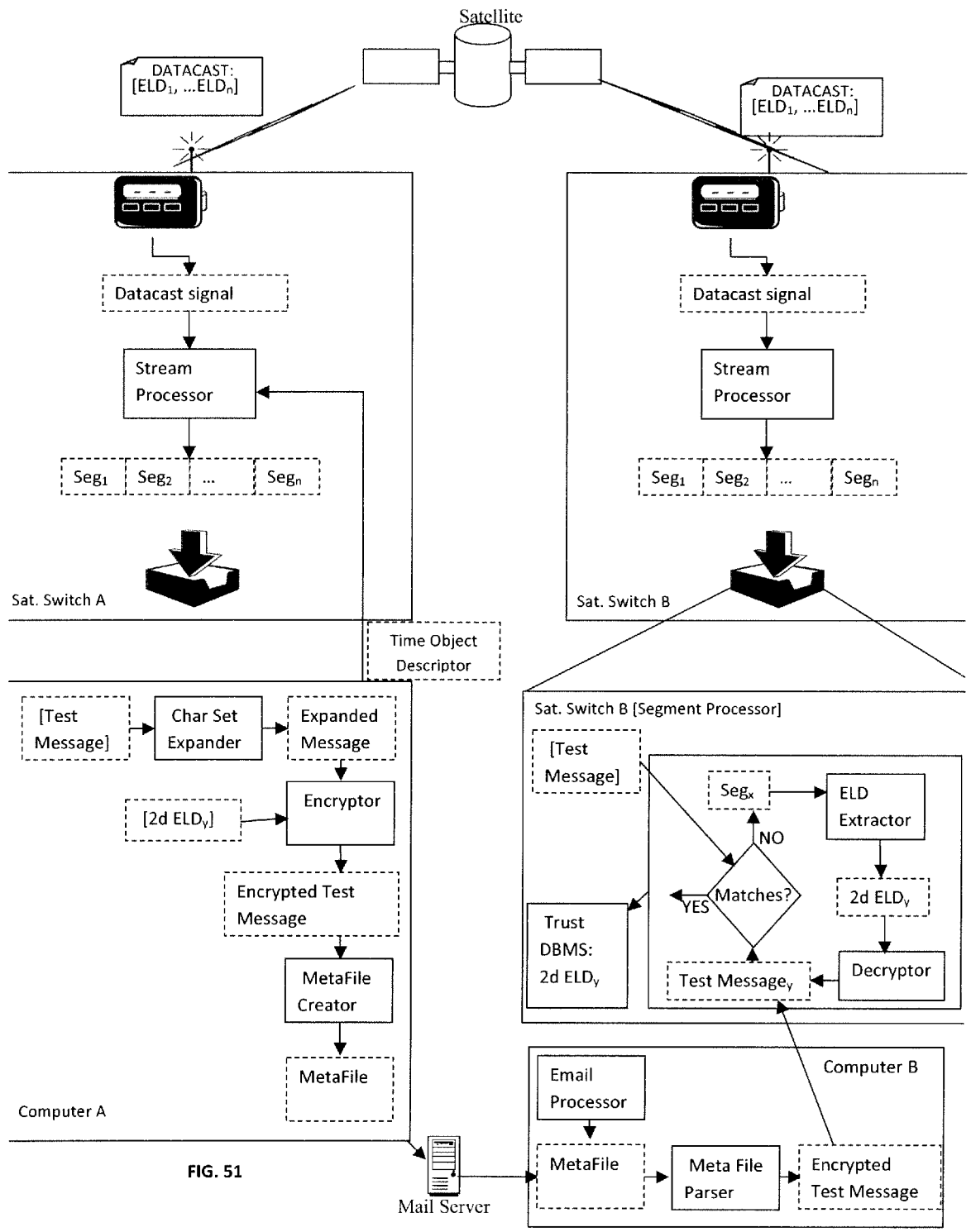
FIG. 51 Execution Steps for Satellite Encryption Logic Data for Computers A and B . . .

FIG. 51 shows how each side receives (m) the same satellite datacast; (n) the same snapshot file containing the ELD's; (o) the same test file; (p) the same ELD selected by the test file process; (q) the same Secondary ELD; (r) the same entry into the Trust DBMS; (s) the same process feeding the Plain-Text ELD's to the magazine of the Protector from the Terrestrial Switch; and (t) the same auto encryption or auto decryption of the Plain-Text ELD. Commuter A has generated and transmitted to its associated Satellite Switch a Time Object Descriptor, and the Switch has processed it. As a result, the Switch selected ELD y, shown in the dashed box, and transmitted it to Computer A. Computer A will store that Secondary ELD in its Trust DBMS in the record corresponding to Computer B. Computer B, by matching the test file against the stream of Secondary ELD's, identifies ELDy as the Secondary and inserts it into B's Trust DBMS in the record corresponding to A.

By using dual means of data transmission—terrestrial and satellite—the Plain-Text ELD's are supplied to the Protectors by the Terrestrial Switch, and the Secondary ELD's are supplied through the satellite datacast. The requirement to transmit any descriptor pertaining to the creation and implementation of the Secondary ELD is eliminated by the Seeding Object Class and the Time Object Descriptor, which together operate directly on data originating in space instead of arriving via terrestrial means. The actual Secondary ELD in the stream of them is selected on each side of the logic circuit, whether on the Satellite Switch or on the individual computer, locally.

The trial and error process is a mirrored procedure, executing on computer B, to identify the Secondary ELD in the satellite datacast that both sides of the logic circuit receive from space in the same point in the datacast, and then the computers install that Secondary into the Trust DBMS on each computer. Each side of the mirrored logic circuit employs the same Secondary ELD generation process, which does not require transmitting any encryption logic descriptor via terrestrial data transmission means. This will now be explained in further detail.

The trial and error method may be used with a Satellite Switch and a LAN, instead of a standalone computer, so that the trial and error process executes on the LAN. In the environment using the Satellite Switch to process the Secondary ELD's in the datacast instead of the computer, the trial and error process may occur as follows. As a preliminary matter, computer A wishes to send an email or chat message to computer B, so A looks up B in the trust DBMS. There is no value in the DBMS for the Secondary ELD because the A and B have not yet established trust. The no-value result of the lookup on the Trust DBMS is the trigger to commence the satellite process. Through satellite data transmission means, a Secondary ELD will be supplied to both A and B, by a mechanism that fastidiously avoids conveying any descriptor pertaining to the Secondary ELD process across the terrestrial portion of the system. This embodiment eliminates the transmission of any data defining the Secondary ELD, such as the Time Object Descriptor, from A to B via email and using the "bucket approach," or with the Terrestrial Switch involved in any way in the Secondary ELD encryption logic process. This is all avoided because instead of transmitting the Descriptor, a the ELD is generated in situ on each computer by a local process that generates and processes mirrored seeding values. The seeding values are the output of the Seeding Object Class.

In order to assure that the Secondary ELD related data transmission is insulated from the terrestrial data transmission means, instead of sending a Time Object Descriptor from A to B as part of the encryption meta-file as in the previously described embodiment, this Initiator embodiment identifies the common Secondary ELD solely by processing to the datacast transmission via locally generated values. Trial and error is used on the recipient computer's side of the logic circuit as a process of elimination, to select the actual ELD that will create the mirrored Secondary ELD logic circuit. A string of ELD's is harvested from the datacast, and each ELD is tested against a test message, a file, by trial and error. The test consists of seeing whether each ELD decrypts the test file or not. This is illustrated in FIG. 51.

The test file either is included in the Protector application of A and B at the inception when those applications are created, or generated on the applications at runtime. In the latter case, instead of a test file that is included in the application, A and B each use a seeding value, the output of an instance of the Seeding Object Class, to generate a common test file for each session, via a test file creation algorithm reposing identically on each Protector. The goal of using a seeding value, the output of a Seeding Object Class, is to harvest in a random way information is available to both computers, to seed the logic build process. The objective is using that information to generate the required random value in the mirrored circuit each time such a value is needed in the encryption logic generation processes.

In using the Seeding Object Class there is a preliminary matter. The common types of data on A and B that potentially can be used as the input to create the seeding object must be identified on both computers. Any kind of common information contained in the encryption meta-file is a candidate, such as the transmission time of the message, or the addresses of A and B, is a candidate for this purpose.

Instead of an encryption logic descriptor for the Secondary ELD being included in the encryption meta-file and sent across the VPN from A to B, this embodiment relies on a test file, a dummy set of bytes, which the Secondary ELD of A has encrypted. The test file may be a standard, fixed feature of the Protector Application. However, it is safer to randomize this. The Protector may use an instance of the Seeding Object Class to create a new test file for each instance of the communication between A and B. To create a such seeding value to randomly generate the test file, a characteristic of the mutual communication process, something available to both computers such as the date of the message or their mutual addresses, is harnessed to generate the test file seeding object. The Seeding Object Class in each instance uses this kind of mutually available data to generate the input, in this case to create the test file. Another use of the seeding object is to create the Time Object Descriptor. The bytes generated by the seeding object operate as the common input into the Time Descriptor Class, available on each side of the mirrored logic circuit, so that computer B can execute the descriptor by loading the Time Object Class. With that, the Time Object is used to locate the segment of ELD's from which A selected the particular ELD that A used to encrypt the Plain-Text ELD. B, by testing that file can distinguish the actual Secondary ELD that A did use from the ELD's in the data cast from the ELD's that A did not use.

So instead of transmitting the Time Object Descriptor from A to B, each side generates it. The Time Object Descriptor is transmitted via terrestrial means in a limited way when the Satellite Switch is used, but only across the LAN that connects each computer to its respective Satellite Switch, and not on the Internet. The Time Object executes on the Switch to produce the ELD snapshot file and supply it to the computer.

Computer A uses a time value from it's clock, such has the timestamp showing the time of transmission of the encryption meta-file to the other computer, as the input into the Seeding Object Class. A generates this timestamp, and B receives it as part of the meta-file. The data parsed from the time stamp is feed into the Seeding Object Class on A, and the output of that class loads A's Time Object Descriptor Class. The same process will happen on B. The time object resulting from loading the class identifies a portion of an ELD stream transmitted by the satellite, so that the data can be used to zero in on a segment of ELD's in the datacast, allowing a Secondary ELD from the segment to be selected and executed. Computer A saves the ELD so selected in its Trust DBMS, so that it can function as the Secondary ELD connecting to B as soon as B has installed it.

Protector A executes that Secondary ELD to encrypt the bytes of the test file, and the encrypted test file is included in its the name-value pair in the encryption meta-file that A, in a moment, will send to B. A uses puts that Secondary to use in the other process, encrypting the Plain-Text ELD, after the latter ELD encrypts the message payload. The fact that the same ELD encrypts both the test file and the Plain-Text ELD allows Protector B to infer, given that the ELD that decrypts one of the test files but not the others, that the ELD that decrypts the test file will also decrypt the Plain-Text ELD used on the payload.

To reach that point, B parses the meta-file, extracts the encrypted test file and subjects it to serial decryption tests, using the ELD's that the ELD datacast arriving on both computers has supplied. Success in the trial and error serial decryption process means identifying the particular ELD which decrypted the encrypted test file, so by deduction this is the Secondary ELD which A has saved in A's Trust DBMS.

Computer B sends the encrypted test file to Switch B, using the hard-wired ELD employed in this connection to encrypt it in transit. The test file is tested on each ELD in the snapshot of the ELD datacast that Switch B has saved, so that in this embodiment the trial and error process happens on the Switch and not on the computer. This approach shifts the compute burden of the checksum from the Computer to the Switch, and the Switch may have specialized hardware such as a GPU to execute in parallel execution the numerous ELD's in the satellite stream. The checksum executing on Switch B is used to match the encrypted test file to the ELD that encrypted it. Each ELD in the satellite datacast which is saved as an array, the snapshot file, is tested on the test file. Each of the ELD's in the series is the sense input. The sense input is matched to the reference. The reference is the test file not included in the encryption meta-file, the unencrypted one generated on both A and B when an output of the Seeding Object Class loads the Test File Generator Class. On each computer the test file was generated in situ by the Seeding Object, or on their respective Satellite Switch, per embodiments. So the reference file in the sense-reference circuit is the unencrypted test file.

On B's side of the logic circuit it is known that A, using the same datacast available to B, used one of the ELD's taken from the datacast to encrypt the test file. When Switch B, using trial and error, happens upon that particular ELD during the process of testing all of them through checksum, the test file decrypts and it matches the unencrypted reference file generated as the output of the Test File Generator Class. It therefore is the Secondary ELD. Switch B encrypts the Secondary ELD using the hard-wired ELD and sends that ELD to Computer B. Computer B installs it in its Trust DBMS, as the value corresponding to A. With that, A and B have their private logic tunnel. In each instance of communication that will occur, A will use its Secondary ELD will encrypt the Plain-Text ELD used on the plaintext of every message and insert that encrypted ELD into the meta-file, and B will do the same every time it communicates with A.

Note that A, apprised of the fact that B is not yet in trust by virtue of the null value resulting from the lookup in the Trust DBMS that is always the first step whenever a Protector communicates, has signaled its own Satellite Switch to provide an ELD, which will become the Secondary ELD for those computers. (Because the datacast is a constant stream, an ELD may be generated at any moment. This fact obviates the need to ever store any Secondary ELD's in a magazine on the computer, and they are placed directly in the secure Trust DBMS). Both A and B are connected to their respective Satellite Switch through the LAN used by each computer. The Switches simultaneously receive the datacast, from the same satellite. This allows data coherency as between the LAN of A and the LAN of B, as each receives an identical stream of data, a continuous feed of ELD's emanating from the common satellite. (In the next embodiment, as an alternative to actual ELD's, channeled entertainment data such as satellite radio or HD television are the input into the encryption logic creation process occurring on A and B in the mirrored process, so that the ELD's are generated from the satellite datacast instead of transmitted by it).

Figure 45:
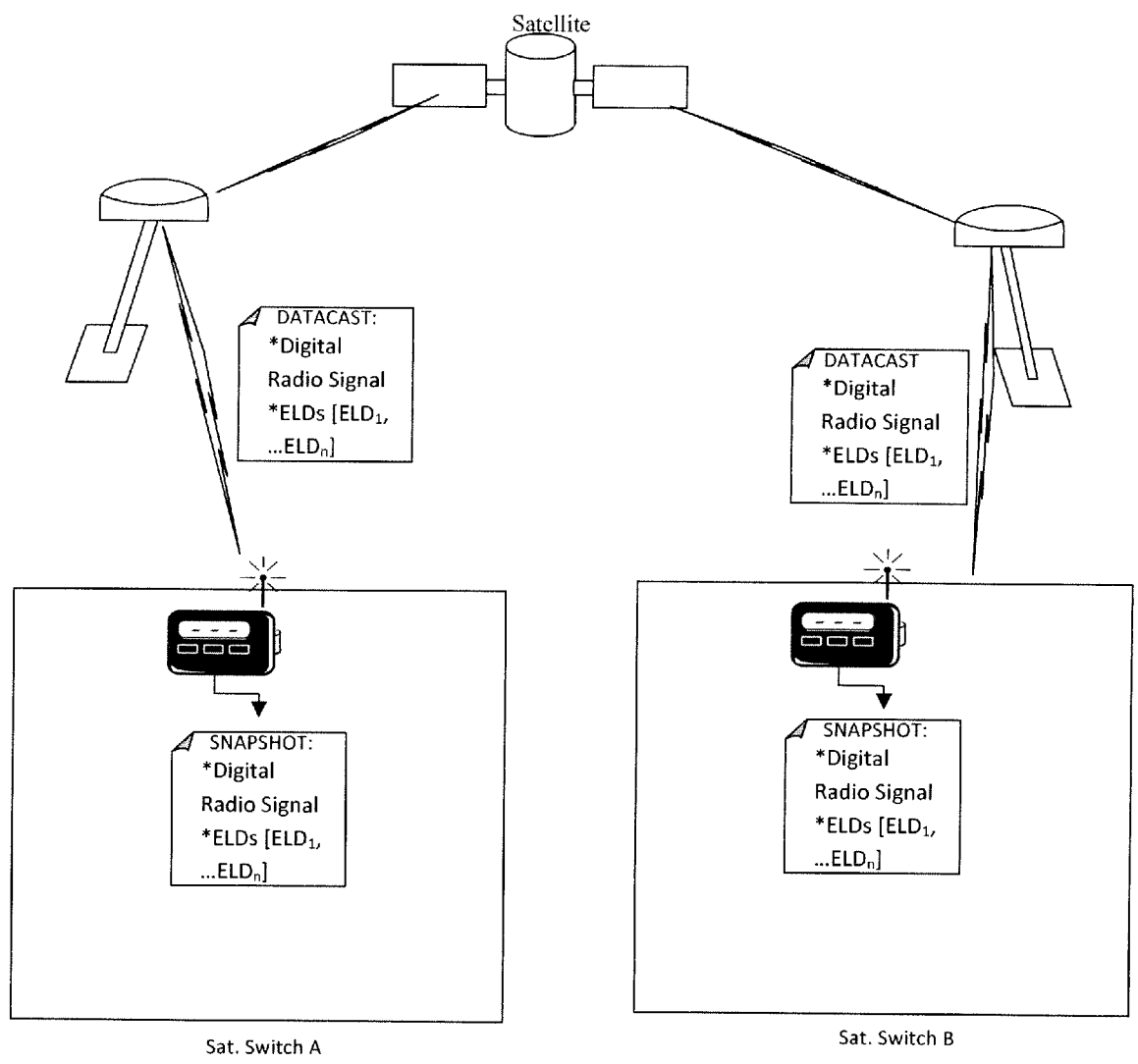
FIG. 45 Satellite Switches A and B capturing snapshots of Secondary ELD's . . .

The Satellite Switches each take a snapshot of the moving map, the ELD datacast. See FIG. 45. The Time Object Descriptor may specify two particular ELD's in the stream to operate as the brackets that delineate the snapshot. The snapshot is saved in a temp file. With the snapshot saved the Satellite Switch can process it as a file. The snapshot may be divided into one minute segments by operation of the Stream Processor Class, with tags dividing one time slice from the next.

The Stream Processor Class may or may not use the test file approach to allowing the recipient computer identify the Secondary ELD. It also may be identified directly by the Time Object Descriptor, to be plucked from the stream. When the test file approach is not used, the Time Object precisely identifies exactly one Secondary ELD in the datacast, on each side, so the timing must be very accurate with this technique.

The ELD's in the datacast are bracketed into time segments, so that they can be located by indexing by the segments. The segments may be of any duration. The solid state drive on each Satellite Switch holds is consecutive segments, taken from the snapshot file saved from the data stream of each channel of the satellite broadcast. Each segment may have multiple ELD's. Every minute (or per embodiments another time interval), the oldest segment is erased from the snapshot file and the newest is added, so new snapshots are created in a series, with each segment being a series of one minute snapshots.

Figure 46:
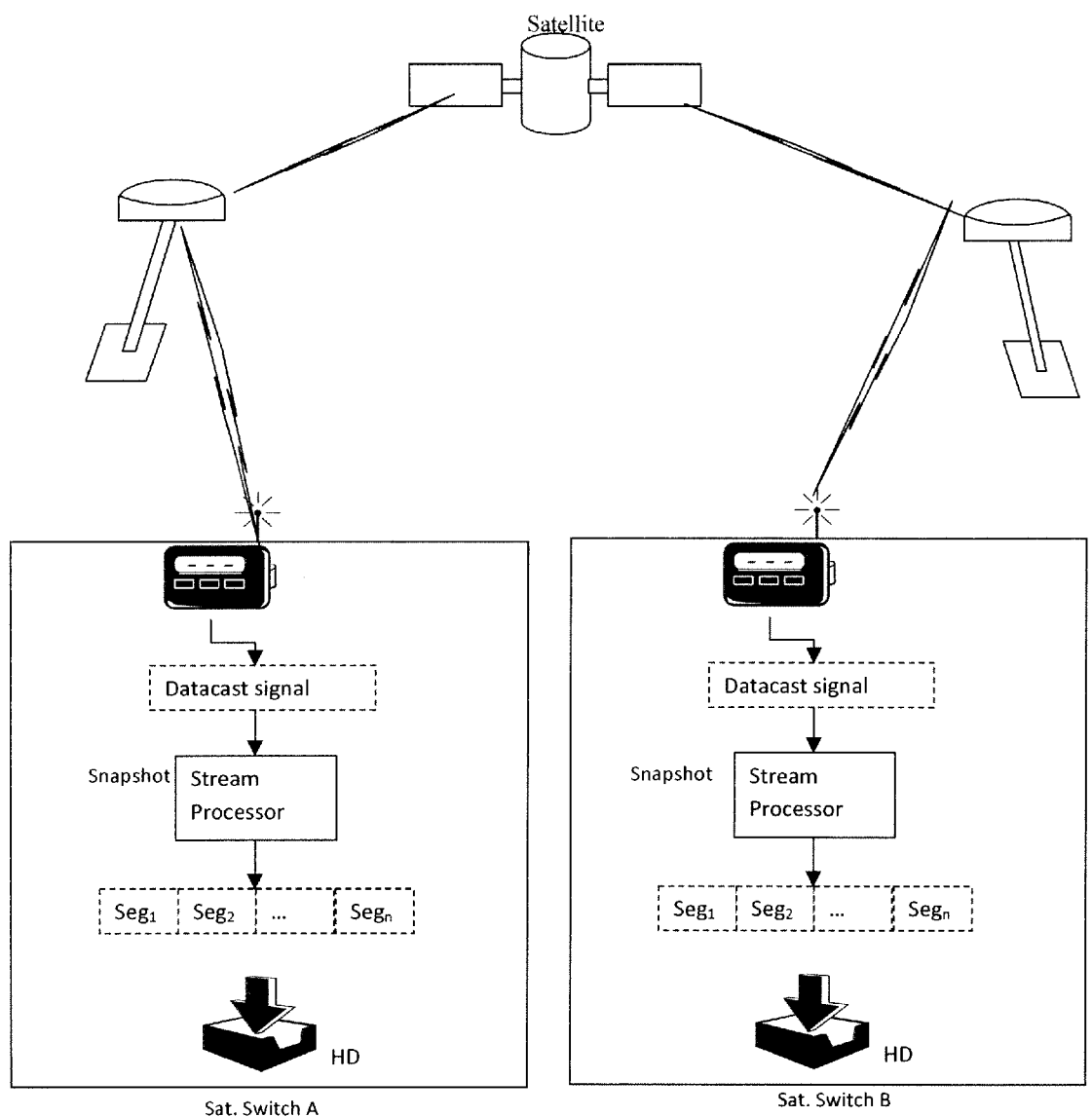
FIG. 46 Stream Processor Class on Switches Handling ELD Stream on Each Side . . .

Both Satellite Switches contain the Stream Processor Class, and they execute it in mirrored fashion by processing identical snapshot files. The snapshots are saved from the datacast identically on both Satellite Switches, using as the reference marker the particular ELD identified in the Time Object Descriptor. The Time Object Descriptor generated on Satellite Switch B uses the time markers to index the segment of the snapshot corresponding to the particular ELD that A has employed as the Secondary ELD. Each Switch executes the Time Object Descriptor and plucks the referenced ELD from its corresponding segment, on each side of the mirrored circuit. (But alternatively, the recipient computer may use the test file approach to locate the particular ELD that the sending computer selected in the snapshot file). The Stream Processor Class may operate on a group of snapshot files, with each file resulting from a separate broadcast channel, and the Switch may process several channels, or all of them, at once. Please see FIG. 46.

The code that extracts the ELD from a segment in a snapshot may be the following:

```
1.  public byte[ ]  extractELDFromSegment( )
2.  {
3.      snapshot1 = file.io.FileIO.readFile(snapshotFile1);
4.      int ELDSize = (int)getSizeFromTimeTags(timeStamp1,
    timeStamp2);
5.      byte[ ]  ELDBytes = new byte[ELDSize];
6.      int start = (int)timeStamp1.getTimeInMillis( );
7.      int j=start;
8.      for(int i=0;  i<ELDSize; i++)
9.          ELDBytes[i] = snapshot1[j++];
10.     return ELDBytes;
11. }
```

Instead of plucking out a single ELD from the stream, a segment may be selected and checksum is used on the segment. The next code example uses the method in the previous example in order to extract the ELD's from the snapshots and perform the trial and error process on the test file, using checksum. This occurs on the Satellite Switch in this example, but it may occur on the computer, depending on the embodiment.

```
1.  public byte[ ] trialAndError(byte[ ] msgBytes, byte[ ]
    encrypted)
2.  {
3.      snapshot1 = file.io.FileIO.readFile(snapshotFile1);
4.      int ELDSize = (int)getSizeFromTimeTags(timeStamp1,
    timeStamp2);
5.      byte[ ] ELDBytes = new byte[ELDSize];
6.      int start = (int)timeStamp1.getTimeInMillis( );
7.      int j=start;
8.      for(int i=0; i<snapshot.length; i+=ELDSize)
9.      {
10.         ELDBytes[i] = extractELDFromSegment( );
12.         EncryptionDocument xml = parseXml(ELDBytes);
13.         Encryptor enc = new Encryptor(xml);
14.         byte[ ] encryptedMsgBytes = enc.encrypt(msgBytes);
15.         boolean flag = checksum(encryptedMsgBytes,
    encrypted);
16.         if(flag) return ELDBytes;
17.     }
18.     return null;
19. }
```

The "plucking" method is one way to obtain the ELD from the datacast, but there is another way. The method in the other embodiment receives the unencrypted bytes of the test message, and the bytes of the encrypted test message (sent by Computer A). The method reads the snapshot file and obtains the size of the bytes that contain the ELD (based on the given time stamps, see lines 3 and 4). In the loop of lines 8 through 9, the ELD's are obtained and parsed (lines 10-12), and the Encryptor is instantiated, assigning the obtained XML of the ELD to it. The bytes of message are encrypted in line 14. The checksum of the encrypted bytes is obtained in line 14, and the received encrypted message is calculated in line 15. If both encrypted bytes match, the bytes of the particular ELD that properly encrypted the message are returned.

A encrypts the plain-text of the message with a randomly selected Plain-Text ELD and then uses the Secondary ELD, provided in the manner just described, to encrypt the first ELD. As previously described, the encrypted Plain-Text ELD and the encrypted plain-text are added to the encryption meta-file and transmitted to Protector B. A saves the Secondary ELD in its Trust DBMS, but at this point it is still useless because B has not yet generated or installed it.

The purpose of the test file is to allow Satellite Switch B to identify the particular ELD that A used as the Secondary. A inserts the test file as encrypted by the Secondary ELD into the meta-file, and sends it to B. B parses the meta-file and extracts the encrypted test file, encrypts it using the hard-wired ELD that connects B to its Satellite Switch and sends it to that Switch, and the Switch attempts to decrypt the test file. Computer B then uses the Seeding Object Class to generate the Time Object Descriptor, and sends the descriptor to Satellite Switch B.

Satellite Switch B uses the time object to identify the segment of ELD's containing the Secondary ELD that A used. Satellite Switch B Satellite Switch B executes the serial checksum tests on that file. The actual Secondary ELD which the Switch discovers by this process is returned by Satellite Switch B to computer B, and computer B installs it in his Trust DBMS, in the record corresponding to A. With that step. A and B have their private logic tunnel. Each time they communicate, that Secondary ELD will encrypt the Plain-Text ELD and the Plain-Text ELD will encrypt the message payload. Note the security advantage that A and B have gained by using the Seeding Object approach: no Secondary ELD nor any descriptor of it has been transmitted via terrestrial means.

The snapshot file results from a moving map, so the hacker would have to act fast if he wished to reconstruct the Secondary ELD from the datacast. The ELD selected from the snapshot soon will have been erased. At that point the toothpaste would be out of the tube and down the drain: it is too late.

In light of this possibility, one may observe that the timing characteristics inherent in the system may be put to good use. The timing of the elements in the system may impose an irreducible latency in the system whereby the information in the datacast that the hacker would need is gone before he can get it. Let us assume that the hacker adopts the strategy of attempting to re-create the logic on A and B whereby they harvest one of the ELD's in the satellite stream (or generate such an ELD). The hacker attempts to derive the structure of the Classes used to generate the Secondary ELD, toward the objective of using the knowledge gained to extract the same ELD from the satellite stream.

The simple expedient of ensuring that the time window inherent in the compute burden of hacking the session object is greater than the time window represented by the computers or their Satellite Switches harvesting that ELD frustrates the hacker. Under the best of circumstances by the time he hacked the logic to find the specified ELD is already would have vanished from the stream.

This approach to security is possible because mirrored the logic build process on the computers happens as the design steps, and the runtime step of harvesting the data from the satellite only happens after the design steps are finished. While the design steps are carried out the ELD stream keeps on flowing, so that time is wasting away. (This is another example of the advantages of the encryption abstraction layer approach). To steal the Secondary ELD the hacker would have to re-create the entire design time process in order to derive the logic of the classes on A and B very quickly—before the particular Secondary ELD that A and B have used in a given instance of communication has vanished from the snapshot file. This is quite a challenge.

It is useless to close the barn door after the horses have run out. The strategy just described leaves the hacker in the barn door, staring at horses vanishing in a cloud of dust.

Note that in this embodiment there is no requirement that the Time Object Descriptor be inserted in the meta-file that A transmits to B. Inserting the Time Object Descriptor is one way of A conveying to B the data that B needs to create the mirrored logic, but a better way has been shown. Instead of transmitting a Time Object Descriptor, the computers use their Seeding Object Class to create one, and a segment of ELD's is identified. Then, the seeding object creates the test file. And then, the trial and error method is used on B, employing that test file, to identify the mutual Secondary ELD that used to establish trust. The encrypted test message is used on Switch B, and all of the ELD's in the snapshot file resident on Switch B, or a subset of them, are executed on the test message. Only one of those ELD's actually decrypts the test message. That ELD is the one that A used to encrypt the test file before A inserted it into the meta-file, and the checksum serial tests has allowed B to identify it.

It may be observed that instead of transmitting the Time Object Descriptor, it is generated locally on the computers. Both computers use it to load the Seeding Object Class in the same way, using that identical input into the Time Object Descriptor Class to harvest the same segment of ELD's from the datacast.

The Seeding Object Class may be used to create the input into the Test File Generator Class, but this is not required. When one of the synchronization described earlier means is employed the computers and the Switches and the satellites are synchronized. Because the clocks of the Switches are synchronized to the same satellite, the test file generation algorithm executes identically on each side of the mirrored circuit, allowing A and B to use the common timestamp as the input to the test file generation algorithm to generate the mirrored test file.

In one embodiment, each ELD in the snapshot file corresponds to its own instance of the test file. Each test file may be individuated by varying its length. This allows the ELD to correspond to the particular instance of the test file. By varying the byte length of the file, when A inserts the encrypted test file into the meta-file and sends it to Computer B, and Switch B receiving it from Computer B after Computer B parsed that test file and passed it on to Switch B, Switch B can associate the test file, having determined its length, with the particular ELD which it has encrypted. The particular test file Satellite Switch A used to select the ELD which Computer A used to encrypt the test file is associated with that ELD using the test file length as the selection criterion. This may be done through a hash table, which may be generated in mirrored fashion on A and B using an input that is the output of the Seeding Object Class. The length of the test file is used to index the particular ELD, or to a group of them such as all of them in the segment. The particular test file indexed in this manner is the one tested to be tested by B on the ELD associated with it. In this embodiment there is a one-to-one relationship between the ELD segments in the snapshot file and the test files, instead of the one to many relationship that is used when a single test file is encrypted by all the ELD's.

Character expansion may be used to make the test file harder to crack, whereby the original encrypted test file encrypted on A, expressed as ASCII characters, is expanded into a bytes set corresponding to Unicode characters, per the technique described previously. A, instead of sending the usual bytes of the test file to B, sends instead an expanded byte set. Then A takes the ELD which Satellite Switch A has supplied by loading the Time Object Descriptor class, and Computer A encrypts the byte set generated from the expanded version of the test file. As the next step, the encrypted test file byte set is inserted into the encryption meta-file and sent to B, using the terrestrial portion of the system. When B receives the tests file byte set, it decrypts it. B may then run the bytes expansion algorithm in reverse, reducing the expanded byte set for faster execution of the decryption. Please see FIG. 48. Computer A sends the encrypted test file to Computer B so that Switch B can resolve the Secondary ELD by the trial and error process.

Figure 48:
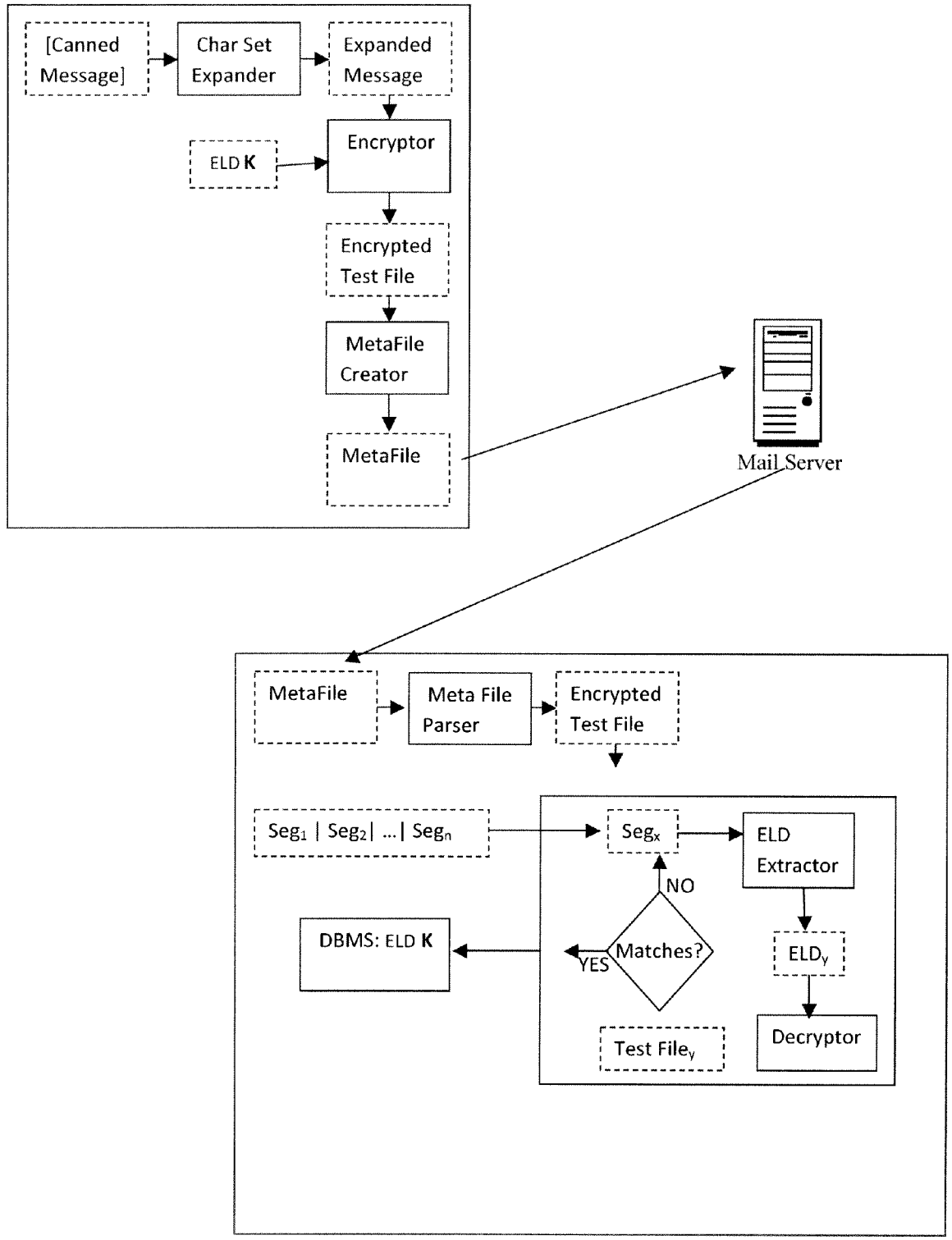
FIG. 48 Obtaining an ELD from a snapshot by trail and error using a Test File . . .

FIG. 48 is an example of expanding the test file, and this is appropriate when the encryption application uses email. Computer A is the upper box, the sending computer and Computer B is the lower box, the receiving computer. A canned message enters the Char Set Expander, and the result is the expanded bytes of the message (the dotted box with the text "Expanded Message"). "Expanded Message" is the test file. The expanded message bytes enter the Encryptor, is encrypted by a Plain-Text ELD. The next step is creating the meta file (by means of the "Meta File Creator") that fulfills the name value pair for the Expanded Message. The result is that the encrypted test file that A will send to B is included in the encryption meta-file. The meta-file is sent as an email, and received by Computer B (via the Mail Server module). The meta-file is parsed, and the encrypted test file is obtained, decrypted, and unexpanded. Then the trial and error checksum process on Switch B begins. The segment identified in the Time Object is entered into the checksum process, and the ELD are extracted from the segment, by means of the ELD Extractor. The ELD obtained by the ELD extractor is the input of the Encryptor (in "Decryption Mode," as illustrated by the "Text Box" with the "Decryptor" text), the decryption generates a Decrypted Test File. A series of instances of Checksum occurs, and this is shown in the lower box. Checksum is performed on the Test File decrypted by each ELD, comparing it to the unencrypted Test File. If a match results then that ELD ($ELD_y$) is stored in the DBMS. Otherwise, the process is repeated until the $ELD_y$ is identified.

The detailed steps in selecting the Secondary ELD, which in the following example we will call ELD K, will now be explained in greater detail. To fool a hacker, the name-value pair in the encryption meta-file contains a dummy test file if no real test file is provided, and this is the case if A and B already are in trust because the Secondary ELD already exists so the trust grant procedure does not occur. Let it be assumed that trust does not exist, so no dummy test file is placed in the encryption meta-file that A prepares and sends to B. The real test file is inserted, and A has encrypted it using the Secondary ELD generated on A's side of the logic circuit and placed in A's Trust DBMS. B parses that file and B knows that the file is real because of the null value in B's trust DMBS in the record corresponding to A. B receives the test message bytes and will decrypt it.

But how? B, having received the meta-file, having parsed it, sees that there is a real bytes set in the name-value pair reserved for the encrypted test file, having obtained the expanded test file byte set, as encrypted by the Secondary ELD selected by the instance of the Time Object Descriptor Class that loaded the Stream Processor Class on the Satellite Switch of A. B, using its Seeding Object Class, parses the data included in the encryption meta-file, and locating the common data elements that both A and B use as the input to the instance of the Seeding Object Class that is the input into the Time Object Descriptor class. B generates the Time Object Descriptor, and it is identical to the one that A generated.

Computer B takes parses the test file bytes set and unexpands it. Then B and encrypts the test file byte set, using the hard-wired ELD corresponding to its Satellite Switch, Satellite Switch B. Computer B transmits the test file, thus encrypted, to Switch B. (The hard-wired ELD step allows that test file to be sent securely to Satellite Switch B. B always uses that hard wired ELD to encrypt all the data going back and forth between B and B's Satellite Switch). Also using the hard-wired ELD for security, B transmits to its Satellite Switch the Time Object Descriptor that B just obtained by loading B's Time Object Descriptor Class with the output of the Seeding Object Class that B just executed. Satellite Switch B receives the test file byte set, and using the same hard-wired ELD, decrypts it. That test file is, of course, still encrypted by the Secondary ELD which A used to encrypt it before A put it in the meta-file and sent it to B. It is Satellite Switch B, and not computer B, that will execute checksum serial test on the test file, using the series of ELD's in the snapshot file in order to ascertain the encryption logic that A used. Satellite Switch B having decrypted the test file using the hard-wired ELD that it always employs when communicating the Computer B, then does the serial decryption tests using the ELD's in the segment of ELD's that it obtains from the datacast, which segment the Time Object has described. This series of tests will reveal the Secondary ELD that A used to encrypt the Plain-Text ELD.

This is a sense-reference circuit, and bytes set encrypted by ELD K, which computer B has sent to Satellite Switch B, is the sense input. The reference input is the unencrypted test file. Satellite Switch B has generated the unencrypted test file by loading the Test File Generator Class, using the same time stamp input that originated on the satellite as A, as the input into the Seeding Object Class. Computer B transmits the output of the Seeding Object Class to Satellite Switch B, and the latter uses that object to generate the unencrypted version of the test file.

In another embodiment, the test file is a static file that is present on the Switches as part of the standardized Satellite Switch software application. To update the test file, the Switch generates a new one from an endless loop, and this happens identically and simultaneously on all of the Switches. The process of updating the test file is something that the Satellite Switches do in the background, and constantly. When an endless loop is used for the updating the test file on all the Switches, each instance of the endless loop swaps out and is replaced by the next loop instance, upon an interval, simultaneously on all the Switches. By this means the current instance of the reference test message is always available to all of the Satellite Switches, but it varies from time to time so it is harder to crack. The Switches using's this varying test file always supply the current version to the transmitting computer when it needs to establish trust by encrypting it with the selected Secondary ELD and transmitting it to the recipient computer. The time stamp on the encryption meta-file allows the recipient computer and Switch to identify the correct test file, associating the time stamp with the version of the test file valid at that time. In either embodiment for supplying the test file, the Switches are supplied with the correct, common test file for the trial and error execution process, both the first Switch and the second one.

In order to tell which of the dozens of ELD's in the snapshot file was the one that A actually used to encrypt the test file—and it is ELD K—Satellite Switch B will execute all of the ELD's in the snapshot, or at least a subset of them. Switch B will in every case attempt to decrypt the test file, repeating the class loading for each ELD in the series, using its Encryptor. By this means Switch B will ascertain which of the ELD's in the series of ELD's in the snapshot was ELD K, the one that A actually used as the Secondary ELD. This is illustrated in FIG. 48.

Instead of the entire snapshot, a portion of it may be selected on the Satellite Switch for this concatenated class loading test process, and an algorithm may select how much of the snapshot is snipped out to form the portion. As mentioned, one way to do this is to correlate the segment with a particular test file of a unique size. The purpose of reducing the snapshot to a smaller portion is to reduce the compute burden inherent in testing all of the ELD's, by limiting the testing to the selected portion. But if enough compute power is applied to the problem this becomes a non issue, and for this reason using a GPU for processing the segment in parallel is attractive.

The time stamp may be used to zero in on the portion of the snapshot file to be tested. The time stamp maybe used as an input into the Seeding Object Class, or used without invoking that class. The portion may be specified by an algorithm that receives as an input the time when Protector A transmitted the encryption meta-file to B. Typically chat messages or emails include a time stamp reflecting the time of transmission. Because the time of transmission of the meta-file may be correlated with the approximate time the when class loaded on Satellite Switch A to generate the Secondary ELD actually used, and because this time stream has been recorded in the snapshot file through the tags dividing the snapshot into time slices, the timing algorithm using the timestamp and the tags selects an approximate range of time in the snapshot file where the actual Secondary ELD is expected to appear in the as-recorded buffered stream. This measurement is possible because the time differential between sending the message and receiving it will tend to fall into a range. There may be a feedback loop to refine the operation of the algorithm that sizes the portion of the snapshot that is snipped out for testing.

The system may be configured so that the actual execution of the "Send" command occurs only during a defined time slot occurring x milliseconds after the bytes matching process yielded the Secondary ELD. This is yet another way to handle the challenge of using timing on each side of the logic circuit to find the same Secondary ELD on both computers.

Each ELD is tested in the portion of the snapshot file selected from the datacast stream. (Both of the Satellite Switches have generated identical snapshots of the stream, thanks to the same snapshot generation routine operating on each, through the Stream Processor Class; see FIG. 46). Each of the ELD's in the selected portion is executed in series, to yield a decrypted Plain-Text ELD on Satellite Switch B. But of course, A only used one of them to actually encrypt the Plain-Text ELD when A transmitted the encryption meta-file to B, per the process illustrated in FIG. 48. This one is ELD K, the actual one Satellite Switch A plucked from the snapshot file. So how does B know which one is ELD K?

Figure 49:
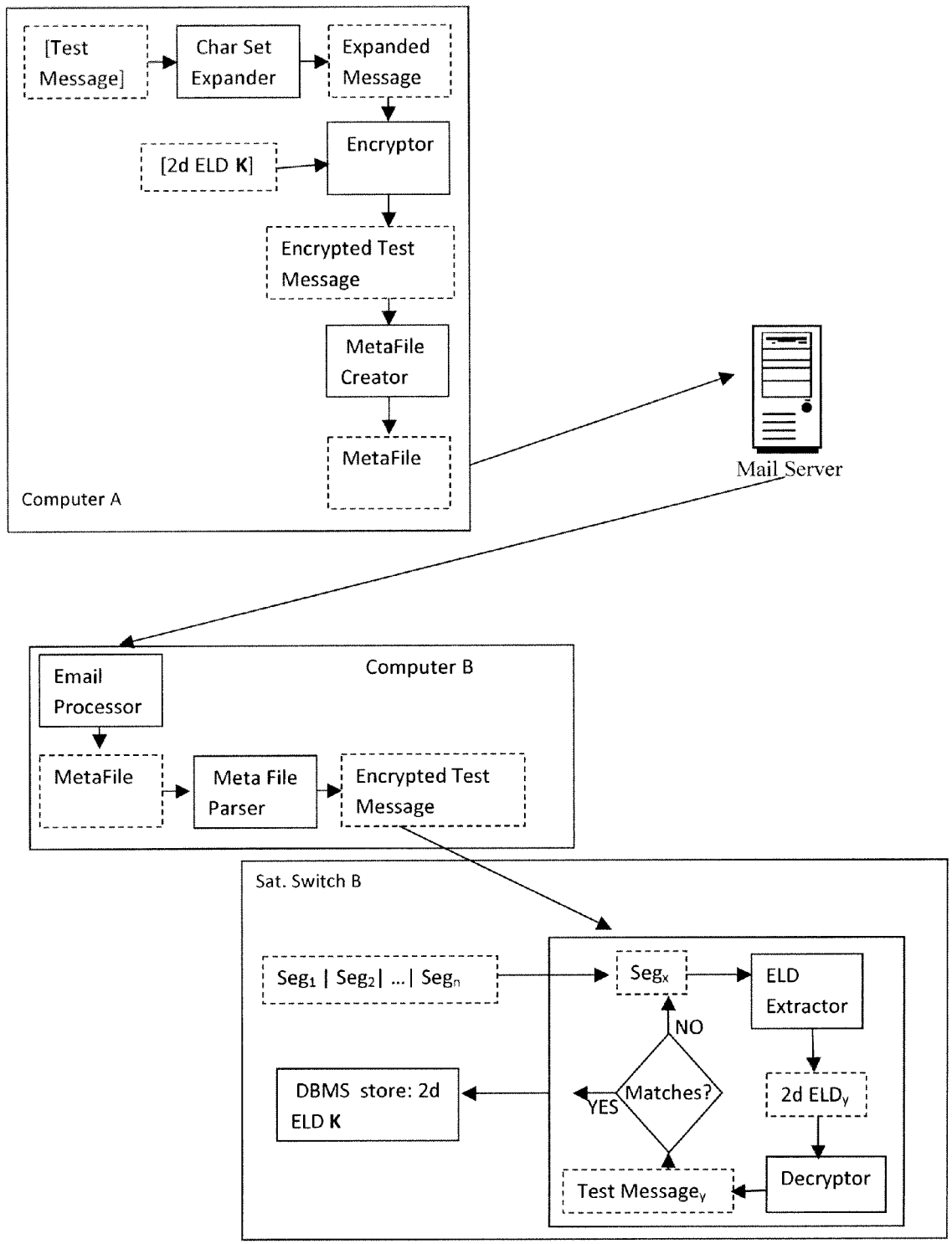
FIG. 49 Transmission of encryption metafile and test file Process on B . . .

The test file process yields the answer by using checksum. Computer B, having parsed the encrypted test file bytes and having transmitted those bytes to Satellite Switch B, by that step has provided the input to that Switch B needs to execute the sense-reference checksum process, as to all of the ELD's in the selected portion of the snapshot file. The input to the concatenated loading of the class, repeated on Switch B for each ELD in the segment, the sense, is the encrypted byte set which Computer B parsed from the encryption meta-file that A encrypted using ELD K and transmitted. The reference is the unencrypted version of the Test file that Satellite Switch B has generated. The encrypted test file, after decryption by each of the ELD's in the series, is compared to the known unencrypted test file, and the result is associated with that ELD and saved in a temp file. The objective is observing which decrypted ELD matches the reference test file, the unencrypted test file that both of the Switches have generated from the common inputs. Please see FIG. 49.

Because Satellite Switch B, like Switch A, has the current version of the reference test file (which is unencrypted), and also the encrypted test file that A inserted into the meta-file and transmitted to B, and because all of the ELD's in the segment of the snapshot file are executed on that encrypted test file in series, Switch B can resolve ELD K. As to each ELD, a decrypted output results from the concatenated series of class loadings, but only when ELD K is executed on Satellite Switch B will the decrypted test file match the unencrypted reference test file, per the checksum.

After ELD K is identified on Switch B, both Computer A and Computer B install it in the Trust DBMS of the their Protectors so that henceforth it can be used routinely, when A and B send encryption meta-files back and forth, to encrypt the Plain-Text ELD's that encrypt the message payload.

Figure 44:
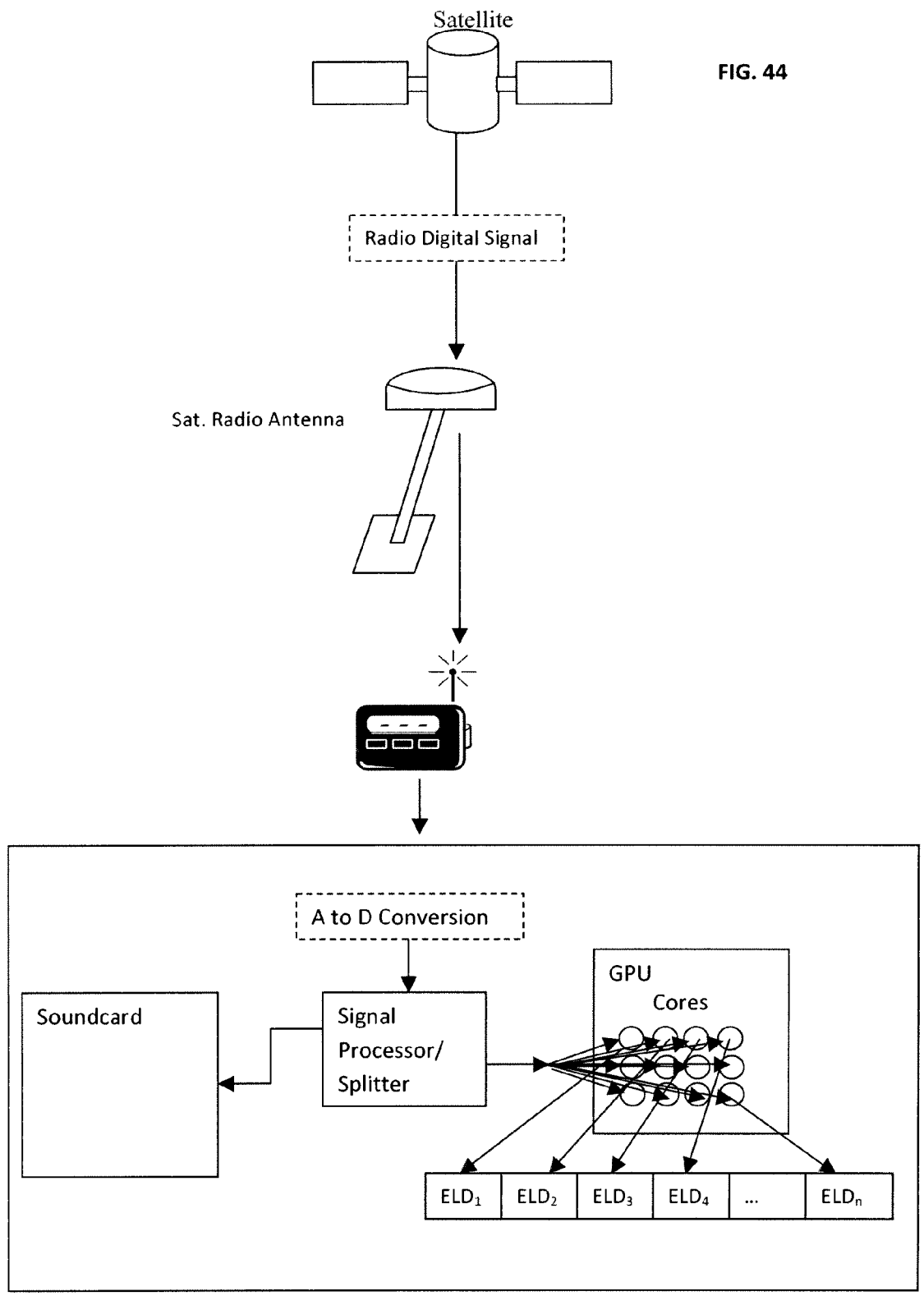
FIG. 44 Signal from Space split for Sound and GPU encryption execution . . .

The Satellite Switches may contain a GPU to speed up the serial execution of the string of ELD's selected from the snapshot and subjected to the checksum, using parallel processing. Each ELD in the snapshot file may be part of a segment, and the segment length corresponds to the number of cores in the GPU. This allows parallel execution for each ELD in the segment on the cores set of the GPU allowing the maximum number of ELD's per clock cycle to be executed. When Satellite the Switches are booted up, the operating system registers the number of available cores on the GPU available for the processing. The goal is for the class loading for each ELD in the snapshot file to be batched into a set that, using the segments, corresponds to the cores so that parallel processing produces maximum advantage. Each ELD in its segment is assigned to its own core. For example, the Stream Processor Class divides the snapshot file into segments that correspond to that number, so that if there are 64 cores, each segment contains 64 ELD's. Please see FIG. 44. Cuda™ or a similar environment may provide this parallel processing functionality.

Serially, each ELD in the segment is assigned to the next core, and after core number 64 has received its ELD to test, the entire batch of ELD's executes, one ELD on each core. The results are saved and the process repeats until each of the ELD's in the segment selected from the snapshot file is tested.

Figure 50:
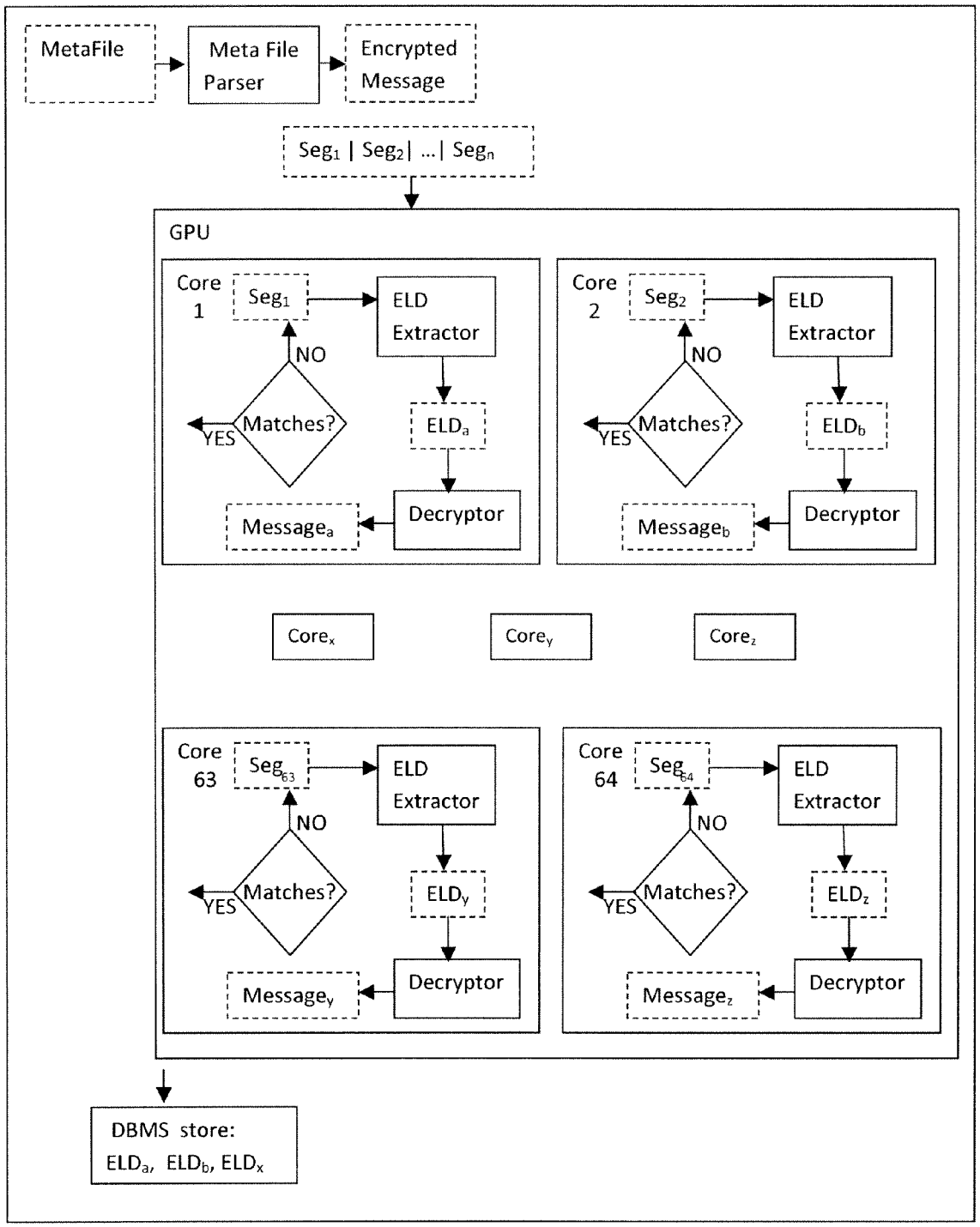
FIG. 50 Serial Checksums on Test Files Identify the True Secondary ELD using GPU . . .

As a result, if n number of ELD's are tested, the result is that n−1 ELD's result in no checksum match, but one ELD does result in a match, ELD K. When the system architect wishes to invoke redundancy in the process establishing the Secondary ELD between A and B, A may select more than one ELD from the snapshot file, and Switch A may transmit more than one to Computer A. Consequently, Computer A may include more than one instance of the encrypted Plain-Text ELD in the encryption meta-file that A sends to B. With multiple Secondary ELD's, Satellite Switch B would perform checksums on the segment yielding a quantity of non-matches equaling n−x, where x equals the number of ELD's A employed as alternate Secondaries. The multiple Secondary ELD approach identifies ELD's $K_1$, $K_2$, etc. Please see FIG. 50. In this illustration, each segment corresponds to each core, and each segment uses a unique test file in the testing. Changing the test file from segment to segment makes the system harder to crack, so in this example the Test File Generator Class generates not a single test file, but one for each segment.

Java along with JOCL can be used in order to process the segments in a GPU using OpenCL. The following paragraphs explain the code that can be used. Keeping in mind that OpenCL uses kernels, the kernel used to extract the ELDs from the snapshot file may resemble the following:

```
1.  String ELDExtractorCode = "__kernel void "+
2.  "KernelELDExtractor(__global const byte *snapshot, " +
3.  "__global const byte *segment)"+
4.  "{ int ELDSize =
    (int)getSizeFromTimeTags(timeStamp1," +
                                            "timeStamp2);"+
5.  "int start = (int)timeStamp1.getTimeInMillis( );"+
6.  "int j=start;"+
7.  "for(int i=0; i<ELDSize; i++)"+
8.  " segment[i] = snapshot1[j++];"+
9.  "}";
```

This code is the same the extractELDFromSegment( ) method shown previously, but in the form of a JOCL kernel, i.e., using the C99 programming language syntax.

The code that executes this kernel may resemble the following:

```
1.  public void getELDsFromSnapshot(byte[ ] snapshot){
2.  cl_context context = createContext( );
3.  byte[ ] ELDBytes = new byte[ELDBytesSize];
4.  org.jocl.Pointer PointerToSnapshot  = Pointer.to(snapshot);
5.  org.jocl.Pointer PointerToELDBytes = Pointer.to(ELDBytes);
6.  clGetContextInfo(context, CL_CONTEXT_DEVICES, 0, null,
    numBytes);
7.  int numDevices = (int) numBytes[0] / Sizeof.cl_device_id;
8.  cl_device_id devices[ ] = new cl_device_id[numDevices];
9.  clGetContextInfo(context, CL_CONTEXT_DEVICES, numBytes[0],
                                Pointer.to(devices),
    null);
10. cl_mem memObjects[ ] = new cl_mem[2];
11. memObjects[0] = CL.clCreateBuffer(context,
        CL.CL_MEM_READ_ONLY | CL.CL_MEM_COPY_HOST_PTR,Sizeof.cl_short
*
                                bytesLength, PointerToSnapshot,
    null);
12. memObjects[1] = clCreateBuffer(context,
            CL.CL_MEM_READ_WRITE, Sizeof.cl_short * ELDBytesSize,
                                PointerToELDBytes,
    null);
13. cl_program program = CL.clCreateProgramWithSource(context,
14.                   1, new String[ ]{ ELDExtractorCode }, null,
    null);
15. CL.clBuildProgram(program, 0, null, null, null, null);
16. cl_kernel kernel = org.jocl.CL.clCreateKernel(program,
                                    "KernelELDExtractor",
    null);
17. CL.clSetKernelArg(kernel, 0, Sizeof.cl_mem,
    Pointer.to(memObjects[0]));
18. CL.clSetKernelArg(kernel, 1, Sizeof.cl_mem,
    Pointer.to(memObjects[1]));
19. cl_command_queue commandQueue =
    CL.clCreateCommandQueue(context,
                                    devices[0], 0,
    null);
20. CL.clEnqueueNDRangeKernel(commandQueue, kernel, work_dimension,
            global_work_offset,global_work_size, local_work_size,
            num_events_in_wait_list, event_wait_list, event);
21. CL.clEnqueueReadBuffer(commandQueue, memObjects[1],
            blocking_read, offset, memorySize, PointerToELDBytes,
                    num_events_in_wait_list, event_wait_list,
    event);
```

```
22.  releaseMemory(memObjects, kernel, program, commandQueue,
context);
23. }
```

Line 2 creates the context over which JOCL works in order to manipulate the GPU. Line 3 initializes the array of bytes that are going to store the bytes of the ELD to be extracted. Line 4 creates a JOCL Pointer that is going to point to the bytes of the snapshot. The next line is similar, but in this case a pointer to the array that is going to store the resulting bytes is created. Lines 11 and 12 creates the memory objects that are going to manipulate the Pointers previously created. Line 13 creates an instance of the JOCL class program, this object is in charge of executing the code of the kernel previously defined. Line 15 builds and compiles the code of the kernel, and line 16 creates the instance of the JOCL kernel class. The arguments (the values of the parameters) of the kernel are set in lines 17 and 18. Line 19 creates a queue of commands (through this queue of commands the kernel is executed). The kernel is executed in line 20, and the result is read in line 21. The memory that was used to perform the task is released in line 22. The kernel for encrypting the message may resemble the following:

```
1.  public String encryptSource = "__kernel void KernelEncrypt
2.  (__global const byte *key, __global const byte *bytes,
      __global 3. const *enc)"+
4.   "{"+
5.   "     enc = encrypt(key, bytes);"+
6.   "}";
```

The kernel receives three parameters, the first one corresponds to the array of bytes of the key used in the encryption algorithm, the second parameter corresponds to the array of bytes to be encrypted, and the last one corresponds to the array where the encrypted bytes are stored. The code in line 5 calls the encrypt( ) function in order to obtain the encrypted bytes.

The code that executes this kernel may resemble the following:

```
1.  public void encrypt(byte[ ] bytes){
2.  cl_context context = createContext( );
3.  byte[ ] enc = new byte[bytes.length];
4.  org.jocl.Pointer PointerToBytes = Pointer.to(bytes);
5.  org.jocl.Pointer PointerToEnc = Pointer.to(enc);
6.  clGetContextInfo(context, CL_CONTEXT_DEVICES, 0, null,
numBytes);
7.  int numDevices = (int) numBytes[0] / Sizeof.cl_device_id;
8.  cl_device_id devices[ ] = new cl_device_id[numDevices];
9.  clGetContextInfo(context, CL_CONTEXT_DEVICES, numBytes[0],
10.                                   Pointer.to(devices),
null);
11. cl_mem memObjects[ ] = new cl_mem[2];
12. memObjects[0] = CL.clCreateBuffer(context,
        CL.CL_MEM_READ_ONLY | CL.CL_MEM_COPY_HOST_PTR,Sizeof.cl_short
*
                          bytesLength, PointerToBytes,
null);
13. memObjects[1] = clCreateBuffer(context,
14. CL.CL_MEM_READ_WRITE, Sizeof.cl_short * bytesLength,
                                    PointerToEnc, null);
15. cl_program program = CL.clCreateProgramWithSource(context,
                       1, new String[ ]{ encryptSource }, null,
null);
16. CL.clBuildProgram(program, 0, null, null, null, null);
17. cl_kernel kernel = org.jocl.CL.clCreateKernel(program,
                                  "KernelEncrypt", null);
18. CL.clSetKernelArg(kernel, 0, Sizeof.cl_mem,
Pointer.to(memObjects[0]));
19. CL.clSetKernelArg(kernel, 1, Sizeof.cl_mem,
Pointer.to(memObjects[1]));
20. cl_command_queue commandQueue =
CL.clCreateCommandQueue(context,
                                          devices[0], 0,
null);
21. CL.clEnqueueNDRangeKernel(commandQueue, kernel,
work_dimension,
               global_work_offset,global_work_size,
local_work_size,
               num_events_in_wait_list, event_wait_list, event);
22. CL.clEnqueueReadBuffer(commandQueue, memObjects[1],
               blocking_read, offset, memorySize,
PointerToEnc,
               num_events_in_wait_list, event_wait_list,
event);
23. releaseMemory(memObjects, kernel, program, commandQueue,
context);
24. }
```

The code is similar to the previously explained code that executes the extraction of the ELD bytes from the segment. They only differ in line 17, where the name of the Kernel is provided.

Two embodiments of Initiator have now been presented, one using exclusively the terrestrial means of data transmission (the embodiments using the Tertiary ELD's and the Terrestrial Switch), and a hybrid system in which the Plain-Text ELD's are provided by the terrestrial data transmission means, but the Secondary ELD's are provided by satellite datacast. In the latter embodiment the mirrored logic characteristic of the other embodiments is preserved because each computer receives the same satellite datacast. With an identical satellite data input creating the encryption logic session object on each computer, a mirrored logic circuit results, so that the bytes of an email or chat message are auto encrypted upon transmission and auto decrypted upon receipt.

There is a third embodiment of Initiator, one exclusively using satellite means of data transmission, which is now described. In the third embodiment there is no Terrestrial Switch that generates or transmits any kind or portion whatsoever of the ELD's that are used in the logic layers. All of the ELD's are generated locally on the Protector, exclusively through information received by satellite. Because each computer is connected to the satellite, either directly or via a LAN containing a Satellite Switch, there never is any need to provide any ELD's by terrestrial data transmission means using a VPN or the Internet; nor any data describing how to generate them. In the third Initiator embodiment, all of the randomness input generating the encryption logic comes via satellite.

Each Protector in the third embodiment of Initiator has its own encryption logic engine, and all of the data the engine requires arrives in the satellite datacast. Computer A and Computer B never send one another a logic descriptor, but instead use the Seeding Object Class to generate a seeding value that is used as a catalyst to the entire encryption logic generation process, both the Plain-Text ELD's and the Secondaries, and this happens on each computer in a completely local process. The VPN is used to transmit the email messages, but never to transmit any encryption related values. The "bucket approach" is abandoned in this embodiment, because all of the encryption related data comes from space.

Because of the following structure, the randomness input into the encryption logic process is exclusively satellite derived. Instances of the Seeding Object Class may generate seeding values used to generate the mirrored logic process on each side of the circuit, for instance, by loading the Test File Generator Class, the Time Object Descriptor Class, and the Stream Processor Class with the seeding values. The Seeding Object Class has been described as the input creating the test file, and that approach is extended so that it also is the input generating the ELD's in situ.

Another point of departure in the third embodiment is that there is no need for the satellite datacast to include any ELD's, not even Plain-Text ELD's. A matching stream of ELD's flowing to each computer from space is not required; the two computers generate, in situ, the mirrored ELD's, simply by processing the common datacast in the same way. The ELD's are created on the spot.

The datacast that is used to do this may be a datacast in any form whatsoever, so long as it reaches both computers identically. The third Initiator embodiment, in one version, uses two or more digital satellite radio transmissions, such as those of XM Radio™. In the fourth Initiator embodiment GPS is used.

The design philosophy of the third Initiator embodiment is that, because the satellite datacast is an ephemeral information stream that arrives at all of the computers simultaneously and which is received by all of them identically, the stream can supply all of the values used in a mirrored encryption logic generation process in a manner affording data coherency, yet with little or no need to store those values. This is an advantage because values that are stored, in contrast to values that vanish, are easier to steal.

Instead of storing the values to disc, a buffer may be used to capture the stream for processing on the CPU. Alternatively, a DSP may replace the CPU as the logic processor to generate the encryption logic in real time, so that neither a buffer nor a snapshot file is needed. When a CPU is used, the ephemeral datacast stream is buffered on each computer in the mirrored pair, and the values are extracted and processed as a file. Then, the file is purged. The tooth-paste-in-a-tube method may be used. But when a DSP is used, the data is processed in a flowing stream, as fast as it arrives, so there is no need to ever store the data that generates the encryption values.

Either using the CPU or the DSP, the advantage by this approach is clear: because the encryption logic generation values are plucked from the flowing stream of the satellite radio broadcast, they vanish as soon as they are used. This happens on all of the computers at once, so that each generates an identical encryption logic session object that is employed as the Secondary ELD.

Because there is no need to transmit the encryption related data as a file that travels across the VPN, which is required when using terrestrial means or the bucket approach, there is no need to save that data to memory (apart from the buffering step required for CPU execution). Because the stream vanishes almost immediately, obtaining the data input to hack the encryption logic session object is a daunting task: there is no saved file to hack. The evanescence of the encryption logic input is a prophylaxis against a brute force attack.

Moreover, none of the encryption logic data traverses the Internet. Terrestrial means are not used to supply the randomness that the encryption logic requires. And because the encryption logic is derived from a constant flow or data, such as streaming music, there is an inexhaustible supply of the raw material for the encryption logic generation process.

A satellite datacast, such as one used in digital television or XM™ radio, may contain multiple channels. In the third embodiment of Initiator a channel selector is used to randomize, from session to session, the input to the encryption logic session object that the datacast supplies. On each side of the mirrored encryption logic generation circuit an instance of the Seeding Object Class may be the input into the Channel Selector Class.

One way to seize data from the stream is for computer A to send a Time Object Descriptor to Computer B, as described above. This is not the method used in the third Initiator embodiment, however, because in the third embodiment no logic descriptor of any sort is transmitted via terrestrial means. Instead of using a descriptor, each side of the mirrored circuit contains an algorithm that generates a data string by comparing, in real time, the bytes of one channel of the satellite datacast to the bytes of another. This is a matching process. The comparison happens identically on computer A and computer B, the computers forming a mirrored logic circuit, and this is why logic coherency is maintained. Because A and B have the same algorithm for bytes matching in the selected channels, A and B generate the same set of matching bytes and these become the matching input into the identical encryption logic engines, which generate identical ELD's.

For the sake of simplicity, a basic, two channel embodiment of the satellite channel stream bytes matching process will be described. The satellite music broadcast is received and processed by two computers, and a mirrored encryption logic will result on both by using the music as the reciprocal random input. The normally intended use of the music broadcast is for the listener to select a channel and listen to the music. The third Initiator embodiment does not prevent this use of the music data transmission, but parasitically uses that data stream for encryption purposes as well.

The main idea is that, given the fact that all of the computers receive all of the music datacast at the same time, an identical algorithm on any two computers can execute a comparison of the bytes of channel x to the bytes of channel y. This processing yields, as a mirrored result on each computer, the same set of matching bytes. The algorithm executes the same comparison process on the same data on both computers, so the process generates the same output, the matching set of bytes, which becomes the input into the Encryptor. Mirrored encryption logic session objects result by harvesting the stream on each side.

The comparison of the first bytes set, channel x, to the second bytes set, channel y, yields a third bytes set, an array of the bytes that happen to match in x and y. (The matching is completely a matter of happenstance, but this does not matter because the point is that the happenstance happens identically on each computer). Because everything is the identical on each computer, they both produce the same array. Each computer processes the datacast identically, yielding an identical output from the identical input. That output is fed into an encryption logic engine on each computer, and the engines also are identical. The result is mirrored encryption logic on the two computers. This is how in the third embodiment of Initiator the satellite datacast creates a matching encryption logic session object on each side, achieving this sleight of hand without any input from the terrestrial data transmission means whatsoever.

The datacast is the same; the extraction of the bytes matches from the channels of the datacast is the same; the generation of the input string derived from the channel comparison process is the same; the encryption logic engine receiving that string as its input is the same; the resulting ELD is the same; the operation of the Encryptor using that ELD in the dynamic class loading is the same; the encryption occurring on each side of the mirrored circuit is the same. This is all achieved without the passing of keys or certificates, so a successful man in the middle attack is very difficult to imagine unless the man in the middle is an astronaut! Please see FIGS. 45 and 46, which show the signal coming directly from space.

The plain-text on each side of the logic circuit is the same. One side auto encrypts it and the other side auto decrypts it. The plain-text that is encrypted in this manner maybe the body of the encryption meta-file, the message, in the case of the Plain-Text ELD; or in the case of a Secondary ELD, another ELD (recall that an ELD is merely a text file). The Trust DBMS approach to the granting of trust works with the third Initiator embodiment, just as in the first and second embodiment.

By these steps a highly orthogonal encryption logic session object is created identically on both of the computers. This is effectuated with absolutely zero logic input provided by terrestrial data transmission means. The randomness data comes directly from space and in real time, leaving the man in the middle out in the cold.

Three channels from space for the bytes comparison process instead of two, or any other number, may be used. As will be shown below, a fictitious channel may also be used as a comparator to the real satellites data feeds to create the bytes matches that constitute the mirrored randomness input on each side of the logic circuit.

In this example channel x and channel y are music channels that the satellite radio datacast transmits down the earth receivers. Because each channel carries music, each channel carries random information. The music channels will be put to a dual use, providing entertainment and a random encryption logic input at the same time.

GPS data may be used in lieu of a satellite radio or television signal, or in addition to it. Global positioning information in the embodiments is not necessarily used to determine position, although this is a good way to provide authentication. Instead, it works as the reciprocal logic input to create in situ the encryption logic executed on the mirrored circuit. The same GPS data stream may be processed by the GPS chipset and software, which may include a DSP, by the CPU and the snapshot approach described above, to generate the mirrored input into identical encryption logic engines on each side of the encryption logic circuit. This generates identical ELD's and therefore identical encryption and decryption execution as a background task.

The GPS version is especially apropos for cell phones, as many of them already include GPS circuitry. Text messages and "push to talk" radio communication messages, carried out through cell phones, may be encrypted using the GPS datacast as the input source for the mirrored encryption logic generation process. As in the other satellite embodiments, Plain-Text ELD's and Secondary ELD's both may be generated from the GPS data simultaneously provided to both the cell phones. The data is not necessarily used to identify the position of the phones. It may only be used as the matching random logic input for dynamic encryption. This means that cell phones and tablet PC's may be endowed with a dynamic encryption logic system that also provides authentication through Secondary ELD's and global position data, and the entire data input for the encryption logic session objects arrives via satellite. Again, the man in the middle attack becomes very challenging.

GPS also may be used in non-mobile computers that use the embodiments, as a check against spoofing, when the data is used to confirm position in addition to being a random logic input for the encryption logic. For example, the first Initiator may use this technique as a supplemental authentication step, proving where the computer is located. The global positioning data, used as such, may be taken as an input into the encryption logic engine creating the Secondary ELD, and this provides assurance that each Protector is located in the position that corresponds to the true user instead of an interloper. When each user enrolls on the network he specifies his permitted locations. This works unless the hacker or spoofer occupies the same building as the true user. On the computer whose authentication is being established the real time GPS position input to create the Secondary ELD is provided from the GPS satellite network. On the other side of the circuit, the same value is derived from the Trust DBMS. When there is a match, assurance is provided that the user is authentic, at least to the extent that he is operating his computer or cell phone at a place where he is permitted to be.

To process the bytes of each channel of the XM Radio™ datacast or the GPS data, Initiator in the second and third embodiments uses the Stream Processor Class. In the second embodiment the Stream Processor Class generates only the Secondary ELD's. In the third and fourth embodiments the Stream Processor Class may generate both the Plain-Text ELD's and the Secondary ELD's, and the encryption logic engine is resident on the Protector instead of on any Switch.

In the third Initiator embodiment the Stream Processor Class works as follows. A stream selector chooses channel x and channel y to be the data streams that will generate the mirrored encryption logic session objects. The channel selector is a class, and may receive as its input an object the output of an object from the Seeding Object Class. Each computer loads the Channel Selector Class, which selects the channels that will be used to provide the encryption data, x and y, and the buffer captures them. A person familiar with the art can see that various means to separate and process the channels exist, using software, hardware (including a DSP), or both.

The output of the Channel Selector Class feeds the Stream Processor Class, which is the class that processes the datacasts received from space in order to generate the input to the encryption logic generation. Periodically, the Stream Processor Class creates a snapshot file of the datacast bytes, one for each channel. The snapshot captures the data in the buffer. The Stream Processor Class routes each of the snapshots to an algorithm, and the time tags are inserted. A person skilled in the art may observe that myriad means of processing techniques may be employed for capturing the stream and for the time division. With each stream captured in a string that is divided in to time tagged segments, the two strings may be compared, using the bytes comparison algorithm. The result of this process is a string of matching bytes. The string is used as mirrored random data on each computer, generating the encryption logic that the encryption abstraction layer requires.

The computers or Switches are synchronized by any of the several techniques mentioned above. Perfect timing is not required however, as before, because the streams are processed off line as files. The first computer identifies a string of bytes in the first datacast stream to be employed as a marker, so that the second bytes file may be positioned by reference to that mark.

The comparison process looks for the similarity of the bytes, or of the bits. (Either approach, bytes or bits, works). When bytes are used, the bytes numbers may be compared to see if there is a match between the first stream snapshot and the second stream snapshot. In this approach the values of any two of the bytes under comparison either match exactly, or they don't match at all.

One way to compare the snapshot file derived from channel x to that of channel y is to compare the segments with regression analysis. This approach may be used for bits and for bytes as well. The segments of A, a through j, are compared to the segments of Y, $Y_1$ through $Y_{10}$. Aa is compared to $Y_1$ through $Y_{10}$, and Ab is compared to $Y_1$ through $Y_{10}$, etc., until each segment has been compared to every other segment. The process when bytes are used is a simple binary comparison, because either the byte numbers match or they do not. When bits are used the comparison may use a different approach based on how many ones and zeros in the bits that are compared need to count as a match. Thus, the bits approach is more flexible. With bits the comparison may require bits similarity greater than n for the bits to be deemed a match.

In the examples below, bytes are used instead of bits. The filtration process effectuated by the bytes matching may be made finer or coarser, per need. When bytes are used finer filtration may be achieved by using more than two channels in the matching process. Code to accomplish this may resemble the following:

```
public boolean compareSignals(byte[ ] segment1, byte[ ] segment2)
{
    segmentSize = timeStamp2.getTimeInMillis( ) -
    timeStamp1.getTimeInMillis( );
    for(int i=0; i<signal1.length; i+=segmentSize)
    {
        byte[ ] signal1_segment = getSegment(signal1, i);
        for(int j=0; i<signal2.length; j+=segmentSize)
        {
            byte[ ] signal2_segment = getSegment(signal2, j);
            int matches = compareSegments(signal1_segment,
                                          signal2_segment);
            if(matches>=threshold)
                return true;
        }
    }
}
``` matches, when filtration is made liner, requires expanding the time window from which the matches are obtained. This makes it easier to find overlapping zones of signal to process.

The code that compares the segments may be the following:

```
public int compareSegments(byte[ ] segment1, byte[ ] segment2)
{
    int matches = 0;
    for(int i=0; i<segment1.length; i++)
    {
        if(segment1[i]==segment2[i])
            matches++;
    }
    return matches;
}
```

There may be a different approach to obtaining an output from the bytes matching, as follows. The following code obtains an array that contains the bytes that matched in both segments:

```
public byte[ ] matchBytes(byte[ ] segment1, byte[ ] segment2)
{
    byte[ ] match = new byte[segment1.length];
    for(int i=0; i<segment1.length; i++)
    {
        if(segment1[i]==segment2[i])
            match[i] = segment1[i];
    }
    return match;
}
```

Figure 52:
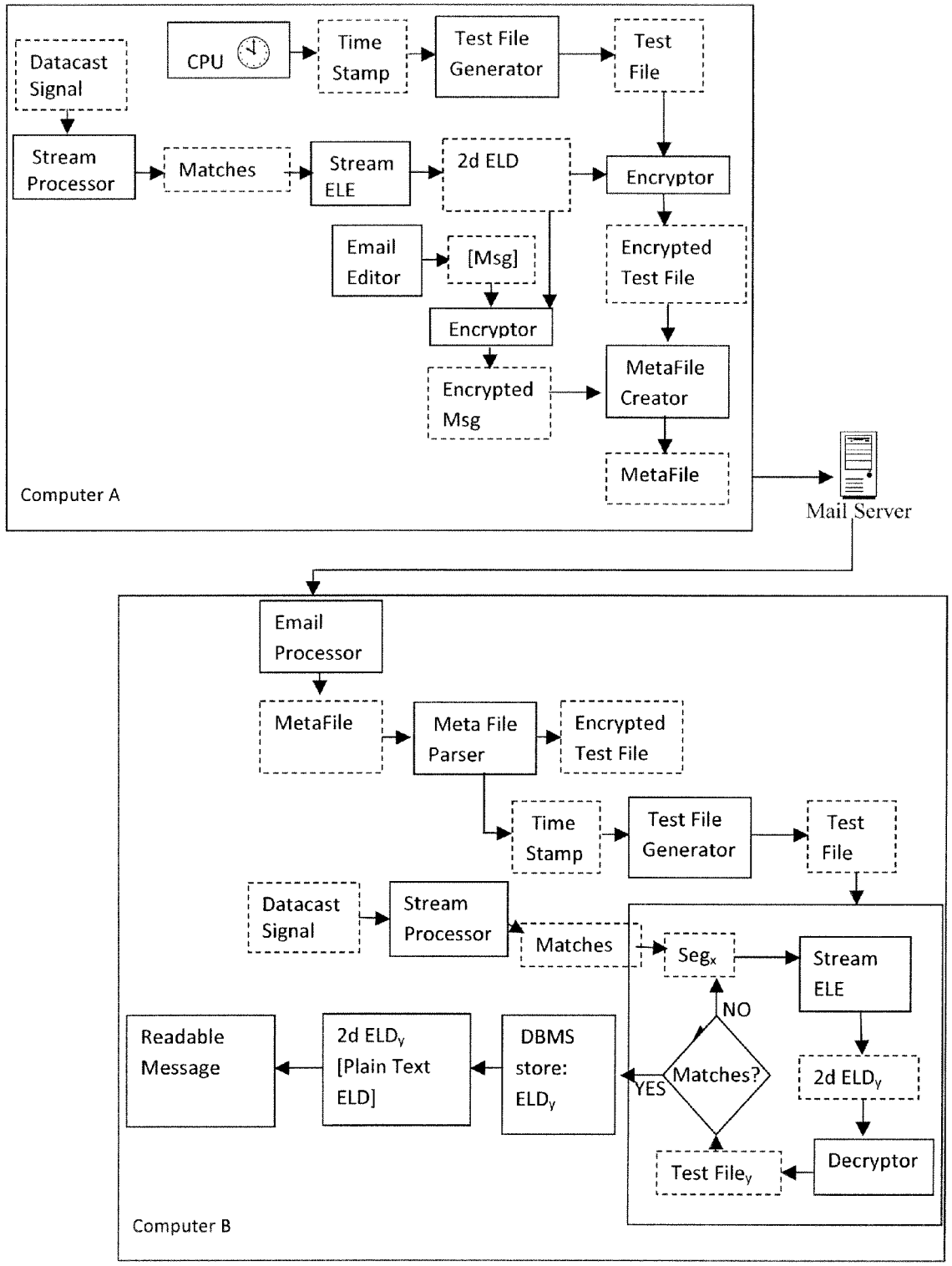
FIG. 52 Detailed Steps showing Timestamps to Generate Mirrored Logic . . .

Each comparison results in a hit or a miss, and the hits are saved in string or a comma delimited file, or an array, so that between each pair of commas the actual matching bytes are expressed. In FIG. 52, the first box is Computer A, the transmitting computer which prepares the encryption meta-file, and the second Box is Computer B, which receives and processes it. Both computers use the Stream Processor Class and Stream ELE (stream encryption logic engine) to generate the mirrored encryption logic that will generate the Secondary ELD. An array of bytes is used as the tests file. Each value between the commas, may be saved to temporary memory and used in any logic generation assignment which that value receives, per the Stream ELE (encryption logic engine) Class. The Stream Processor Class generates the bytes matches: note the dotted line box "matches" appearing both in the box representing the sending computer and the box representing the recipient computer. Then the ELD's are tested indirectly, as each ELD is executed against its test file, and by this means the true Secondary ELD used on A is identified. In this illustration that Secondary ELD is $ELD_y$. The comma delimited file expressing the bytes matches may be expressed as an XML text file, when the proprietary XML based class loader of the embodiments is invoked in the logic prep process. When an array is used as the output of the Stream Processor Class, however, it does not does not have to converted into XML in order to work on the Encryptors of the computers.

Although the particular manner of comparing the data from stream of x and y may vary with embodiments, the goal is the same: to generate a value set entered into the respective encryption logic engines, in a process mirrored on each computer. The output of the logic engine, the ELD, informs the dynamic class loading process for automatic encryption and decryption, per the embodiments.

With this third embodiment of Initiator there are two differences from the first two embodiments. First, the input for the encryption logic generation process comes exclusively from satellite data transmission means. In the second embodiment the Secondary ELD's arrived via satellite, but the Plain-Text ELD's were received at the computer via terrestrial data transmission means, from a Switch at a URL. The second difference is that the encryption logic engine is present on the local computer, so there is no external logic engine. (It is possible to use two logic engines, however, one on each computer and one on an external Switch as well).

In other respects the third Initiator embodiment resembles the first two. As before, the Executor in the third embodiment of Initiator is on the local computer. In every embodiment of Initiator the objective is the same: to establish a private logic tunnel between two trusted computers by providing them with a unique Secondary ELD. A randomly chosen Plain-Text ELD encrypts the plain-text, and the Plain-Text ELD, after being encrypted by the Secondary, is included in the encryption meta-file along with the message payload that the Plain-Text ELD has encrypted, creating an auto-executing packet for decryption by the recipient computer.

The encryption meta-file, as in the other embodiments, is transmitted via email, chat, or text messaging. The third embodiment of Initiator the Protector-Receiver network works just as before, with the improvement that none of the data whatsoever for generating the encryption logic is transmitted via terrestrial means and is thus immune to the usual hacking methods. Because the third Initiator embodiment uses exclusively satellite based data transmission means for the encryption logic generation input, through a stream that arrives and vanishes in an instant, it is a highly secure way to provide a LAN with encryption that auto encrypts the messages when sent and auto decrypts them upon receipt, and with automatic authentication. This is a useful architecture for the Encryption Abstraction Layer because not only does the raw material for the logic exist in an endless supply that is provided free, but moreover, it is supplied in a vanishing stream.

In the third and fourth Initiator embodiments, just as in the second, the timestamp function of a typical email or chat message may be harnessed as a trigger for the logic generation processes, either through the Seeding Object Class, or with this intermediate step is eliminated and the timestamp used as a direct input into an algorithm. Additionally, the time specified may be useful in making the logic process execute faster on the computers, by helping the recipient side of the circuit zero in on the actual part of the datacast stream that the other side has used to generate the Secondary ELD. The timestamp corresponding to the first message transmission, or the first reply or both, may be invoked in loading the Seeding Object Class on each side of the circuit. The timestamp also may take the form of an array that specifies the time of micro events occurring on the computer during the encryption process, to yield fine grained control over the processes.

Because data stream x and data stream y are each captured in a snapshot that is processed as a string of data segments divided by time tags inserted by the Satellite Switches when the create the snapshot files, the timestamp in the message of the sending computer may be used as a scheduler, in order to estimate the appropriate zone the snapshots on the receiving computer for testing for matching bytes. The scheduler does not operate in real time, but in virtual time. It does this by processing the timestamp of the sending computer and the time tags in the snapshot file to identify the portion of the segments of x and y on the recipient side of the logic circuit are to be subject to the bytes matching process that is most likely to yield the particular bytes matches that produced the actual Secondary ELD that A used on the Plain-Text ELD before A transmitted the meta-file.

The user of computer A clicks on "Send," transmitting the email, and the moment of the click is logged. That moment is represented in a value which is the input into the Seeding Object Class on A. With that input the chain of class loadings that generates the bytes matches and ultimately the Secondary ELD takes place on A's side of the logic circuit.

The duration of time between the creation of the Secondary ELD by the Stream ELE and the click on "Send" also is recorded and put into the meta-file, and both values may be part of a timestamp array. That array is saved on A, and transmitted to B in the encryption meta-file. The "Click on Send Moment" time value is then entered into B's Seeding Object Class, just as it was on A. The Seeding Object becomes the input into the Time Object Class, and the output of the Time Object Class, the Time Object, is the input into the Stream Processor Class. Then, the output of the Stream Processor Class is used as the input to the next step, the Stream ELE Class. This yields the Secondary ELD that is saved in the Trust DBMS of each computer. (Alternatively, the functionality of the Time Object Class may be subsumed by the Stream Processor Class).

The time lag between the click and the completion of the logic design time process to generate the Secondary ELD may vary from computer to computer, or from Switch to Switch, but all of the lag times for the different computers and their Switches will fall into a range. The range may be correlated to a profile of the computer, based on its compute power. Processing the lag time data through a scheduling algorithm allows the lag time between the selection of the datacast segment, and A's transmission of the encryption meta-file to B, to be compacted. Compacting the time frame allows a narrower portion of the snapshot file to be used in the trial and error Secondary ELD identification process. (The checksum process will compare the decrypted test file to the unencrypted test file, using the series of ELD's that each bytes match generates). Also, accelerating the time before the segment is selected narrows the window during which the segment theoretically is subject to hacking, by allowing the actual segment that was used vanish sooner than it otherwise might. This virtual "acceleration" comes about by making the snapshot file is smaller, so it holds the data derived from a smaller interval of time.

This concern about the timing is due to the fact that it is helpful to the recipient computer, or its Satellite Switch, to be able to correlate the lag with a zone in the moving map, the snapshots of x and y, in order to zero in on the approximate segment of the two streams upon which the sending computer performed the bytes matching process. There may be a "snipper" function in the Stream ELE Class, operating on B that snips the portion of the time tagged segments from the x snapshot and the y snapshot which is estimated to be the portion most likely containing the matching bytes from the satellite radio transmission channels that generated the ELD on A. The snippet size and location is determined by an algorithmic estimation of the place in the snapshot files that the Stream Processor Class has used to derive the bytes matches resulting in the array that, on each computer, is the output from the loading of the Stream Processor Class. That output loads the Stream ELE class. The classes in this sequence of processes depending on the matching bytes form a chain of execution. The test file checksums are executed in series. When the matching test file pair is identified, the Secondary ELD that cause it is stored in the Trust DBMS of each computer, and with that the private logic tunnel is complete.

As in the second Initiator embodiment, each set of matching bytes in the identified segment, when fed into the engine, may create an ELD that is tested against a test file common to both computers, and only the actual Secondary ELD used satisfies the checksum. In the second Initiator embodiment, the ELD's received from the datacast are used in the serial checksum tests. In the third embodiment, the bytes matches are tested, but indirectly. Each match generates its own ELD through the action of the Stream ELE Class, and when the test file decrypts the actual Secondary ELD used this is identified by the checksum because the sense file matches the reference file. By this means B identifies that particular ELD as the one that A has employed as the Secondary. And also as in the second Initiator embodiment, an output from an instance of the Seeding Object Class may generate an identical copy of the test file, the reference file used in the checksum, on each side of the circuit.

The time relationship between the click on "Send" and the time tags in the segments of the snapshot file on the transmitting computer's side of the circuit may be recorded by A. When A clicks on "Send" the sending does not happen at that moment, but only after the encryption process in all its steps is complete, including the generation, storage, and use of the Secondary ELD. The user does not realizes this because everything happens in the background. Recording the interval between the "Send Click Moment" and the last step of the encryption process, the encryption of the Plain-Text ELD by the Secondary ELD, is the final step in preparing the encryption meta-file for transmission to B.

This piece of recorded data means that the Stream Processor Class on computer B can use the time relationship between the moment A clicked on "Send" and the time tags in the portion of the two snapshots, that of x and of y, to identify, in the snapshot files, the portion of the streams of x and y that A used to generate the matches. A has calculated this time difference, the time lag, and sent it to B in the encryption meta-file. B uses the recorded interval, the lag, as a scheduling value in processing the snapshots. B's Stream Processor Class uses this information as a focusing mechanism to identify the most promising portion of the snapshot files on the x and y stream of Computer B for conducting the trial and error process, in order to find the particular group of matching bytes in x and y that A used to generate the Secondary ELD. Then, the trial by error process finishes the routine by generating the ELD resulting from each match, and using its checksum capability, identifies and saves the actual Secondary ELD that A used. With that accomplished, A and B have their common Secondary ELD, which is auto installed in the Trust DBMS of each.

B parses the timestamp array from the encryption meta-file, and will use it to focus on the most promising zone of the x and y snapshots likely to yield the Secondary ELD. The timestamp array provides a fuzzy logic, so that B locates the same general range of the snapshot files of channels x and y to be processed on B's side of the circuit, to find the actual match of bytes form the Stream Processor Class that created the Secondary ELD that A used to encrypt the Plain-Text ELD included in the encryption meta-file that B has received. As in the case of the second Initiator embodiment, this approach simplifies the process of identifying the true Secondary ELD. The test file technique using checksum allows an entire portion of the snapshot files to be compared through the serial tests, presenting the advantage that there is no requirement that any exact time instants, per the Time Object Descriptors of A and B, perfectly match: all that is required are overlapping zones with the actual ELD appearing somewhere in the overlap.

The zone is identified on B by using the timestamp array, and the trial and error approach previously described is used to generate the actual Secondary ELD. The difference between the Second Initiator embodiment and the third is that in the former "literal" ELD's are contained in the datacast, but in the latter the bytes matches generated from the datacast channels generate the ELD's in situ. Note that A has not transmitted via terrestrial means any descriptor to index the particular matches that the Stream Processor Class has generated to create the Secondary ELD, and this fact makes the system more secure. As in the second Initiator embodiment, the test files are subjected checksum in a process of trial and error, and the true Secondary ELD is revealed. This is a "go, no go" test that identifies the Secondary ELD generated on A, which again we will call ELD K.

When A clicks on "Send," the timestamp is generated, and it is saved on A for downstream processing. The timestamp will be used for multiple purposes. The timestamp may be an array, and part of the array may be a time value capturing the moment when the user clicked on "Send." This time value may operate as an input into the Seeding Object Class, the output of which loads the Time Descriptor Object class on A. As a result, A's satellite Switch generates A's Secondary ELD from the buffered streams x and y, the bytes of which are matched. The "Send Click Moment" is saved as part of the time stamp array so that B can use that moment as the time value that lets it zero in on the zone of snapshots x and y upon which the bytes matching will be conducted. But B also uses the "Send Click Moment" in the timestamp, just as A did, to load the Seeding Object Class and generate the Secondary ELD in the first instance.

All of the steps on A will now be explained in greater detail. A uses another ELD to encrypt the time stamp, and A inserts that encrypted time stamp into a name-value pair of the encryption meta-file. A, having saved the time stamp in a temp file, uses it as the input into the Seeding Object Class, the output of that class is fed into the Test File Generator Class, and the output is the test file. A then uses the as-generated Secondary ELD to encrypt the as-generated test file, and A inserts that encrypted test file into the encryption meta-file.

The time stamp value does not indicate when the encryption meta-file actually was sent by A, but instead, only the moment when he clicked on "Send." That "Send Click Moment" is in the past as to all of the encryption logic generation processes occurring on A. Therefore, the actual sending of the encryption meta-file on A is not executed before all of these steps, which happen as a background task, have occurred. But the user is unaware of this, not knowing that clicking on "Send" triggers all of the processes relating to the satellite based encryption. As opposed to the "Click Send Moment" moment, the "Real Send Moment" moment is the moment when the encryption processing has occurred and this is the last step before the encryption meta-file leaves A's computer for B. The Real Send Moment also is captured in the time stamp array, and the elapsed time may be measured and also included in the time stamp array.

B receives the encryption meta-file, which contains the plain-text, and the plain-text has been encrypted by a Plain-Text ELD. The Plain-Text ELD has been encrypted by the Secondary ELD that A just generated by using the "click moment" in the timestamp array to load A's Seeding Object Class, and by the subsequent steps. B, in receipt of the encryption meta-file, parses the name-value pair containing the encrypted time stamp array, which has been encrypted by a Plain-Text ELD, and B decrypts the timestamp array.

The decrypted timestamp array will be invoked on B, just as it was on A, to load the Seeding Object Class. The outputs of that class, in its various instances, supply the inputs to the various classes comprising the dynamic encryption logic generation processes on B. The end point of these steps is the Secondary ELD being generated on B in the identical process that just occurred on A. B uses that Secondary ELD to decrypt the Plain-Text ELD, and B decrypts A's message.

Therefore, it can be seen that from the very inception the system is secure because on A, the sending computer, the message payload was encrypted by the Plain-Text ELD, and that ELD was encrypted by the as-generated Secondary ELD, with these steps occurring with a complete absence of transmitting via terrestrial means any encryption logic descriptor. Instead of using a any descriptor that actually specifies a logic process, the timestamps are used parasitically as a seeding value on each side of the logic circuit, invoking the Seeding Object Class.

One of the processes triggered on A by the timestamp array, via an output from A's Seeding Object Class, may be the generation of the random test file that is used on each side of the logic circuit in the checksum trial and error testing process. (In the simplest approach, a standard version of the test file may be supplied to all of the Protectors, but the more secure approach is to generate it randomly on each side of the circuit during each act of communication, so that it varies from session to session). An instance of the Seeding Object Class generates an output, an object, which loads the Test File Generator Class. Another instance of the Seeding Object Class generates another object used as the input into the Stream Processing Class, with the latter class selecting the particular bytes matches that are used as the input to the Stream Encryption Logic Engine. B's Stream Processor Class uses the "Send Click Moment" value in the timestamp and the "Real Send Moment" moment to calculate the time lag on A, and this value is of assistance to B so that B's Stream Processor Class can focus on the portion of the x and y streams that most likely will generate the actual bytes match that resulted in A's Secondary ELD being generated on B's logic engine. The Satellite Switches insert time tags in the snapshot files corresponding to stream and stream y, and this allows the Switch of the recipient computer to zero on in the correct zone of the snapshots to perform the bytes matching.

A may identify a bytes segment to be used as a mark to index the bytes matching process, and again using the test file process, introduce that match into an encryptor to encrypt a test file. By multiple encryption instances and checksums B may identify the bytes operating as the mark. The common mark allows the bytes matching to proceed in a mirrored way on both files. This approach may be used instead of time tags, or in addition to them.

The end result of all this is that A and B obtain the same Secondary ELD and record it in their Trust DBMs. This approach works on both the third Initiator embodiment, using the matching streams of satellite radio data, and on the fourth Initiator embodiment using GPS, which soon will be explained.

An alternative to the snapshot approach is to use the timestamp and the resulting seeding object to identify a datacast on a satellite channel that is to arrive in the future. In this case a DSP on A and on B can process the datacast streams, stream x and stream y, in real time. This is more secure than using the snapshot approach because there is no need to store the snapshot to temporary memory. The disadvantage to this approach is that it is less forgiving of any imprecision in timing.

But in the embodiment using buffering and snapshot files, with the timestamp array parsed, B has the elapsed time value representing the interval of time between the time tags in the snapshot files of stream x and stream y used in the bytes match, and the moment when A clicked "Send." In this embodiment, because there is no need to transmit a Time Object Descriptor from A to B, the functionality of the Time Object Descriptor Class pertaining to the identification of the time segment used to create the ELD's is merged into the Stream Processor Class. The object resulting when the Seeding Object Class is loaded may be used directly as an argument to load the Stream Processor Class, so that the segments of channels x and y are snipped and subjected to bytes the matching, and the first stream is marked for the purpose of positioning it in relation to the other stream. This approach provides functionality equivalent to the Time Object Descriptor Class without requiring the latter class to exist separately. The Time Object Descriptor functionality is simply another Stream Processor Class step when this approach is used.

With the elapsed time information available to B, B's Stream Processor Class looks back in time in the snapshot files corresponding to datacast streams x and y to find the relevant zone in the snapshot file that time tags that correspond to, the time when the bytes matches in the snapshots were discovered on A. A hash table associates the time tags and the information that B has extracted from the timestamp array. Using the hash table, the Stream Processor Class "zeroes in" on the sequence of time tag segments in the snapshot files of x and y that, when processed, will likely yield the bytes matches on B that correspond to the same input into the Stream ELE Class on A used to generate the actual ELD that A used as the Secondary ELD, finding the approximate zone of the streams that will be compared in the bytes matching process. The serial checksum tests operating on B's encrypted test file will yield the answer.

The Stream Processor Class on B finds the matching bytes, and enters each match into the Stream Encryption Logic Engine to generate the ELD's. Each ELD is loaded to decrypt the test file, and the checksum identifies the ELD which was actually used on A as the Secondary ELD. The output array from the Stream Processor Class, expressing the bytes matches generated on A, will be the same on B, as they have the Stream Processor in common. In light of this, each side produces and saves to its Trust DBMS the same Secondary ELD.

Therefore, B may use the decrypted timestamp array not only as a random input to load the Seeding Object Class. It also uses the timestamp array as a time value per se in the scheduling that must be performed on the snapshot files. The timestamp array is an argument in B's Stream Processor Class, to determine the elapsed time that B will use to measure define the zone in the snapshots to be processed by looking back at the satellite data streams x and y, which when entered into the Stream Processor Class will yield the bytes matches Switch B requires to generate the Secondary ELD. The objective is that, given that the Stream Processor Class and its input are the same on A and B, the output also will be the same: an mirrored input series into the Stream Encryption Logic Engine, resulting in the creation a chain of ELD's which, when subjected to the serial checksum tests, will identify the actual Secondary ELD that A used and saved in A's Trust DBMS. This allows that Secondary ELD to operate on both sides of the circuit from that point forward.

The test file is generated using the same approach, using the timestamp array as the Seeding Object Class input. A and B have used the time stamp array (B has decrypted his copy, parsed from the meta-file) to generate the instance of the Seeding Object Class corresponding to the Test File Generation Class on both sides of the mirrored circuit, so that A and B generate an identical test file. The output of this instance of the Seeding Object Class is the object that loads the Test File Generator Class, and the latter class creates the test file on each computer by processing the object as an argument, to select the test file from an endless loop of random bytes. The tests file results as the result of selecting a particular endless loop bytes segment. That segment is what is selected as the test file to perform the serial checksum process on B, through the Stream Processor Class. The Test File Generator Class may be part of the computer, or part of the Satellite Switch that is associated with each computer.

A has taken the copy of the test file which A just generated using the timestamp array as the input, and has encrypted it, using the Secondary ELD that A created by instantiating the Stream Processor Class and the Stream ELE class. A has used the snapshot files of x and y to generate that Secondary ELD. A has placed that encrypted test file in its name-value pair in the encryption meta-file. But the Secondary ELD is not included in the test file, as that would violate the security goal of generating it instead of transmitting it.

So A has used the time-stamp-derived array that he created by clicking on "Send" for multiple purposes. In addition to generating the test file that is encrypted by the Secondary ELD, A has transmitted that timestamp array to B as a value that is useful in its own right, to measure recorded elapsed time. A has encrypted that time stamp array with a Plain-Text ELD and placed that array in its name-value pair of the meta-file, so that security is enhanced when it is transmitted to B. A has used that array as the input into his copy of the Seeding Object Class, and through the operation of the downstream classes has created the Secondary ELD. Therefore, through all of the above computer A has reached its two goals: (1) the creation and first use of the Secondary ELD, now stored in A's Trust DBMS, and (2) the generation and transmission of the timestamp array so that B can use it, as A has used it, to load the Seeding Object Class, thereby loading the other classes that generate the encryption logic on B's side of the circuit.

FIG. 52. is an overview of the steps that occur. B receives the encryption meta-file, decrypts the timestamp array, and (1) loads the Seeding Object Class, uses that output to load the Test File Generator Class, thereby generating the same test file that A used; (2) uses the test file and another instance of the Seeding Object Class, again using the timestamp array as an argument, to load the Stream Processor Class; (3) uses the resulting bytes matches to load the Stream Encryption Logic Engine Class; as a result generates the Secondary ELD and saves it in B's Trust DBMS; and (4) uses that Secondary ELD to decrypt the Plain-Text ELD that encrypted the message payload; (5) decrypts the message payload, and reads it.

There are a variety of satellite transmission data types that may be used to satisfy the mirrored logic input process that generates the encryption logic on A and B. GPS is a good input to the encryption logic generation process. GPS has three advantages over XM Radio™ or the other satellite data services that are entertainment oriented, such as HD television. First, GPS has world wide coverage. This means that within limits any two persons on the earth can receive a common data stream, the identical GPS datacast, and process it to dynamically generate mirrored encryption logic. (When coverage is blocked there is a workaround in the embodiments described below, which virtualizes GPS reception all over the world). Second, GPS is in the public domain, at least to the extent that there is no cost barrier to receiving the signal. There is no membership fee or proprietary restriction on the right to use the GPS datacast. Third, the GPS receiver chipsets are readily available. They are low power, ubiquitous, and inexpensive.

Many smart phones include GPS reception capability and many automobiles are also GPS capable, so the embodiments may provide encryption in both of these environments without additional hardware. The smart phone is a small, portable device that uses little power, so the user can always have it ready. Text messaging, chat, and interactive voice response (the mode of operation in the "push to talk" radio phones) are candidates for GPS based dynamic encryption. Full duplex communication also may employ the method, but this requires more computing resources and in this embodiment a DSP should be used instead of a CPU.

The GPS satellite system uses multiple non-geosynchronous satellites, and employs trilateration to determine global position. It uses the travel time of radio signals containing the data, which emanate from twenty four satellites, plus three backups. The earth receiver processes the multiple signals, using time and distance calculations to derive the global position of the receiver, expressing it as latitude and longitude. The GPS system uses radio signals that enable time calculations, and from these signals distance values for each satellite signal being received are derived. The timing measurements result from pseudo-random digital code that the satellites transmit via radio waves. The multiple known distance values are used to calculate position.

The GPS satellites transmit signals on two carrier frequencies. The L1 carrier is 1575.42 MHz and carries both the status message and a pseudo-random code for timing. The L2 carrier is 1227.60 MHz and is used for the more precise military pseudo-random code. For the purposes of the embodiments, the only important fact is that all of the persons in range of a given satellite receive the same pseudo-random code from it. This means that two computers receiving the GPS signal from the same satellites may share a constant common digital data stream, which can be captured and used as an input into the mirrored encryption logic generation process.

Described above is the method of using the information in the GPS satellite broadcasts in the intended way, to determine location. What is described now, however, is something completely different: a fourth embodiment of initiator that uses the GPS signal parasitically, for a purpose having nothing to do with navigation. This fourth Initiator embodiment is a means of processing a satellite datacast for other than its intended purpose: as a randomness input to mirrored encryption logic engines, the output of which is a Secondary ELD. As in the other examples, one or more Secondary ELD's encrypt the Plain-Text ELD that encrypts the message payload, and the dynamic class loading process is used to execute each level of encryption in an orthogonal system. This approach provides a spectrum of encryption logic layers, as in the first three Initiator embodiments, but this is achieved without resort to any terrestrial encryption data transmission means whatsoever, for greater security. All of the encryption logic data emanates from the GPS satellite network.

The GPS receiver processes multiple satellite data streams, using at least three channels, but in a version allowing greater accuracy, four. The satellites use atomic clocks to allow time calculations accurate to less than a thousandth of a second. Three channels calculate a point in three dimensional space, and the fourth channel provides a correction factor.

A GPS receiver chipset allows the data received to be processed, but the processing need not be limited to position calculation. A person knowledgeable in the art would recognize that the sophistication of the timing means provided by GPS may be used in other digital processes that are time sensitive, processes other than determining global position. As will be demonstrated, the superb timing capabilities of GPS may be utilized to allow two computers, after synchronization, to identify the same portion of a GPS data stream, allowing the mutually identified stream segment to be used as an input into the encryption logic generation process of the embodiments.

As in the third embodiment, the XM radio embodiment of Initiator, the fourth embodiment using GPS also allows a channel selector to be used to determine randomly which GPS satellite provides the datacast that will generate the mirrored logic input. The approach of the third embodiment may repeated in the fourth, in the sense that the signal of one GPS satellite may be compared to a second GPS satellite for the purpose of bytes matching, just as a first XM radio data broadcast channel may be compared to a second channel.

As before, when the CPU is used to compare the GPS satellite streams for a match, the Protector may take a snapshot of the streams and save the snapshots so the satellite signal can be compared not in real time, but offline, as files. The bits or bytes may be run through a matching algorithm, as in the third embodiment, using the Stream Processor Class. The class inserts time tags in the as-saved snapshot file corresponding to the feed from each satellite. The tags are used, as in the third Initiator embodiment, to associate an elapsed time value, originating in the Protector, between the moment when the user clicks on "Send" and the time tags in the snapshots that correspond to the point where the bytes matches are generated.

In all of the embodiments using time tags it is important to keep in mind that the tags themselves are not values used in the dynamic encryption logic input process. They are merely dividers. The purpose of the dividers is to allow the computers to find the pertinent portions of the snapshot files. For this reason, there is no requirement that the dividers appear in the same place in the data stream on each computer. The Seeding Class Object may serve as the input into a class that searches for and identifies a matching bytes pattern between two datacast streams, performing this on each computer or Switch. The matching bytes pattern may serve as an index mark for the insertion of the time tags. However, because zones and the test file are used, there is no strict requirement that the tags appear in the same place in the snapshot files on the two sides of the encryption logic circuit.

The Stream Processor Class may be modified to be used in real time if a DSP is provided, instead of using snapshot files. Loading the Stream Processor Class in real time may involve programming the computers to perform the bytes matching on the stream on a time that is in the future as to the moment when Computer B is expected to receive the encryption meta-file. This gives B, after receiving the encryption meta-file, a future time window to extract the matching bytes from the GPS data feeds. The time window is in the future as to both computers, so that neither one is late. The pros and cons of the two approaches—real time processing versus file based processing—have been explained above.

In the fourth Initiator embodiment, just as in the third, the objective is to generate bytes matches identically on each computer, and then, use the series of matches as a mirrored input into the encryption logic engine on each computer. This results in mirrored encryption logic on each side of the logic circuit, so that the messages are auto encrypted when sent and auto decrypted when received, just as in the other Initiator embodiments.

One method to do this is to select one of the GPS transmissions, capture it as a digital data stream, and compare it to a Fictitious digital data stream in order to generate the bytes matches that the Stream Processing Class requires as its input. (Because the only purpose of processing the streams is encryption, since no position calculations are made, it is of no import that one of the streams is fictitious rather than real). Each Protector or its associated Switch generates the fictitious stream. The fictitious stream may be common to all the computers as it is installed into the Protector when it is generated; or it may be the output of an algorithm that is generated by values common to the two computers who are to engage in the encrypted session, by using the output of the Seeding Object Class. For example, the timestamp may be an argument instantiating the Seeding Object Class, and that output may provide the common input on the computers that generates the fictitious data stream.

A voice print may provide an additional input into the Seeding Object Class of each computer, and the call of one user is patched through to the other user, so that each can input the voice print for authentication. An interactive voice response routine executing on the cell phones, which is a voice application, is downloaded by the enrolled users, and they use it as part of Initiator, in keeping with the "contextual" strategy of using the mutual personal knowledge of the trusted parties as part of the trust grant process. Because the parties recognize each others voice, it is safe for them to mutually release to on another, using the call that connects them, their voice print files. The voice prints are encrypted and mutually exchanged.

The voice prints, the output of the applications, become reciprocal inputs into the Seeding Object Class, and the inputs may reach the Protectors via Bluetooth. In one version, the reciprocal voice prints operate as a double sense-reference circuit, and the first speaker records his own voice print and saves it, and provides a verbal sample to the second speaker. The second speaker does the same, so that reciprocal sense-reference comparisons are executed, resulting into a combined logic input that becomes part of Initiator, or otherwise operates as an input into an encryption logic layer. Each live sample is compared to each recorded sample in an exchange. When the comparison is true the logic circuit closes, and with that the values reciprocally generate an input into the Seeding Object Class.

Using Bluetooth to enter into Initiator the output that is the result of the voice print exchange is consistent with the strategy of supplying the logic elements without using terrestrial data transmission means. Voice prints captured in this manner also may be used by themselves to create a simple layer of meta-logic, without combining with any encryption logic data originating on a Satellite or transmitted across a VPN by terrestrial means. The satellite embodiments in this manner may use voice print authentication to make Initiator more orthogonal, so that the Secondary ELD is an encryption logic value of very high confidence. However, it is more time consuming to force the users to place calls and provide voice prints, so the architect of the system might decide against adding this logic layer for convenience reasons.

The fictitious stream in one version is an endless loop, and in each act of communication an instance of the loop is created. The fictitious stream may be created by loading the Fictitious Stream Class, and this process resembles the Test File Generator Class.

As an alternative, the generation of the Fictitious stream also may be made part of the functionality of the Stream Processor Class. The loop has a starting mark. The Stream Processor Class may instantiate the loop simply by moving its mark in relation to the other snapshot used in the bytes comparison, the snapshot arriving from space. The mark is used for positioning purposes, to fix its position in relation to the real satellite datacast stream, so that segment by segment the two streams may be compared. The fictitious stream and the real stream are compared as files, as snapshots. The result of the comparison changes each time the position of the starting mark changes.

The endless loop may be saved as a fictitious snapshot file that is positioned in relation to the other snapshot file, the one originating on the satellite, through the Stream Processor Class. Because the endless loop is identical on each computer or Switch it is a good mechanism for synchronization. It can contain time tags which all of the computers can coherently process.

The Stream Processor Class finds the mark in the instance of the Endless Loop that it generates, and using the mark, shifts the fictitious stream loop forward or backward in respect of elapsed time, as recorded in the snapshot file taken from the real data stream, the actual stream from the satellite. This allows the relationship of the endless loop to the data stream recorded from space to vary from session to session, and for instances to be created by the Seeding Object Class. (When snapshot files are used this process does not involve real time, but the virtual time, which to say the as-recorded time expressed in the snapshots from the real, satellite stream, and the fictitious, endless loop stream).

By this means, the previously described trial and error process used on Computer B in the XM radio embodiment to generate the Secondary ELD also may be used with GPS data transmission. Instead of comparing one satellite radio channel to another as in the satellite radio embodiment, in this embodiment a single GPS channel is compared to a fictitious channel, using the snapshot file of the real file and a snapshot file from the endless loop fictitious file, and then performing on the snapshots the same bytes matching technique as in the XM radio embodiment. But as in the XM Radio™ example, one GPS stream and another GPS stream may be compared directly to one another, without resort to a fictitious stream or the endless loop approach.

Shifting the endless loop snapshot in relation to the snapshot from the satellite datacast allows the Stream Processor Class to randomize the bytes matching process for each instance of the comparison of the real satellite stream to the fictitious stream. A and B have the same algorithm in the Stream Processor Class to generate the endless loop and position it, and they receive the same datacast from one of the GPS satellites. Bytes to be used as an indexing mark in the satellite data cast may be identified by a class executing on both computers the input to which is the Seeding Object Class. Furthermore, A and B have the same Stream Processor Class, and each Stream Processor Class generates the same output of matching bytes when fed the same input. Using these mirrored resources—and supplying any commonly available initial value entered on both A and B, such as the output of the Seeding Object Class—triggers the encryption logic generation process in identical fashion on A and B, thereby harnessing the satellite datacast arriving at both computers as the reciprocal randomness input for the encryption logic session object.

On both computers the bytes matching process operating on the GPS data occurs by instantiation of the Stream Processor Class. Instantiation occurs in mirrored fashion on each computer, because of the mirrored input. The Seeding Object Class generates the mirrored initial input into the logic generation process, and the output of that class may result from any group of values which A and B share, such as the timestamp on the sending of the message or the reply, or characters derived from the name of the sender and the recipient.

The Seeding Object Class is agnostic as to which of the common data elements on the computers are selected to generate the object when that class is loaded. The values that happen to be common elements on A and B which the class may use are not confined to time related values or the timestamp array. For example, characters harvested from the identities of the sending and receiving Protectors, such as their registered email addresses, may be embraced by the Seeding Object Class. The Seeding Object Class generates a "general purpose" object serving as the input to any of the processes on the Protector, any time an input is needed to trigger the downstream actions that execute in mirrored fashion on A and B. Among such actions are those of the Stream Processor Class. The Stream Processor Class, accepting a mirrored object from the Seeding Object class on each computer, extracts the snapshot files from the GPS data streams and executes the bytes comparison on them. As a result the mirrored encryption logic is generated.

For compatibility in processing, the satellite snapshot file and the endless loop snapshot file are given the same segment size and the same method of time tagging. The snapshot file has time tags that correspond to the recorded true time marked on the "moving map" upon an interval, and these tags are inserted based on the moment that the snapshot file captured the flowing GPS datacast on A, based on an index mark generated as explained above. The endless loop snapshot file has pseudo time tags corresponding in their format to the tags in the satellite snapshot file. These are virtual tags in that they represent a fictitious segment of time. Elapsed time is used to define where the tags are inserted into the real satellite snapshot file, and the endless loop time tags mimic this process. The segment size and tagging methodology is common to both the satellite snapshot file and the fictitious snapshot file from the endless loop, and this compatibility allows the Stream Processor Class on each side of the encryption logic circuit to match the bytes of one stream to the other, per the loading of the Stream Processor Class.

In a chat system for smart phones having GPS capability, dynamic encryption logic generated on each phone to execute as a mirrored encryptor pair enables a compatible encryption logic session object that auto encrypts each message upon transmission and auto decrypts it upon receipt. A common object from the Seeding Object Class, generated on both phones, may provide the input that triggers the mirrored logic generation process. The input may be the timestamp array or other data the phones mutually posses. The common, mirrored object on each smart phone may be an output array that results when the Seeding Object Class is loaded.

When a time stamp is used as an input to the Seeding Object Class on each phone or computer, it may be transmitted as follows. A sends a message to B, and when A clicks on "Send," or when the phone number is executed, as in the other Initiator embodiments the encryption logic generation process begins. In the case of email, when A clicks on "Send," that moment is captured in the timestamp array. The timestamp array is encrypted by a Plain-Text ELD and saved in a name value pair of the meta-file. A then uses a second Plain-Text ELD to encrypt the message payload, and this information also is inserted into the meta-file. A transmits the meta-file to B. B receives the meta-file, and B's Encryptor loads the Encryptor Class twice, once to decrypt the time stamp and once for the message payload. The ELD used for each is executed separately.

An important point when the embodiment described below, using reciprocal time stamps on the two computers, is used for encrypting the first call or message, is that no Secondary ELD is used in the encryption until the second message has been transmitted by the recipient of the first message. Up to this point all that has happened is the precursor process that will let the Secondary ELD be used on the next transmission and response between A and B. So the first message and the first reply are encrypted by a Plain-Text ELD, which is inserted into the meta-file in native form.

The Protector of B parses the two ELD's and decrypts the message payload and the time stamp. Now B will respond to A's message. B, using the text composition window of his Protector, writes a reply message to A. The time stamp functionality just described that occurred on A is repeated on B. A receives B's reply, and in it B supplies, in reciprocal fashion, a time stamp to A. At this juncture both A and B both have the time stamp of each other's message, and each stamp may be a string of bytes representing the year, month, date, hours, minute, and second of the respective message transmissions. Both strings are combined into an array, the first time stamp followed by the second time stamp.

This combined string is one of the possible inputs to the Seeding Object Class, which can operate reciprocally on each computer now that each computer has both timestamps. An algorithm may include other data in the input to the Seeding Object Class. Such data may include random bytes on each computer included in the meta-file and encrypted by an ELD, or letters from the string representing the name of the sender or the recipient, or both.

This version, in which the completion of the Secondary ELD creation process is deferred until after the Response of B to A, represents a tradeoff, and differs from the prior version. In the prior version the timestamp array is generated after user A clicks "Send" and the complete encryption logic process is executed on A, including the generation and execution of the Secondary ELD. In the present version, in contrast, A must wait for B's reply before the Secondary ELD is generated. Additional security is provided because there is a combined time stamp involving a data input from both computers. This is a step of "pre-authentication," because in the call each speaker recognizes the voice of the other, or otherwise identities the other interlocutor by contextual means. So the second version for generating the ELD's is more secure than the first version, but this security comes at a price: the initial message from A to B travels without the benefit of any Secondary ELD, as does B's initial reply to A. But as in the other example, once the Secondary ELD is generated it is saved to the Trust DBMS of both computers and used thereafter.

In the second version just described, in which A and B engage in chat using their smart phones, on each computer the combined timestamp array may be entered into the mirrored instance of the Seeding Object Class. The various instances of that class provide a random "seeding" input into the class loading for the downstream classes that provide the various functions in the dynamic encryption process, including the processing of the satellite data and the generation of the Secondary ELD. The final step is executing the Plain-Text ELD so that the plain-text is encrypted.

The first instance of the Seeding Object Class it provides the input loading the Test File Generator Class, which generates the test file used on each side of the mirrored circuit used to identify the true Secondary ELD. In the fourth embodiment of Initiator, as in the second and third embodiments, trial and error is used: the common test file will be serially decrypted by the chain of ELD's which the Stream Processor Class generates through the bytes matches resulting from comparing the satellite snapshot file and the endless loop snapshot file. In the third embodiment of Initiator two satellite music channels are used in the bytes matching, and each is saved as a snapshot file that changes repeatedly upon an interval. Both channels in the third Initiator embodiment are a moving map of data, which the snapshot freezes and saves as a file. In the fourth embodiment of Initiator, using a GPS data channel, the GPS data snapshot is an input into the into the Stream Processor Class, just as in the third Initiator embodiment, but the other input is the fictitious snapshot. The Stream Processor Class generates the endless loop snapshot file on each side of the mirrored logic circuit, on both A and B, which will be compared to the snapshot of the GPS data channel. The matching bytes output from the Stream Processor Class is the input into the Stream Encryption Logic Engine.

Therefore, as one can see, to generate the matching bytes, either GPS data or satellite music data may be used as common random noise input into the mirrored encryption logic generation process on A and B, and fictitious data may be used as well. In either Initiator embodiment the output of the bytes comparison process executed by the Stream Processor Class is the set of matching bytes. The bytes matches are between the snapshot from of a real satellite datacast and the snapshot from a second satellite datacast, the latter being either real or fictitious. A third snapshot may be matched to the first two, and a fourth, etc. Adding snapshots increases the granularity of the process, resulting in a finer filtration of the bytes in the streams that are matched. Finer filtration yields fewer matches per unit of time. The number of matches per unit of time may be controlled by adjusting the fineness of the filtration, and this may enlarge or reduce the compute burden.

The output of the Stream Processor Class is an object which is input into the Stream Encryption Logic Engine, identically on each side, in order to generate the Secondary ELD that both A and B will use henceforth as their unique private logic tunnel during their communication sessions. In every instance of communication between A and B, that Secondary ELD will encrypt the Plain-Text ELD that encrypts the plain-text of the message payload. The Stream Encryption Logic Engine code may be as follows:

```
1.  public void generateEncryptionLogic(byte[ ] bytes)
2.  {
3.     algorithms = readAlgorithmsXml( );
4.     for(int i=0; i<bytes.length; i++)
5.     {
6.        byte seed = bytes[i];
7.        int index = (int)RandomNumberGenerator(seed, MAX);
8.        Algorithm algorithm = algorithms[index];
9.        encryptionLogic.add(algorithm);
10.    }
11.    generateParameters(bytes);
12. }
```

First, the algorithms XML is read in line 3. The loop of lines 4-10 randomly selects the algorithms by using an RNG. The RNG uses a seed value, in order to generate the random numbers, as well as a maximum value a random number can have. The current byte (of the array of bytes obtained by the matching procedure) is used as the seed, the MAX value corresponds to the total number of available algorithms. The random number is used as an index of the array of algorithms that was read on line 3, and the algorithm on the position given by that number is added to the logic. After all of the algorithms have been obtained, the values of the parameters of the algorithms are randomly generated, once again using the bytes as an input (see line 11).

```
1.   private void generateParameters(byte[ ] bytes)
2.   {
3.     int length = bytes.length;
4.     for(int i=0; i<encryptionLogic.size( ); i++)
5.     {seed = bytes[i]; seed2 = bytes[i+1];
6.       Algorithm alg = encryptionLogic.get(i);
7.       Param[ ] params = alg.getParamArray( );
8.       int begin = RandomNumberGenerator(seed,length);
9.       int end = RandomNumberGenerator(seed2, length);
10.      for(int j=0; j<params.length; j++)
11.      {
12.        String type = params[j].getType( );
13.        boolean isRandom = params[j].getRandom( );
14.        if(random)
15.        {
16.         if(type.equals("bytearray"))
17.            paramValue = getByteSegment(bytes, begin, end);
18.         else if(type.equals("String"))
19.         {
20.           byte[ ] b = getByteSegment(bytes, begin, end);
21.           paramValue = new String(b);
22.         }
23.         else if(type.equals("boolean"))
24.            boolean b = (begin>10);
25.         else if(type.equals("int"))
26.           paramValue = new Integer(begin);
27.         else if(type.equals("byte"))
28.           paramValue = new Byte(begin);
29.         else if(type.equals("float"))
30.            paramValue = new Float(begin);
31.         else if(type.equals("double"))
32.            paramValue = new Double(number);
33.       }
34.       params[j].setValue(paramValue);
35.      }
36.      alg.setParamArray(params);
37.      encryptionLogic.set(i, alg);
38.     }
39. }
```

The values of the parameters of the algorithms previously selected are randomly generated in the above code sample. The loop from line 4 through 38 checks the type of data, and based on that the proper type of value is generated. Lines 8 and 9 generate the random numbers based on the received array of bytes (from the satellite stream). The value of the current byte is used as a seed to generate the random number, and the value of the next byte is used to generate the second random number. When the type of data is a byte array (lines 16 and 17), a randomly selected segment is taken from the stream, and used as the value. When the data type is a String, a process similar to the byte array type is executed, but in this case the segment of bytes is used to create a String (lines 20 and 21). In the case where a Boolean value is going to be generated, the randomly generated number is checked to see if it is greater than a given threshold. If it is a 'true' value is assigned; otherwise the value is 'false.' If the parameter is of a numerical type, the random number is converted into the proper data type (Integer, float, etc.), as shown in lines 27 through 32.

A person skilled in the art will note that using snapshot files is but one way to process the satellite datacast, or compare the bytes of one datacast to the bytes of another, or to a virtual datacast represented by an endless loop or similar technique. The datacast processing also may occur in real time, using a digital signal processor to compare the datacast channels, thereby generating a mirrored encryption logic output on A and B. When a DSP is used the only requirement is that it be able to process the data as quickly as it arrives, but this is not unduly difficult. Because of the buffering and the substantial processing power that the modem DSP possesses there may be, according to the circumstances, no need to save the data as a snapshot and process it offline. Satellite Radio data casting typically can have a data rate that does not push the limit of the compute power of the modern DSP, and buffering handles any overrun. Standard satellite reception chipsets, including those used for GPS or for music, may be adapted to this purpose.

In this example the output of another instance of the Seeding Object Class is entered into the Test File Generation Class, which generates the random set of bytes used as the test file on the two computers. Because both A and B load the same Seeding Object Class, and because both A and B also will use the resulting object as the input into the Test File Generator Class, both A and B generate the test file for the session in identical fashion. The GPS data received on each computer will generate the ELD's to be tested against that file.

Both A and B, using the Stream Processing Class, have executed a pattern matching algorithm on the bytes of the satellite data selected for comparison. The computers have generated the output of that process: the identification in each snapshot file of the particular bytes that match. Regression analysis and maximum likelihood are two of the potential mathematical techniques for the matching. The bytes so identified may be, on each side of the mirrored circuit, taken as an index to identify by mathematical means other bytes in proximity to one or both of the bytes that match, such as two to the left of the matching byte, and five to the right. A unique hash table may instantiate this process for each session. The bytes identified are processed into an output, an array, by the Stream Processor Class. The array the output of the Stream Processor Class loads the Stream Encryption Logic Engine Class, producing with each instance of loading the engine class a distinct Secondary ELD.

The same engine may generate a Plain-Text ELD, too. As in the previous Initiator embodiments, there is no difference in the two kinds of ELD's in terms of their creation or execution. The difference is in application: when the ELD is a Secondary the Executor must execute it identically on each side of the mirrored circuit. This is how authentication is achieved, by creating the private logic tunnel. This requires that the ELD to be shared on each end of the tunnel and that it be supplied in advance of the session, and furthermore that the same one be used during each instance of communication.

But as to the Plain-Text ELD there is no such requirement. Each Encryptor can execute any Plain-Text ELD. Furthermore, any Secondary ELD can encrypt any Plain-Text ELD, because the Plain-Text ELD is merely a text file.

Therefore as to the Secondary ELD, the challenge is seeing to it that both computers always have the same one. That requirement is met in the satellite Initiator embodiments by the fact that both A and B receive the same satellite datacast, generate the same output from the Seeding Object Class, and after the downstream series of classes is loaded, the same output from their logic engines. After the Secondary ELD is generated, A and B provision it identically in their Trust DBMS.

Using satellite data as the randomness input into the mirrored encryption logic circuit works in email, and in chat and text messaging. In the first two chat communications, A has sent a message to B, and B has replied. The first two messages were encrypted with a Plain-Text ELD, but not with a Secondary ELD, because it did not yet exist. With the third transmission, (the second time A transmits a message to B) the Secondary ELD can be generated because at that moment A and B have both the time stamp from the first transmission, that of A to B, and the time stamp from B's reply to A. The two timestamps will operate as the input into the Seeding Object Class. But it is possible to use only one timestamp to generate the Secondary ELD, that of the transmitting computer that sends the very first chat message, though this is less secure.

A knows that B is not in trust at the inception, because at the beginning of the chat session A looked up B in the Trust DBMS, but the Secondary ELD value was null. Because the second transmission from A to B has begun, (this is the third transmission in the chat session) Protector A has both timestamps, as does Protector B, and that timestamp pair is the data A needs to generate that Secondary ELD, so that process commences. B will use the timestamp pair as well.

The combined timestamp array loads an instance of the Seeding Object Class, in order to generate an output. This happens on both computers, because both at this moment all posses all of the timestamp data needed in the process. The output from the Seeding Object Class is used as a parameter of the Stream Processor Class. The output selects the portion of the snapshot files or streams which will be processed to generate the bytes matches. As a result of loading the Stream Processor Class a portion of the snapshot file of the GPS data stream is snipped out of the snapshot. That portion will be compared, in the bytes matching process, either to the fictitious satellite datacast snapshot resulting from the endless loop, or to a second GPS datacast snapshot. For each instance of snapshot comparison the Stream Processor Class loads again.

In the fourth Initiator embodiment the endless loop is used in the bytes comparison with the actual satellite datacast, and the endless loop also may be used in the third embodiment. The output of another instance of the Seeding Object Class is fed into the Endless Loop Class, and the result is that the bytes of the endless loop are generated, the mark at the beginning of the loop is identified, and the loop is rotated in relation to the actual satellite datacast snapshot in a random amount, by moving the mark either n segments to the right or n segments to the left. (This is a "virtual" rotation because the loop is not actually in motion, but merely positioned in relation to the portion of the snapshot file containing the GPS datacast bytes segments that will be the other side of the bytes matching process). The GPS snapshot file is the fixed snapshot file in the sense that the segments of the Endless Loop file move in relation to it. The selection of bytes in the GPS stream by A can serve as the index mark in the same snapshot file on B, so that the endless loop index mark may be positioned in relation to the GPS index mark. The pre-identified bytes in the GBPS snapshot, selected on A, may be used to "synchronize" (this is not in real time) the GPS snapshot file. In the instance of the Endless Loop Class, which is the loop, the marked segment is moved to the right or to the left in relation to the fixed, GPS snapshot, as synchronized.

The amount of rotation of the loop may be determined by the output from the Seeding Object Class, with that array operating as one of the parameters in the Endless Loop Class, or in the alternative as a parameter in the Stream Object Class. A parameter specifies the position of the segments of the instance of the Endless Loop Class, by relating its marked segment to a specified index in the GPS snapshot file. That positioning value also may be indexed by the output of an instance of the Seeding Object Class generated on each computer.

For example, the index segment in the loop may be from zero to nine segments to the right of the four hundredth time tag of the GPS snapshot file, or from zero to nine segments to the left of the four hundredth time tag, depending on what the object generated by the Seeding Object Class randomly generates. For compatibility in the matching process, both the GPS snapshot and the endless loop pseudo-snapshot contain the same time tag format and bytes segment length between each tag. With the rotation set, the segments of bytes on the pair of snapshot files are lined up and the bytes comparison process can proceed.

The Endless Loop code may be the following:

```
1.  public void execute( ) throws Exception
2.  {
3.     while(!stop)
4.     {
5.        byte[ ] bytes = createPseudoSnapshot( );
6.        file.io.FileIO.writeFile(filePath, bytes);
7.        pause( );
8.     }
9.  }
```

The endless loop consists of lines 3-8. The bytes of the endless loop pseudo snapshot are created on line 5, and on the next line are stored in a file. The code must be temporarily stopped so the file can be properly saved (see line 7.)

The next code example shows the createPseudoSnapshot( ) method:

```
1.  public byte[ ] createPseudoSnapshot( )
2.  {
3.     byte[ ] bytes = new byte[fileSize];
4.     for(int i=0; i<fileSize; i++)
5.        bytes[i] = masterBytes[index++];
6.     return bytes;
7.  }
```

The array that contains the bytes of the snapshot is initialized in line 3. The bytes of the masterBytes[ ] array are taken, beginning at the position given by the index variable. The rotation assigns a new value to the variable. The output of the Endless Loop Class is input to the Stream Processor Class. These steps are how the Stream Processor Class regulates the bytes comparison process applied to the compatible snapshot files.

There may be five instances of the Seeding Object Class in the fourth embodiment of Initiator, the embodiment using GPS. In each instance of the Seeding Object Class, the output of loading the class is an array. The first instance of loading the class yields an array that creates the channel selection to choose the particular GPS satellite whose datacast will be used to generate the moving map, the snapshot file of that data that provides the randomness input into the encryption logic generation on the computers. The second instance of the Seeding Object Class yields an array that is the input into the Test File Generator class, creating the test file used in the trial and error decryption process. The third instance of the Seeding Object Class yields an array input into the Endless Loop Class, to generate an instance of the endless loop. The fourth instance of the Seeding Object Class is the input into the Time Object Descriptor Class that identifies the portion of the GPS data stream, snipped from the snapshot, which is to be processed by comparison to the endless loop instance. The fifth instance of the Seeding Object Class is an array input into the Stream Processor Class to identify which segment in the GPS snapshot file will correspond to the mark in the loop and position the loop in relation to the GPS snapshot file accordingly. This allows the segments of the snapshot file and the segments of the endless loop to line up and be subjected to the bytes matching algorithm that executes when the Stream Processor Class is loaded, which is the next step. All of this happens in mirrored fashion on both computers. Finally, the output of the Stream Processor Class is the input into the Stream Encryption Logic Engine, and with that the Secondary ELD is created. FIG. 52 illustrates this process.

The Seeding Object Class is not limited to dynamic encryption in which the randomness is generated in whole or in part from a satellite feed. The Seeding Object Class may be used when a Terrestrial Switch is involved in the encryption logic generation process, as well. For instance, it could be used in the first Initiator embodiment with email, triggering logic steps on the edge, in the local email applications. The class may provide an object that is an input into the dynamic class loading process in all of the dynamic encryption embodiments, whenever a mirrored input is required. The Encryption Logic Switch may use the endless loop approach to provide time synchronized random values used in the encryption logic.

Another endless loop embodiment is one using HD radio. Each radio station receives a timing input for synchronization, such as one from dedicated radio time signal stations, GPS disciplined oscillators, or the Network Time Protocol, and using this synchronization data, broadcasts in synchronized fashion the endless loop simultaneously to the computers. HD radio coverage overlaps sufficiently in populated areas to ensure universal coverage. This approach does not require any satellite data transmission, and is an inexpensive technique. Timing is simplified because the time tags are built into the transmitted signal. Either random bytes included in the signal may be used in bytes matching to generate logic on the computers, or native ELD's may be broadcast in the endless loop. Bytes matching also may be used in HD or analog radio data transmission to the computers, so that they generate the encryption logic in situ by processing the matching bytes received from the radio signal as the encryption logic input. To simplify processing, the computers and the HD or analog radio transmitter may use identical endless loops, and this facilitates bytes matching when that technique is used.

The Seeding Object Class approach differs from other methods of encryption for email, chat or voice, such as methods that rely on keys and a central server. For example, the Silent Circle email encryption service of 2013 utilizes a server-side key management system, a central server that does not eliminate the possibility of the man-in-the middle attack. The embodiments of the invention, in contrast, use dynamic class loading on the applications to provide an encryption logic session object executing at the edge, bringing this about through encryption logic descriptors, and Plain-Text and Secondary ELD's. With the approach of the embodiments, in contrast to Silent Circle, the man in the middle attack is thwarted.

The Stream Encryption Logic Engine Class may be thought of as an Encryptor specialized for the reception of inputs from satellites. The input is the result of the bytes matching process from the Stream Processor Class, as described. The bytes matches may result from a pattern recognition algorithm using regression analysis or a similar technique that compares the satellite snapshot file to the endless loop, or one GPS stream to another, or two streams to the endless loop, etc. The matching bytes are the output of the Stream Processor Class, and the matches are saved in a temp file, along with designated bytes on either side of the match. Serially, each match generates an input which may be processed as an array entered into the Stream Encryption Logic Engine Class, the output of which is a string of ELD's.

The matching bytes may be the actual input, or they may be used as a marker point for selecting, through an algorithm, other bytes, such as the third to the left and the ninth to the right of the matching bits in each of the streams, as explained above. This randomized bytes selection approach may be applied to both the GPS snapshot file and to the endless loop, once the matching bytes have been identified. In any embodiment in which both A and B receive a first random data stream that is compared to second random stream, or both to a third, bytes matching may be employed. The streams may originate from any source, either satellite, terrestrial, or fictitious.

The matching bytes, as well as any other bytes in a programmatically defined relationship to the matching ones, function as the input into an encryption logic engine. Actually, the matching bytes do not even require a logic engine to be used for encryption, as the technique may simply generate keys or certificates, operating as a variation on the other methods of encryption.

For example, the meta-logic technique of the embodiments may be used with AES. A logic engine that generates ELD's is not the only way to create an automatically executing private logic tunnel between trusted computers given effect as a background task. In the AES embodiment there is no encryption logic engine, and ELD's are not used, so the embodiment forfeits the advantage of using a different algorithm in each instance of communication. The system architect forfeits the advantage of the Composite ELD, but gains the advantage of relying on a well proven encryption algorithm that has been subjected to public scrutiny. For example, there is a top secret version of AES that uses 256 bit keys. The system architect may elect this security strategy, instead of using a logic engine and a composite ELD, due to particular requirements, such as a military or legal encryption specification.

As will now be explained, an architecture not using ELD's but AES or a similar algorithm instead need not jettison the protection that encryption meta-logic affords. In this "non-ELD" embodiment the Secondary ELD becomes a key used in AES encryption, and the keys are deployed in the Trust DBMS as in the Secondary ELD example. Then, another AES key is used to encrypt the plain-text. Finally, the Secondary key, the one looked up in the Trust DBMS of the sending computer, encrypts the primary AES key so that it may be included in the encryption meta-file. Therefore one may observe that encryption meta-logic may be supplied via AES. DES, or other common encryption algorithms. Because the recipient computer also has the Secondary Key in its trust DBMS, just as in the other embodiments, the recipient computer can decrypt the key used on the plain-text. The latter key, once it is decrypted, is used to decrypt the plain-text. See FIG. 53. In this example The keys are randomly generated using any of the techniques described herein, including a randomness input from space. It is possible, therefore, to construct a dynamic Encryption Abstraction Layer using, instead of ELD's, AES or another single algorithm. As in the embodiments using ELD's, such an abstraction layer may use encryption meta-logic, and in fact, as many logic layers as the system architect wishes to employ.

It is possible to combine AES and the keys it uses with ELD's and composite encryption logic descriptor executing dynamically on the edge into a complex system that utilizes AES and ELD's as well. For example, the ELD may be used to encrypt the AES key before it is transmitted, or the AES key may be used to encrypt an ELD generated by any of the four Initiator embodiments. In one embodiment AES is used to encrypt the Trust DBMS and the key is created as the output of the Mnemonic Input. A Composite ELD may include the AES algorithm and keys within it. The Seeding Object Class and the Stream Processor Class may generate AES based encryption logic, in the same way that the other embodiments use these techniques.

The programmed relationship of the matching bytes to other bytes that surround them, mentioned above, may be complex. The matching bytes array entered into the encryption logic process may be something richer than merely the unprocessed matches, such as the square root of the first byte to the left of the matching byte in stream x times the square of the fourth byte from the right, and this product divided by the ninth byte to the right of the matching byte in stream y. This complex bytes matching approach may be used with snapshot files, but also in a real time analysis of the matching bytes, when a DSP is used. The streams yielding the matches may be real, fictitious, or both, and more than two streams may be employed in the bytes matching process. There are 24 GPS satellites, and the streams of any number of them may be used in the bytes matching, and any number of fictitious data streams also may be employed. This subject involves the usual engineering tradeoff between complexity and reliability. The above observations concerning the technique of bytes matching are not limited to GPS, as other kinds of satellite data streams may be used, such as HD television or XM Radio™, and even to completely "virtual" data feeds such as the GPS "Super Signal," explained below.

A, now on the verge of transmitting the third message of the chat session, has all of the data needed to generate and execute the Secondary ELD. At this moment both A and B have each other's the timestamp array, plus such other data as the particular instance of the Seeding Object Class requires, because they have both transmitted an encryption meta-file to one another once.

As a background task, A's Protector loads each instance of the Seeding Object Class, using the complex timestamp data created on both of the computers to generate the five encryption logic steps described above. The Channel Selector class chooses the GPS datacast that will be compared to the endless loop. The Endless Loop Class generates the endless loop and positions it relative to the GPS snapshot, and that class is loaded by the object that is the output of the Seeding Object Class. The Stream Processor Class on A compares the GPS snapshot to the as-generated and as-positioned endless loop, expressing the results of the comparison process as a series of matching bytes. That serial output of matches is an array taken as a parameter in the Stream Encryption Logic Engine, with each bytes match loading the class once and creating an ELD.

In one match in the series of bytes matches entered into the Encryption Logic Engine, the output will generate the true Secondary ELD. B will recognize this because according to the checksum on the test file caused by the ELD produced by that match, the match caused the decryption of the test file. Therefore, B knows that it has encountered the same Secondary ELD that A used. ELD K will have appeared.

When that ELD is captured on both computers—which is to say when B identifies it—it is provisioned in the Trust DBMS of both A and B, and with that it becomes their Secondary ELD. As to the ELD's created by this process that do not happen to be the Secondary ELD, they need not be wasted, as it can be used as Plain-Text ELD's.

So A uses that series of bytes matches to lock the test file, and B uses the matches to unlock it. But before actually using the Secondary ELD in this manner, A can test it right on Computer A, before sending it out to computer B. A can test it by using it on the test file before that Secondary ELD is actually used to encrypt the Plain-Text ELD. The idea is not to use that Secondary ELD to encrypt the Plain-Text ELD until that Secondary ELD passes the test, to gain the assurance that the Secondary ELD is a good one. This "good or no good" test uses checksum as a preprocessing step on A, as a failsafe mechanism.

When B, having received the encryption meta-file from A, executes the checksum to find ELD K, each Secondary ELD is one parameter in the class loading process in the Encryptor, and the other parameter is the encrypted test file. The process happens serially, repeating until it reveals the actual Secondary ELD that A used. When that happens the decrypted test file and the unencrypted test file will match. Please see FIG. 54.

Figure 53:
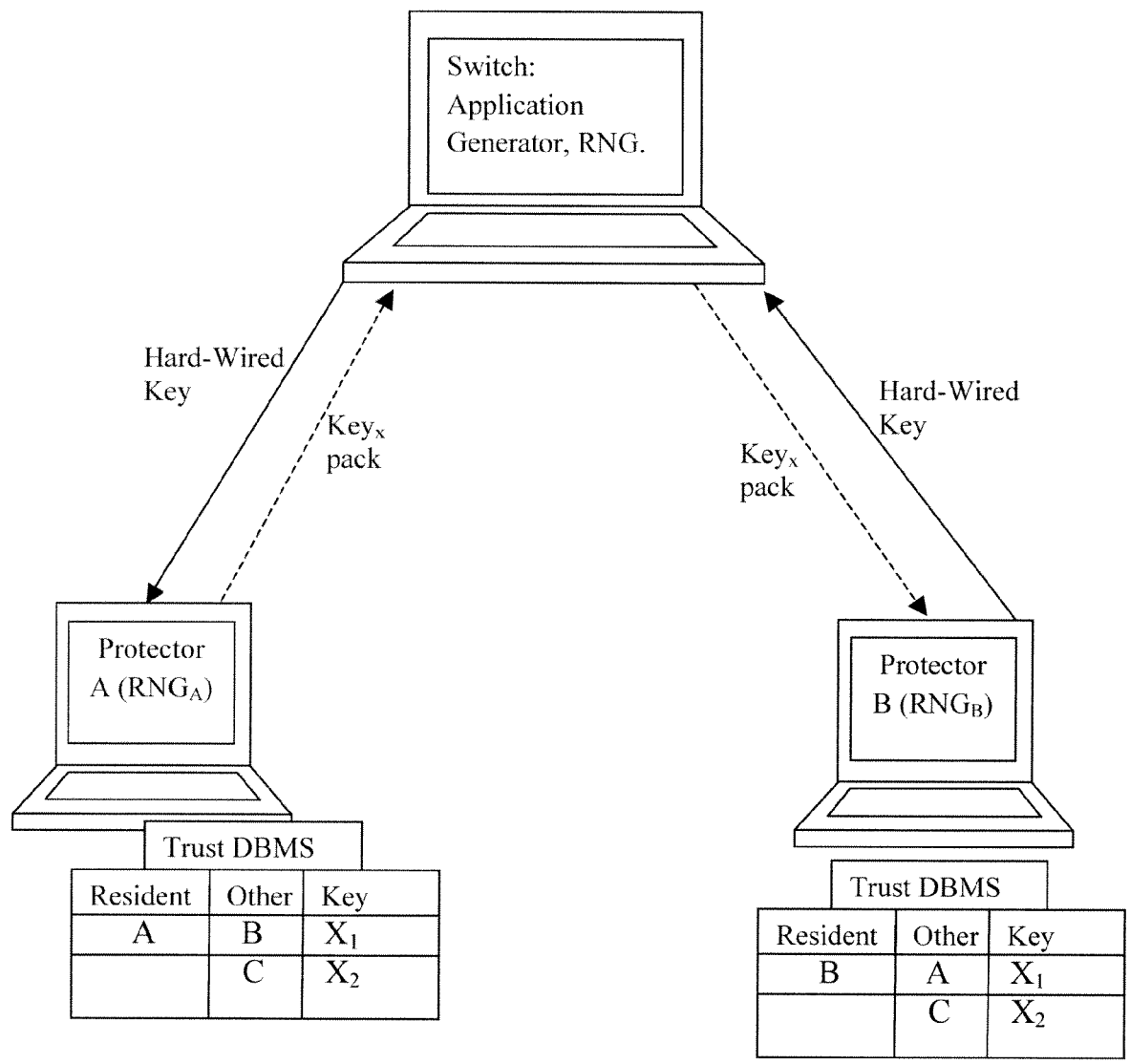
FIG. 53 Non-ELD based Meta-Logic Using AES and Keys for Aromatic Encryption . . .
Figure 54:
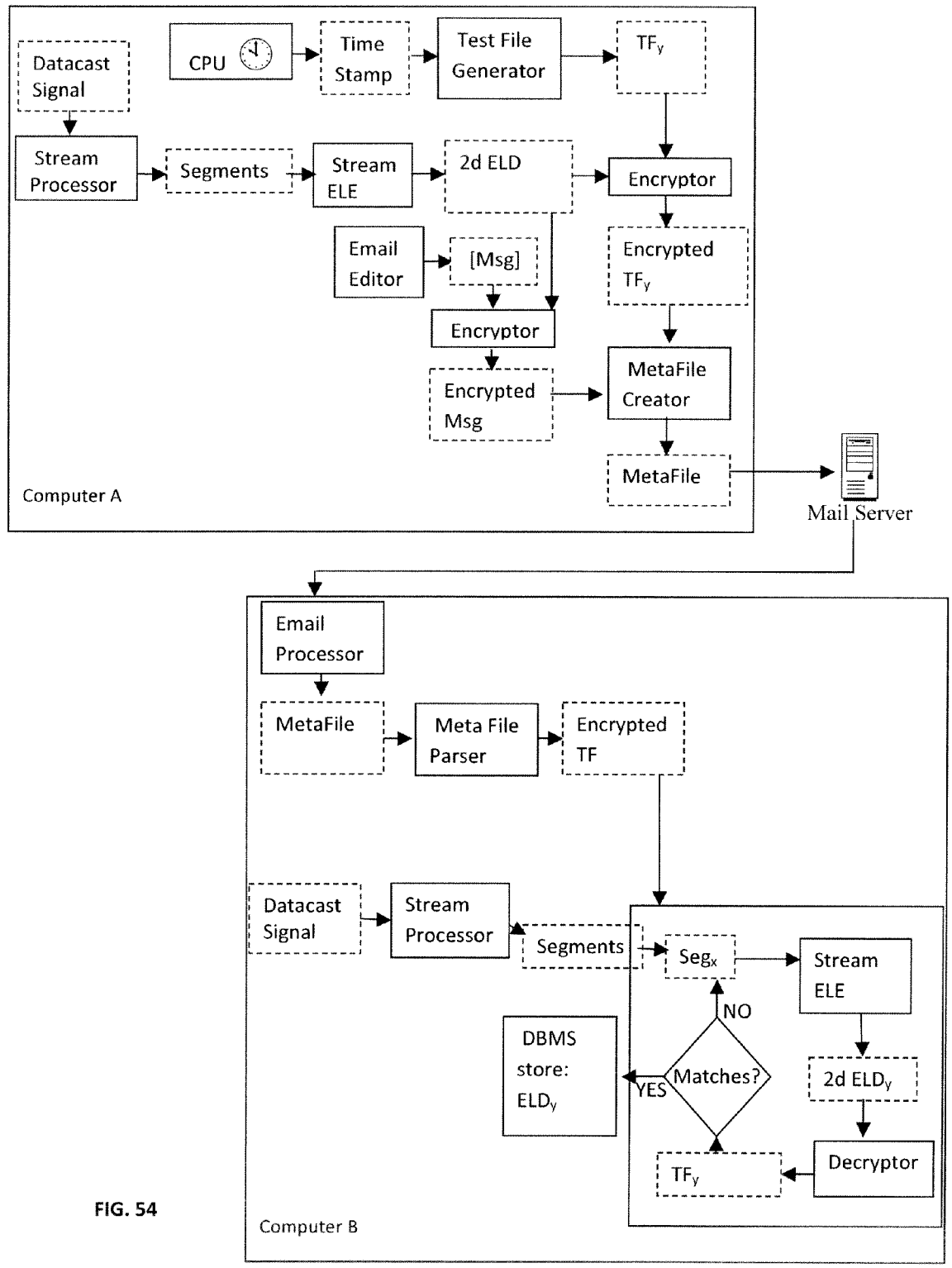
FIG. 54 Generation of Test File and Secondary ELD on A, and Detection on B . . .

One can see that the processes of FIG. 54 may be adapted to use AES instead of ELD's, as shown in FIG. 53. The test file approach also may be used with AES based meta-logic (non-ELD based meta-logic) because AES may also be used to encrypt a test file, and on that basis transmit an encrypted test file across the terrestrials portion of the encryption VPN instead of a key. The test file technique, just as in the case of ELD based meta-logic, can allow the recipient computer to identify a Secondary AES key used to decrypt the Primary AES key employed to encrypt the plain-text. Therefore one may observe that the use of ELD's is not required to construct an Encryption Abstraction Layer.

Now that the Secondary ELD is established, A uses its Stream Encryption Logic Engine to generate a Plain-Text ELD, using any kind of random input into the engine to create it, and A uses it to encrypt the Plain-Text. (For instance, the discarded ELD's found not to match the true Secondary ELD's may be used as Plain-Text ELD's). The Plain-Text ELD will be encrypted by the Secondary ELD that ultimately results from the process that the Seeding Object Class started, and that encrypted Plain-Text ELD will be inserted into the meta-file in its name-value pair in the encryption meta-file.

When the session commenced, the lookup on A of the Secondary ELD for B returned a null value, and this event triggered the operation of the Seeding Object Class so that the missing Secondary could be supplied. But in this embodiment for creating the Secondary both A and B contribute their time stamps into the Seeding Object Class. This means that the Secondary cannot be generated until B has replied to A. The requirement of a reply from the second computer provides authentication.

Now that A is communicating with B for the second time in this chat session A has all of the data it requires to complete the creation and installation of the Secondary ELD. The same approach also works with email, and in that embodiment too the "Send" command may trigger, as a background task, the transmission of an email from A to B and a reply from B to A to supply the handshake needed for the Seeding Object Class to have the necessary input from both computers. That email may be merely a data packet that is transmitted and returned as a background task that is invisible to the user. With that data at hand, both A and B create and install their Secondary ELD on the Trust DBMS on their email applications. This send-and-reply trust initiation procedure means that the email plain-text takes longer to actually travel from A to B than it would in the absence of the dual timestamp embodiment, but this only has to happen once, during the first contact between the computers, because from that point forward the Secondary ELD is contained in the Trust DBMS on both.

When A and B already are in trust, the lookup on A's Trust DBMS returns a positive value. When a positive value results, a random string of dummy data generated by the RNG on A is the input into the Stream Encryption Logic Engine on A, rather than the output of a bytes matching process conducted on data received from space. Because A and B already are in trust—there already is a Secondary ELD available—Protector A knows that only a Plain-Text ELD is needed, not a Secondary ELD. A Plain-Text ELD does not require logic coherency between A and B, so the bytes matching process that otherwise would be required to provide matching logic on each of the circuit is not necessary for an ELD in this use. All that is needed is for the Encryptor on B to be compatible with the ELD that is the output of the Stream Encryption Logic Engine on A, and A can achieve this simply by generating that ELD through A's RNG. B will load the class and execute that ELD and decrypt the plain-text, so long as that ELD is in its unencrypted form. Therefore, the RNG on A generates the random input that is fed into the Stream Encryption Logic Engine to generate a Plain-Text ELD if the lookup on the Trust DBMS shows that there is a Secondary ELD corresponding to B.

However, in an alternative embodiment the random bytes received from the GPS datacast are used to generate not only the Secondary ELD, but the Plain-Text ELD as well, obviating the need for the RNG. Using the RNG instead of the satellite datacast is an orthogonal feature of the as-generated Protector application, because it differentiates the logic creation process on the computers, given that each RNG may be associated with its own instance of a randomizing hash table that the RNG may employ.

The Initiator functionality using satellite data transmission means may be enhanced by customized hardware. In one embodiment there is a plug-in board, such as one using PCIe, which is used in the personal computer or the Satellite Switch. The board may include a circuitry for satellite datacast reception and an antenna, a CPU, RAM, ROM, a solid state drive, a WROM memory (write-once-read-many), a DSP, and a multi-core GPU capable of parallel processing in order to process the string of ELD's in parallel to discover the one that decrypts the test file, or to find the bytes matches that generate an ELD through a logic engine. Please see FIG. 44.

The software operating on the plug-in board may operate as follows. There is a channel selector, which is a software switch that selects one or several satellite signals to process. This may be a class that is loaded by an instance of the Seeding Object Class. So long as a compatible a compatible antenna is provided for each respective satellite datacast, e.g. XM Radio™, GPS, or HDTV, the various datacasts may selected and combined for processing on the board. The selector in one embodiment employs a Channel Selection Class, fed by an object from the Seeding Object Class, in order to choose the channels and route them to processing. The one or more fictitious channels may be among the set of the channels subject to selection, in addition to the actual satellite datacast channels. The endless loop fictitious channel may be a string that is burned into ROM.

After the channel or channels are selected, the data from the selected channel is captured as a snapshot file and routed to the Stream Processor Class. The Stream Processor class is loaded and this processing step may take advantage of parallel processing, by means of the GPU. (When a DSP is used, the snapshot is not needed as the streams are processed in pseudo real time, which is to say processed immediately upon receipt, instead of as a file saved on the system). The output of that Class, an array, is fed into the Stream Encryption Logic Engine. The output of that engine is an ELD, either a Secondary ELD or a Plain-Text ELD. In the latter case as mentioned above an RNG may be the random input in lieu of the output of the Stream Processor Class, given that when the ELD is a Plain-Text ELD instead of a Secondary ELD there is no need to generate mirrored logic on each side of the circuit from the satellite datacast both the computers simultaneously receive. The Plain-Text ELD simply is parsed on the recipient computer and executed independently of any filtration logic between the computers. Please see FIGS. 52 and 54.

The input into the Encryptor, where the class loading that causes the encryption occurs, is the output of the Encryption Logic Engine, the ELD. For greater security the ELD input into the Encryptor may be encrypted and decrypted again at that point. As an additional security feature, there may be an Analog to Digital to Digital to Analog conversion step that employs a unique frequency to transmit the data. The analog transmission process operates as a fuse, breaking the chain of digital data transmission.

The fuse is the functional equivalent of a hardware based security logic circuit. The objective is to authenticate the user by making sure not only that he is who he says he is, but moreover, that he also is using his computer in an authorized location, a place that legitimately corresponds to his identity. The former assurance is provided by the Cognitive Signature and the Trust DBMS. The later assurance is provided by the global position data that the computer receives and processes on the plug-in board. The functionality of the security logic circuit actuated by the hardware may include these features or others, such as voice printing or the other techniques described. The various embodiments of the security logic circuit share the feature of having one or more hardware devices open or close only upon the entry, on each side of the circuit, of matching values, as independent elements in an orthogonal system. A plug-in board is described, but the hardware may be deployed by other means, such as by a chipset on a motherboard, or by a graphics processing board with augmented functionality.

The security logic circuit may use two DSP's, using digital to analog conversion on the first side of the circuit, and on the other side, analog to digital conversion. The ELD, the output of the logic engine, is input into DSP One, and this generates an analog output. That analog output becomes the analog input to DSP Two, which then converts that analog signal back into a digital signal so the CPU can process it. This security logic circuit functionality may be provided on the plug-in board.

Figure 55:
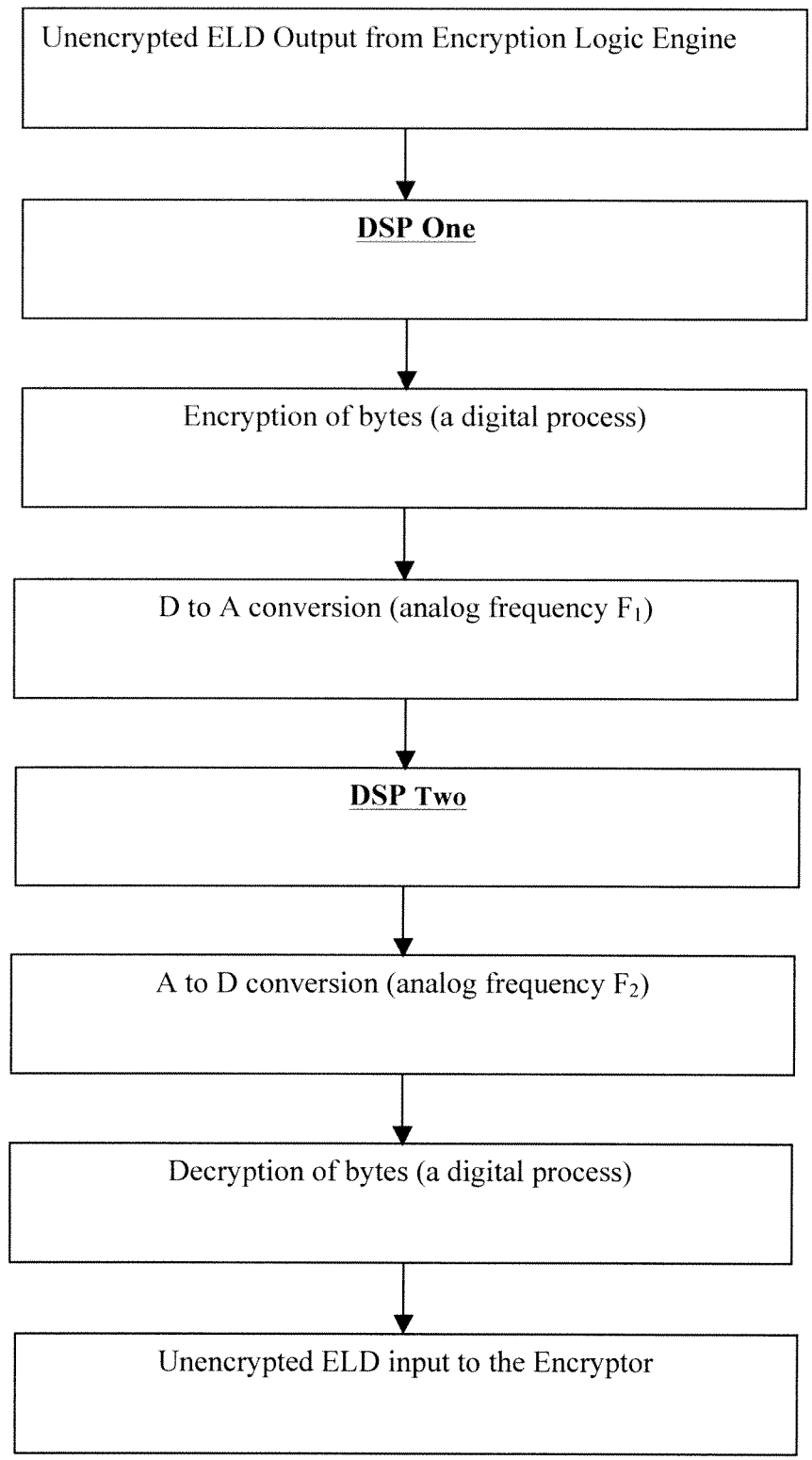
FIG. 55 Flow of Processes for Analog and Digital Security Logic Circuit . . .

The security logic circuit has two safety features: an encryption step, involving the digital portion of the signal on each DSP, and a frequency setting step involving the analog portion. DSP One and DSP Two are both involved in each step, in the digital process and the analog process as well. The operation of the two safety features is shown in FIG. 55, a process diagram.

As to the first security feature, the security logic circuit takes the native ELD, the output from the Encryption Logic Engine, and encrypts it using an instance of Housekeeping encryption. The installer application randomly generates this instance of the Housekeeping Encryption for each individual application. In connection with this process, the plug-in board has a "WORM" memory chip (write once read many). The instance of the Housekeeping Encryption algorithm that the installer application has generated for that particular Protector is saved on the WORM chip, and by this means the Housekeeping Encryption algorithm is made available to DSP One. With that step, the encryption logic is locked into the hardware and operates by default, encrypting the ELD output of the Encryption Logic Engine every time one is created, and before that digital stream is converted into an analog stream by DSP One. The same algorithm encrypts the ELD on DSP One and decrypts it on DSP Two.

In between those two steps there is an analog safety feature, to be described, but first the digital fuse will be explained. As to the digital portion of the security logic circuit, implemented by DSP One and DSP Two, the logic circuit executes as follows. DSP One loads the Housekeeping Encryption algorithm from the WORM. However, DSP Two does not load it from the WORM. In the DSP Two side of the security logic circuit, the Housekeeping Encryption algorithm is retrieved from the Trust DBMS. DSP Two is the decryption side of the security logic fuse. Unless the user opens the Trust DMBS by submitting a true mnemonic input, the Housekeeping Encryption algorithm is not loaded on The DSP Two side. Only if the user remembers the answers to the questions comprising his Cognitive Signature does the Trust DBMS open so that the Housekeeping Encryption algorithm actuated on DSP Two, thereby decrypting the ELD. Supplying the correct Mnemonic Input closes the digital part of the security logic circuit.

The plug-in board and the Protector application may be sold together, as a kit. The software is on a DVD, and the DVD includes an installer application. The board is installed using the installer software, and the software saves the particular instance of the Housekeeping Encryption Logic provided in that copy of the software to the WORM chip. The Installer application also sets the encryption logic on the other side of the circuit, on the motherboard side, by placing the Housekeeping Encryption algorithm in the Trust DBMS of the Protector, as data that is read only and not visible to the user. The algorithm is installed to DSP Two when the Cognitive Signature is correctly matched by the Mnemonic Input. (As to the DSP One side, the algorithm upon installation is saved on the WORM chip).

Alternatively, only the parameters that generate the Housekeeping Encryption Logic may be stored, and after a successful Cognitive Signature authentication the algorithm is loaded with the parameters, and the algorithm in the ready configuration is saved to RAM on the motherboard. By this means, the encryption logic used in DSP One that is saved on the plug-in board is matched by the encryption logic generated on DSP Two, the motherboard side of the circuit, upon user authentication, which is to say when the user logs in with the correct Mnemonic Input. This is how the first safety feature of the security logic circuit, the Housekeeping Encryption Logic, is given effect.

The second safety feature of the security logic circuit is the setting of the analog frequency on the analog portion of the security logic circuit, so that the frequency of the analog output of DSP One matches the frequency of the analog input of DSP Two. The installer application initializes this, too. The installer sets the frequency of the analog portion of signal, and this is the second step when the installer application installs the plug-in board on the computer. Another algorithm, burned into the WORM chip so that the algorithm is saved for DSP Two, is activated. This algorithm sets the frequency of the board each time the computer is booted up. The algorithm will be executed on DSP One each time the computer boots up so that the frequency is set for the session. For the logic circuit to close, frequency $F_1$ must match frequency $F_2$, per the diagram. FIG. 55.

The argument used in the frequently setting algorithm is the global positioning data that expresses the location of the computer. This is an additional authentication means. If the computer is in the wrong place—which is to say other than the place that was identified as the correct locus of operation for that computer when the user installed the plug-in board—the analog circuit fails because the correct frequency is not provided. DSP One and DSP Two can only communicate when the both use the same analog frequency, and the common frequency allows the analog output of DSP One to be received and processed as the analog input on DSP Two. This analog step in practical effect is a fuse because unless the frequencies match, DSP Two cannot convert the signal back into digital form, and without this conversion step the signal is useless. A frequency match on both DSP's is required to close the security logic circuit.

The installation process for the analog portion of the security logic circuit involves capturing an acceptable global position input and using it to generate the same frequency on each side of the security logic circuit. This may happen as follows. The installer application contains a wizard that allows the system to capture the current global position received from the satellite network, and use it as the reference in a sense-reference frequency setting circuit on DSP One and DSP Two. The circuit performs authentication by verifying the location of the computer, using the analog capabilities of DSP One and DSP Two. The hardware is installed on the computer, and the user is presented with a wizard that initializes the sense-reference analog portion of the security logic circuit. When the user is executing the installer the wizard asks him whether his present location, the place where the board is being installed, is the place where he expects to use the computer in the normal course. If so, he replies yes to the wizard, and the board captures that location as a value generated from or related to the latitude longitude output of the GPS reception chipset on the board.

DSP One will verify the location each time the computer attempts encrypted communication, checking that stored location which is in installed to the WORM, the reference, against the sense of the sense-reference circuit. The sense is the GPS position data that the board receives every time an instance of encrypted communication is to occur. If the user responds to the wizard by saying "yes" when he is asked if he intends his current location to be the one that will be deemed to validate his position as the acceptable locus of operation for his computer, then that GPS location value is entered into the WORM so that it is permanently saved, and DSP One will accesses that value each time the computer is booted up. DSP One uses the value as the input into the frequency setting algorithm that sets the frequency of the analog output of DSP One, so that it matches the frequency on DSP two.

DSP Two retrieves that value from the WORM and sets the frequency on its analog input using that saved value. DSP One, in contrast, obtains the same global position value by receiving it directly from space, using the GPS reception capability that the GPS chipset on the board provides. That GPS value, on both sides of the circuit, operates as the mirrored input into frequency setting algorithm on DSP One and DSP Two. If the values match, each side sets the same frequency and the Analog output frequency of DSP One matches the analog input frequency of DSP Two. The frequency setting algorithm sets the frequency of the analog portion of the security logic circuit for each instance of encrypted communication. The same algorithm is used on both sides of the sense-reference circuit, both on DSP One and DSP Two, so when the inputs match the circuit closes. But only DSP Two will access that value from the WORM chip. DSP One, in contrast, has no access to the frequency value in the WORM chip. DSP One can only input the position value that it receives from space. DSP One is the sense side of the sense-reference circuit, and DSP Two is the reference. This means that DSP One must input the true GPS value after receiving the GPS position data from a satellite if the circuit is to close.

So after the frequency setting value for the analog input into DSP Two is installed, that value being saved in the WORM, from then on each time an act of communication takes place the plug-in-board, through its GPS chip set, receives the current position data. Automatically that value is saved to RAM and entered into the frequency setting algorithm controlling the frequency of analog output of DSP One. The frequency control value is erased from RAM when the session is over. The next time there is communication these steps repeat. In this way, when $F_1$ as shown above in FIGS. 55 and 56 above equals $F_2$, and the circuit closes. If $F_1$ does not equal $F_2$ then the circuit remains open.

In a more advanced embodiment the WORM remembers more than one GPS location, so the user may be authenticated, for instance, both at home and at work. This is useful for laptops. The installer allows the user to enter x number of locations, and each new location may be entered into the WORM, and an activation key activates each instance of the new location entry process. For each new location the encryption service provider may recite to the user the next installation key in the chain of them that is saved on the WORM. The keys are installed into the WORM by the installer application before the board is shipped, but the keys are not readable to the user. The keys remain locked unless the provider supplies the matching value of the next key in the chain. Activating a new location may require the user, through the enrollment server or by other means, to pay a fee.

Figure 56:
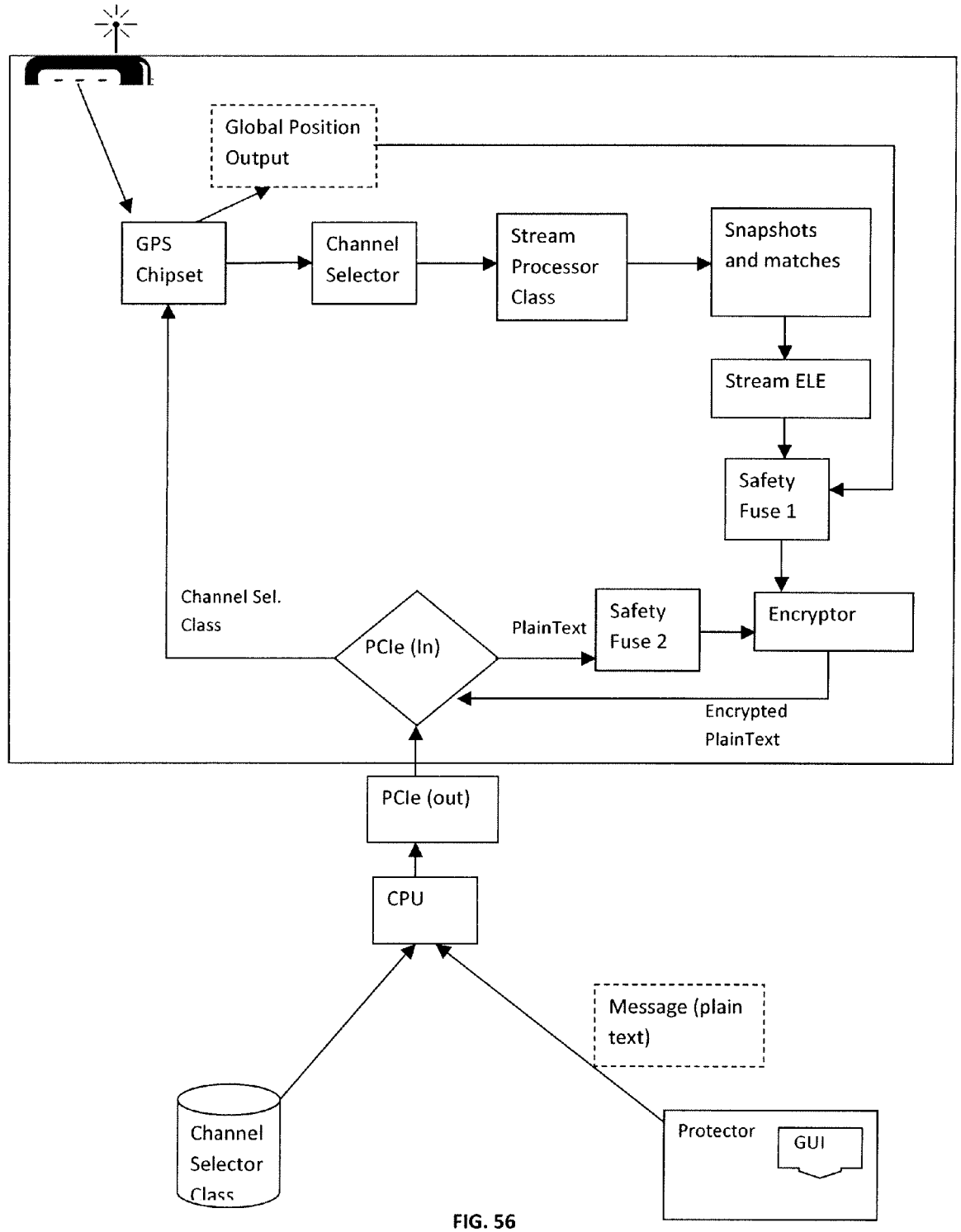
FIG. 56 The Safety fuses using a DSP . . .

FIGS. 55 and 56 illustrate the board. The plug-in board and the Protector application may be packaged and sold together, with the software provided on a medium, e.g. a DVD. Each package is a kit. Each kit may be individuated from the others by causing the encryption of the data before it reaches DSP One, and on the other side of the security logic fuse as it leaves DSP Two, to vary per an instance of a hash table. Each copy of the installer application varies algorithms in each instance of installation, so that no two computers are logically alike. Because each board has a serial id, this means that each copy of the installer and each board must be sold together, as one item corresponds to the other. This requirement enhances security.

The instance of Housekeeping Encryption Logic installed to the digital portion of each DSP, as well as the analog frequency used at the two analog points of the circuit, varies from one kit to the next. The installation program included with the kit causes the WORM chip to save the values, so that they are permanently installed into the hardware, uniquely setting the encryption logic and the frequency on each computer in which the kit is installed and uniquely instantiating the Housekeeping Encryption Logic. The Installer program is in each case may be an instance of a class. The instance randomizes the frequency setting algorithm and the Housekeeping Encryption Logic algorithm. In each case the randomization steps afforded by the installer supply unique values for that individual kit. The installer program installs those values into the Protector application and into the WORM chip. This means that if a hacker cracked one computer, a computer with a different kit installed could not be cracked in exactly the same way, because this individuation feature set minimizes the monoculture problem.

Recurring payment firmware may be included in the plug-in board, and the installer program may install keys that activate the board and are received from a URL containing enrollment and billing software. As in the prior embodiments, an enrollment server allows the person to subscribe to the service, and via the internet or via interactive voice response the user pays online and receives keys matching the as-installed activation keys in the WORM. The service provider records the activation keys corresponding to that kit and that user, and this is tied in to the recurring payment system. The user receives the next activation key each time he pays up. The access keys entered each time the user pays for his next period of enrolled use match the keys burned into the WORM, the keys having been installed through the installer application provided in the kit.

The installer DVD allows the installer to be re-executed if the need arises, and the values burned into the WORM chip on the board are saved on the DVD for future use. If the user has his duly licensed DVD, should his computer be stolen he can receive another board and install it on his next computer without having to pay twice. The user is told to keep his DVD separate from the computer, for instance in his safe, to guard against an inside attack.

The different nature of a satellite datacast used to provide entertainment, such as XM™ Radio, as compared to the GPS datacast, implies different architectures when the data stream is harnessed as a randomness input for encryption. GPS data unlike entertainment satellite data is available worldwide. For example, XM Radio™ is only available in North America. XM™ Radio is not available worldwide, but it is available universally across its coverage area.

This is not so with GPS. For a vehicle to calculate its position as it moves, using GPS, it typically receives four satellite transmissions to process on its receiver. The signals are received in real time. Not all of the signals in the satellite network, however, can be received by the vehicle, or by any given GPS receiver. At any given moment some of them are always on the other side of the world. Each receiver is however always in contact with enough satellites to be able to ascertain its global position.

The GPS embodiment of Initiator differs from the normal use of GPS because the purpose of Initiator is not determining geographical position, but authenticating a user on a secure VPN. The fourth Initiator embodiment only uses GPS as a random data source to generate encryption logic. Unless the particular encryption embodiment is one using location as a supplemental data input for authentication, such as the plug-in board embodiment just described, the system makes no use of the GPS network to calculate position.

For this reason, there is no requirement to receive the GPS data in real time. The only requirement is for the data eventually to be available to the communicating computers in identical form, because identical inputs create mirrored logic outputs to load the Encryptor in the same way on each computer. "Availability" of the satellites therefore does not mean available immediately, and because this approach to using the datacast is free from any requirement to calculate position, latency in receipt of the datacast is not an impediment to architecting a data structure that works in generating the mirrored values on encryption logic engines of the communicating computers.

What is required is merely a way for any computer on earth to be able to share, eventually, a common logic input into an encryption logic engine via a GPS signal that is received by a counterpart computer, so that they can execute the mirrored encryption logic process. Obviously this cannot happen in real time if A is on one side of the world and B is on the other, because they would not be in contact with the same satellites. But the computers can receive the signal with "virtual simultaneity," which means at two moments sufficiently close in time, which is to say adequately synchronized, to allow the logic generation process to work.

The following Initiator embodiments using GPS create such a virtual simultaneity, so that every computer has world wide GPS pseudo reception. All of the GPS signals, the full 24 satellite compliment, are provided to all of the computers, irrespective of each receiver's terrestrial location, all of the time. This happens through a network of relay servers, each of which receives four GPS signals using a standard, low cost receiver chip set, and each of which uploads its four digital streams to a central server or central network that provides the virtual simultaneity. This may be a hub and spoke architecture, with the relay servers feeding the hub, and the hub making available to all of the computers all of the GPS signals.

There may be a central server that combines all of the signals from the receiving servers into a Super Signal. By using a network of relay servers that communicate with the hub, all of the GPS digital streams from all of the satellites are captured nearly at once. The central server transmits the GPS super Signal across the Internet, as a continuous feed consisting of the entire set of global GPS channels. For redundancy, a network of servers can provide the Super Signal transmission. The central server may contain an atomic clock to synchronize all 24 channels. Also, it may freeze the entire 24 channel stream as a snapshot file, providing the same super snapshot to all the computers. Alternatively, the computers may capture the Super Signal and prepare the snapshot files, inserting time tags to specify the portion required to generate the input to the Stream Processor Class.

Although it would be more expensive to do so, all of the redundant central servers may be synchronized by atomic clocks. Any of the synchronization means described above may provide the adequate synchronization for the purpose of GPS pseudo reception, keeping in mind the fact that the servers may be synchronized to one another in pseudo-time. There is no requirement that they also be synchronized in real time because they are not used to find a location but merely used to supply a matching stream of random data used as an encryption logic input. The synchronization merely needs to be adequate to provide a common random data broadcast capable of generating mirrored dynamic encryption logic on Computers A and B. As explained above, the use of snapshot files, buffering, zones, and bytes matching may obviate the need for perfect timing. The synchronized 24 satellite stream is available to all of the servers, in this version, all of the time, and the output of each server is a multi channel snapshot file that the computers process offline.

When snapshot files are used, only minimal synchronization may be required. Latency between the transmission of the signal across the network and the direct reception signal from the satellites on the local computers is irrelevant in this embodiment. The only requirement is that all of the signals be available to all of the computers, but the signal does not have to be available to all of them at precisely the same moment. All that is required is for the signal to arrive at each computer in the same approximate zone of time, so that the computers, using the Stream Processor Class, can generate the snapshot files and process them for bytes matches. Please see FIG. 57.

Therefore, the "zeroing in" approach described above, using snapshot files and zones, may overcome latency. The bytes matching technique provides multiple potentially overlapping points in the as-recorded GPS feed that are available for selection as the logic inputs to create the encryption logic session object. With the Super Signal approach the trial and error technique using checksum may be employed to distinguish, on the recipient computer, the actual bytes input used to generate the logic on the transmitting computer from the bytes that were not used. The time tags in the snapshot files allow the "timing" for the comparison process to occur locally on the computers. This is not timing in real time, but pseudo-timing, as it merely involves the processing of a file. The only requirement is that the computers to enter into trust execute the bytes comparison on each side of the mirrored circuit in the same way, and the time tags by identifying the zone of the snapshots to be tested allow this to occur when the Stream Processor Class loads on the pair of computers. An output from the Seeding Object class may trigger this process when the Super Signal is used, just as in the other embodiments.

Synchronizing all of the redundant central servers would prove challenging if the data were used for position calculations. But such is not the case in the embodiments that to not use position data as an authentication means. The requirements for data reception by the Protectors do not include any real time reception in these embodiments. All that is required is that all of the signals be available to all of the computers in an acceptable window of time, which is to say soon enough to generate and process the snapshot files. As before, the trial and error approach allows two computers to identify not a single moment down to the millisecond in real time, but merely a common portion of the snapshot file of one or more of the GPS data transmissions. A portion of snapshot one is compared to a portion of snapshot two in the trial and error process that uses a test file and checksum. Using the Super Signal, either by itself or in conjunction with an actual GPS datacast which the computer actually receives directly from space, or with a fictitious signal from an endless loop the Super Signal includes, the bytes matches are processed on each computer and the matches generate the mutual encryption logic.

When the Internet is used to broadcast all of the GPS datacasts at once the requirement of a GPS receiver for each computer may be eliminated completely, in one embodiment. The computers generate the encryption logic exclusively from the pseudo-signal. \

The transmission of the GPS Super-Signal by terrestrial means does not violate the general principle of avoiding terrestrial means to provide information pertinent to the Secondary ELD generation process. This is so because only the raw signal is provided, not any information concerning how the raw signal is processed on the computers to generate the logic. This differs from sending an encryption logic descriptor across the Internet, such as the Tertiary ELD that is used in the first Initiator embodiment. The theft of an ELD that is sent across the Internet could be the starting point for hacking the system, but receiving the 24 channels of the raw signal from the network would not be helpful, as this data is not an encryption key but merely the stuff from which the key is created. It is the merely the raw material that is processed to generate the requisite encryption logic coherency, and the Seeding Object Class may trigger this process locally, on each computer.

The Super Signal Server may send 24 snapshots as a large file of bytes, with the time tags inserted, as a composition. A hard-wired ELD may be used to encrypt the composition as it is downloaded from the particular server to the computer or Satellite Switch to which the server is connected. There is an advantage when the Super Signal Server supplies the time tags, in that they are received by the computers in identical fashion.

Each of the individual signals in the Super Signal may be processed as a snapshot file. In one embodiment, the Super Signal server receives a request from the computers in the form of a Time Object Descriptor that includes a GPS channel selection. The Seeding Object Class on both computers creates the input into the Time Object Descriptor Class, and transmits that Object to the Super Signal Server. The Super Signal Server processes that object, and returns the resulting snapshots to the computers so they can load their Stream Processor Class.

Figure 57:
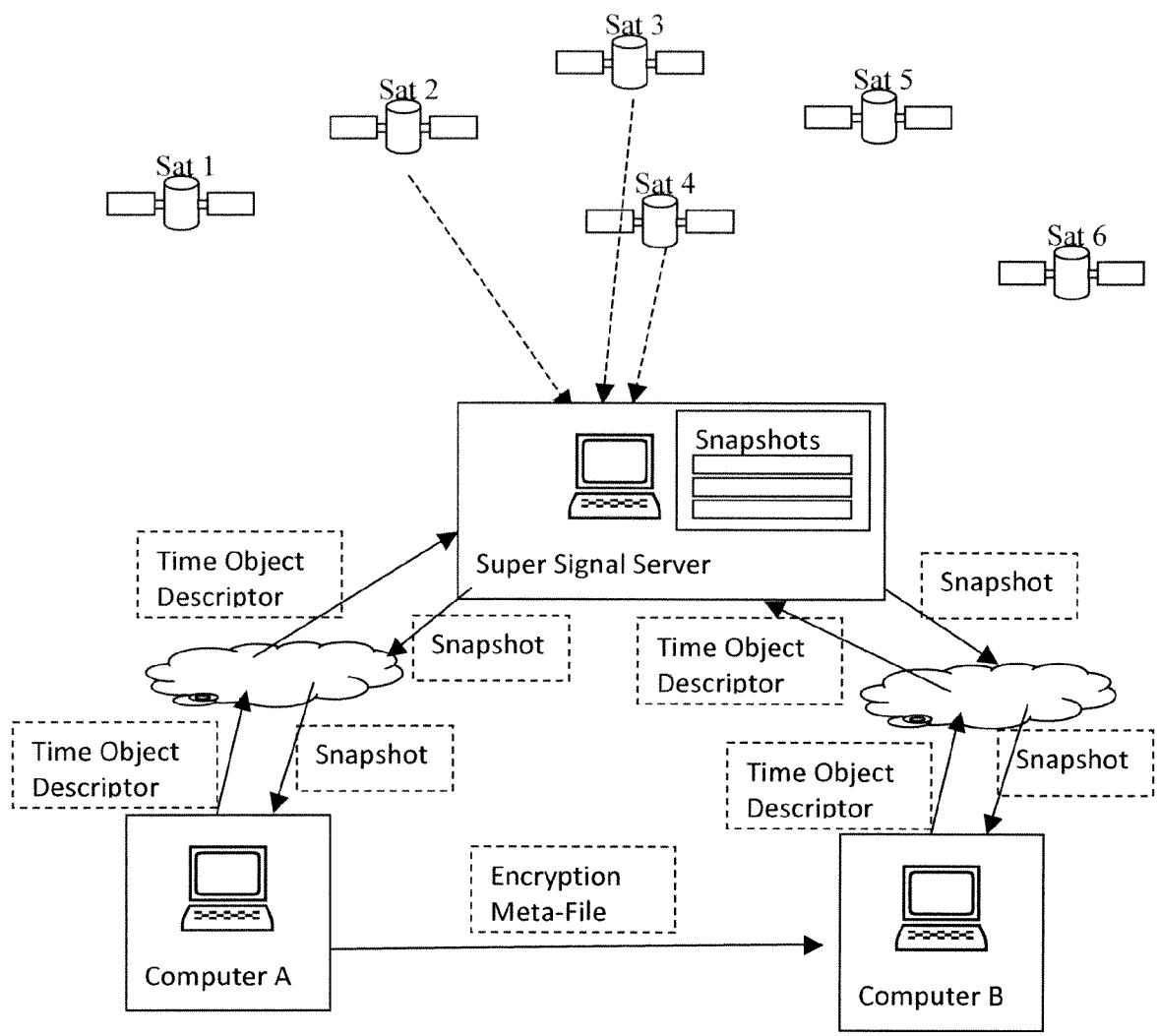
FIG. 57 The Super Signal Server . . .

In another embodiment the Super Signal server receives, instead of an object generated from an instance of the Seeding Object Class on each computer, the seeding object itself, transmitted in a packet that also contains the address of the other computer. The Trust DBMS on the Super Signal Server generates the snapshot file by executing the Seeding Object to identify the snapshot files from the streams to be returned to the computers, and sending the resulting stream back to A, and then to B as well, having parsed B's address from the packet, protecting it on each leg with the associated hardwired ELD. In either case the Super Signal server returns a common snapshot file to the computers, as illustrated in FIG. 57. The computers, using the Stream Processor Class, generate a test file and an endless loop, and they process the mirrored snapshot files as previously described, to find the matching bytes and feed the Stream Encryption Logic Engine.

The Time Object Descriptor may designate a future time, subsequent to the latest estimated time that either of the computers could receive the Super Signal, so that the Super Signal servers executes the object at a point in time that is late enough to ensure that both computers receive it before the signal passes. In this embodiment the Super Signal Server returns not the snapshot files, but the actual ELD that results from processing the bytes matches. The Super Signal Server itself processes the bytes matches to obtain that ELD.

In another embodiment, when the time for parsing the Super Signal is far enough in the future, there may be a handshake between each computer and its Super Server. The Super Signal server feeds the entire Super Signal to both the computers without resorting to snapshots, in real time. Both computers process the Super Signal in real time, as it is received; but this does not mean that they must process it simultaneously in order to generate the bytes matches that feed the logic generation process. This is possible because for the purposes of the invention all that is required is that the two computers receive the same signal: not that they receive it at the same instant. (This would not be true if the objective were position calculation instead of random logic generation).

In yet another embodiment, one using a peer-to-peer architecture for the computers, the Super Signal server is eliminated. Both computers use the mutual object resulting from their Seeding Object Class to select a channel, as previously explained. Then, the computers search for a particular peer computer that receives from space the channel selected. Instead of a central server, search is used to identify one of the peer computers with a receiver that is in receipt of the selected channel. The counterpart computers executes the same search, as they share the same Seeding Object, to build the mirrored logic, with the Seeding Object Class providing the common trigger on both computers for the chain of logic prep steps that reach out to find the peers receiving the channel specified in the process triggered by the common seeding object on the computers. The search is executed individually on each computer, and there is no need that they contact the same computer to serve as the origin of the satellite data. Again, they only need to receive the same data feed: they do not need to receive it in the same instant, or from the same peer. With each computer in receipt of the common data (though it may be received from non-identical peers) the other instances of the Seeding Object Class build the Secondary ELD in the manner described previously.

This approach requires a handshake between each computer and its respective peer, in order to receive the datacast from the selected channel. The datacast that Peer One provides to A, and that Peer Two provides to B need not occur simultaneously, and it is of no moment that A and B receive the datacast from different peers. The only requirement is that each computer contact one peer that is in receipt of the selected GPS datacast that will serve as the input into the mirrored logic process. The reception of the datacast be each peer may occur simultaneously, and the computers process each matching datacast in real time, using the DSP on each computer. Because the peers receive the data from space, the communicating computers, A and B, don't have to. The snapshot approach is forgiving from the timing standpoint, and the peers may return snapshots to A and to B instead of a real time signal. By equipping only some of the peers, instead of each computer, with GPS reception capability the cost of the network is reduced.

Figure 58:
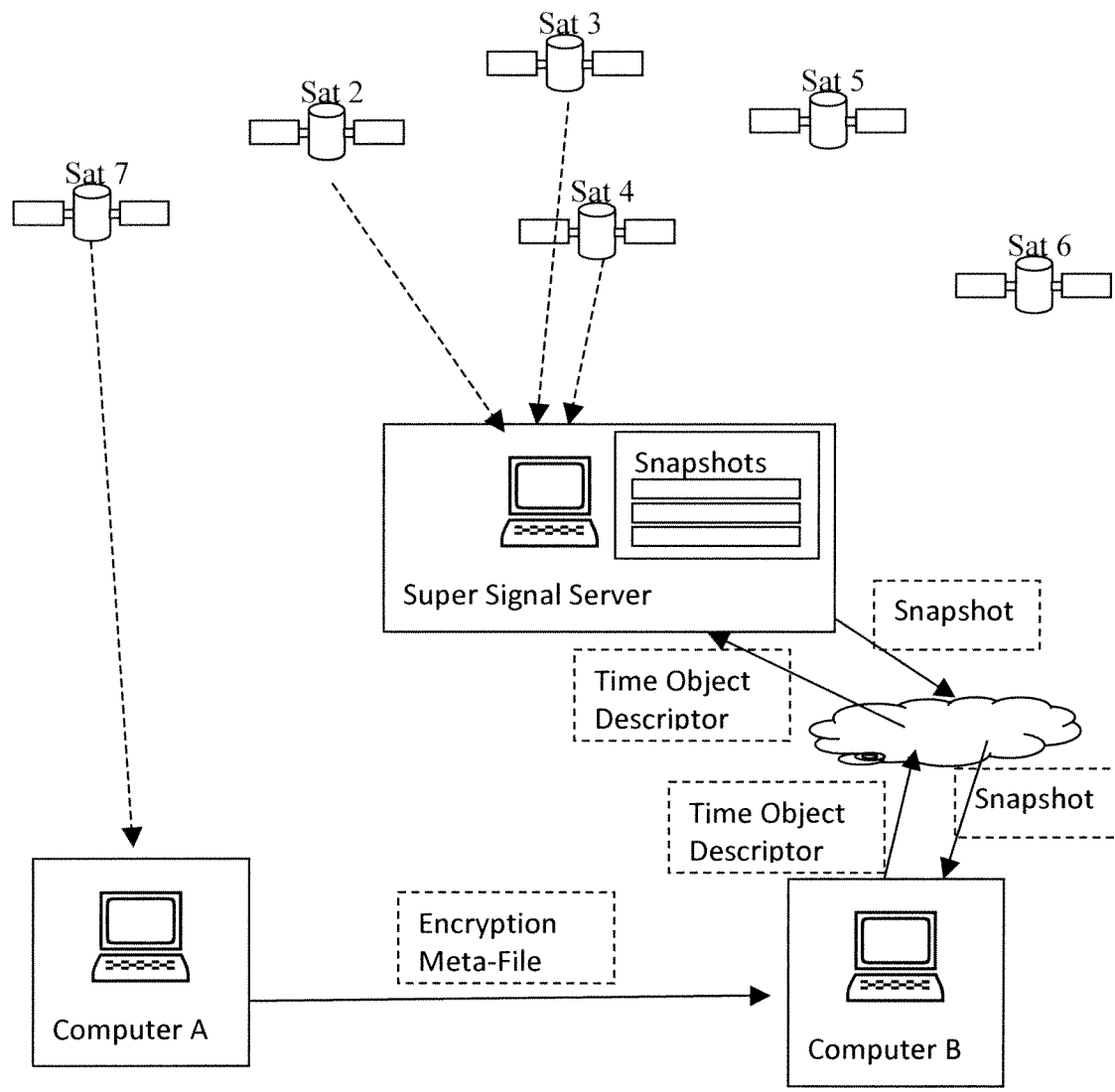
FIG. 58 Retrieval of Snapshot from Super Signal Server . . .

Each individual computer may have at all times a set of enrolled trusted peers so that all of the GPS signals world wide are available to the individual computer at all times. That individual computer may enjoy a hard-wired ELD that links it to its peer set, for extra security. This approach, as illustrated in FIG. 58, allows all of the peers to enjoy satellite reception by allowing the peers who do not have it to communicate with the satellites through the peers who have it. A hard-wired ELD may be used to connect the peers without reception to a trusted set of peers who have it, using the Trust DBMS technique.

In yet another embodiment, a hybrid architecture, a snapshot is transmitted by the Internet to A, but B obtains the satellite data by direct satellite reception. As in the prior example, it is of no moment that A receives the signal later than B. This is so because each satellite data input generates the output from the bytes matching process is identical irrespective of the moment in real time when the satellite data input was received. When the data transmission is partly by Internet and partly direct from the satellite, the data still may be processed at approximately the same moment, in real time and using a DSP, as soon as A and B receive that data. But the important point is that the peers receive the data simultaneously from space, not that the bytes matches be generated simultaneously.

The peers may contain DSP's and atomic clocks to download the GPS data simultaneously in real time. The Time Object Class receives an identical input from the Seeding Object Class on each computer, and that object specifies a future time for each peer to harvest the satellite datacast. A and B, after generating the Time Object, search for a peer that happens to be in receipt of the specified channel, and A and B transmit that object to the peers that are identified through the search. There is no need for them to find the same peer, although the may be required to do that in one embodiment. (If A and B do use the same peer, there is no potential timing discrepancy as in the case when each uses a different peer). The only requirement is that the peer or peers use the common Time Object that the computers have generated. The peers execute the moment indicated in the time Object identically, by identifying that moment in the received data.

The execution step on A and B may involve a DSP that executes the bytes matching in real time as the signal is received, so that the execution is in real time even though the receipt of the data from space is not simultaneous.

In the hybrid approach, one computer uses a peer and the other receives the GPS data directly from space. The receipt of the signal in the hybrid approach is not simultaneous because one data reception is direct from space, but the other is from a peer found through search, or from a Super Signal Server transmitting on the Internet. The only requirement is that the moment the datacast is seized be far enough in the future to allow for the latency inherent in the fact that one of the computers, the slower one, does not receive the signal directly from space. The hybrid approach is illustrated in FIG. 58.

Combined data delivery means—data delivery by satellite to A and data delivery by Internet to B from the Super Signal Server—also may work with the snapshot method, using the CPU instead of the DSP. The first snapshot file, the one received on A directly from the satellite, still can be compared to an identical snapshot received by B through the Super Signal, emanating from the other side of the world, even though they are not received simultaneously, using the CPU to process files instead of using a DSP as just described. The snapshot files are not compared in real time, because they are static files, so checksum may be used.

For CPU execution, all that is required is that the streams be captured, saved as a snapshot, and marked with the time tags. With that the streams, the snapshot files on each computer, can be compared by instantiating the Stream Processor Class. Each side of the logic circuit obtains the bytes matches required to generate the Secondary ELD. So in this embodiment the Super Signal is not a live feed of data, but merely a segment selected from one or more streams, which contain time tags and are saved as snapshots. Again, this need not happen simultaneously on the computers. The comparison process involves bytes matching, and this is merely something that happens to files and therefore does not have to occur in real time.

The Stream Processor Class may execute the bytes matching either on the computers, or on the Peers when the Peers receive the satellite datacast. In the latter case, each peer may receive from its respective computer, and return to that computer, data which is encrypted by a hard-wired ELD.

In order to enable this peer implemented hard-wired ELD functionality, trust must be established in advance between the computer and its respective set of peers, as explained previously. The Trust DBMS provisions the Secondary ELD's that match A to A's set of trusted peers, and match B to its own set of peers. A Trust DBMS is provided on all of the peers, and a state controller on each peer governs whether that computer is to consume a datacast prepared by another peer, or prepare a datacast for someone else.

If there is any imprecision in coordinating the two portions of the datacast that A and B process to generate the encryption logic, the "zeroing in" function, using the time stamps to load the Seeding Object Class and generate the input to the Stream Processor Class, may be used to compensate for the imprecision. The same zone of time in the datacast may be identified by A and B, irrespective of whether the datacast arrives by Super Signal or by direct satellite transmission. With either transmission means, the Stream Processor Class is loaded on both A and B, as just explained. This approach works when some of the computers are not equipped with a DSP, because the CPU processes the snapshots as files offline.

The Time Object Descriptor Class may resolve any timing issues arising out of the fact that the computer receiving the Super Signal takes longer to obtain its satellite datacast than the computer receiving that data directly from space, simply by identifying a moment for the mutual harvesting of the datacast by A and B that is far enough in the future to provide a margin of error. With a margin of error there is assurance that A and B will, through the peers acting as their surrogates, capture the signal in time, which is to say before the moment described in the Time Object has passed. Because of the elegant timing functionality of GPS, a person skilled in the art of satellite data transmission may perceive that there are many techniques for synchronizing the clocks of GPS receivers (using atomic clocks, dedicated time radio stations, Network Time Protocol, etc.), and many techniques to compensate for the difference in elapsed time between A receiving the satellite data used in the dynamic encryption process, and B receiving the same data. Many approaches will work to synchronize the direct reception of the satellite signal and the Super Signal, so that all of the computers can receive all of the GPS satellite signals worldwide in a way allowing any GPS datacast whatsoever to be used as mirrored inputs into the encryption logic engines of all the computers, regardless of the geographic origin of the signal, whenever they communicate. For example, there is no issue about missing the window when snapshot files are used, because in this embodiment the signal is saved as a file.

In one embodiment the Super Signal may be the only source for the satellite signal that the computers receive and process. This approach allows the computers not to require any satellite antenna or satellite reception circuitry. The network card is all that is required to receive the data, because the entire signal arrives over the Internet as a Super Signal.

There may be another embodiment in which a single server on the Internet transmits the satellite signal, and the server instead of transmitting a Super Signal only receives the four GPS signals emanating from the satellites with which the server happens to be in reception, transmitting only those. The four signals are captured by the server (but for redundancy a network of servers may be used). The difference in this simplified embodiment is that only four GPS datacasts are used to generate all of the logic for the entire network of Protectors. The server, or a redundant network of several, relay the four-satellite GPS data to the Protectors. An endless loop fictitious signal may be used to time the other four and provide another signal for bytes matching. Because with this approach no computer requires any satellite reception capability, there is no requirement that all 24 signals be present: there is no need to compensate for the fact that two computers happen to be on opposite sides of the earth.

In this four satellite version, when the Protectors generate the mirrored random input into their logic engines, each channel may be compared to the fictitious channel present on the signal server using the endless loop technique, instead of comparing one satellite channel to another. In a related configuration, an endless loop signal may provide the channels used in the bytes matching, after being be synchronized by the GPS signals. The four GPS signals may synchronize one or more endless loop channels, with only the endless loop channels instead of the actual satellite data channels providing the encryption logic randomness input to the computers. The timing on the server is then used to set the timing on the clocks of the computers. The endless loop may provide raw signals that are processed in situ on the computers via bytes matching, or may provide native ELD's with the GPS signal providing only timing.

In one embodiment using four GPS signals, each computer loads the Channel Selector Class using the output of the Seeding Object Class. Then, with the channel selected, the Stream Processor Class on the computer generates an instance of the endless loop and matches it bytes to the bytes of the selected channel. (Since the data is not used to establish position, it is of no consequence to use only the satellites covering part of the earth instead all of it to capture the random data feeding the logic engines). The Protector computer in this embodiment receives all of the satellite data from the Internet, using its network card, and none of it from space. Therefore, no computer requires GPS reception capability.

Figure 59:
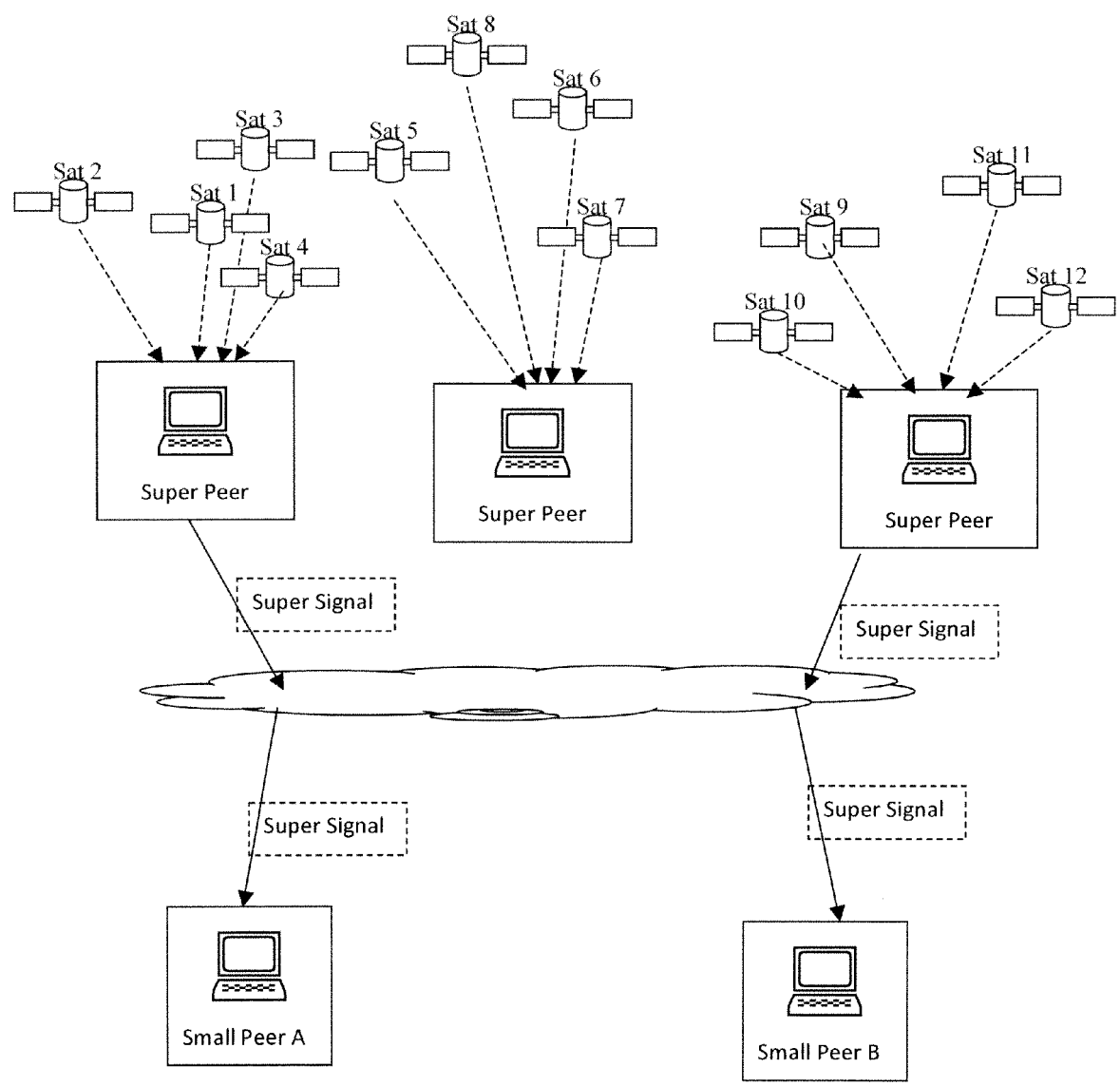
FIG. 59 Peers without Satellite Reception Obtaining It through Trusted Peers . . .

There may be another peer-to-peer architecture for transmitting the satellite signal, in which some of the Protector applications are Super Peers, having the capability of a server that receives the GPS Signal and re-transmits it to the remaining computers that have no GPS reception capability. The Super Peers require the GPS circuitry and antenna, and each peer so equipped receives four GPS satellites at once. The computers without GPS reception capability are called the Small Peers. The Small Peers are Protectors that consume the Super Signal but do not produce it, given that they have no GPS reception capability. FIG. 59 shows this architecture.

When the Protectors enroll on the network, incentives may he provided to encourage the proliferation of the GPS Super Peers. Because a Super Peer is more complex it costs more, so incentives are in order. For example, a central server may be used for enrollment and billing, as explained previously. The user profile is recorded on the enrollment server, and if the user has purchased and installed the GPS circuit card required for that computer to operate as a Super Peer, the monthly charge for licensing that Protector is reduced. There may be a software billing module on the both the Small Peers and the Super Peers (see FIG. 59.) The Super Peers share in the revenue from the subscription fees of the Small Peers, and the billing and enrollment server calculating the amount and causing the deposit of that sum to the Super Peer's electronic bank account. Another approach is for the provider of the encryption service to own and operate all of the Super Peers. There may be a billing module on the Super Peer software, and on the Small Peer software, so that that each time a Small Peer receives data from a Super Peer, a charge payable by the Small Peer to that Super Peer is recorded on the billing server and the Super Peer is paid.

The point of the Super Peers is to allow all of the computers on the face of the earth to use the various GPS data streams as the logic input into the dynamic encryption process to create mirrored encryption logic shared by the counterpart computers, no matter where the computers are located. The Super Signal is one way to do it, but it comes at the cost of resorting to terrestrial transmission means, as the Super Signal arrives at the computers via a network such as the Internet.

Figure 60:
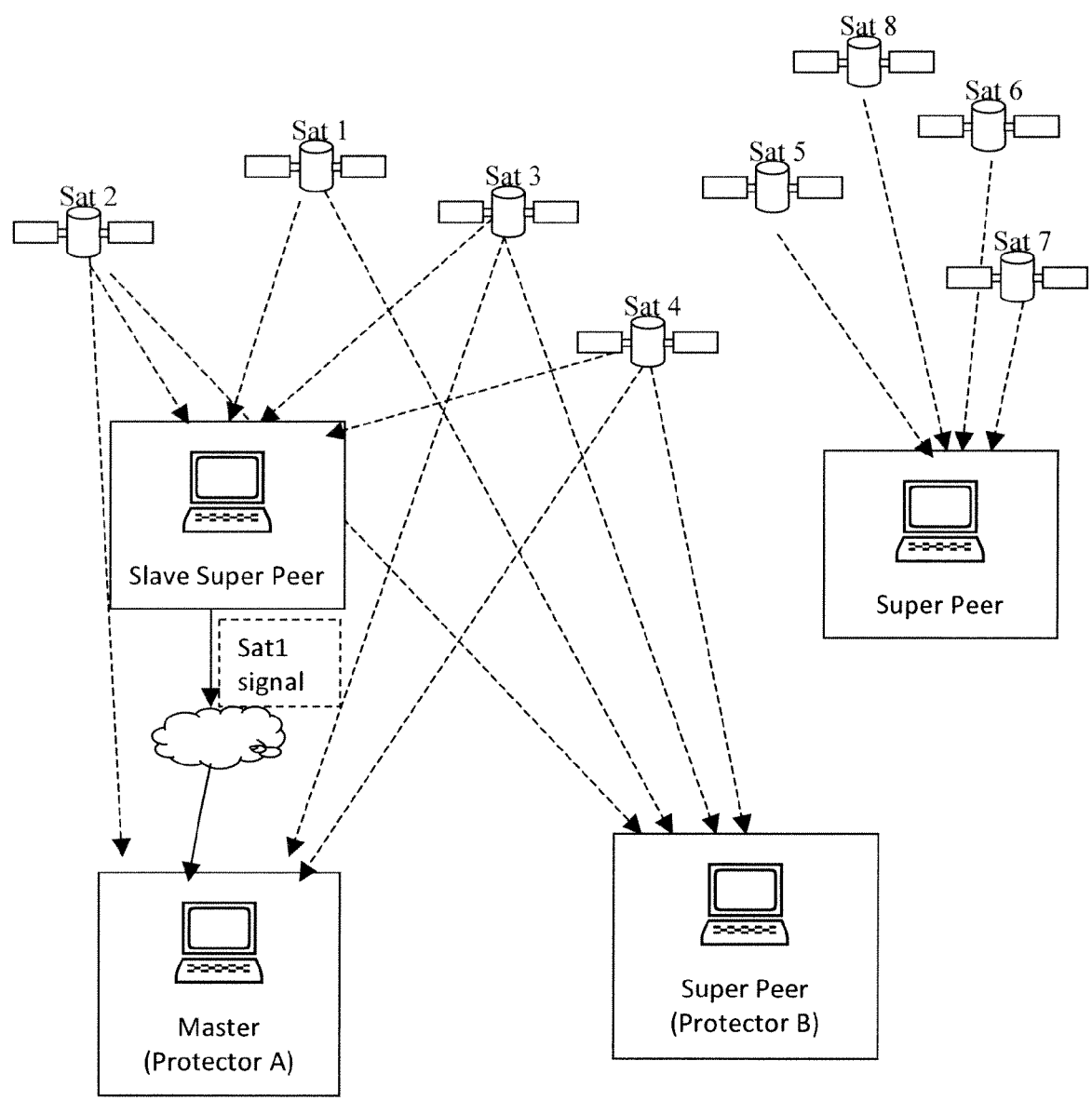
FIG. 60 Peer Architecture with Each Peer Receiving at least One Satellite Directly . . .

Another hybrid version is possible, combining terrestrial data transmission means and direct satellite data transmission means in the same process, taking advantage of the following fact. No matter where on the earth two computers are located, each of them is within reception range of at least three GPS satellites. This means that when a mirrored logic circuit using satellite datacasts is created for the dynamic encryption, at least half of the mirrored satellite data stream used to generate the circuit may arrive at the computer directly by satellite. Conversely, one may observe that in any such datacast circuit between the two counterpart computers, at most half of the circuit would have to receive its data via terrestrial means. With this in mind it is apparent that various strategies are possible to use terrestrial data transmission means as a crutch or extender to work around the fact that not all of the GPS satellites are in range of all of the computers at any one time. Having half of the satellite data stream arrive by direct satellite transmission is still a bulwark against hacking, even though it is less of a bulwark than having the entire stream arrive from space. This hybrid configuration is depicted in FIG. 60

One work-around strategy to deal with the problem of not all of the computers being in receipt of all of the satellites involves a network of Super Peers to obtain the satellite signals. The Protectors may search and find the Super Peers, to obtain the satellite data from each one. But in this hybrid configuration example the each Protector also has GPS reception capability, so both the Super Peer and the Protector may obtain GPS datacasts from space. In a slight variation to this approach a Satellite Switch and a LAN are used instead of providing GPS reception on each computer. Another characteristic of this solution is the fact that an extra Trust DBMS is provided, one on each Super Peer.

Each Super Peer operates as a relay, using the technique described previously for the Tertiary ELD process in the first Imitator embodiment. Each Super Peer contains a hard-wired ELD that corresponds to all of the Protectors with whom the particular Super Peer is in communication, trust previously having been established. The Protector, in this embodiment, has three instances of the Trust DBMS: one for its Receivers, one for its Protectors, and one for its Super Peers. As a background task, a routine constantly is running on each Protector whereby the Protector randomly selects a Super Peer, either by its address or by its global position as determined by its GPS circuitry, or by both, and the routine installs a hard-wired ELD connecting the Protector executing this routine with the selected Super Peer. The functionality of Initiator in its various embodiments, as explained above, allows the hard-wired ELD's to be installed, initiating trust between the Super Peer and its Protectors. A first Super Peer and Protector A may establish trust by enslaving a second Super Peer to act as a relay for Tertiary ELD's. Using the Tertiary ELD's, the first Super Peer and Protector A receive the encrypted Secondary ELD, decrypt it, and install it in their Trust DBMS.

The trust establishment routine for a Protector terminates when it has at least four Super Peers that are in reception of each GPS satellite and has installed a hard-wired ELD for to connect to each of the Super Peers. Providing four Super Peers for each GPS channel gives redundancy and balances the workload. The Protector, in its third Trust DBMS, accesses a private logic tunnel (a hard wired ELD) with each Super Peer as to whom the hard-wired ELD trust routine has been executed. Each of those Super Peers, likewise, has a hard-wired ELD in its Trust DBMS corresponding to each Protector that has run the routine establishing trust. This is called the Satellite Trust DBMS.

Each Super Peer has the Satellite Trust DBMS. That DBMS contains a data table containing the GPS Latitude Longitude coordinates of all Protector's with whom the Supper Peer is in trust, their id, and the hard-wired ELD pertinent to that Protector. Each DBMS, both the one on the Super Peer and the one on the Protector, may use the position data corresponding to the computers to generate an array expressing the particular group of GPS satellites with whom the Protector is in contact at any moment. The group of satellites is constantly changing, so the position data in the Trust DBMS allows the computers to keep track of the satellites that might be in touch with at any given moment because the data is updated upon an interval. The purpose of the array is to determine if the other computer must resort to a Super Peer to close the logic circuit, and if so, which Super Peers are in reception of the data not available to that computer.

When each Protector enrolls on the network it's location is placed on the Terrestrial Switch in a data table on the Switch DBMS. Another way for the computers to learn of each other's location is to provide a name value pair for that in the encryption meta-file. Because each computer knows where the other is located, it can ascertain which satellites are available for reception by the other computer and which ones are not. Ascertaining this fact allows the computer not in reception of those satellites to find one of the Super Peers which is in reception of those satellites, and use that Super Peer to supply the otherwise unavailable satellite datacasts. With the position of each computer known, ascertaining which satellites are in reception of the satellites required to provide the missing logic input for the session is accomplished using search. The search term is generated from the global position of the computer that is in direct satellite reception, and this value is associated with a Super Peer that is in reception of that same computer, and that Super Peer supplies the missing data to the other computer on the far side of the world. When one computer contacts another, the array is part of the encryption meta-file, so that the reception status of their relationship may be ascertained. The shared position data either allows the computers to know that both can receive the data directly from space, or on the other hand, the fact that one of them will require the assistance of one of its Super Peers.

The data in the array enables a search procedure whereby a first Protector, when receiving a first protected communication and therefore requiring the initiation of trust, may ascertain whether any given Super Peer with whom that first Protector enjoys trust also is a Super Peer in trust with the Second Protector. The object of the search is a profile that each Super Peer prepares and keeps current that globally expresses all of its trust relationships. This allows the computers to find at least one Super Peer with whom both computers enjoy trust.

The purpose here is that it is possible to identify a Super Peer to act as a relay with trust to both computers, so long as both have previously established that trust. As in the case of the Tertiary ELD, the Super Switch mimics the Terrestrial Switch approach in that it has a Secondary ELD corresponding to each Protector. This means that the Super Peer, once "enslaved" as shown in FIG. 60, can transmit the encryption data it harvests from the satellite to each computer in a protected state, using each respective Secondary ELD, after the Super Peer has looked them up in its Trust DBMS.

Another way for the computers to find common trusted Super Peers is for each Super Peer generates a profile file that is searched on the cloud, and the profile identifies all of the enrolled trusted computers as well as that Peer's IP. The computers can execute a search of the profiles of the Super Peers as an initial step, ascertaining whether they can reach any common satellite. If both computers are in range of the same satellite, neither Protector will need the assistance of that Super Peer, as each Protector can get the datacast unaided. But if they are not, searching the Super Peer Profiles on the cloud allows them to identify the common trusted Super Peers. Through this search capability the Protector is apprised as to whether a first Super Peer with whom a second Super Peer is in trust is in contact with the unavailable GPS satellite, so that the datacast from that satellite may be provided virtually, using the Super Signal to satisfy the computer needing the substitute signal.

In one embodiment the computer initiating communication, A, prepares the array and adds it to a name-value pair on the encryption meta-file so that the other computer, B, can ascertain the satellite reception status of the first computer. Based on that information, B either reaches the same satellite using its own reception capability, or searches for one of the Super Peers that can reach the satellite with which A is in direct reception. FIG. 60 shows this process.

It is possible to build a more complex Secondary ELD connecting A to B, a Secondary ELD that requires a reciprocal satellite data input, an input actually received from space from each computer that is provided to the other computer. In the reciprocal embodiment both computers receive one data input directly from space and another one from one of its trusted Super Peers. The Secondary ELD requires both inputs to load. So in this embodiment this step just described happens on both Computers, not merely on A. This complex approach is more secure because both computers, not merely one, receive part of the encryption logic data directly from space. This means that each computer must receive at least some of the satellite data by other than terrestrial means, so that hacking is frustrated on both computers.

Both in the reciprocal embodiment and the simpler embodiment not requiring reciprocal satellite data inputs, each computer enjoys its own secure set of Super Peers. Between each computer and the set of Super Peers with whom it has established trust, there may be a unique Secondary ELD. The lookup capability that each computer enjoys in respect of the Super Peers with whom it has a private logic tunnel, through the Secondary ELD, allows each computer to virtually extend its satellite range by relying on the signal provided by the Super Peer, as a fictitious signal used in the bytes matching. By this means each computer in the world can securely obtain any GPS signal, from anywhere in the world, to load the Stream Processing Class and perform the bytes comparison process that generates the input into the mirrored encryption logic engines no matter where the computers are located. Each computer at all times can receive data to input into this class directly from at least one satellite, and in some instances, depending on chance, the two computers will have be in reception range of a common satellite. But if one of the satellites is out of range, a Super Peer that is in range of that satellite provides this missing link to the data stream from that satellite, protecting that transmission to the computer by a Secondary ELD. Security is assured, because as a background task each computer constantly maintains, using its Trust DBMS, the capability of initiating an encrypted handshake with at least one Super Peer at every point on the earth's surface. By this means GPS coverage is extended worldwide.

Whenever two Protectors are not in reception range of a common satellite, the Super Peer provides the missing signal, supplying it virtually over the Internet. But how does the Protector who requires that signal locate that Super Peer? The computer requiring the missing signal finds the Super Peer who has it by search. An index value identifying the channels in reception range of a given Super Peer are a searchable value corresponding to that peer's IP address, its global position, or both. The values may be part of an profile file that is constantly updated and searched on the cloud. The Super Peer updates its profile identifying the satellites that happen to be in range during a specified time interval. When Computer A searches for the profile of the Super Peer that will supply virtually the signal that the other computer, B, receives directly from space, the profile returned form the search specifies one or more Super Peers in reception of the satellites that B receives directly. A reaches one of those Super Peers, causing that Super Peer to supply the missing satellite datacast. If A is not in reception of the same satellites of B, the global position of B is associated with a Super Peer that is, with statistical near certainty, is in receipt of the same satellites which B can reach but A cannot. If the position of B and the Super Peer so selected merely overlap, instead of being identical, and the particular computer with whom A is in contact does not happen to enjoy at that moment satellite reception identical to the Super Peer which A has located, an exception is thrown. A's attempt to initiate trust with B fails, and the process repeats. Another Super Peer is found, by a second search, and the process starts anew.

In another embodiment, the Super Peer is eliminated, and each Protector instead of being a Small Peer as shown in FIG. 60 is in effect a full Super Peer. In this version, each Protector can receive satellite data for its own immediate use, or be enslaved by any other Protector, per need, to provide the data that the other Protector cannot reach.

This is similar to the approach of using the endless loop to provide the missing signal, in that virtualization is used. The virtualization provided by the Super Peers does not exclude the endless loop virtualization approach in carrying out the bytes matching process that yields the encryption logic input. Both virtualizations may be used in the logic build for the secure communication sessions occurring through the private logic tunnel between A and B. The bytes matching process executed in the Stream Processor Class may include a real satellite signal, a substitute signal from a Super Peer, and as well, a fictitious endless loop signal generated locally on the computer or its related Switch, with the Stream Processor Class using all three streams in the bytes matching. Snapshots of all three kinds of signal may be employed, and if a DSP is present real time execution of the three streams may occur too.

In order to allow each Protector to express to the other Protector whether the Super Peer process is needed in a given instance, the encryption meta-file sent from one Protector to the other in this embodiment may contain a name-value pair identifying the particular GPS satellites with whom the Protector generating the meta-file is in range. The satellites are not geosynchronous, so to accomplish this the Trust DMBS of each Protector may contain a geographical coordinate corresponding to its global position, and the coordinates are associated with the particular satellites at a particular moment in time. The position of the network of satellites may be expressed in a profile, a moving map which each Super Peer prepares and uploads to the cloud at an interval, in the process deleting the old profile, which is at that moment out of date. An algorithm may allow Computer A to look up the position of Computer B and determine, first, if they are close enough to one another to allow the mutual reception of n number of satellites, and second, if they are not that close, which Super Peers are the closet to the Computer B, so that Computer A may enslave the closest one, as shown in FIG. 60. If A is not in range of at least one of the GPS satellites that is in range of B, A executes the routine that searches for and contacts a geographically appropriate Super Peer, thereby virtually extending A's range, and A receives the input from the Super Peer using encryption through the hard-wired ELD connecting A to that Super Peer.

By this technique, logical coherency is virtualized across the entire GPS satellite network. In one embodiment the computer initiating the communication, A, is always the one that receives the satellite feed directly from space, instead of from a Super Peer. In another embodiment, the logic circuit is not complete until B replies by transmitting a response meta-file to A, which describes the origin of the data that B has used to generate logic from B's direct satellite feed, and A has to find a Super Peer to match that data and introduce it into A's Stream Processor Class. With this approach, at least some of the satellite data in every case and on every computer is received by non-terrestrial means, in each act of communication, because each computer is in range of at least three of the GPS satellites.

The process is complicated, but it need not occur in every instance of communication, because the mirrored ELD creation process is only used when trust needs to be established. This is an instance of Imitator. As to the Plain-Text ELD's, Computer A can generate them without regard to the actions of Computer B, because a Plain-Text ELD is not dedicated to the specialized purpose of generating a private logic tunnel.

The use of Super Peers is not limited to satellite data originating on GPS satellites, as it also works with entertainment oriented satellite datacasts, such as HD television or XM Radio. For example, consider the circumstance of one satellite radio network covering North America and the Caribbean, and a second network covering the rest of the world. (This situation exists as of 2013). The technique just described can virtually extend coverage worldwide, using the two satellite radio networks. The North American computers use Super Peers in contact with the non-North American satellites, and vice versa. The use of Super Peers in this examples allows worldwide coverage in a manner allowing at least one of the snapshots processed by the Stream Processor Class arrive at one of the pair of computers via satellite. As to differences in the signal from the two satellite radio networks, a Reconciliation Class, using the techniques described above, may be included as part of the Stream Processor Class to provide mutual intelligibility between the two satellite entertainment broadcasting networks. The signals when reconciled may be processed by a DSP, in real time, or using the CPU and snapshots. When snapshots are used, reconciliation may not be not needed because the Stream Processor Class converts the streams into compatible snapshot files as part of the inherent functionality of that Class.

In one highly orthogonal embodiment satellite entertainment data is used alongside GPS data. GPS chipsets are ubiquitous, small, and inexpensive. In light of this fact it makes sense to combine both satellite networks, so that the third Initiator embodiment using XM radio provides the logic to generate the encryption at the edge, and GPS is an independent logic layer that is used to authenticate the users who communicate by confirming their geographic position. This approach is apropos when specialized hardware is used.

When under the circumstances the Super Peer must be invoked to extend virtually the range of one of the computers, the information concerning the missing data stream is provided to that computer by a Super Peer within range of the other computer which the first computer randomly selects when the search is executed. The existence of the private logic tunnel through which the virtual stream data is sent from the Super Peer to that computer makes the data very hard to crack. The snapshot file virtualized on the Super Peer may be encrypted by a Plain-Text ELD, and then that ELD is encrypted by the hard-wired ELD. This technique is broadly applicable to any satellite network in which not all of the satellites are accessible by all of the computers.

Figure 61:
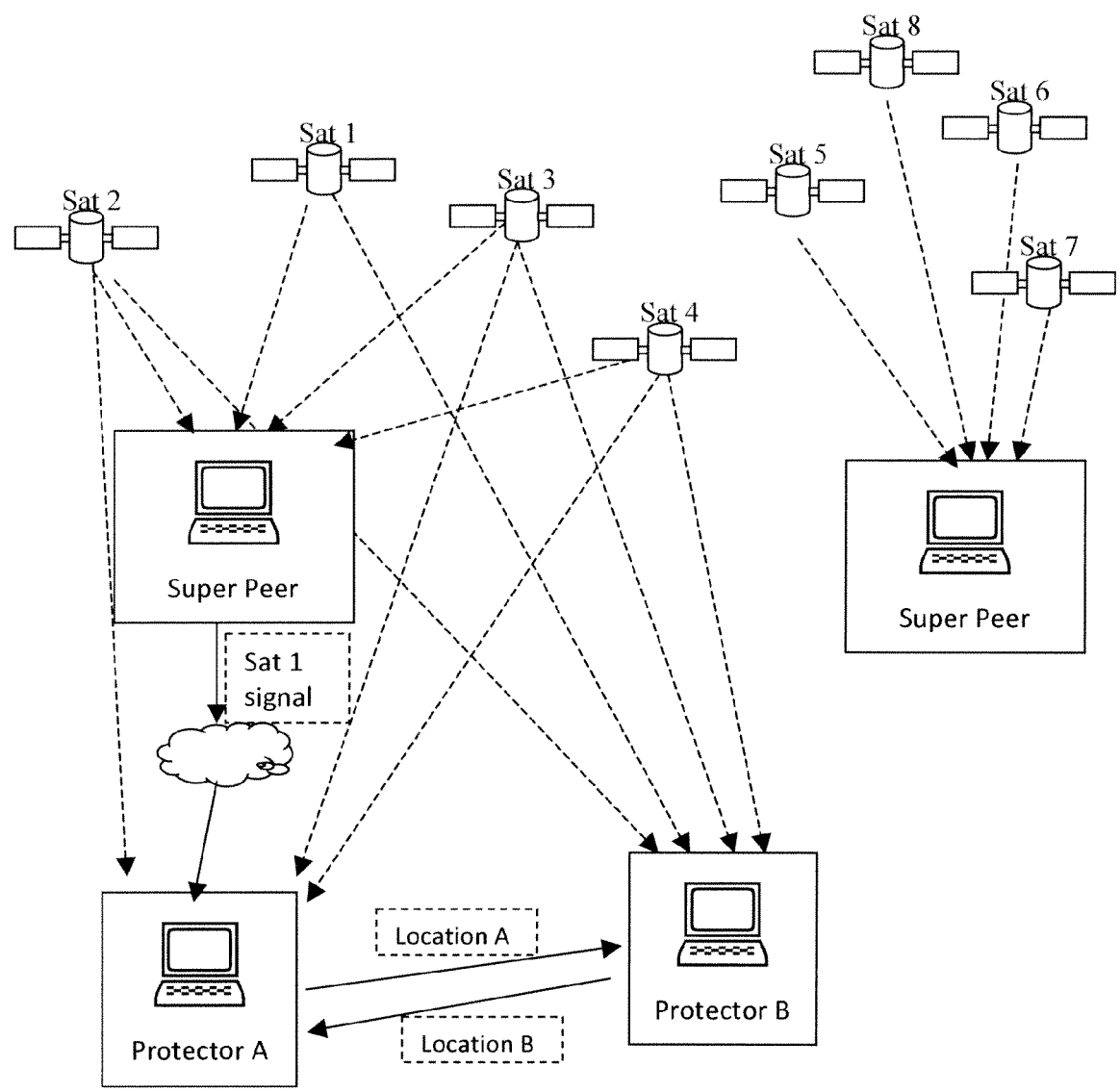
FIG. 61 Super Peer Architecture with Reciprocal Direct Data Receipt from Space . . .

The security advantage of satellite data transmission means is preserved so long as at least one of the parties receiving a stream that will be processed in the mirrored logic receives that stream directly from the satellite instead of form a Super Peer. In one embodiment, two computers when in first contact compare the location of each, to determine if they are in range of a common satellite or not. If not, each one chooses one of the satellites as to which it is in range, and uses a stream from that computer to feed the Stream Processor Class. There are therefore at least two direct satellite data inputs (at least one for each computer) with the computer in range using that satellite for the live feed part of the signal that it will process, and the other computer matching that data input by obtaining it from a Super Peer. Then on the other computer the obverse happens, in a reciprocal process. This means that an interloper would have to crack two data feeds coining directly from space, one to each computer. As to the matching data feeds from a given satellite, one leg comes in via Satellite in real time, and the other is received in scrambled form, thanks to the Secondary ELD of the Super Peer connected to the other computer. Position based authentication also may be used, through the GPS data that each computer receives from space. FIG. 61 illustrates this dual reciprocal technique.

Figure 62:
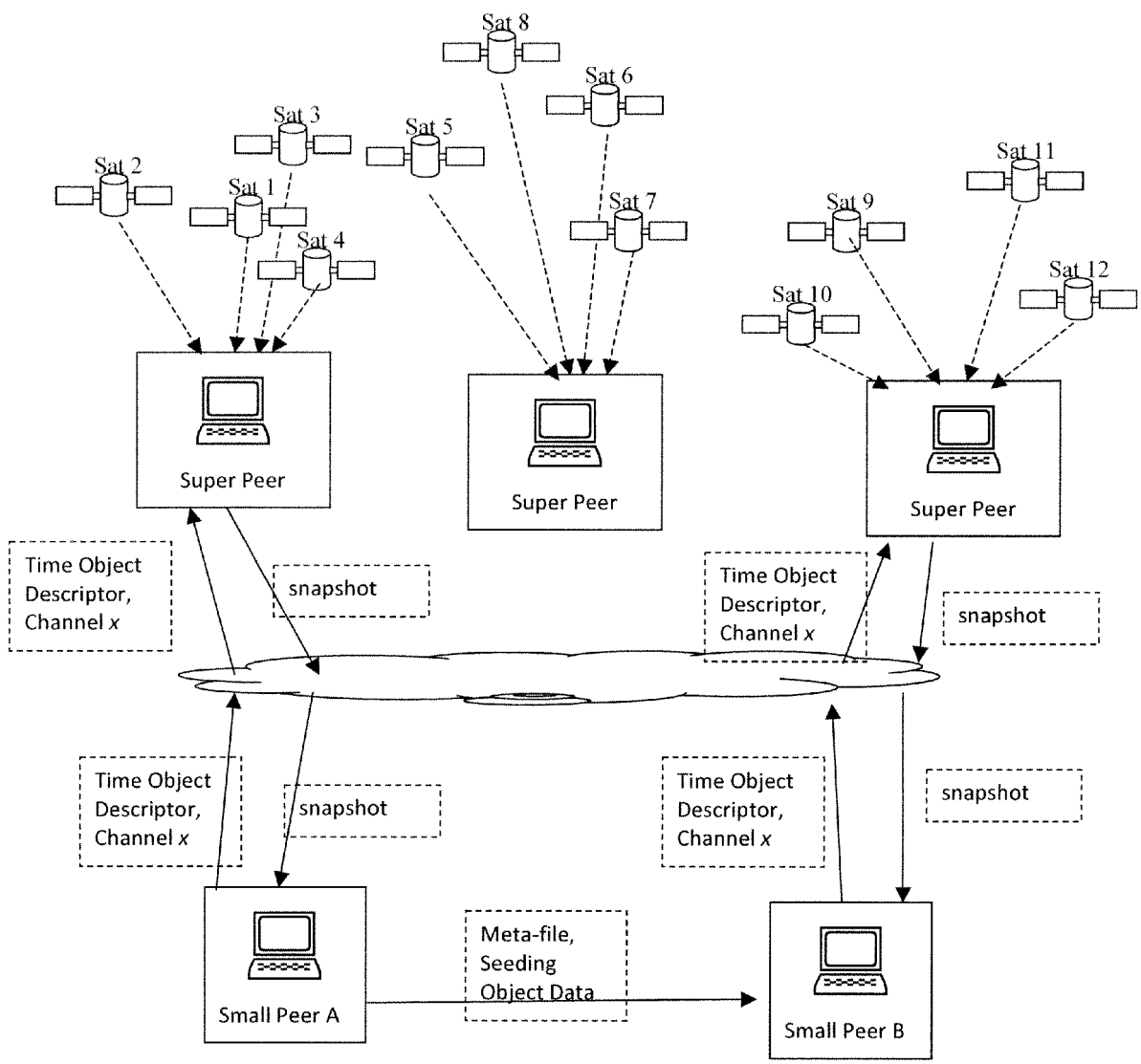
FIG. 62 Super Peer Network with Trust DBMS and Hard-Wired ELD's . . .

When Super Peers are used in another, simpler embodiment, no Protector has any GPS reception capability at all: only the Super Peers have it. The fact that each Protector enjoys a hard wired ELD with the Super Peers with whom it is in contact means that when the Protector receives a snapshot file, or sends a Time Object Descriptor to the Super Peer or for the matter any other data, it all is encrypted via a private logic tunnel. The Satellite Trust DMBS stores the Secondary ELD's that connect each Protector with its own set of Super Peers, and looks up and executes that Secondary ELD in each instance automatically and as a background task. The system architect may deem the existence of the Secondary ELD to provide adequate security, even though in this embodiment requires that all of the data travel from the Super Peer to the small peer via terrestrial means. See FIG. 62.

The moment of time in the satellite data stream that is specified in one embodiment, instead of being a past time using a snapshot file that the Super Peer already has prepared, may be a future time which the Time Object Descriptor specifies for the snapshot file to be generated, with enough delay to assure that the Super Peer has adequate time to process the request for the snapshot file. The snapshot file may be generated on the Super Peer but not processed on it. The Stream Processor Class may be present on the Super Peer, but it may be more secure to include the Stream Processor Class only on the Protectors, so that the bytes matching process occurs locally. When the bytes are matched on the computers instead of on the Super Peers the only data that passes from the Super Peer to the Computer is the raw data, instead of the matching bytes, and this makes the system harder to crack. The bytes matching process may be generated by a Seeding Object, and when the snapshots are processed on the computers the Super Peers have no contact with the operation of the Seeding Object Class.

There may be a multi-step process given effect through an algorithm in which, first, the Time Object and Channel selection are generated on the Protector, and then the Super Peers are found by search, provided with the Time Object generated on the computers, and they select the data channel and use the Time Object to harvest the data from space. This process on the Super Peers is triggered in mirrored fashion by an instance of the Seeding Object Class on A and B. When Computer A sends the meta-file to Computer B, Computer B uses the output of the Seeding Object Class to generate the Time Object Descriptor, which may include the channel selection value. A uses the same Seeding Object data to generate the same Time Object Descriptor. Then each computer searches for an appropriate Super Peer, and using the Secondary ELD, transmits the Time Object Descriptor to its trusted Super Peer. The Super Peers execute the Time Object Descriptor in mirrored fashion. On each Super Peer the Time Object results in matching snapshot files of the signal from space that are captured on each Super Peer and downloaded to the respective computers. This is all shown on FIG. 62.

The Time Object Descriptor may specify a future time in order to allow for the latency inherent in the process of B searching for the Super Peer that corresponds to the satellite which fed the data to A, so that the Super Peer supplies the information before that future moment passes. This approach may be used when the Super Peers use a DSP to process the datacast in real time. B transmits the Time Object Descriptor to the Super Peer it has searched for and located, using the hard-wired ELD to protect the object during transmission. A generates the same Time Object Descriptor as B, again using the Seeding Object Class. B sends the same Time Object Descriptor to a Super Peer, just as A has done.

The Super Peers that A and B use may be different. It does not have to be the same Super Peer because both Super Peers receive the same data feed from space. Only the data from space that needs to match, but this can be accomplished without the computers using the same peer.

Both A and B, by searching for one of the peers in its respective set, reach one of the Super Peers transmitting the channel specified, and the Time Object Class is loaded by the output from the Seeding Object Class, identically on each computer. The Super Peers may not use a DSP, using instead the CPU and buffering to process the datacast as a file. Each Super Peer executes the Time Object Descriptor, obtains the snapshot file corresponding to that time and channel, and returns the snapshot to the enrolled computer that uploaded the object. The Time Object Descriptor is uploaded to the Super Peer, and the data from space that the Super Peer obtains by loading the Time Object Descriptor Class is returned to the requesting computer. Both the upload of the Time Object Descriptor from the Protector to the Super Peer, and the Super's download of the data harvested from space, are encrypted by the Secondary ELD that connects each Protector with the Super Peer it has selected to provide the snapshot file (though the hard wired ELD is not shown in FIG. 62).

To conclude this examination of how trust is established in an encrypted network using the embodiments, the following should be observed. Four embodiments of Initiator have been shown: (1) a version using purely terrestrial data transmission means that protects the Secondary ELD's in transit using Tertiary ELD's, (2) a hybrid system that supplies the Plain-Text ELD's via terrestrial means but supplies the Secondary ELD's by transmitting them directly from space, (3) a version that eliminates the terrestrial means of transmission as to all of the data needed in the encryption logic process, by providing the whole of the data directly from space, and by giving each Protector with its own logic engine and generating a mirrored input into it by matching the bytes of a first satellite datacast to the bytes of a second datacast, and (4) a similar version that uses a real or virtual GPS signal and a fictitious signal, or combination thereof, to create the bytes matches. The third and fourth embodiments generate Secondary ELD's, as do the first two; but the third and fourth embodiments may create the Plain-Text ELD's as well.

A person skilled in the art can perceive that these techniques may generate Encryption logic that varies from session to session, providing authentication at the same time, without using the Protector-Receiver architecture and without using primarily software, and by using satellite data from space. For example, the Initiator embodiments one through four above may be adapted to firmware, operating in a smart phone, and in this approach neither a Protector nor a Receiver client application would not be needed. The satellite data might simply generate a key, operating on the two computers in a mirrored fashion. To a greater or lesser extent, the functionality may be supplied in a plug-in board, shifting the process from software to firmware. A similar observation that a person skilled in the art may make is the fact that the embodiments just described using global positioning satellites are not limited to GPS. Nations such as China, Russia, India, and the EU have created rival satellite navigation systems, and mutatis mutandis the techniques described are equally applicable to those systems.

Programmatic Detail

The Protector Database Management System

The Protector implements several local databases. The databases may use the SQLite format, due to its robustness and compactness. The entire database, both the executable and the data it uses, is contained within single SQLite file. This means that an entire database file may be encrypted by an ELD. In the embodiments the databases may be: comm, contacts, files, firm, rights, travELDrive.

The comm database stores data used for communication between a professional and a client. This data is used later by the Report Card module, which grades the Professional's communication with his or her clients in terms of timeliness. The contacts database as its name implies stores the data of the Professional's contacts, i.e., the clients. The files database is used for storing information concerning meta-files, i.e., their names and headers, so this data may be looked up whenever a file search or file download is requested by a colleague within the same firm or group as that Professional.

A DBMS is also used in the Travel Drive functionality. The Travel Drive concept involves storing specially selected files in a secure data subsystem, such as a thumb drive or a designated drive on a laptop. The drive is reserved for sensitive data needed on a business trip. Professional travel can be dangerous to one's data because sensitive information may be lost or stolen, much to the detriment of the client. The purpose of the travel drive is to compel the laptop user to make an election, whenever he travels, about which files are truly required to be removed from the secure network for the business purposes of the trip, so that all the remaining files can remain behind on the network. Then, an ELD encrypts the specially selected files for the trip. After the business trip is over the files put in the travel drive are erased. The methodology may be described as enforcing a procedure for data withdrawal only on a need to know basis.

The Travel Drive contains a copy of the files needed on the trip, and the originals remain on the LAN. Per the Travel Drive functionality, whenever the Protector detects the Travel Drive function has been used, the files that were taken are eliminated after the trip is over. An audit trail may be generated, to force the traveling professional to account for the data that he moves from the LAN to the laptop, and establish that he has restored it to a secure status by erasing the files at the end of the trip. The audit trail lets the network administrator compel the network users to account for their data, and the erasure step following the trip may be a forced background task following a warning.

In order to manage all of these databases the Protector Database Management Module is used. This module is used to create the database at design time, and to insert the data into it and retrieve and delete data from it at runtime. The module is used whenever the Protector-Receiver architecture makes use of a DBMS.

In all of instances where a DBMS is to be used, if the file of an SQLite database does not exist the Database Management module creates it. The code for the detection of the existence of a database may be as follows:

```
1. public boolean existsDatabase(String databaseName, String path)
2. {
3.     String filePath = path + databaseName;
4.     Java.io.File file = new Java.io.File(filePath);
5.     return file.exists( );
6. }
```

If the return value of the previous listing is false, the database is created. The database creation code may be as follows:

```
1. public void createCommunicationDatabase( )
2. {
3.     String commDBName = "comm.sqlite";
4.     com.database.LDBMS ldbms = new com.database.LDBMS(dbDir, commDBName);
5.     String fieldNames[ ] = {"recipient","filename","filesize","date","sent"};
6.     String fieldTypes[ ] = {"VARCHAR", "VARCHAR","VARCHAR", "VARCHAR", "VARCHAR"};
7.     int fieldLengths[ ] = {255,255,50,100,10};
8.     ldbms.addTable("communication", fieldNames, fieldTypes, fieldLengths);
9.     ldbms.createDatabase( );
10. }
```

This code creates the comma database. Line 4 creates the instance used to manipulate the SQLite database. All of the databases that described above have only one table. The names of the fieldNames of the table are stored in an array (see Line 5). When the table of a database is created, the data types of each field are needed, as well as their length, and these values are stored in an array in lines 6 and 7. In line 8 the data needed to create the table are added, and in line 9 the database is created.

A generalization of the previous code, usable to create any database, is the following:

```
1. public void createDatabase(String dbName, String tableName, String[ ] fieldnames, String[ ] fieldTypes, int[ ] fieldLengths)
2. {
3.     com.database.LDBMS ldbms = new com.database.LDBMS(dbDir, dbName);
4.     ldbms.addTable(tableName, fieldNames, fieldTypes, fieldLengths);
5.     ldbms.createDatabase( );
6. }
```

The code for retrieving data from a database may be as follows:

```
1. public Hashtable retrieveData(String dbName, String table, Vector fields, String cond)
2. {
3.     com.database.LDBMS ldbms = new com.database.LDBMS(path, dbName);
4.     Hashtable results = ldbms.selectData("workgroup", fields, cond);
5.     return results;
6. }
```

The parameters received by the method are the name of the database to be accessed, the table that is going to be queried, the fields that are going to be retrieved, and the condition to filter results.

Line 4 executes an SQL query of the form "SELECT [fields] FROM table WHERE Cond," where [fields] is the list of fields that are going to be retrieved and Cond is the condition that restricts results (for example "ID='123456789'." In this case, only the record that has the ID value of '123456789' would be retrieved). The results are stored in a hash table. The code for inserting data into a table may be as follows:

```
1. public void insertData(String dbName, String table, Vector
field,
                                                   Vector
values)
2. { com.database.LDBMS ldbms = new com.database.LDBMS(dbDir,
dbName);
3.    ldbms.insertData(table, values);
4. }
```

The parameters of the method correspond to the name of the database, the table to be updated, the fields and the values to be inserted. The insertion occurs on line 3, where the LDBMS (SQL Lite database) instance executes an SQL statement of the form "INSERT INTO table (fieldD1, field2, . . . , fieldN) VALUES (value1, value2, . . . , valueN)".

Data can be updated with new values. This is done by the execution of an SQL statement that has the form "UPDATE table field=new_value WHERE cond", and cond is the condition that restricts the update of the field to the record that conforms to it.

The code executing this statement may be the following:

```
1. public void updateData(String dbName, String table, Vector
fields,
                                      Vector values, String
cond)
2. { com.database.LDBMS ldbms = new com.database.LDBMS(dbDir,
dbName);
3.    dbms.updateData(dbName, field, values, cond);
4. }
```

The last type of transaction that is performed on a table of a database is the deletion of records, shown in the following code:

```
1. public void deleteData(String dbName, String table, String
                                    keyField, String
keyFieldValue)
2. { com.database.LDBMS ldbms = new com.database.LDBMS(dbDir,
dbName);
3.    ldbms.deleteRecord(table, keyField, keyFieldValue);
4. }
```

The SQL statement that is executed by the LDBMS is "DELETE FROM table WHERE keyField=keyFieldValue".

Programmatic Detail

The Contacts Manager

The Contacts Manager is the module on the Protector that administers the contacts of the Professional. This module has the Trust DBMS containing the Secondary ELD's, and the Cognitive Signature locks it. It is unlocked when the user submits a true Mnemonic Input, and it may be encrypted by AES. In one embodiment for professional networks the contacts may be of two kinds: Colleagues and Clients.

This dichotomy corresponds to the two dimensions of communication in the Protector-Receiver architecture, the horizontal and the vertical. The horizontal dimension is from professional to professional, which is to say, from Protector to Protector. The horizontal dimension is where Initiator comes into play. The vertical dimension is from the Protector to his client set, to his Receivers. The vertical dimension uses the pre-installed Secondary ELD that the Protector provisions on each Receiver application when the Protector auto generates it, so the vertical dimension does not require the actions of Initiator. The veridical dimension ELD may be hard-wired into the Receiver, or in the multi-Protector version, looked up from the Receiver's Trust DBMS.

Figure 63:
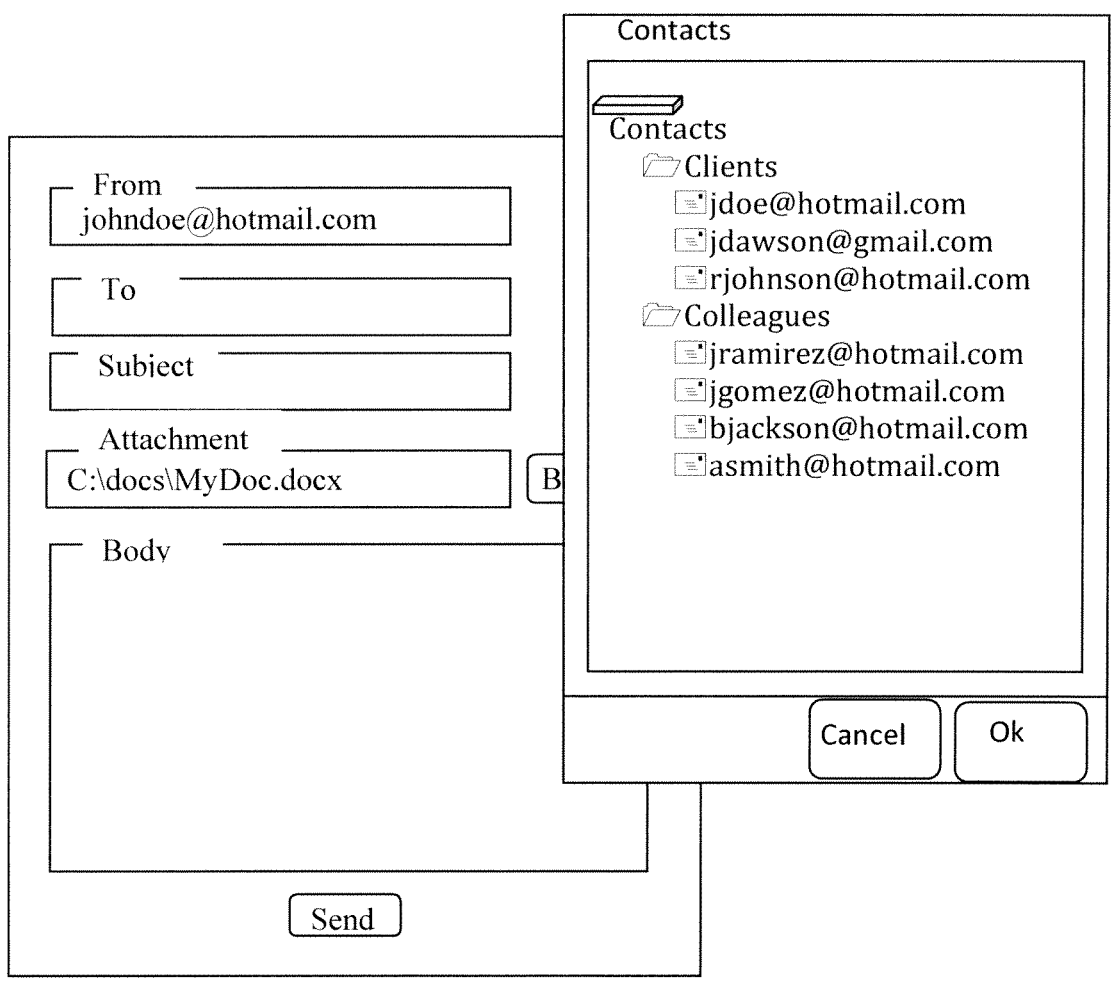
FIG. 63 Contacts Frame of Protector Application . . .

Whenever the professional is going to create a new email and select the contact to receive it, the contacts may be displayed in a tree view. The tree in one embodiment has two branches: Clients and Colleagues. In another embodiment there is a list view with sorting options, instead of a tree view. In another embodiment there is no view, but a text box for search instead. The contacts frame where the tree is displayed is illustrated in FIG. 63. Whenever the frame is going to be displayed (by clicking the "Contacts" button on the Protector GUI), this command executes the proper method on the Contacts Manager Module.

The following may be the code on the Protector that displays the contacts frame:

```
1.public void actionPerformed(ActionEvent e)
2.{
3.   if(e.getSource( ).equals(buttonContacts))
4.   {
5.     Class[ ] types = {boolean.class};
6.     Object[ ] values = {Boolean.TRUE};
7.     String method = "displayContactsFrame";
8.     String module = "contacts.manager.ContactsManager";
9.     ModuleLoader.executeModuleMethod(module, method, types,
values);
10. }
```

The method ("displayContactsFrame") is dynamically executed through the module loader, in line 9. The parameters and data types of the method are given in the types array and the values of the parameters are given on the values array. The parameters correspond to a single Boolean value.

Programmatic Detail

The Template Manager

The Template Manager is a module that lets the Protector create, store, read and display emails based on templates. Templates are useful in cases where an email is going to be sent to different people but the form of the email is the same, with the content differing only in some parts such as the name of the recipient. The module also may be used as an index referencing templates created under a third party application, such as MS Word©. Templates may be downloaded from the cloud. The Template Manager also may be used to streamline the creation of legal pleadings during on-line litigation, such as in the Lit Linker application described below.

Templates are simply emails where some attributes are left blank. Some of this attributes are the recipient, the attachment, and some parts of the body. For instance, a template can be the following:

```
From: johndoe@gmail.com
To: _____
Subject: Dear _____
Attachment: _____
Body: Dear _____, today _____ [date] _____ I send
you this email to inform you of your case. . . .
```

Whenever an email is created under the Protector, it can be saved as a template before it is sent if the author wishes to do so. When the template functionality is used in online litigation, the caption in a given case, which is repeated in each pleading, may be captured as a Template to obviate repetitive typing. The code for saving an email as a template may be the following:

```
1. public void saveAsTemplate(String subject)
2. {
3.    meta-file.xml.Header header = Header.Factory.newInstance( );
4.    Vector<meta-file.xml.Pair> vMetaPairs = new Vector( );
5.
6.    meta-file.xml.Pair metaPair = Pair.Factory.newInstance( );
7.    metaPair.setName("SENDER EMAIL");
8.    String sender_id = parent.invokeMethod("getUserId");
9.    metaPair.setValue(sender_id.getBytes( ));
10.   vMetaPairs.add(metaPair);
11.   metaPair = meta-file.xml.Pair.Factory.newInstance( );
12.   metaPair.setName("CONTENT");
13.   String meta-filesPath = parent.invokeMethcd("getMeta-filesPath");
14.   Java.io.File rtfFile = new Java.io.File(meta-filesPath+"tmp.rtf");
15.   Object[ ] values = {rtfFile};
16.   parent.invokeMethod("saveRTFDocument", values);
17.   byte[ ] fileBytes = file.io.FileIO.readFile(rtfFile);
18.   byte[ ] encBytes = encrypt(fileBytes);
19.   metaPair.setValue(encBytes);
20.   vMetaPairs.add(metaPair);
21.   metaPair = Pair.Factory.newInstance( );
22.   metaPair.setName("MATTER");
23.   Header matterHeader = emailProcessor.getMatterHeader( );
24.   for(int i=0; i<matterHeader.sizeOfPairArray( ); i++)
25.   {
26.      String matterName = matterHeader.getPairArray(i).getName( );
27.      if(matterName.equals("RE"))
28.      {
29.         byte[ ] subjectBytes = encrypt(subject.getBytes( ));
30.         matterHeader.getPairArray(i).setValue(encSubject);
31.      }
32.   }
33.   XFileDocument matterXml = emailProcessor.getMatterXml(matterHeader);
34.   metaPair.setValue(matterXml.toString( ).getBytes( ));
35.   vMetaPairs.add(metaPair);
36.   Pair[ ] metaPairs = getPairsArray(vMetaPairs);
37.   header.setPairArray(metaPairs);
38.   vTemplates.add(header);
39. }
```

The template is the header of the meta-file XML (line 3). The sender of the email is stored in the first name-value pair (see lines 6-10). In line 8 is reference to the parent Object. This object is an instance of the class, GeneralObject, previously mentioned. GeneralObject corresponds to the Protector application. It is used to obtain the values of the sender's email.

In lines 11-20 the content (i.e., the body) of the email is obtained, encrypted, and added to the next npair. The value of the Content name-value pair correspond to the bytes of an RTF file that contains the body of the email.

The re line is obtained and added to a Name-value pair in lines 21-35.

The Header that contains the data of the template is created in lines 36 and 37, and the header is stored in the vTemplates Vector.

The vTemplates vector is saved as a file, as shown in the following code:

```
1. public void saveTemplates( )
2. {
3.    try{
4.       byte[ ] bytes = ObjectToByteUtil.getBytes(vTemplates);
5.       byte[ ] encBytes = encrypt(bytes);
6.       file.io.FileIO.writeFile(filePath+"tmps.ml", encBytes);
7.    }catch(Exception e){ }
8. }
```

The getBytes( ) method of the ObjectToByteUtil class (line 4) obtains the bytes of a Java Object, in this case the vTemplates vector. The bytes are encrypted, as seen in line 5, and they are saved in a file (tmps.ml).

The code that displays a template is in the Protector's main class. In order to display a template, the executeModuleMethod( ) method of the ModuleLoader is used to obtain the selected template. This code may be as follows:

```
1. public void displayTemplate(int sel)
2. {
3.    Class[ ] types = {int.class};
4.    Object[ ] values = {sel};
5.    Email email =
6. (Email)ModuleLoader.executeModuleMethod("protector.template.manager
                .TemplateManager", "parseTemplate", types, values);
7.    String subject = email.getSubject( );
8.    if(subject!=null) subjectField.setText(subject);
9.    String rtfPath = meta-filesPath + "tmp.rtf";
10.   Java.io.File rtfFile = new Java.io.File(rtfPath);
11.   byte[ ] contentBytes = email.getBodyBytes( );
12.   file.io.FileIO.writeFile(rtfFile, contentBytes);
13.   taMessage.openDocument(rtfFile);
14. }
```

In line 6 the email template is take from the Template Manager module (executing the parseTemplate method). After the template has been obtained the attributes of the email are taken and displayed on each component (see lines 7-13).

Programmatic Detail

The Protector-Switch Connectivity Library

The Protector application only has intermittent connection to the Switch, and only for limited purposes is a connection established. For example, whenever the ELD's in the Protector's magazine fall below a threshold the Protector sends a request to the Switch for more. There is a brief interval of communication for transmitting the ELD's, and then the Protector goes offline. Another reason to establish a connection, per the first Initiator embodiment, is when there is a new Tertiary ELD for the Switch to download to a Protector. The purpose of the Protector-Switch Connectivity Module is to establish a connection, whenever one is needed, by sending a request to the Switch to retrieve that data that is required. Data can flow both ways.

The basic building block of this module may be the Switch-Connectivity library, which relies on the ServerCommunicator, previously explained. All of the low level connectivity is achieved through the ServerCommunicator API. The Switch-Connectivity Library is involved when a Protector needs to initiate contact with another Protector, as the first Protector uses this module in Initiator to invoke the relay process sending the Tertiary ELD up to the Switch and then back down again to the other Protector.

In one embodiment the users of the Protector-Receiver Network enroll through an organization, using a membership paradigm. The membership paradigm is given effect through a VPN, which also implements the encryption. One of the purposes for which a Protector establishes a connection to the Switch is to allow the Switch to verify the type of membership the professional has and check on his membership status, and this may occur at logon. The Switch uses the membership data to activate (or deactivate) certain functionality in the Protector. The code for the membership data retrieval may be the following:

```
1. public String retrieveMembership( )
2. {
3.   SwitchConnectivity conn = new SwitchConnectivity( );
4.   Vector requestData = new Vector( );
5.   requestData.add("RETRIEVE_PROTECTOR_MEMBERSHIP");
6.   requestData.add(SENDER_EMAIL);
7.   requestData.add(serial_id);
8.   conn.initSwitchCommunicator(v);
9.   String mem = conn.getMembership( );
10.  return mem;
11. }
```

The vector that contains the request is created in lines 5-7. The data that is needed is, first, is the command that indicates to the Switch what action to take ("RETRIEVE_PROTECTOR_MEMBERSHIP", in this case), the identity of the Protector (the professional's email address), and the serial id of the Protector. Connection is established in line 8 and in line 9 the result is retrieved.

The request for ELDs is also sent to the Switch. The code that corresponds to this action may be the following:

```
1. public Vector retrieveELDs( )
2. {
3.   SwitchConnectivity conn = new SwitchConnectivity( );
4.   Vector requestData = new Vector( );
5.   requestData.add("ELD_REQUEST");
6.   requestData.add(SENDER_EMAIL);
7.   requestData.add(serial_id);
8.   conn.initSwitchCommunicator(v);
9.   Vector v = conn.getELDS( );
10.  return v;
11. }
```

The elements of the request data vector are similar to the one of the retrieveMembership( ) method, and it only differs in the command ("ELD_REQUEST").

The SwitchConnectivity Library is one way to supply ELD's to a network that uses values in a meta-file in the dynamic class loading process for encryption. In the SwitchConnectivity Library this is achieved by supplying the ELD's to the point of execution through a download from the network. This is not the only way to transmit the ELD's securely to the point of execution, and any system that supplies ELD's to the Encryptors in a way that allows the ELD's to arrive without the risk of being stolen while enroute and used to crack the system, will work. The "dual means" approach for transmitting the ELD's and the plain-text separately to the place where the class loading is to occur may be used, so that the ELD's cannot be garnered from the meta-file and used to hack the system. As shown above, the dual stream may be provided in the satellite embodiments of Initiator described above.

Satellite means have been described, but radio also can be used. A radio signal may be digitized through a modem, and in this way the ELD's may arrive at the point of execution by an independent path, —a route other than the terrestrial or Internet based VPN—making it harder for the hacker to crack the system than if the ELD used on the plain-text in the encryption meta-file were included in that file. Plain-Text ELD's, Secondary ELD's, or both, may be supplied by radio-based Encryption Transceivers. A network of the Transceivers, which may use HD radio, can broadcast Plain-Text or Secondary ELD's to the computers that execute them during the class loading. A Trust DMBS may be used to associate each recipient of the radio signal on the Encryption Transceiver with a frequency and time of broadcast, and in that manner the trust logic circuit is constructed at runtime, using a portion of the loop to provide the ELD's, through the radio broadcasts.

A feature of this radio based embodiment may include, embedded in the meta-file that is the first communication between the computers, a descriptor of the frequency and time, through which the two computers in need of a private logic tunnel (their common Secondary ELD) may communicate through one or more modem transceivers, and the transceivers may inter-operate as a peer network sharing synchronization data. Each computer may be associated with a particular Encryption Transceiver, or network of them. As above, there may be a "Transceiver Switch" operating a LAN connected to, instead of a satellite, an Encryption Transceiver. When a Transceiver Switch and LAN are used there is no need for each computer to have radio reception capability in order to make use of the data transmission from the Encryption Transceiver.

Using their associated transceivers, one computer or Switch may transmit encryption logic data to another, such as ELD's. The transmissions contain no plain-text, but instead, auxiliary values used in dynamic class loading, such as ELD's, which are small files that lend themselves to transmission by Encryption Transceivers. A Trust DBMS may be used on the Transceivers and on the applications (though one is not required) and by this means trust is established by provisioning Secondary ELD's on the system. To assure data coherency the test file method may be used.

Figure 64:
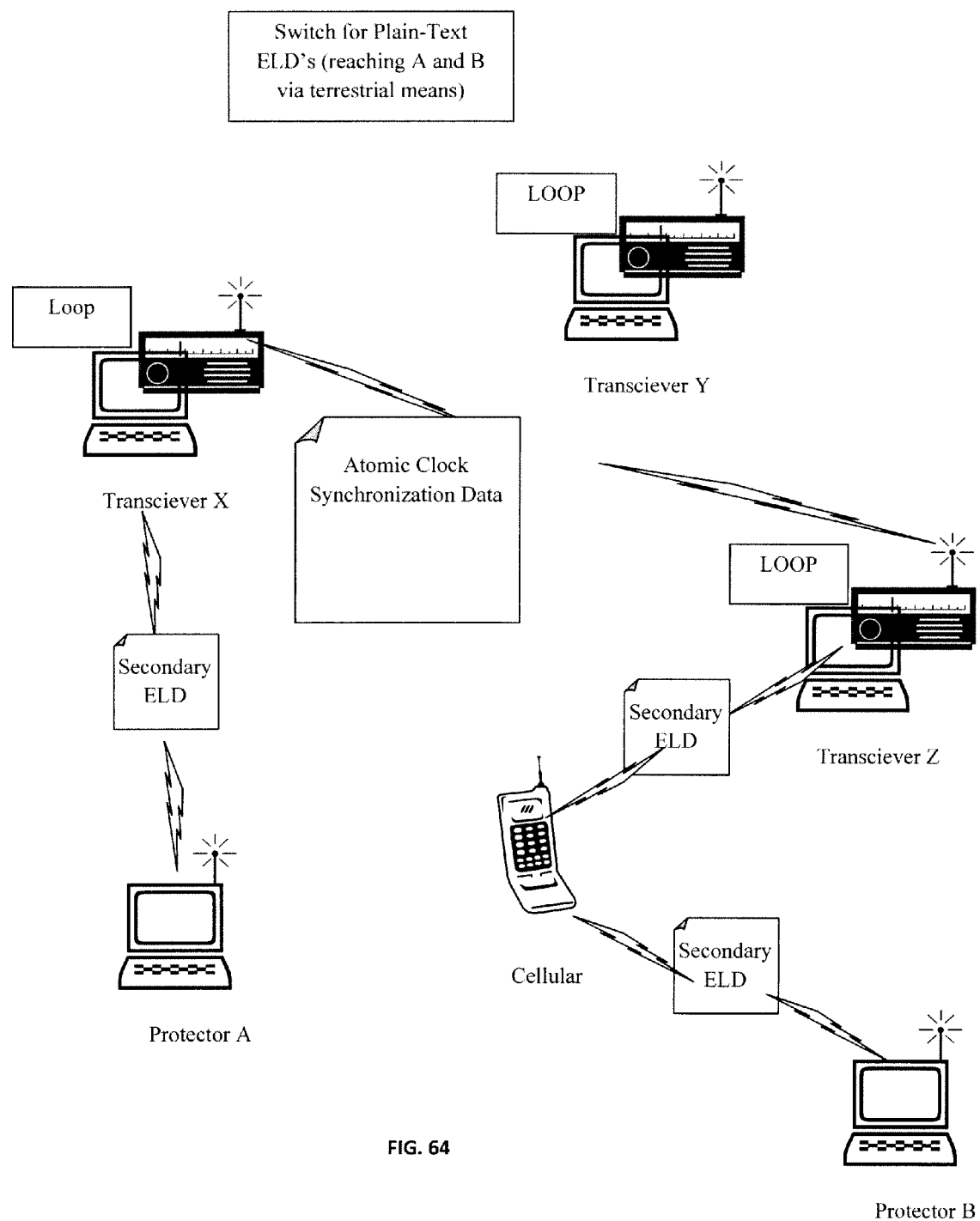
FIG. 64 Peer Network of Radio Transceivers to Transmit Encryption Logic . . .

In another embodiment, the Encryption Transceivers do not transmit ELD's or any addressing information concerning the Protectors from one Transceiver to another, but instead transmit a common endless loop of multiple data channels, and the Protectors execute bytes matching in a mirrored fashion using the data loops encryption to generate the encryption logic input. Alternatively, the endless loops may broadcast ELD's instead of random noise in multiple channels. A computer in reception range of a transceiver, through the Seeding Object Class, uses a Time Object Descriptor to receive an identified ELD selected in an endless loop, and the other computer, having used its own Seeding Object Class to generate that descriptor, uses search across the peer transceiver network to download the same ELD by generating and executing the same descriptor. The test file method may be used to assure that both computers have obtained the same ELD from the respective endless loop on the Transceiver corresponding to each. All of the Encryption Transceivers may be synchronized by an atomic clock and may execute the same endless loop. FIG. 64 illustrates this process.

Although it is not shown in FIG. 64, the Encryption Transceivers also may be synchronized by GPS data received from space. As in the Satellite datacast example, perfect timing is not required when segments of ELD's the test file approach is used by the Protectors. Also not shown in FIG. 64 is the fact that a common Seeding Object may be used on the two computers to generate the Time Object Descriptor, executing on the Transceiver, to select the Secondary ELD downloaded from A's Transceiver to A and from B's Transceiver to B. The Transceivers may use buffering and snapshot files to allow the Time Objects Descriptors received by the Transceivers to load the Time Object Descriptor Class, and identify and download to each computer the Secondary ELD so specified.

In yet another embodiment using Encryption Transceivers, the Protectors use bytes matching executed on one or more channels of random data which the Encryption Transceivers supply as a common broadcast to all of the computers, or their associated Transceiver Switches (the Transceiver based analog of the "Satellite Switch.") Routers from all of the Encryption Transceivers. Because the data is in the format of endless loops, each loop may have a common time tag structure with the other loops. This works as in the Second, Third, and Fourth Initiator embodiments, the difference being that the data arrives from the radio spectrum instead of from space. Each Transceiver may transmit a dozen simultaneous loops of random bits, on multiple channels or using multiplexing. The Encryption Transceivers receive GPS data from space to synchronize the endless loop transmissions. GPS timing data is very accurate, and the chipsets to receive and process this signal are ubiquitous. As in the satellite examples, the Protectors use a Seeding Object to generate a channel selection, and then, a positioning of the loops to carry out the bytes matching. When the computers generate the same Seeding Object, everything else follows in a mirrored chain of processes.

The network of Encryption Transceivers, selected through their identifiers, may be ordered by a DBMS so that only those within signal range of the given Protector are chosen for the encryption data transmissions. These values may be stored on each transceiver and on each Protector, on a DBMS on each. A Transceiver and each Protector within range of it may enjoy a hard-wired ELD. A Trust DBMS on both the Protector and the Transceiver may contain a table indicating the signal quality between the transceiver and its Protectors. A signal range algorithm may process this data and keep it current in real time, so that the Protector always has at least one good signal in range.

The Encryption Transceivers may constitute a network of peers. The Time Object Descriptor uploaded to the first Transceiver by the transmitting computer may include the address of the recipient computer. Based on this address, the first Transceiver looks up, on its Signal Range DBMS, the address of a second Transceiver that is in range of the recipient computer, and operating as a relay the first Transceiver sends the Time Object Descriptor to the Second Transceiver. Then, both Transceivers execute the object, thereby selecting the same ELD, and each Transceiver downloads that ELD to its respective computer. With that, both computers have the ELD they need. This approach may be used with either Plain-Text ELD's or with Secondaries.

In another version, each party is informed by a value in the encryption meta-file, and not in the radio signal, of the time and frequency of the transmission that will provide the ELD used to decrypt the encryption meta-file. (The encryption meta-file is not received by modem transceiver but by conventional, terrestrial means such as the Internet). The use of HD radio toward this end resembles the second Initiator embodiment described above.

The signal strength adequacy, to determine who is in range of each Encryption Transceiver, may be established empirically as a background task, with the transmission to and reception by the computers occurring constantly and the signal strength measured and recorded. These transmissions may include dummy messages in which no ELD is included.

The information embedded in the encryption meta-file sent by Computer A may inform Computer B as to which of the many transmissions B will receive from its associated Encryption Transceiver true transmission instead of being a dummy transmission. For redundancy multiple channels and times may be invoked, to make sure that B receives at least one working copy of the encryption logic generation data.

The obsolescence of traditional analog radio implies that the analog infrastructure might profitably be put to new use, such as the transmission of Secondary ELD's. This approach may be seen as a distributed, analog version of Initiator in embodiments two through four.

Figure 65:
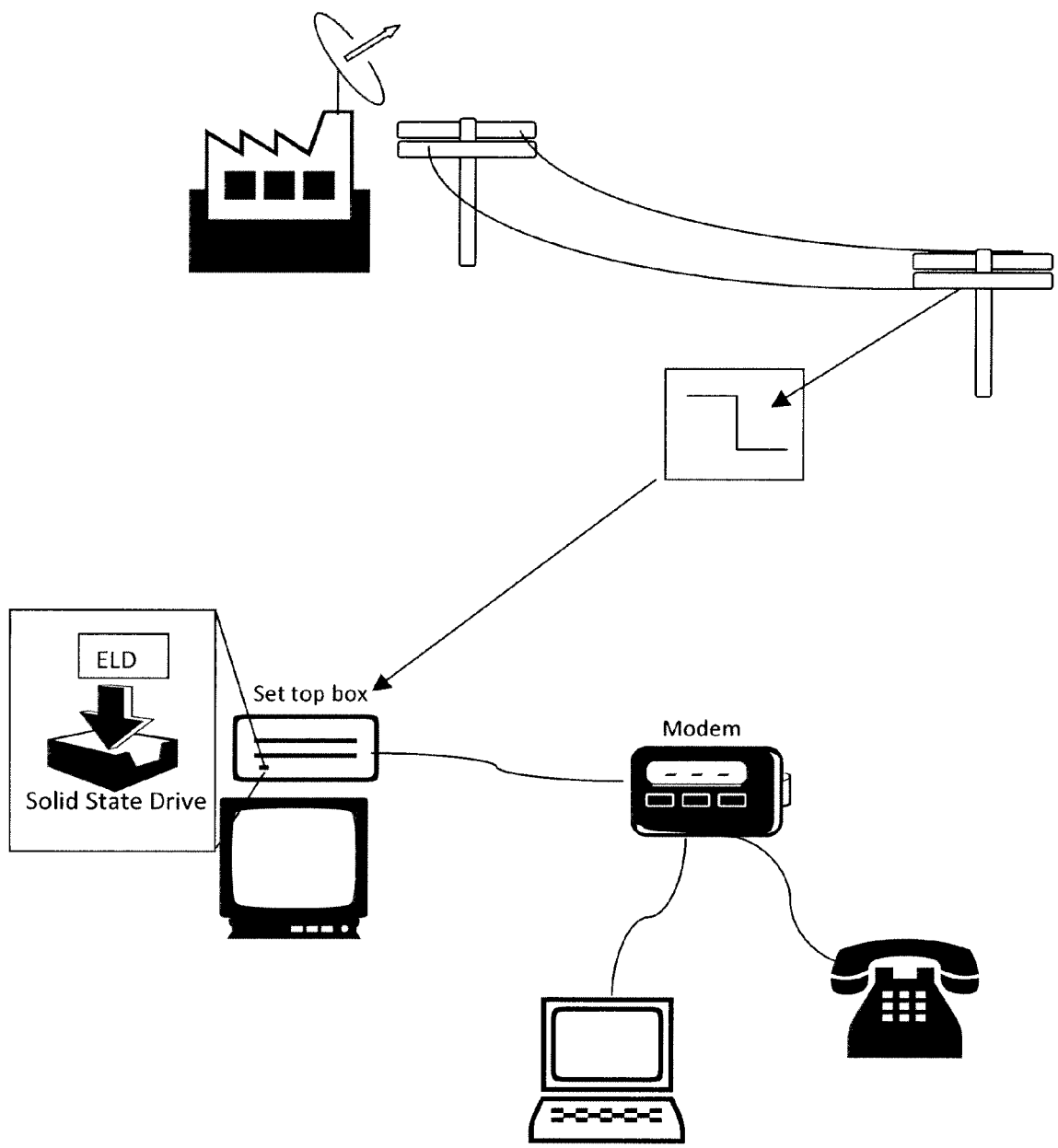
FIG. 65 Dynamic Class Loading for Encryption and Viewer Choice in Digital Television . . .

As another example of providing an ELD at its point of execution via a path non-identical to the route of the plain-text, instead of embedding the Plain-Text ELD in the encryption meta-file, consider the possibilities of digital cable television. Cable television providers supplying a digital signal to the television also supply Internet and telephone service. The ELD's may be embedded into the television signal, hidden, so that the "bucket" is the cable television signal instead of the encryption meta-file. The ELD's may be stored in memory on the set-top-box, in a small solid state drive. To operate a web of trust the television signal may be the transport mechanism for the Secondary ELD's. See FIG. 65 for am illustration of this process in one possible embodiment.

The above examples are another illustration of the flexibility that the abstraction layer approach affords in the dynamic modification of digital files. ELD's and pixelization tags (described below) are two examples of abstracting the digital file so that it is escalated in value by class loading occurring in two steps: first by first describing the transformation it undergoes, and then executing the transformation as a background task. The expression of the logic through descriptors is a step that is separate from the execution of that logic. This is the essence of the abstraction layer approach, and it gives the network architect great flexibility, even being useful in digital television applications.

The embedding of values to trigger class loading (dynamic or otherwise) is not limited to encrypting Internet messages. It may also modify a television signal, as a technique to enhance the broadcast for the purposes of advertising or viewer enjoyment.

For example, an integrated development environment or operating system for digital television allows the producer to compose the digital work in such a way that the audio and video streams are subject to algorithmic control via dynamic class loading process of the embodiments. To process the audio-digital digital signal, a set-top-box using a DSP may perform the dynamic class loading. For censorship, frontal nudity may be pixelized out at the set-top-box, and the box contains software that carries out the dynamic class loading to modify the pixels corresponding to the naughty portion of the body. The digital stream contains tags, to actuate the process, which identify the offending pixels. A binary value in the stream that is parsed, the HD television signal, modified per the embodiments, allows the user to turn the pixelization on or off by using his remote control. In the audio stream the same approach may be used to mute out offending words, when the words are identified in the stream by tags.

Figure 66:
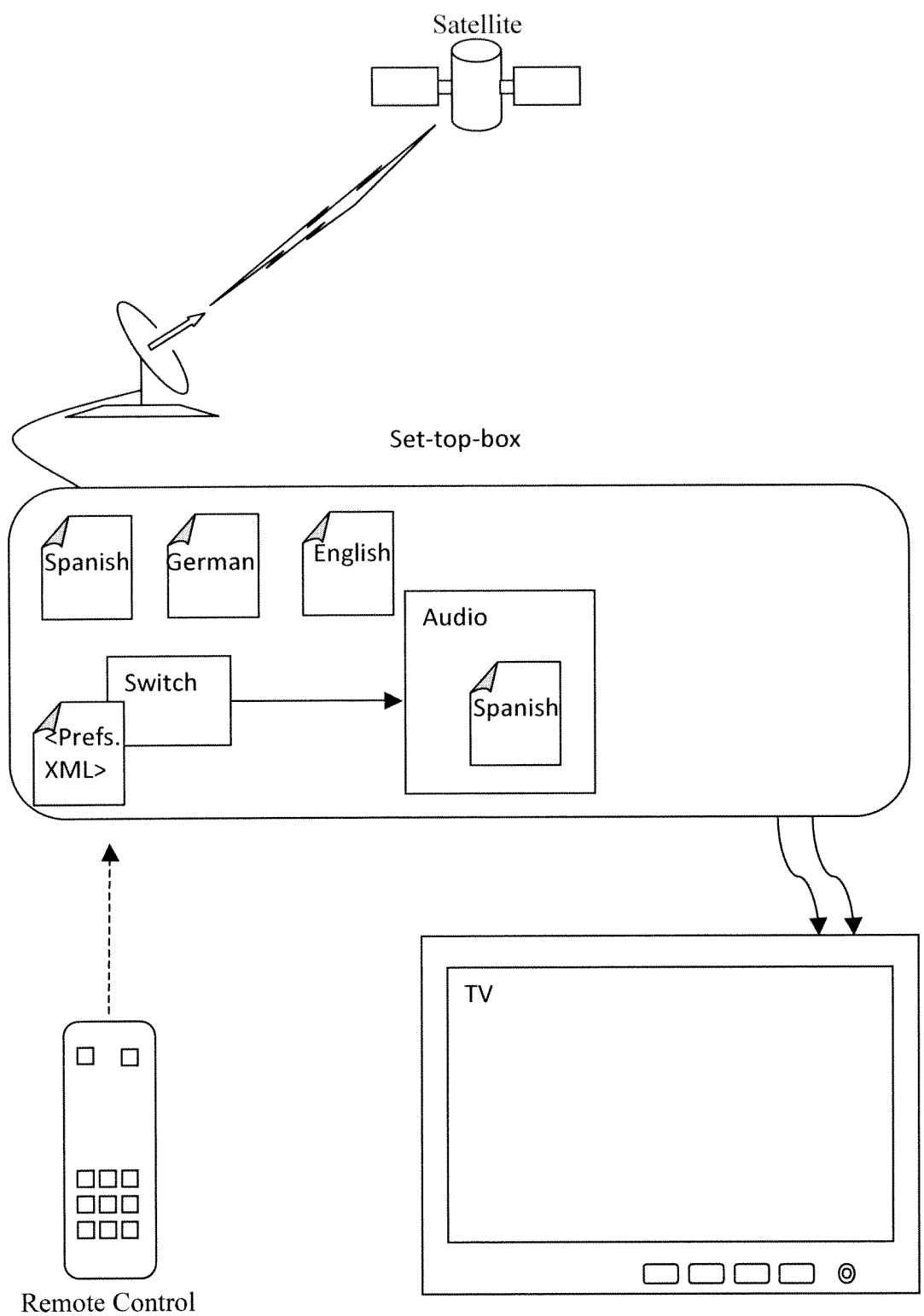
FIG. 66 Dynamic Class Loading for Digital Television for Language Selection . . .

The differential encryption of digital files, made possible by dynamic class loading, can improve parental control. Only persons over 18 may be allowed to decode an adult digital movie. Unless the viewer provides the correct Mnemonic Input, one associating the age of that person with proper digital rights, he is shut out. An enrollment procedure and a DBMS associates the adult user with his Cognitive Signature, and these values correspond to the digital rights actuated on the set top box. The dynamic class loading approach, again relying on tags in the stream, may allow the viewer to select one of multiple dubbing streams or sub titles from the streaming audio file to route to amplification, as in FIG. 66. The producer provides the languages subject to the user's selection when the digital work is composed, and the amplified language stream is selected at runtime. The same dynamic class loading approach in digital television may be used to modify the digital stream in online gaming, and the gaming console operates in a fashion similar to the set top box. Not only censorship, but also payment, may be used as the trigger that allows access or prevents it.

A person skilled in the art can perceive that using Xml-Beans is not the only way that the class loading approach may be used to provide user control over the digital television data stream at the point of reception. Using class loading per user input is generally useful as an instrument to enhance the viewer experience and give the viewer autonomy over what he sees.

Figure 67:
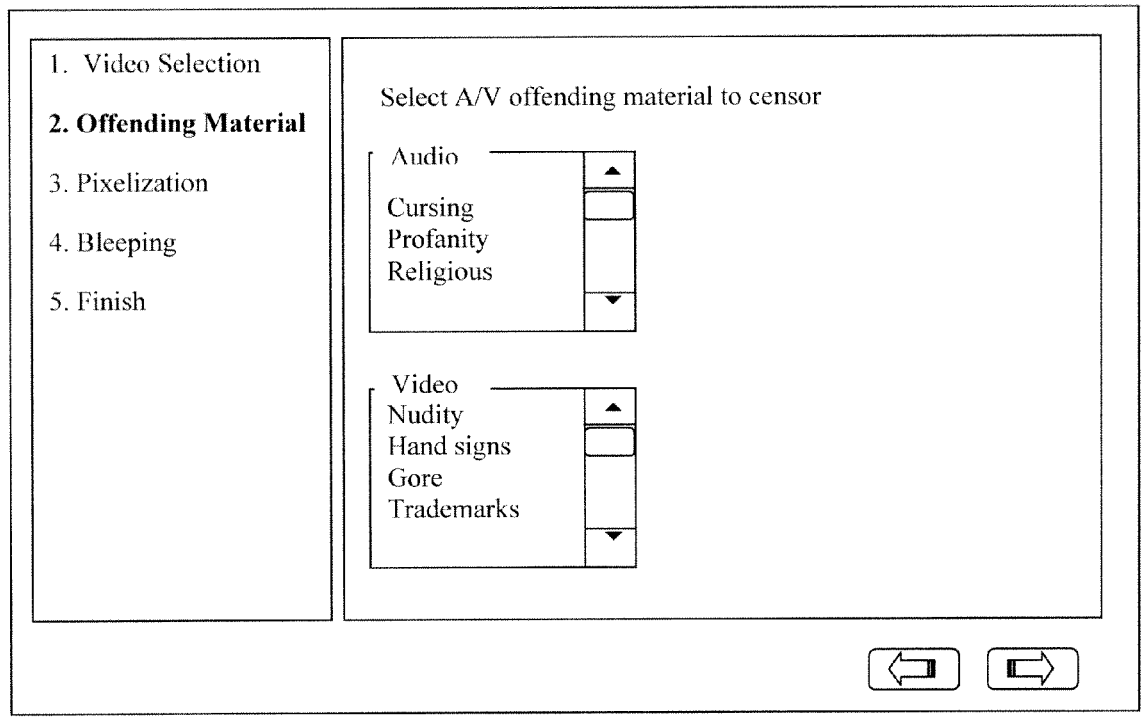
FIG. 67 GUI for Conjugation of Viewer Preferences as to Censorship . . .

When the set top box is part of a network, conjugations of settings carrying out these selections may be downloaded from a central server or from the cloud. The conjugation of settings corresponds to a user profile, which is programmatically defined and may be created through a wizard, the output of which is stored on an enrollment server. In this way affinity groups, such as religions or political parties, may control the content that the members of the group are allowed to see and hear. A Portal to a web service allows the censor representing the affinity group to prepare the conjugation of settings to censor out the images, sounds, and programming that are not allowed to be viewed. The web service downloads the conjugation to a subnet of set top boxes of enrolled users who have submitted to the censorship, or otherwise have allowed a third party to limit the scope of what the view or modify it. See FIGS. 67 and 68.

Figure 68:
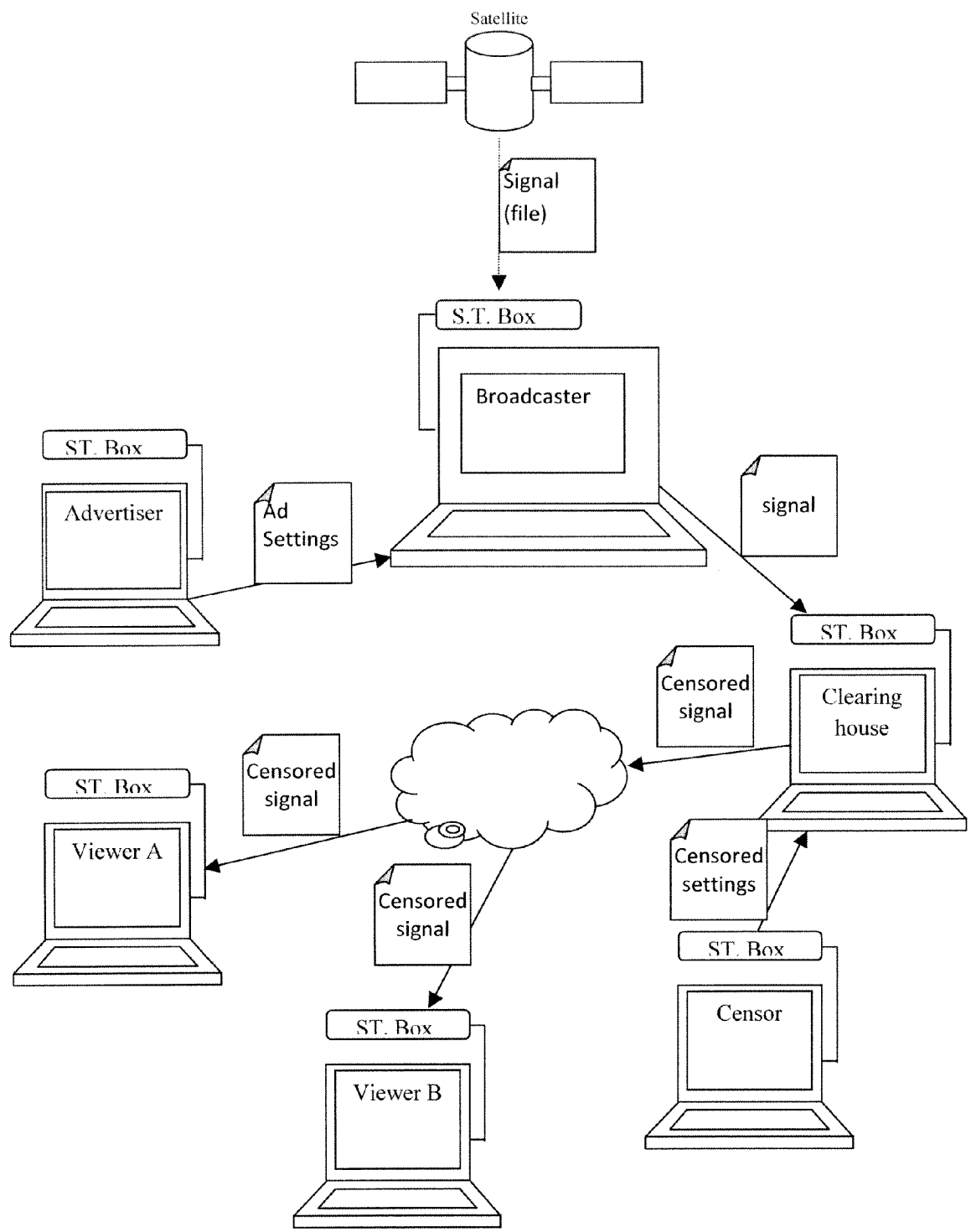
FIG. 68 Integrated Digital TV Environment for Censorship and Ad Substitution . . .

The conjugation may allow paid advertising to be inserted into the digital broadcasting stream, and the tags identify the points in the stream susceptible to the substitution of the advertising for the default content. A development environment allows the preparers of the advertising to supply it to the broadcasters in a compatible format, and the time slots for the advertising may be bought and sold on a digital exchange, a market. The ads may be pre-loaded to the set top box and stored in advance of executing on the presentation layer; or be provided online from a URL. Free content, such as Wikipedia™ or You Tube™, also may be substituted into the stream when the tags in the stream mark the spots where this is appropriate. Advertising algorithms such as those of Google can control the advertising substitution process employing the dynamic class loading of the embodiments. When a URL is the source of the substitute content for the default digital broadcast, the tags may cause dynamic class loading to find the URL and switch to that source, either at run time or by loading the ad in advance to the solid state drive. A DBMS may be used to order this process, with sundry tables associating viewers, broadcasters, content providers, and advertisers. The content the viewer actually receives may vary per censorship and per advertising substitution, as shown in FIG. 68.

Therefore, one can observe that dynamic class loading triggered by values in the meta-file is not limited to encryption. Note the digital broadcasting code below, showing how dynamic class loading works as a technique for pixelization. One of the video formats that is used for streaming video images on the Internet is MOV. The code sample below is for opening a MOV file (a digital video format) in Java:

```
1. public Movie createMovie(String movieFilePath)
2. {
3.   try
4.   {
5.     QTFile file = new QTFile (new File(movieFilePath));
6.     OpenMovieFile omFile = OpenMovieFile.asRead (file);
7.     Movie m = Movie.fromFile(omFile);
8.     return m;
9.   } catch (Exception e) { }
10.  return null;
11.}
```

As shown below, tags may be inserted into the MOV file to trigger dynamic class loading, to execute the pixelization. The first function, executed at design time, insertTag, shown in line 1, inserts the tag in the MOV file. The second function, getTag, at line 7, obtains the tag at runtime.

```
1. public void insertTag(int i, String key, String value)
2. {
3.     Pair p = new Pair(key, value);
4.     QTHandleRef qthref = new QTHandleRef(p);
5.     movie.getUserData( ).addData(qthref);
6. }
7. public Pair getTag(String key)
8. {
9.    QTHandleRef ref = movie.getUserData( ).getData(key);
10.   return (Pair) ref.getObject( );
11.}
```

In this case, the class loading process is performed on the pixels to do the blurring, e.g. to eliminate visible frontal nudity. The pixelization code may be expressed as a class that is dynamically loaded, such as the class shown below, and the class may be called by the dynamic class loader of the embodiments. The class loading may execute on the set-top-box, or a computer, router, gaming console, or other device connected to the television. See below:

```
1.public void escalateMovieImage(Movie movie)
2.{
3.   QDRect bounds = movie.getBounds( );
4.   Dimension dim = new Dimension(bounds.getWidth( ), bounds.getHeight( ));
5. QTImageProducer ip = new QTImageProducer (player, dim);
6. //convert from MoviePlayer to Java.awt.Image
7. Image image = Toolkit.getDefaultToolkit( ).createImage(ip);
8. //**********ESCALATION IS PERFORMED******************
9. BufferedImage bimage = toBufferedImage(image);
10. Pair pDim = getTag("position");
11. Dimension d = pDim.getValue( );
12.int[ ] rgbArray = getBlurrImage(d.w, d.h,);
13.bimage.setRGB(d.x, d.y, d.w, d.h, rgbArray, 10, 5);
14.ImageIcon icon = new ImageIcon (bimage);
}
```

Figure 69:
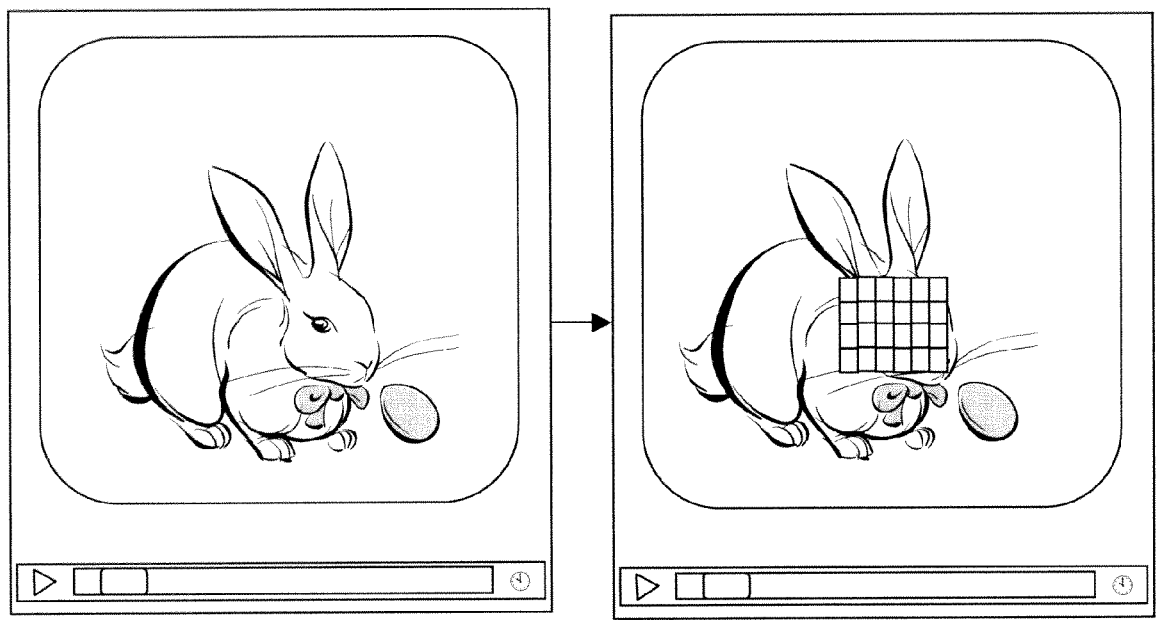
FIG. 69 Pixelization Result of Viewer Controlled Censorship via STB . . .

This code obtains an image from the movie and adds a black square in the region of dimension w*h at the (x,y) position. A tag, which was inserted at design time, is obtained in line 10. A Pair object is obtained, this object contains a Dimension value. This Dimension defines the area that is to be blurred. The values of the Dimension object are used in lines 12 and 13, were the area is blurred. When a tag is inserted into the MOV file in this fashion pixelization is controlled through software by the viewer, not the broadcaster. The class loader in the set top box is executed and the selection for pixelization occurs through the remote control. As in the case of the satellite embodiments of Initiator, a DSP may be used to execute the stream processing by carrying out the dynamic class loading process in real time. Please see FIG. 69.

Programmatic Detail

The Travel Drive Module

Returning to the subject of the Protector-Receiver Network, one of its modules enhances security during travel for laptops and Iphones. The Travel Drive module, as described briefly above in the Protector Database Manager section, facilitates the saving of selected files in a secure data storage medium, such as a thumb drive, whenever a professional must travel and work with those files. The files may be loaded onto the travel drive from a network. Just as importantly, the Travel Drive Module facilitates the return of the removed data to secure status on the network. This all occurs automatically, as a background task.

The Travel Drive process automates the procedure of checking out and returning sensitive information from a network when a user needs to travel with that information present on a lap-top, PDA, or smart phone. This is analogous to a circulating library: the sensitive data is checked out, and then checked back in. The module also may facilitate the temporary use of either a removable or non-removable storage medium for the purpose of providing security to the data of a mobile computer. The Travel Drive functionality auto-copies the sensitive data onto the mobile computer, encrypting it with an ELD, and then it automatically erases the copy at a specified future time, after restoring to the network any altered files so that the network contains the current version of each. The Protector may use a listener in order to detect when the removable drive designated as the Travel Drive is connected. The user interface for the Travel Drive function lets the user identify in advance the expected duration of his trip, and the end of trip date plus a grace period is the trigger for the return of the data to the network and the erasure of the travel drive.

Whenever a Travel Drive is going to be created, there is a selection option, with the available drives and files displayed in a window on the Protector. The window has a drop list that contains all of the available drives (fixed, mobile, and network drives). The drive and files to copy on it must be chosen. FIG. 71 is an example of the Travel Drive Window. After the drive and files have been selected, the Travel Drive module automatically creates a copy of the files on the selected destination drive. The code that performs this may be as follows:

```
1. private void copySelectedFiles( )
2. {
3.    Java.io.File f = getSelectedDrive( );
4.    String travelPath = f.getAbsolutePath( ) + "travel";
5.    Java.io.File travELDrive = new Java.io.File(travelPath);
6.    if(!travELDrive.exists( )) travELDrive.mkdirs( );
7.    Vector<Java.io.File> vFiles = getSelectedFiles( );
8.    byte[ ] ELDBytes = ELDFulfillment.getELD( );
9.    com.encryption.logic.EncryptionDocument ELDXml = null;
10.   ELDXml = parseLogic(ELDBytes);
11.   for(int i=0; i<vFiles.size( ); i++)
12.   {
13.      Java.io.File fileToCopy = vFiles.get(i);
14.      sFiles += fileToCopy.getAbsolutePath( );
15.      String fileName = fileToCopy.getName( );
16.      byte[ ] bytes = FileIO.readFile(fileToCopy);
17.      XFileDocument xmlDoc = parseMeta-fileXml(bytes);
18.      meta-file.xml.XFileDocument newXmlDoc = encrypt(ELDXml, xmlDoc);
19.      String travelFilePath = travelPath + fileName;
20.      FileIO.writeFile(newXmlDoc, travelFilePath);
20.   }
21.   updatelistnerTravELDrive(ELDXml.toString( ), sFiles);
22.}
```

The selected travel drive is obtained on line 3, and the path where the files are to be copied is created. The selected files are obtained in line 7, and they are copied on the travel drive path on the loop of lines 11-19. The travel drive may be a removable drive, or not. Using a removable drive, such as a thumb drive, affords the user the additional security advantage that if the computer is stolen the drive need not be stolen too, so long as it is carried separately. On line 21 the database of the listener is updated with the information of the drives that were copied.

The code for detecting a travel drive on the computer may be as follows:

```
1.public boolean isTravELDriveProtector(String path)
2.{
3.   DatabaseManager.selectData("travELDrive", "drive='" + path + "'");
4.   String res = DatabaseManager.getField("drive");
5.   boolean isTravELDrive = res!=null;
6.      return isTravELDrive;
7.}
```

This code is executed whenever a new network drive is detected as the source drive and the user indicates that travel is planned using the portable device. The code retrieves the data of the travel drives from the database (the travELDrive database discussed above regarding the Protector Database Manager Module), with the given condition (see line 3), "drive='"+path+"'". If data was retrieved, it means the connected network drive is a Travel Drive, therefore, the files that were taken must be erased. The code for the removal of the file is executed. The following is one embodiment for this code:

```
1.public void removeFilesFromTravELDrive(String path)
2.{
3.   DatabaseManager.connect("travELDrive");
4.   DatabaseManager.executeUpdate("DELETE FROM travELDrive
5.                                     WHERE drive='" + path + "'");
6.   File travELDrive = new File(path);
7.   File[ ] files = travELDrive.listFiles( );
8.   if(files!=null)
9.   {
10.      for(int i=0; i<files.length; i++)
12.      {
14.         File travelFile = new File(FilePath, files[i].getName( ));
15.         travelFile.delete( );
16.      }
27.      file.io.FileIO.rmDir(travELDrive);
18.}
```

The database is updated on line 4. The files of the travel drive are removed on lines 6-21. The Java.io.File that is represents the folder of the travel drive is created on line 6, and after that on line 7 the files that are contained within that folder are obtained. They are deleted on line 15. The ELD used to encrypt the files in the Travel Drive is encrypted as a field in the Trust DBMS on the computer. Unless the user logs in successfully, providing a Mnemonic Input that matches his Cognitive Signature, he may not select any files to encrypt and store in the Travel Drive, nor may he decrypt the files so stored because he is shut out of the DBMS in which the Travel Drive ELD is expressed.

Programmatic Detail

The Report Card Module, and the Receivers Menu

The Report Card is a module on the Protector analyzing all of the professional's communication with his clients in terms of timeliness. It registers the number of times the professional has communicated with a client and the dates of communication, including the most recent contact. The purpose of this module is to prevent negligence in communication by the professional by informing him of how frequently he contacts each client, hence the moniker "report card."

Whenever an email is sent, the recipient's ClientId, the date, and the number of emails sent at that point is stored in an XML document. The XML may be as shown below:

```
<Report>
    <Report ClientId="jsmith@gmail.com" ClientName="John Smith">
        <EmailReport lastEmailDate="1339702183527" mailsSent="3"/>
        <ChatReport lastMessageDate="1339115166476" messagesSent="1"/>
    </Report>
    <Report ClientId="sjones@hotmail.com" ClientName="Stephen Jones">
        <EmailReport lastEmailDate="1339196884121" mailsSent="5"/>
        <ChatReport lastMessageDate="1339196884121" messagesSent="10"/>
    </Report>
    <Report ClientId="crichardson@trust.net" ClientName="C. Richardson">
        <EmailReport lastEmailDate="1339196884121" mailsSent="5"/>
        <ChatReport lastMessageDate="1339196884121" messagesSent="10"/>
    </Report>
</Report>
```

In one embodiment the report is sent to the Switch so it can be analyzed, and when it detects poor communication the professional is warned. If the report is forwarded to a third party, such as the State Bar or a malpractice insurer, or the network administrator of the law firm, the third party can advise the poorly communicating professional "to step it up." In another, less embarrassing embodiment the report is sent in an email, as an encrypted attachment, but only to the Professional himself; but if there is a second warning it is no longer private. In either embodiment the data generated under the Report Card module can be displayed in a dialog window as the Report Card for that professional, in case he wants to check how well he is doing in his professional communication. FIG. 72 illustrates the Report Card window.

Figure 73:
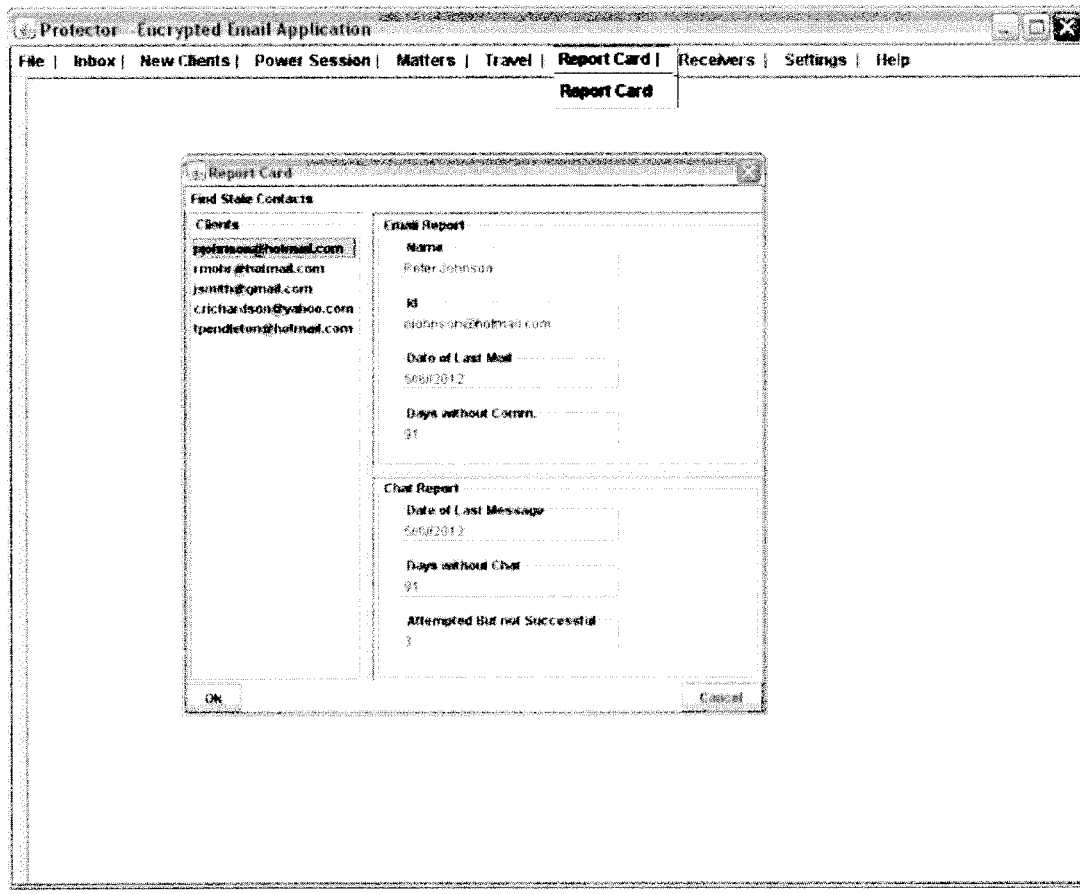
FIG. 73 The Report Card Screenshot . . .

FIG. 73 is a screen shot of the Report Card. The list of clients is displayed on the left hand side, and on the right hand side is the report card score for the selected client, pjohnson@hotmail.com. When double clicking on a client on the list, the report is displayed.

Figure 74:
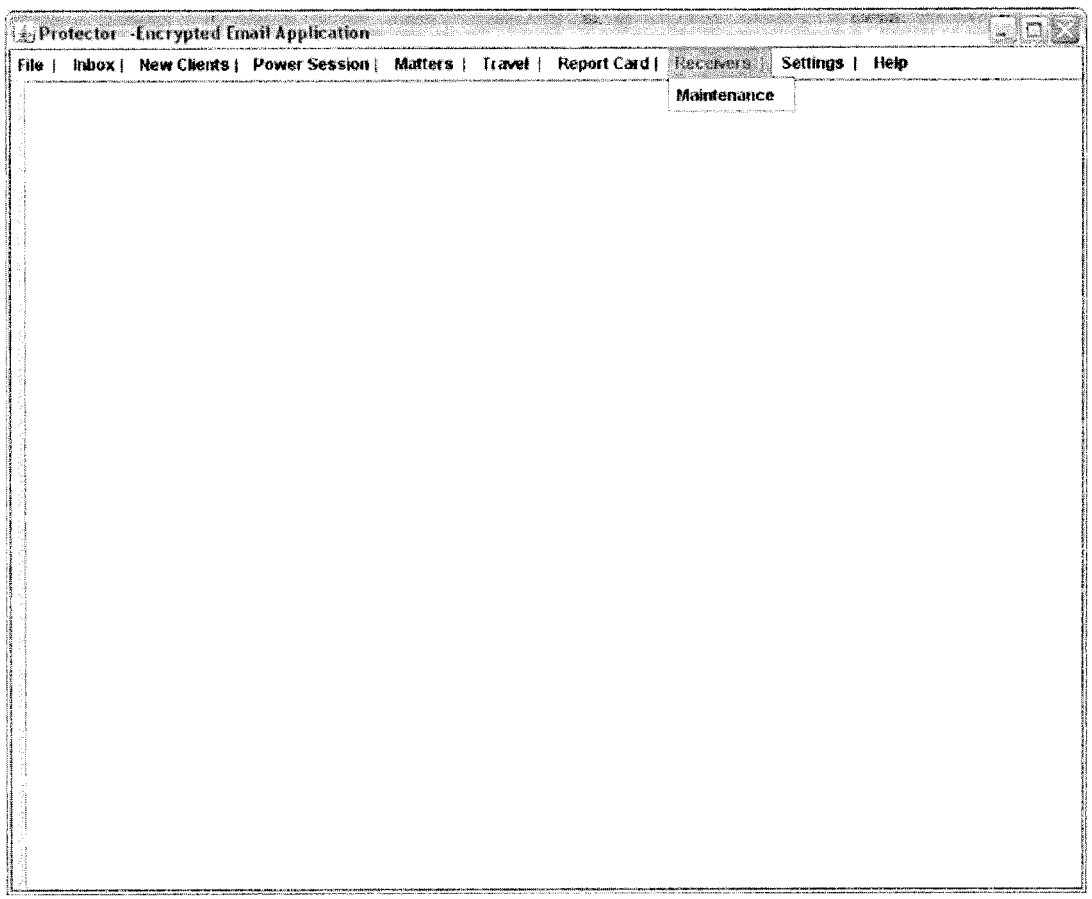
FIG. 74 The Receivers Menu Screenshot . . .

The Receivers Menu allows the Professional to maintain the Receiver applications he has provided to his clients, and each one may be thought of as an account. This menu is used to check the status of the Receivers and to delete Receivers where the Professional-to-Client relationship has expired. FIG. 74 shows the Receivers Menu, and FIG. 75 shows the Maintenance Window.

Figure 75:
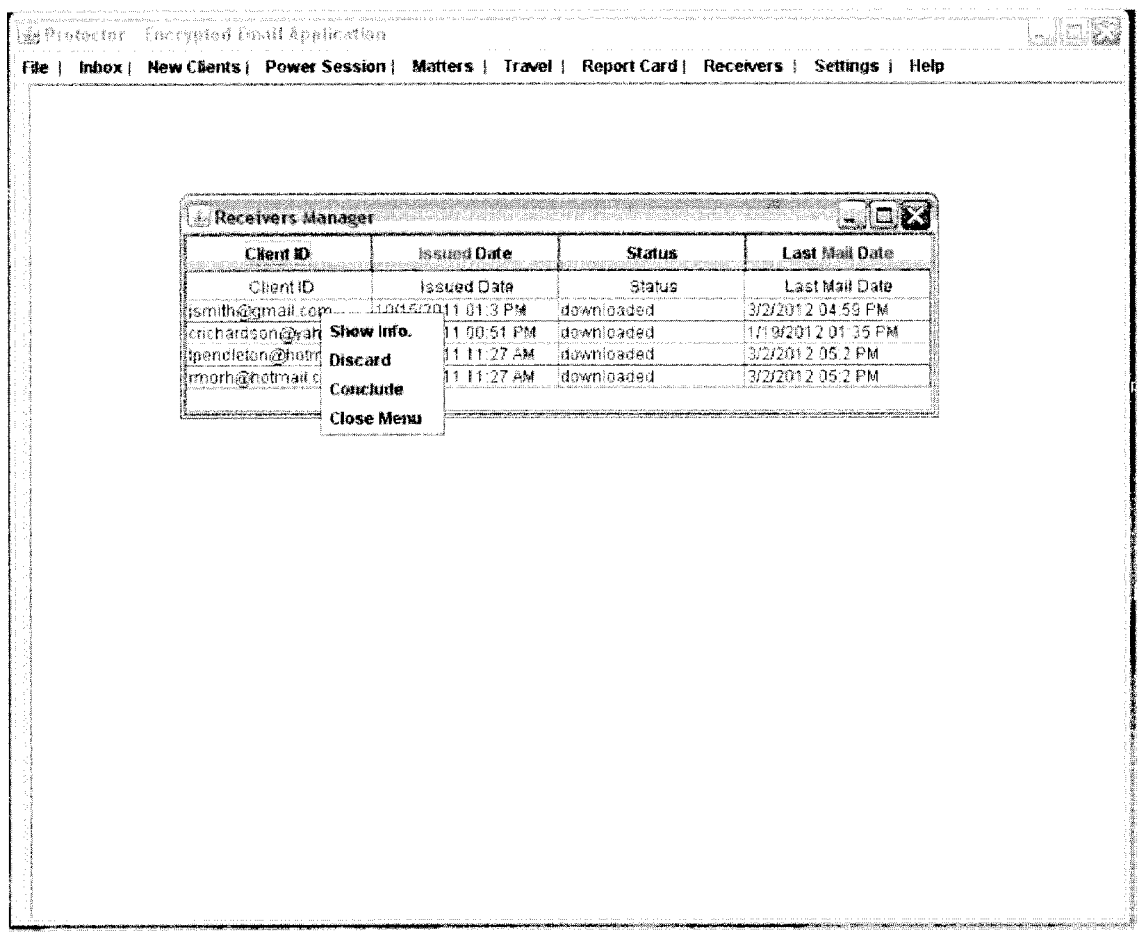
FIG. 75 The Receivers Manager . . .
Figure 76:
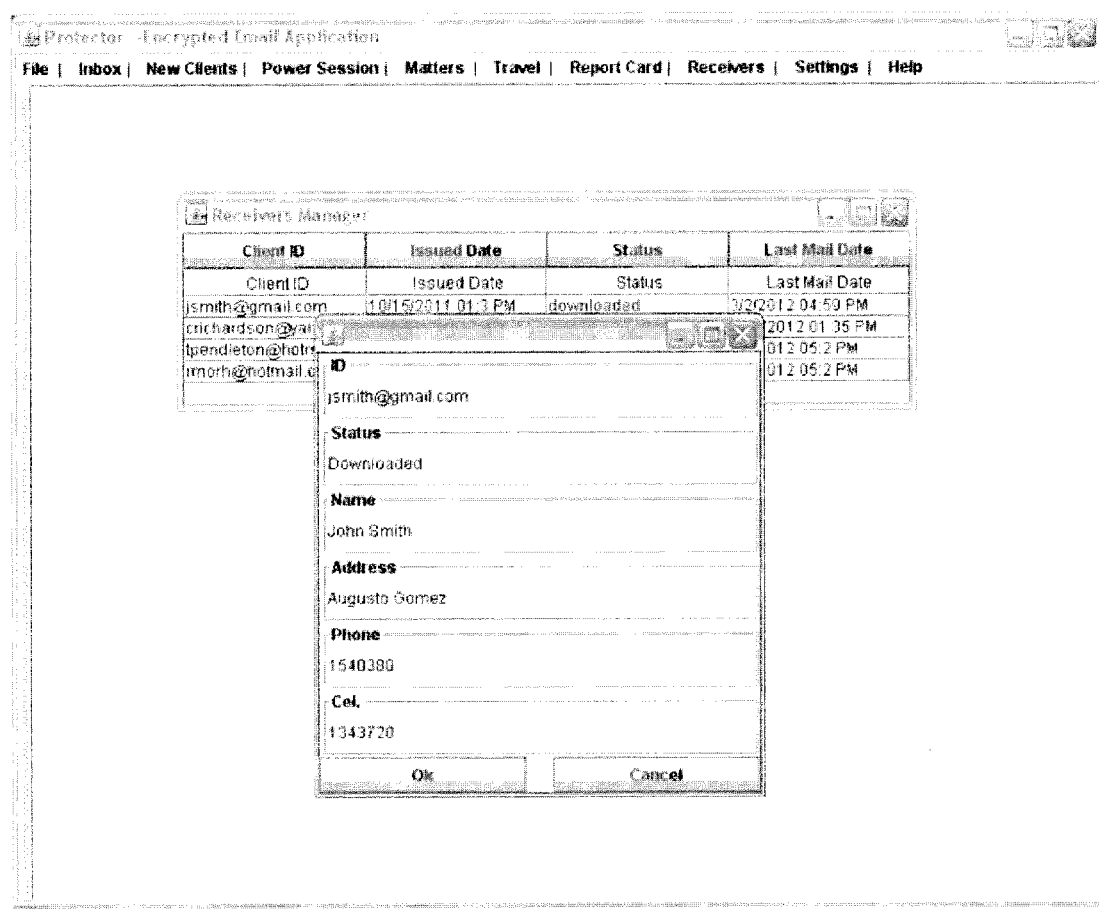
FIG. 76 Receiver's Property Viewer . . .

FIG. 75 also shows the right click menu. This menu shows the options for the maintenance of the Receivers. The right click menu has several options (Show Info, Discard and Conclude). One option displays the data concerning the Receiver (shown in FIG. 76). The Discard option of the right click menu is used for discarding a Receiver. When this option is selected, a especial email containing the discard command is sent to the Receiver. When the Receiver processes this command it disables the Receiver so it can no longer be used. Whenever a Receiver is used by a client it is advantageous to the lawyer to end his involvement for the case explicitly, to establish that his duties on the matter have ceased. Destroying the Receiver at the end of the case punctuates the lawyer's involvement.

In that regard, the Conclude Menu option is similar to the Discard option. Conclude is used when the case is to be closed and the lawyer-client relationship has run its course. This command may trigger, as the last use of the Receiver, its receipt of a canned message telling the client that the attorney-client relationship on the matter has run its course. The fact that such a message was sent may be of legal significance should the client wish to sue the lawyer for malpractice, because the date of the message may establish the statute of limitations. The enrollment agreement sent to the client with his Receiver application may stipulate that the client understands this and agrees.

Programmatic Detail

The Switch

The Switch is a server application used to generate a bundle of ETD's for each Protector and put them under the Protector's control, so they can be consumed during the communication sessions with the Receivers and with the other Protectors. The ELDs in the batch are fungible, in the sense that any ELD can be used to encrypt either plain-text, or another ELD. The Switch may do other things as well, such as enroll each Protector on the network.

In one embodiment the super-user of the CryptoNet enjoys access to the Switch through the Console, through which he can program one or more of the networks to connect to a single Switch, or to cause a given Switch to fail over to another one, or shift the Protectors under one Switch to another one at a preselected time or according to a condition or algorithm. The Console allows the super-user to manage N number of networks, all operating on a single Switch. The Console may allow the super user to change the IP of the Switch, so that one Switch may be used and second Switch may be tested, and the traffic routed to the Second Switch when the testing is completed. The Console has a command that changes the IP of the Switch on all of the components that use the Switch, so that there is a seamless transfer of functionality to the second Switch.

The Switch communicates with a dedicated, master Switch DBMS, and that database may have a proxy. The Switch DBMS orders the data needed to run the network regarding such subjects as the payment status of each individual CryptoNet under its dominion.

In the case of a particular CryptoNet, the DBMS associated with it is different from the Switch DBMS. The CryptoNet DBMS us a subset of the Switch DBMS that contains only the information that pertains to that particular CryptoNet, and none of the data involving the other CryptoNets. Each individual CryptoNet has its own DBMS to order all the data which that particular CryptoNet uses. Each one processes, for instance, the data used in the processes of generating the profile web page using the servlet. This preserves confidentiality, and also makes it unlikely that a data crash on one CryptoNet would affect the other CryptoNets.

Whenever a Protector requests a batch of ELDs the Switch checks the DBMS to see if the ID of the requesting Professional is registered, which is to say a person properly enrolled, and if so whether that professional has paid the subscription fee required by the EULA. The Switch DBMs may link to an accounting DMBS with tables that record payment.

The Protector may receive its ELD's by accessing the Switch DBMS and retrieving the data concerning his account. However, this data in another embodiment also may be processed on the CryptoNet DMBS, which may be a separate DBMS, as just described. In one embodiment the Switch checks the CryptoNet DBMS for data that establishes that the Protector is entitled to receive his next batch of ELD's, and if so the Switch downloads them to the Protector through the port, when the Protector logs on. If the ID is registered and the account is paid, then ELDs are generated for that Protector and dispatched as a batch. The batch is encrypted before being downloaded to that Protector by the Protector's hard-wired ELD, which scrambles all its communication with the Switch in every instance. (The Protector and the Switch never engage in any unencrypted communication).

There can be several CryptoNets, with different ones corresponding to different groups of Professionals, and yet there may be only one Switch supplying the ELD's. When there are multiple CryptoNets communicating with a single Switch, each CryptoNet may have its own CryptoNet DBMS, and may communicate with its own Tomcat server generate and its own servlet. A single Switch can handle multiple CryptoNets such as, for example, one network for lawyers and their clients and another for accountants. In one embodiment there is a division of function so that the data that strictly pertains to the individual CryptoNet, such as who enrolls on it, is put on a separate server, with each CryptoNet having its own Tomcat server for the servlet functionality. However the Switch and Switch DMBS may also include this functionality, eliminating the separate CryptoNet DMBS and the separate Tomcat server. Per requirements, the Switch DBMS and the CryptoNet DBMs may pass information back and forth, with each DMBS server protected by a proxy, and all of the information going back and forth encrypting with each instance of a CryptoNet using its own encryption logic for this purpose, such as a unique instance of Housekeeping Encryption Logic.

The super-user, given access through the Console, can redirect the networks to the various Switches that are available, either as a primary Switch or as a fail-over. A person skilled in the art should recognize that when maximum failover protection is desired, a network of Switches may be made available to all the CryptoNets, with the network configured as a ring of super-nodes, as in Skype™.

The Switch is not involved in network administration: that task is handled by the administrator of the network, who uses his Portal application. The Switch may generate the Portal, and copy it to a DVD. The system integrator receives the DVD containing the Portal Installer and installs it on his computer, and there may be an activation code supplied by a live operator at customer support. The Portal Installer may contain values that the Switch uses to create a hard-wired ELD connecting the Switch to the administrator.

The DVD may create other values related to security in the particular CryptoNet over which the administrator enjoys control. For example, the Switch may communicate with the CryptoNet DBMs via an encrypted tunnel, and a value in the Portal Installer DVD sets a parameter in the encryption algorithm. This is an individuation feature that gives each Portal application its own logic tunnels on the particular CryptoNet the system integrator creates, thereby increasing the orthogonality of the system. The Portal Application links the system integrator to the Switch, and some of the network generation functionality occurs on the Switch, and the rest of it on the DVD based installer.

The Switch DBMS is the administrator's point of control over his CryptoNet. Through the Portal the administrator reaches that DBMS. The Switch functionality is independent of the particular data used to operate each CryptoNet, because this data is ordered in the Switch DBMS and there is a data table associated with the particular CryptoNet. This database, however, is not properly part of the Switch itself. This separation of function insulates the primary action of the Switch, which is to generate the ELD's, from the functions that depend on a particular CryptoNet. The hard-wired ELD related data is not on the Switch, but on the Switch DBMS. One design strategy is to limit Switch functionality to logic generation. But when the full embodiment is used, logic execution is provided as well, as in the Tertiary ELD process. All of the functionality that may be offloaded to the Switch DBMS is put there instead of being put on the Switch.

A proprietary proxy may be used as a firewall to prevent unbuffered communication between the Switch and a Protector. The Protectors of each CryptoNet must use the proxy each time they contact the Switch. To increase security and robustness, each CryptoNet uses its own set of proxies. The proxies for each CryptoNet may operate on the same physical server but on a different logical server. The Installer allows the system administrator, using the Portal application, to generate not only the CryptoNet DMBS and web server functionality, but the proxy as well. A port is assigned to each proxy, and this differs from one CryptoNet to the next. So proxies may share the same IP, but they must have different ports. The proxy may contain a load balancing function, allowing the Switches to be configured as super nodes so that when one is saturated the load is shifted to another.

Protector-Receiver networks may be created using an integrated development environment. The system integrator uses the IDE, and it may be implemented in part through an installer application that the system integrator receives on a DVD. The Portal application may contain all or part of the IDE functionality. This may vary with embodiments. The IDE can take the form of a web service, a stand-alone application included in the Portal application, or a hybrid.

Whatever the embodiment of the IDE, the network architect may use it to create an individual CryptoNet. When a Protector-Receiver Network is deployed through the IDE, a port is assigned for the proxy that will connect the Protectors of that Protector-Receiver Network to the Switch. The CryptoNet IDE may handle this function without command line programming. The object of the IDE is to automate to the greatest extent possible the work of the system integrator, so that most of the decisions made in the creation of the CryptoNet may be made by clicking on a value or responding to a wizard. The IDE individuates each individual CryptoNet in several respects, such as auto generating unique parameters for the proxies and the various points where Housekeeping Encryption Logic may be used to connect the modules, to make the network as orthogonal as possible. The system integrator, using the IDE, takes maximum advantage of the inherent capability of the Encryption Abstraction Layer to provide orthogonality.

The proxies may be handled by a Java master class called the Proxy Manager. The Proxy Manager connects to the Switch to extract certain information, such as the number of CryptoNets, and the ports assigned to them. The Switch connects to the Switch Database and retrieves the data and sends it to the Proxy Manager. After this step the Proxy Manager initializes the Proxies.

When the system integrator for the new Protector-Receiver Network is finished with the coding, the final step the IDE provides for the network is deploying and registering it. The Switch executes the CryptoNet registration process. Whenever a new Protector-Receiver Network is going to be registered the Protector-Receiver Network IDE establishes a connection to the Switch, and it sends the registration data that corresponds to that CryptoNet. The data is saved on the Switch DBMS.

In one embodiment the Switch, configured through the IDE,
(1) takes the registration data;
(2) creates the subdirectory pertaining to the new network;
(3) creates a new instance of the CryptoNet DBMS, establishing its port or IP, and sends initialization data to it;
(4) assigns a port for the proxy that is going to use for communication between the Protectors and the Switch;
(5) generates the installers for the Receiver and Protector Applications which the CryptoNet will provide to the users;
(6) creates the HTML that will be used on the Tomcat Server (which may be either physical or logical) in order to create the Web Page Profile HTMLs so each user can have his servlet-based profile page;
(7) creates the subdirectory within the Web Server (such as Apache Tomcat) that corresponds to the Web Page;
(8) and saves the HTML's in a sub-directory on the Switch.

When a system integrator uses the IDE to create a CryptoNet, his ID is verified to make sure he has the right to use it. Unless he registers his IDE on the Switch DBMS, the system integrator enjoys no digital rights cannot access the IDE, in embodiments where the IDE is in part a web service. The registration process may be part of the DVD that installs his Portal, and the DVD from the inception generates a hard-wired ELD connecting the system integrator to the Switch. Some of the IDE functionality may be provided on the DVD, but to provide control to the licensor of the CryptoNet, such as billing, some of the functionality is contained in the associated web service. The system integrator, using the IDE that the Portal provides, registers after the hard-wired ELD for that person is installed, so that the registration process is secure.

A CryptoNet can also be registered in a "test mode," which in operation is similar to PayPal's Sandbox test environment. When a Network runs in this mode it has limited Protector downloads, limited ELD's for testing the sample Protectors, and a limited period of operation. It is only a trial CryptoNet. A listener accessible by the Console searches for the CryptoNets that are in test mode and that were registered after a defined period of time, for example ten days. Whenever the listener finds a CryptoNet with offending characteristics, such as being in trial mode for too long, that CryptoNet is disabled, and the disablement may occur automatically per settings on the Console.

If the system integrator decides actually to deploy the CryptoNet, then it is updated from "test mode" to "real mode." A flag in the Switch DMBS indicates its real state and from that point forward the Switch checks the payment status of the CryptoNet network, checking the associated DMBS to make sure that the host of that CryptoNet is paid up and letting the CryptoNet continue to run when there has been no lapse in payment or other breach of the license.

When the system integrator enrolls and pays, the Switch DBMS generates his Portal application. The generation of the Portal application may follow the initial step whereby the installer, on the DVD, generates the hard-wired ELD that connects the system integrator to the Switch. The installer application contacts the Switch using that ELD to encrypt its first communication, so that the web service and the installer work together to generate the completed Portal application. The shell of the Portal application may be included on the DVD, with a registration code included in it which the Switch recognizes and associates with the hard-wired ELD associated with that copy of the Portal. The Switch associates the copy of the installer and Portal application that the system integrator has received on the DVD with the saved hard wired ELD that is contained in the DVD, using a DBMS.

From that point forward the Portal application encrypts all of its communication to the Switch, and the Switch encrypts its communication in response as well. With the hard-wired ELD given effect, the Portal installer application installs the rest of the IDE that he uses to author his CryptoNet, and then he uses that secure connection to the Switch to operate it once it passes from test mode to real mode. For example, once the system integrator has his Protector installed and his CryptoNet has passed from test mode to real mode, he can lock out individual Protectors if they violate the terms of the EULA. His communication with the Switch to carry this out is protected by the hard-wired ELD.

The super-user operates at the highest level. He uses the Console to activate, deactivate, or eliminate entire CryptoNets. This gives him veto power over all of the system integrators, all of the Portal applications, and all of the CryptoNets. The Console interacts with the Switch through its proxy in order to allow this control to be exercised securely, using an encrypted port. The Console reaches the Switch DBMS, and the Switch through the respective proxy of each CryptoNet DBMS. The Console disables the connection between the CryptoNet DBMS and the Switch in order to shut down any CryptoNet that is not paid up.

After a Protector-Receiver Network has been registered, tested and deployed in real mode, the professionals begin to use it. They register on the CryptoNet and download their Protector applications. To become a member of the CryptoNet VPN, the professionals register through the CryptoNet's web server, such as one using Apache Tomcat. That server has access to the CryptoNet DBMS, which contains the data that pertains to that particular CryptoNet.

The system Integrator's DVD that is used to install his Protector may contain values used to instantiate a parameter in an encryption algorithm, so that all of the communication between the CryptoNet DBMS and the Tomcat server corresponding to the particular CryptoNet which the system integrator creates is encrypted. This allows another individuation feature in System Integrator One's CryptoNet, so that if an interloper happened to hack that CryptoNet, using his own copy of the Protector application instead of the one registered on the system, the knowledge gained would prove insufficient to crack the CryptoNet that System Integrator Two has created. This keeps the data used both in design time and in runtime secure, as each particular CryptoNet uses its own unique encryption logic to link the servers that provide the secure VPN functionality for that CryptoNet.

Such data, deserving of protection, includes the payment status of each Protector, his email address, etc. The Web Page connects to the Switch and sends the registration data to it, ordering the data in the DBMS. The Switch DMBS and CryptoNet DBMS communicate through an encrypted port. The DVD that is provided to the system integrator has a wizard to set a parameter of an encryption algorithm that establishes the encryption logic for this dimension. The encryption for this link is corresponds to the particular instance of the CryptoNet DBMS, per the values in Portal installer and the DVD. It is a good security strategy to provide the initial encryption values for the new CryptoNet under construction on a DVD, instead of from a URL, because they the DVD can be mailed: at least this much of the data online hacking is impossible.

Security in communication also is provided at the Protector level, once the CryptoNet is up and running, in respect of the professional's communication with the Tomcat server. In order for the professional who enrolls to send the data in an encrypted fashion, a Java Applet and Java Script may be used. Java Script manipulates the Applet component. The JavaScript code obtains the data from the text field in the HTML on the registration web page, and then executes the method of the Java Applet that sends the data. The HTML code that contains the JavaScript code and Applet may be the following:

```
1. <html>
2. <script LANGUAGE="JavaScript">
3. <!--
4.      function sendData(form)
5.      {
6.         var names=new Array(form.elements.length);
7.         var values=new Array(form.elements.length);
8.
9.          for(var i=0; i<form.elements.length; i++)
10.         {
11.             var name = form.elements[i].name;
12.             var value = form.elements[i].value;
13.          names[i] = name;
14.          values[i] = value;
15.         }
16.                 var applet = document.getElementById('enroll');
17.                 applet.sendData(names, values);
18.     }
19. //-->
20. </script>
21. <applet id="enroll"
22. code="confidential/client/enrollment/ConfidentialClientEnrollment"
23.     width="1" height="1">
24. </applet>
25.        ...
26.     </body>
27. </html>
```

The JavaScript code (lines 4-18) takes the name and values of the components in the enrollment data entry form. These components are a text field and a password field. After all the data has been obtained, the element with id enroll (the applet, defined in the previous HTML code) is obtained and manipulated, that is, the sendData( ) method is executed.

The code of the Applet that sends the data may be the following:

```
1. public void sendData(String[ ] names, String[ ] values)
2. {
3.    Hash table h = new Hash table( );
4.    for(int i=0; i<values.length; i++)
5.    h.put(names[i], values[i]);
6.    SwitchConnectivity sc = new SwitchConnectivity(appPath);
7.    Vector vRequest = new Vector( );
8.    String command = "CONNECT_ENROLL_PROTECTOR";
9.    vRequest.add(command);
10.   vRequest.add(h);
11.   sc.initSwitchCommunicator(vRequest);
12. }
```

This method takes as parameters two String arrays (names and values), which contain the name of a field of the table of a database that stores the data of the Protector's user, the professional, and the values of the fields, respectively. This information is taken from the registration HTML. Then the method creates a hash table with names and values, which is the object that is sent to the Switch. This information is encrypted before being sent with Housekeeping Encryption Logic, using a parameter that is individuated for each individual CryptoNet.

The Switch receives this data, connects to the DBMS, and sends the data to it. The Protector Registration Code of the Switch may be the following:

```
1. public Vector enrollProtector(Vector v)
2. {
3.        Hash table h = (Hash table)v.get(1);
4.        Vector fields = new Vector( );
5.        fields.add("id");
6.        fields.add("UserId");
7.
8.        Vector vValues = new Vector( );
9.        for(int i=0; i<fields.size( ); i++)
10.          vValues.add(h.get(fields.get(i)));
11.       fields.add("activated");
12.       vValues.add("false");
13.
14.       String pw = h.get("password").toString( );
15.       String ePw = HousekeepingEncryption.encrypt(pw);
16.       vValues.add(ePw);
17.       vValues.add("false");
18.       fields.add("downloaded");
19.
20.       insertProfessionalData(vValues);
21.       Vector vResponse = new Vector( );
22.       vResponse.add("PROTECTOR_REGISTER");
23.       return vResponse;
24. }
```

This method receives as a parameter the Vector that was sent by the Applet, the one containing the hash table of information concerning the professional and his enrollment, and in line 3 the hash table is obtained. A Vector that contains the data is created and sent to the DBMS. In line 14 the password is obtained. In the next line it is encrypted, using Housekeeping Encryption. In line 20, the method insertProfessionalData( ) connects to the DBMS and sends the data.

The Switch sends a new batch of ELDs to each Protector whenever one runs low or whenever the supply has timed out. (Timing them out is one way to prohibit an unpaid Protector from continuing to use the encrypted network.) The Protector checks the level of ELDs that remains, and if it is lower than a given threshold or if a given period of time has passed the Protector sends a request to the Switch, the Switch sends a new batch of ELD's, and the old ELD's are purged.

Programmatic Detail

The Console

The Console is the super user's remote control application over the deepest functionality of each CryptoNet. This may include identifying the IP and Port of the Switch and Proxy, determining the quantity of ELDs that a Switch sends to the Protectors on a given CryptoNet and the interval for sending more, and test mode time-out interval. The Console can also activate or deactivate entire CryptoNets and identify any system integrators to exclude and lock them out.

When the Switch or its Proxy is going to be moved from one physical server to another, the IF's must change. Unless the super user makes allowance for this change, moving the IP would cause the CryptoNet to fail for not being able to find its Switch. The LP's may be changed via programmatic control, so that the Switch currently in use may be replaced by an alternate automatically with no disruption of function. Each of the affected network components must be informed of the change, and this may be summarized in an XML file. When the IP of any of these components is changed, the Console DBMS logs the change and updates the rest of the components on that CryptoNet.

The console may handle the changes by allowing the super-user to interact with the system through a GUI. In the CryptoNet embodiment wherein each Cryptonet has its own DBMS server and its own web server, instead of leaving this functionality on the Switch and Switch DBMS, there may be a CryptoNet Linking DBMS present on the Switch, which the Console accesses. The purpose of the CryptoNet Linking DBMS is to allow the servers of a particular CryptoNet to access a Switch at any IP which the super user specifies using the Console. The DBMS associates the IP's used by that CryptoNet with the super user's selection. The Console merely introduces the new IP, and the Linking DBMS and its associated code perform the change, allowing the CryptoNet servers to find the Switch at the new location. The Console may move all of the CryptoNets to a Switch at a new IP, or only some of the CryptoNets.

Figure 78:
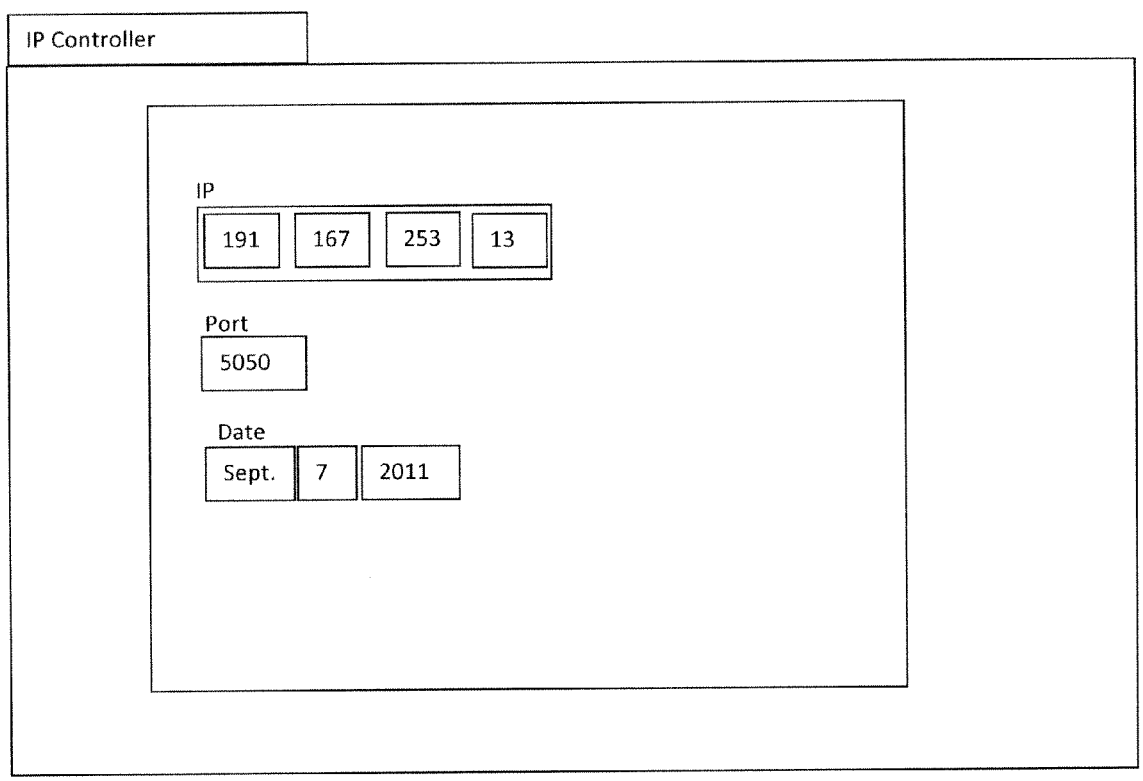
FIG. 78 The Console: Selection of IP and Port of the Switch . . .
Figure 80:
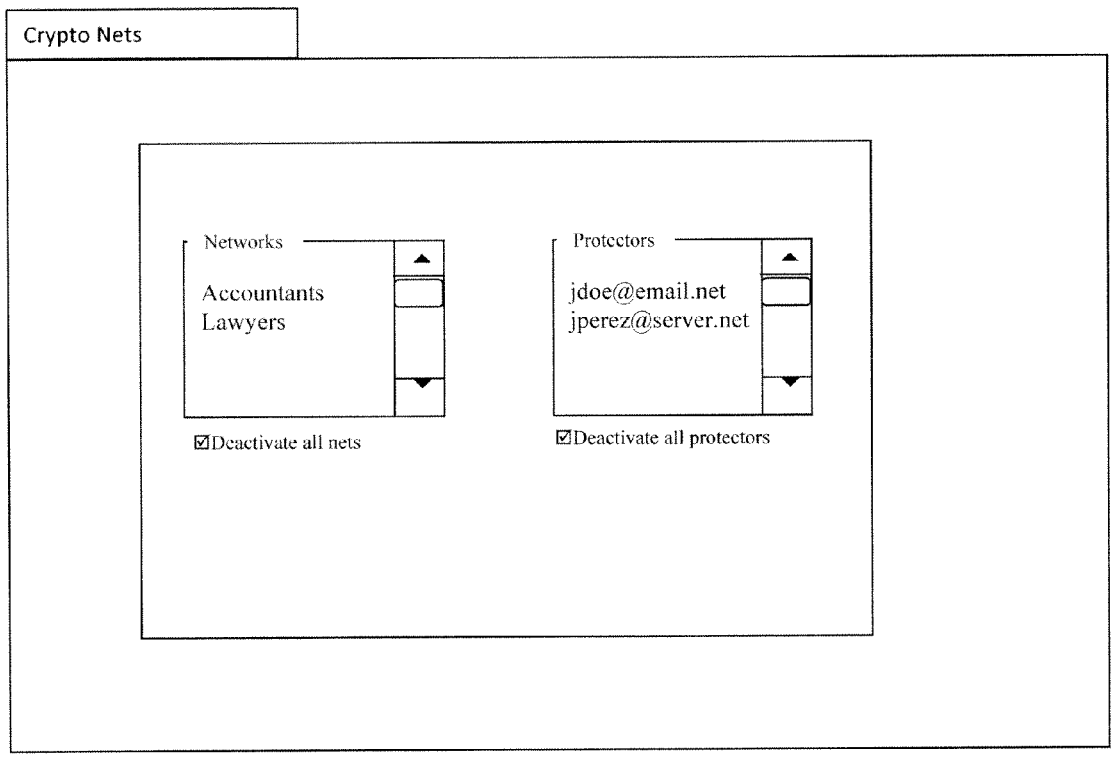
FIG. 80 The Console: Crypto nets control . . .

This approach may allow multiple Switches to be configured as super-nodes, so that the Switches are interchangeable and controlled by a single Console. The super-nodes maintain data coherency by communicating in the background to keep their data current, so that one can fail over to the next. The Switch Linking DBMS orders the values used in this process, and time values for the automatic transfers may be part of this process. The value set on the super-nodes may roll to a common start date simultaneously, across the whole network, so that the next set of operative IP's becomes active at the same moment, universally. FIGS. 78-80 show the Console.

Programmatic Detail

The Portal

The Portal is an application similar to the Console, in that it is a control mechanism over the network, but it operates at a different level. It controls only a given Protector-Receiver Network, unlike the Console, which controls all of them. All embodiments of the CryptoNet utilize a design time step and a runtime step and invoke class loading, and the Portal may control both steps.

The Portal allows the system administrator to control the particular CryptoNet that is under his dominion and in which he has digital rights. When the system administrator logs into a given CryptoNet in order to operate or modify it, his connection to it may be indirect, as what he truly controls is the Switch DBMS, so that he communicates with his CryptoNet in this mediated fashion. This need not be apparent at the user interface. This approach allows the CryptoNet to use only one port, the one to the Switch. This allows the Protector to enjoy the benefit of the proxies and hard wired encryption logic that connect the CryptoNet to the Switch, and this is more secure than opening a direct Protector-to-CryptoNet connection to the computers on the actual CryptoNet.

The enrolled Protectors on the network are displayed in a window in the Portal's GUI. The system administrator can activate or deactivate a selected Protector (the professional), or groups of them. When data has been modified the Portal sends the updated data to the Switch, which relays the data to the CryptoNet DBMS server and the CryptoNet web server. These servers control each individual CryptoNet, but in another embodiment their functionality is combined into the functionality of the Switch.

The Portal is the instrument through which the network administrator can compel compliance with the terms of the EULA by an enrolled member, or groups of them. When the system administrator, using his Portal, decides that a Protector is to become deactivated, the next time that Protector tries to retrieve ELDs from the Switch service is denied. This is appropriate when the subscription fee has not been paid, or the user of the Protector for another reason violates the terms of service or cancels his subscription.

When a person decides to become a system integrator and build a CryptoNet, he enrolls on the network, contacting the Switch. The Switch takes, through the operation of a connected URL, receives his enrollment data and saves it to the Switch DBMS. Then, the Switch acknowledges his electronic payment and with that the Switch generates his Portal application. The Portal is sent to the system integrator with an installer, and these files are attachments to an email addressed to that person. In one embodiment, as mentioned above, the installer and the shell Portal application are supplied on a DVD, but the values used to make the Portal operational are received from the switch. The values complete the encryption algorithms that protect the Protector's secure connection to the CryptoNet servers which he the system integrator creates and operates.

The system integrator opens the files and installs his Portal application. The Portal allows him to develop his CryptoNet and test it. The CryptoNet remains in test mode until he elects to transfer it to real mode. After the CryptoNet is running in real mode he, again using the Portal application, he can activate individual users and charge them a fee for use. The billing and collection functionality of a CryptoNet may be delegated to a third party provider, such as Digital River. The CryptoNet DBMS may contain tables associated with billing. The election to leave test mode for real mode may disable the IDE used to develop the CryptoNet. Once the CryptoNet is in real mode, the system integrator controls the settings of his CryptoNet and activates and deactivates the Protectors who enroll on it, using his Portal application.

Programmatic Detail

The Professional's Profile Page

Whenever a professional enrolls on a Protector-Receiver Network, before downloading his Protector application he first must provide some personal data. The data, among other purposes, is used to present the professional to the public as an enrolled member. Once the professional has enrolled he can access his profile page, which is a pseudo web page generated by the servlet. The profile page gives the professional a presence on the World Wide Web. The servlet may be included as part of the functionality of the Switch, or hosted on its own server. In one embodiment the servlet functionality accompanies the enrollment process on a single server which carries both the enrollment and the encryption logic functions. The Switch DBMS may store the personal data that the servlet uses, but in a more scalable embodiment the CryptoNet uses its own CryptoNet DBMS that communicates with the Switch DBMS through a secure connection.

The profile page may display the professional in a visually attractive way, as a "plug" for his practice. If somebody is searching for a professional by using a search engine, the search engine directs that potential customer person to the page. The design philosophy is that it is of little additional compute burden to auto generate the professional's web profile, since the professional's personal data has been taken into the system anyway for enrollment purposes. Therefore it makes sense to give the professional a web profile page as part of the Protector-Receiver value bundle. Additionally, the profile page may do double duty by functioning as the mechanism through which the professional downloads his Protector application after the Switch has auto generated it.

The profile page is created through a Java Servlet. Servlets are accessed through any web browser, such as Mozilla's Firefox™. According to embodiments, in order to access the Servlet the Servlet's URL may be typed in the address bar, for example:

http://www.ccserver.net/servlet/CCServlet

In some cases, Servlets require parameters. For example, if the task of a Servlet is displaying the professional data of a member of a CryptoNet, then the servlet needs to know this information. The use of an ID, or the name of the professional, can be used to up this data. The Servlet takes that parameter from its URL, and as explained below. According to embodiments, parameters may be a name-value pair. The name of the parameter and its value must be given, for example: ID=123456

In the case of the Professional's Profile Page, the ID of the Professional that is being searched for must be provided, so the Servlet can know how to look for that Professional's data. The URL may appear as follows:

http://www.ccserver.net/servlet/CCServlet?ID=123456

Through this URL the Servlet is accessed. The URL takes the Name-value pair of the parameter, process it, creates an SQL statement with the received parameter, establishes a connection to the DBMS, sends the SQL statement to the server, and the server processes the statement and sends the results to the Servlet. If the result is found (the data of the professional), the Servlet creates the HTML of the Profile Web Page and sends it back to the web browser, and the browser displays the profile. The DMBS receiving the SQL statement may be the Switch DBMS, or in the other embodiment, the particular CryptoNet DBMS of the CryptoNet upon which the professional is enrolled.

Programmatic Detail

The IDE for the Protector-Receiver Network

According to embodiments, the Protector-Receiver Network Integrated Development Environment (IDE) may be provided to allow a system integrator to develop CryptoNets with minimal command line programming, and it may be part of the Portal. The core functionality of the Protector and Receiver applications is not modified by the IDE, but instead, only the variables needed to implement the network in a given instance. The IDE lets the system integrator approach the task of creating his network as nothing more than supplying a scheme of settings, so that a new network can be created or an existing one modified merely by changing these values by using the GUI.

Figure 81:
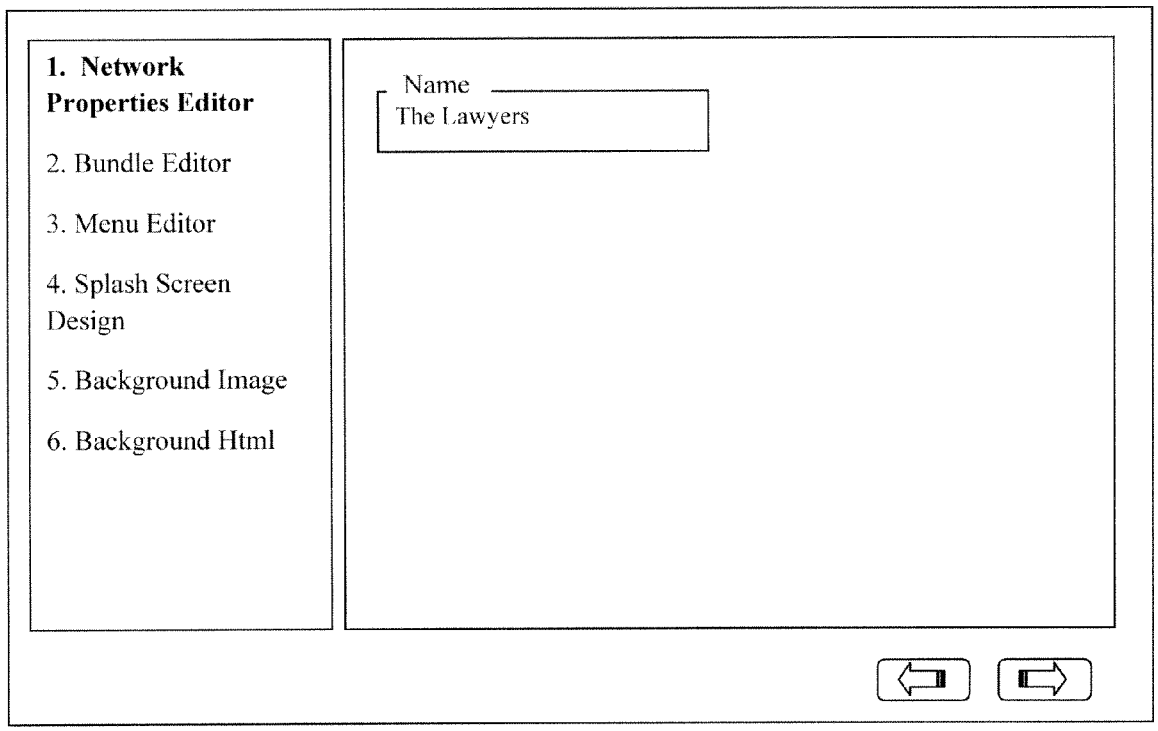
FIG. 81 CryptoNet IDE: Network Properties Editor . . .

The variables that the IDE addresses in the network feature set may include the name of the network, the form and content of the new menus for the applications, the splash screen of the Receiver, the background image of the Protector, and the background of the Profile Web Pages (e.g., See FIG. 81). The IDE is used to modify the presentation layer to establish the professional purpose and identities of the persons who use the network, while the underlying architecture is not affected. It is a "fill in the blank" approach: the streamlined creation of professional networks that provide automatic authentication and encryption.

A wizard in the IDE help the system integrator design each of these features in an orderly fashion as he creates his CryptoNet. The first step is to classify or name the Protectors, e.g. "The Lawyers." FIG. 81 shows the first panel of the Wizard, where the name of the CryptoNet is typed.

The second step is to add values to the multi-lingual bundles. In programming bundles are used to make an application intelligible in multiple languages. Properties files are created. These contain name-value pairs and the value of the pair changes, according to the language, as there is one property file per language. For example if English, French and Spanish are used in an application, three different properties files would be used. The names of the property files may conform to the universal language codes and country codes. Following the example of American English, French and Mexican Spanish, the three properties files' names would be:

Bundle_en_US.properties
Bundle_fr.properties
Bundle_es_MX.properties

The name of the bundles must have a base name, in this case "Bundle," and the rest of the name denotes the language. According to embodiments, each bundle must have the Name-value pair with the same name, so the value would be in each language:

Window=Window (English)
Window=Ventana (Spanish)
Window=Fenêtre. (French).

Figure 82:
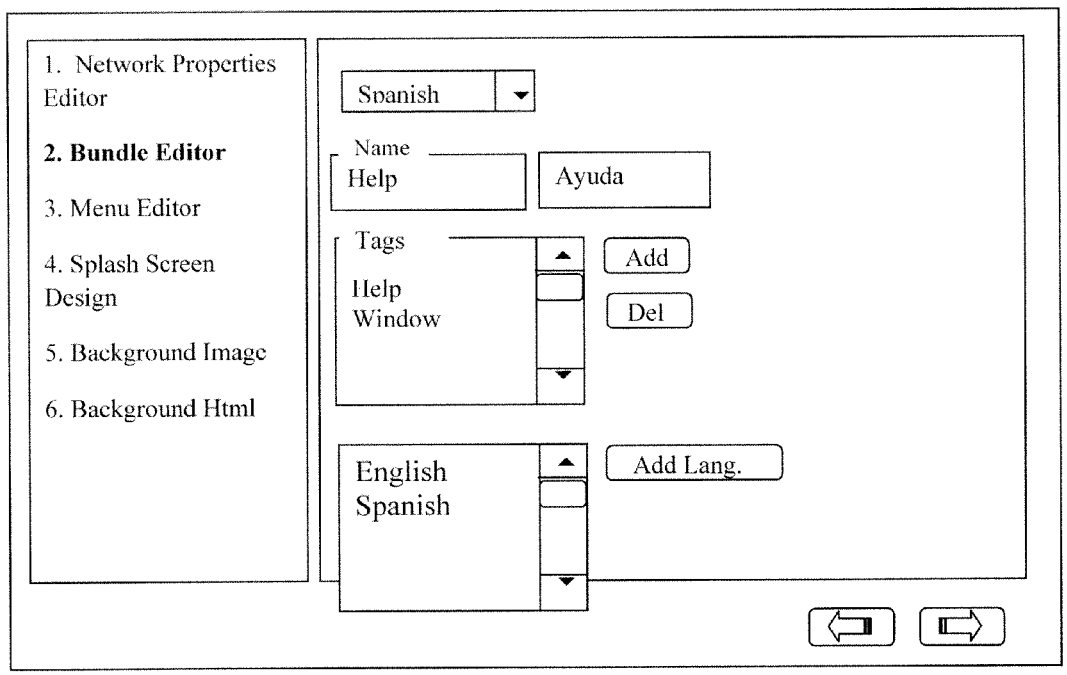
FIG. 82 CryptoNet IDE: Bundles Editor . . .

Name-value pairs must be supplied when a new menu is to be added to the Protector. The Panel of the wizard that corresponds to this step is illustrated in FIG. 82.

The use of properties files to define the language at the presentation layer may facilitate mutual intelligibility for users of the network who happen to have different native tongues. For example, for an international engineering consortium such as Jacobs, Inc., of Pasadena, or Bechtel, Inc., of San Francisco, the language used at the presentation layer can conform to the needs of the engineering firm's customer. When Americans perform engineering for Saudis, at each end of the private logic tunnel the user's native language can be given effect, Arabic for the customer and English for the American engineers. The system converts the values and the processes of the network into the correct language on each end, per the bundles, creating artificial mutual intelligibility. The use of wizards accepting an input that the bundle defines is a substitute for word-for-word translation. This is to say, if the wizards at the user layer are translated, mutual intelligibility may be achieved, at least to some extent, even in the absence of any further translation steps.

The first item in the panel is a list of all of the languages available. From this list the language to be added is selected. In the Name and Value text field the name and value of the corresponding tag for the new language is defined. After all the pairs corresponding to the new language being added have been defined, the values are saved by clicking the "Add Lang" button.

The next step is creating the menus for the Protector application to be used in the new Crypt® Net. New menus and options for the CryptoNet may be created through a Wizard. The functionality for each menu item is programmed using an application such as Java's Net Beans. The user of the Wizard selects the JAR file that was created through Net Beans, and the menu for that functionality is created.

Figure 83:
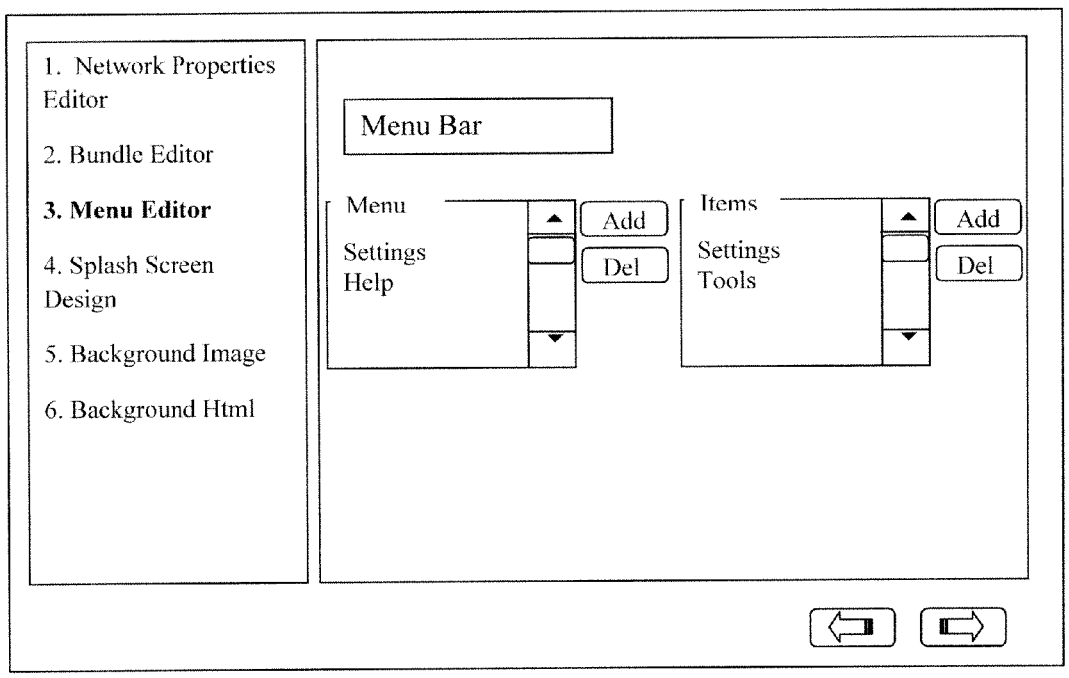
FIG. 83 CryptoNet IDE: Menu Editor . . .

First, the name of the Menu Bar is given. After that the Menus can be added using the Add button next to the Menu List. When clicking the Add button, a frame where the name of the menu, the name of the class that implements the menu, and the Jar File that contains the class is provided. Once the frame is established items can be added to that menu by clicking the Add button next to the Items list. A Process similar to the addition of the Menu takes place. The name of the Item, the class that implements the item, and the Jar File that contains the class may be given. FIG. 83 illustrates the Menu Editor.

In the Splash Screen Design step, the system integrator designs the splash screen for the Receiver application. This feature of the IDE allows the system integrator to exercise artistic control. When the Receiver application processes a meta-file, it takes information from the header and the information is displayed in the splash screen. In this step the IDE presents a canvas where the system integrator can freely design the splash screen through a right click menu, from which the visual components are selected. Two types of components can be selected. TEXT and IMAGE. The IDE also allows the design for the Splash Screen to be imported from a graphic design application.

Per the IDE, when any of these components is selected it is configured, which is to say linked to the header of the meta-file that the Receiver opens. This means that at run time the components of the splash screen take values from the name-value pairs of the header. This link is given effect by typing the name of the name-value pair included in the header.

Figure 84:
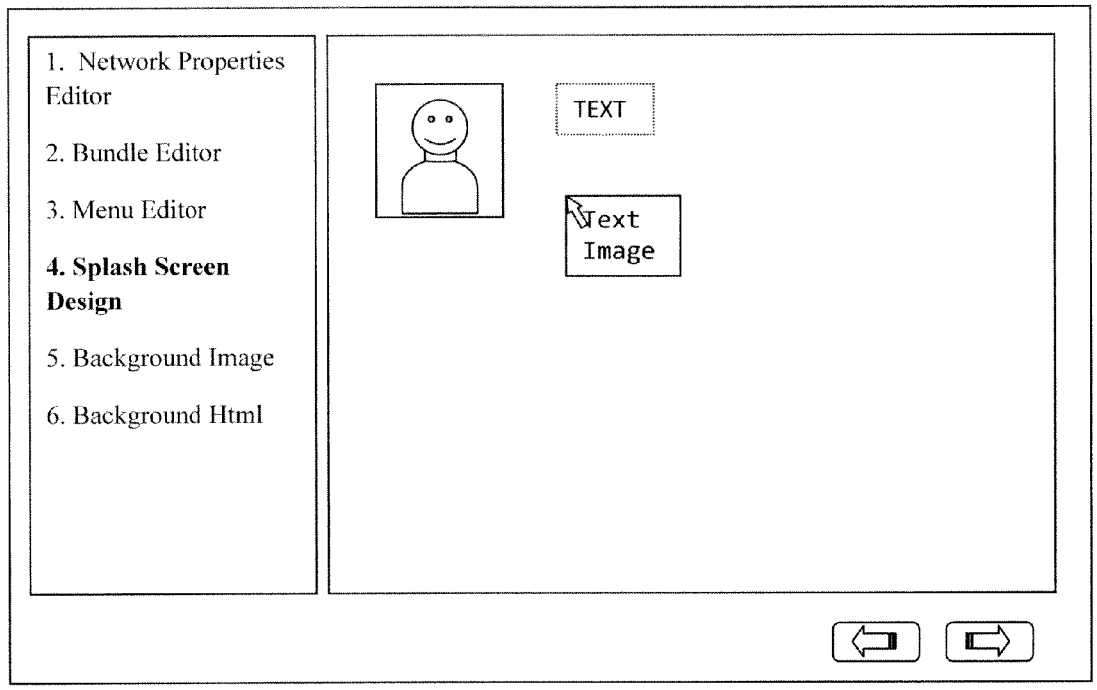
FIG. 84 CryptoNet IDE: Splash Screen Designer . . .

FIG. 84 shows the Splash Design panel of the Wizard.

Figure 85:
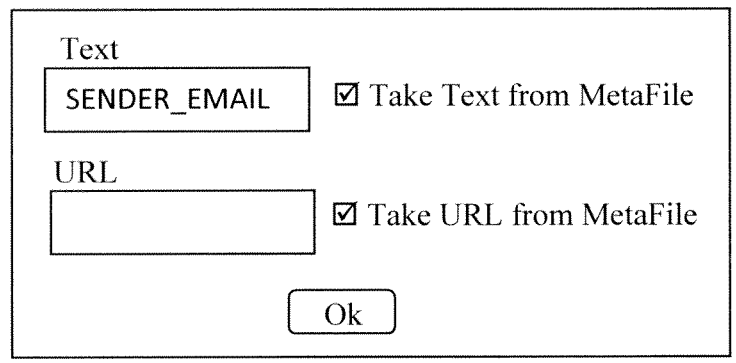
FIG. 85 CryptoNet IDE: Text Component Editor . . .

The component that contains the arrow on the left corner, Text Image, represents the right click menu from which the splash screen components are selected. The TEXT component's attributes can be edited with the frame shown in FIG. 85.

Figure 86:
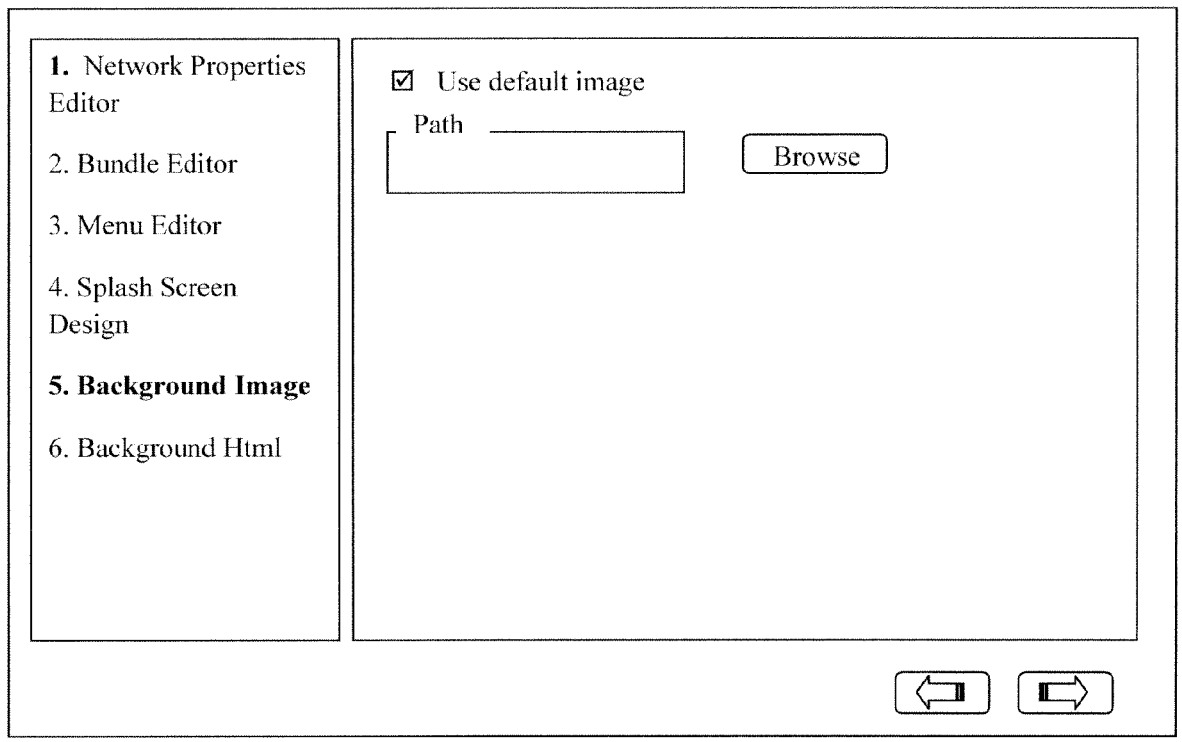
FIG. 86 CryptoNet IDE: Background Image Selector . . .
Figure 87:
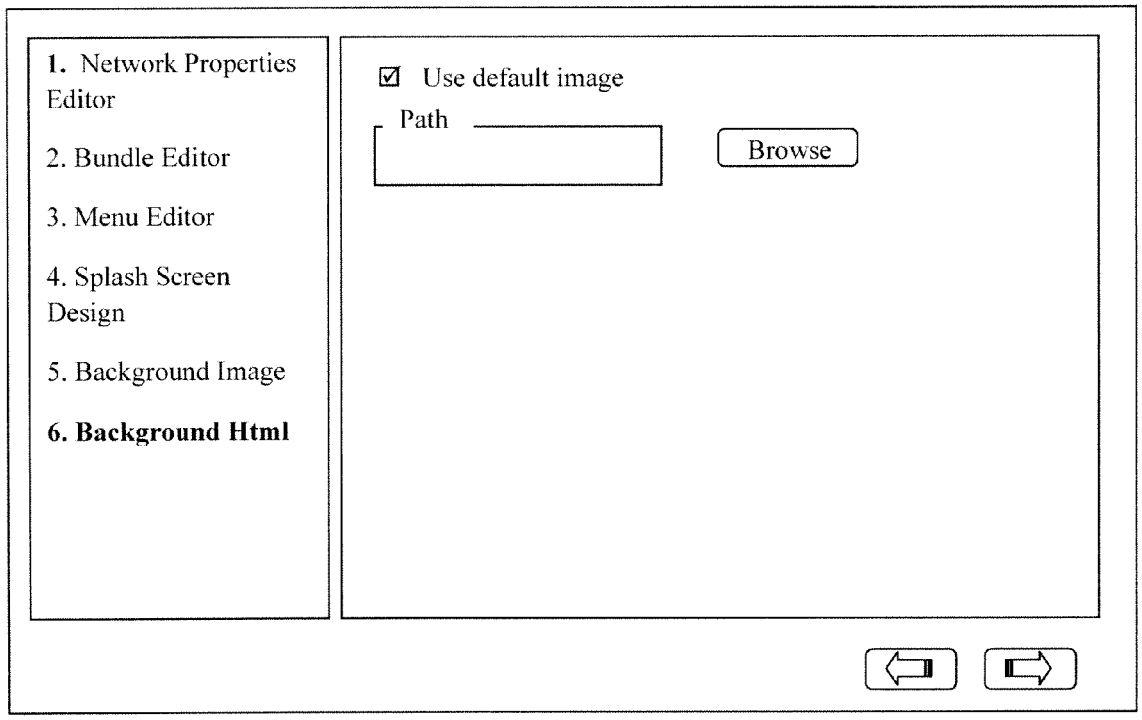
FIG. 87 CryptoNet IDE: HTML Background Image Selector . . .

The next step is selecting a background image for the Protector, to customize the Protector according to the type of network it is or to meet an artistic request. The company might have a logo to use as background image for the Protector. FIG. 86 shows the Background Image Selector. This step is very similar to the previous one. A background image is selected, but in this case is the one that is going to be used in the HTML pages of the professionals' profile (see FIG. 87). The data given in each of these panels is stored in different XML documents, with the exception of the Bundles Panel, which is stored in ".properties" files.

Once the CryptoNet has been designed it is deployed to the Switch, starting out in test mode. The CryptoNet allows the Protector to the Receiver to send encrypted documents back and forth, and the Protectors are authenticated by their dedicated Secondary ELD's. The Switch handles the registration of the network, the generation of the applications, the web site for the user profiles, etc. After the system integrator has finished using the IDE to create his CryptoNet, he assumes control of the network. The super-user, operating the Console, allows the network to pass from test mode to real mode when permission for this exists. The system integrator decides when the network is ready for that step, based on how the testing turns out.

Using the Protector-Receiver Network

Figure 88:
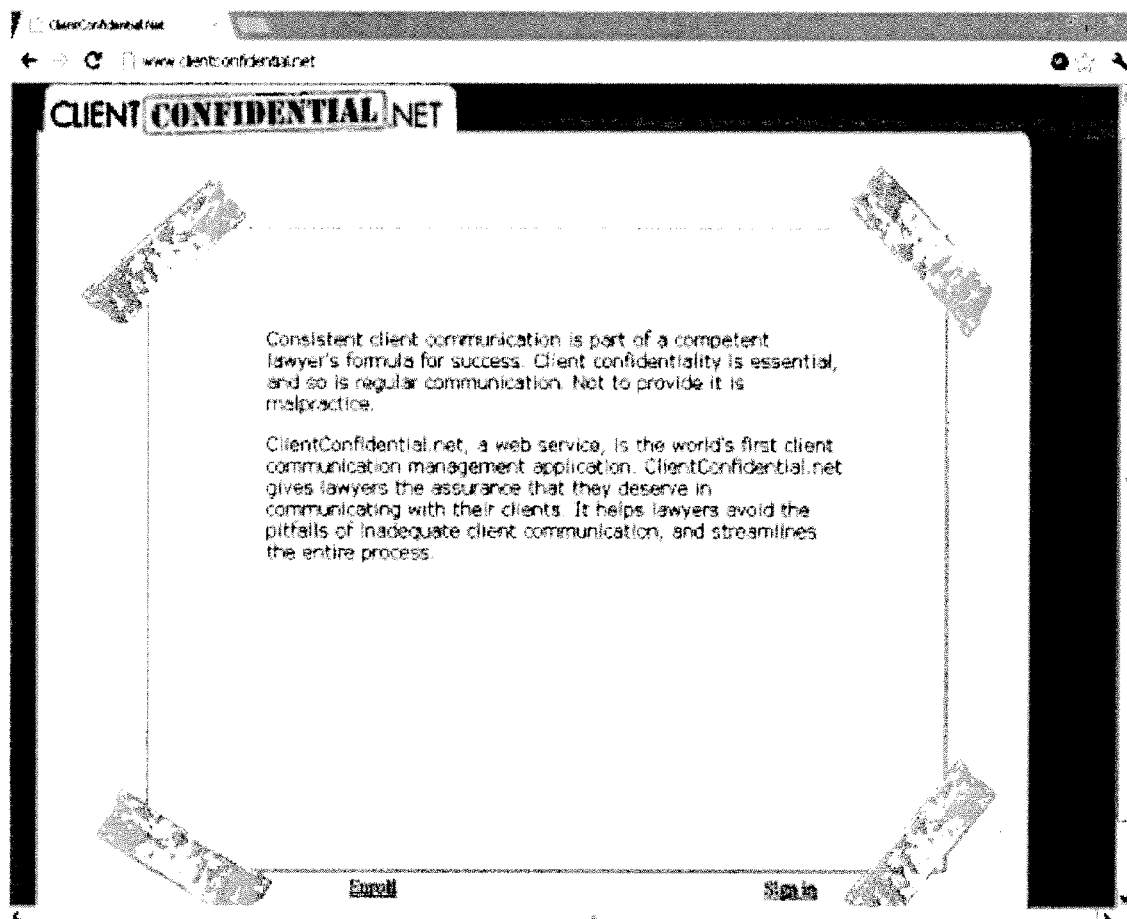
FIG. 88 Client Confidential Main Web Page . . .

The step-by-step operation of a CryptoNet will now be illustrated through the screenshots of one embodiment. In order for a professional to use a CryptoNet (a Protector-Receiver Network) he must first enroll. This process is performed by accessing a web site such as, hypothetically, "ClientConfidential.net," illustrated in FIG. 88. At the bottom of the home page, two links appear, Enroll and Sign In. When a professional is going to use the system for the first time he selects Enroll.

Figure 89:
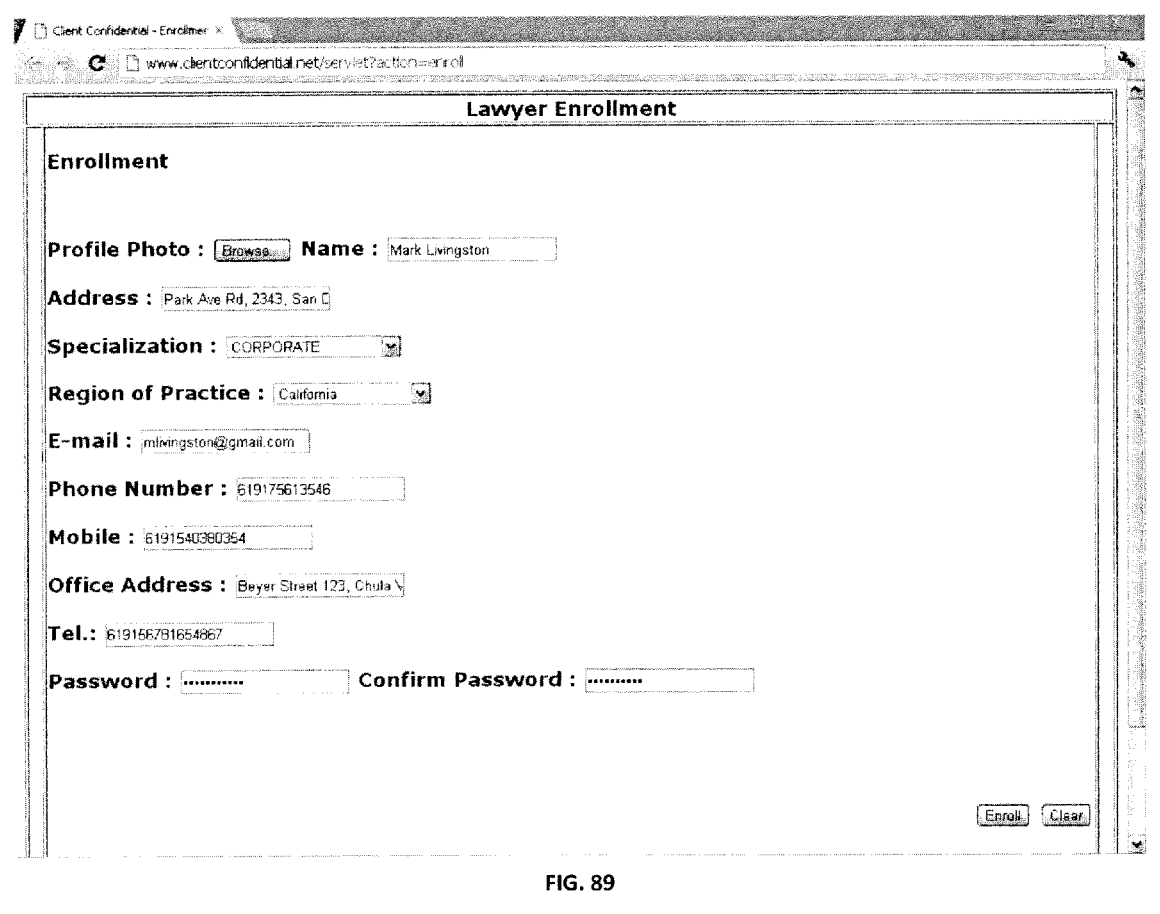

When the Enroll link has been selected the page shown in FIG. 89 is displayed, a series of text fields. The professional provides his personal data, including name, address, home phone, office address, office phone, etc. After the professional has provided the personal data he clicks the Enroll button.

The enrollment web page connects to the Switch DBMS and sends the registration data to it. To allow the enrollee to send his enrollment data with encryption, a Java Applet and Java Script may be used to link the enrollee to the enrollment page. Java Script manipulates the Applet component. The JavaScript code obtains the data from the text fields in the HTML, and then executes the method of the Java Applet that sends the data.

The HTML code that contains the JavaScript code and Applet may be the following:

```
1. <html>
2. <script LANGUAGE="JavaScript">
3. <!--
4.      function sendData(form)
5.      {
6.          var names=new Array(form.elements.length);
7.          var values=new Array(form.elements.length);
8.
9.          for(var i=0; i<form.elements.length; i++)
10.         {
11.             var name = form.elements[i].name;
12.             var value = form.elements[i].value;
13.             names[i] = name;
14.             values[i] = value;
15.         }
16.             var applet = document.getElementById('enroll');
17.             applet.sendData(names, values);
18.     }
19. //-->
20. </script>
21. <applet id="enroll"
22. code="confidential/client/enrollment/ConfidentialClientEnrollment"
23.     width="1" height="1">
24. </applet>
25.     ...
26.     </body>
27. </html>
```

The JavaScript code (lines 4-18) takes the name and values of the components in the form. These components are text fields and a password field (the use of a conventional password is limited to the enrollment step). After all the data has been obtained the element with the id 'enroll' (the applet, defined in the previous HTML code) is obtained and manipulated, that is, the sendData( ) method is executed.

The code of the Applet that sends the data may be the following:

```
1. public void sendData(String[ ] names, String[ ] values)
2. {
3.      Hash table h = new Hash table( );
4.      for(int i=0; i<values.length; i++)
5.          h.put(names[i], values[i]);
6.      SwitchConnectivity sc = new SwitchConnectivity(appPath);
7.      Vector vRequest = new Vector( );
8.      String command = "CONNECT_ENROLL_PROTECTOR";
9.      vRequest.add(command);
10.     vRequest.add(h);
11.     sc.initSwitchCommunicator(vRequest);
12. }
```

This method takes as parameters two String arrays (names and values) which contain the name of a field of the table of a database that stores the identity of the Protector's user (the professional) and the values, respectively. This information is taken from the registration HTML. Then the applet creates a hash table with names and values, which is the object to be sent to the Switch. This information is encrypted before being sent with static encryption logic, Housekeeping Encryption, instead of encryption logic generated as a session-object.

The Switch receives the data, connects to the DBMS, and sends the data to it. The Protector Registration Code of the Switch may be the following:

```
1. public Vector enrollProtector(Vector v)
2. {
3.     Hash table h = (Hash table)v.get(1);
4.     Vector fields = new Vector( );
5.     fields.add("id");
6.     fields.add("UserId");
7.
8.     Vector vValues = new Vector( );
9.     for(int i=0; i<fields.size( ); i++)
10.        vValues.add(h.get(fields.get(i)));
11.    fields.add("activated");
12.    vValues.add("false");
13.
14.    String pw = h.get("password").toString( );
15.    String ePw = HousekeepingEncryption.encrypt(pw);
16.    vValues.add(ePw);
17.    vValues.add("false");
18.    fields.add("downloaded");
19.
20.    insertProfessionalData(vValues);
21.    Vector vResponse = new Vector( );
22.    vResponse.add("PROTECTOR_REGISTER");
23.    return vResponse;
24. }
```

This method receives as a parameter the Vector that was sent by the Applet, the one that contains the hash table of the information concerning the professional. In line 3 this hash table is obtained. A Vector that contains the data is created and this vector is sent to the DBMS.

In line 14 the password is obtained. In the next line it is encrypted, using Housekeeping Encryption Logic. In line 20, the method insertProfessionalData( ) is the one that connects to the DBMS and sends the data.

A dialog window informs the professional when he or she has been successfully enrolled. After the professional has been enrolled he can sign in, download the Protector application, install it, and use it. He can also check his profile page by using his browser instead of his Protector, but the Protector, using a button, can load the browser address bar for this task. FIG. 90 shows the login page. Here the professional enters his user ID, which is his registered email address. Next, the professional remembers the password he or she provided during the enrollment step, and enters it.

Figure 91:
FIG. 91 Professional Profile Editor . . .

Once again the Applet takes the data provided by the professional, encrypts it, and sends it to the Switch. When the Switch receives the data it decrypts it and checks whether the user is enrolled, and if so an Ok flag is sent to the applet. Otherwise a NOT ENROLLED message is sent to the applet. If the professional provided incorrect data an error window is displayed. Otherwise, the professional's profile page is displayed in the browser. The Profile page of the professional is shown in FIG. 91.

The Protector application is downloaded after the Professional has accessed his profile page. A button lets him do this. From the different links on the left side of his profile, the Download Protector link is selected. He clicks this button and the Servlet processes the request. First it checks if the Protector has been already downloaded once by the professional, and if this is the case an error message is displayed. If the Protector has not been downloaded the customization process begins for his new Protector. The Protector application may be auto generated on the Switch, or on an associated server. This process includes generating the hard-wired ELD and installing it, and the Serial id as well, and any other customized features. Customized logic adds security to each Protector as this circumvents "the monoculture problem" that arises when many users share an application with identical security features, because each application uses its own unique security logic.

The code processing the download request may be the following:

```
1. if(action.equals("download"))
2. {
3.     String copyAppName = user_id+"Protector.exe";
4.     File src = new Java.io.File(appPath + appName);
5.     File dest = new Java.io.File(appPath + copyAppName);
6.     copyFile(src, dest);
7.     boolean download = downloadProtector(response, dest,
                                              appName,
user_id);
8.     if(!download) displayDownloadError( );
9. }
```

The Servlet receives as a parameter the action that it must perform (for example, displaying the profile of a Professional, or downloading a Protector application). The Servlet checks whether the parameter that tells it what to do corresponds to that Protector. If the parameter corresponds to that Protector a copy of the installer is created, in order to be customized (lines 3-6). Line 7 downloads the installer. If there was an error, a message is displayed (line 8).

The code that downloads the installer of the Protector may be the following:

```
1.  private boolean downloadProtector(HttpServletResponse
resp,
2.  String filename, String original_filename, String
userId )
3.  {
4.     boolean flag = isProtectorDownloaded(userId);
5.     if(!flag)
6.     {
7.       serial_id = retrieveSerialId(userId);
8.       hardwireData(userId, serial_id);
9.       Java.io.File f =
10.      FileDownloader.doDownload(getServletConfig( ).
                getServletContext( ), resp, filename,
original_filename);
11.      f.delete( );
12.      return true;
13.    }
14. return false;
15. }
```

The code checks whether a Protector application has already been downloaded by the user, and if it has not been downloaded then the serial id of the Protector is obtained. Then the serial id is hard-wired into the Protector application when the Switch generates it (see line 8). The next step is downloading the application, per line 10. The temporary file of the application is removed in line 11.

```
1.  public void hardwireData(String user_id, String serial_id)
2.  {
3.     String appName = user_id+"Protector.app.jar";
4.     String installerPath = path+"app/";
5.     String protectorJarPath = "Contents/Resources/Java/";
6.     String encId = HousekeepingEncryption.encrypt(serial_id);
7.     writeFile(serialIdPath, encId.getBytes( ));
8.     String toRemove = installerPath + "Contents";
9.     command = "jar -uf Protector.jar serial.id";
10.    executeCmd(installerPath + protectorJarPath, command);
```

-continued

```
11.  Hashtable h = retrieveELD(user_id);
12.  byte[ ] encELD = h.get("ELD");
13.  String xmlPath = installerPath + protectorJarPath +
"ELD.xml";
14.  FileIO.writeFile(xmlPath, encELD);
16.  command = "jar -uf Protector.jar ELD.xml";
17.  executeCmd(installerPath + protectorJarPath, command);
18.  String charSetBytesPath = installerPath +
protectorJarPath +
"cse.byt";
19.  CharacterSetExpander cse = new CharacterSetExpander( );
20.  byte[ ] bytes = cse.getScrambledHashtableBytes( );
21.  FileSlicerScrambler slicer = new FileSlicerScrambler( );
22.  int slices = getRandomInteger(15);
23.  byte[ ] scrambledBytes =
slicer.sliceAndScrambleFile(bytes,
slices);
24.  FileIO.writeFile(charSetBytesPath, scrambledBytes);
25.  command = "jar -uf Protector.jar cse.byt";
26.  executeCmd(installerPath + protectorJarPath, command);
27.  rmDir(toRemove);
28.  }
```

The serial id is encrypted in line 6 and stored in a temporary file in line 7. The encrypted serial id is hard-wired into the application in line 10, so that the application stores it only in encrypted form. When the Protector logs on to the Switch, the Serial id is decrypted and the id is transmitted to the Switch, using the hard-wired ELD for security.

The ELD is obtained in line 11. Its purpose is operate as the dedicated ELD that auto encrypts all data transmission between the Switch and the Protector. The retrieved( ) method contacts the Switch and retrieves it. The next step consists in "hard-wiring" the selected, permanent ELD into the Application (see line 17).

The character set expander hash table is obtained in line 20, and in line 23 it is customized. Since this step is performed with random values used in each instance, each Protector has its own unique character set expander hash table. This step is used to enhance the security of the Cognitive Signature login process. Like the dedicated ELD that protects the Switch communication, the characters set expander hash table is "hard-wired" into the application. This occurs at line 26. The final step consists in the removal of the temporary files at line 27.

Figure 92:
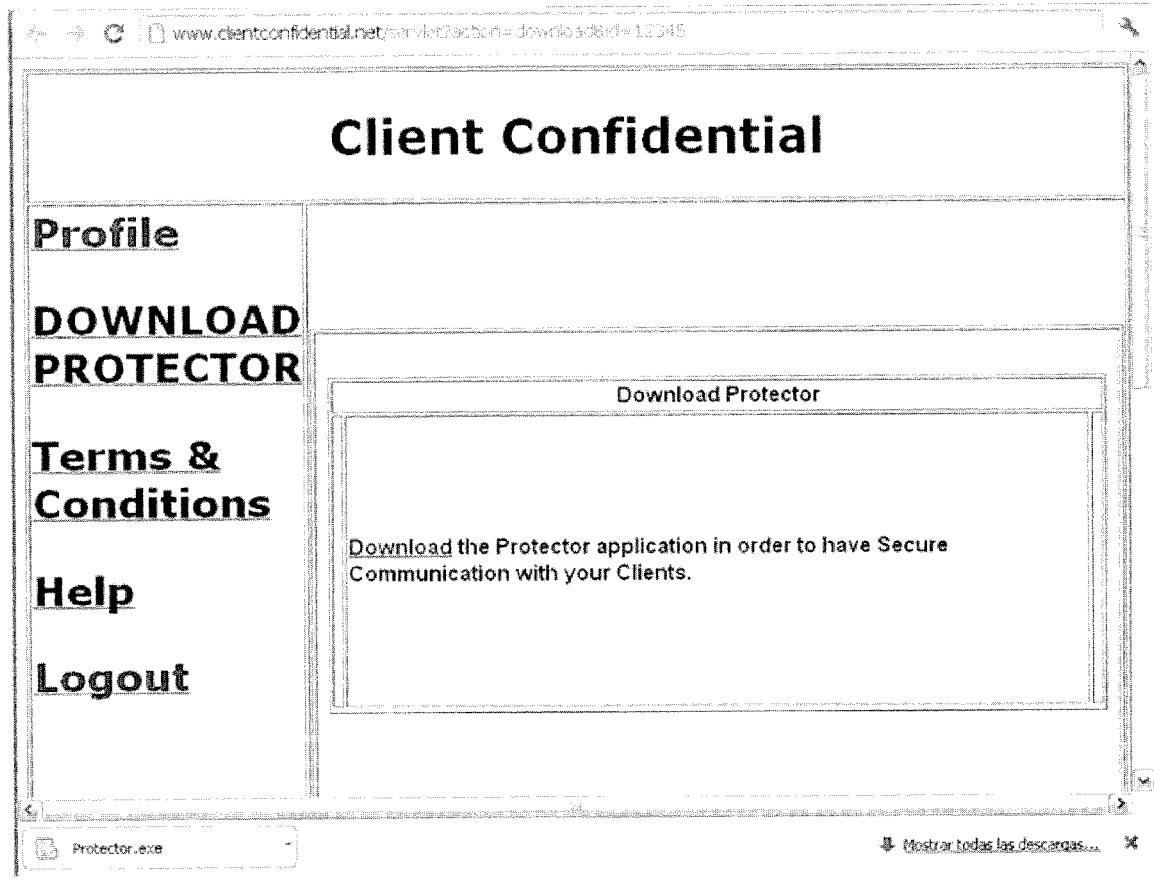
FIG. 92 Download of the Protector . . .

The entire process of auto-generating the Protector application happens as a background task executing on the Switch. After all this happens the Protector application is ready to be downloaded. The Switch transmits it to the Tomcat server in the embodiment where each CryptoNet has its own DBMS and web server, and this transmission is encrypted using the embodiments. FIG. 92 illustrates the downloading process as seen by the professional at the user interface. Again to provide security, the applet is used for the download.

A client looking for a lawyer may access the ClientConfidential.net web site in order to search for any lawyer who has enrolled. If the potential new client cares about attorney-client confidentiality, this search capability allows him to verify whether a lawyer whom he has considered retaining is a member in the encryption service offering Protector-Receiver. That lawyer's profile page will be the hit for the search.

Figure 93:
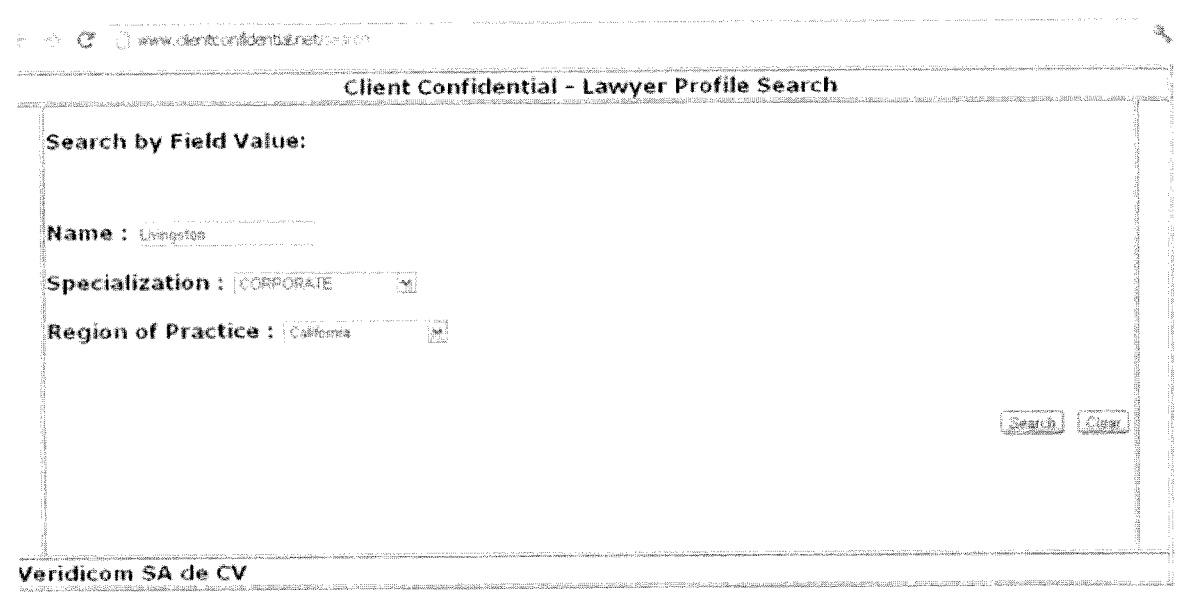
Figure 94:
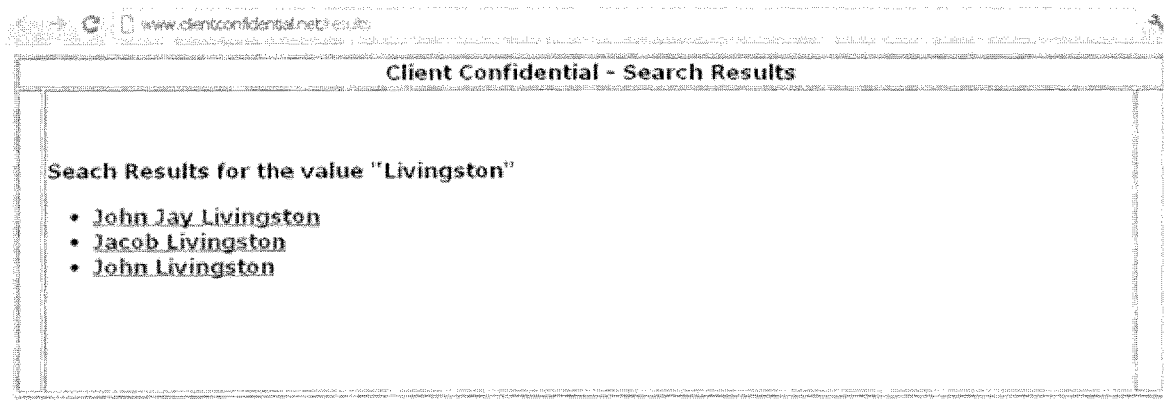
FIG. 94 Search Results . . .
Figure 95:
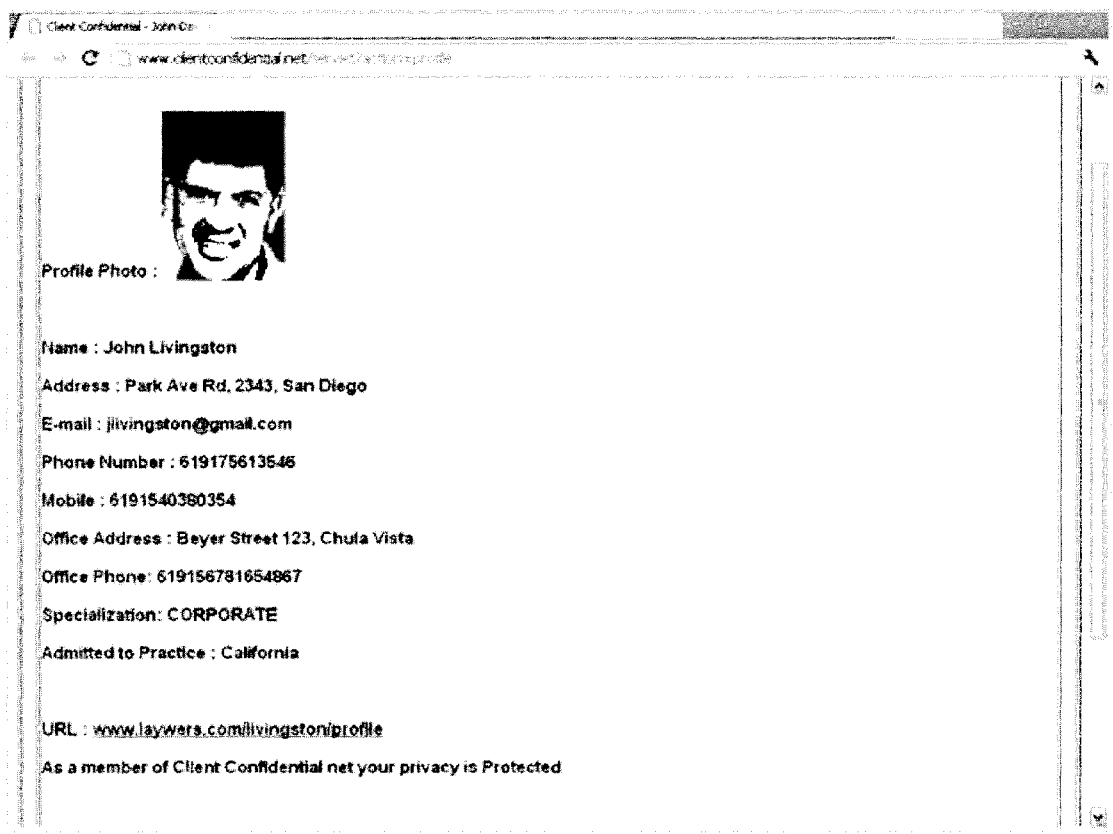
FIG. 95 Profile of the Professional . . .

The potential new client can search for a lawyer using the Search function of the web page, shown in FIG. 93. He enters values into at least one of the text fields shown in the search web page. For example, a part of the name may be typed in the "Name" field. In FIG. 93 the name "LIVINGSTON" has been typed. After the search values have been specified the potential new client clicks on the Search button and executes the search. The Servlet takes the values and sends a request to a remote database server. The remote database server processes the request and sends the results back to the servlet. The servlet processes the results, and displays the list of found lawyers who fulfilled the conditions given by the values entered. FIG. 94 shows the results of the search performed with the values given in FIG. 93. Lawyers whose names contain the string "LIVINGSTON" are displayed. When the client clicks on one of the result links, the profile of the Lawyer is displayed, his servlet-based web page. See FIG. 95. The lawyers may be sorted on the basis of geographic location, and some of the lawyers may elect to pay a premium to gain priority in the search results per the Google™ strategy.

Figure 96:
FIG. 96 Protector Installer . . .

After the installer of the Protector is downloaded it is executed to perform the installation. (The installer and the Protector are downloaded together.) The installer is executed by double clicking on its icon, and the window for selecting the path of installation is displayed. See FIG. 96. The installation path is selected by clicking on the "Browse" button. C: is the default value. Once the path has been selected, the Install button must be clicked. The files installation progress window is displayed.

Once all of the files of the application have been installed on the computer, the Protector Configurator is executed. The Configurator registers the application in the Windows™ Registry in order for Windows to know how to process the output files of the applications which have been tested as compatible with the encryption functionality, such as MS Word™ documents, spreadsheets, etc. The OS Detector allows the same process to occur under the Apple operating system, and under Android as well.

When the Protector is going to be used for the first time the wizard for creating the professional's Cognitive Signature appears. The Cognitive Signature is the character string generated from the professional's answers to a series of unique personal knowledge questions used to authenticate him. The questions may address facts expressed in words, or dates expressed in numbers, and a guide onscreen may randomly ask the user to enter not only the actual number or date, but as to each keystroke, enter additionally one or more adjacent keys. The guide displays shift number characters for the user to see and input, providing the same functionality as CAPTCHA. The guide generates random values to select these additional keys, and using the additional keys expands the key so that it is harder to crack. Another way of guiding the user to help him input extra keys is to put a matrix of the entire Unicode character set on the screen, with numbers in the columns and letters in the rows so that cells can be specified. The cell containing the Unicode character which the user is to enter into the key is identified by its number and letter. Alternatively, an arrow can appear to designate the particular Unicode character randomly selected for the user to input, and the user clicks on the cell which the arrow is pointed at.

For example, the first question may be one which calls for answers in letters. The letter string, the answer, is saved in ram and shortly will be used as the input to a hash table. The second question may call for a date, so the answer would be a string of numbers such as 112754, Nov. 27, 1954. The numbers are entered one at a time, by typing, but before the next number is written there is a special instruction. The hash table using the data from the letter input generates the special key instructions that will be inserted into the login process at this point. In one embodiment, after the date is keyed in, the matrix of Unicode character appears and the user clicks on the cell containing the arbitrarily selected Unicode character per the arrow that points it out. Thus, the user's input is guided not only by memory, but also by a Captcha like step that expands the key in a totally random say.

Instead of a matrix and arrows, a pictograph indicating "shift number" keys may appear, and using the shift number keys expands the universe of characters, making the system harder to hack. After each numeral in the date, the hash table generates an alphanumeric value actuating pictograph that gives the user a special, supplemental typing instruction. Obeying the pictograph, the user enters an "inter-numerical" key, or several, and the key selected to be entered is one of the "shift-number" characters. (These are the characters that appear above the numerals on a QWERTY keyboard).

The hash table governing this process for the individual Protector application is generated as the output of the initial letter string, and because this input differs with every unique letter string that the user enters, the resulting hash table is different from that of any other Protector. The numerical data input also is different, so applying the unique hash table to it generates a unique string of shift number keys, per the shift number key identifiers, as presented to the user through the pictograph, which literally points to the keys. In one embodiment the shift-number identification is presented to the user as a pictograph that appears after each numeral key is entered, the shift number key having been selected by the instance of the hash table. However, the additional characters the user is asked to input, the ones that are not part of a mnemonic input, may be generated independently of the memory of the user. In this case they are not dependently derived from the mnemonic input, but derived solely from the Captcha like process. When both techniques are used, both memory and Captcha operate independently to frustrate a programmed attack. Another approach is to use event controls under Java to prohibit the entry of characters too rapidly, slowing the input of characters to the pace of a human user instead of allowing the entry of the characters at electronic speed.

This may prove cumbersome the first time the user does it, but after a while it becomes second nature because the user does this every time he logs in. The purpose of the special typing instructions randomly generated from the hash table created by the letters input during the first part of the login is to expand the scope of the characters entered as the login security key. The randomly generated hash table may use the special instruction, the pictograph, or the click-on-the-matrix user input method, and this may vary with embodiments.

According to the pictograph, if the use enters the key for the numeral 5, the corresponding shift key would be %. (When the user keys the shift key and five, the percent sign is selected). The input into the hash table is the string of letter key entries, and hash table generates a random shift-number key identifier value corresponding to the numeral key. If the numeral that the user enters is 5, and the random shift-number key identifier value is 2L (two keys left) the shift number key the user selects is #, because this is the shift number key that is two spaces to the left of 5. Instead of a character based descriptor telling the user what to type, the Pictograph showing the keyboard can point out the key literally, and this imposes a lesser mental burden. If the value is 1R, the user enters the shift number key that is one key to the right of 5, which would be ^, because that is the key identified in the pictograph.

This technique forces the user to create a Cognitive Signature that is constructed by a much larger byte set than if only alphanumeric characters were employed. Using a larger universe of characters as the pool of characters from which each entry is keyed creates a key that is more random and harder to crack. The hash table that is generated, as a final step, may shuffle the order of all the keys that the user has entered. This overcomes the predictability inherent in the fact that in the beginning the user inputs only letters, and then a number followed by a shift-number key.

When such a CAPTCHA-like pictograph is used to forces the user to touch a shift-number key that exists in the relation to the number key that the hash table has defined, the user sees which key to enter and enters that key. As in the case of CAPTCHA, under the embodiments actual human vision is required to complete the data entry that creates the key.

The logic advantage of using a hash table to force the user to expand the mnemonic Input by including shift number keys in this manner flows from the fact that the shift number keys are randomly generated from a logical relationship to the keys first entered, not merely from a direct correspondence to the mnemonic content. If a remote computer used heuristics to guess the user's answer to the Cognitive Signature questions, the system still could not be cracked because the hacker could not see the pictograph. The mnemonic input derived hash table may be followed by a second hash table powered by the RNG, using the Unicode Matrix technique, to include characters that are independent of the mnemonic input, as well. Both techniques enhance orthogonality.

The Cognitive Signature is established in the first instance as part of the enrollment process, after the user has downloaded and installed his Protector application. The user enrolls his Cognitive Signature by matching it repeatedly, by entering the correct Mnemonic Input more than once. If he is successful, it means that he has chosen good questions, which is to say questions which given his life experience he can easily remember. With his Cognitive Signature installed, from that point forward providing the correct Mnemonic Input unlocks the user's contacts list, the Trust DBMS on his Protector.

Figure 97:
FIG. 97 Selection of Questions of Cognitive Signature . . .

The first step of the wizard is the selection of questions to be answered (see FIG. 97) based on which ones the user can answer with the greatest certainty. This process of elimination is known in the nomenclature of the embodiments as winnowing. Winnowing may use questions that call for letter answers as well as number answers, such as facts and dates, respectively, as this forces the user to employ a larger character set than if he merely keyed in letters.

Figure 98:
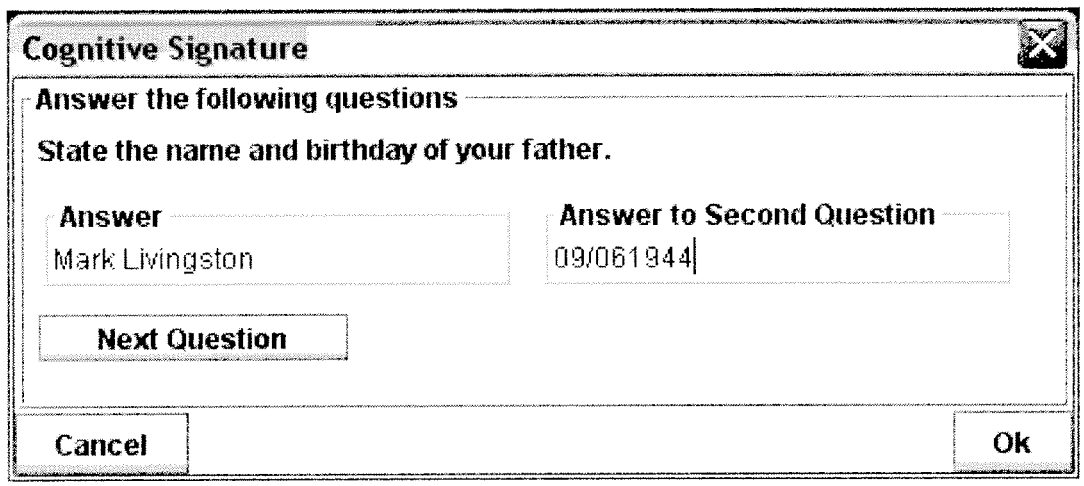
FIG. 98 Answering the Selected Questions of Cognitive Signature . . .

The next step consists in answering the chosen questions. These are called the Strong Set. From the questions selected by the user only 3 must be answered during login, in one embodiment. FIG. 98 shows the answering process as to one of the selected questions.

The answers to the Strong Set questions, involving both facts expressed in words and dates expressed in numerals, are harvested as a string. The shift number key expansion technique just described, using the first part of the string to generate the instance of a hash table affecting the numerical values entered later in the string, per the CAPTCHA-like pictograph depicting the keys to be entered, may or may not be used, as may the matrix and arrow version of Captcha expressing the full Unicode character set. The string is used to generate the key that encrypts the Trust DBMS of each Protector.

In one embodiment the original ASCII string is expanded by translating it into bytes that correspond to the Unicode character set. The initial string is expanded into a Unicode character string, and the bytes corresponding to the second, expanded string are the key, which this expansion step is now is quite large. As shown in the code sample above at line nineteen, the expander hash table may be customized and individually hard-wired into each Protector application. This is another example of an individuation feature protecting against "the monoculture" problem. A hacker who cracked the Cognitive Signature of one Protector, thanks to this customization, would not be able to use the knowledge gained to hack a different Protector.

Figure 99:
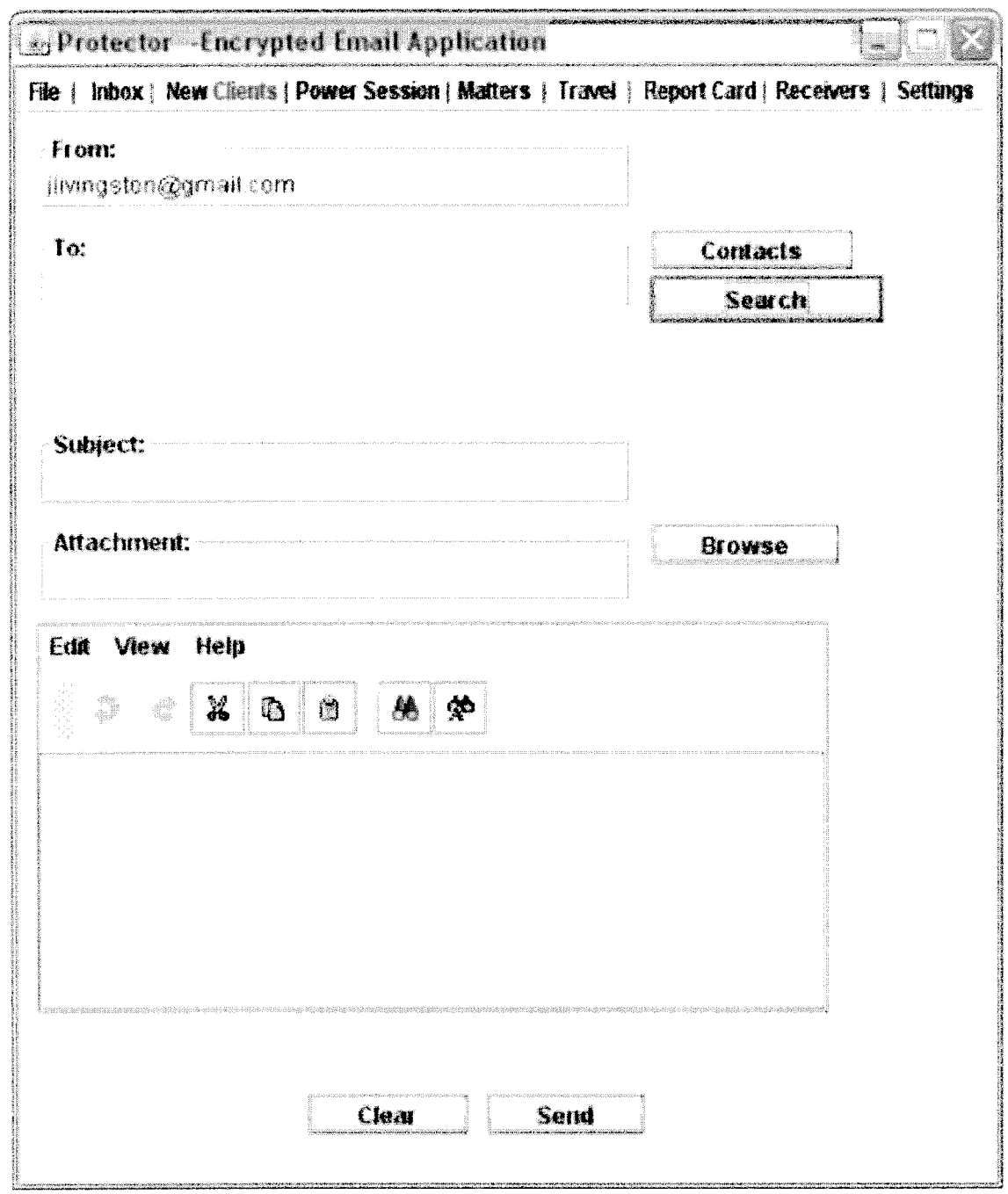
FIG. 99 The Protector . . .

Each time the given Protector is executed the question and answer process is repeated as part of the login, using the same questions, in order to decrypt the Trust DBMS. If the user wants to quit the routine before he has answered the questions completely, an error message is displayed. After the user successfully provides the Mnemonic Input to authenticate himself, the Trust DBMS on the Protector is unlocked and the Contacts List is available for use as shown in FIG. 99.

Figure 100:
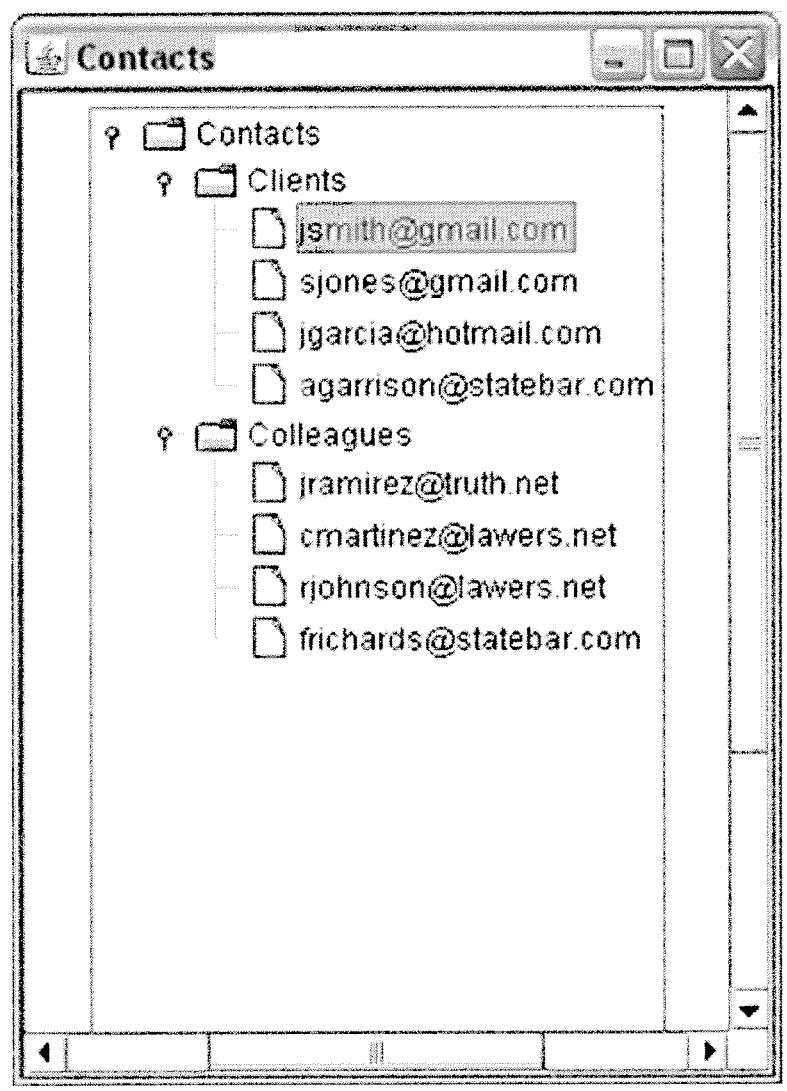
FIG. 100 Clients per Tree View . . .

With the Cognitive Signature correctly provided, and that string processed in the background to open the Trust DBMS of that Protector, the recipients of the emails to be sent are selected. Whenever the Protector is to send an email, the recipient is clicked on from the list of contacts. The list may be displayed as a tree view, shown in FIG. 100. There is another way of selecting a contact, by clicking the "Search" button underneath the "Contacts" button. When this button is clicked a window for entering a search term is displayed, and after the search term is executed the results are shown. A window may list the most recent contacts, or sort them on another basis which the user selects.

After the recipient has been selected the Subject (or re line) of the email must be provided. If the email is going to have attachments they are selected by clicking the "Browse" button by the Attachment field. The browse-and-select method for the attachments works as in a conventional email application.

Figure 101:
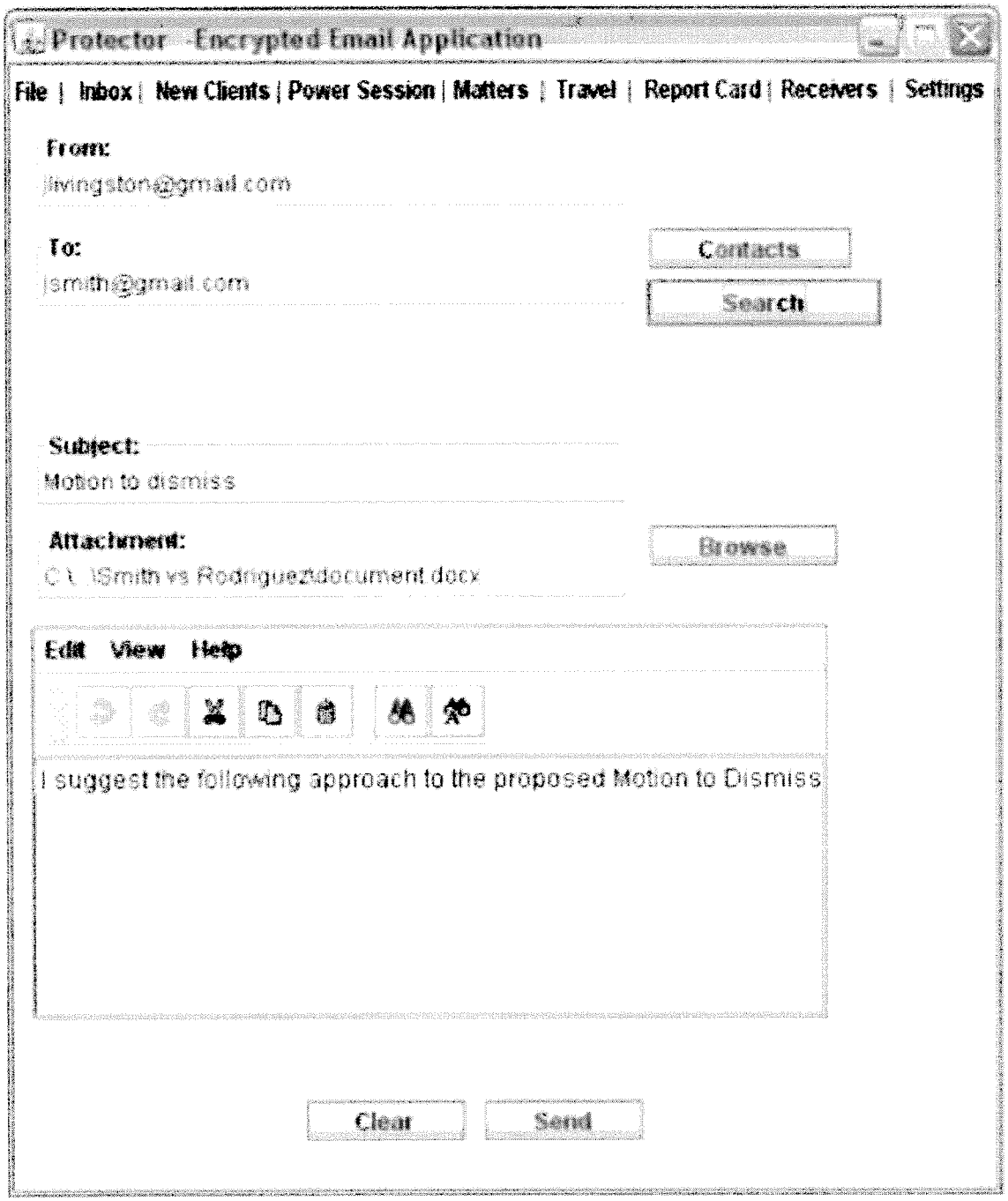
FIG. 101 Creation of an e-mail . . .

The last step consists typing the body of the email. See FIG. 101. After all these steps the user clicks "Send" button, and the text and attachment of the email are encrypted and added to the meta-file as a background task, and the email is transmitted to the designated recipient.

Figure 102:
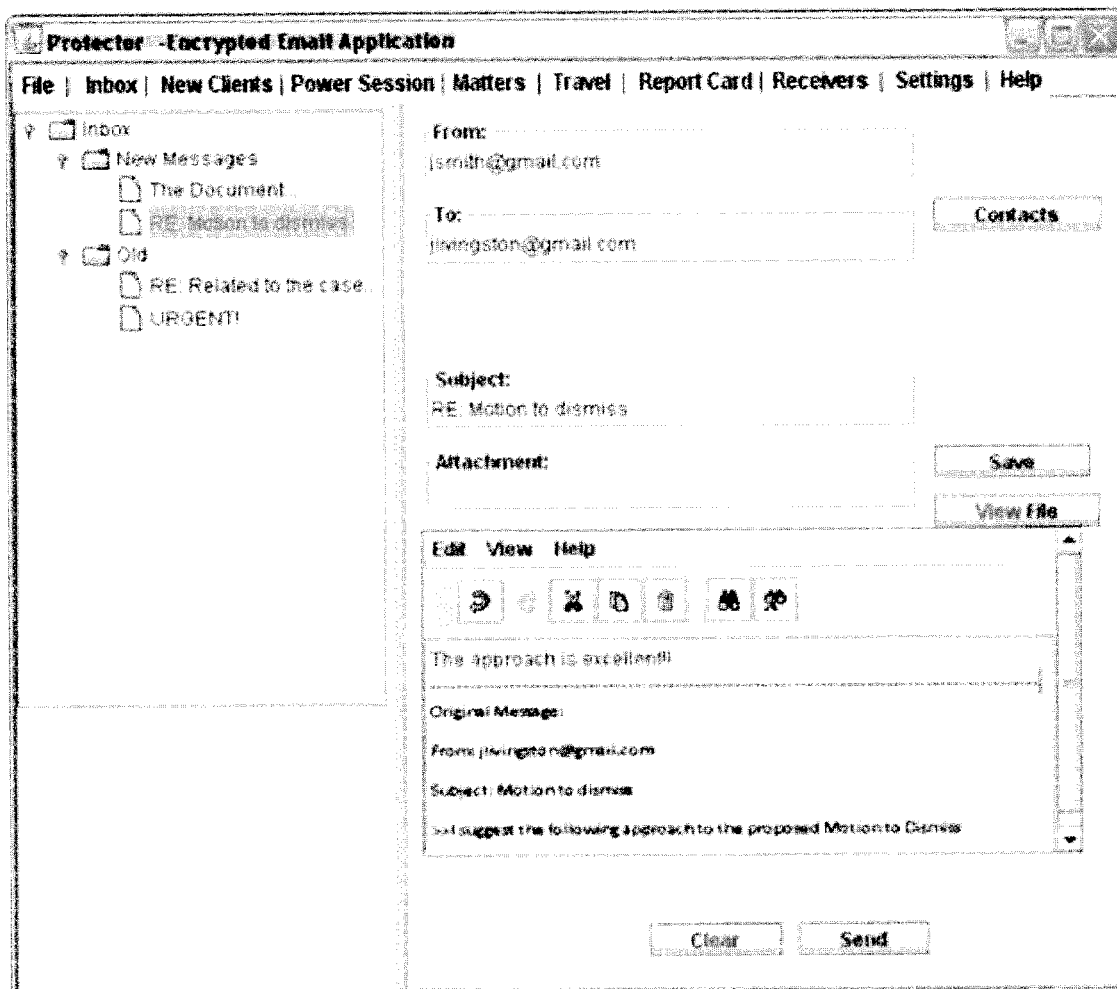
FIG. 102 Reading Email . . .

Under the embodiments the meta-file is sent as an attachment to a conventional email that is generated using an ordinary mail server or web service, such as Gmail. The protected message "rides piggyback" on the conventional email message. The conventional email server is used parasitically by the Protector to transmit the encrypted meta-file to the recipient application as an attachment to the conventional message, using an ordinary email account. There may be nothing in the transmission to allow the conventional server to know that the communication has been protected, so the email server treats the message no differently from the others. Once the email has been sent a dialog window opens, indicating success or the lack of it. The application that receives the protected email is either another Protector or a Receiver. The recipient application extracts the meta-file attached to the email, auto decrypt its contents, and displays the message in the view window. See FIG. 102.

A conventional email application or email web service such as Gmail© offers a re-line for each email message. The re-line is hijacked in the embodiments and used as a signal to convey whether the two communicating parties are in trust or not. If the email is sent to a colleague who has a Protector application but is not yet in trust with the sender, the sender's Protector application on the default "re line" provided by the conventional web-mail interface inserts a canned message such as "Secure contact established." Secure contact is the usual result of the automatic grant of trust procedure per Initiator, so the affirmation that secure contact is established is the anticipatory announcement of the expected success of that process.

This canned message in the re-line works as a binary value which the Protector processes to show whether trust exists, so that if it does not the receiving Protector knows that it needs to execute Initiator to establish trust with the recipient of the message. Initiator executes completely a background task. Protector Receiver uses the first Initiator embodiment, utilizing Tertiary ELD's. If trust does not yet exist, the canned message signals the Recipient Protector to expect to receive a Tertiary ELD to execute the grant of trust procedure. If trust already exists, the canned re line is "Secure Message by Client Confidential.net," or a similar message. The re line allows both the transmitting Protector and the Receiving protector to perform the steps that Initiator requires.

When the professional uses his Protector to check his email account for messages received, whether it is a POP account or a web-mail account, the Protector does not display the canned re-line but goes directly to the true re-line, the contextual one which the author of the email, using his own Protector, has written to inform the recipient of what the message is about. On the other hand, in the event the professional checks his mail from a browser (perhaps he is at an Internet café and he does not have his Protector available as he is using a public computer) the canned re-line appears. Under these circumstances, when he uses a browser on a public computer to check his email and there is a message from a professional with whom his Protector has not yet established trust, the canned re line appears "Secure Contact Established," because this is the process that will occur later when the professional opens that message on his own computer, using his Protector. But at this point, because the user is not in possession of his Protector, the encrypted message cannot be read. From the standpoint of Initiator, nothing is different, and the public computer presents a point of failure. Initiator will create the Secondary ELD and the trust grant process proceeds normally. But so long as the professional is in the café using a public computer and is not in possession of his Protector application, he cannot read the message, except for the re line as just described. But if he uses his laptop in the Internet café and his Protector is installed on it, he enjoys automatic encryption and decryption as in the normal course.

If the user is on a public computer and trust already exists, the canned message in the web-service email re line is "Secure Message encrypted by ClientConfidential.net." But still, since he is on a public computer and has no Protector, he cannot read the message. Later on, on a different computer containing his Protector, the Protector processes the true re line and presents it to the user, such as "Motion to Dismiss." And in the case of trust not existing, the grant of trust process is automatic, as described above in the section explaining Initiator.

In one embodiment, however, the user may be allowed to receive and see a second message when he only has a browser available, a message appearing in the conventional email message box. In other words, although the conventional email or web mail implements the encrypted attachment strategy of Protector Receiver, the existing application or web mail account still allows the user to insert a message. The capability to send an unencrypted message, in this embodiment, is unimpaired. This is a work-around that tells the user whether seeing the encrypted message is urgent. For example, the lawyer's assistant may realize that the lawyer is not in possession of his Protector, which is installed on his laptop, but does have his smart phone. The assistant, knowing that the lawyer has his smart phone without a Protector installed, sends the protected message to both the smart phone and the laptop. The assistant, using his own Protector application, tells the lawyer in the message, in the message window used in the conventional web mail message, "Get your laptop and read this urgent, confidential message concerning Smith v. Jones." The lawyer can't read that protected message on the smart phone, because it has no Protector installed on it. So the lawyer goes back to his car, gets his laptop, and reads the urgent, protected message as to which he was just informed.

Figure 103:
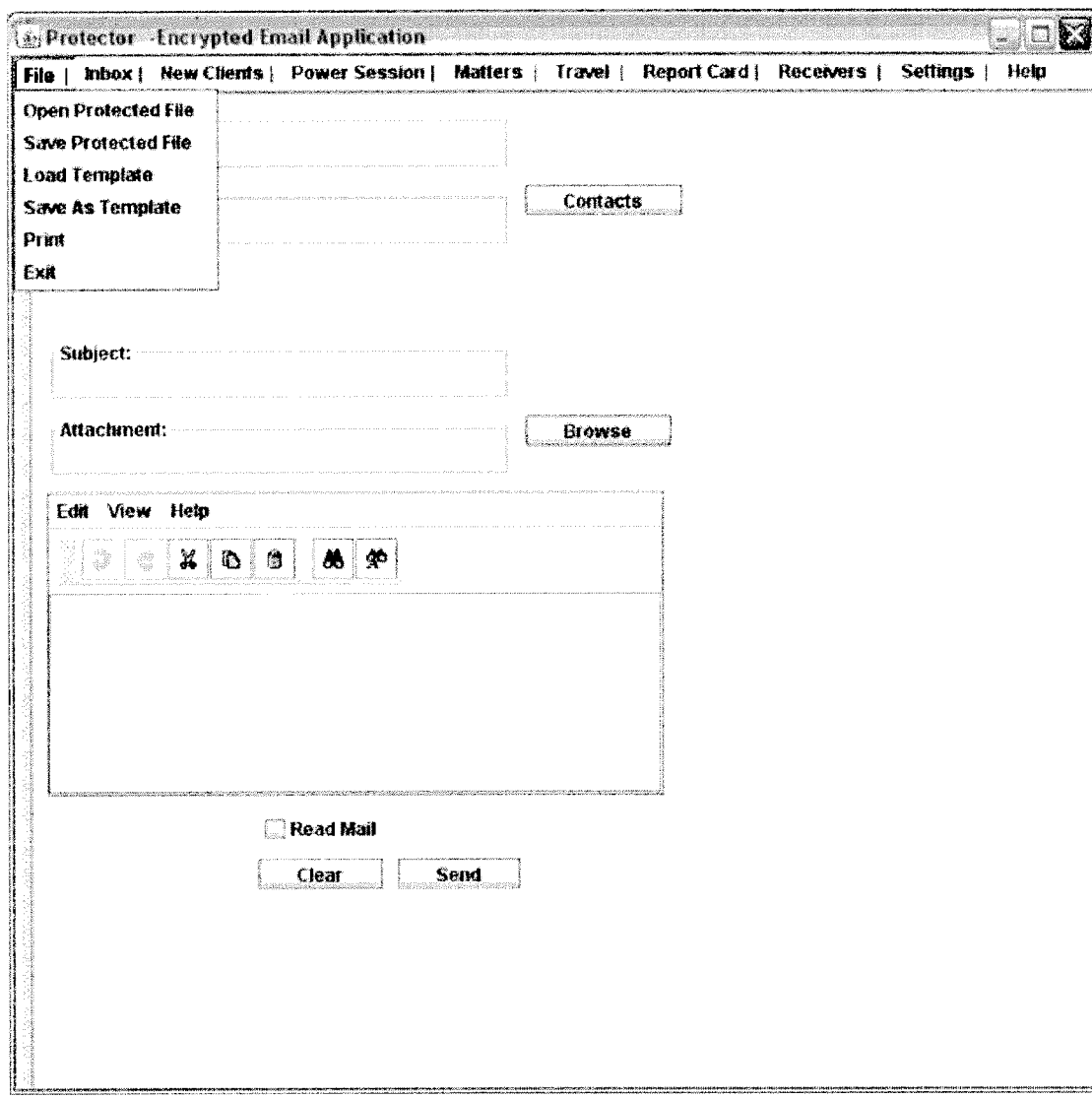
FIG. 103 The File Menu . . .

The Protector has a menu bar where the primary functions are accessed. The first menu is the File Menu. This menu contains options for opening the protected files, saving the currently displayed email as protected, loading a template, and saving the displayed mail as a template. FIG. 103 shows the File menu.

Figure 104:
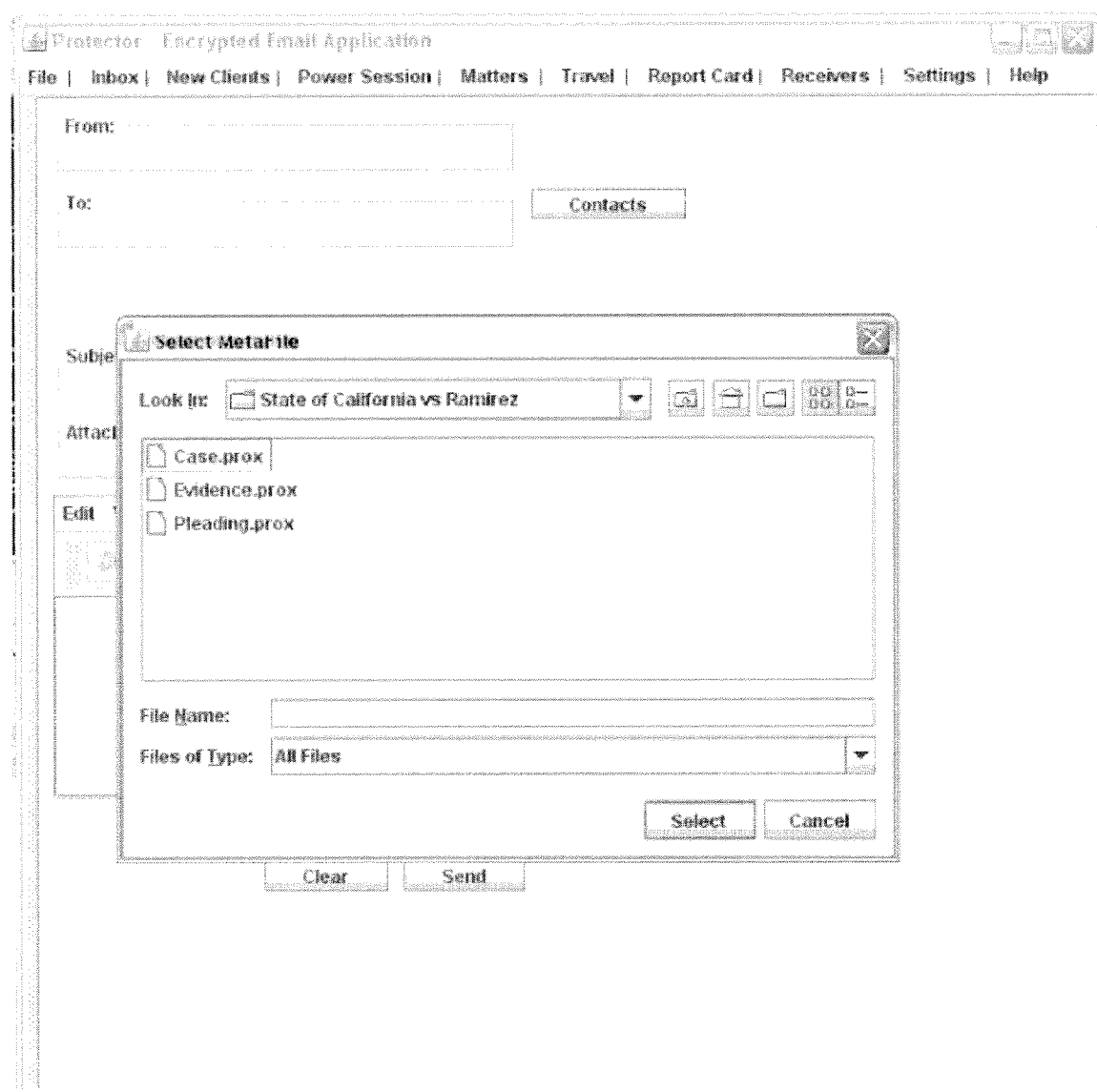
FIG. 104 Selection of the Meta File to be Opened . . .

When a protected file is to be opened the Open option is selected. A file chooser appears, allowing the user to select the protected file to be opened (see FIG. 104). After the protected file has been selected by clicking on it, the content is displayed in the Protector in the view window. The same process is performed when a template is selected.

Figure 105:
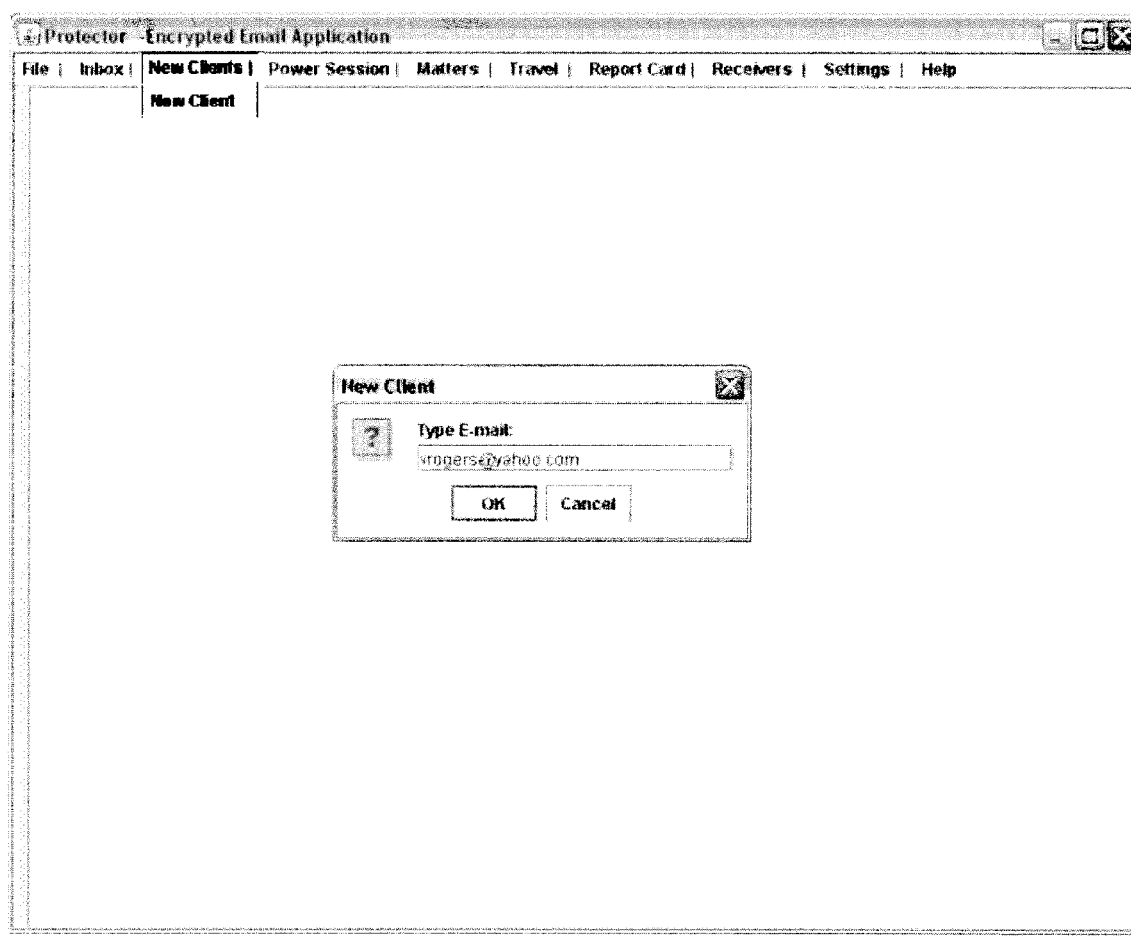
FIG. 105 Adding a New Client . . .

FIG. 105 shows the New Clients menu. This menu is the one the professional uses to register new clients and provide each with his customized Receiver application. The professional must know the client's email address beforehand—that of his ordinary, unprotected account—in order to email to him his enrollment form. The Protector may import the user's other contacts lists. This is a data packet to be filled out and returned. If the professional and the new client already have made contact through a conventional email account, all the professional has to do is copy and paste the client's email address into the box in his Protector, as shown in FIG. 105. Then, the professional clicks on a button to invite the new client into trust, and this step uses the Protector's email functionality to send the invitee the enrollment packet without any further data input steps by the professional. The packet is an attachment to an email. In another embodiment the professional checks each address in a list of them in his conventional email account to be imported into the Protected account, so that from that point forward the protected account can be used for secure communication between the Protector and any selected addressee.

Everything happens as a background task once the client's invitation packet is filled out and returned. The packet is a prox file, so the Protector recognizes it and processes it automatically. The Receiver application for the new client is auto generated on the Protector after the new client fills out the packet and returns it, by the Protector processing the packet. With this information the professional's Protector application can automatically prepare the customized Receiver application that the client will use in the attorney-client secure communication. This auto-generation process for the Receiver, executing on the Protector, mimics what happens on the Switch when the Protector is auto generated. The same code is used with a slight modification. This hierarchical approach to the generation of subservient applications with tailored logic and individuated features may occur at n sub-levels.

Figure 106:
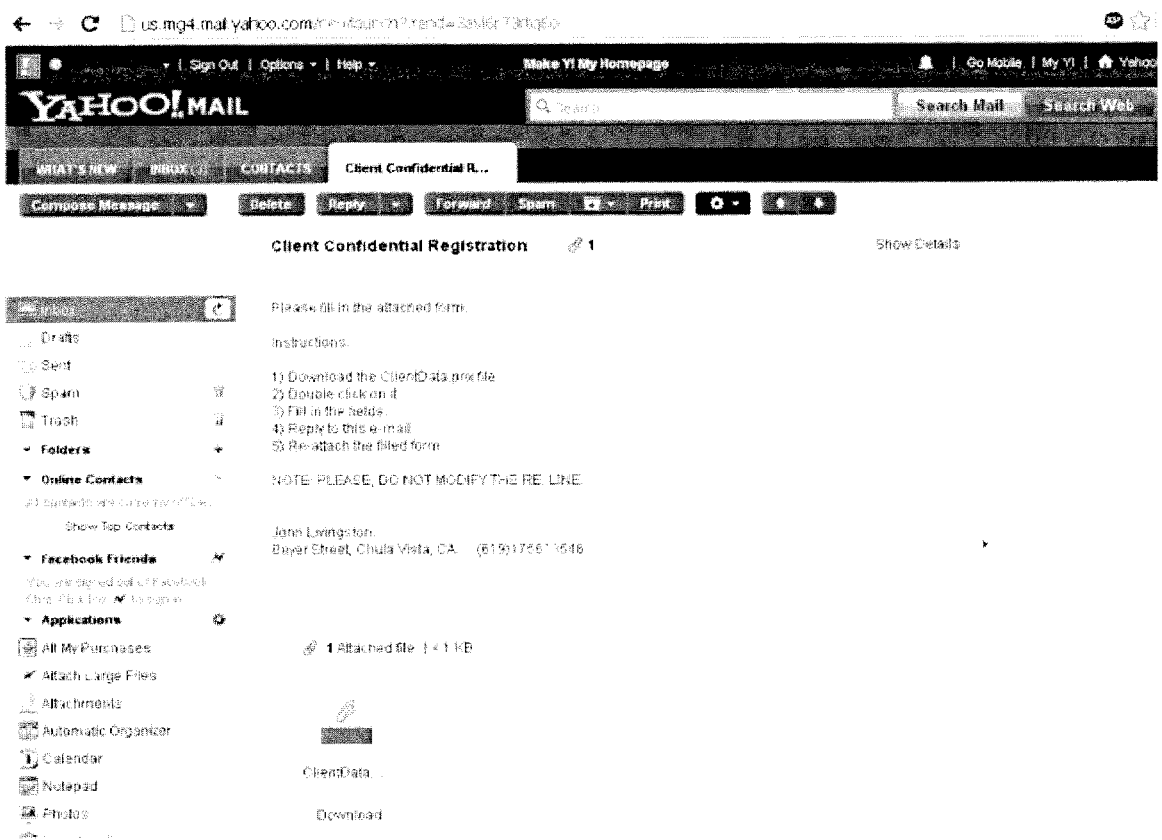
FIG. 106 Email including the Form for the Client . . .
Figure 107:
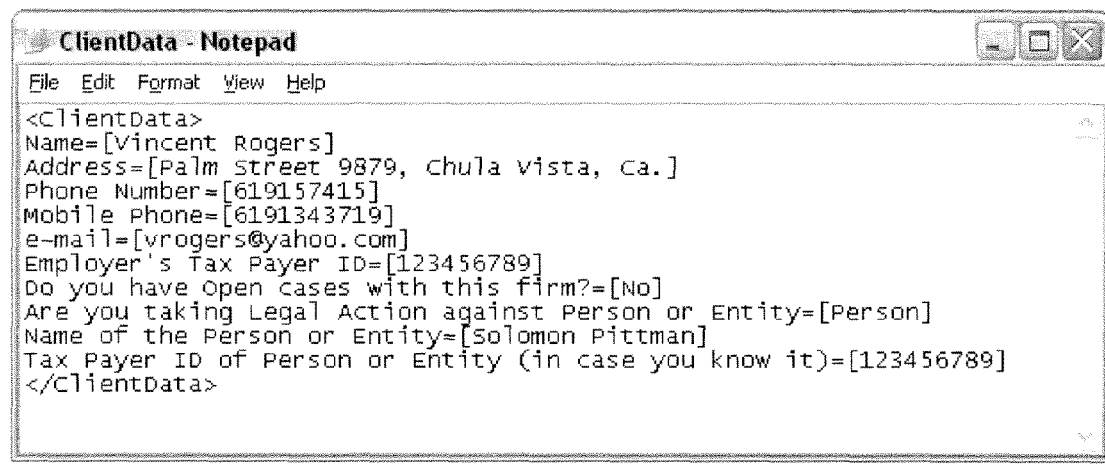
FIG. 107 The Client Data Form . . .

When the professional clicks on the button as shown in FIG. 105, the Protector auto generates the invitation to the client enroll on the trusted network, and this is a canned email message to the client with the enrollment packet attached. After the email has been sent and received the new client opens the packet and fills it in. This form requests the client's data (name, address, phone number, etc.). FIG. 106 shows the client's email web page (viewed in a web browser), and the email (with subject "Client Confidential Registration") has been received. This email contains the instructions the client must follow to fill in the data. FIG. 107 illustrates an example of a form that has already been filled in. After the client has filled in the data, it is sent back to the Protector of the professional. The new enrollee may use the "reply" function of his email application to return the packet.

The professional, using an ordinary mail client (such as Outlook©, Thunderbird©, or a web browser in the case of web mail) opens the email, extracts the packet, and saves it to his Protector. Alternatively, he uses his Protector directly to receive and open the client's reply packet.

In the embodiment where the professional receives and opens the reply to the invitation using his Protector, the form is an email attachment using the .prox extension, and the Windows Registry associates that extension with the Protector application. Once the .prox file has been downloaded by the recipient Protector it is double clicked, and the Protector processes it to extract the information in the packet and store it in the Trust DBMS, after creating a recording corresponding to the new client. With that step the new user in trust, who is about to obtain his Receiver, is registered in the Trust DBMS of the Protector. This step may occur automatically at login, so that all of the pending new Receivers are processed on the Protector in a batch.

Figure 108:
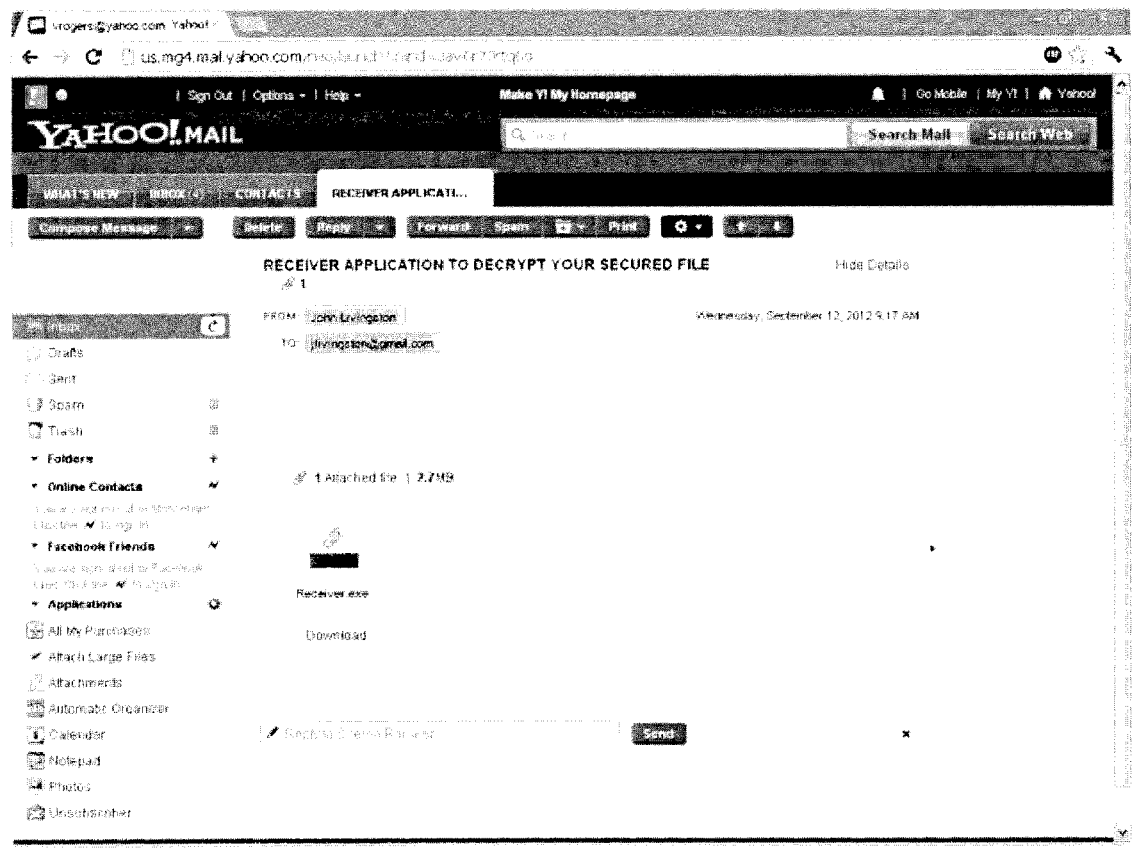
FIG. 108 E-mail containing the Receiver Application . . .

Then, the Receiver application is auto generated and emailed to the client at his designated address. FIG. 108 shows the email that contains the Receiver as an attachment. In another embodiment, the task of the client in filling out and returning the .prox data file to the professional may be streamlined by a wizard provided to the client, such as in an applet, to insert the information and send it back automatically, or by a link to a web service accomplishing the same.

The Power Session is an automated communications capability that the Protector provides to the professional. It allows the professional, using his Protector, to communicate with each of his clients using their Receivers, through a mass serial chat session with each client who wishes to sign up for the session. There is an automatic scheduling capability on the Protector so that each individual session of the Power Session executes in series. The next session begins after a break, after a defined interval. The purpose of the Power Session is to crowd as much client communication as possible into the smallest amount of time.

Figure 109:
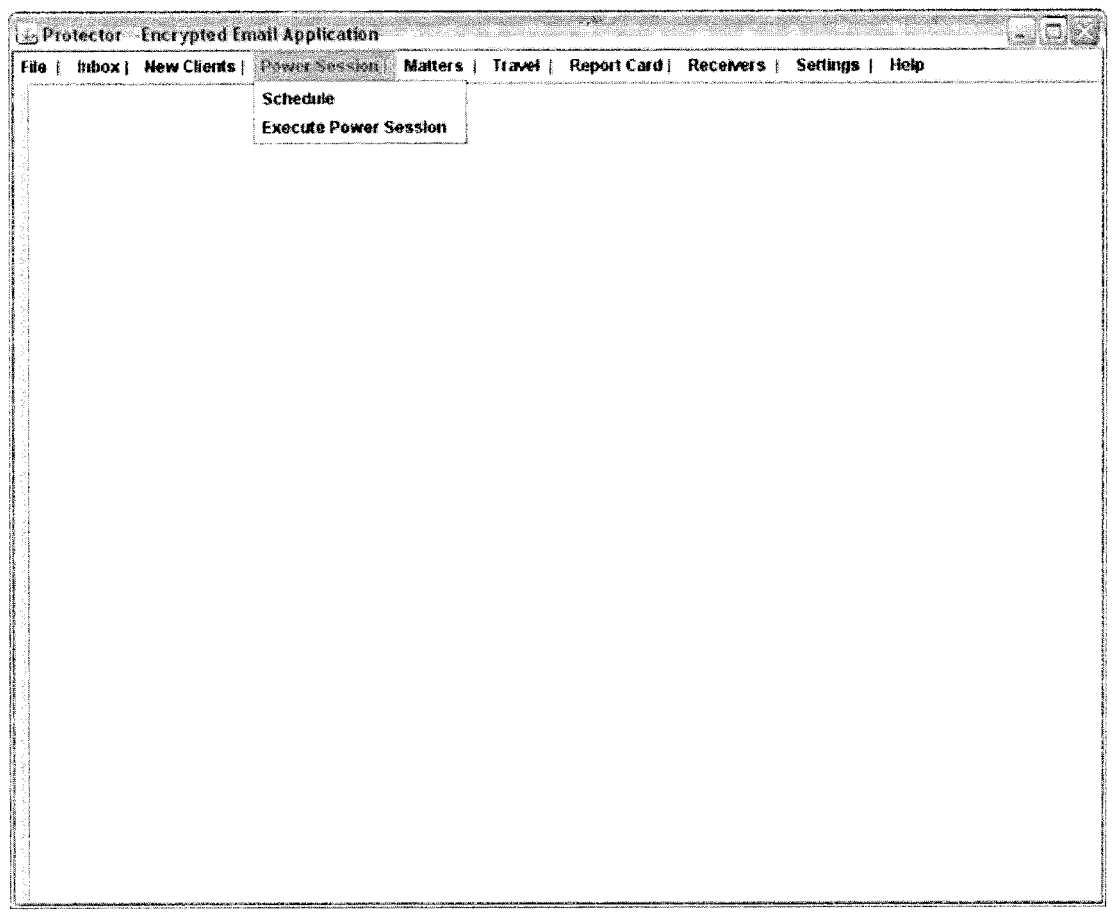
FIG. 109 The Power Session Menu . . .
Figure 110:
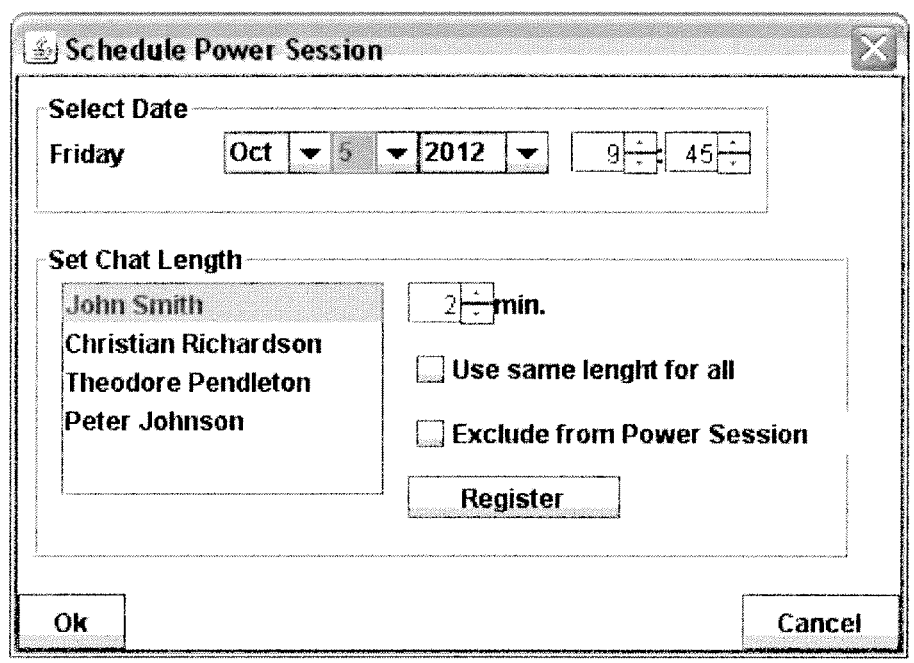
FIG. 110 Power Session Scheduler . . .

The Power Session Menu is used to schedule and execute the Power Session. FIG. 109 shows the menu. The Power Session can be scheduled via the Schedule option, and when this option is selected the Schedule window is displayed (see FIG. 110). Here the professional selects the date and time the Power Session is to take place. The clients who are going to participate in the Power Session are assigned their respective time slots by an algorithm executing on the Protector.

When the Power Session option is clicked, the Power Session Server Module is executed. This module lets the Protector application emulate a chat server that extends chat capability to the clients who have accepted the professional's invitation to participate in the Power Session. The Server Module identifies the Receivers who are connected and available for chat.

Figure 111:
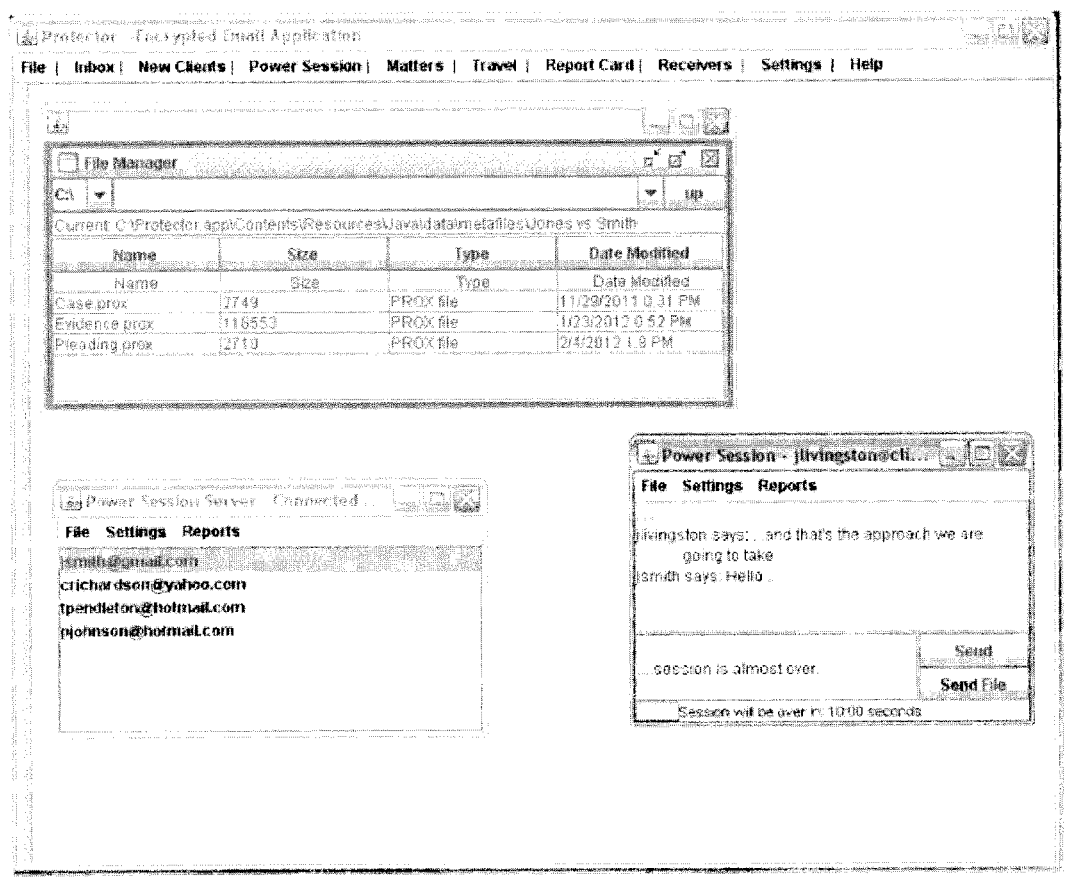
FIG. 111 Power Session in Progress . . .

The Power Session displays the chat dialog in a window on the Protector during each session, and automatically times the session out so the Lawyer may chat with the next client. When the session with a client is going to time out, a warning message is displayed on the professional's window. FIG. 111 illustrates the Power Session.

Figure 112:
FIG. 112 The Matters Menu . . .

FIG. 112 shows the Matters Menu of the Protector. It has two options: Matters Control and Serve Pleading. The latter option provides automatic service of process and proof of service. Matters Control is a function that allows the grouping of .prox files based on a matter or case, so this is one method of using the embodiments to conduct online litigation. The related documents in the case are grouped as a set, and all of the lawyers in as given litigated case may share the same file grouping logic.

The functionality involving the transmission of pleadings in a richer embodiment may be contained a supplemental module appurtenant to Protector-Receiver, the Lit Linker module. Under Lit Linker all or part of the process of litigation may be expressed in a process captured by algorithms. The serve pleading option is more limited, as it captures only one of the procedures of litigation, the service of process and its proof. Lit Linker in its various embodiments captures this litigation process, and many others as well. Lit Linker make take the form of an independent application with a computer to computer communications capability.

Figure 113:
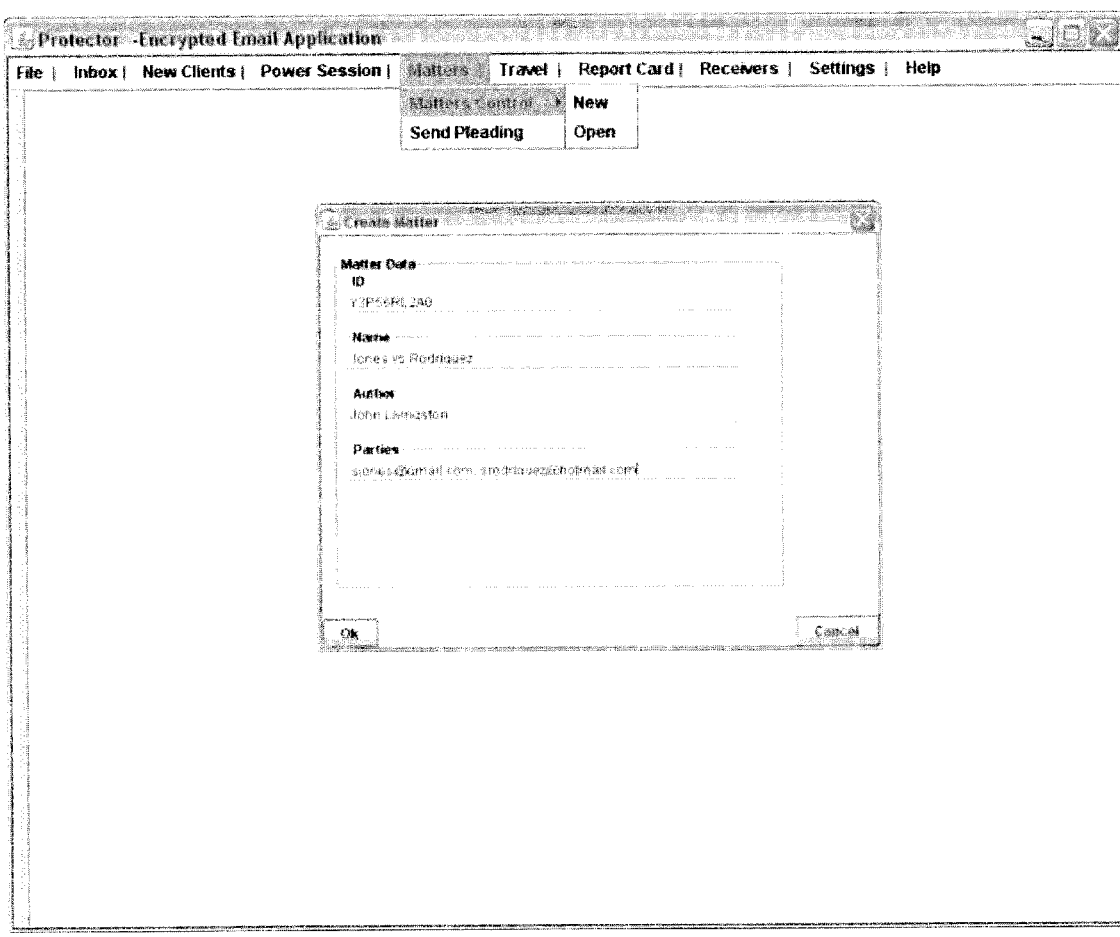
FIG. 113 Creation of a New Matter . . .

Every time a professional creates a message on his Protector, in one embodiment he must designate a matter to which the message corresponds. This forces the professional to stay organized in what he writes, so that the writings are categorized based on the matter and by that means are searchable. Matters Control is a menu that contains two options, New and Open. The New Option is used for the creation of a new matter or case. FIG. 113 shows the frame where the professional enters the background data for a new matter. There is an unique ID number for the new matter. In this example matter number is Y3P56RL2A0.

In one embodiment the Switch prepares the matters identifiers in batches and downloads a batch to each Protector in the same manner as it provides the ELD's. A clock or an RNG on the Switch may generate the matters identifiers, and the identifier may be an eighty character alphanumeric string. As a background task, the Protector supplies the new string when the user clicks on New, identifying the matter. In the same manner the Protector saves ELD's in a magazine, it may save a supply of matters designators. The supply provides a new matter ID for the new matters or cases to be opened, and each new matter takes the next available ID. When the matter ID consists of eighty ASCII characters it is highly improbable that any two are alike, making quite unlikely any confusion arising from two different matters sharing by happenstance the same matter ID.

Figure 114:
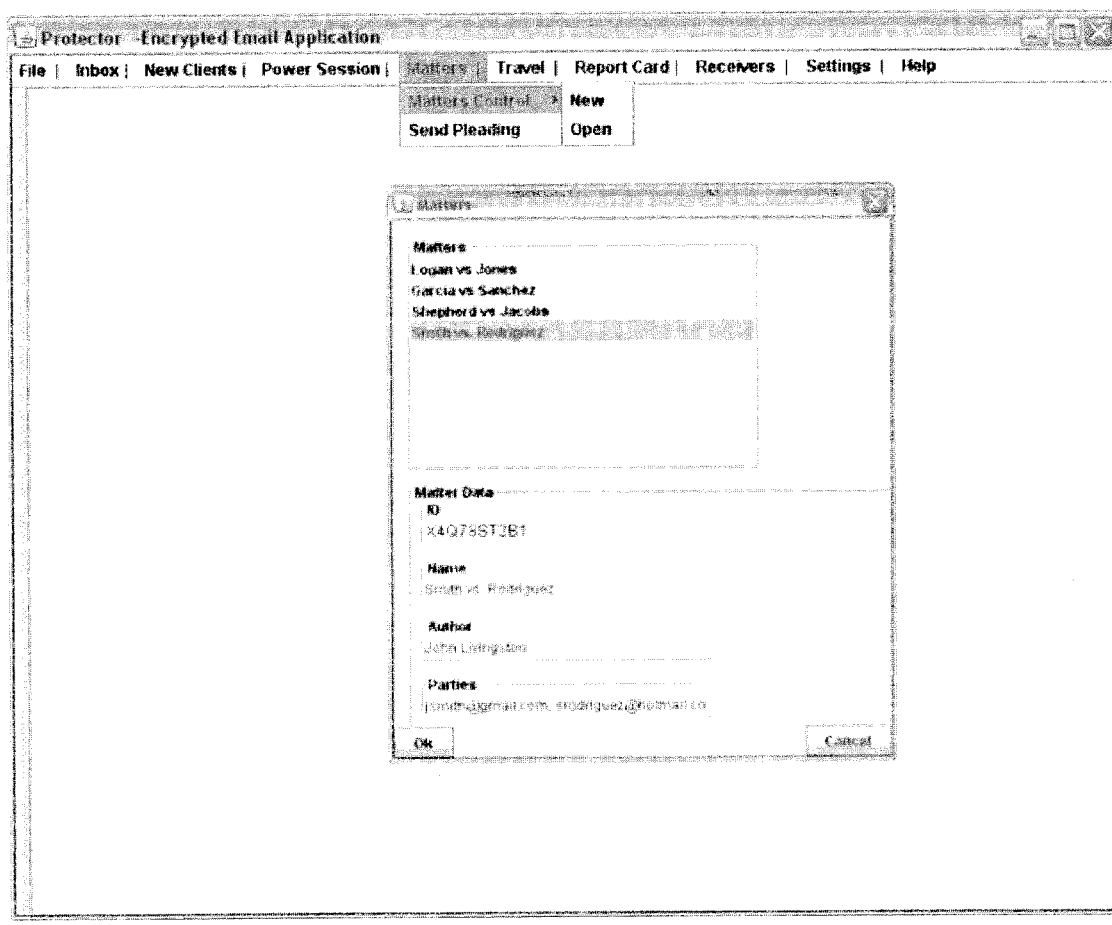
FIG. 114 Opening a Matter . . .
Figure 115:
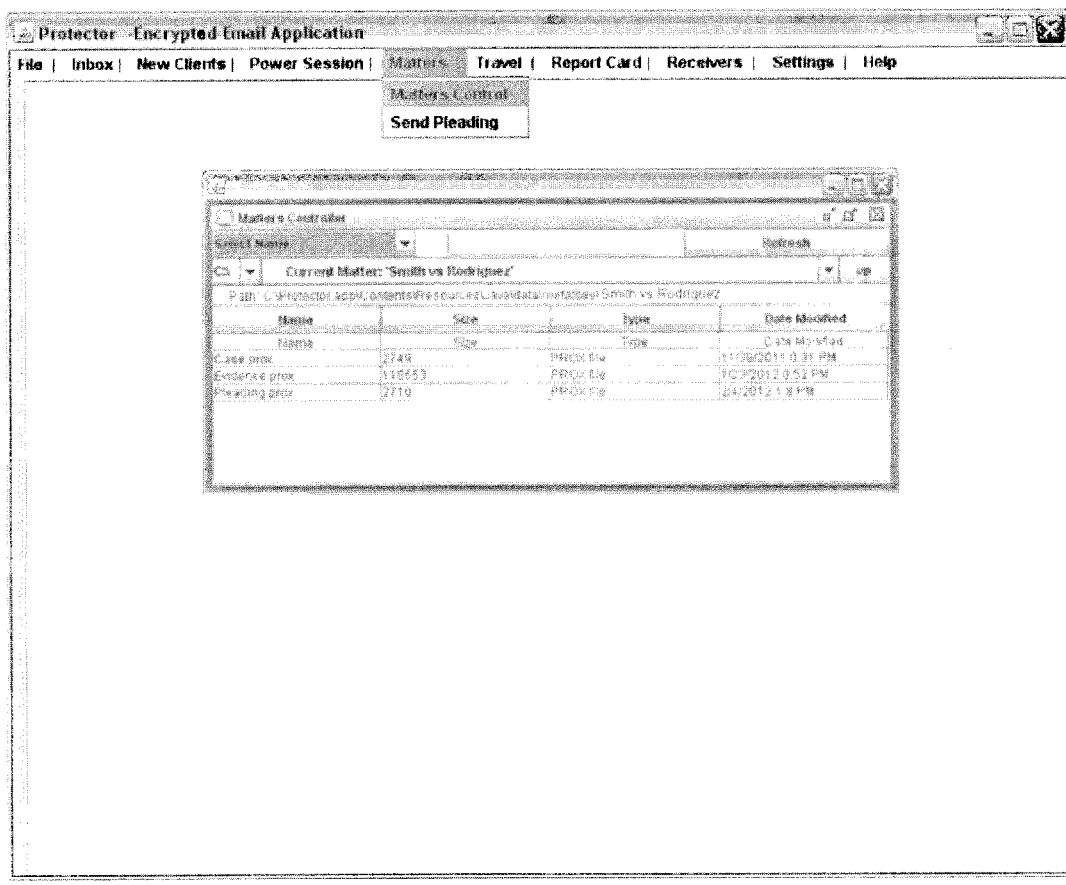
FIG. 115 Matters Control . . .

The Open option on the Matters Menu is used to open existing matters. When this option is selected a window showing the list of matters is displayed (see FIG. 114). After a matter has been selected (by double clicking the matter on the list) the matters controller window is displayed. The window of the matters controller is shown in FIG. 115. As can be seen, this window is similar to the Windows™ Explorer, as it shows the files that correspond to a matter. At the presentation layer each matter is stored in its own folder, and the name of the folder corresponds to the name of the matter. The documents may be sorted by their attributes, that is, by name, by date, etc.

Figure 116:
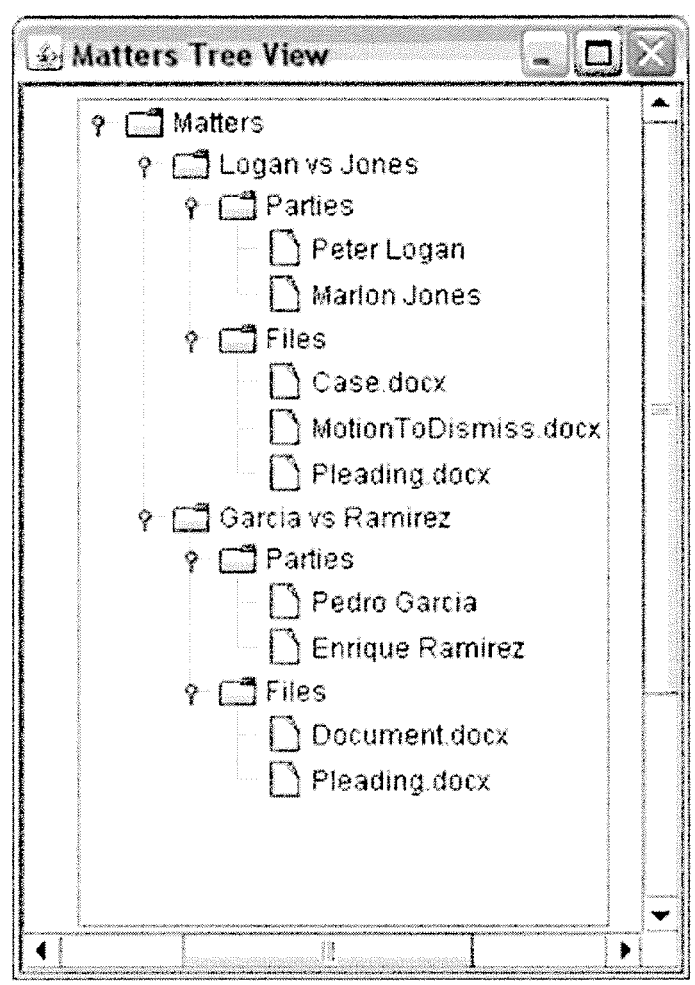
FIG. 116 Matters Tree View . . .

The matters control interface may provide a Tree View (see FIG. 116). The tree presents the matter as a set of branches and sub-trees. The sub-branches display the documents that are related to the case, transaction, or matter in which the parties involved, and the user may open any document shown by clicking on it.

The tree-view may be used in online litigation to display a complex multiparty case. The meta-files that express the pleadings in the litigation contain values to enable this functionality. For example, each pleading meta-file may contain a name-value pair indicating whether the pleading is one which is responsive to another pleading, such as an answer to a complaint, or a pleading that requires a responsive pleading, such as a complaint, a pleading demanding a reply. This dichotomy may actuate the branching functionality of the tree, with the process charting the entire case. Other activities may be enhanced by the tree view technique, by construing each document either as one either requiring a response, or as a second document which is responsive to a first document. For example, a battle plan can embody this functionality when Protector based communication occurs in the military context. The meta-files express either a response to an order from a superior, or an order from a superior requiring a response.

The matters-related technique of supplying a value in the meta-file is not limited to litigation, as the matters paradigm is broadly used by knowledge workers in all the professions. In medicine the case of the patient who needs to be cured is the matter. In investment banking the deal is the matter. In the military the war game is the matter. In police work or espionage the matter is the investigation of a criminal organization, and so on. When the meta-file contains a matter value the files pertaining to the matter may be searched on the cloud, or on a peer-to-peer network.

Figure 117:
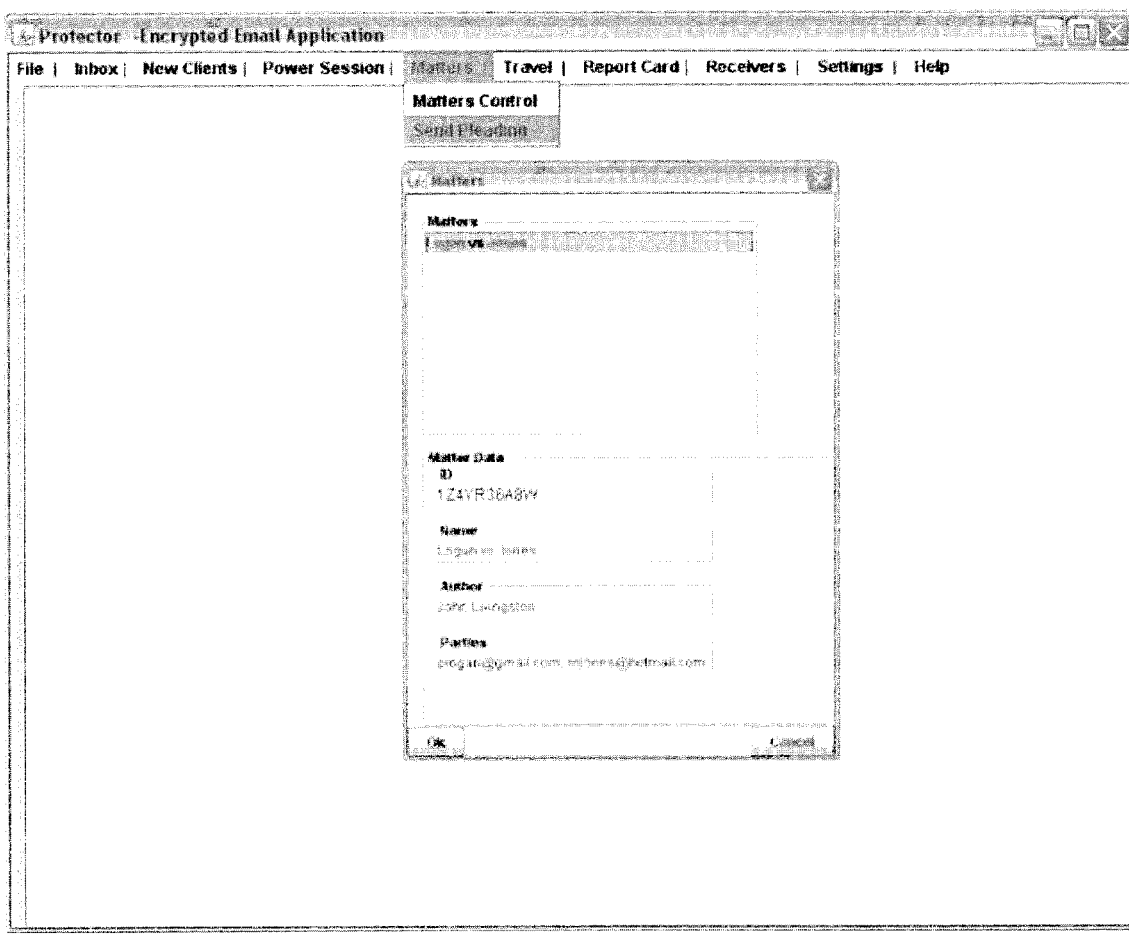
FIG. 117 Sending a Pleading . . .

Another function under the Matters tab of the Protector is the transmission of pleadings in the litigation from one lawyer to another, by clicking the Serve Pleading option. This is a technique for automating the service of process. A litigated case simply is another matter, insofar as the executable code is concerned. One Protector may send a pleading to another, with both the sender and the recipient's Protector associating the expressed matter value with an ELD to bring about auto encryption of those meta-files by logic unique to that matter. After the Serve Pleading option is clicked, a window where all of the matters appear is displayed (see FIG. 117). When the professional clicks on one of the cases, after the pleading has been selected, another window where the email of the lawyer to whom the pleading is to be sent is displayed. These steps allow the pleading to be transmitted to be associated with the case and with its recipient as well.

In another embodiment the entire set of lawyers who have appeared in the matter appears as a list, and there is a box, "serve all." This default selection electronically serves the pleading meta-file on all of the lawyers and generates a report constituting electronic proof of service. Serve all makes sense as the default option because usually the law requires that every pleading be served on all of the lawyers who have appeared in the case. The proof of service report may take the form of an attachment to a judicially pre-approved legal form for proof of service, with the attachment supplying the content proving that the service occurred, and the form to which it is attached meeting the formalities of the jurisdiction.

To effectuate the electronic service of process of the pleadings each client application may contain a DBMS pertinent to the service of process functionality, containing fields corresponding to the serving party, the recipient party, the date of transmission, the date of receipt, etc. The client application of the receiving party, after the pleading meta-file is received, may generate a reply as a background task, indicating that service was perfected. The reply may be a data file that is transmitted automatically, as a background task and invisibly, and processed on the recipient computer.

This approach surpasses the traditional method of service in which the existence of legal service is merely established by a proof of mailing, because it is the receipt of the pleading rather than the mere mailing of it that demonstrates that due process of law has been met. Using the embodiments for proof of service, the actual receipt of the pleading per the service is established by objective evidence, instead of merely presumed from the statement of the person who served it that it really was sent out.

The automatic generation of proof of service may occur whenever the Serve Pleading selection is entered on the initial Matters Control menu. The values used to generate the automatic proof of service are included in the name-value pairs of the pleading meta-file template when the case is opened, and these may include the names of the attorneys, their addresses, the names of their clients, etc. Data of this kind may be displayed in the Tree View of the matters when the a party expressed on the tree is clicked. See FIG. 116.

In one embodiment whenever the professional uses his Protector he is compelled to provide a matters value for each communication. The Protector remembers the matter values associated with a given message recipient after that recipient has selected the matter from a dropdown list. If a given recipient is involved on several matters, they are listed under his name and the particular matter at hand is clicked. This approach also enables search, so that all the protected files and messages pertaining to a given matter may be located and grouped together. In the forced matters designation embodiment, unless the professional enters a matters value for his communication the message is blocked and an error message appears, compelling the user to identify the matter before proceeding. Using the GUI, when a lawyer's name is clicked on, all matters with that lawyer appear as a list.

To open the matter for the first time, the professional may describe the matter in words in the window provided, and the Protector automatically assigns the matter an ID value and an ELD that all the meta-files on the matter will share. From that point everything occurs automatically. The common ELD for all the meta-files on the matter may operate as a supplemental layer of meta-logic, encrypting the Secondary ELD, or encrypting the plain-text.

Matters control as methodology for online litigation may be implemented by adding a litigation module to a Protector-Receiver network. At the user interface this may involve an extra tab, such as shown in the Screenshots corresponding to one embodiment of an online litigation application, Lit Linker, explained below. One example of a logic flow using the embodiments to carry out online litigation is shown in FIG. 123, "Logic Flow for Lit Linker."

Other Protector-Receiver Modules

Figure 118:
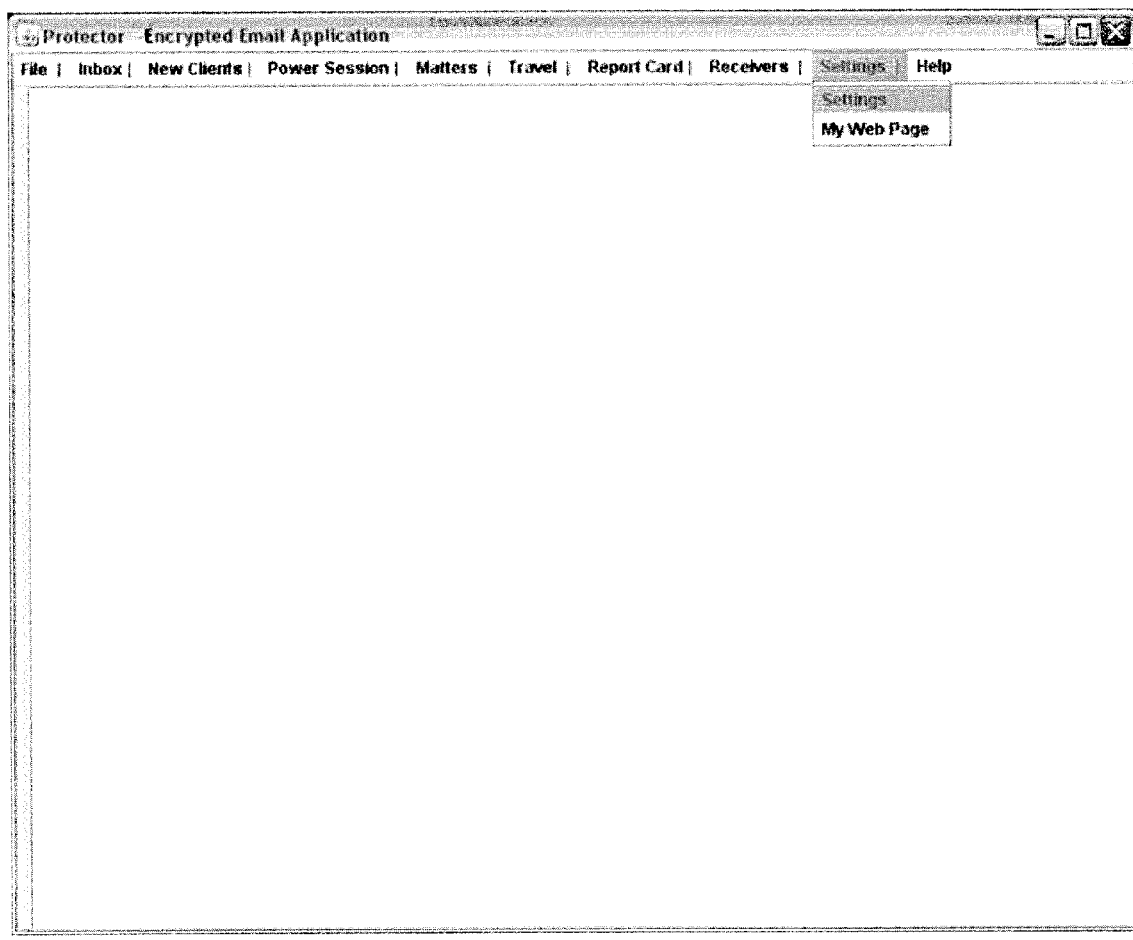
FIG. 118 Settings Menu . . .

The Settings option of the Settings Menu allows the Professional to define the settings on the Protector. The settings include such data of the professional as the email address that the Protector uses and how to filter the contacts. FIG. 118 shows the Settings Menu, and FIGS. 119-120 shows the Settings Frame.

Figure 119:
FIG. 119 Settings Frame: My Data . . .
Figure 120:
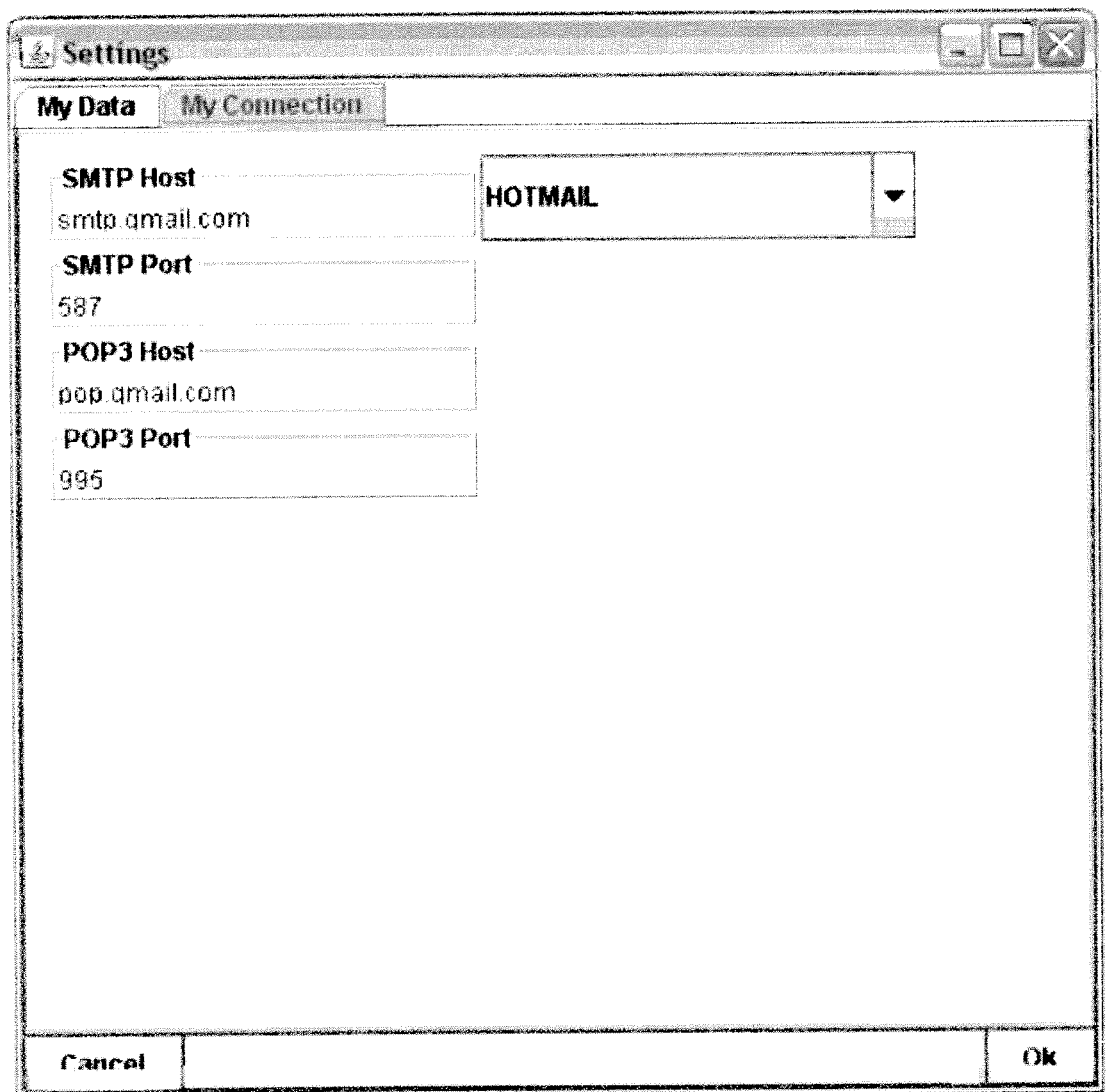
FIG. 120 Settings Frame: My Connection . . .

FIG. 119 shows the Personal Data panel of the settings frame. Here the professional can select the profile picture that the client will see when he uses his Receiver. Using the connectivity panel shown in FIG. 120, the professional selects the mail server that the Protector will use for sending and receiving the protected email. The data needed for the connectivity is the host and port of the SMTP server, for sending email, and the host and port of the POP3 server for email retrieval. The most popular web-mail servers may be selected from the dropdown list that is updated from time to time. When a server from the web-mail server list the hosts and ports are automatically assigned.

The Settings Menu also contains the options for displaying the Professional's profile page (My Web Page). This feature allows the Professional to access his or her web profile through the default web browser installed on his computer. Clicking on this option loads the address into the web browser automatically.

The Help Menu is used for displaying the help options of the Protector. There is an "About" box, and the Help Menu may link to a YouTube video, executed through the web browser. This is a tutorial showing how the Protector is used.

Figure 121:
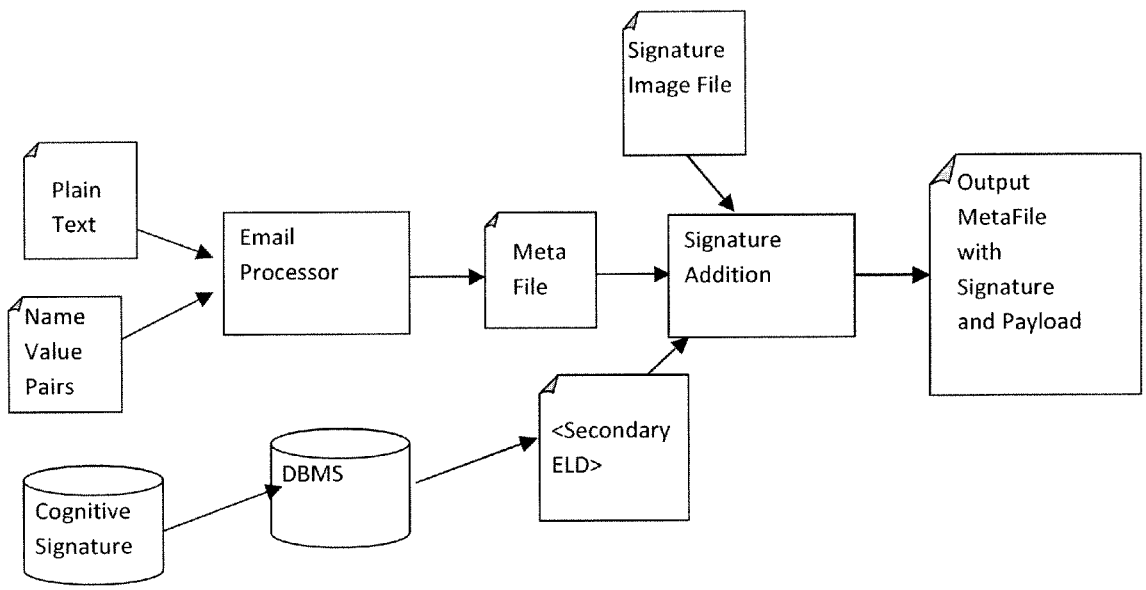
FIG. 121 Auto Encryption Process Flow . . .

One embodiment of Protector-Receiver provides the automatic insertion of the handwriting signature of the author of the document after the author has been authenticated. A Java class "Signature Addition" is dynamically loaded with digital signature image data, and the meta-file is created with this data provisioned in one of the name-value pairs. The result is a meta-file bearing information within it which, when parsed and with the class loaded by the recipient, inserts the signature. It is authenticated by the Secondary ELD and rendered visible to the person who opens the document. This all occurs automatically. The values that load the class are contained in the encryption meta-file, along with the other name-value pairs that are parsed and loaded when the meta-file is received and opened. FIG. 121 illustrates this process. The digital signature image of the signing party may be encrypted by the Secondary ELD corresponding to that party, so that the Protector of the recipient party inserts it only in event that trust exists.

Figure 122:
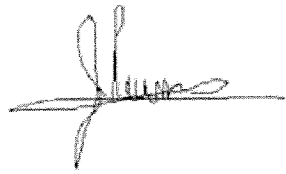
FIG. 122 Document with Signature . . .
Figure 123A:
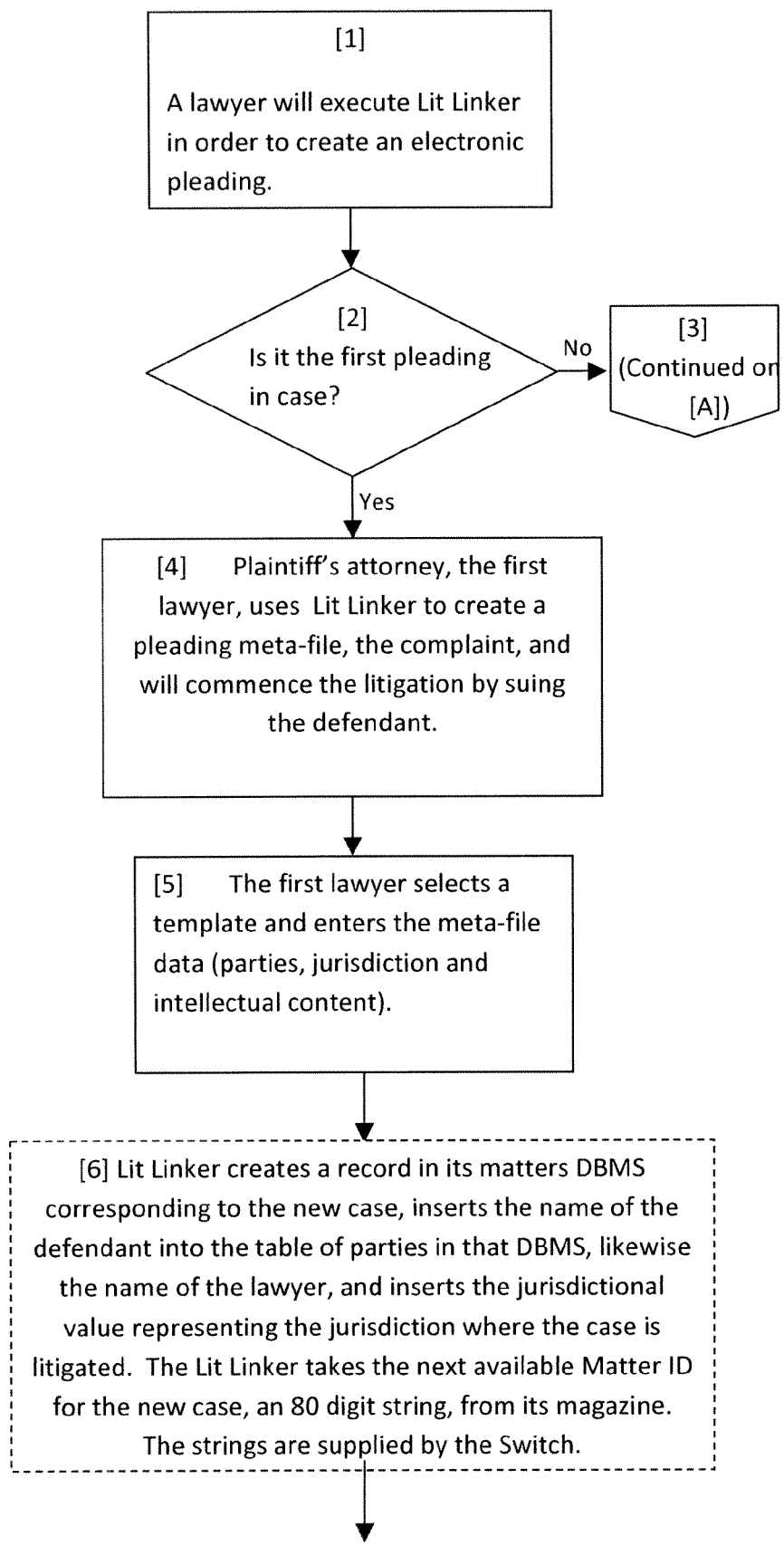
FIG. 123A Auto Decryption and Reply Process Flow . . .
Figure 123B:
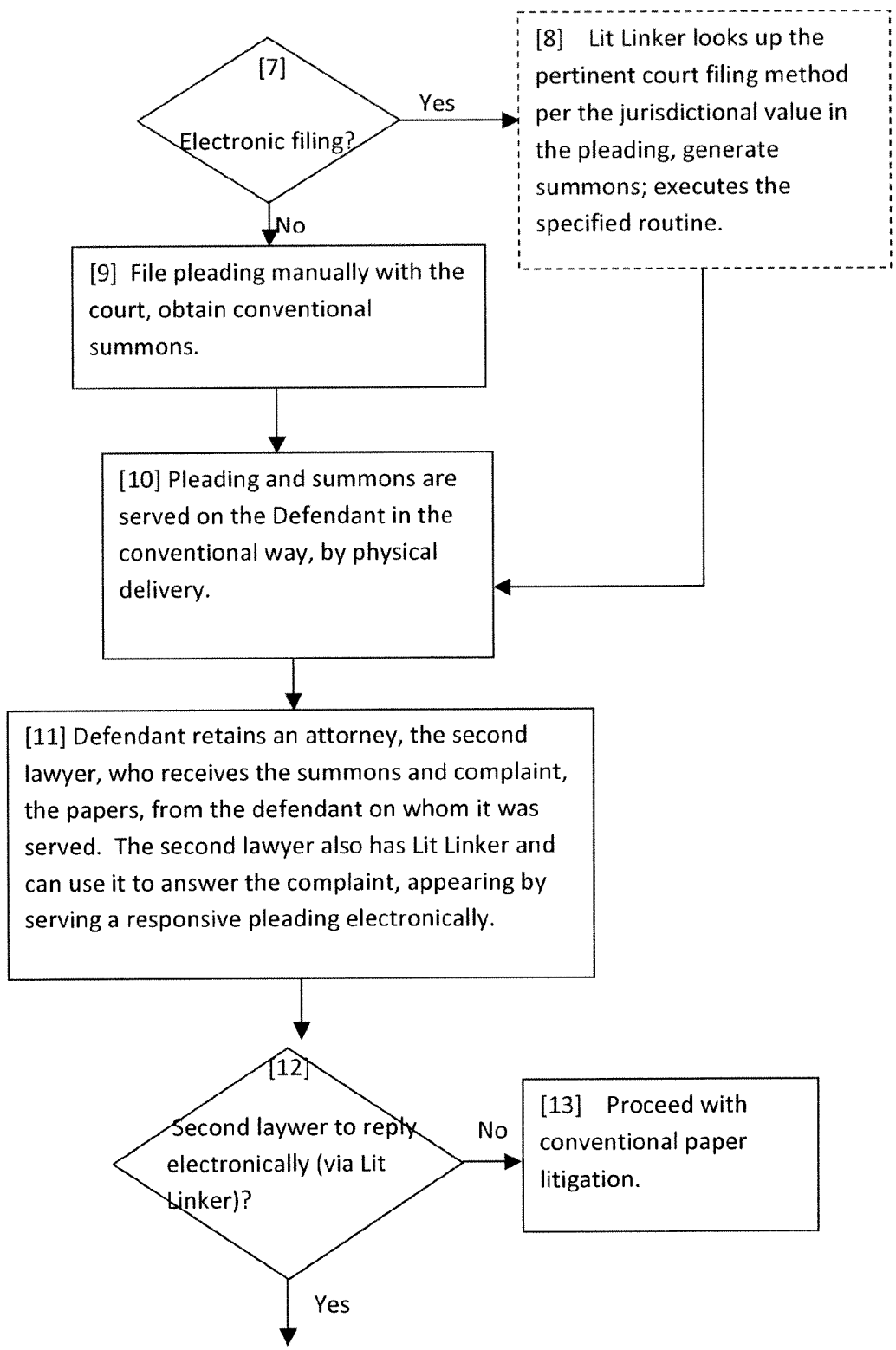
FIG. 123B Auto Decryption and Reply Process Flow . . .
Figure 123C:
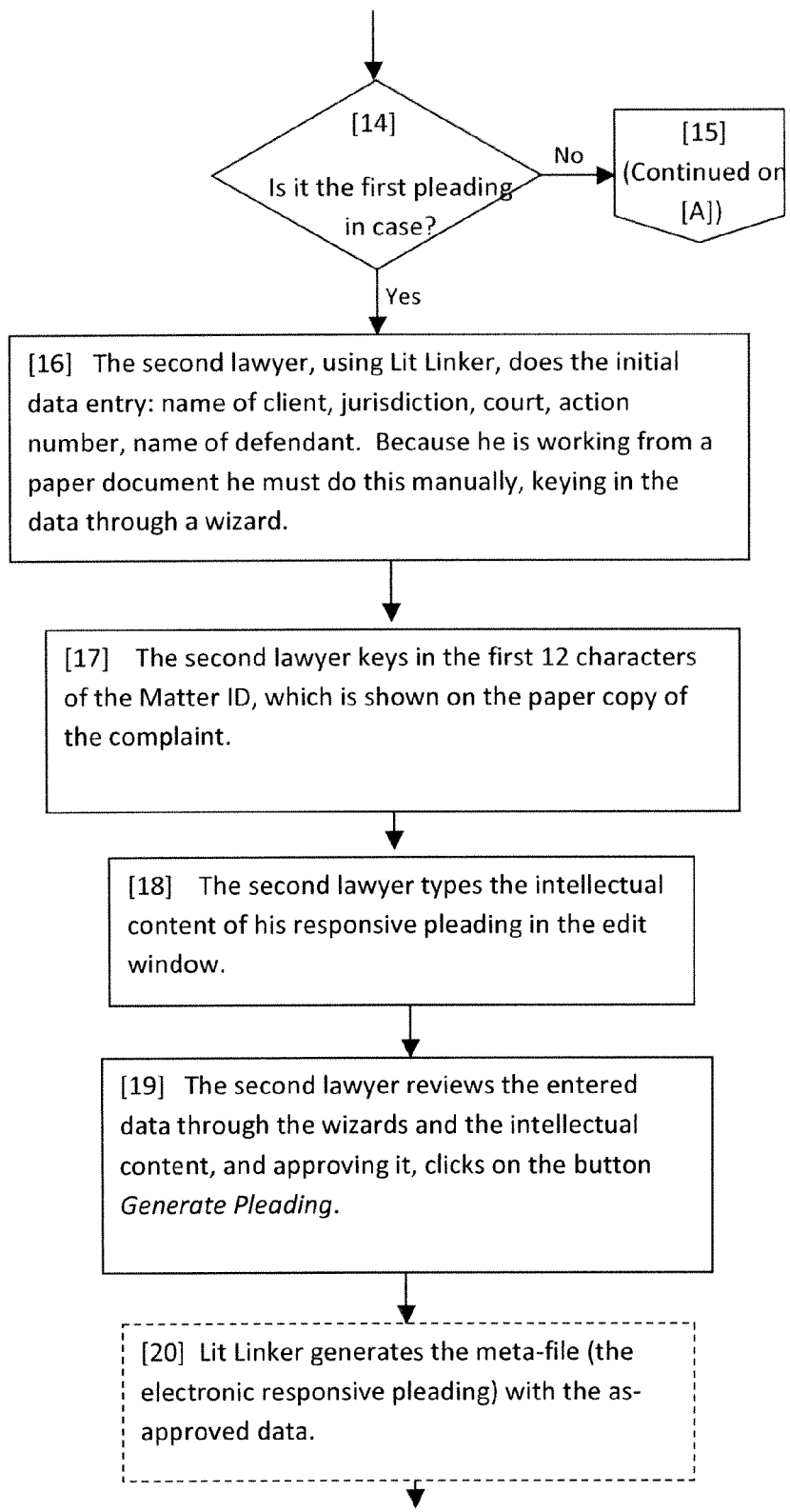
FIG. 123C Auto Decryption and Reply Process Flow . . .
Figure 123D:
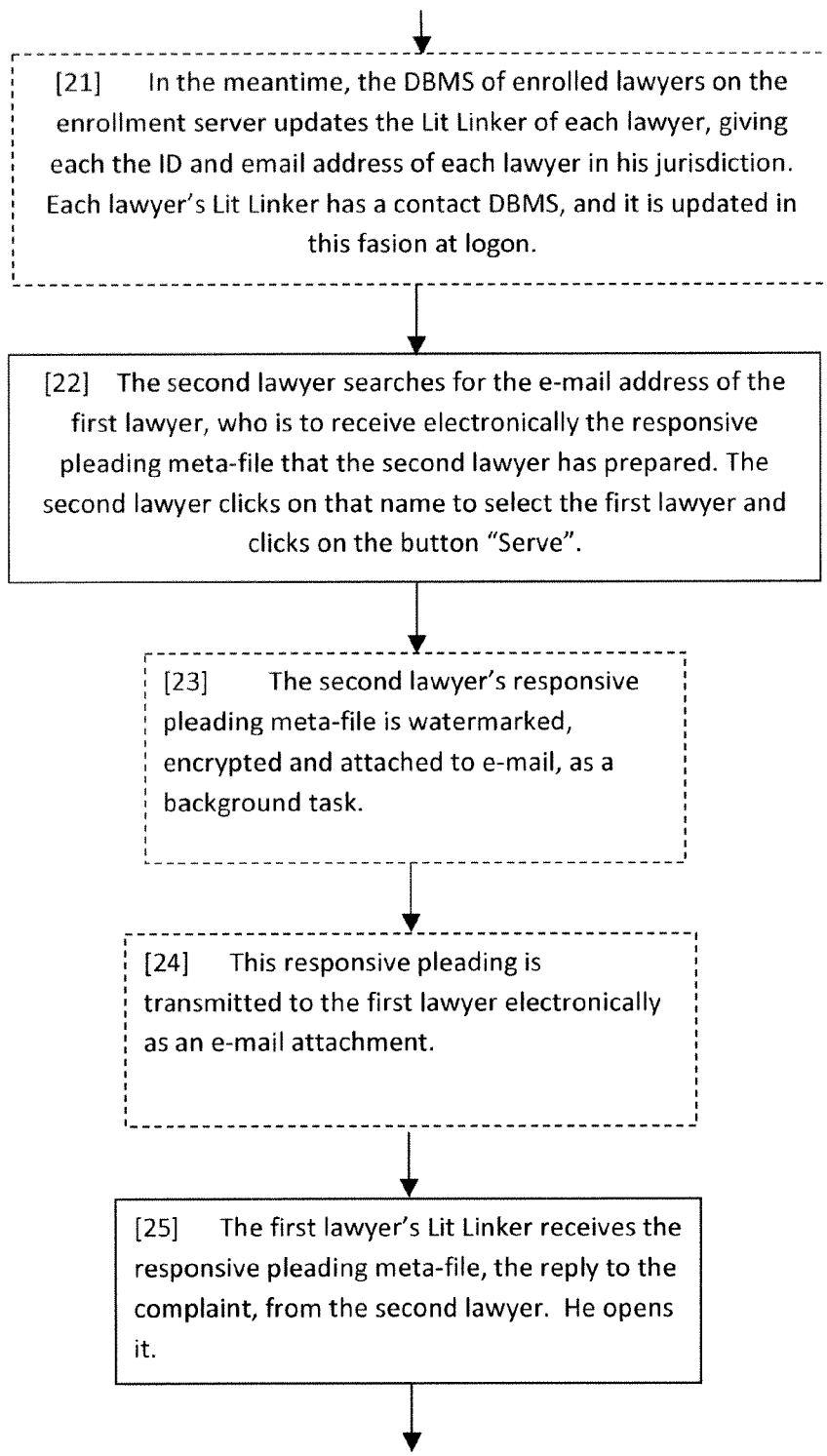
FIG. 123D Auto Decryption and Reply Process Flow . . .
Figure 123E:
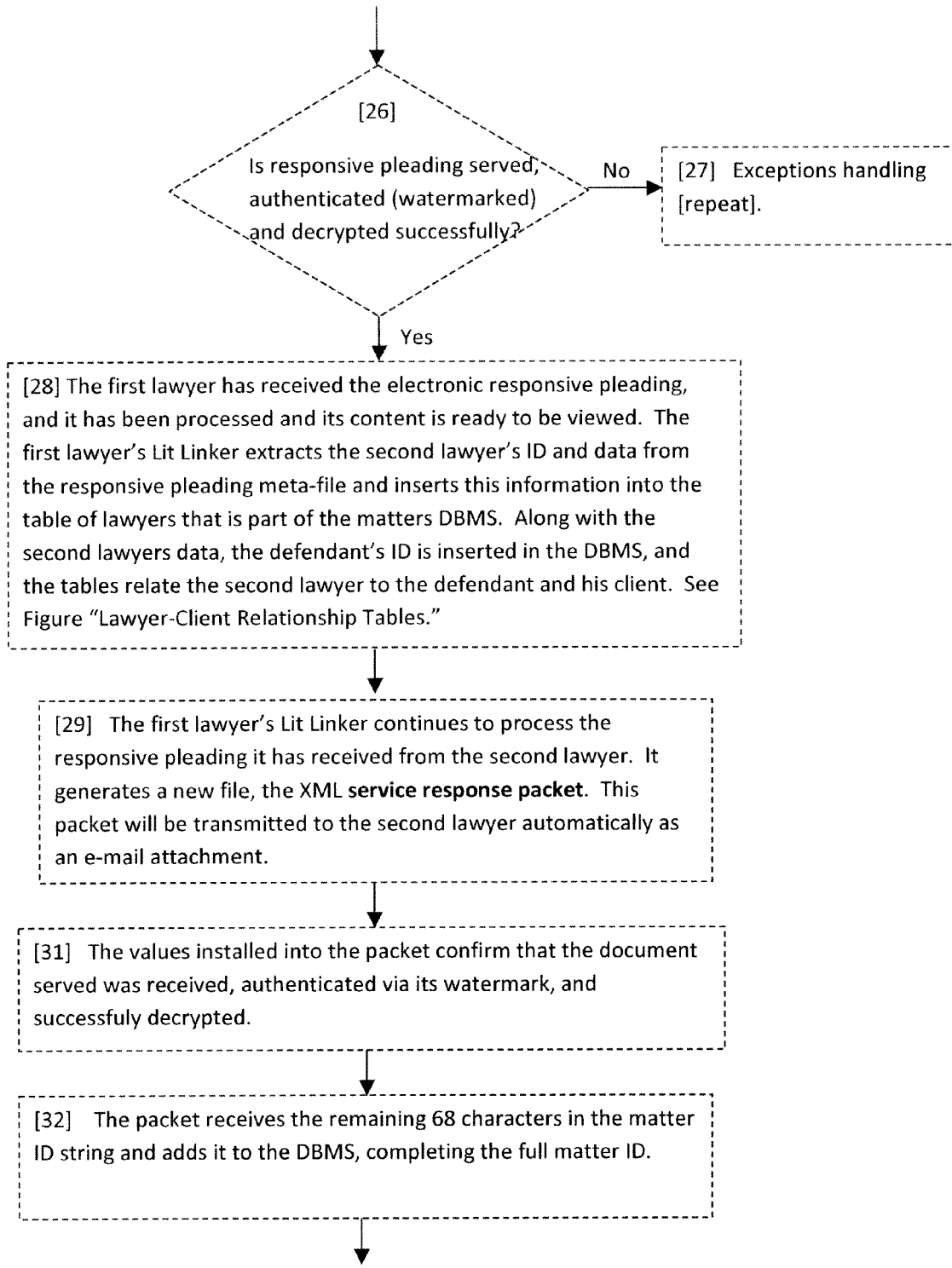
FIG. 123E Auto Decryption and Reply Process Flow . . .
Figure 123H:
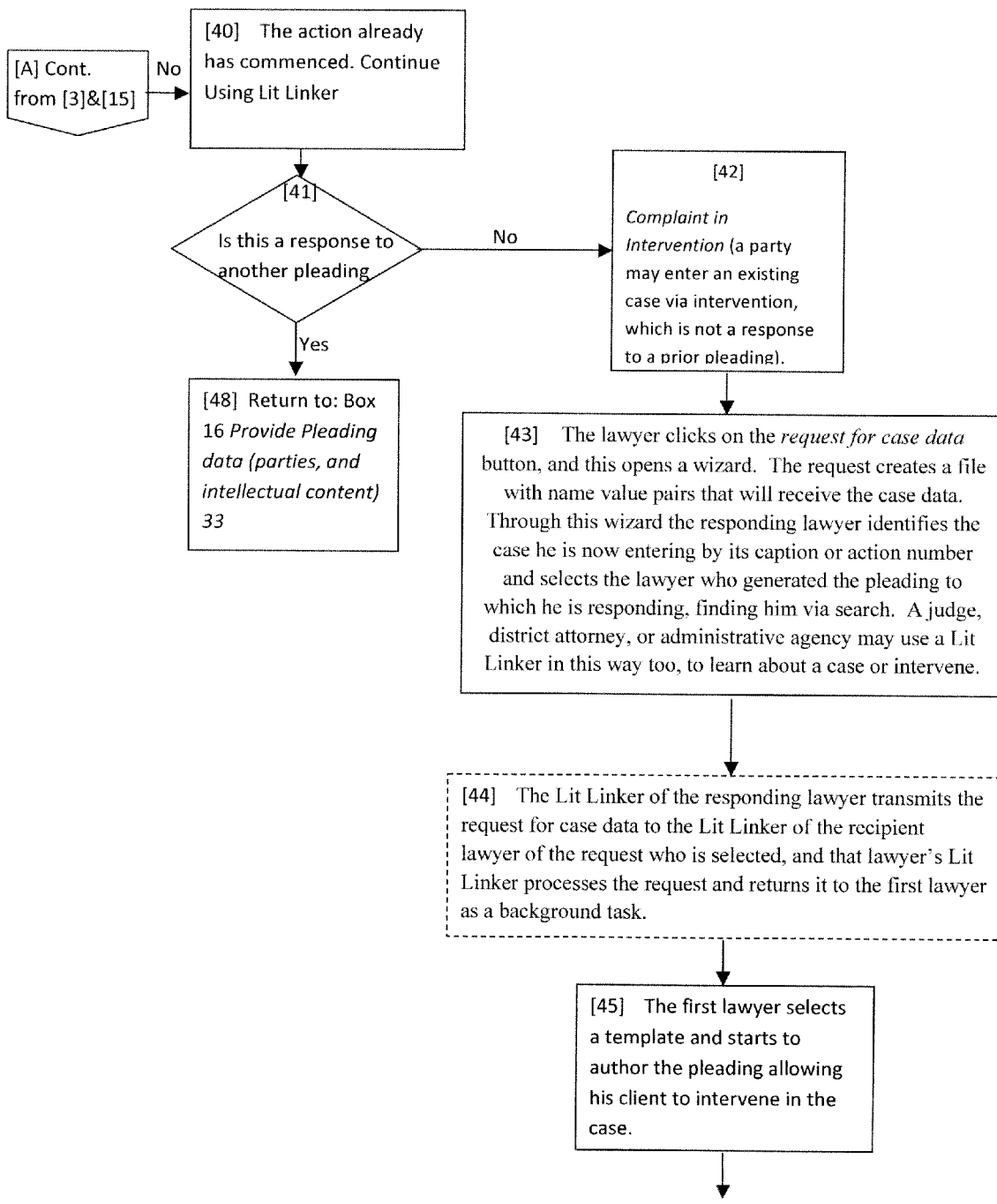
FIG. 123H Auto Decryption and Reply Process Flow . . .
Figure 123I:
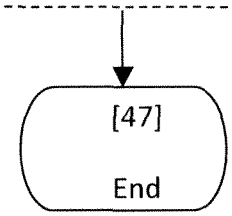
FIG. 123I Auto Decryption and Reply Process Flow . . .
Figure 124:
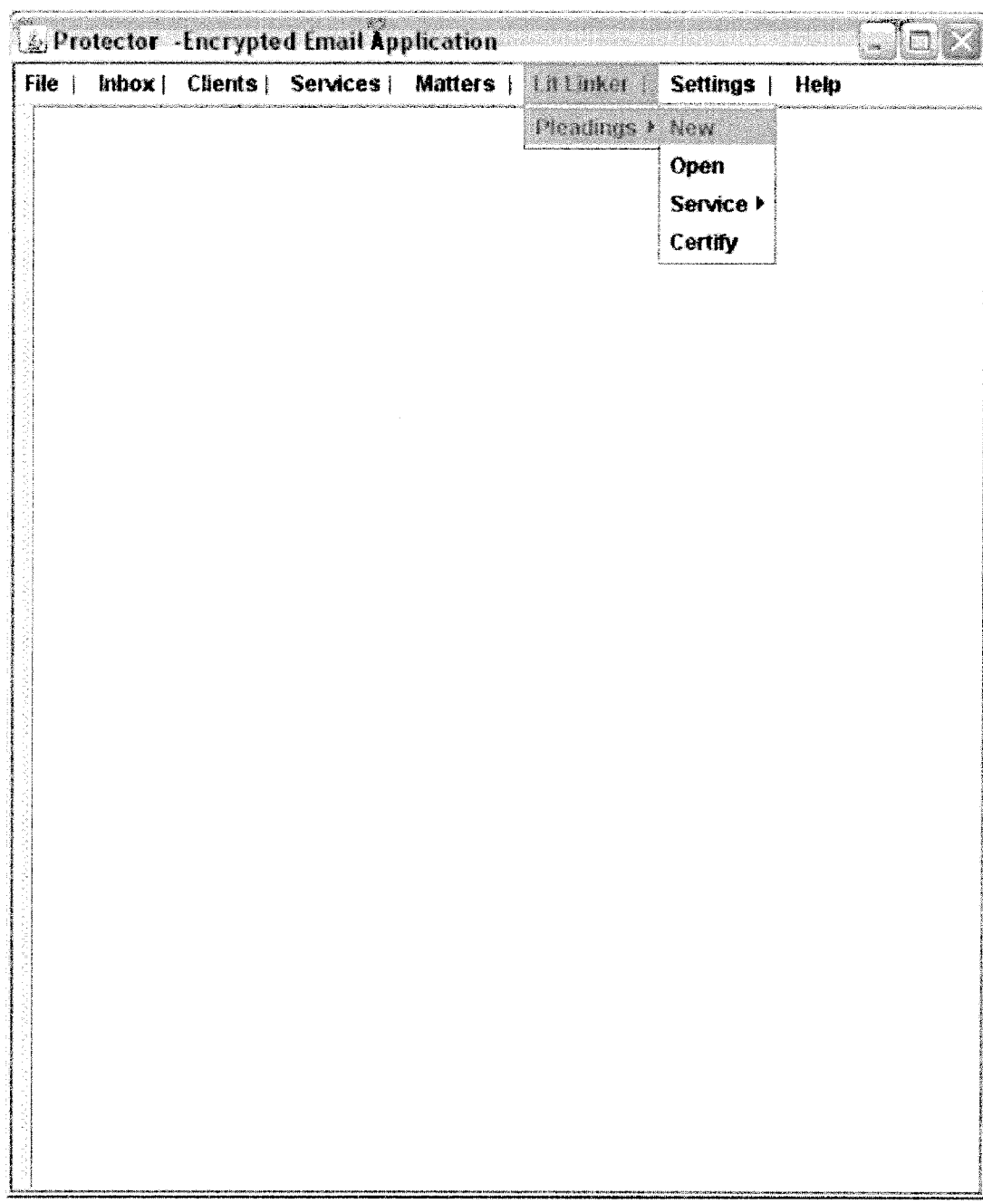
FIG. 124 Lit Linker Menu . . .
Figure 125:
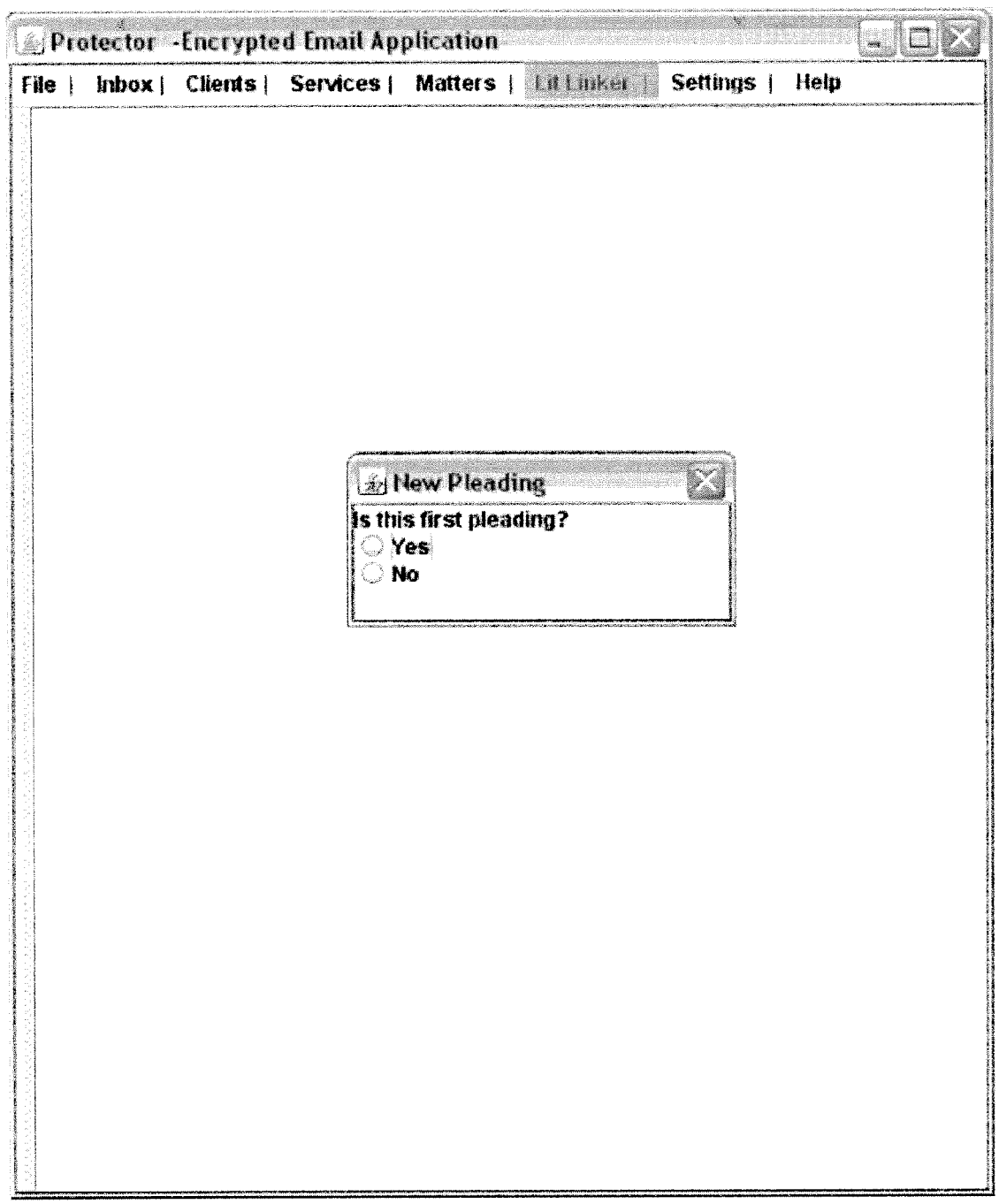
FIG. 125 First Step in the Creation of a Pleading . . .
Figure 126:
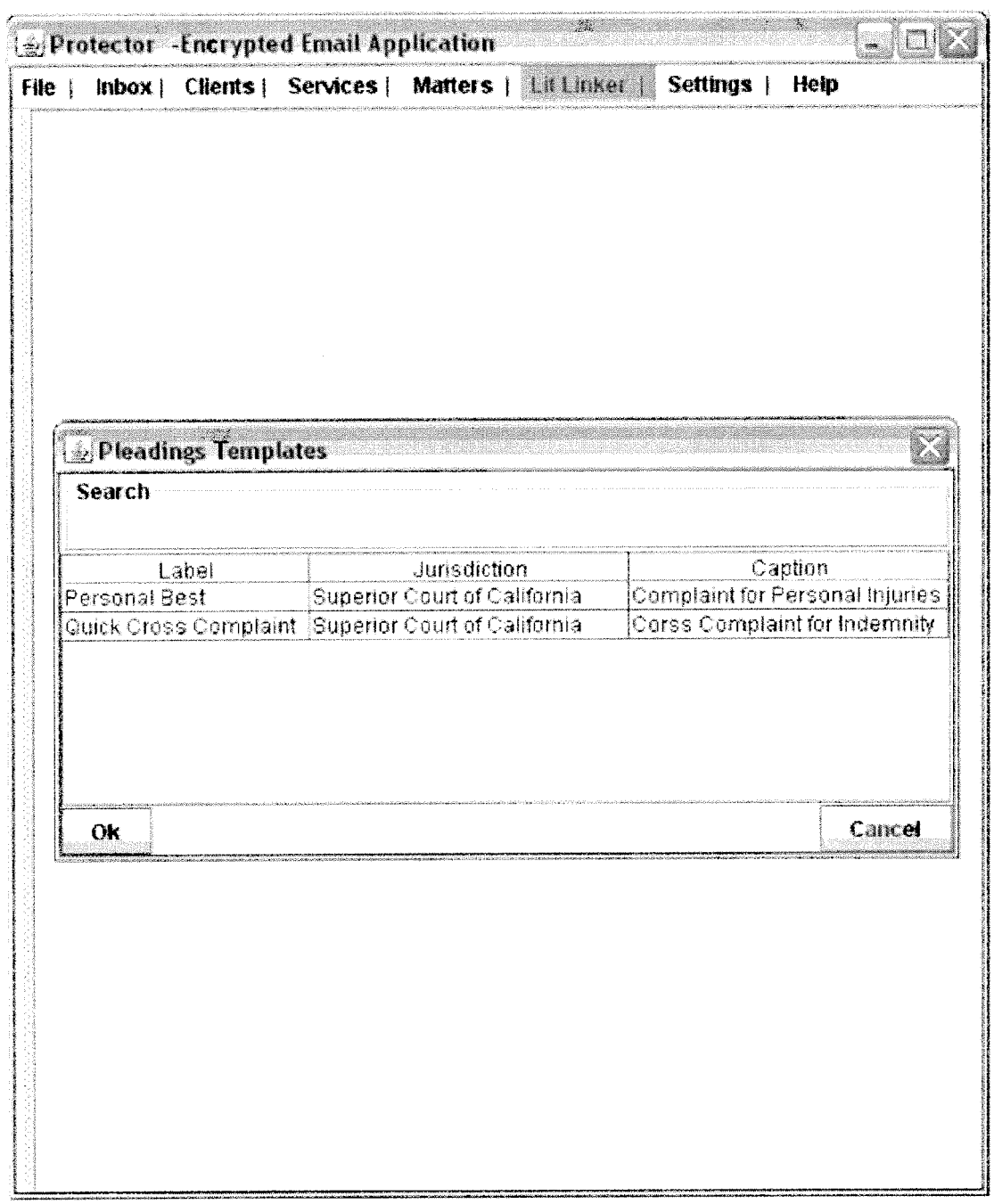
FIG. 126 Selection of Pleading Template . . .
Figure 128:
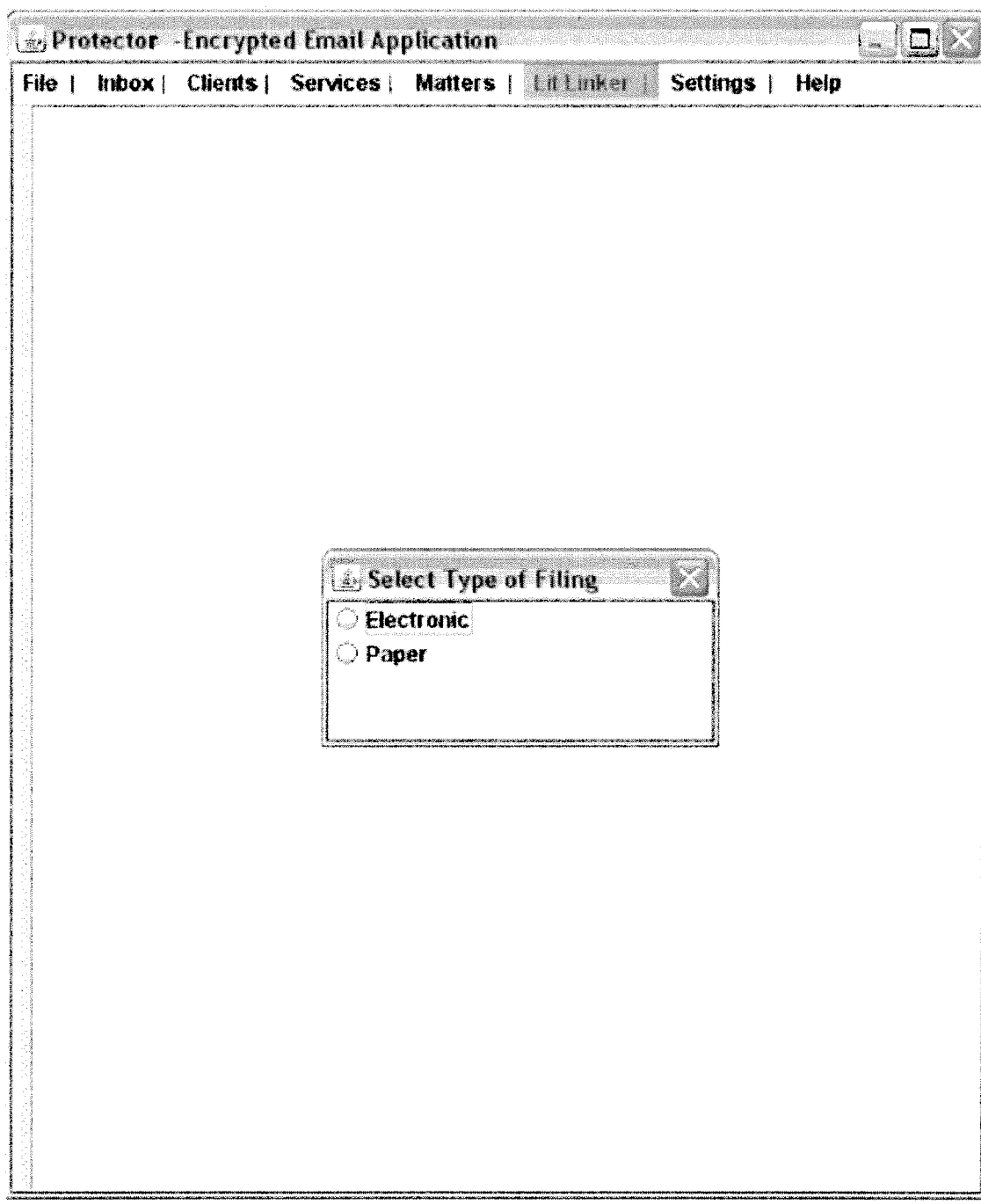
FIG. 128 Selecting Type of Filing . . .
Figure 130:
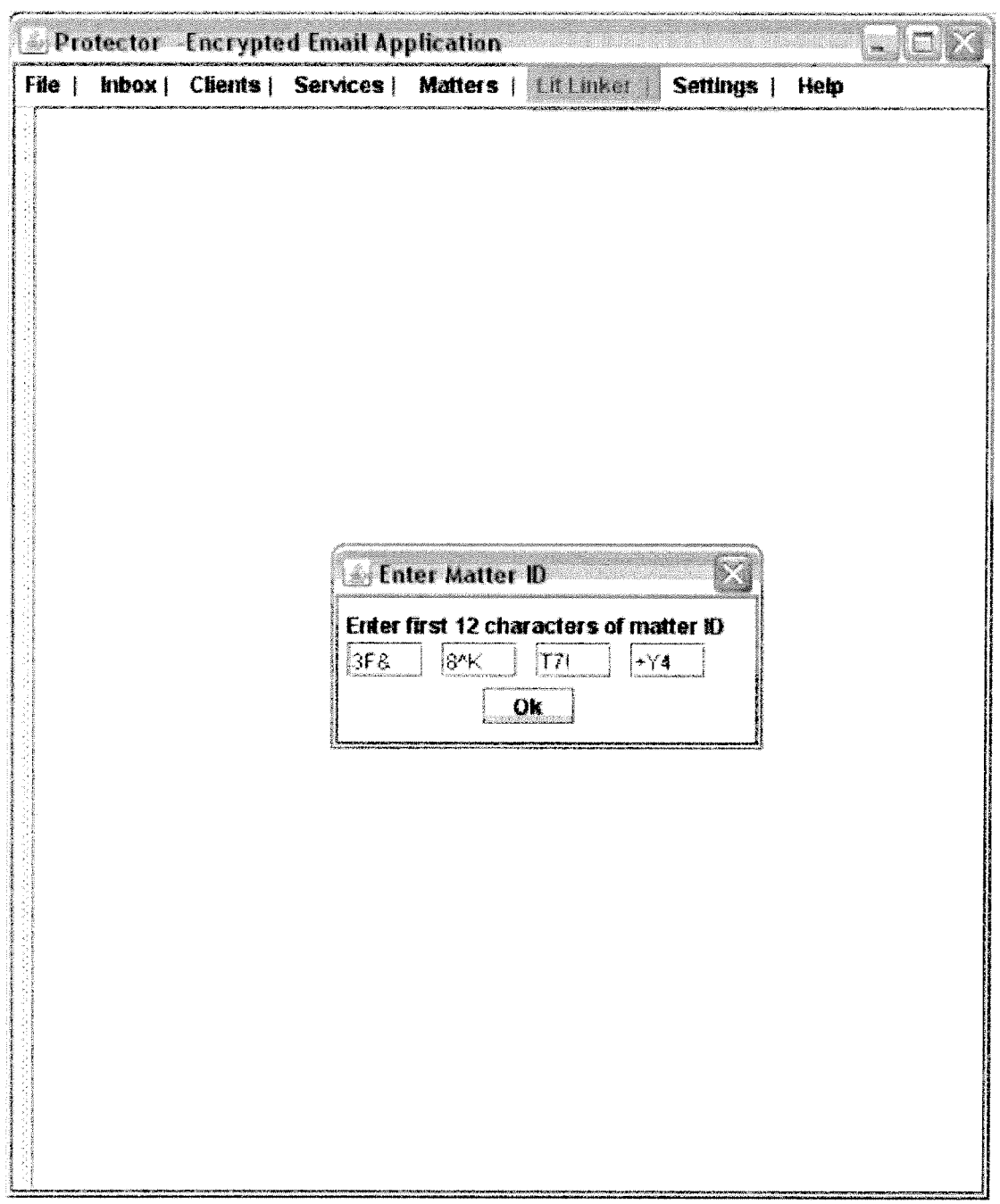
FIG. 130 Entering the Matter ID . . .
Figure 132:
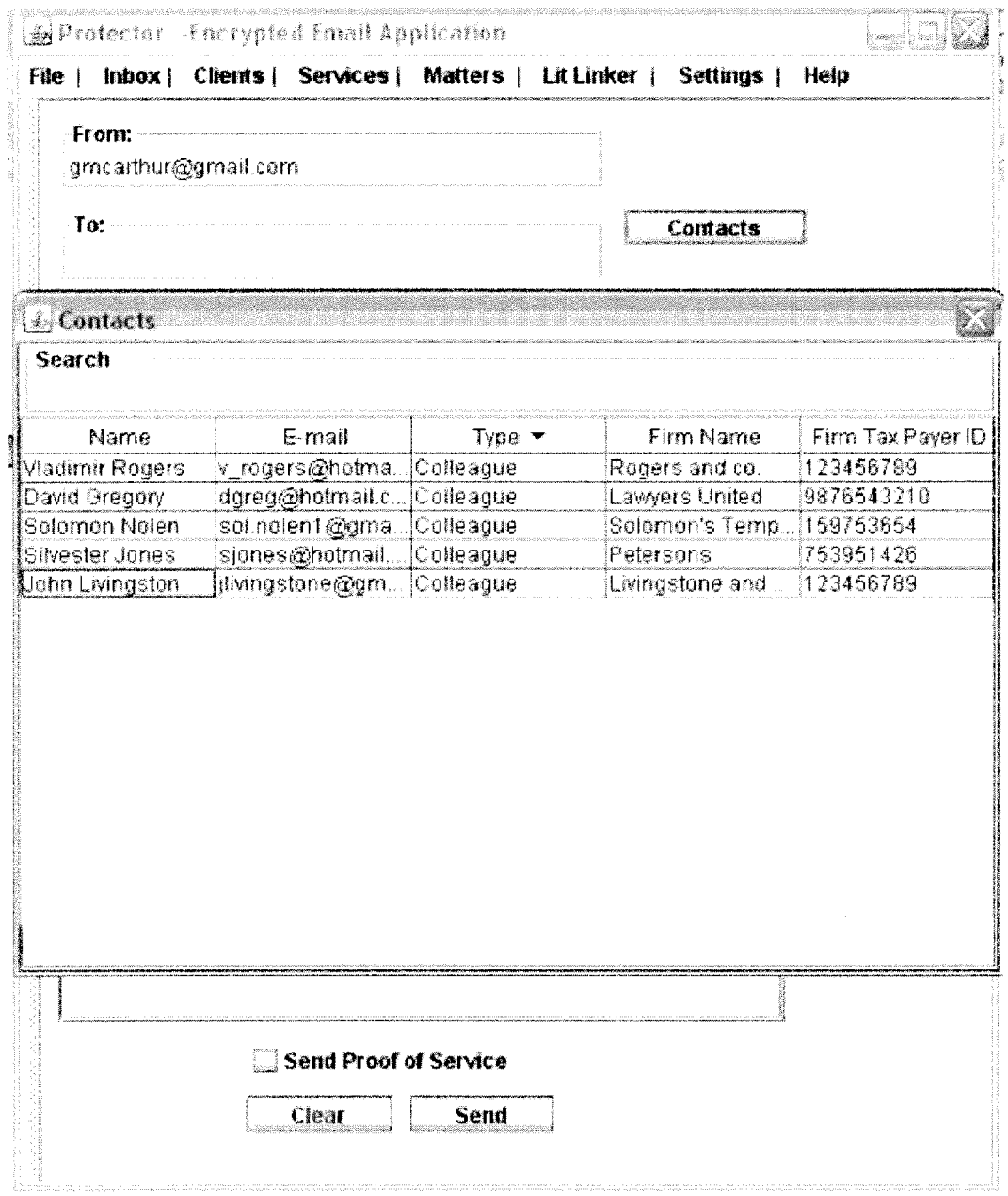
FIG. 132 Selection of the Plaintiff's Lawyer . . .
Figure 133:
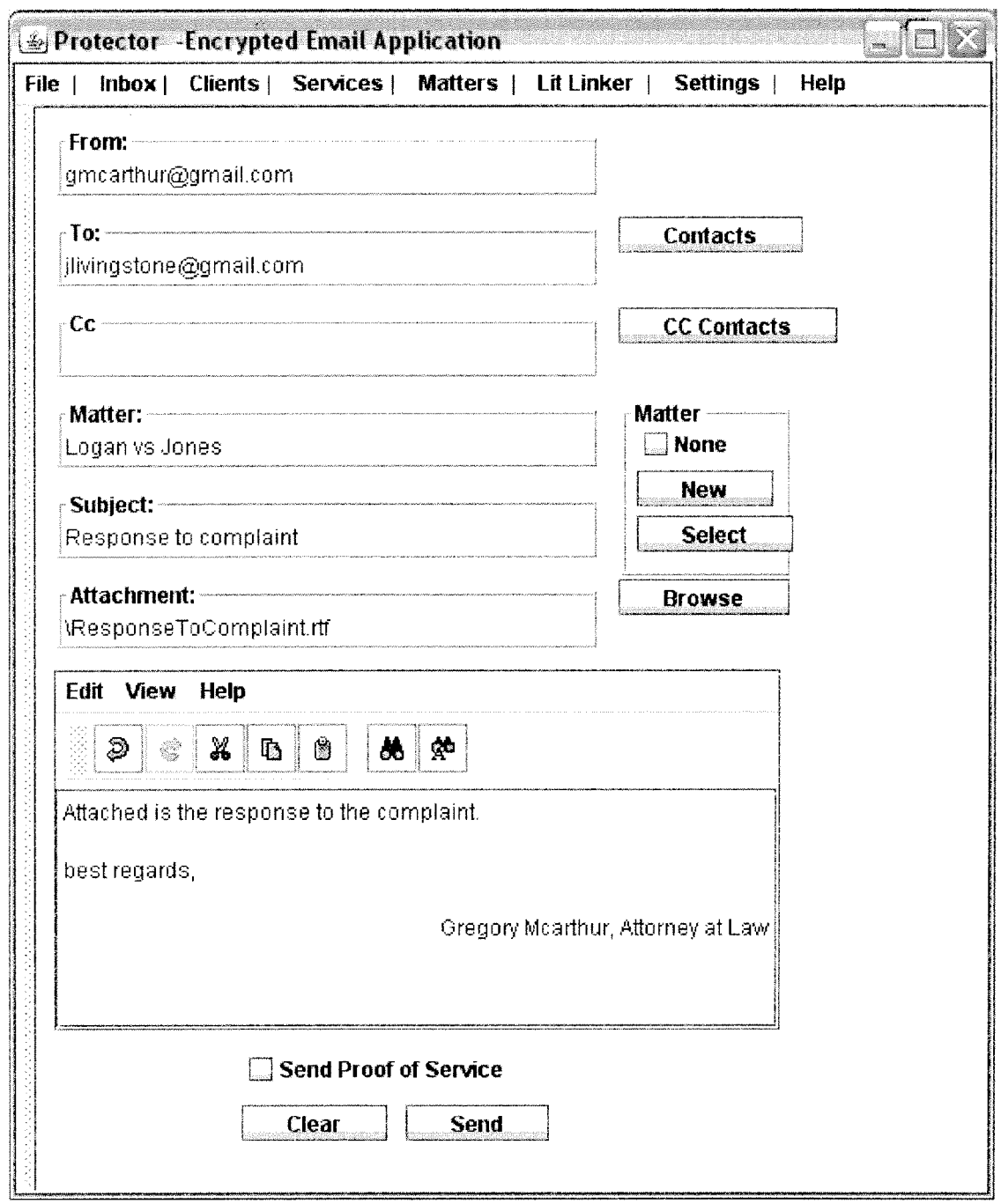
FIG. 133 The Pleading response as an Email Attachment . . .
Figure 134:
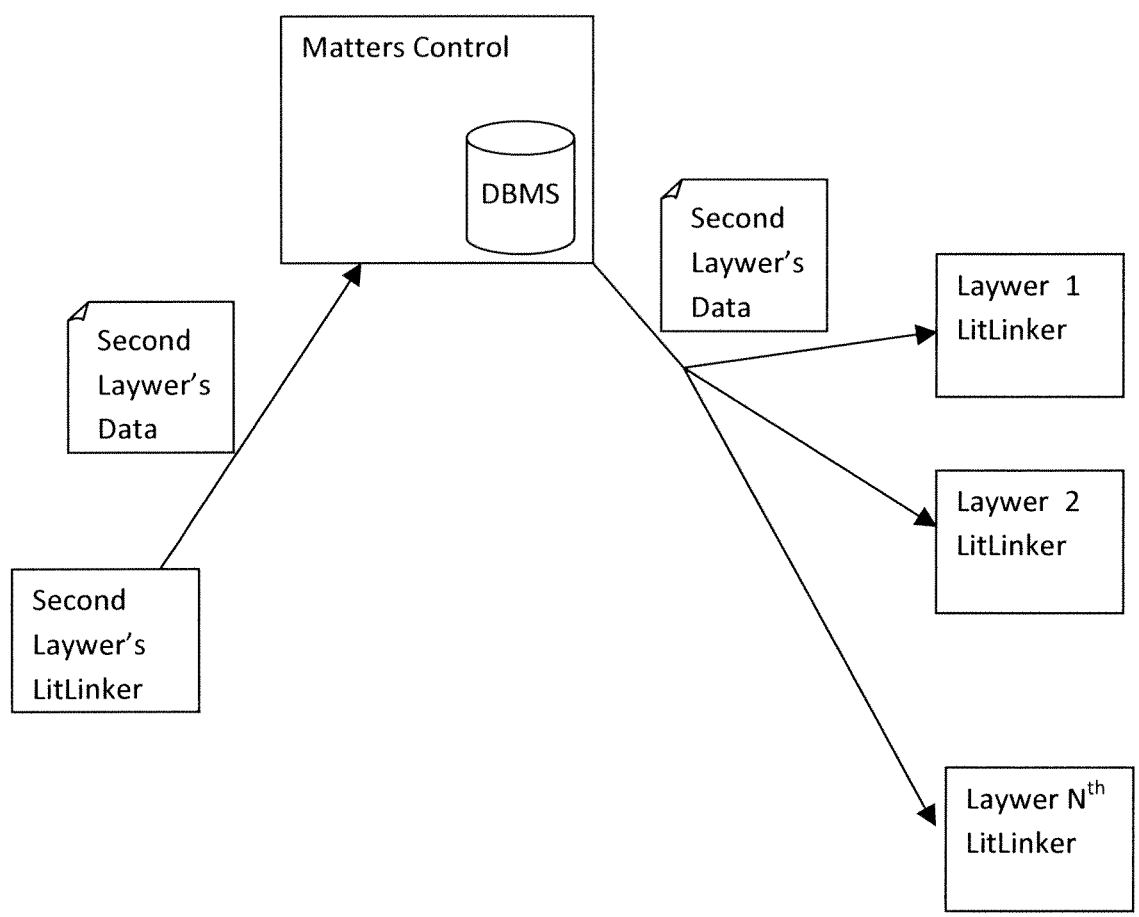
FIG. 134 Broadcasting of a Lawyer's Data to the Other Lawyers in the Matter . . .
Figure 135:
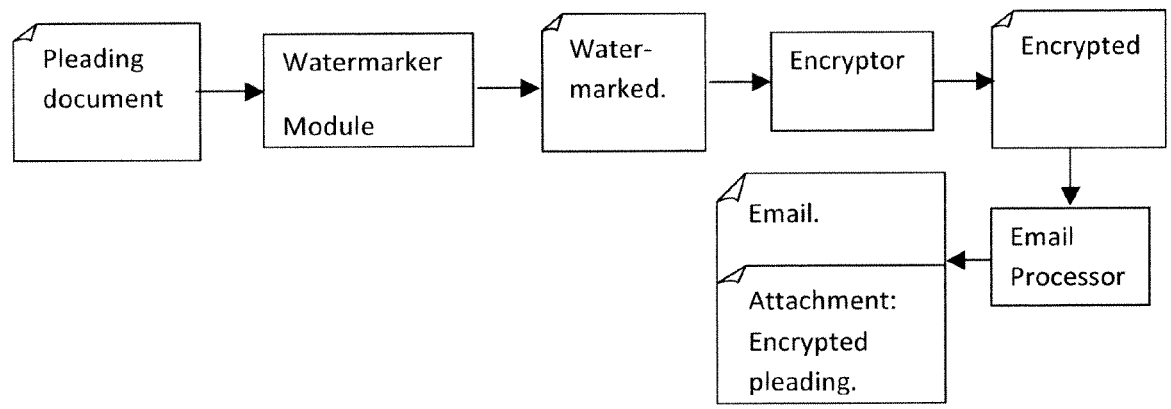
FIG. 135 Block Diagram: Watermarking and Encryption of a Pleading . . .
Figure 136:
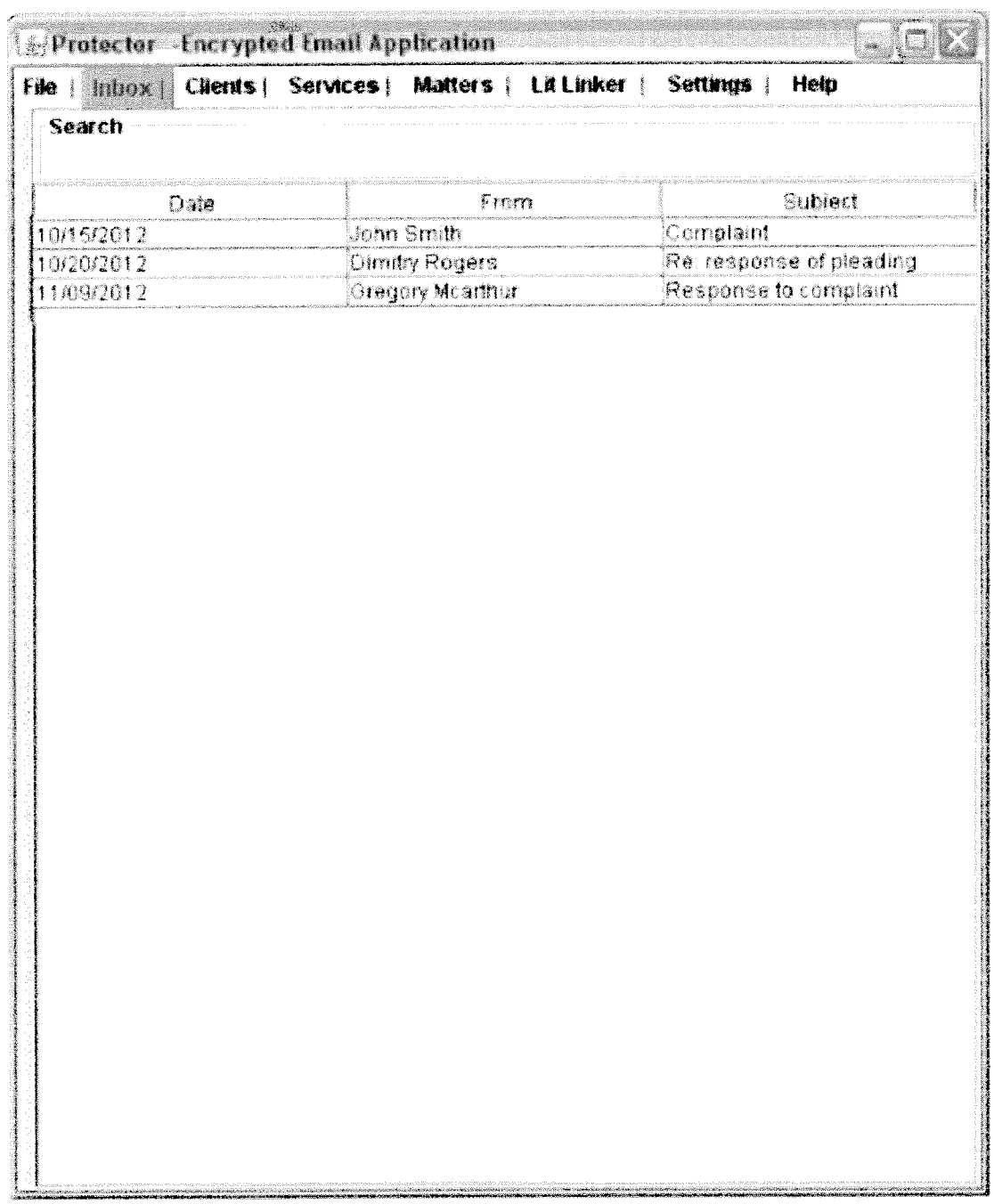
FIG. 136 The Inbox for Online Litigation . . .
Figure 137:
FIG. 137 Wizard for Creating a Response to a Complaint . . .
Figure 138:
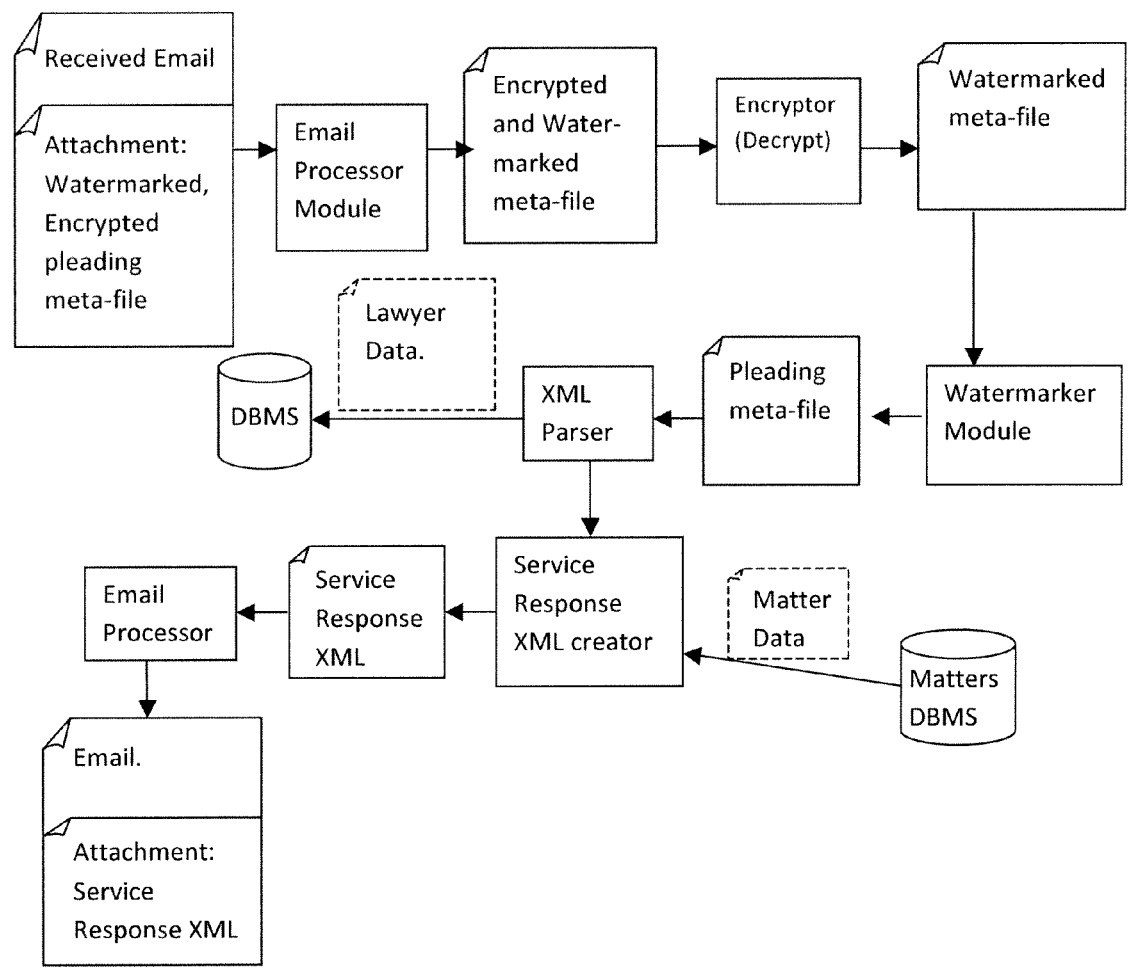
FIG. 138 Decryption and Removal of Watermarking for a Meta-File . . .
Figure 139:
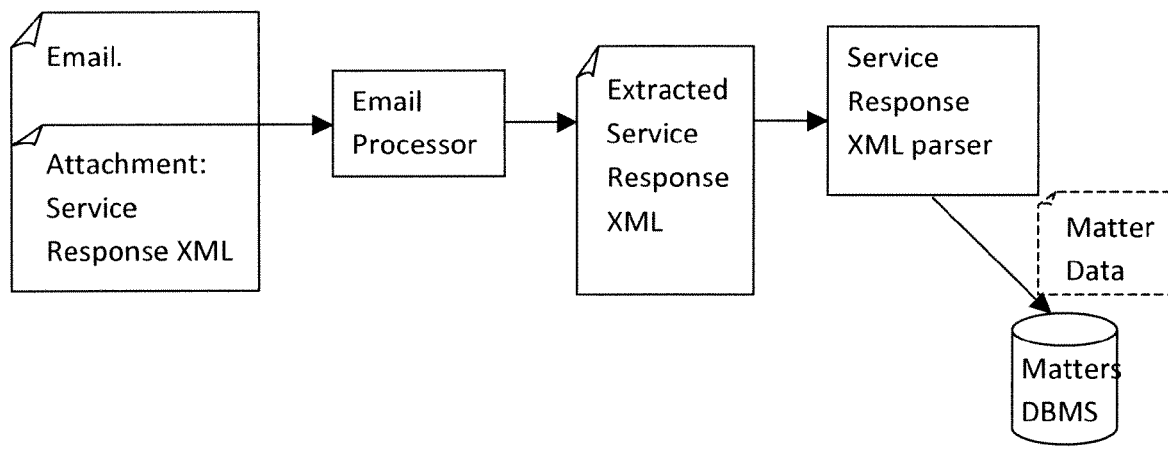
FIG. 139 Proof of Service Procedure and the Matters DBMS . . .
Figure 141:
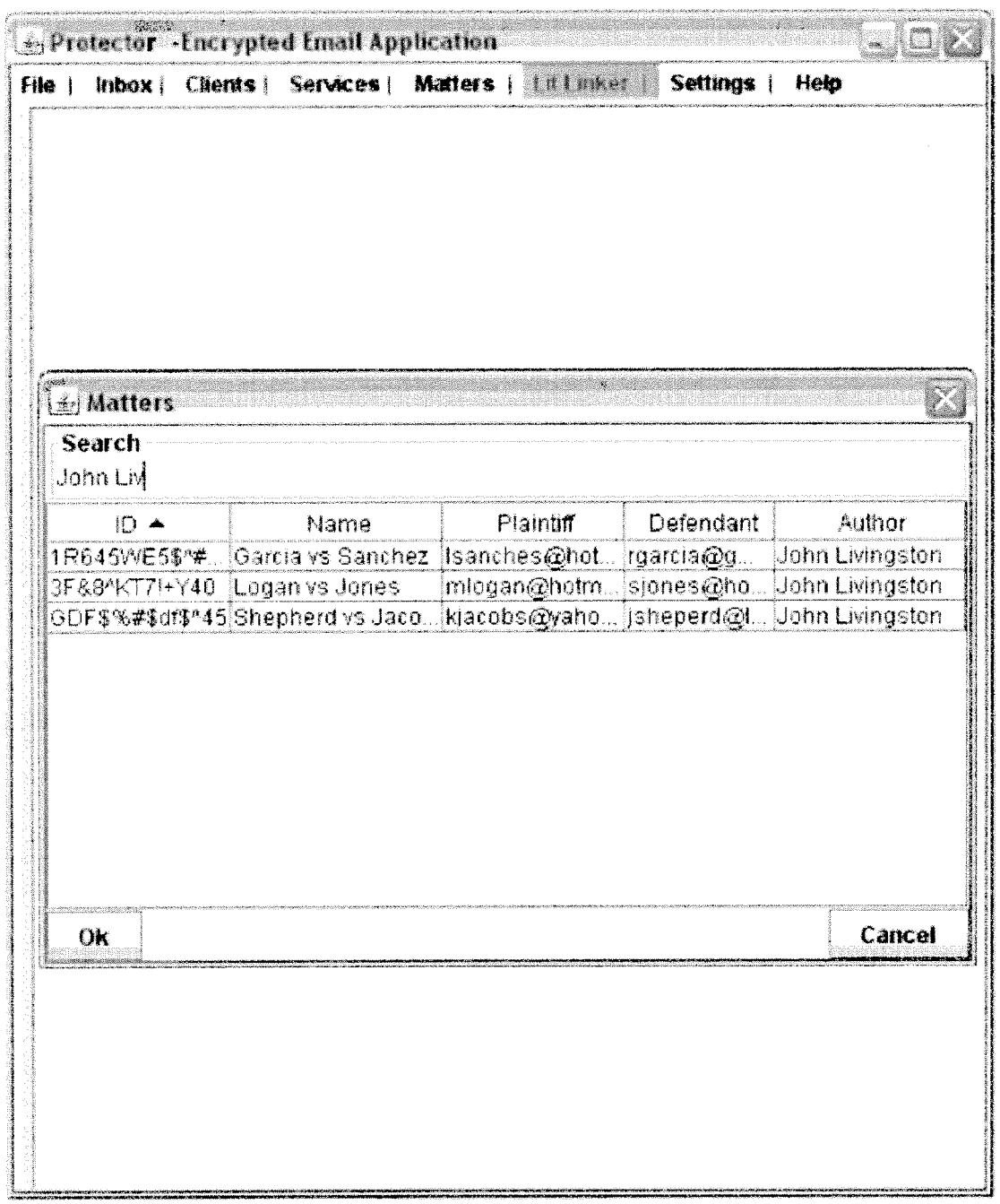
FIG. 141 Searching Matters corresponding to John Livingston, Esq. . . .
Figure 142:
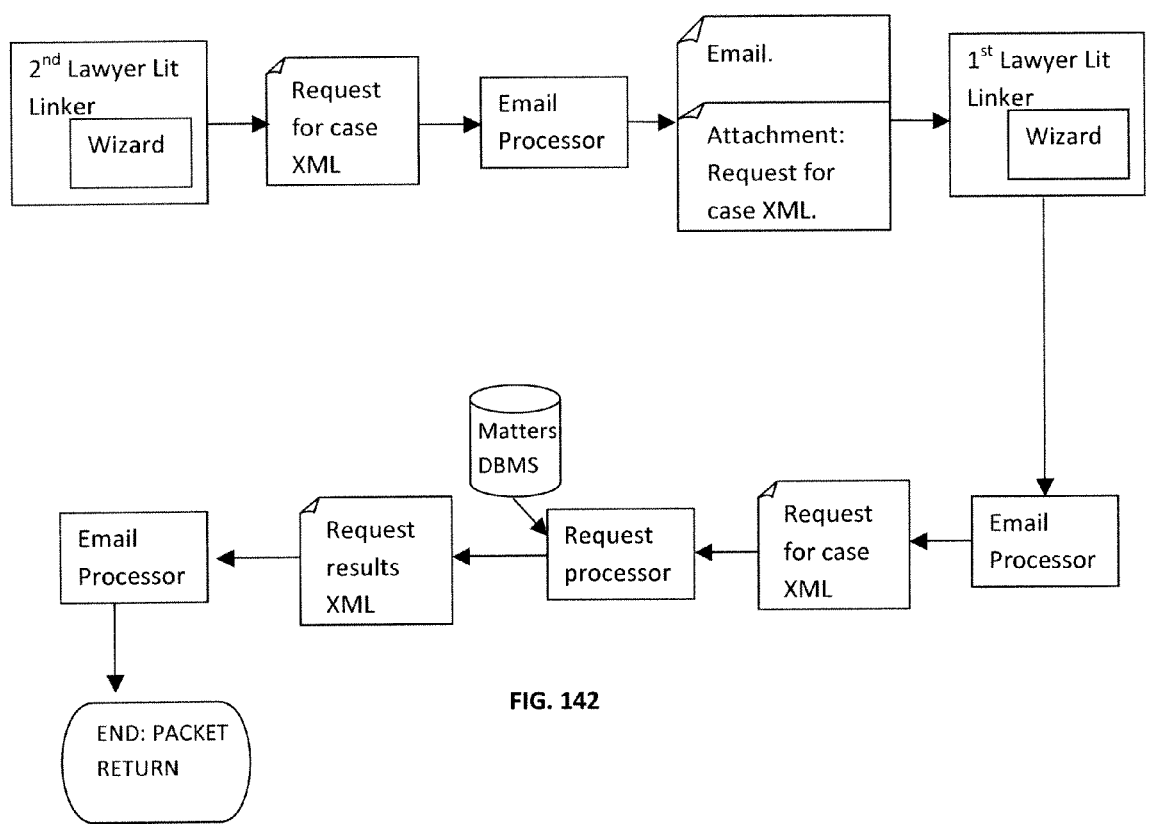
FIG. 142 Request from Lawyer One to Lawyer Two for Global Update of Pleadings . . .

Another way to handle the signature functionality is to include the signature in the body, the content that is wrapped and encrypted. Under this approach the signature may be encrypted by its own ELD. When the signature uses an ELD distinct from the one used on the message plain-text, a hacker would have to crack two ELD's instead of one. On the other hand, the same Secondary ELD may encrypt both the ELD used to encrypt the text and the ELD used for the graphic image of the signature. FIG. 122 is an example of a document containing a digital signature given effect by these means.

Adapting the Protector-Receiver Architecture to Online Litigation

Online Litigation in the embodiments is not limited to local applications using meta-files and ELD's, such as the Protector-Receiver architecture, but this is a good way to do it. When the process of litigation is automated through the embodiments, the pleadings in the litigated case take the form of meta-files that include name-value pairs for values that actuate litigation-related algorithms. By using the algorithms, the tasks of litigation are automated in whole or in part. The repetitive litigation tasks are accomplished by digital means as a background task, leaving the mind of the trained counselor free to focus on the high value tasks that truly require the professional competence that a lawyer assiduously acquires through years of advanced education. This saves the lawyer from drudgery, saves the client money, and generally speeds up the practice of law. This is the object of online litigation.

The embodiments may take the form of an automatic litigation network using meta-files, and executing algorithmic processes expressing the litigation process without automatic authentication and encryption. However, for the sake of security it is better if encryption and authentication are used in the automated litigation network. This means that the Protector-Receiver architecture may be used to provide the security in an online litigation application. The Protector-Receiver paradigm may be extended to enable the specifically litigation-related algorithms to automate the repetitive legal tasks, and the basic encryption meta-file can include extra name value pairs for the litigation related values. The litigation-related algorithms, like the ones that execute encryption and authentication, are given effect by the values and the class loading process.

The Protector-Receive network may be adapted toward the end of automated, algorithmically implemented online litigation in the following particulars. The dedicated, specially adapted Protectors employ values in the meta-file to inform the algorithmic processes that capture the essence of litigation as an interactive process, and spell out the steps. Civil litigation and the prosecution of criminal cases are, to a high degree, rule governed activities. For these legal activities there are special procedural laws—Codes of Criminal and Civil procedure—governing things at every step. For this reason the activities of litigation lend themselves to algorithmic control.

The same technique of wrapping the content of the file payload with name value pairs for encryption, as in Protector-Receiver, may be used to automate litigation. A good approach is to combine both functions in a single client application for online litigation. The lawyers interact in the litigation by using the application, to sue and defend one another's clients, by passing encrypted pleading meta-files back and forth. Therefore, a good strategy for the meta-files is to expand "the bucket approach" paradigm and add values to actuate one or more litigation related algorithms, in addition to the values and databases used for encryption and authentication. One embodiment of this concept for an application for automated litigation is called Lit Linker. In Lit Linker the same parsing technique used for Protector-Receiver and its meta-files is employed to execute the values contained in the meta-file that trigger the algorithmic litigation functionality.

In one Lit Linker embodiment the pleading meta-file contains a jurisdictional value indicating in which jurisdiction the action is filed with the court. This is a useful variable because, in many respects, the routines to automate the litigation process will vary by jurisdiction. The jurisdictional value may trigger functions such as the selection of a rule set derived from a the code of civil procedure corresponding to that jurisdiction, or the selection of a template that conforms to the rules of court in respect of the formatting requirements for the legal documents. Another question is whether in the given jurisdiction the pleadings may be electronically served, and if so, how. Thus, one can see that by combining encryption and authentication with other automatically actuated functions specifically pertinent to the litigation process, such as employing a value for the jurisdiction that triggers the routines depending on that, the Protector-Receiver paradigm may be used to automate litigation and bring the process online.

Lit Linker may be a supplemental module that is part of Protector-Receiver, but this is not the only way to do it. In one embodiment the online litigation capability is included in a library that is separate from Protector-Receiver, and this may be a completely independent application. Lit Linker, in the embodiment described below, takes the independent application approach.

The Lit Linker network uses client software applications with computer-to-computer communications capability, using meta-files specially adapted to the purposes of litigation. The meta-files contain name-value pairs, and the values effectuate automatic encryption and authentication, but additionally execute one or more algorithms that automate the repetitive tasks in the litigation process. The algorithms allow one or more of the steps of the litigation process to occur by default, as a background task.

Lit Linker uses meta-files to expresses the legal pleadings in a litigated case. The meta-files contain name value pairs to actuate the default functionality that automates the litigation process, making litigation less tedious. In Lit Linker the meta-file contains a header, and its body is the intellectual content of the pleading, the lawyer's work product. For example, a complaint meta-file may contain in the body the names of the parties, the background facts, the causes of action, and prayer for relief. This is the essence of the claim whenever the plaintiff sues the defendant, so the complaint meta-file captures this information. The defendant's answer, also expressed in a meta-file containing intellectual content, may deny the plaintiff's claims and assert affirmative matter as a defense.

FIGS. 123-A through 123-I are a ten page flow chart showing the logic of how the litigation process may be captured by an application that reduces litigation to a series of steps. Lit Linker uses this logic flow, in one embodiment. The logic flow demonstrates how both procedural and substantive law may be given effect in a case by client applications, which may connect to servers, the client applications also enjoying computer-to-computer communications capability through which the lawyers interact with one another. The assertion of affirmative matter may trigger the case charting function described above, showing on the tree that depicts the litigation the fact that a new party or pleading has been injected into the case, and that a response is required.

The pleading meta-file contains a name-value pair for the intellectual content, plus numerous others. The name value pairs express values that, in addition to the processes of encryption and authentication per the technique of Protector-Receiver, execute the algorithms automating the litigation process in whole or in part.

Jurisdictional control is one example, and another example is the following. In conventional (off-line) litigation, if the case involves multiple parties, it is to be observed that not all of them enter the case or leave it at the same time. It is considered essential in the practice of law for each lawyer to become apprised of the total scope of the litigation in order to properly represent his client. The lawyer needs to understand the role of every party in the case. This means that each lawyer should at least peruse all of the legal pleadings in the case, if not study them copiously, and this is recognized as a legitimately billable activity.

To read them the lawyer needs to have them. In conventional litigation in some jurisdictions the rules of civil procedure allow the lawyer when appearing in the case for the first time to deposit with one of the other lawyers in the case a sum to cover copying charges, and then demand that one of the other lawyers copy of all of the pleadings in the case and turn them over to the first lawyer. Alternatively, the demand may be made on the court, copy charges are deposited, and the clerk of the court manually prepares the global pleadings set for the newly appearing lawyer.

In one embodiment of Lit Linker each pleading meta-file includes in one of its name-value pairs an index, which may be an XML document, that catalogs globally all of the pleadings filed in the entire case. The index may be a log listing the pleadings in chronological order and identifying the lawyers and their clients. Each Lit Linker also contains in its Matters DBMS a field corresponding to the log. Each time a pleading is transmitted from the first Lit Linker to the second Lit Linker, the Lit Linker receiving the meta-file extracts the log and compares that log to the corresponding log stored in its own Matters DBMS.

Three outcomes from the comparison of the logs are possible. One, the First Lit Linker and the second have the same global log of pleadings in the case. Two, the Lit Linker transmitting the pleading meta-file expresses in its log a greater set of pleadings in the case than that of the recipient Lit Linker. Three, the transmitting Lit Linker has a smaller log than the recipient has. If two or three is the case, then the Lit Linker with the larger log of entries in its DBMS supplements the DBMS of the other Lit Linker by supplying the missing pleading meta-files. It looks the pleadings up, retrieving them from its hard drive, and sends them out to the other Lit Linker. So by this technique, the Lit Linker with the more complete information updates the Lit Linker with the less complete information, and this occurs by default and as a background task. The name value pair expressing the log triggers this algorithmic function, because the logs automatically are compared each time one Lit Linker sends the other Lit Linker a pleading, and if pleadings are missing they are retrieved and transmitted from the other party who possesses them to the party requiring them without any user input by the lawyer sending them.

After this process is complete the complete set of pleadings in the case may be sorted by author, party, date, etc., and both lawyers have the same pleadings in that case. Search criteria may be clicked on and the criteria correspond to these data fields. Note that by this technique each Lit Linker, automatically and as a background task, is made to possess at all times all of the pleadings in the case without ever bothering the lawyer for a copy of anything missing. Once the pleadings are identified and supplied to the lawyers, so that each has the full set, they may be found by search, and the applications may receive them on a cloud or from a server or network. The cloud may consist of all the lawyers who have appeared in the case, and each case may be expressed a virtual private cloud. The redundancy afforded by hosting multiple copies of the litigation meta-files on the cloud protects against casualty loss.

Compared to the manual methods of conventional litigation, it is far easier to remain apprised of the scope of the litigation when the step of accounting for all of the pleadings, in the case in order to stay current, is automated as a background task that executes every time a pleading is served in the case. In Lit Linker there is an algorithm to accomplish this. The comparison of the logs on the transmitting computer and the receiving computer lets the lawyers know of one of them has an incomplete set of pleadings. The application with the greater set of pleadings parasitically uses its reply pleading to transmit to the other application the pleadings that the other is missing, again by using the bucket approach. Another way to do it is to send a special packet, sent as a background task that is dedicated to this sole purpose.

Another example of a litigation process that may be automated by operation of an algorithm actuated by values in the pleading meta-file is the propounding of a request for the authenticity of u writing. The law calls this process "establishing a foundation," and the procedure is known as a request for the admission of the authenticity of a document. For a document to be admitted into evidence, the court must find that the document truly is what the proponent of it says it is. This procedure compels the lawyers to handle this technicality before the trial starts, so that the trial is shortened.

Values to verify automatically the authenticity of a document may be included in the pleading meta-file. In one embodiment of Lit Linker this is accomplished by virtual watermarking. When one Lit Linker client application prepares a pleading meta-file, before it is transmitted to the other Lit Linker, it is "watermarked" digitally, by operation of an algorithm. This may occur in sundry ways, and one is the following. The pleading meta-file, before it is encrypted, is expressed as a set of bytes by operation of the transmitting Lit Linker. Then, an RNG on the Lit Linker generates a series of numbers to determine random insertion points for dividers in the bytes, and the dividers correspond to this count in the bytes. The objective is to space the number of characters between one divider and the next arbitrarily and record the spacing. The dividers are markers in the bytes, and each divider is a character. The bytes are processed so that the characters between each divider are counted, and the count is saved as a score.

If the document is to be deemed authentic, which is to say not tampered with, the spacing between the markers when the document was marked must equal the spacing between the markers established later, when the document is received later by the recipient Lit Linker, when the spaces are counted again. If the spacing is the same this establishes that it is highly unlikely that any characters have been removed or added, so by inference that there has been no tampering with the document. (It is highly unlikely that any tampering with the original document, or failure to transmit all of its bytes, would result in an identical count in the as-received document.) The initial score reflecting the spacing when the document was auto-watermarked is encrypted and saved in a name-value pair in the pleading meta-file, and compared to any later rendered score upon a subsequent count on the same body of text.

The details of the auto-watermarking process are as follows. When the document is first scored the score is inserted into the pleading meta-file in a name-value pair reserved for this purpose. Then the entire byte set constituting the pleading meta-file is encrypted. The first Lit Linker transmits this meta-file to the second Lit Linker. The second Lit Linker decrypts the file and extracts the bytes, and this step may employ the Secondary ELD technique for authentication. The second Lit Linker executes the same watermarking algorithm as the first to count the number of characters between the dividers. (The algorithm is part of his Lit Linker application.) This yields the second score. The score previously saved by the first Lit Linker and installed in the corresponding name-value pair of the meta-file sent to the recipient is compared to the new score. (As the initial step the first score is decrypted). If the scores match, the second Lit Linker deduces that the copy of the pleading meta-file it has received from the first Lit Linker is true and that nobody has tampered with it.

All of this occurs as a background task. At the user interface this triggers an icon in the Lit Linker application showing no tampering. The icon may in the opposite case issue a warning, such as a beep or a light that has turned from green to red.

This is automatic, obviating the need for a manually prepared "Request for the Admission of the Authenticity of Documents," which is a cumbersome non-automatic step prescribed in the codes of civil procedure of the various States. The "Request for Admission" procedure is a separate pleading that requires a response. It is a fee generator, but it is not a step that truly requires the skill of a lawyer. The algorithmic automation of this step in the litigation process saves the lawyer time and saves the client money.

Yet another example of a step in the litigation process that may be effectuated through algorithmic automation per the Lit Linker approach is proof of service. The possibilities of this litigation function generally have been explained above, and now a specific implementation is described under the Lit Linker methodology. The conventional way of proving the service of a pleading during the course of litigation is for someone, such as the lawyer's assistant, to mail or email a writing, separate from the actual pleading served, attesting to the fact of mailing or electronic transmission, and this is a declaration under oath expressed in an attachment to the pleading served: "I declare under the penalty of perjury that I mailed the pleading entitled X to the parties on the included mailing list," or a similar attestation. This approach leaves open the possibility that the sworn declaration of service by the assistant that the pleading was served could be, innocently or deliberately, not true. The court or other recipient of the attestation would have no way of knowing whether the declaration really was true or not.

When the proof of service step in litigation is algorithmically carried out through Lit Linker this shortcoming in the conventional means is overcome. The process may occur in such as way as to make it very hard to falsify the matter of proving that service in fact has occurred. In the very least, accomplishing service electronically, per the embodiments, means that unless a person wishing to misrepresent service has technical computing knowledge, falsifying the proof of service would be very difficult, because the process occurs without any user input and in the background. Proving service electronically through Lit Linker is more accurate and more informative than doing it in the conventional way, as will be demonstrated. The algorithmic establishment of lawful service allows not only automatic proof of transmission for the pleading sent electronically, but better yet, proof that it actually was actually received complete and in legible form.

Whenever a pleading is served the Lit Linker may prepare a Service Response Packet which is an XML document that, as a background task, is returned by default to the party that served the electronic pleading, as an automatic, silent reply. The response packet in addition to other functions confirms that the electronic pleading not only was received by the party to whom it was sent, but moreover that the Lit Linker of the recipient party successfully decrypted that meta-file and executed the watermark functionality. This authenticates the as-received document as being identical to the as-sent document, establishing that it was actually received in a legible and unaltered form. In contrast to the conventional method, this prevents the recipient from claiming at all persuasively not only that he never got the document, but also that he got it but couldn't decrypt it or read it.

The litigation automation examples provided above, made possible by values in the pleading meta-file that actuate the algorithmic expression of each respective legal process, are illustrated in the Lit Linker Flow Chart, FIGS. 123-A through 123-I. A non-exhaustive list of processes and activities for online litigation using an application with computer-to-computer communication capability, and subject to automation via algorithmic control given effect through the values in a pleading meta-file which the applications create, process, and transmit, may include the following:

(1) Identifying by means of addressing, and through data in the pleading meta-file, the lawyers appearing in the litigation;
(2) Searching or looking-up facts, persons, laws or intellectual content arising out of or pertaining to the litigation, and associating the same in sets, URL's, searchable terms, groups or folders, or a cloud;
(3) Authenticating the users of the applications on the network, including the method of Secondary ELD's or meta-logic;
(4) Processing the serial id number of the online litigation application and the data pertaining to its user, in respect of his or her settings, preferences, rights, and participation on the network;
(5) Associating the meta-file to the litigated case to which it pertains; provisioning, associating and executing matter identifiers and associated ELD's that pertain to that case or matter;
(6) Expressing the jurisdiction of the litigated matter, and searching for and invoking laws and rules pertaining thereto, assembling a composition thereof, and otherwise triggering functions that depend on the jurisdiction;
(7) Identifying the judge assigned to the case, performing data mining on the judges to identify their bias, and exercising judicial disqualification when appropriate, and using a cloud and search to accomplish this with privacy;
(8) Controlling the manner in which the litigation is initiated, and creating an operative meta-logic for the meta-files dedicated to that case when it is commenced (such as via a matters ELD); providing personal service of the summons and complaint conventionally, when per the pertinent rules of civil procedure the automatic approach of the embodiments is not possible, but using that approach when it is; generating a proof that service of the pleading meta-files has taken place and that the content was received in good form;
(9) Identifying the court where the litigation takes place;
(10) Identifying the action number of the litigation;
(11) Identifying the parties in the litigation;
(12) Associating the lawyers prosecuting the litigation, the judges deciding it, and the jurisdictions in which they are admitted lawfully to practice and their bar numbers to determine their good standing; corroborating their enrollment status on the network and their right to use the software; integrating this data per a value set or DBMS or searchable avatar file describing each lawyer or judge;
(13) Generating billing data pertaining to the litigated case including the time spent preparing the pleading and the hourly rate, and the fees and taxes and sanctions and fines pertaining to the case, and identifying the payors and the payees and automating payment thereon and an accounting for the same;
(14) Generating either an index value referencing an electronically stored attorney-client fee agreement if one exists (or index values showing standard provisions) or the nonexistence of such an agreement, or alternatively the verbatim expression of the agreement or a specification of standard provisions; identifying the statutes and other laws pertaining to the attorney-client relationship in that jurisdiction and the requirements imposed by law, and demonstrating the compliance of the agreement with those requirements;
(15) Deploying ELD's to encrypt the pleading meta-file in whole or in part, or the differential use of ELD's whereby part of the meta-file is encrypted by one ELD and other parts by other ELD's (including Secondary and Plain-Text ELD's), toward the end of allowing the meta-file to evince multiple schemes of digital rights as among the lawyers and their clients and the judges and the clerks of the court, or sub-groups thereof;
(16) Specifying the commencement date of the litigation and using it to allow the lawyer to be cognizant of the deadlines arising form the legal procedures; associating the deadlines to the particular procedure from which it arises through a warning system at the user interface that suggests a legal response and provides a link to the relevant legal authorities, or by loading a Help Class specifically pertaining to that case; identifying all of the dates in the litigation, according to a rule set, triggering the extension or withholding of legal powers and duties as among the litigants, including statutes of limitation;
(17) Identifying the final determination of the litigation by settlement, judgment or non-appealable order, and supplying that data through a wizard the lawyers use when the case if over; providing a URL or an index or descriptor or data structure or cloud referencing the same, or a portal for this purpose;
(18) Establishing whether a judgment, order, duty, or contract has been complied with or not, and if so the circumstances that demonstrate that fact; recording the same on a searchable cloud or data structure hosting indicia of the satisfaction of the judgment, or default, breach, cure, release, notice of completion, undertaking or guaranty; calculating pre-judgment and post-judgment interest;

(19) Identifying any connection of the identified litigation to any other litigation, as in the case of coordinated proceedings or the consolidation of multiple actions, or a connection to other litigation involving the same parties in whole or in part, and if so, the action numbers and jurisdictions of the other litigation; identifying any litigation into which a government agency or party enjoying a special status enjoys the right of intervention and the statutory basis for that determination; executing a search or lookup to reveal any of the above or to associate the parties and the actions as a work group, or to create a value set corresponding to such a group;

(20) Specifying the policy numbers and limits of insurance pertaining to the case, together with the names of the insurers and their contact information; processing this information in respect of any issue as to insurance coverage or limits; preparing a subrogation receipt; paying indemnity upon judgment or other event triggering the duty to pay, and accounting for the same, including interest calculations;

(21) Identifying any joint defense agreement or special arrangement concerning communication as among the defendants or other parties or their counsel or insurers, including indemnity or contribution or the holding harmless of one party by another; identifying any ad hoc sub-group of litigants or their attorneys or insurers or indemnitors and generating for them an encryption logic scheme to unify them in privacy and automate secure communication; as to any joint defense or similar agreement, using markers designate the parts that are privileged or otherwise non-discoverable, and a template to bring this about;

(22) Identifying contracts pertinent to the litigation and compelling the admission of their validity, or other issues arising in contract; identifying and authenticating written memoranda of contracts on a cloud or data structure, or the abbreviated expression of the same by reference values or the indexing of standard provisions, including their expression in XML; the performance of the contracts vel non; addressing and search for all of the above, and hosting the contractual data on a cloud;

(23) Generating a table of authorities or a summary or index of the legal support cited in the intellectual content in the body of the pleading meta-file; Shepardizing™ the same; processing the logical relationship as among the authorities, including but not limited to gauging the verisimilitude of one authority to another, whether one authority has overruled another, and whether the authorities otherwise are in accord or not; authoring and implementing algorithms used in this gauging process, including statistical techniques such as regression analysis that capture all of the legal authorities in a case or brief and execute the comparisons as a background task, and provide a graphic view; preparing URL's and web services and data compilations pertinent to the above;

(24) Generating, through an algorithm, written discovery requests pertaining to the issues of law or of fact, per the intellectual content of the pleading; parsing that content for values which correlate to a legal research resource organized by issue classification, such as the West™ key number system; generating jury instructions or a proposed statement of decision arising from the intellectual content and the issues identified; correlating the intellectual content to legal authority such as statutes or published cases in a way that suggests to the lawyer further steps, such as through a wizard expressing possible alternative strategies and practice tips; executing searches pertinent the above;

(25) Listing the issues in the litigation and specifying which are agreed and which are disputed; preparing a pre-trial statement summarizing the same under the Federal Rules of Civil Procedure or the similar laws of a State;

(26) Referring the case to an arbitrator or removing it to another jurisdiction; randomly assigning the case for trial or decision by algorithm, toward the end of preventing forum shopping or judicial corruption;

(27) Generating and auto-inserting into the pleading meta-files the handwriting signatures of the parties and their attorneys, via encrypted or unencrypted image files depicting the same; designating the insertion points for the signatures through templates; generating any other digitally expressed unique personal bio-identifiers such as a finger print, voice print or iris scan, and inserting the same into the meta-file or using the same to operate as an authentication gate; causing the authentication, encryption and meta-encryption of such bio-indicator files; integrating the bio-indicators into the process of creating, sharing, transmitting, and downloading the meta-files;

(28) Generating, saving, and selecting the templates available to the lawyers to create the pleading meta-file, and using the templates to author the meta-file or to create a second meta-file in response to a first one; generating and processing addresses and index values used to reference such templates or search for them, look them up, or fill them in with data and save them, per a data structure or wizard; using a cloud or network to save, search for, retrieve, and modify the templates and exchange them; reaching a URL for this purpose and using an encrypted port and an enrollment procedure;

(29) Using XML, and or XmlBeans, to provide form and content to the online litigation process and the meta-files and auxiliary data packets used therein; using XmlBeans in dynamic class loading to execute the litigation related algorithms;

(30) Toward the end of refining the legal argument in the case, processing the intellectual content of the meta-file logically, in light of the legal authorities cited in it, via regression analysis and statistical operations that measure the logical similarity of the intellectual content of a first meta-file to that of a second meta-file, such as one filed in opposition, or to a published case or law to be distinguished or offered in support; ranking the results, and in order to carry this out, using the techniques of artificial intelligence; presenting to the user a wizard that automates the refinement of the legal arguments in connection with these processes;

(31) Determining the status of the parties as to any prior convictions or warrants for their arrest or tax liens other recorded obligations or obstructions to legal title or right, via searches reaching electronic abstracts of judgment or criminal sentences or fines or defaults, or breaches, cures, or impediments such as lis pendens—and doing this as a background task; doing this through search using a cloud or a URL; integrating this information with the processes of discovery, including the propounding and answering of interrogatories or requests for admission; determining the marital status or residency or citizenship status of a person, or a legal disability by search or lookup; recording all of the above on a cloud or other data structure;

(32) Archiving redundant copies of each pleading meta-file on the network for backup purposes, and searching for them and retrieving them via a data structure or a public or private cloud; providing peer-to-peer search in the applications to enable this capability;

(33) Certifying a transmitted or copied meta-file as a true and correct copy of the original; certifying the authenticity of the purported author of as-served meta-files, and using a signature image to do this; watermarking the meta-files by taking the bytes, generating a string of values corresponding to the insertion points for markers in the bytes, saving the string, inserting the markers per the values in the string, saving the bytes with the markers inserted, counting the bytes between each marker, saving the count as a score expressed in a name value pair of the as-watermarked meta-file, encrypting and decrypting the score, comparing that score to the score rendered later when the process is repeated on the bytes of the same pleading payload when received by a second computer, and processing the result to yield a finding of document integrity or not;

(34) Corroborating the service of process of the meta-file; verifying the names and email addresses of the lawyers representing the parties and the status of representation;

(35) In connection with the proof of service, generating and recording a reply message from the recipient of the served electronic document in response to the sender, whereby the actual receipt is acknowledged along with the fact that the document successfully was authenticated and decrypted and transmitted in unaltered form;

(36) Attesting or notarizing an official document, deed or power of attorney; confirming the recordation of a deed or instrument or contract and archiving the document in multiple copies on a cloud or other data structure; enabling the original notary or a subsequent one to certify the above on a later occasion; finding this information by search or through a portal; registering the users and charging them a fee;

(37) Determining, in respect of a new pleading meta-file, whether it is one which requires a response or is one which constitutes a response to a prior pleading meta-file; expressing this determination in a name-value pair and using that value to generate a tree to diagram the scope of the case as a whole; generating, inserting, transmitting, storing, and displaying values and images pertaining to this process;

(38) Searching, indexing, and assembling a set of laws and procedures which pertain to the case, thereby generating a case reference library, a composition available to all the lawyers on the matter; searching the case reference library and integrating the authorities in it with the intellectual content of the pleadings and with the written discovery in the case; globally indexing all of the sources of legal authority cited in the reference library for processing, search, and lookup; parsing the intellectual content of the pleadings to update the research library throughout the course of the litigation automatically; generating a table of authorities in the pleadings; expressing the body of the pleading meta-file by using HTML to reference the legal authorities, so that the reader may click to link to the authorities in the case research library automatically and read them or Shepardize™ them; carrying out the above through a cloud.

(39) Authoring a court order, judgment or decree, serving it on the parties and certifying compliance therewith or the execution of penalties in the event of non-compliance; preparing a satisfaction of judgment, or in the contrary case a court-ordered encumbrance or seizure of assets.

(40) Generating, recording, and processing stipulations entered in the case by the parties or their attorneys, including but not limited to stipulations expressing their mutual assent to accept the electronic methods of the embodiments in lieu of the conventional methods of litigation; recording the stipulations verbatim or expressing them through standard provisions referenced in an index, lookup, or a search; exchanging, transmitting, recording and printing the stipulations expressed in this way and encrypting them with dynamic encryption logic or meta-logic, including ELD's;

(41) Data mining, and generating outputs relating thereto, in light of the sex, socio-economic status, race, religion, ethnicity, educational level, political affiliation, criminal history, etc. of the litigants or the lawyers or the judges in a given case, toward the end detecting bias or otherwise measuring the fairness of the litigation process or the laws involved, or determining the fulfillment of a legislative intent; reaching a URL containing such data; causing the generation, storage, search, lookup, retrieval, or processing of data pertaining to the above and creating algorithms toward that end; creating development environments for authoring applications, services, and mathematical models with this capability.

Lit Linker may implement the above described litigation processes automatically, by default, through name-value pairs expressed in the pleading meta-files, and through any other data packets used for auxiliary background functions. Lit Linker may use Plain-Text ELD's and Secondary ELD's for security in carrying out the above functions. The Java programming language offers maximum flexibility for applications through dynamic class loading and the dynamic execution of the methods of a class, as explained above, and Lit Linker makes full use of this. Similar languages such as C# or Python may be used as well. Encryption Logic Engines and ELD's may be used, but also keys and conventional algorisms such as AES may provide the encryption logic, and encryption meta-logic too.

The Email Processor Module described previously per the Protector-Receiver architecture, with its functionality extended, may process all of the name value pairs used in Lit Linker. Like the Protector-Receiver architecture, Lit Linker may consist of several functional modules. One of the Protector's main modules is the Email Processor, which creates the meta-files that wrap the encrypted contents of the email to be sent, and send it. On the recipient's side, the Email processor module processes all the name-value pairs that were added during the creation of the meta-file. Lit Linker extends this approach by automating the litigation processes as described above, so that the routine processes execute automatically as a background task, when the name-value pairs corresponding to the processes are parsed, and the pleadings may be created, transmitted, received and processed as emails, or as chat messages, per the embodiments.

A person reasonably skilled in the art can perceive that chat may be used as the basis of an online litigation network, instead of email. For example, the Power Session concept may be extended, whereby a judge conducts case conferences with lawyers on a case via chat, or conducts a hearing providing the lawyers with the right to respond to a tentative ruling by chat. Similarly, the lawyers can open each case and litigate it by broadcasting pleadings to the other lawyers on a chat network. Skype can be used to videoconferencing, and the automatic methods of the embodiments fit with the Skype paradigm. The Facebook paradigm also could be invoked, and the "friending" function can apply to litigants on a case to allow them to appear.

Both Protector-Receiver and Lit Linker use the Email Processor module and employ name-value pairs in the meta-files which are processed in the background. Like the communications sessions of Protector-Receiver, the above described litigation-related processes may be given effect through name-value pairs and dynamic class loading. In each name-value pair the "name" is a command to be executed in order to process the "value." For example, where the pleadings and litigation related messages are encrypted using meta-logic, in the case of a name-value pair that corresponds to the Plain-Text ELD, the "name" indicates the pair that contains that ELD, and the value indicates that something must be done to the contents of the "value" (the encrypted Plain-Text ELD), namely that it most be encrypted or decrypted using the Secondary ELD.

In one embodiment the processing function for the name-value pairs is contained in only one Java class. But this presents the disadvantage of rigidity. Whenever new functionality is added the whole code of the class must be modified. In a different embodiment, one using dynamic class loading and XML, the main class need only handle the interpreting of the name-value pairs, dynamically loading the classes needed for the data processing and the dynamically executing the methods that process the value. On each application there is a JAR file that includes each class using the method that performs the processing. The XML file, a configuration file, is read by the main class in order to load the other classes and execute the methods, according to each received name-value pair, Per this approach, the processing of a name-value pair can be considered a "state" of execution. There may be a State Controller module used to execute the various states. Before executing a state, when XML is used to describe it, the XML is read. One example of an XML document used in state control is shown below:

```
<Klasses>
  <Classes>
    <Klass Command="POS" Method="parseProofOfServiceHeader"
         Klass="pos.processor.ProofOfServiceProcessor"
JarPath="ProofOfServiceProcessor.jar"/>
    <Klass Command="POS_RESPONSE"
Method="processProofOfServiceResponse"
         Klass="pos.processor.ProofOfServiceProcessor"
JarPath="ProofOfServiceProcessor.jar"/>
    <Klass Command="RESPONSE_TO_PLEADING"
Method="processResponseToPleading"
Klass="pleading.processor.PleadingProcessor"
JarPath="PleadingsProcessor.jar"/>
    <Klass Command="PLEADING_RESPONDS_TO_PLEADING"
Klass="pleading.processor.PleadingProcessor"
JarPath="PleadingsProcessor.jar"/>
    <Klass Command="PLEADING" Method="processPleading"
Klass="pleading.processor.PleadingProcessor"
JarPath="PleadingsProcessor.jar"/>
    <Klass Command="PLEADING_RESPONSE"
Method="processPleadingResponse"
Klass="pleading.processor.PleadingProcessor"
JarPath="PleadingsProcessor.jar"/>
    <Klass Command="MATTER_ELD" Method="processMatterELD"
Klass="pleading.processor.PleadingProcessor"
JarPath="PleadingsProcessor.jar"/>
    <Klass Command="MATTER_PARTY"
Method="processMatterParty"
```

-continued

```
Klass="pleading.processor.PleadingProcessor"
JarPath="PleadingsProcessor.jar"/>
  </Classes>
</Klasses>
```

The code of the state controller that reads the XML may be as follows:

```
1.  for(int i=0; i<classes.length; i++)
2.  {
3.       servercommand.processor.Klass klass = classes[i];
4.       className = klass.getKlass( );
5.       jarPath = klass.getJarPath( );
6.       servercommand.processor.Param[ ] params =
         klass.getConstParamArray( );
7.       types = new Class[params.length];
8.       values = new Object[params.length];
9.       for(int j=0; j<params.length; j++)
10.      {
11.        String type = params[j].getType( );
12.        types[j] = getParamClass(type);
13.        values[j] = getParamValue(params[j], type);
14.      }
15.      command = klass.getCommand( );
16.      method = klass.getMethod( );
17.      useDataVector = klass.getUseDataVector( );
18.      addCommandsData(command, jarPath, className, types,
         values, method, paramTypes, paramValues, useDataVector);
19. }
```

This code reads the contents of the XML (lines 3-17), and once the data has been read, it is stored in a Hash table. The method that is invoked in line 18 is in charge of the last step.

The class that invokes the state controller is the Email Processor class. The code where the state controller is invoked may be the following:

```
1.  for(int i=0; i<pairs.length; i++)
2.  { pair = pairs[i];
3.     Vector data = new Vector( );
4.     String command = pair.getName( );
5.     data.add(command);
6.     data.add(sender);
7.     data.add(pair);
8.     stateController.executeState(data);
9.  }
```

Lines 2-7 add the data that is needed to execute the state into the vector, and line 8 executes the state. This is performed for each name value pair of the meta-file.

The code of the state controller's executeState( ) method may be as follows:

```
1.  Hashtable methodData = (Hashtable)commandsData.get(command);
2.  jarPath = methodData.get("jarPath").toString( );
3.  className = methodData.get("className").toString( );
4.  classInstance = (Object)methodData.get("classInstance");
5.  method = (String)methodData.get("method");
6.  paramTypes = (Class[ ])methodData.get("paramTypes");
7.  args = (Object[ ])methodData.get("paramValues");
8.  DynamicClassLoader cl = new DynamicClassLoader( );
9.  cl.addFile(jarPath);
10. if(classInstance!=null)
11.     cl.setInstance(classInstance);
12. else
13. {
14.     cl.setClassName(className);
15.     types = (Class[ ])methodData.get("constParamTypes");
16.     values = (Object[ ])methodData.get("constParamValues");
```

-continued

```
17.    cl.createInstance(types, values);
18.  }
19.  Object o = cl.invokeMethod(method, paramTypes, args);
20.  return o;
```

Lines 1-7 get the data used for the loading of the class and execution of the method from the hash table of commands. The dynamic class loader is instantiated in line 8. Lines 14-17 create the instance of the class, and line 19 executes the method and obtains the result.

An IDE may be used to simplify the task of adding application functionality in Lit Linker, through the development of new name-value pairs. For example, Lit Linker instead of being a unitary web service, may be a set of several related ones developed by third parties, who use the IDE to streamline their programming efforts and insure that their applications are compatible under the common environment. Shown in FIG. 143 through 149, is one embodiment of such a development environment for the author of compatible Lit Linker applications. The applications provide to the lawyer, through his Lit Linker shell, some or all of the functions listed above as items one through forty-one. In this embodiment Lit Linker is not an application, but a shell that reaches the web services that the individual developers author.

Figure 143:
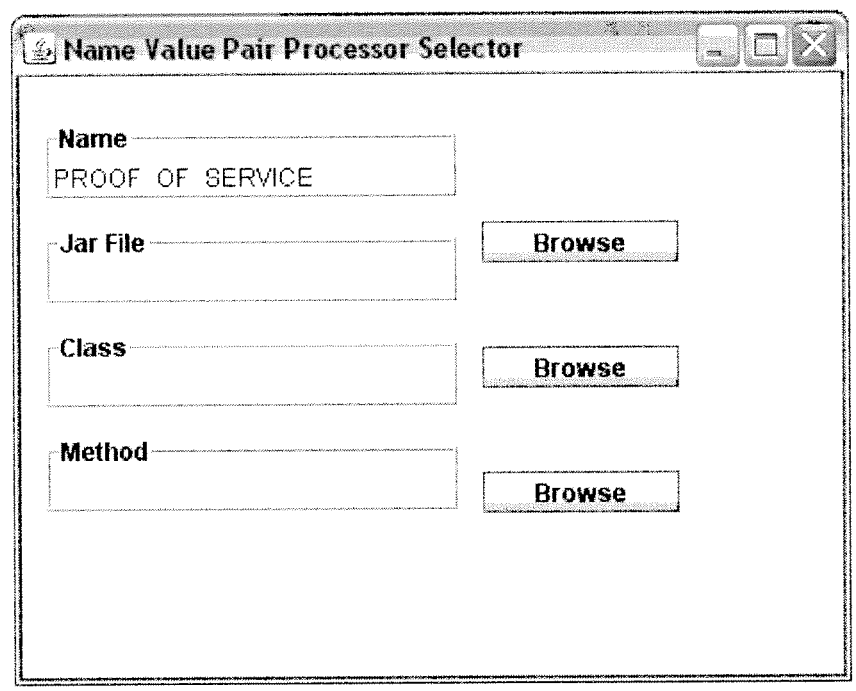
FIG. 143 CryptoNet IDE: Name-Value Pair Processor Selector . . .

Lit Linker in this embodiment uses dynamic class loading. The flexibility offered by dynamic class loading may be maximized with an IDE to create new name value pairs and to develop the modules to execute their functionality. The IDE may be as follows, in FIG. 143, depicting the panel where the S.I. defines the name of the Name-Value pair. The panel also allows the user to select the module to execute its functionality at run time.

Figure 144:
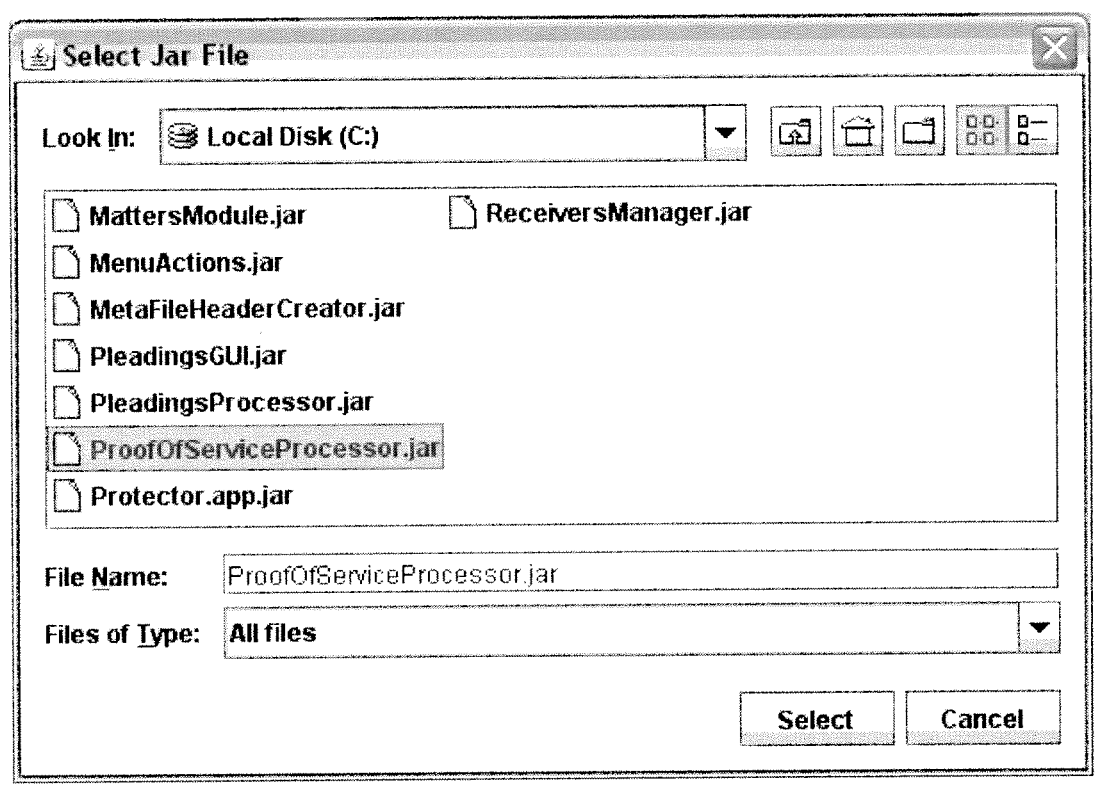
FIG. 144 CryptoNet IDE: Selection of JAR File to Process Name Value Pair . . .

Under the IDE the first step in the process is stating the name. The name is typed in the text field with the "Name" label. After the name of the name-value pair has been provided, the following step consists in the selection of the JAR file that contains the class to execute the functionality of the name value pair. The JAR file can be selected from the file system by clicking the "Browse" button by the text field with the "Jar File" label. When this Browse button is pressed, a file chooser window is displayed (as shown in FIG. 144). By means of the file chooser, the JAR file is selected. In FIG. 144, the ProofOfServiceProcessor.jar file is selected.

Figure 145:
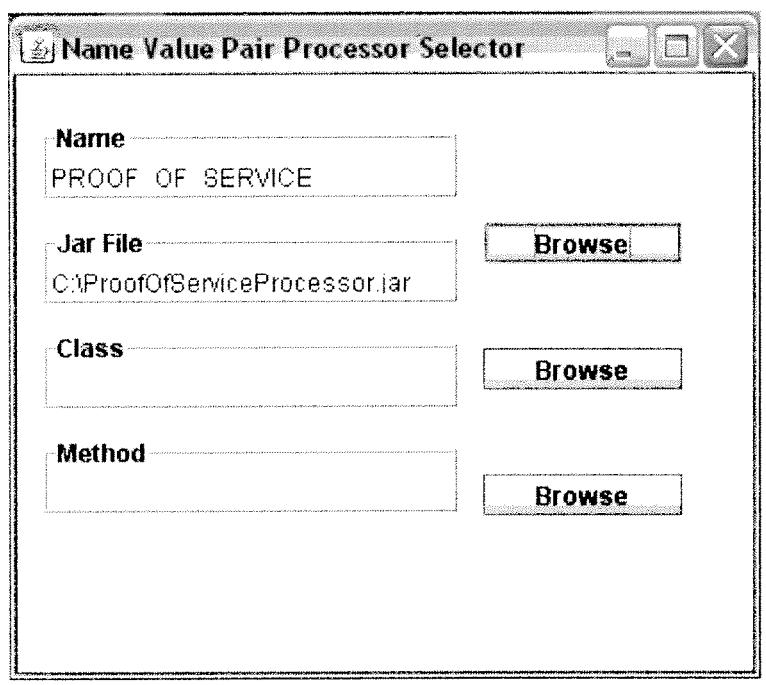
FIG. 145 IDE: Name-Value Pair Processor Selector after selecting JAR File . . .
Figure 146:
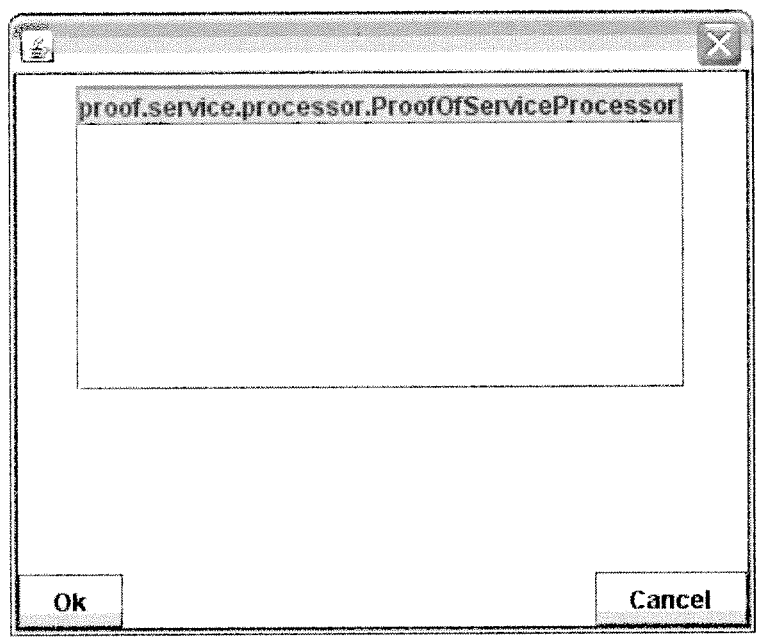
FIG. 146 IDE: Selection of the Class from the Selected JAR File . . .
Figure 147:
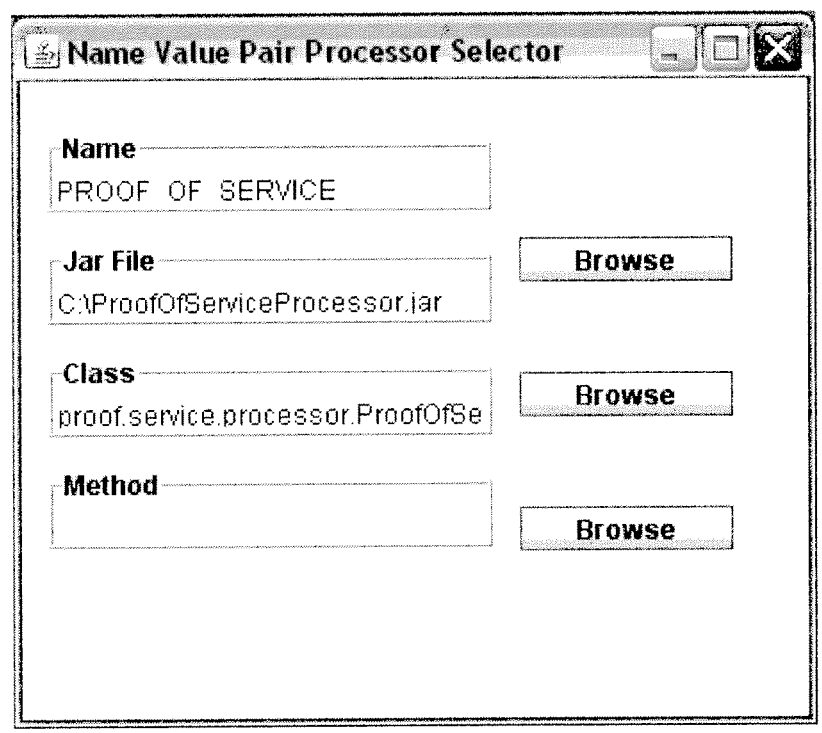
FIG. 147 IDE: Name-Value Pair Processor Selector after Selecting Class . . .

When the Jar file has been selected, the name of the jar file along with its path are displayed in the Jar File text field (as can be seen in FIG. 145). The next step in the process involves the selection of the class that contains the functionality that will be executed by the Email Processor when it receives the corresponding name-value pair. The class is selected by clicking the Browse button next to the "Class" text field. When said Browse button is clicked, a dialog window displays the list of classes contained within the selected JAR file (illustrated by FIG. 146).

In this particular case, the JAR file contains only one class (the proof.service.processor.ProofOfServiceProcessor). The class can be selected by double clicking the corresponding item in the list. Once selected, the binary name of the class is displayed in the Class text field (as seen in the FIG. 147).

Figure 148:
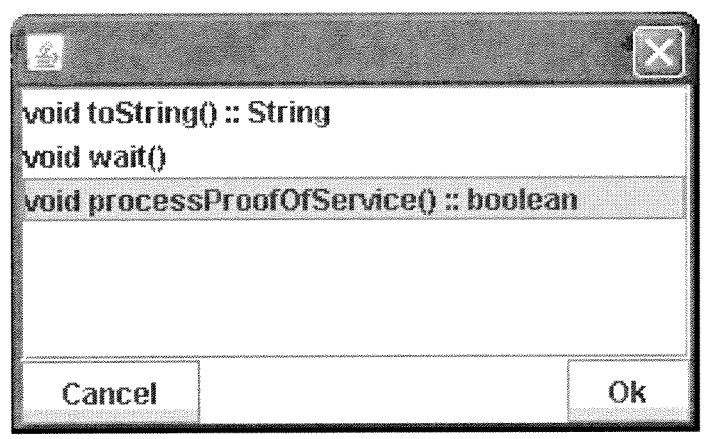
FIG. 148 IDE: Selection of Function to Process the Value of the Pair . . .
Figure 149:
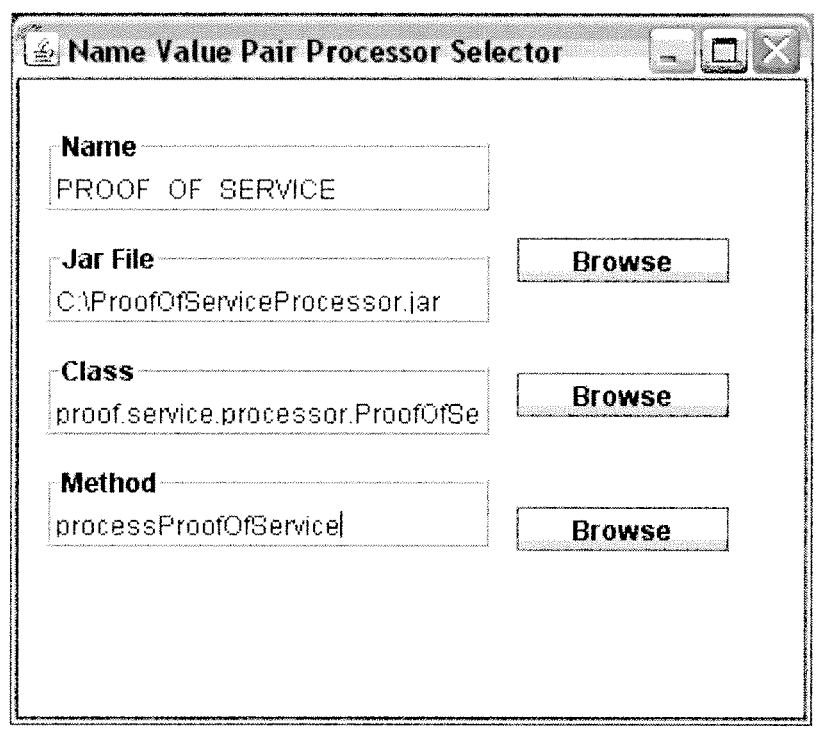
FIG. 149 IDE: Overview of Content of As-Designed XML for Email Processor . . .

The last step is selecting the method that performs the processing of the Name Value Pair. The method can be selected by clicking the Browse button by the "Method" text field. This button displays a dialog window that contains a list with the methods available in the selected class, as seen in FIG. 148. The method is selected by double clicking the proper item in the list. After the method has been selected, its name is displayed in the "Method" text field (as shown in FIG. 149).

After all of the information has been provided, the XML that describes the modules of the Email Processor is modified, as shown below:

```
<Klasses>
 <Classes>
    <Klass Command="PROOF_OF_SERVICE" Method="processProofOfService"
        Klass="pos.processor.ProofOfServiceProcessor"
                JarPath="ProofOfServiceProcessor.jar"/>
    <Klass Command="POS" Method="parseProofOfServiceHeader"
        Klass="pos.processor.ProofOfServiceProcessor"
                JarPath="ProofOfServiceProcessor.jar"/>
    <Klass Command="POS_RESPONSE" Method="processProofOfServiceResponse"
        Klass="pos.processor.ProofOfServiceProcessor"
                JarPath="ProofOfServiceProcessor.jar"/>
    <Klass Command="RESPONSE_TO_PLEADING" Method="processResponseToPleading"
        Klass="pleading.processor.PleadingProcessor"
                JarPath="PleadingsProcessor.jar"/>
    <Klass Command="PLEADING_RESPONDS_TO_PLEADING"
        Klass="pleading.processor.PleadingProcessor"
                JarPath="PleadingsProcessor.jar"/>
    <Klass Command="PLEADING" Method="processPleading"
        Klass="pleading.processor.PleadingProcessor"
                JarPath="PleadingsProcessor.jar"/>
    <Klass Command="PLEADING_RESPONSE" Method="processPleadingResponse"
        Klass="pleading.processor.PleadingProcessor"
                JarPath="PleadingsProcessor.jar"/>
    <Klass Command="MATTER_ELD" Method="processMatterELD"
        Klass="pleading.processor.PleadingProcessor"
                JarPath="PleadingsProcessor.jar"/>
    <Klass Command="MATTER_PARTY" Method="processMatterParty"
        Klass="pleading.processor.PleadingProcessor"
                JarPath="PleadingsProcessor.jar"/>
 </Classes>
</Klasses>
```

Such a development environment may provide a common processor module as a standardized function in the online litigation client applications, executing the name-value pairs as a background task, extending the functionality of the Email Processor Module described in Protector-Receiver to include the online litigation functionality. The processor module may invoke dynamic class loading and algorithms. The development environment also may include a standard meta-file format, such as one expressed in XML, which the developer uses to add the name-value pairs that express the default, automatic functionality that effectuates the particular litigation-related process that the developer wishes to bring about. A formally standardized meta-file, the functionality of which the developer extends by adding name-value pairs, may be provided to ensure compatibility among the developed applications.

This method of creating an encrypted network for professionals who, using a dedicated client application, exchange meta-files that automatically execute professionally specific functions as a background task, is not limited to lawyers. It is generally applicable in the professional world. For example, military officers may enjoy applications resembling Lit Linker that encrypt and transmit battle plans on a private cloud, in the process broadcasting multiple encrypted copies as a bulwark against accidental loss. Doctors collaborating in treating a patient may use the same approach, as may investment bankers working on a deal who wish to use a common tool to calculate the net present value.

One Embodiment of Lit Linker is the application illustrated through the screen shots that are numbered as FIG. 124 through 141. The Lit Linker screen shots are referenced by number, and correspond to, the blocks of the Lit Linker Logic Flow Chart. The logic flow shows how litigation may be automated or streamlined by expressing some of the steps as algorithmic processes. The Lit Linker Screen Shots show how some of the processes of the above list of 41 items for automation by algorithm may be expressed in the lawyer's client application.

Litigation is one legal process subject to algorithmic expression, but is not the only legal activity that involves documents susceptible to automation per the embodiments. For example, deeds may be recorded electronically rather than conventionally when a county recorder uses the client application of the embodiments tailored to the special requirements of that public office. The recorded deeds and other legal writings given effect as official documents, when the recorder uses a dedicated application that processes the specialized documents meta-files, may be subject to algorithmic processing. In one embodiment the application used by the county recorder or by a notary is auto generated on a server and tailored to that person's individual use, per the embodiments. The certification process may invoke the embodiments, such as bio-indicators to prove authenticity. The application has individuation features, minimizing the security danger of the monoculture problem, and no two County Recorder applications are alike.

The use of such an application may give the official documents security through a multi-level Encryption Abstraction Layer, redundancy through the generation of multiple copies, and search capability for the documents on a private cloud. When a deed is submitted for recordation in digital form instead of on paper, one embodiment permits the county recorder's client software application to watermark it, encrypt it, generate multiple copies, and broadcast them across the private cloud that all of the recorders enrolled on the network share. In one embodiment the application of each county recorder may be a peer-to-peer application in which any peer can search for a copy of the deed on the other peers, because each peer stores a full set of all of the deeds recorded in that state. For reliability the peer applications may use solid state drives.

The existence of multiple official copies lessens the risk that one county recorder might negligently or corruptly falsify a copy of the deed or other officially recorded document, because the multiple true copies would stand in stark contrast to the version involved in the tampering. The existence of multiple copies is a prophylaxis against such a defalcation because a comparison would easily expose it. The broadcasting of multiple copies also eliminates the risk that if the county court house burns down the original documents would be lost. (The same principle applies to the pleadings in a litigated case).

Although Lit Linker may be a supplemental module of functionality in a Protector-Receiver application (this is the embodiment shown in the screen shots), it also may be implemented in other ways. It may be a stand-alone application. It may be an applet, or a plug-in that operates in the background with an email application such as Outlook© or Thunderbird©, or with MS Word™. Neither Lit Linker nor Protector-Receiver needs to be a fully embodied, stand-alone application. Either application may take the form of a module or filter, such as a plug-in or applet, that operates transparently in the background in connection with other applications. The small module approach presents the advantage of reducing the learning curve for the user who already uses MS Word™, Outlook™, Thunderbird™ or Gmail™ because in this embodiment the encryption and litigation functionality merely supplements those applications instead of replacing them, and operates invisibly in the background.

In fact, the ability of the automatic authentication and encryption capability of the embodiments to be expressed as a filter, add-on, or plug-in, or otherwise remain in the background, is one of its general advantages when compared to the other methods. Because the embodiments use an abstraction layer that invokes object oriented programming, they easily may coexist with other applications. The embodiments may be universalized by invoking an operating system to standardize the functionality, endowing the applications with interoperability in respect of the encrypted and authenticated output files of the applications that run under the OS, so that each application automatically encrypts and authenticates the documents.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer encryption method comprising:
auto encrypting bytes of plain-text to be sent from a first computer to a second computer during a session, using a common encryption algorithm composition including a first and second encryption algorithm, the common encryption algorithm composition being generated from accessing a set of encryption and decryption algorithms, and a first Encryption Logic Descriptor (ELD), wherein the first ELD includes a text file used in a class loading process or a similar process using another programming language, and encrypting includes the first computer parsing the first ELD text file to create a parsed text file, and auto-encrypting the unencrypted bytes of the plaintext using the common encryption algorithm composition which the first ELD describes, without user knowledge of the composition;

the common encryption algorithm composition including an object for which the class loading process (1) takes a first portion of the parsed ELD text file as a selection of the first encryption algorithm and a second portion of the parsed ELD text file as a selection of a first random parameter to be used within the selected first encryption algorithm; (2) takes the plaintext to be encrypted as a parameter which the first algorithm and first random parameter encrypt, (3) takes a third portion of the parsed ELD text file as a selection of the second encryption algorithm and a fourth portion of the parsed ELD text file as a selected second random parameter to be used within the second selected encryption algorithm;

and wherein auto-encrypting the plain-text includes (1) executing the first encryption algorithm with the first random parameter to encrypt the plain-text to create a first encrypted output, and (2) executing the second encryption algorithm with the second random parameter to encrypt the first encrypted output to create a second encrypted output, with the executing of the first and second encryption algorithms in the class loading process performed at the first computer without assistance from a computer server that includes hardware processor coupled to memory, and then, including the second encrypted output in a meta-file to be transmitted to the second computer, the second encrypted output including one of (1) a message and an attachment or (2) a streaming media file;

encrypting the text of the first ELD using a second and different ELD to create an encrypted first ELD text, using the class loading process and without user knowledge, adding the encrypted first ELD text to the metafile;

sending the meta-file from the first computer to the second computer, the transmission occurring without any encryption or decryption of the metafile on a server;

the second computer receiving the meta-file and parsing the encrypted, first ELD text file contained in the metafile and decrypting it by using a copy of the Second ELD in the class loading process, and parsing the encrypted bytes of plain-text in the meta-file and auto-decrypting the encrypted plain-text bytes using the decrypted first ELD, using the class loading process, and without user knowledge and with none of the decryption process of the second computer effectuated by a server, and presenting the auto-decrypted bytes to a recipient; the second ELD not being included in the metafile, the second ELD having previously been furnished, automatically and without user knowledge, to the two computers; and an automated, secure on line method for litigation at the first computer, using applications with a computer-to-computer communications capability and connected through a network, and the applications being capable of search, the applications processing metafiles that employ class loading and name-value pairs to execute litigation-related procedures.

2. The method of claim 1, the first and second computer each including a data structure comprising a URL, a matrix, a set of peers, or a Trust DMBS, wherein the data structure is used by the first computer in the session prior to sending the metafile to look up automatically and execute the second ELD to encrypt the first ELD as a background task, and in the next session of communication the same second ELD being used, but the Second ELD encrypting a new first ELD being used to auto encrypt and auto decrypt the plain-text.

3. The method of claim 2, further comprising the second ELD auto encrypting and auto decrypting, in addition to the first ELD, a digital image of a signature file inserted into the metafile upon transmission and decrypted upon receipt so as to appear in the written document that the metafile expresses; the signature image file being associated with the person who, by enrolling on the encrypted network, authorizes its automatic decryption and use as his signature in the documents which he has authored, encrypted, and transmitted to the other computer.

4. The method of claim 1, further comprising the first computer receiving, saving, installing the second ELD into the encryption application on the first computer and the second computer doing the same toward the end of auto encrypting and auto decrypting the first ELD, the applications automatically encrypting and decrypting the data sent back and forth using the first ELD and class loading and auto encrypting and auto decrypting the first ELD using the second ELD, the second ELD being installed automatically as a background task when the first computer and the second computers using the applications begin to communicate for the first time.

5. The method of claim 1, further comprising the second ELD, or the data from which it is generated, being provided to the first and second computers by satellite, radio, and non terrestrial data transmission means.

6. The method of claim 1, further comprising encrypting using new logic for each communication session between two computers, the logic being generated automatically, without user action, on a commonly connected Encryption Switch containing a logic engine, and the logic being provided automatically, without user action, to the computers via a network; or a virtual Encryption Switch and logic engine locally incorporated into the encryption application, the applications being a peer-to-peer architecture.

7. The method of claim 1 further comprising providing Proof of service for documents of legal significance, the fact of the transmission of the document being recorded on both computers, as well as the fact of the actual receipt of the document in a form identical to that of the transmitted document.

8. The method of claim 1 further comprising providing for each lawyer the automatically supplying to his computer of the new pleadings in the litigated case, each lawyer thereby keeping his set of pleadings current through a process operating as a background task executing each time one of the lawyers transmits a pleading to another lawyer, every lawyer thus being furnished automatically with the current global set of all pleadings in the case.

9. The method of claim 1, wherein and a matter value and a jurisdiction value are assigned to a data structure for each case when the case is commenced, the data set being installed and processed on the application of each computer, the data then being expressed in pleadings metafiles searched and processed according to the values; the metafiles being available to the computers in either a peer-to-peer topology and through the cloud or through a central server; the values being processed in the applications per algorithms that automate the first appearance of the new lawyers entering the case and carry out jurisdiction dependent legal processes, the matter value and the jurisdiction value constituting metadata in the metafile, the metadata being used in the class loading process to carry out the litigation related procedures.

10. The method of claim 1, further comprising an extension to the dynamic class loader using an XML text file, instantiated as an XmlBeans Object, as a configuration file that is parsed to load a programming language class.

11. The method of claim 10, the programming language class modifying digital television data at the point of reception by the viewer, by means of altering the audio and video streams via procedures controlled by the viewer or, by using a network, a third party acting on the viewer's behalf.

12. The method of claim 10 further comprising online litigation, which is effectuated by loading classes that carry out procedures pertaining to the litigation process, such as determining the authenticity of digital documents; the automatic updating on all of the computers in the litigation of the pleadings on file so that each computer enjoys the full, current set; matters control so that common matters are searched and grouped together; the virtual filing of legal documents; automatic proof of service; the generation of a rule set and table of authorities pertaining to the case based on its jurisdiction.

13. The method of claim 1, wherein the method is performed by a messaging system for sending messages including typed text to and receiving messages including typed text from other computers; wherein the first ELD is stored on the first computer prior to auto-encrypting the unencrypted bytes of the plain-text; wherein auto-encrypting the unencrypted bytes of the plain-text includes using the parsed ELD to control or perform the auto-encrypting; and wherein the plaintext is typed by a user of the first computer typing on a keyboard or using another text input device.

14. The method of claim 1, further comprising, prior to encrypting bytes of plain-text:
at least one server switch including the first encryption logic engine, the Switch creating the first ELD, wherein creating the first ELD includes: (1) randomly selecting the first and the second encryption algorithms from a plurality of encryption algorithms, (2) randomly selecting as to the first encryption algorithm and the second encryption algorithm, a sequence for their execution, (3) randomly selecting and recording the first and second random parameters, (4) identifying the plain-text to be encrypted;
recording of (1) through (4) above, with (1) through (4) above comprising portions of the text of the ELD; and
repeating the process creating the first ELD and transmitting the resulting plurality of ELD's to the first and the second computer, wherein the first ELD text file includes (a) the first, second, third and fourth potion of the parsed text file; and (c) a fifth ELD portion parameter.

15. The method of claim 14, further comprising, prior to encrypting bytes of plain-text:
the server switch distributing the copy of the plurality of encryption algorithms to the first computer, the second computer, and a third computer;
the server switch creating a plurality of ELDs using the same process for creating the first ELD;
the server sending copies of a plurality of ELD's, including a third ELD to the first computer, the third ELD including a third ELD text file to be used to auto-encrypt unencrypted bytes of a second plain-text to be sent from the first computer to the third computer in a second metafile, wherein auto-encrypting bytes of the second plain-text is to use the plurality of encryption algorithms and the same process for auto-encrypting the unencrypted bytes of the first plain-text; and
the server sending a copy of a fourth ELD to the first and the third computer, the fourth ELD to be used to encrypt the third ELD to create an encrypted third ELD, using the class loading process, to be added to the second metafile to be sent from the first computer to the third computer, the third computer parsing the metafile and executing the fourth ELD to decrypt the third ELD, and the third computer executing the third decrypted ELD to decrypt the second plain-text of the second metafile; the first and third computer storing a copy of the fourth ELD in a record of a trust DMBS on each computer.

16. The method of claim 14, further comprising:
the Switch generating and transmitting by secure means to the first computer and to the third computer, respectively, a random nonidentical plurality of ELD's, the first computer and the third computer each storing its respective nonidentical plurality a storage means/resource ("magazine") to make the ELD's accessible when needed, and the third computer to execute the same automatic encryption/decryption processes as the first computer; and
ones of the random nonidentical plurality of ELD's to be randomly withdrawn by the first computer and the third computer from its respective magazine whenever either computer requires an ELD to carry out the class loading process, thereby to encrypt either the bytes of a plain-text message payload or the bytes of the text of another, different ELD; each computer then to execute the withdrawn ELD and load the class;
the switch to perform the loading of the magazine with the ELD's magazine replenishment occurring without user selection and automatically.

17. The method of claim 16, further comprising:
on the first computer, a first copy of a first data structure/DBMS, the structure to record trust relationships among the computers, a first copy of the structure/DBMS operating as the first trust DMBS of the first computer;
the first copy of the first trust DBMS of the first computer containing a first blank record corresponding to the third computer, the first blank record to be fulfilled by a first copy of a first value signifying mutual trust between the first and third computers, the first copy of the trust value identifying procedures and resources from which trust is established per an executable process;
the switch sending a second copy of the first trust DBMS to the third computer, the second copy containing a second blank record, the second blank record to be fulfilled by a second copy of the first trust value, the second copy of the trust value, as it matches the first copy, expressing the existence of the mutual trust, the matching values thereby enabling reciprocal trust procedures and resources;
the switch sending the trust DBMS copies to the first computer and the third computer to be stored separate from the magazine also present on the computers;
the Switch generating and transmitting, to both the first and the third computer and by secure means, a trust value recorded in the trust DMBS of the first and third computers establishing their mutual trust, the value including an identical copy of a third ELD;
the transmission of the third ELD from the Switch to the first and third computer occurring prior to the transmission of any encrypted bytes from any one computer to the others; and
wherein transmitting the third ELD includes causing the first computer to perform, receiving the first copy of the third ELD and saving it in the first record of the first computer's first copy of the trust DBMS, that record corresponding to the third computer; and causing the third computer to perform having stored in its own, second copy of the first trust DBMS a second identical copy of the third ELD in the record corresponding to the first computer: thus allowing each computer to identify the other as a trusted counterpart and execute the reciprocal trust procedure.

* * * * *